(12) United States Patent
Takahara et al.

(10) Patent No.: US 10,263,534 B2
(45) Date of Patent: Apr. 16, 2019

(54) POWER CONVERSION DEVICE

(71) Applicant: Mitsubishi Electric Corporation, Chiyoda-ku (JP)

(72) Inventors: Takaaki Takahara, Chiyoda-ku (JP); Ryota Kondo, Chiyoda-ku (JP); Satoshi Murakami, Chiyoda-ku (JP); Hajime Toyoda, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 16/063,640

(22) PCT Filed: Aug. 29, 2016

(86) PCT No.: PCT/JP2016/075181
§ 371 (c)(1),
(2) Date: Jun. 18, 2018

(87) PCT Pub. No.: WO2017/138176
PCT Pub. Date: Aug. 17, 2017

(65) Prior Publication Data
US 2019/0006952 A1 Jan. 3, 2019

(30) Foreign Application Priority Data
Feb. 8, 2016 (JP) ................................. 2016-021471

(51) Int. Cl.
*H02M 7/217* (2006.01)
*H02M 1/12* (2006.01)
*H02M 1/42* (2007.01)

(52) U.S. Cl.
CPC ......... *H02M 7/217* (2013.01); *H02M 1/4216* (2013.01); *H02M 1/12* (2013.01); *H02M 1/4233* (2013.01)

(58) Field of Classification Search
CPC ...... H02M 7/217; H02M 7/4216; H02M 7/49; H02M 7/219; H02M 7/12; H02M 7/497;
(Continued)

(56) References Cited

U.S. PATENT DOCUMENTS

2009/0116268 A1 5/2009 Kishida et al.
2011/0121661 A1* 5/2011 Kawakami ................ G05F 1/67
307/110
(Continued)

FOREIGN PATENT DOCUMENTS

EP 2012419 A1 1/2009
EP 2731248 A1 5/2014
(Continued)

OTHER PUBLICATIONS

Office Action dated Jan. 31, 2017 in corresponding Japanese application No. 2016-575254(with partial English translation).
(Continued)

*Primary Examiner* — Gustavo Rosario Benitez
(74) *Attorney, Agent, or Firm* — Oblon, McClelland, Maier & Neustadt, L.L.P.

(57) ABSTRACT

A power conversion device includes a reactor, a single-phase inverter, and a single-phase converter which are connected in series to each other between an AC power supply and a smoothing capacitor, and performs power conversion between AC voltage of the AC power supply and DC voltage of the smoothing capacitor. The power conversion device includes a control unit which controls switch elements of the single-phase inverter and switch elements of the single-phase converter so that charging operation and discharging operation of the DC capacitor are performed in one switching cycle of the single-phase inverter and the charging amount and the discharging amount thereof are equal to each other.

19 Claims, 171 Drawing Sheets

(58) Field of Classification Search
CPC .......... H02M 7/537; H02M 7/02; H02M 7/04; H02M 7/10; H02M 1/4233; H02M 1/42
See application file for complete search history.

(56) References Cited

U.S. PATENT DOCUMENTS

| | | |
|---|---|---|
| 2011/0280049 A1 | 11/2011 | Mori et al. |
| 2013/0058134 A1* | 3/2013 | Yamada ................ H02M 7/217 363/17 |
| 2013/0121045 A1* | 5/2013 | Murakami ............. H02M 7/49 363/67 |
| 2013/0336028 A1 | 12/2013 | Kawamura |
| 2014/0233279 A1* | 8/2014 | Kondo ................. H02M 7/217 363/37 |
| 2015/0043253 A1* | 2/2015 | Awane ................ H02M 1/4258 363/37 |
| 2015/0357937 A1 | 12/2015 | Takahara et al. |
| 2016/0036346 A1 | 2/2016 | Kawamura |
| 2016/0036347 A1 | 2/2016 | Kawamura |
| 2016/0036348 A1 | 2/2016 | Kawamura |
| 2017/0179836 A1 | 6/2017 | Kondo et al. |

FOREIGN PATENT DOCUMENTS

| | | |
|---|---|---|
| JP | 2009-95159 A | 4/2009 |
| JP | 2011-147198 A | 7/2011 |
| JP | 2013-17346 A | 1/2013 |
| WO | WO 2007/129456 A1 | 11/2007 |
| WO | WO 2010/082265 A1 | 7/2010 |
| WO | WO 2013/035383 A1 | 3/2013 |
| WO | WO 2014/125697 A1 | 8/2014 |
| WO | WO 2015/174123 A1 | 11/2015 |

OTHER PUBLICATIONS

International Search Report dated Nov. 8, 2016 in PCT/JP2016/075181, filed Aug. 29, 2016.

* cited by examiner

FIG. 142

| Vc2 COMMAND | Vc3 COMMAND | 0~t31 MODE 7 | t31~Tsw MODE 2 | Tsw~T32 MODE 8 | T32~2Tsw MODE 1 |
|---|---|---|---|---|---|
| INCREASE | INCREASE | ⇒MODE 9 | | | |
| INCREASE | DECREASE | ⇒MODE 8 | | ⇒MODE 9 | |
| DECREASE | INCREASE | ⇒MODE 6 | | ⇒MODE 7 | |
| DECREASE | DECREASE | ⇒MODE 9 | | ⇒MODE 6 | |
| NONE | NONE | | ⇒MODE 9 | | |
| DECREASE | NONE | | | ⇒MODE 9 | |
| NONE | INCREASE | | | | |
| NONE | DECREASE | | | | ⇒MODE 9 |

FIG. 156

| Vc2 COMMAND | Vc3 COMMAND | 0~t31 MODE 7 | t31~Tsw MODE 2 | Tsw~T32 MODE 8 | T32~2Tsw MODE 1 |
|---|---|---|---|---|---|
| INCREASE | INCREASE | ⇒MODE 9 | | ⇒MODE 9 | |
| INCREASE | DECREASE | ⇒MODE 8 | | | |
| DECREASE | INCREASE | | | ⇒MODE 7 | |
| DECREASE | DECREASE | ⇒MODE 6 | | ⇒MODE 6 | |
| INCREASE | NONE | ⇒MODE 9 | | | |
| DECREASE | NONE | | ⇒MODE 9 | | |
| NONE | INCREASE | | | ⇒MODE 9 | |
| NONE | DECREASE | | | | ⇒MODE 9 |

FIG. 169
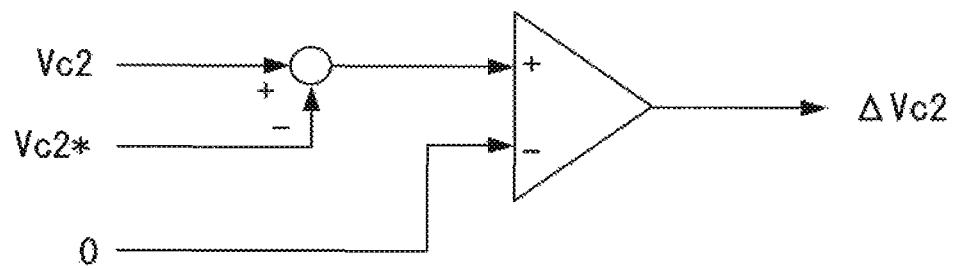
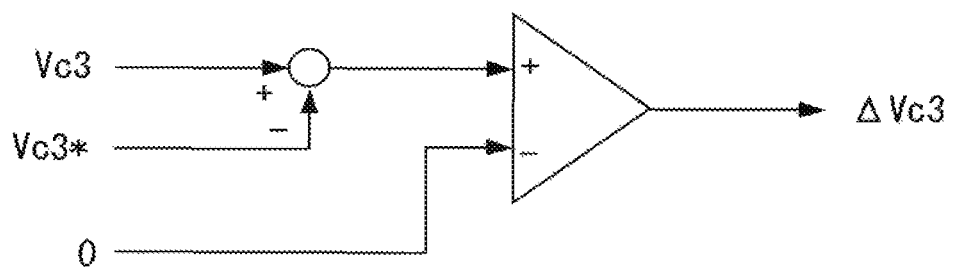

POWER CONVERSION DEVICE

TECHNICAL FIELD

The present invention relates to a power conversion device which has a reactor, an inverter, and a converter connected in series to each other between an AC power supply and a smoothing capacitor and which performs power conversion between AC voltage of the AC power supply and DC voltage of the smoothing capacitor. In particular, the present invention enables size reduction of a DC capacitor used in the inverter, and the like.

BACKGROUND ART

A conventional power conversion device includes: a converter (main converter) composed of four switch elements; a smoothing capacitor for smoothing output of the converter; a single-phase inverter (sub converter) composed of four switch elements and a DC capacitor and having one AC terminal connected to an AC terminal of the converter; and a reactor connected between the AC terminal of the single-phase inverter and the AC power supply (see, for example, Patent Document 1).

The converter is driven by gate pulses with 1 pulse per half cycle of the AC power supply, to operate so that generated voltage at the AC terminal of the single-phase inverter becomes a difference between voltage of the AC power supply and generated voltage of the AC terminal of the converter, thereby reducing voltage applied to the reactor and controlling the power factor for voltage and current of the AC power supply so as to be a high power factor while controlling voltage of the smoothing capacitor to be a desired voltage.

CITATION LIST

Patent Document

Patent Document 1: Re-publication of PCT International Publication WO2010/082265

SUMMARY OF THE INVENTION

Problems to be Solved by the Invention

In the conventional power conversion device, the inverter performs ON/OFF operation with its switching cycle, and control is performed such that, during an ON period of the converter, the DC capacitor is charged by the AC power supply, and during an OFF period of the converter, the DC capacitor is discharged toward the smoothing capacitor. As described above, since the converter performs switching in synchronization with the half cycle of the AC power supply, energy of charging and discharging of the DC capacitor in one cycle of the AC power supply becomes great, so that ripple voltage of the DC capacitor increases.

Increase in ripple voltage leads to increase in the withstand voltage required for switching elements of the inverter, to which the ripple voltage is applied, and thus it becomes difficult to apply low-withstand-voltage elements which are capable of high-speed switching. Therefore, in order to reduce ripple voltage to enable high-speed switching, as a result, the capacitance of the DC capacitor is inevitably set to be great, thus causing a problem that the device size increases.

The present invention has been made to solve the above problem, and an object of the present invention is to provide a smaller-size power conversion device by enabling reduction in the capacitance of the DC capacitor used in the inverter.

Solution to the Problems

A power conversion device according to the present invention has a reactor, an inverter, and a converter connected in series to each other between an AC power supply and a smoothing capacitor, and which performs power conversion between AC voltage of the AC power supply and DC voltage of the smoothing capacitor. The inverter includes inverter AC terminals, a DC capacitor, and switch elements, and switches a voltage level between the inverter AC terminals to a positive/negative value of voltage of the DC capacitor, or zero voltage, through switching operations of the switch elements. The converter includes converter AC terminals connected to the AC power supply via the reactor and the inverter, converter DC terminals connected to the smoothing capacitor, and switch elements, and switches a voltage level between the converter AC terminals to a positive/negative value of voltage of the smoothing capacitor, or zero voltage, through switching operations of the switch elements. The power conversion device includes a control unit for controlling the switching operations of the switch elements of the inverter and the switch elements of the converter. The control unit controls the switch elements of the inverter and the switch elements of the converter so that charging operation and discharging operation of the DC capacitor are performed in one switching cycle of the inverter and a charging amount and a discharging amount thereof are equal to each other.

Effect of the Invention

In the power conversion device according to the present invention, as described above, switching operations of the switch elements are controlled so that the charging amount and the discharging amount of the DC capacitor become equal to each other in one switching cycle of the inverter irrespective of the very long cycle of the AC power supply, whereby the charging/discharging amount itself is reduced, the capacitance required for the DC capacitor in order to suppress ripple voltage is reduced, and size reduction of the device is achieved.

BRIEF DESCRIPTION OF THE DRAWINGS

FIG. 120 is a diagram showing a current route in a first period in FIG. 119.

FIG. 121 is a diagram showing a current route in a second period in FIG. 119.

FIG. 122 is a diagram showing a current route in a third period in FIG. 119.

FIG. 123 is a diagram showing a current route in a fourth period in FIG. 119.

FIG. 124 is a diagram showing a current route in a fifth period in FIG. 119.

FIG. 125 is a diagram showing a current route in a sixth period in FIG. 119.

Figure 126:
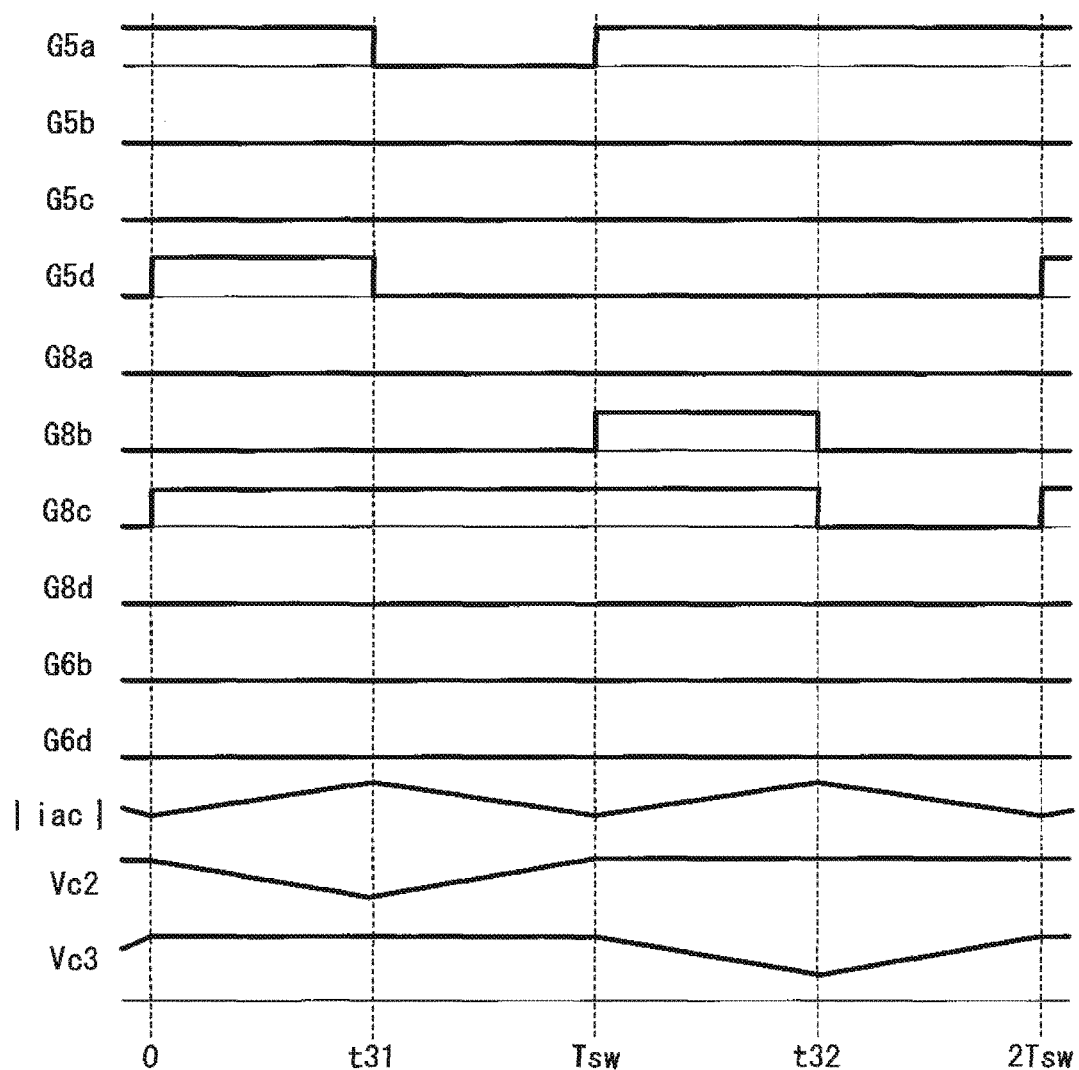

FIG. 126 is a waveform schematic diagram showing the operation state in an area 3 in the negative half wave of the AC power supply 1, in the power conversion device according to embodiment 3 of the present invention.

Figure 127:
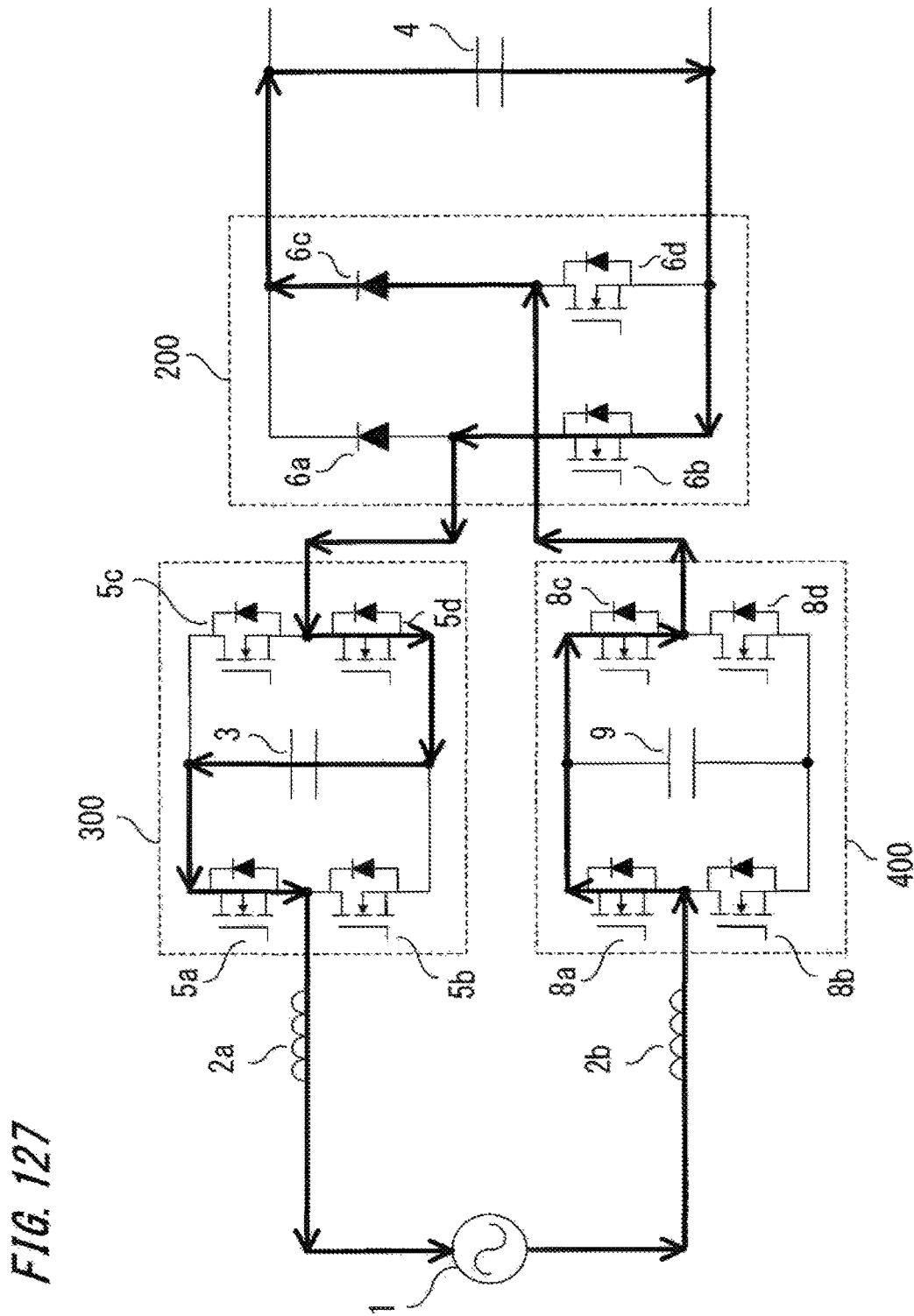

FIG. 127 is a diagram showing a current route in a first period in FIG. 126.

Figure 128:
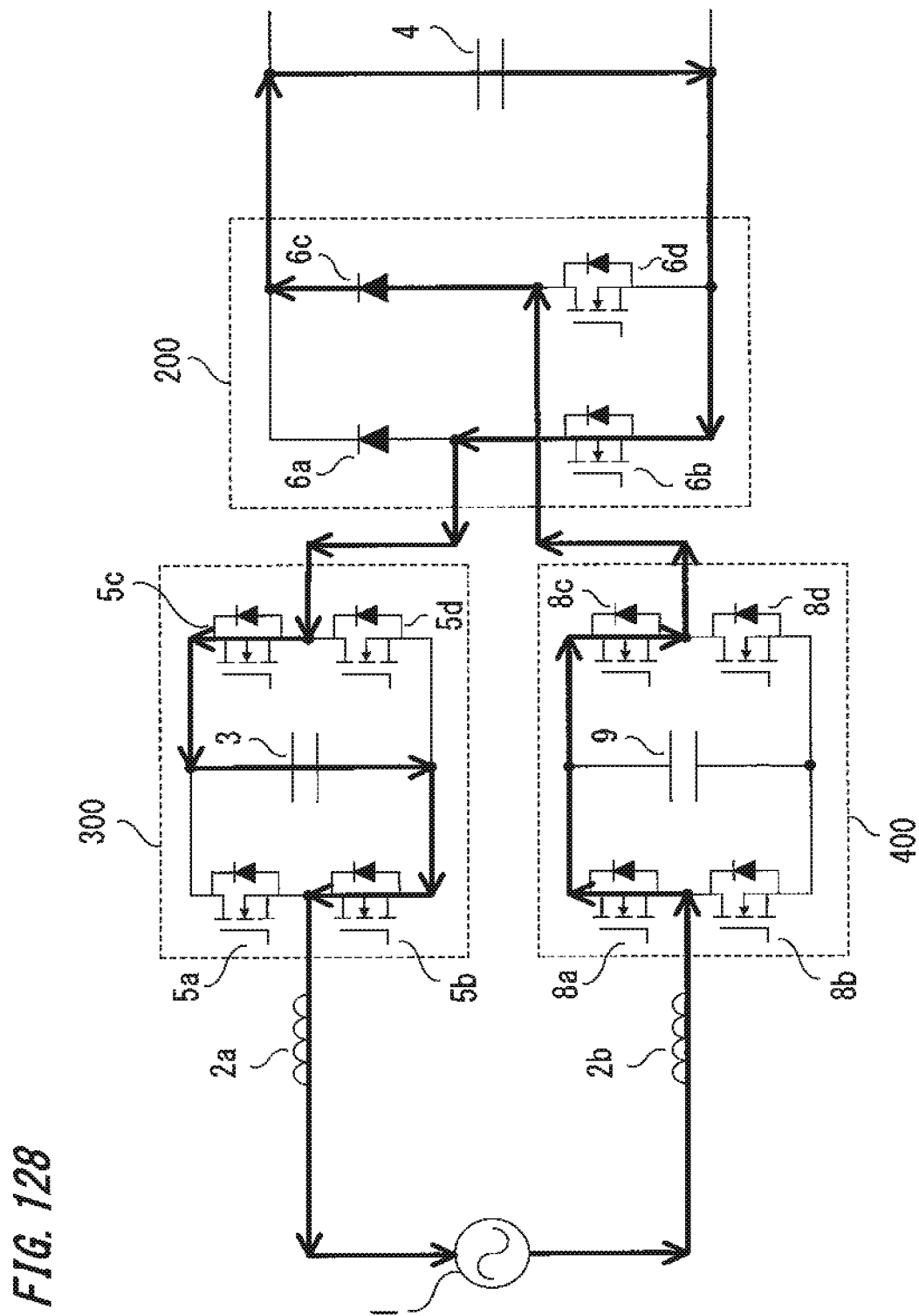

FIG. 128 is a diagram showing a current route in a second period in FIG. 126.

Figure 129:
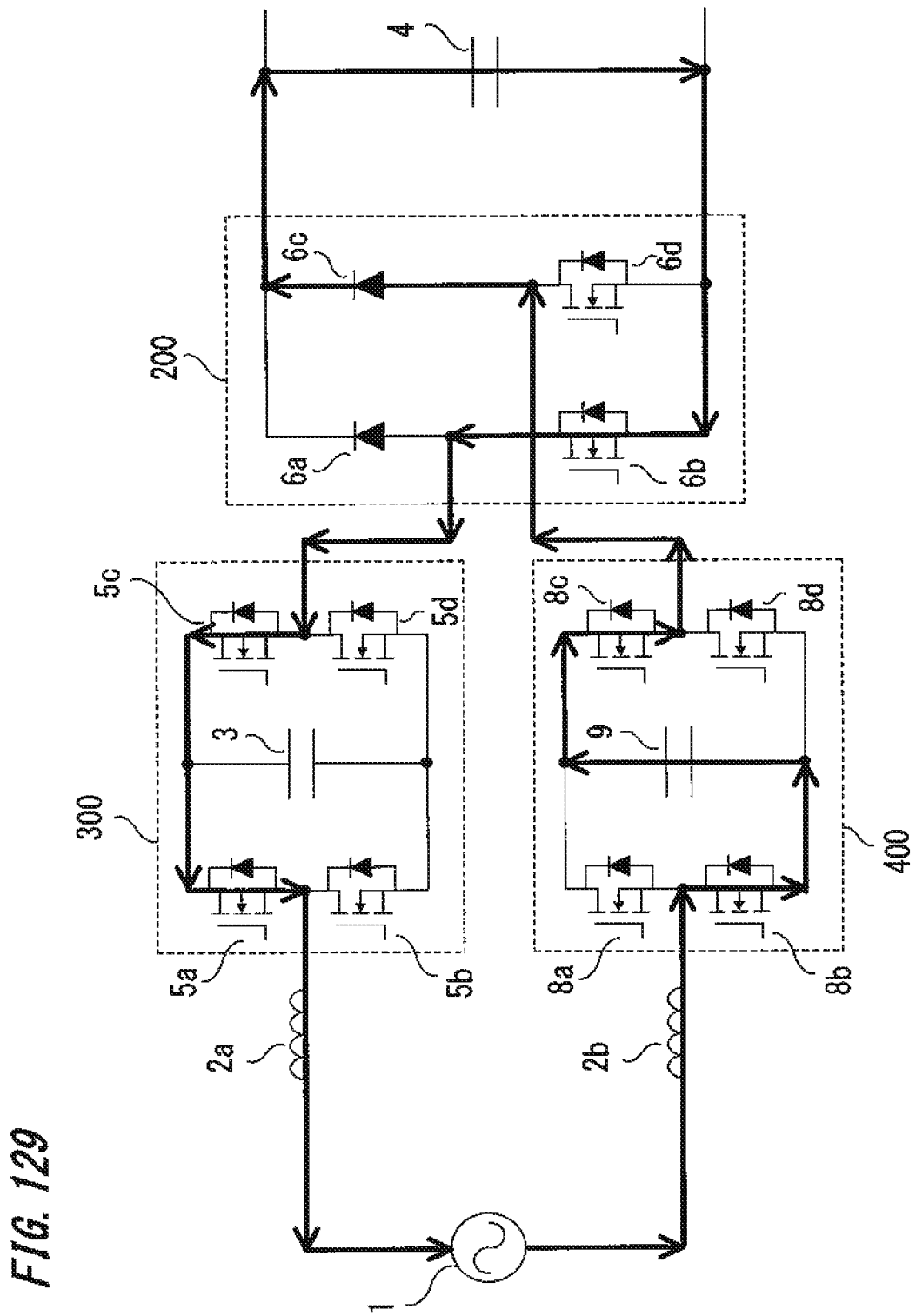

FIG. 129 is a diagram showing a current route in a third period in FIG. 126.

Figure 130:
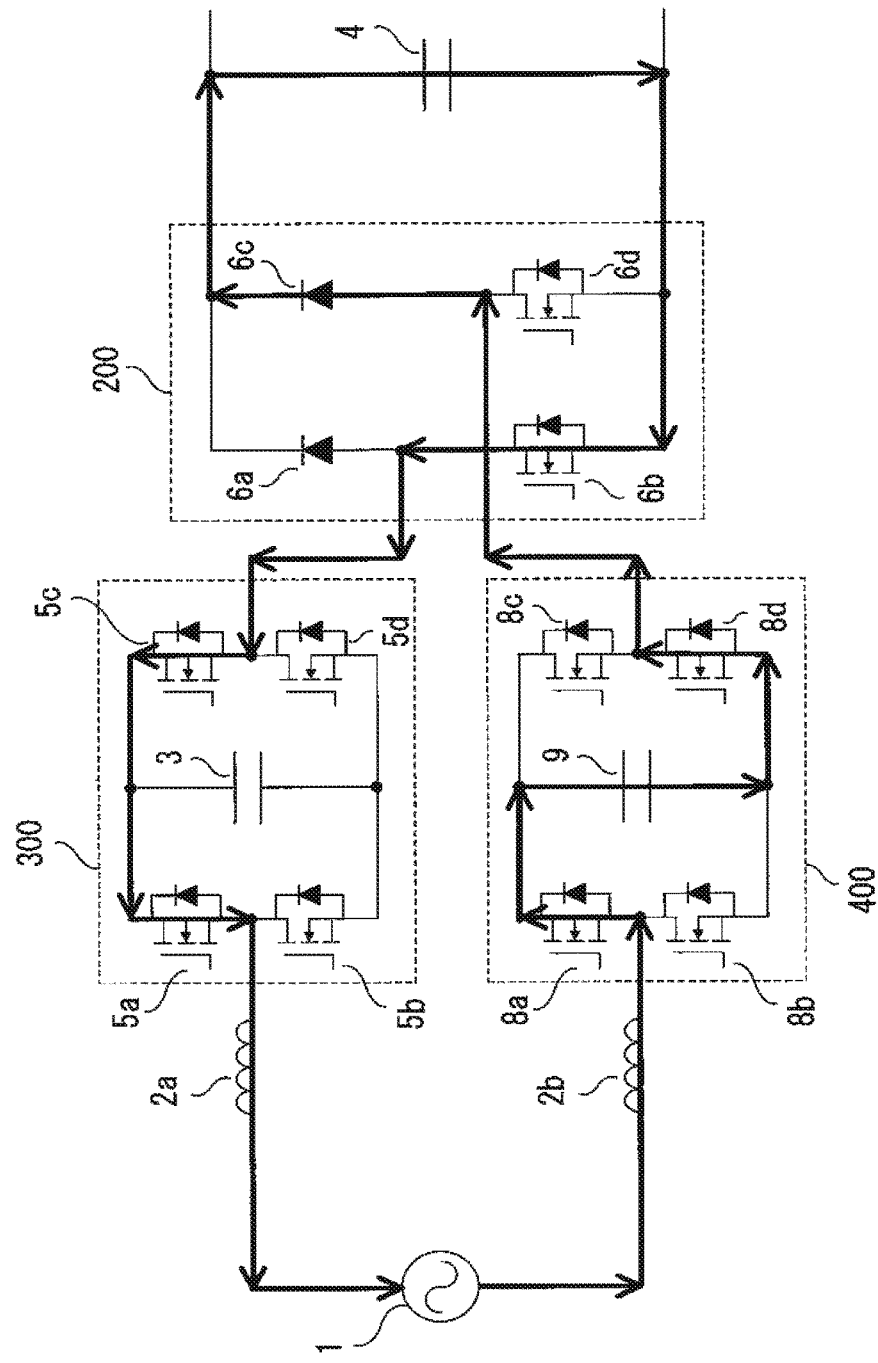

FIG. 130 is a diagram showing a current route in a fourth period in FIG. 126.

Figure 131:
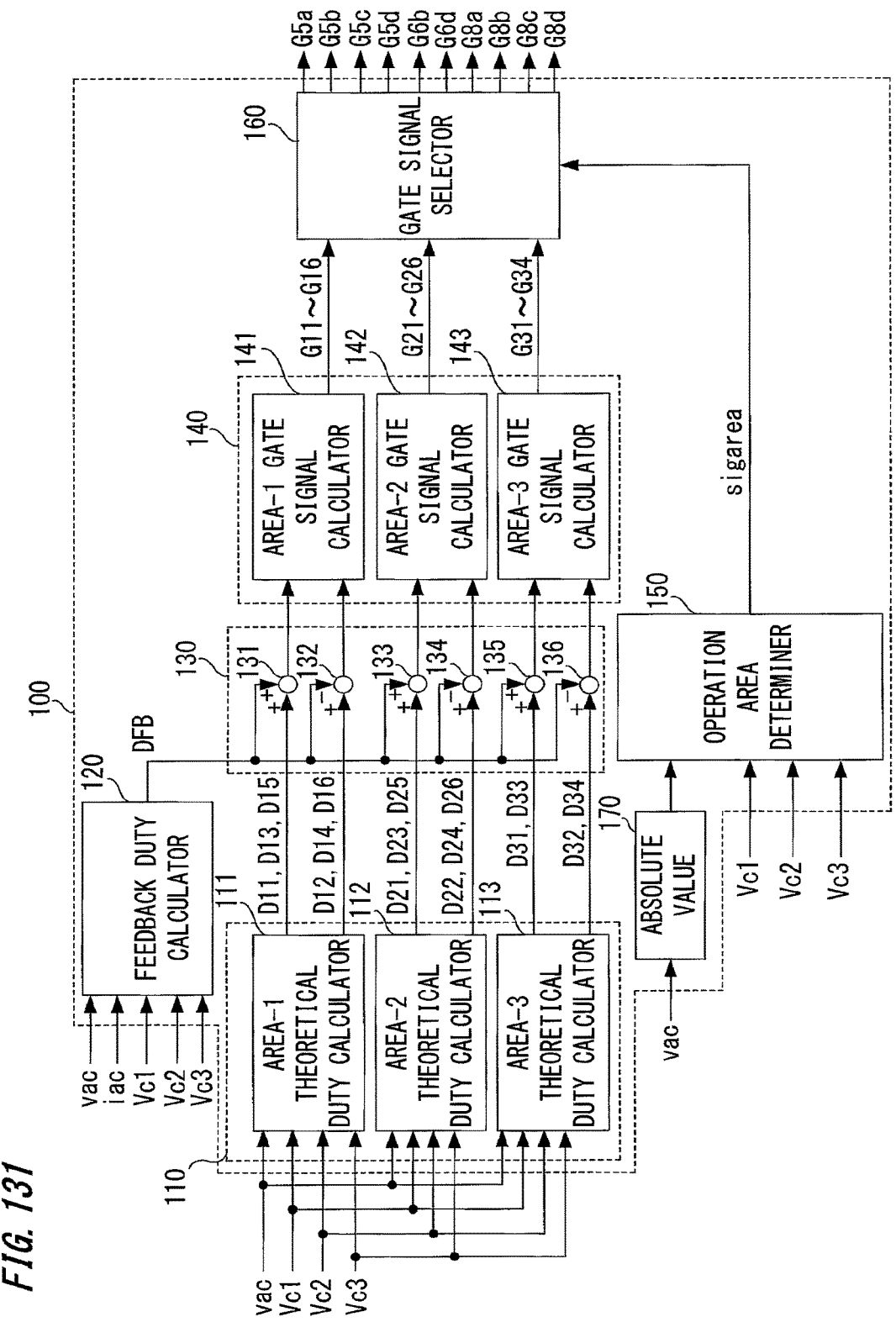

FIG. 131 is a configuration diagram of a control unit 100 in the power conversion device according to embodiment 3 of the present invention.

Figure 132:
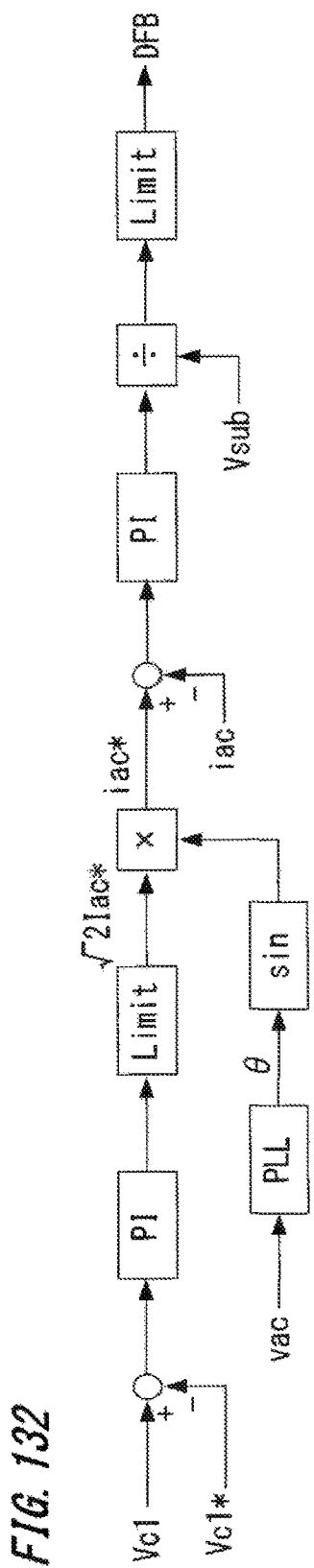

FIG. 132 is a configuration diagram of a feedback duty calculator 120 composing the control unit 100 in FIG. 131.

Figure 133:
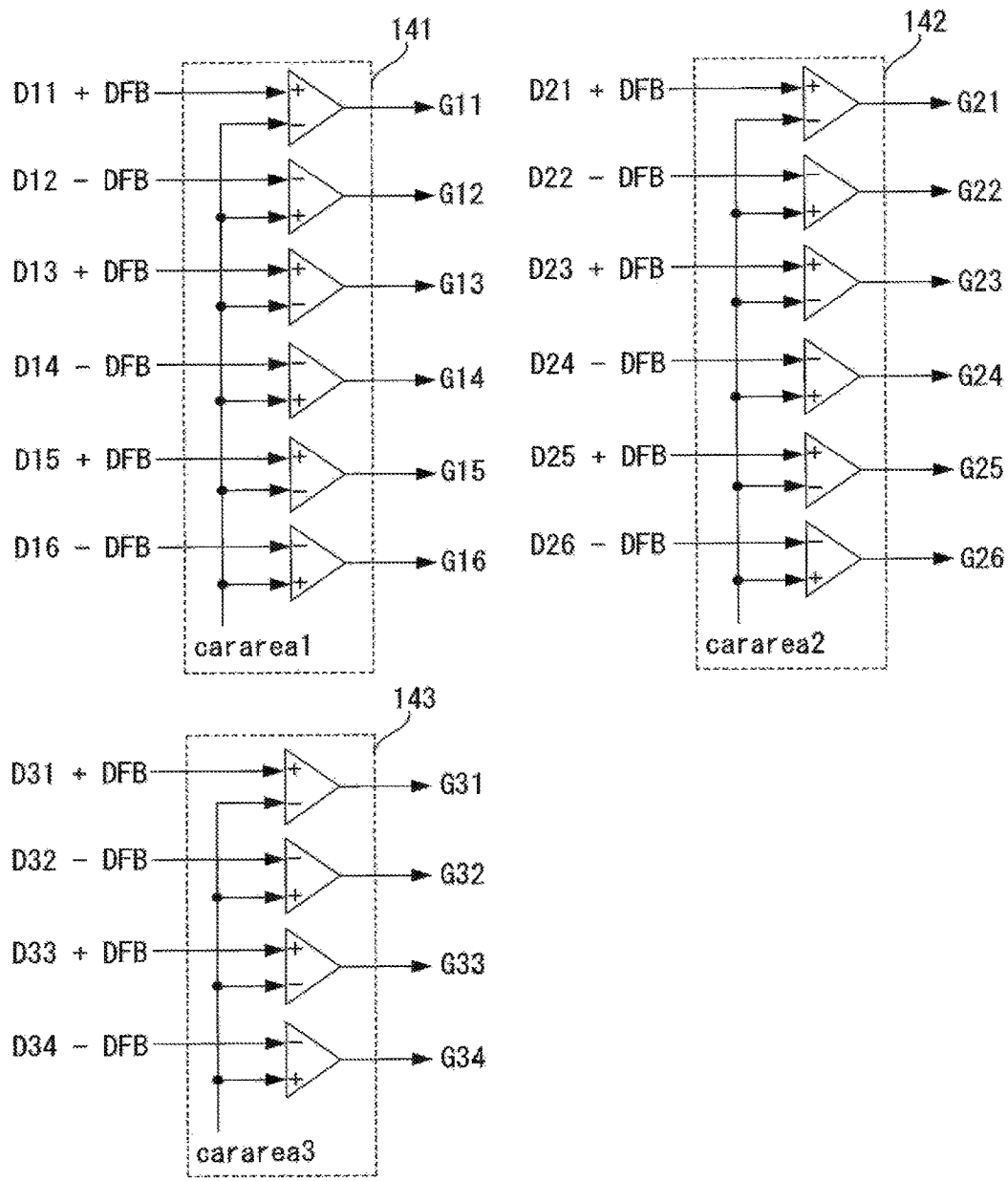

FIG. 133 is a configuration diagram of a gate signal calculator 140 composing the control unit 100 in FIG. 131.

Figure 134:
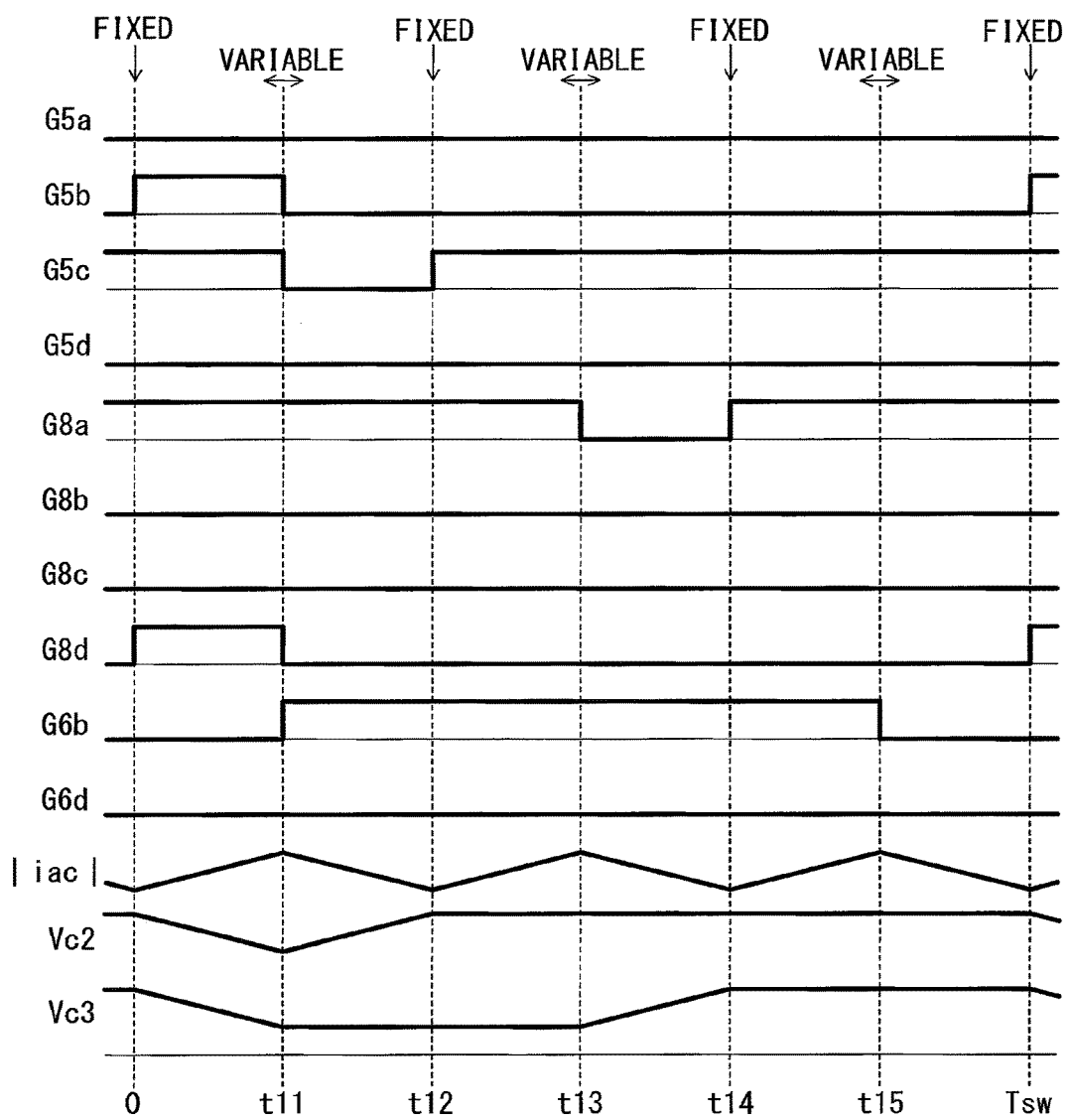

FIG. 134 is a gate pattern diagram in an area 1 in embodiment 3.

Figure 135:
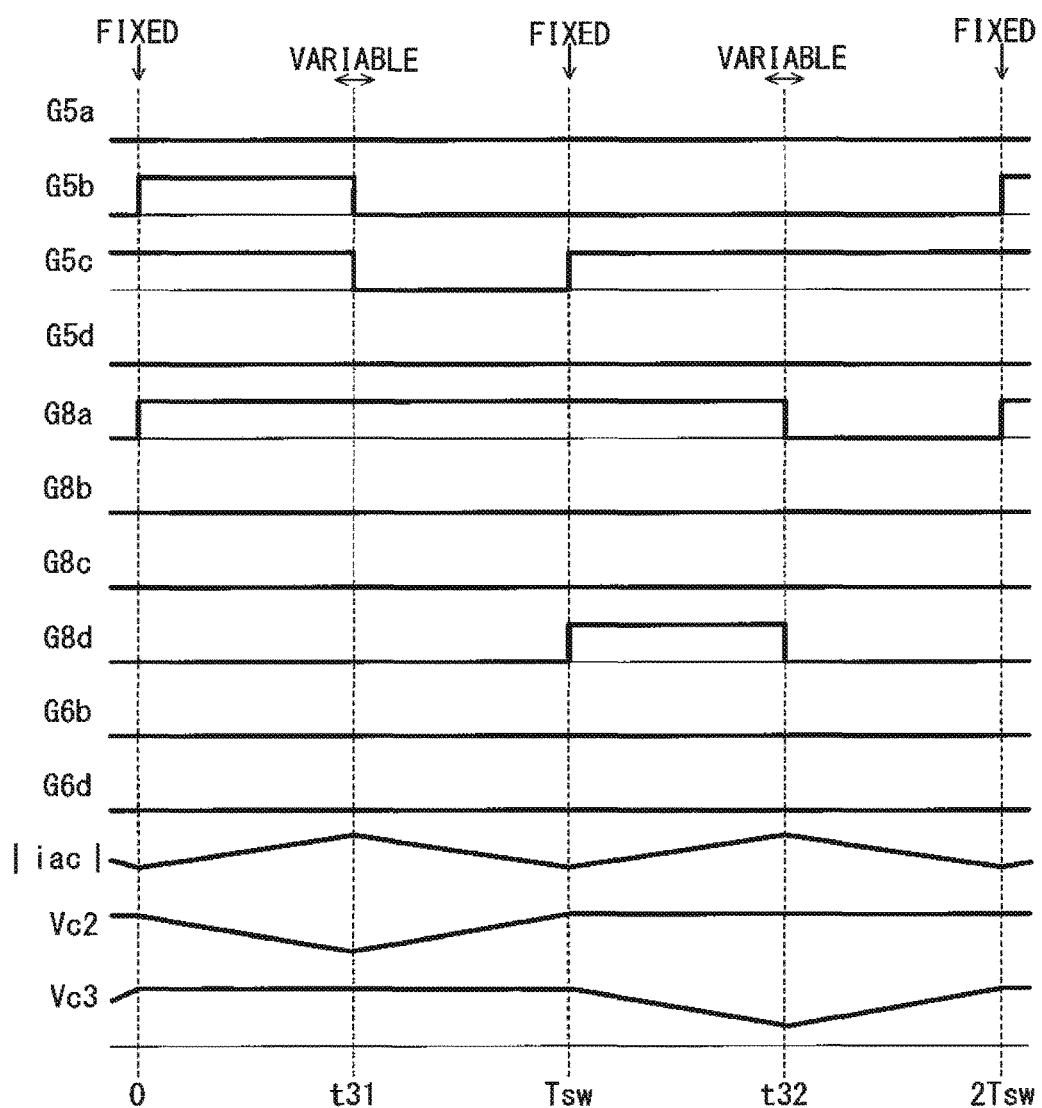

FIG. 135 is a gate pattern diagram in an area 3 in embodiment 3.

Figure 136:
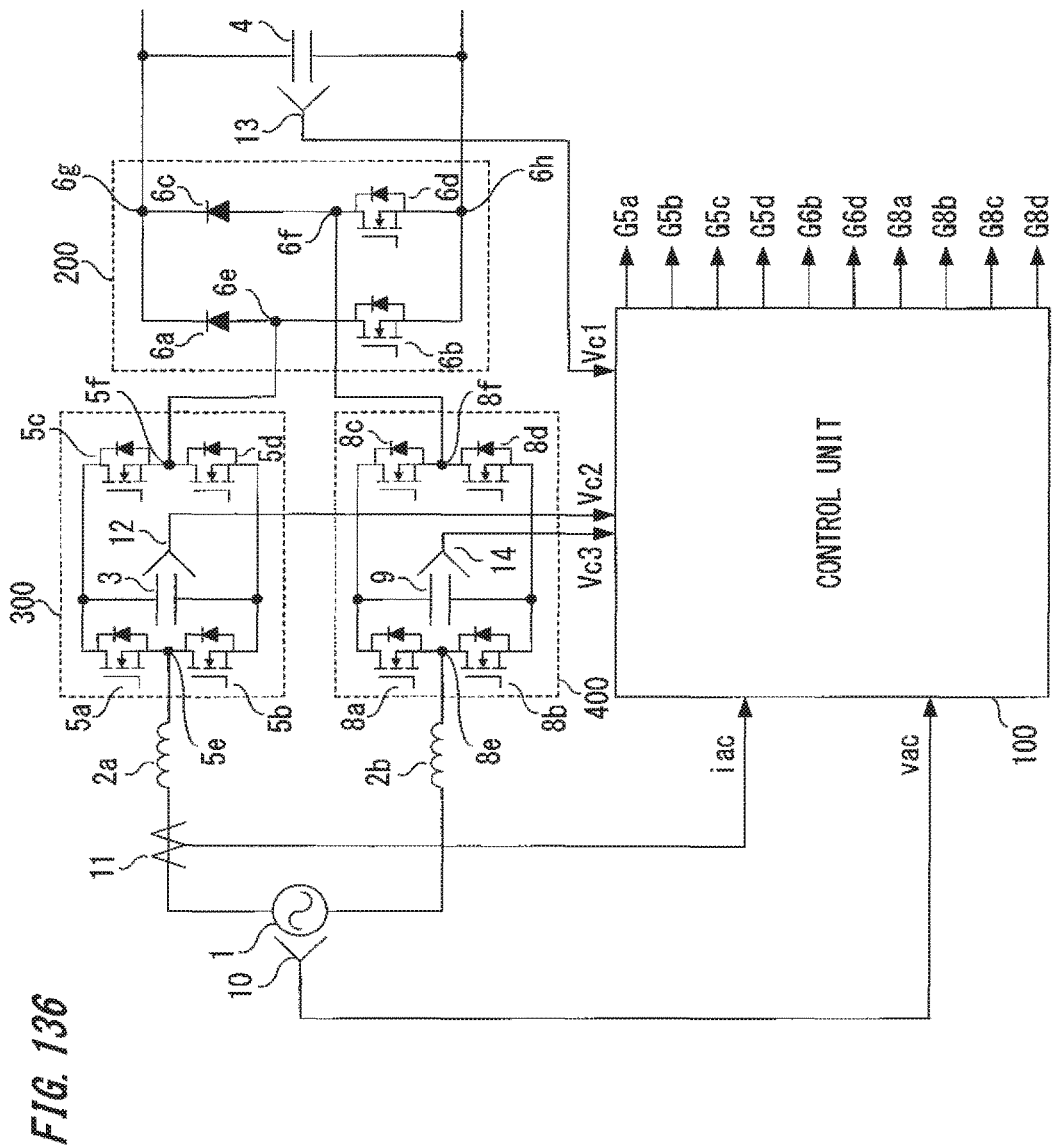

FIG. 136 is a circuit configuration of a power conversion device according to embodiment 4 of the present invention.

Figure 137:
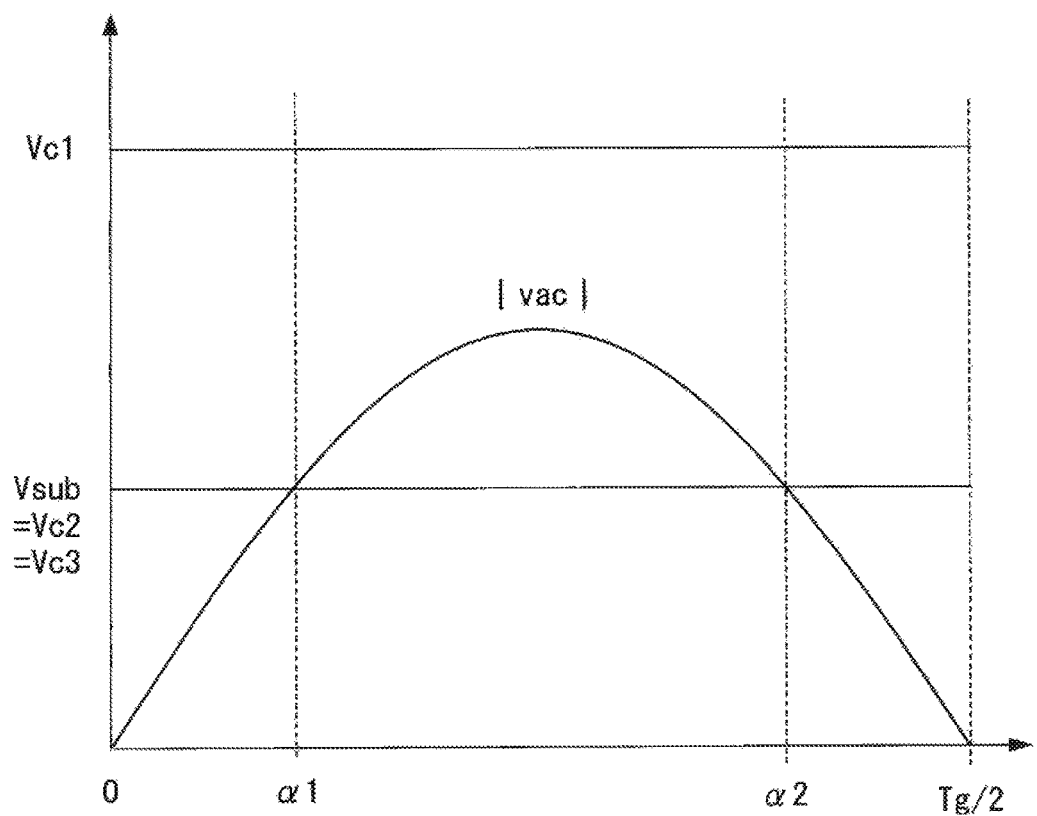

FIG. 137 is a diagram showing a relationship of voltages in a step-up operation mode in the power conversion device according to embodiment 4 of the present invention.

Figure 138:
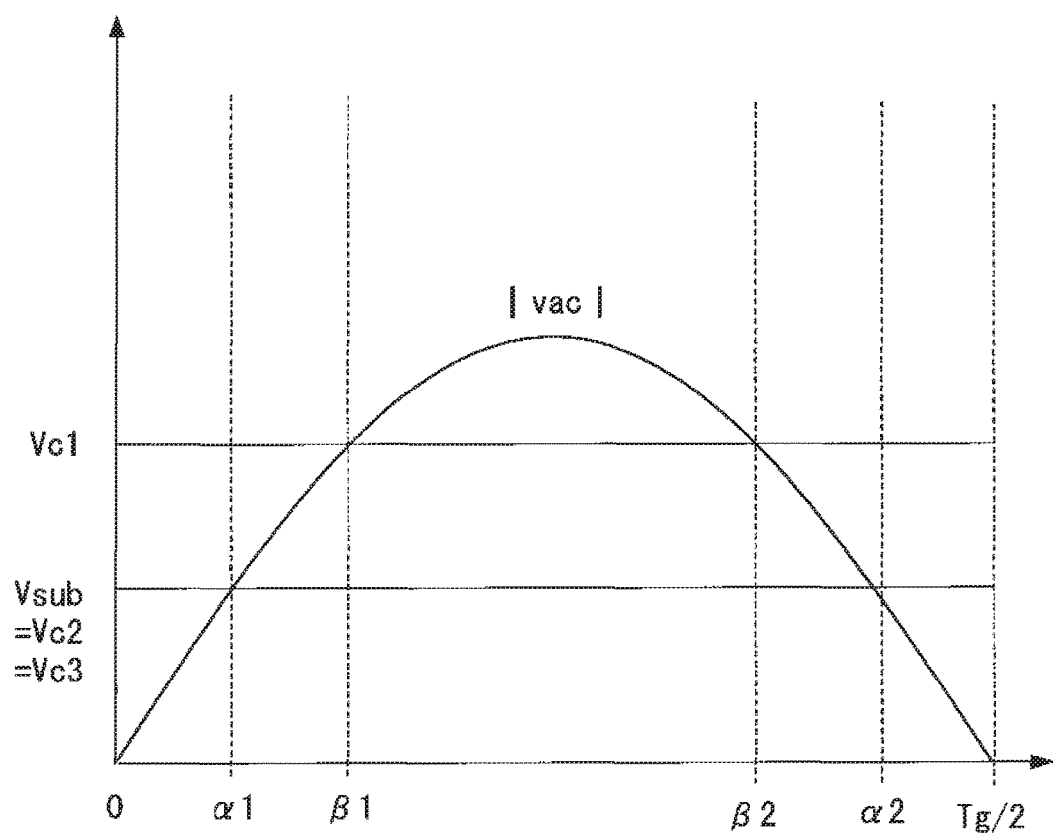

FIG. 138 is a diagram showing a relationship of voltages in a step-down operation mode in the power conversion device according to embodiment 4 of the present invention.

Figure 139:
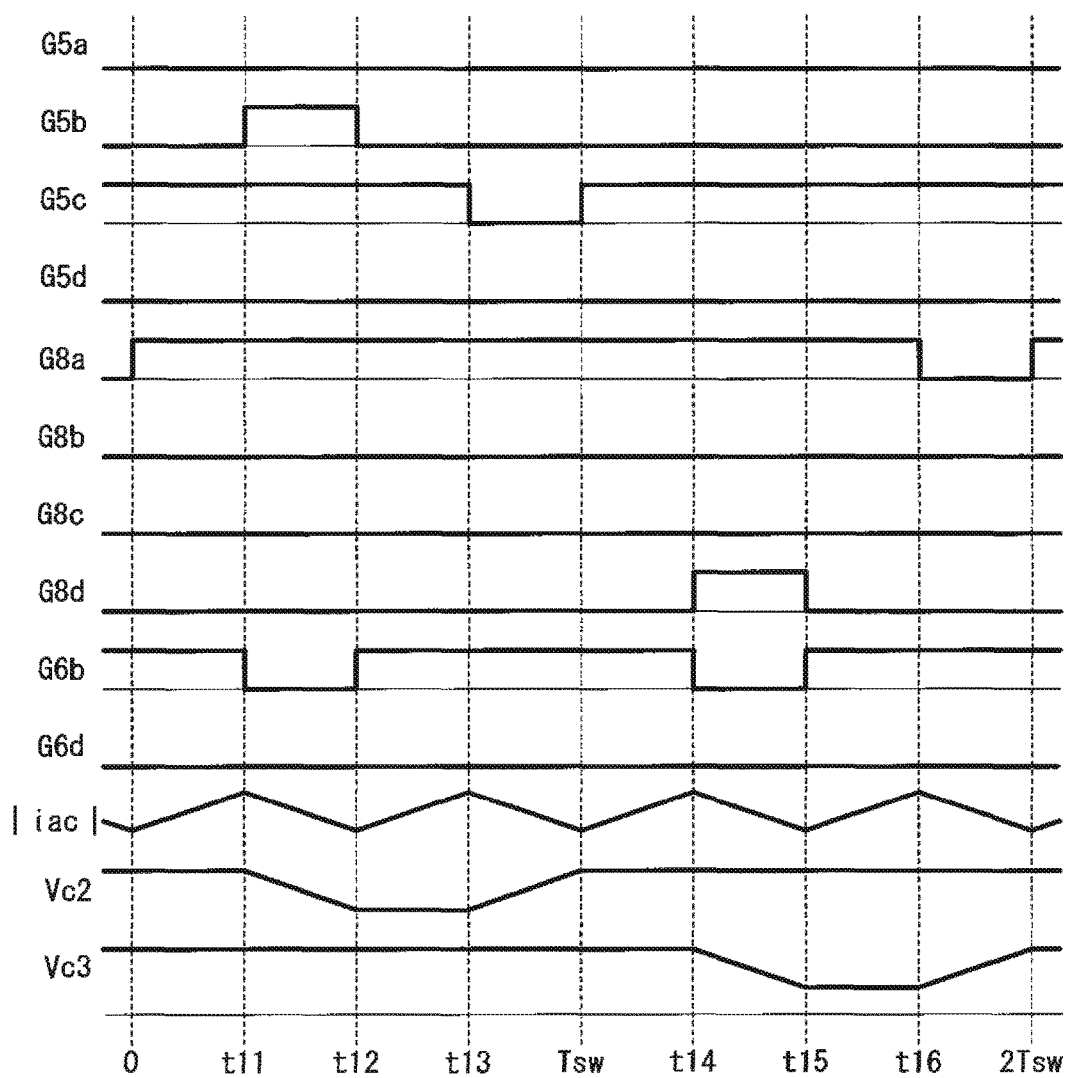

FIG. 139 is a waveform schematic diagram showing the operation state in an area 1 in the positive half wave of the AC power supply 1, in the power conversion device according to embodiment 4 of the present invention.

Figure 140:
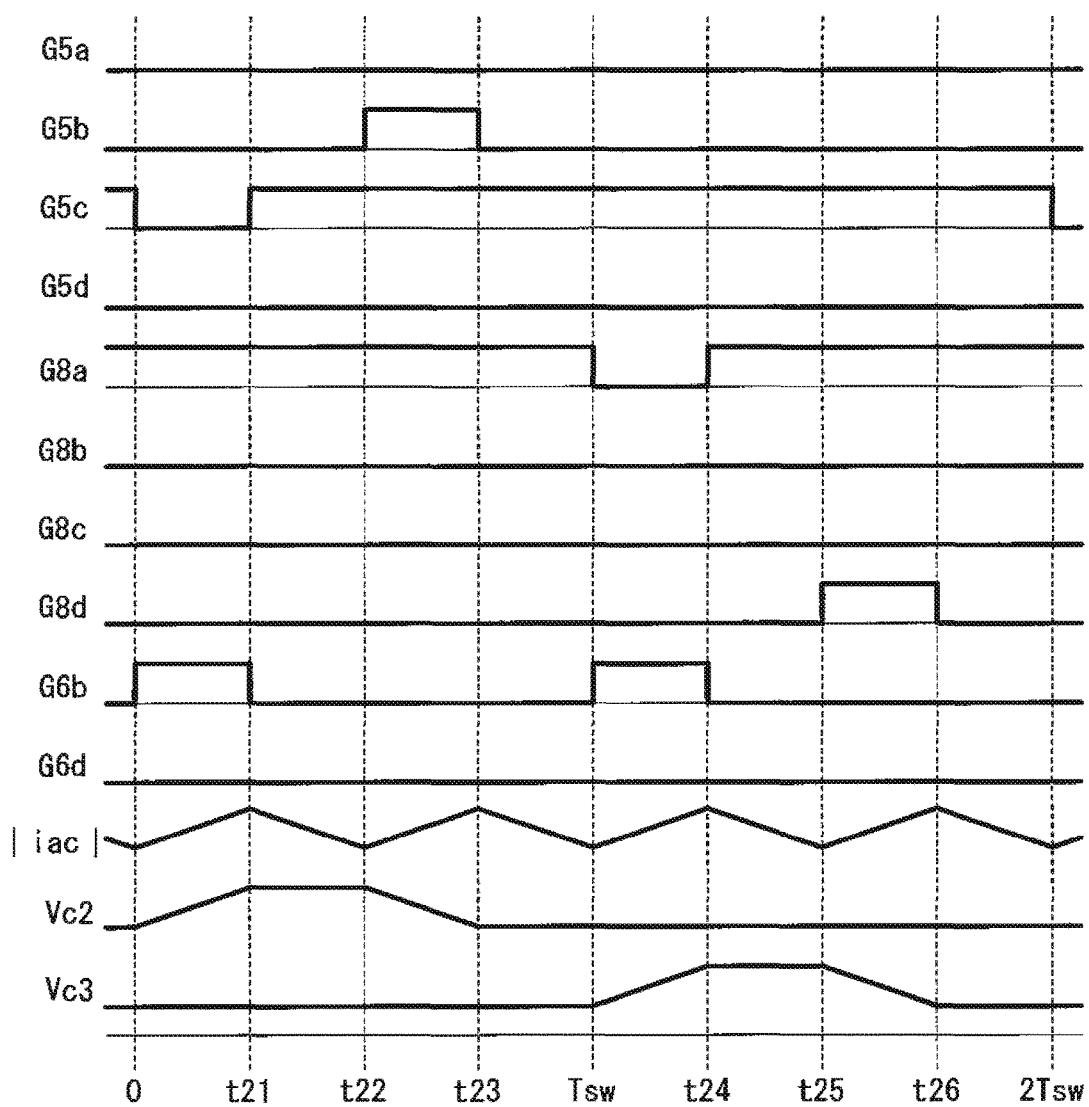

FIG. 140 is a waveform schematic diagram showing the operation state in an area 2 in the positive half wave of the AC power supply 1, in the power conversion device according to embodiment 4 of the present invention.

Figure 141:
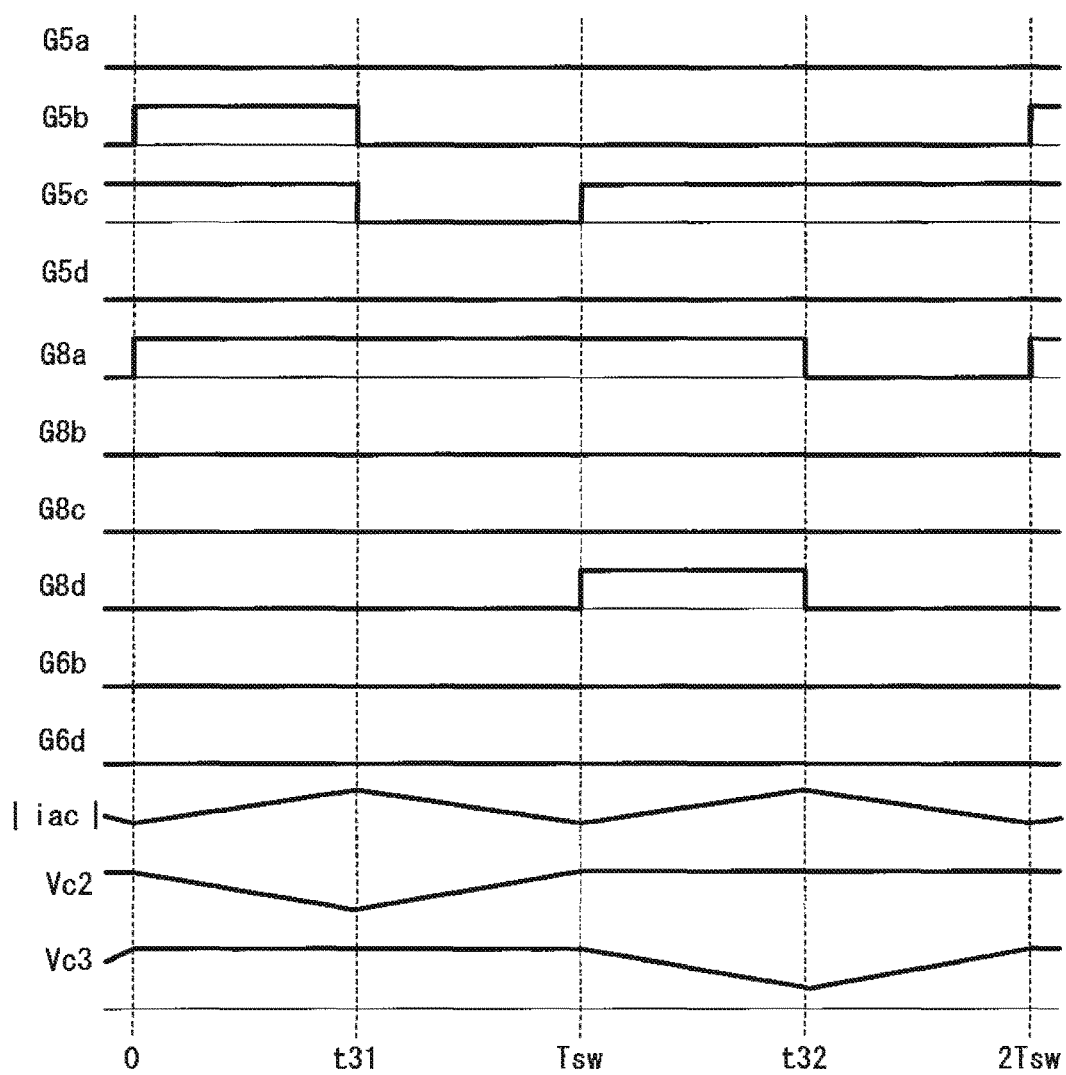

FIG. 141 is a waveform schematic diagram showing the operation state in an area 3 in the positive half wave of the AC power supply 1, in the power conversion device according to embodiment 4 of the present invention.

FIG. 142 shows the manner of switching of the operation mode in accordance with an increase/decrease command for voltage Vc2 and an increase/decrease command for voltage Vc3.

Figure 143:
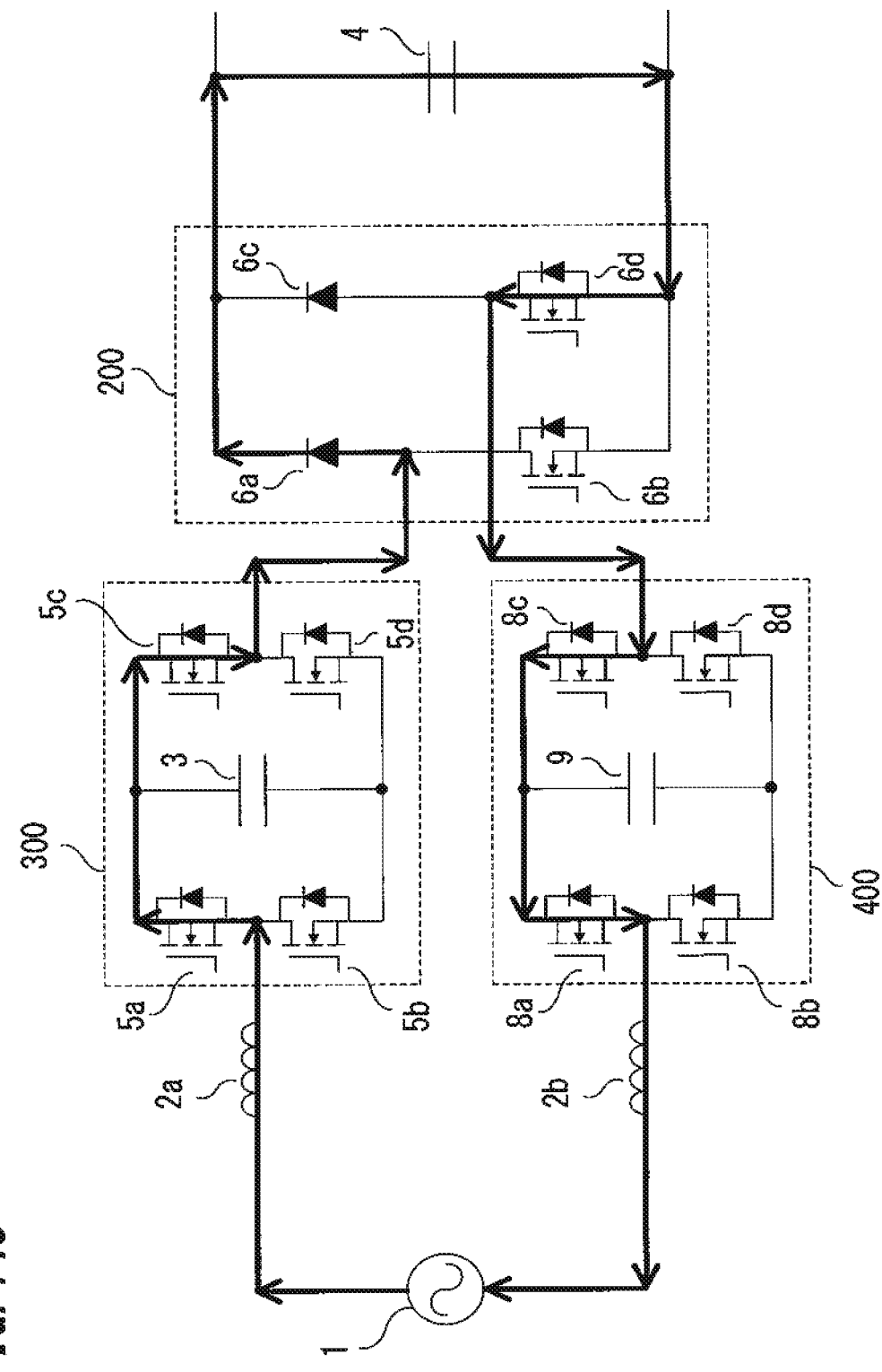

FIG. 143 is a diagram showing a current route in a mode 9.

Figure 144:
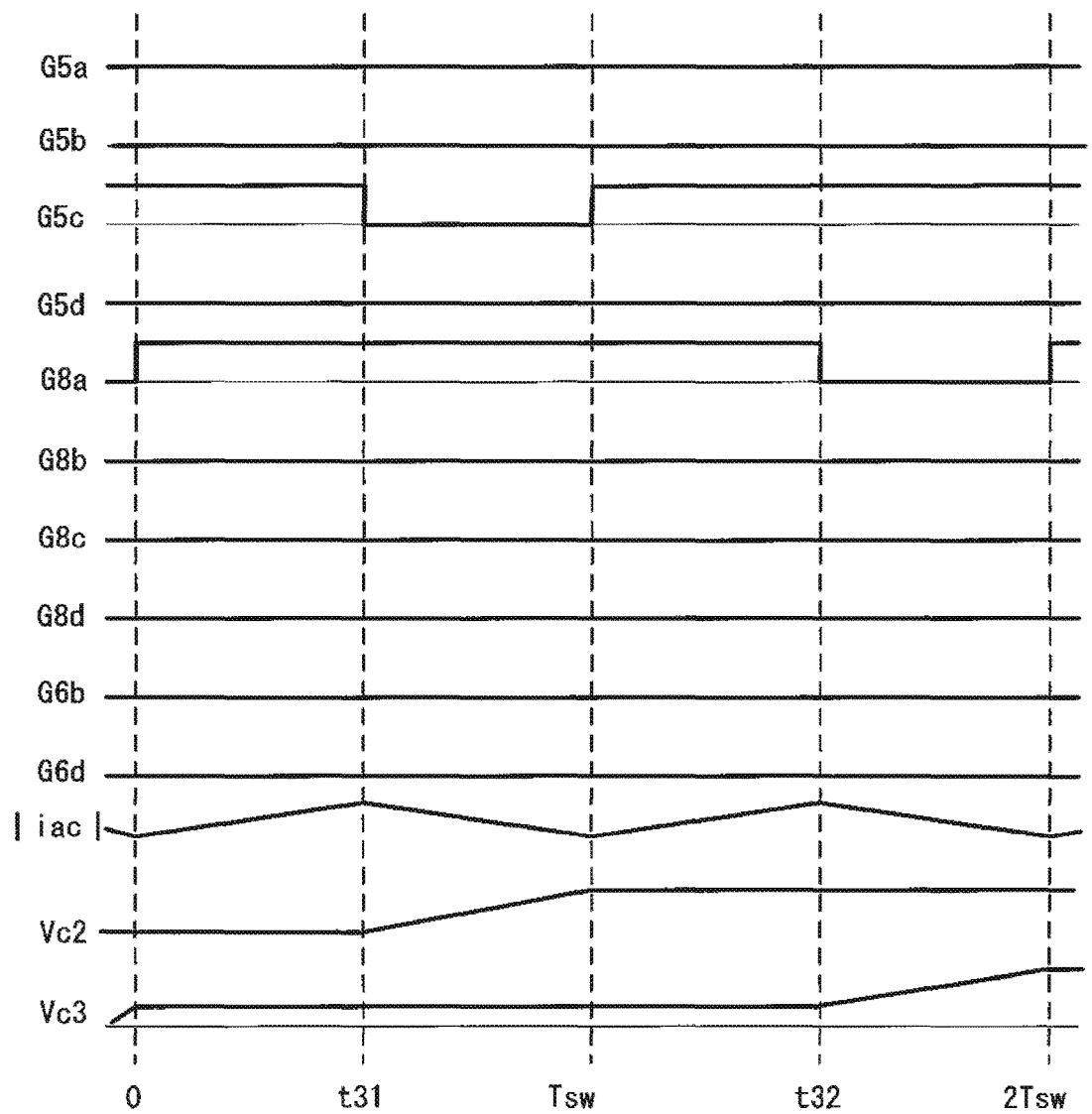

FIG. 144 is a waveform schematic diagram showing the operation state in an area 3 in the positive half wave of the AC power supply 1 in the case where the operation mode in a period from 0 to t31 is switched from mode 7 to mode 9 and the operation mode in a period from Tsw to t32 is switched from mode 8 to mode 9.

Figure 145:
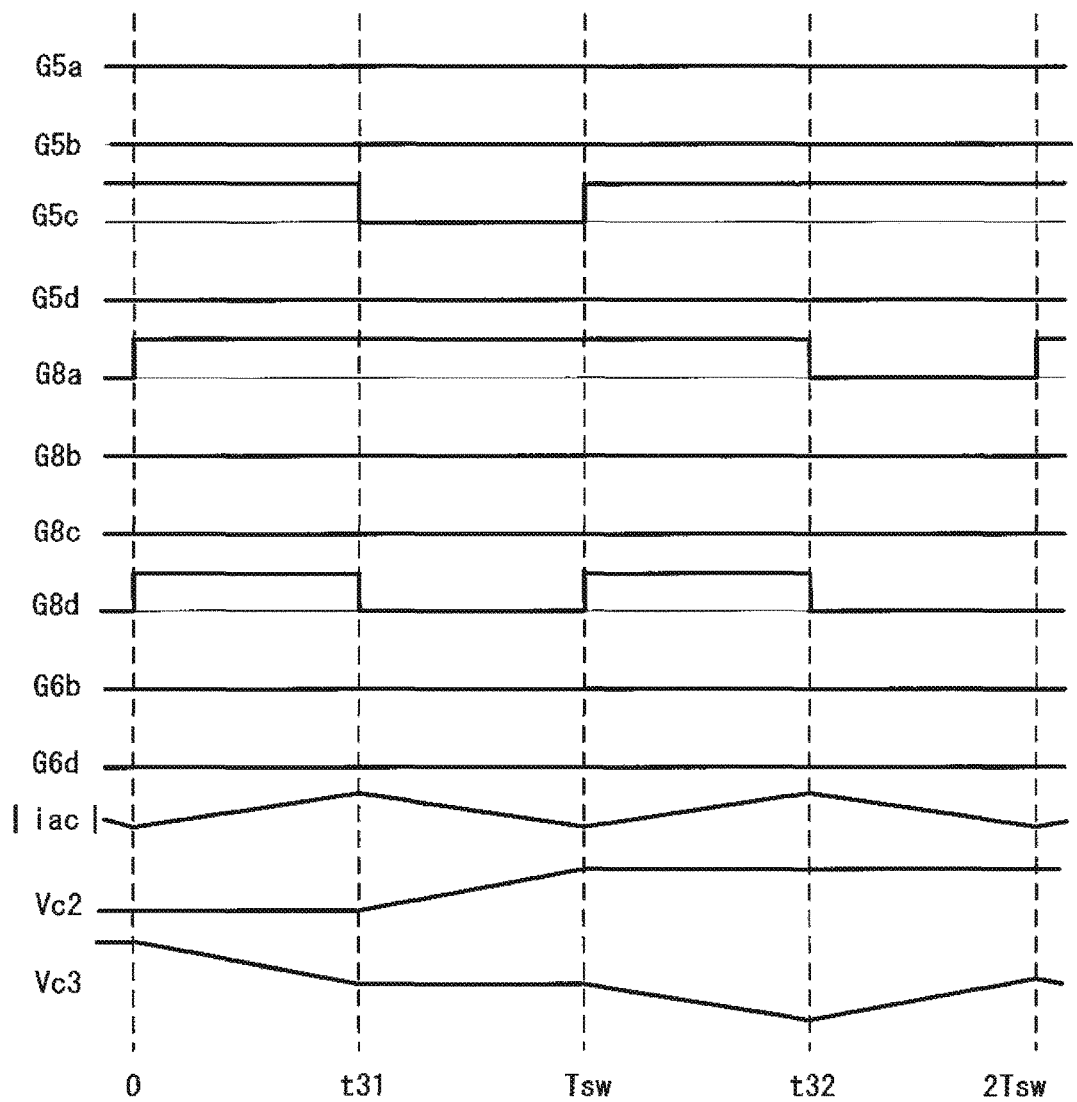

FIG. 145 FIG. 145 is a waveform schematic diagram showing the operation state in an area 3 in the positive half wave of the AC power supply 1 in the case where the operation mode in a period from 0 to t31 is switched from mode 7 to mode 8.

Figure 146:
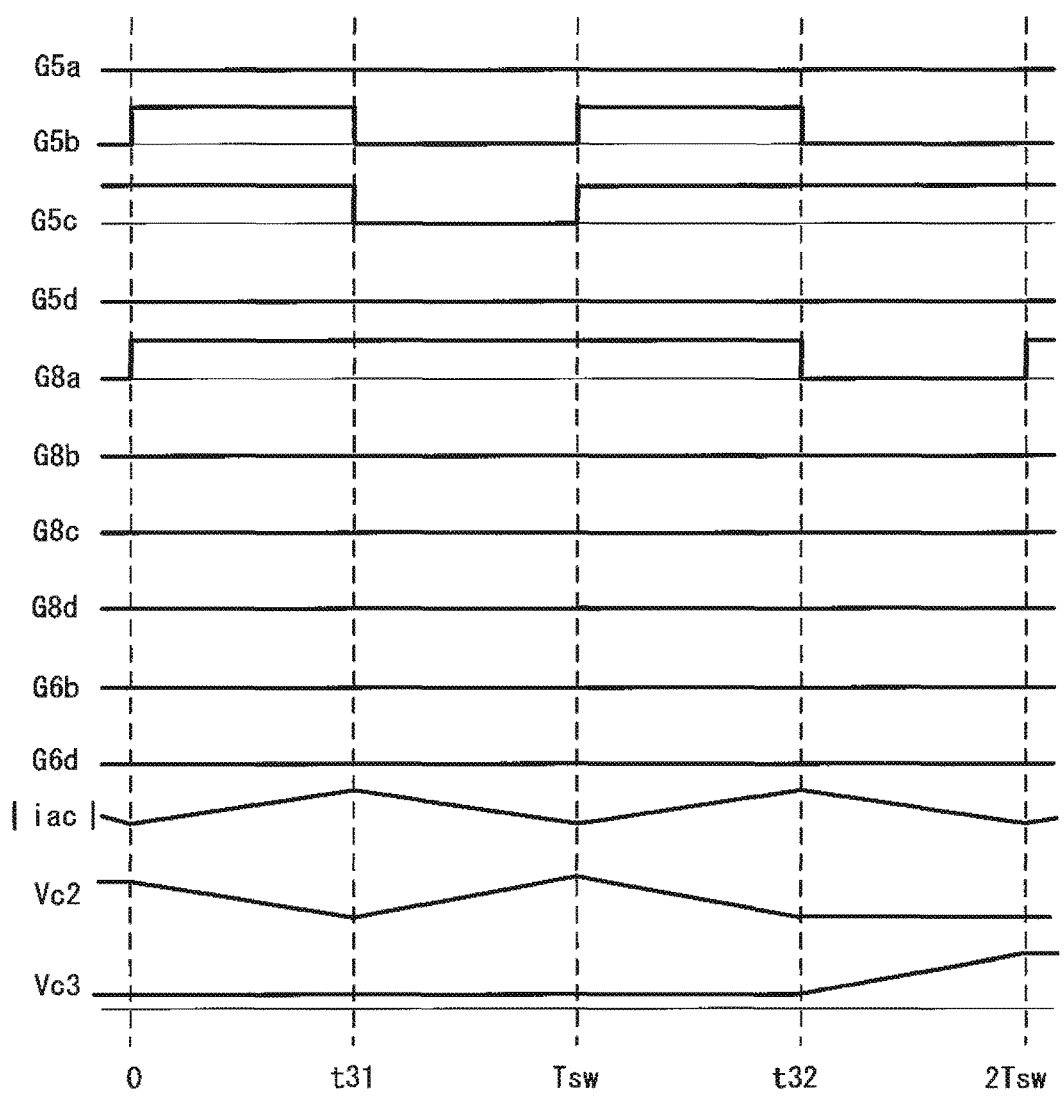

FIG. 146 is a waveform schematic diagram showing the operation state in an area 3 in the positive half wave of the AC power supply 1 in the case where the operation mode in a period from Tsw to t32 is switched from mode 8 to mode 7.

Figure 147:
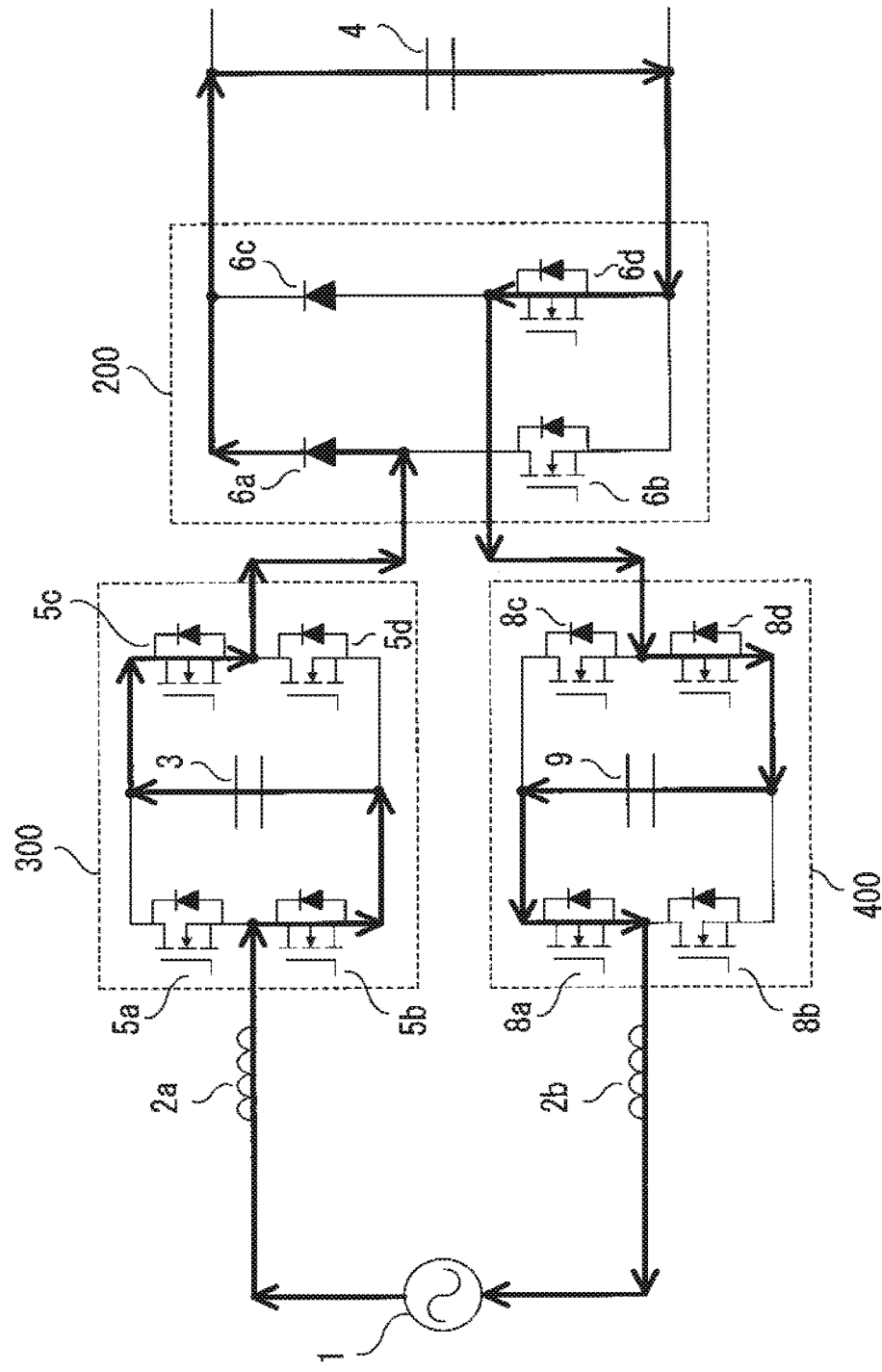

FIG. 147 shows a current route in a mode 6.

Figure 148:
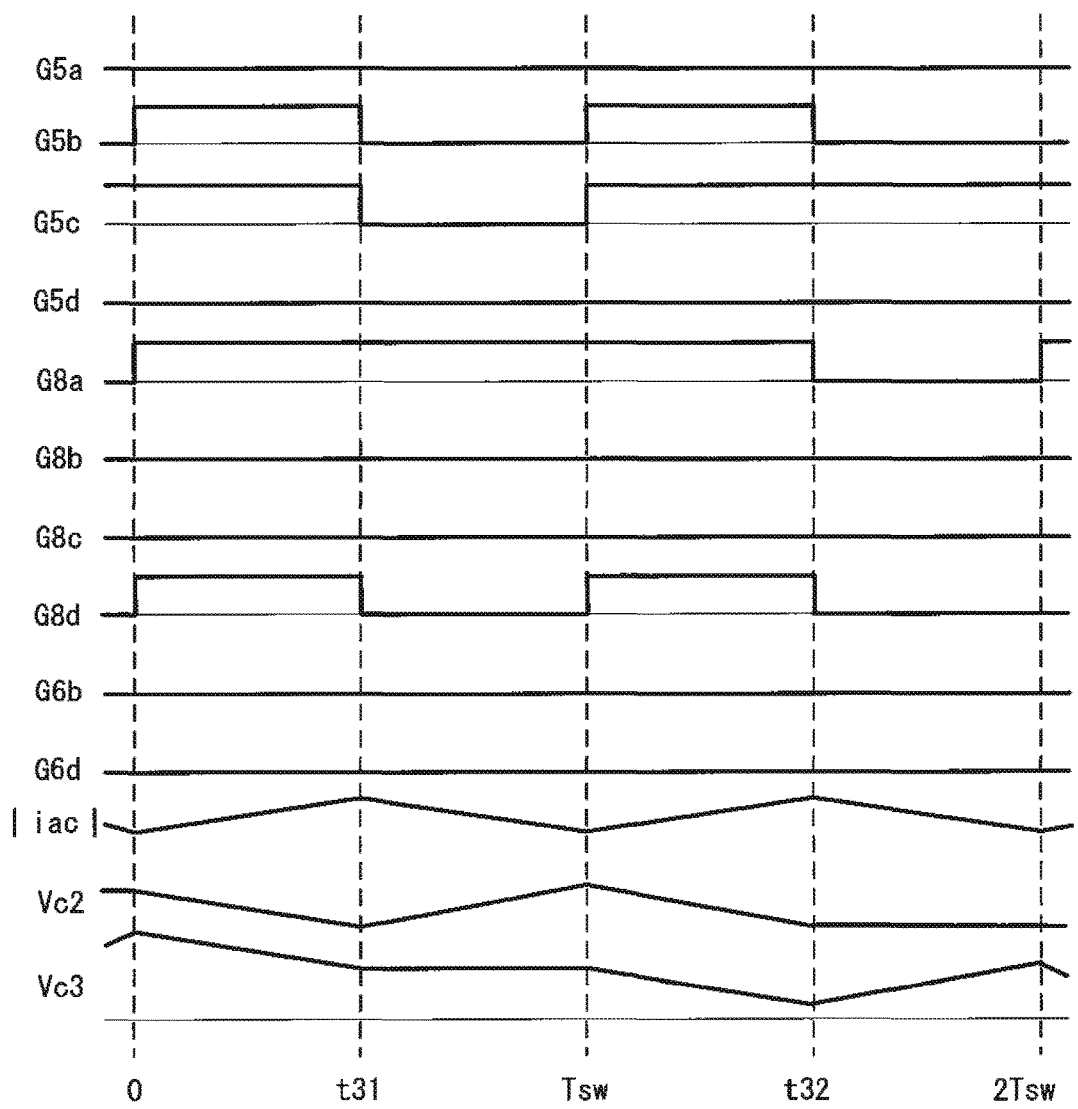

FIG. 148 is a waveform schematic diagram showing the operation state in an area 3 in the positive half wave of the AC power supply 1 in the case where the operation mode in a period from 0 to t31 is switched from mode 7 to mode 6 and the operation mode in a period from Tsw to t32 is switched from mode 8 to mode 6.

Figure 149:
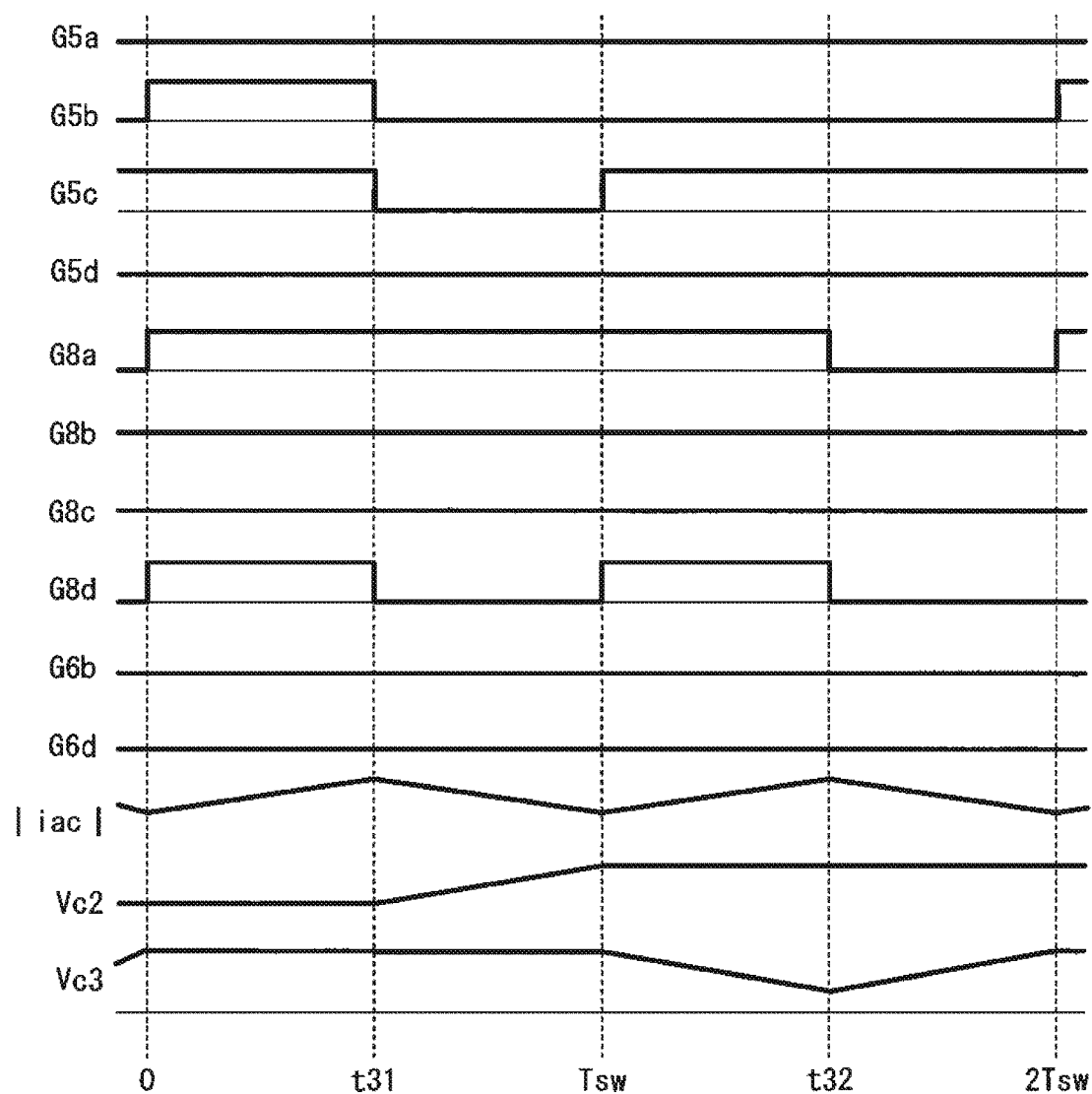

FIG. 149 is a waveform schematic diagram showing the operation state in an area 3 in the positive half wave of the AC power supply 1 in the case where the operation mode in a period from 0 to t31 is switched from mode 7 to mode 9.

Figure 150:
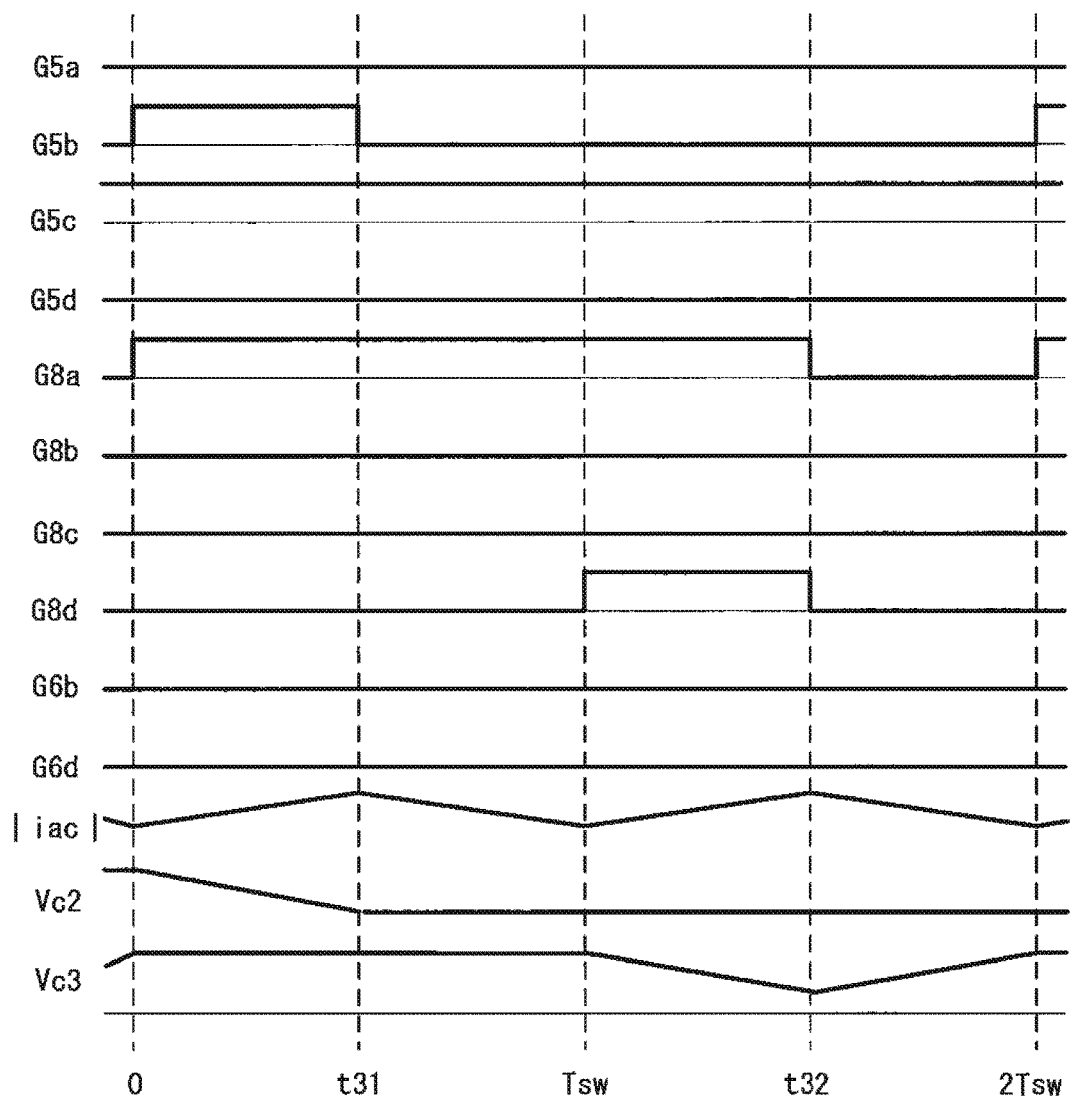

FIG. 150 is a waveform schematic diagram showing the operation state in an area 3 in the positive half wave of the AC power supply 1 in the case where the operation mode in a period from t31 to Tsw is switched from mode 2 to mode 9.

Figure 151:
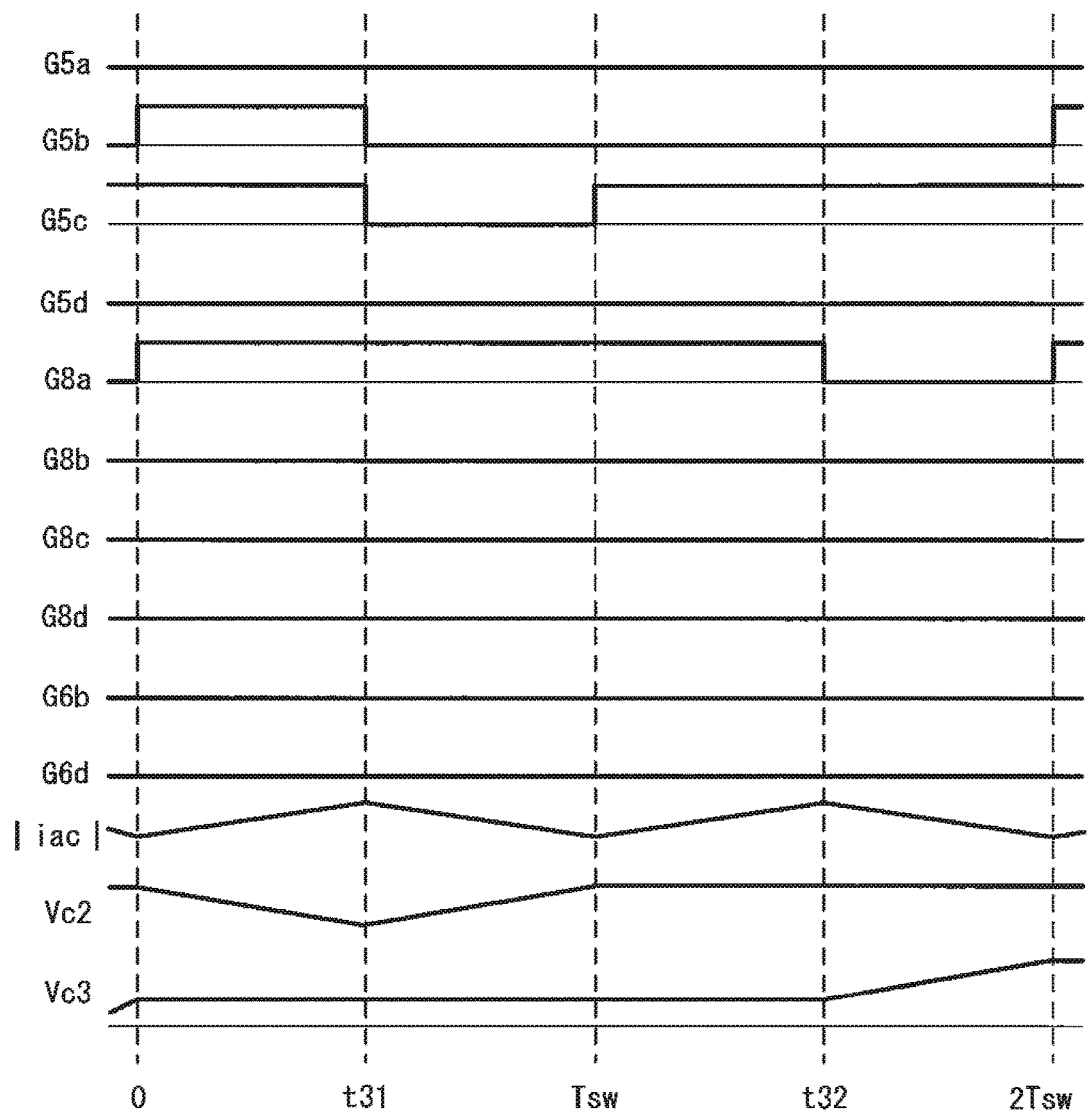

FIG. 151 is a waveform schematic diagram showing the operation state in an area 3 in the positive half wave of the AC power supply 1 in the case where the operation mode in a period from Tsw to t32 is switched from mode 8 to mode 9.

Figure 152:
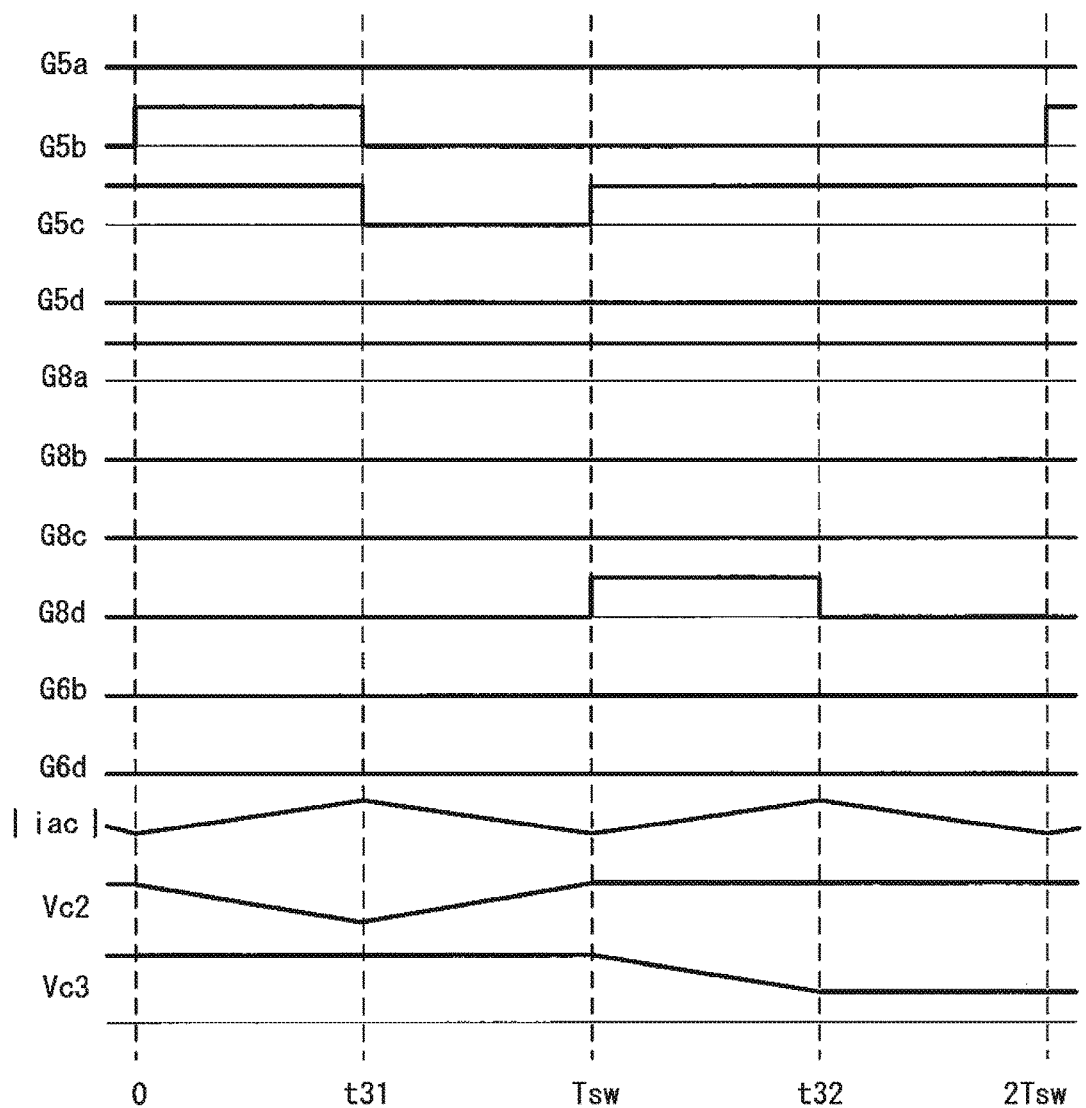

FIG. 152 is a waveform schematic diagram showing the operation state in an area 3 in the positive half wave of the AC power supply 1 in the case where the operation mode in a period from t32 to 2Tsw is switched from mode 1 to mode 9.

Figure 153:
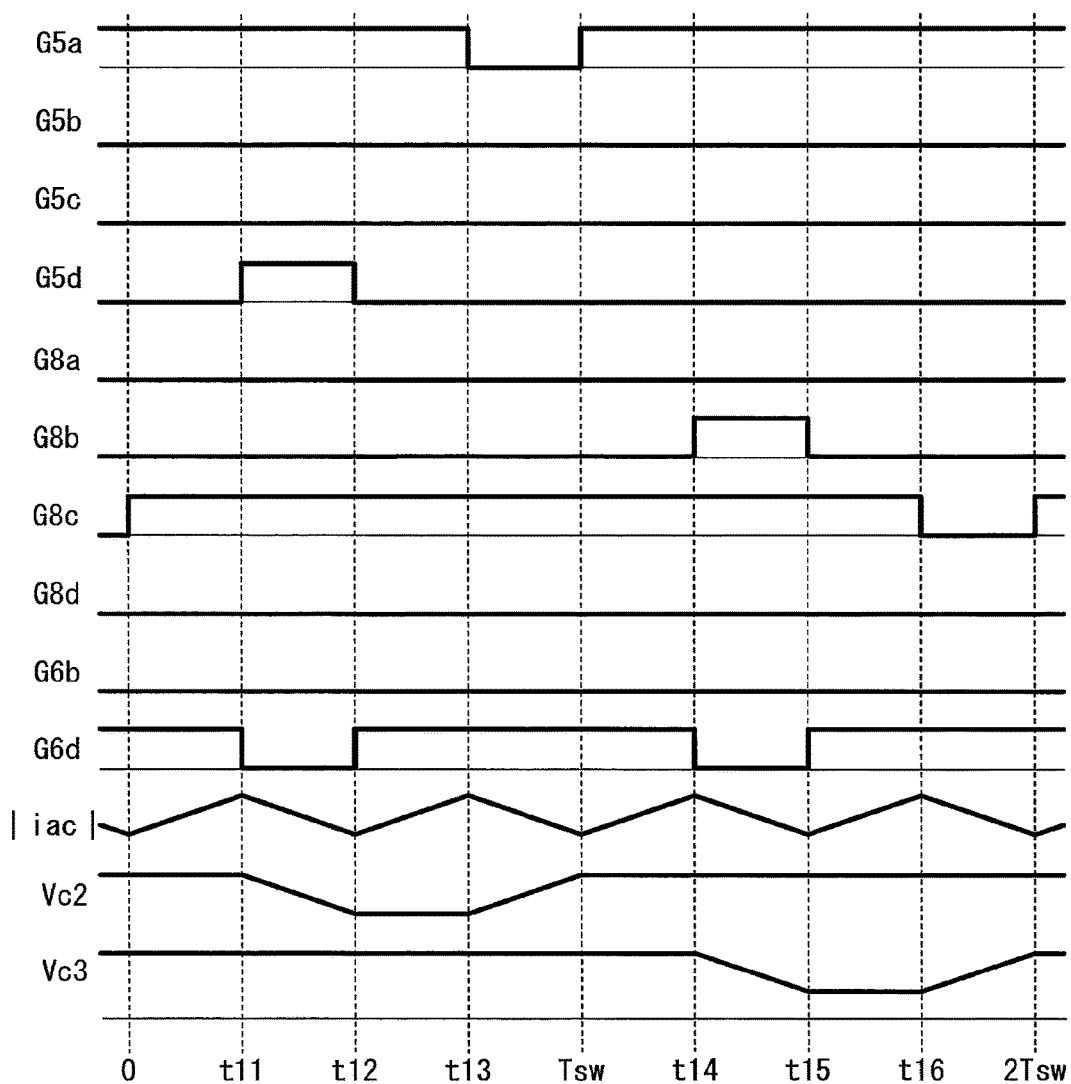

FIG. 153 is a waveform schematic diagram showing the operation state in an area 1 in the negative half wave of the AC power supply 1.

Figure 154:
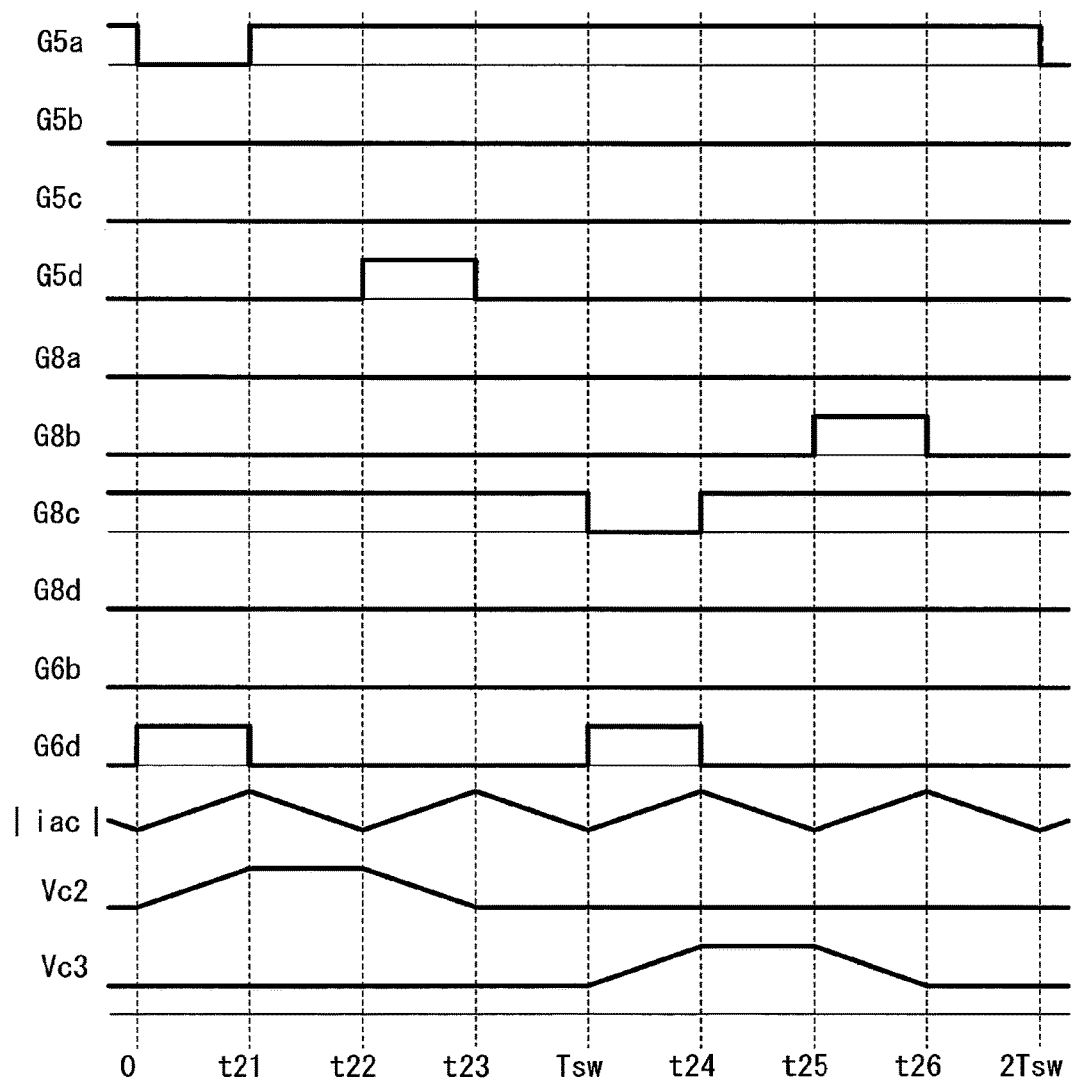

FIG. 154 is a waveform schematic diagram showing the operation state in an area 2 in the negative half wave of the AC power supply 1.

Figure 155:
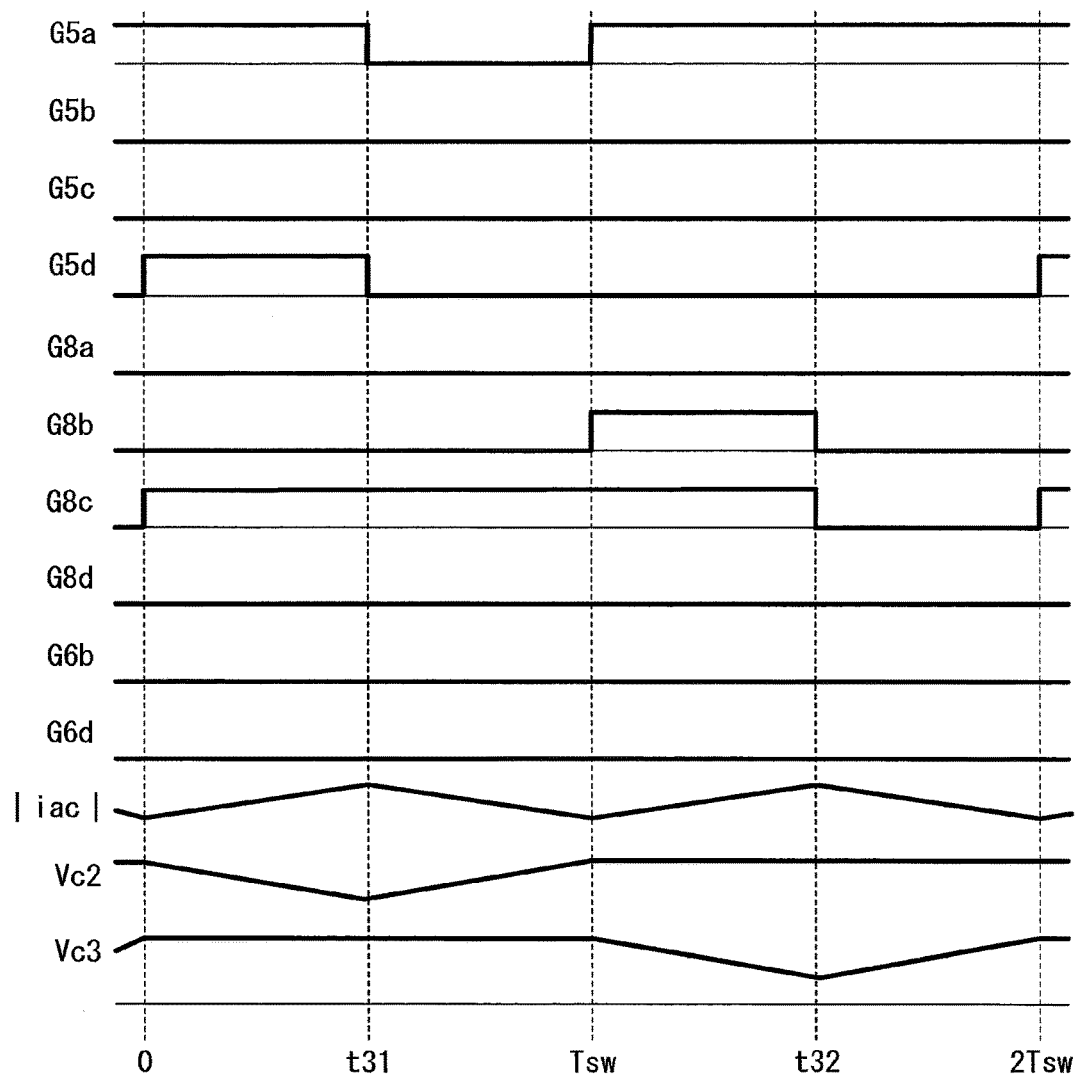

FIG. 155 is a waveform schematic diagram showing the operation state in an area 3 in the negative half wave of the AC power supply 1.

FIG. 156 shows the manner of switching of the operation mode in accordance with an increase/decrease command for voltage Vc2 and an increase/decrease command for voltage Vc3.

Figure 157:
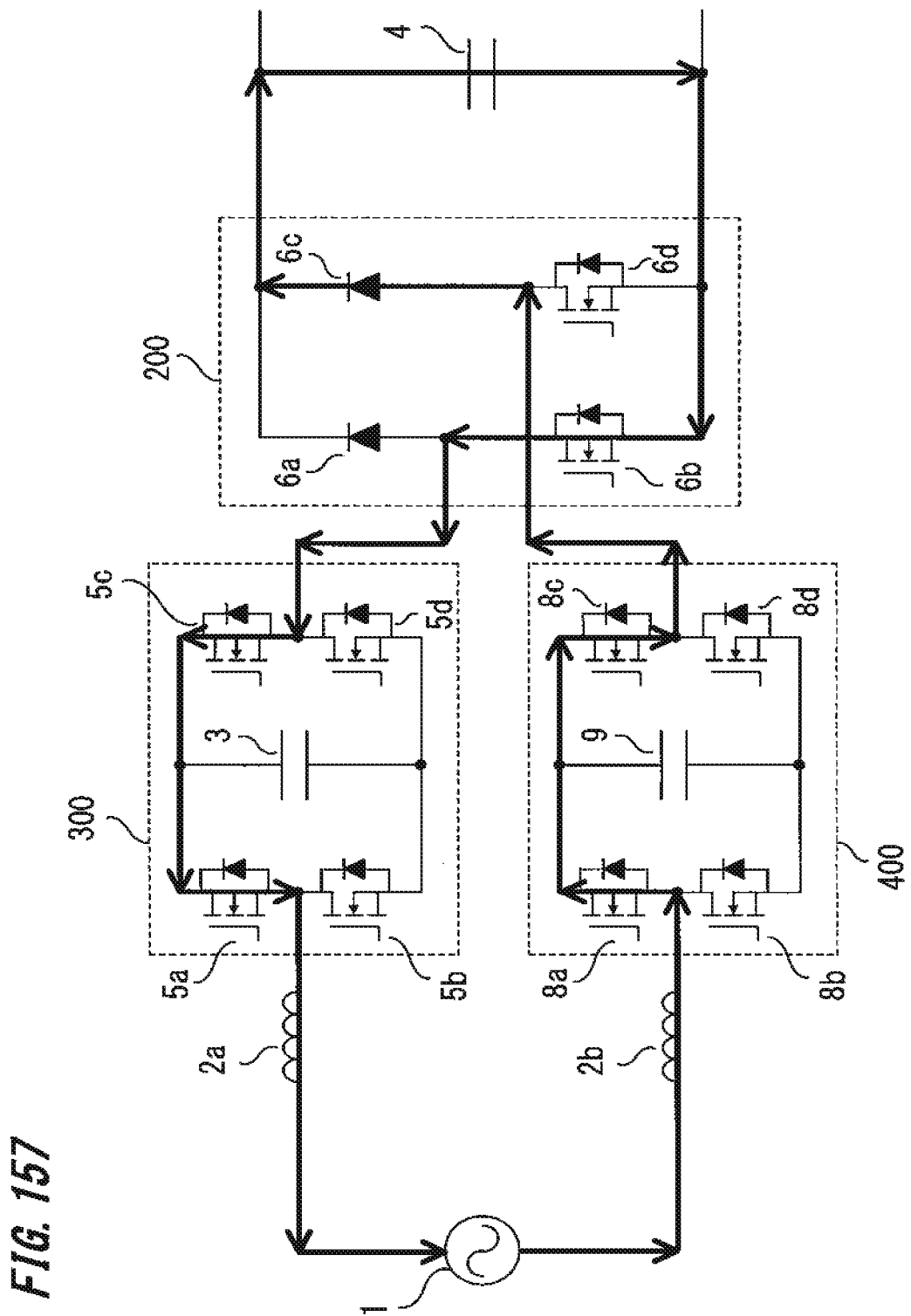

FIG. 157 is a current route in a mode 9.

Figure 158:
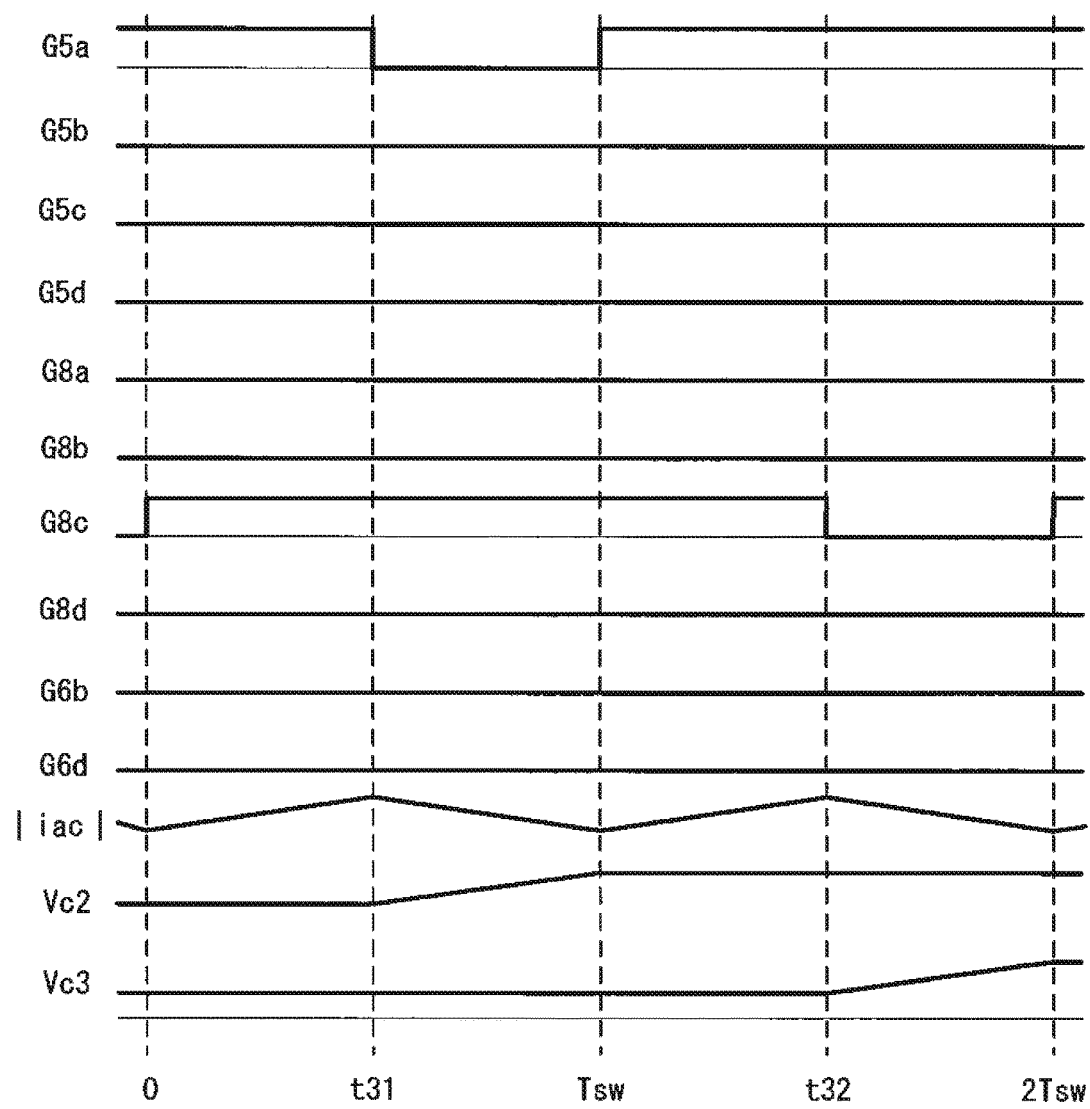

FIG. 158 is a waveform schematic diagram showing the operation state in an area 3 in the negative half wave of the AC power supply 1 in the case where the operation mode in a period from 0 to t31 is switched from mode 7 to mode 9 and the operation mode in a period from Tsw to t32 is switched from mode 8 to mode 9.

Figure 159:
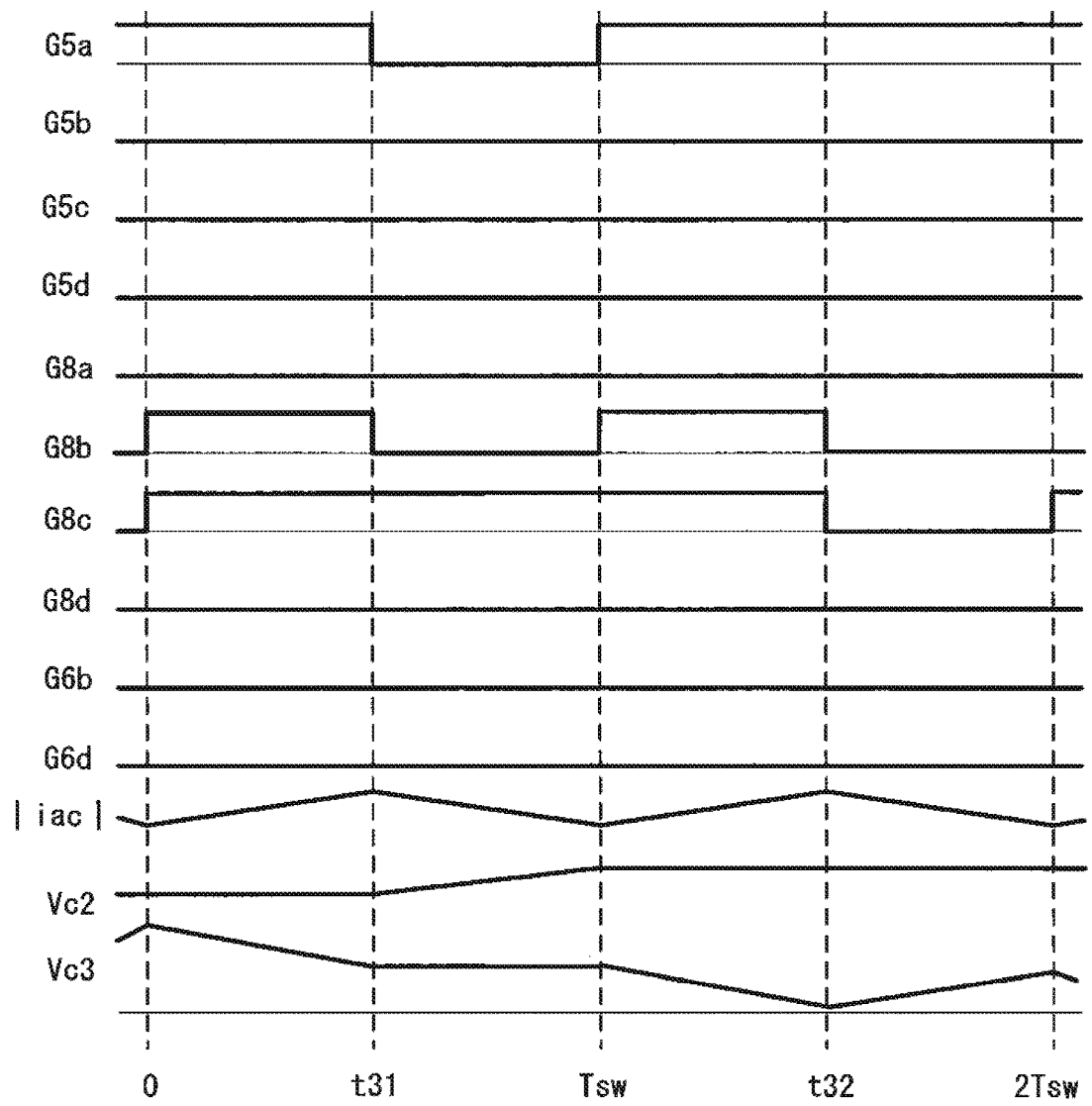

FIG. 159 is a waveform schematic diagram showing the operation state in an area 3 in the negative half wave of the AC power supply 1 in the case where the operation mode in a period from 0 to t31 is switched from mode 7 to mode 8.

Figure 160:
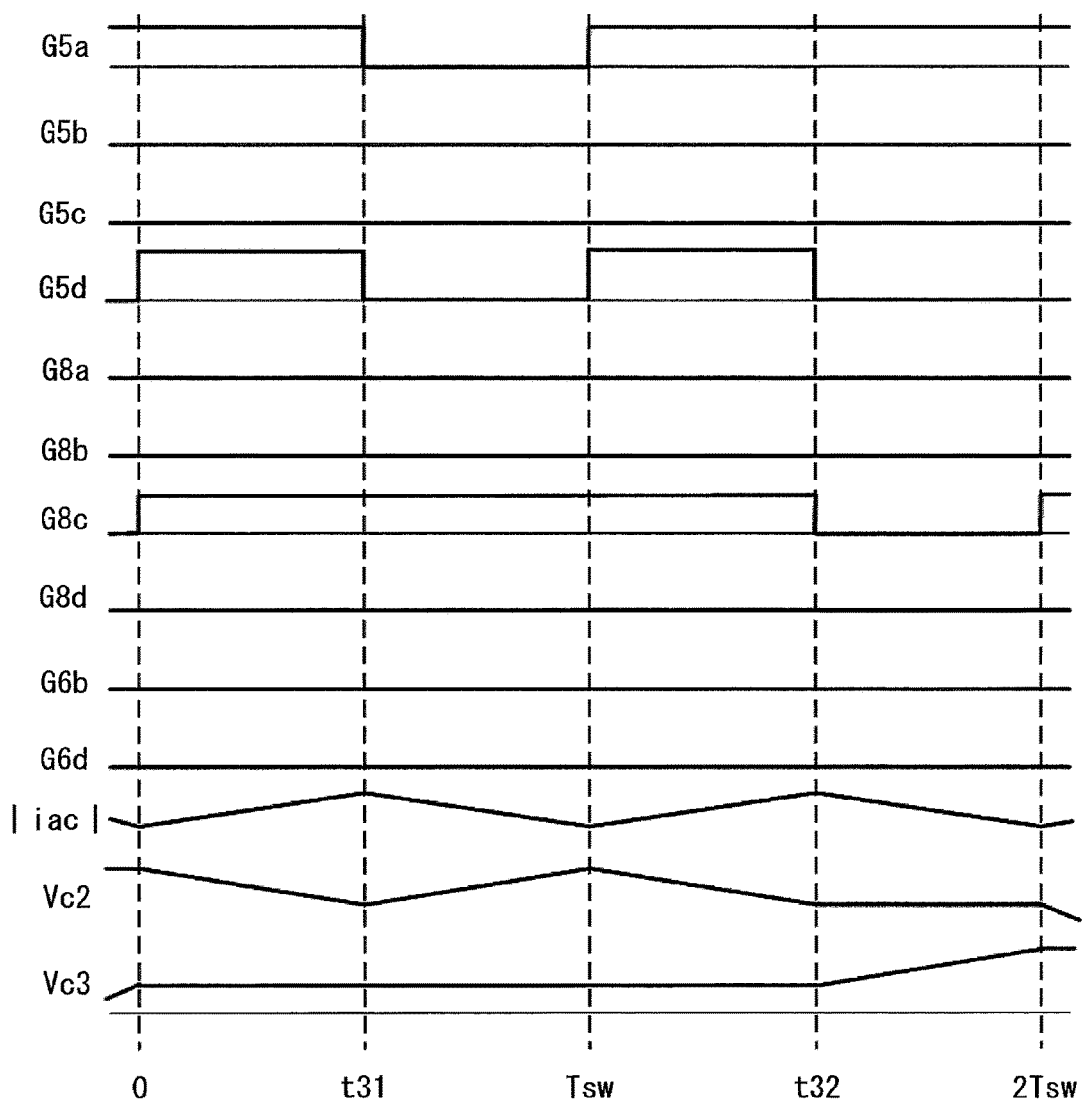

FIG. 160 is a waveform schematic diagram showing the operation state in an area 3 in the negative half wave of the AC power supply 1 in the case where the operation mode in a period from Tsw to t32 is switched from mode 8 to mode 7.

Figure 161:
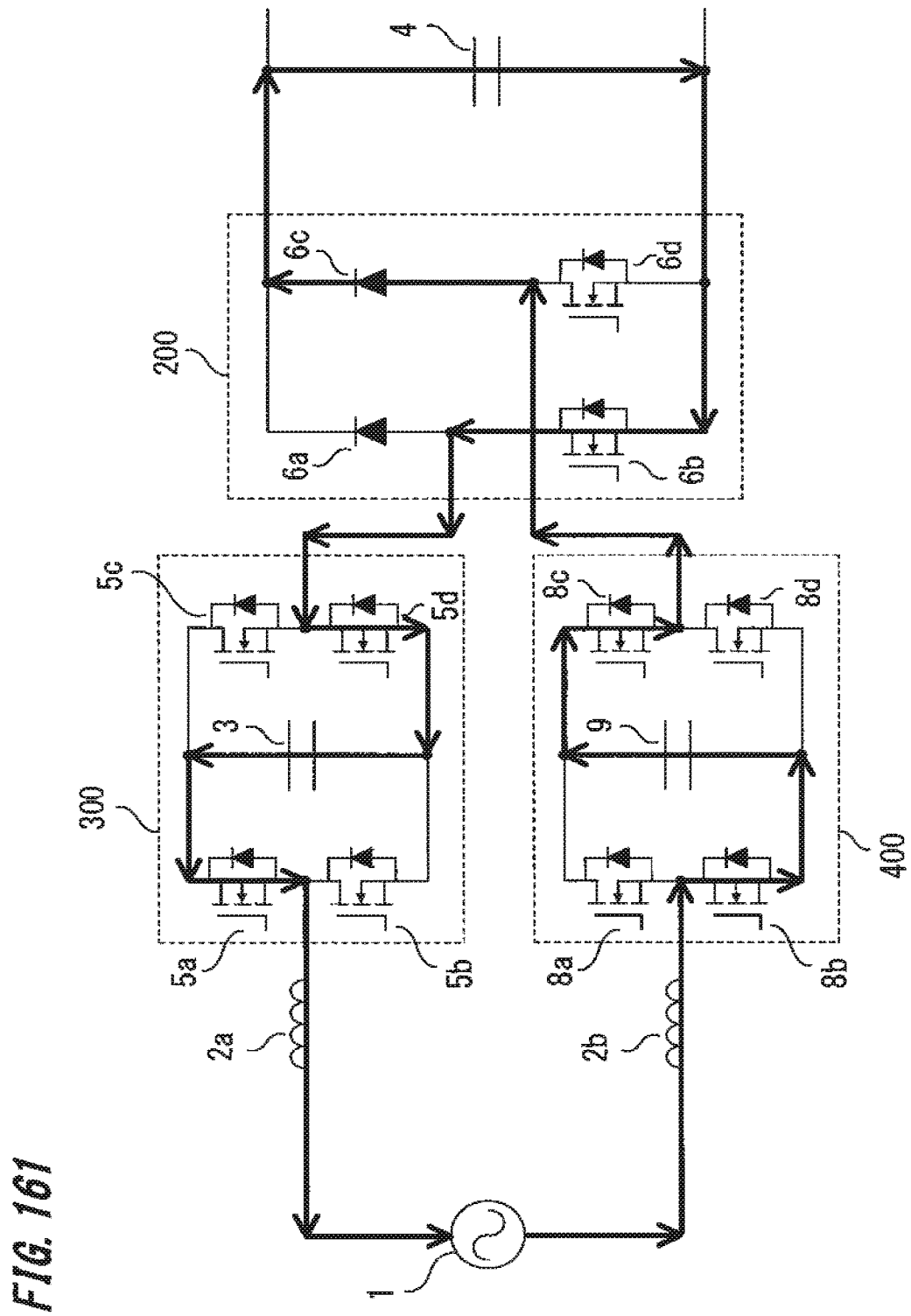

FIG. 161 is a diagram showing a current route in a mode 6.

Figure 162:
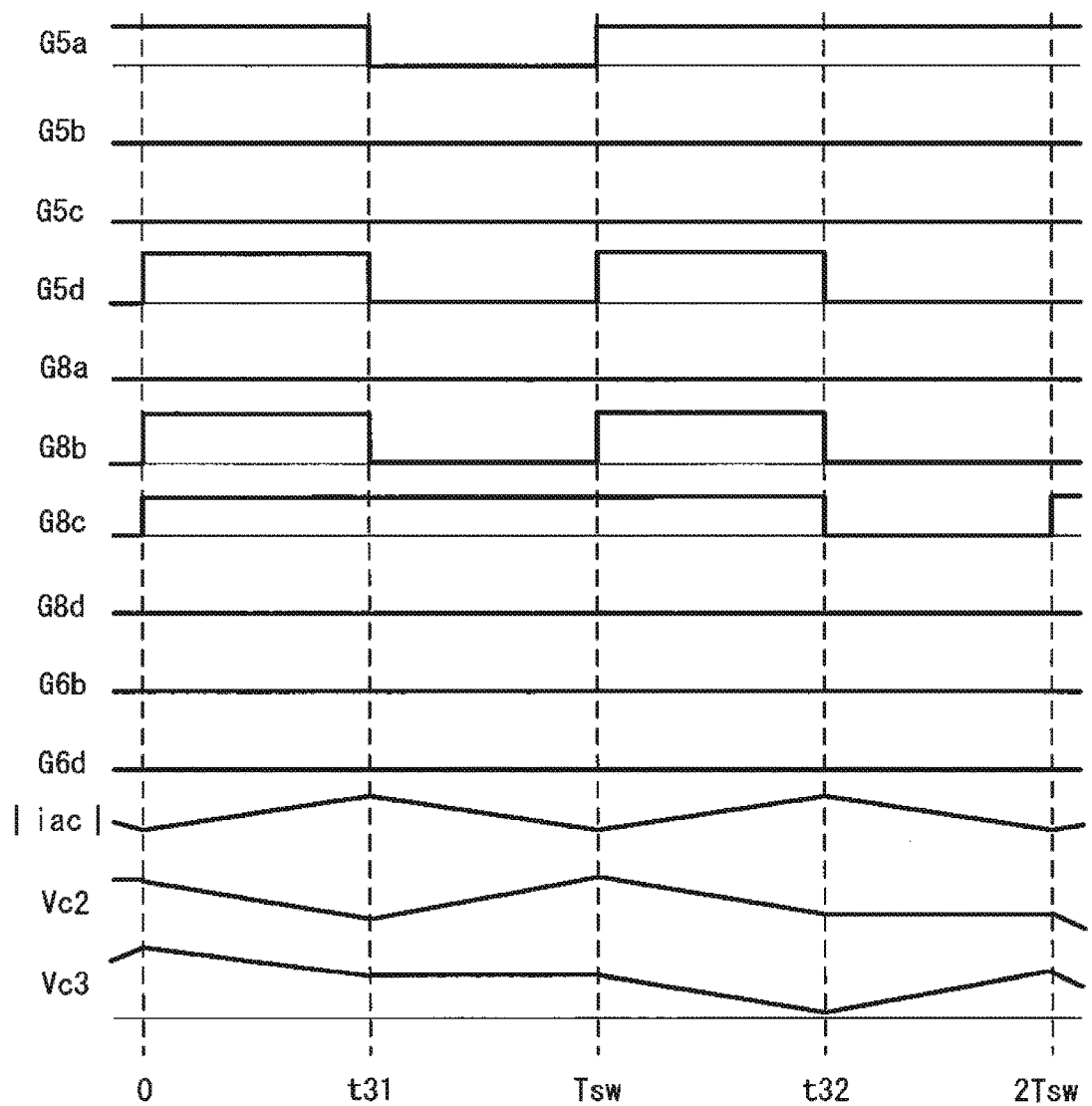

FIG. 162 is a waveform schematic diagram showing the operation state in an area 3 in the negative half wave of the AC power supply 1 in the case where the operation mode in a period from 0 to t31 is switched from mode 7 to mode 6 and the operation mode in a period from Tsw to t32 is switched from mode 8 to mode 6.

Figure 163:
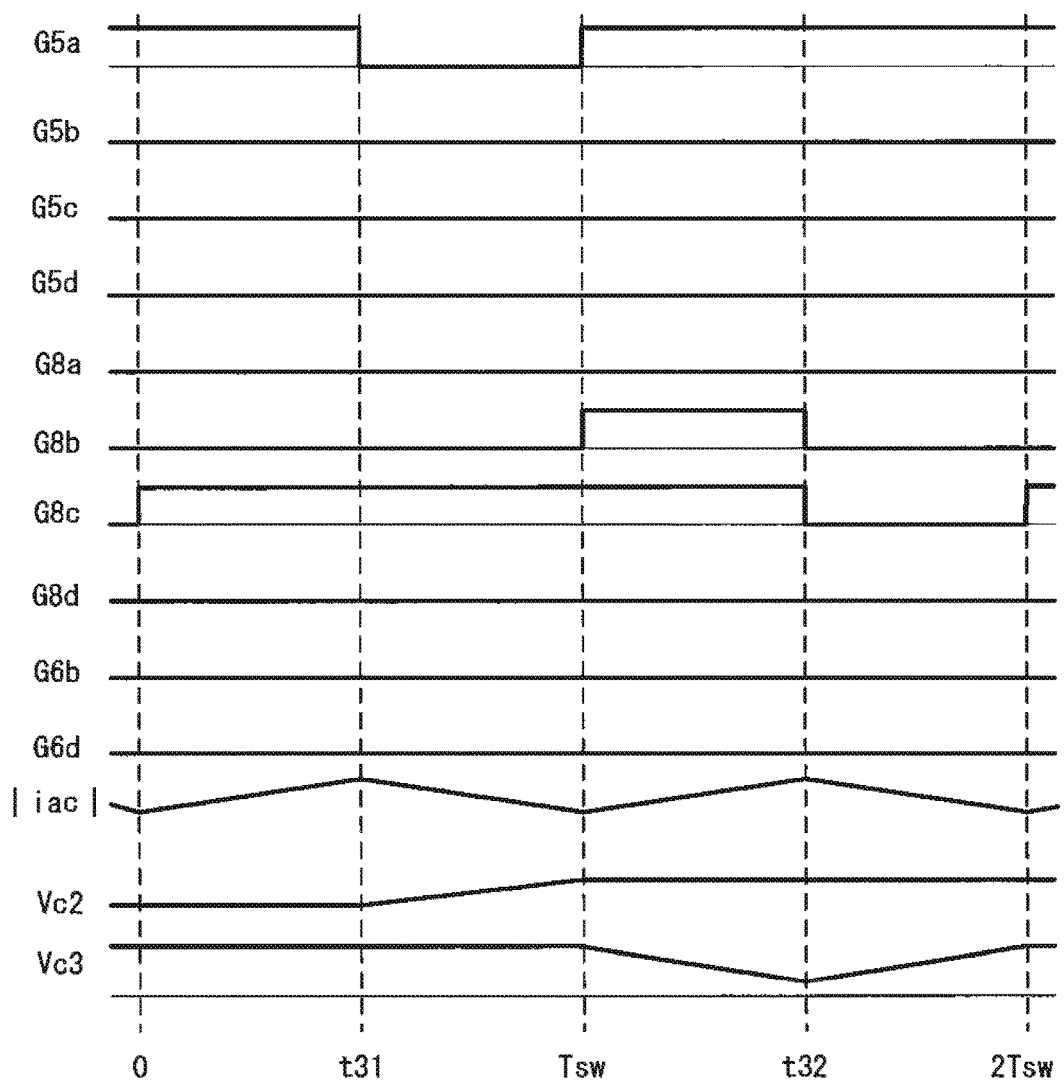

FIG. 163 is a waveform schematic diagram showing the operation state in an area 3 in the negative half wave of the AC power supply 1 in the case where the operation mode in a period from 0 to t31 is switched from mode 7 to mode 9.

Figure 164:
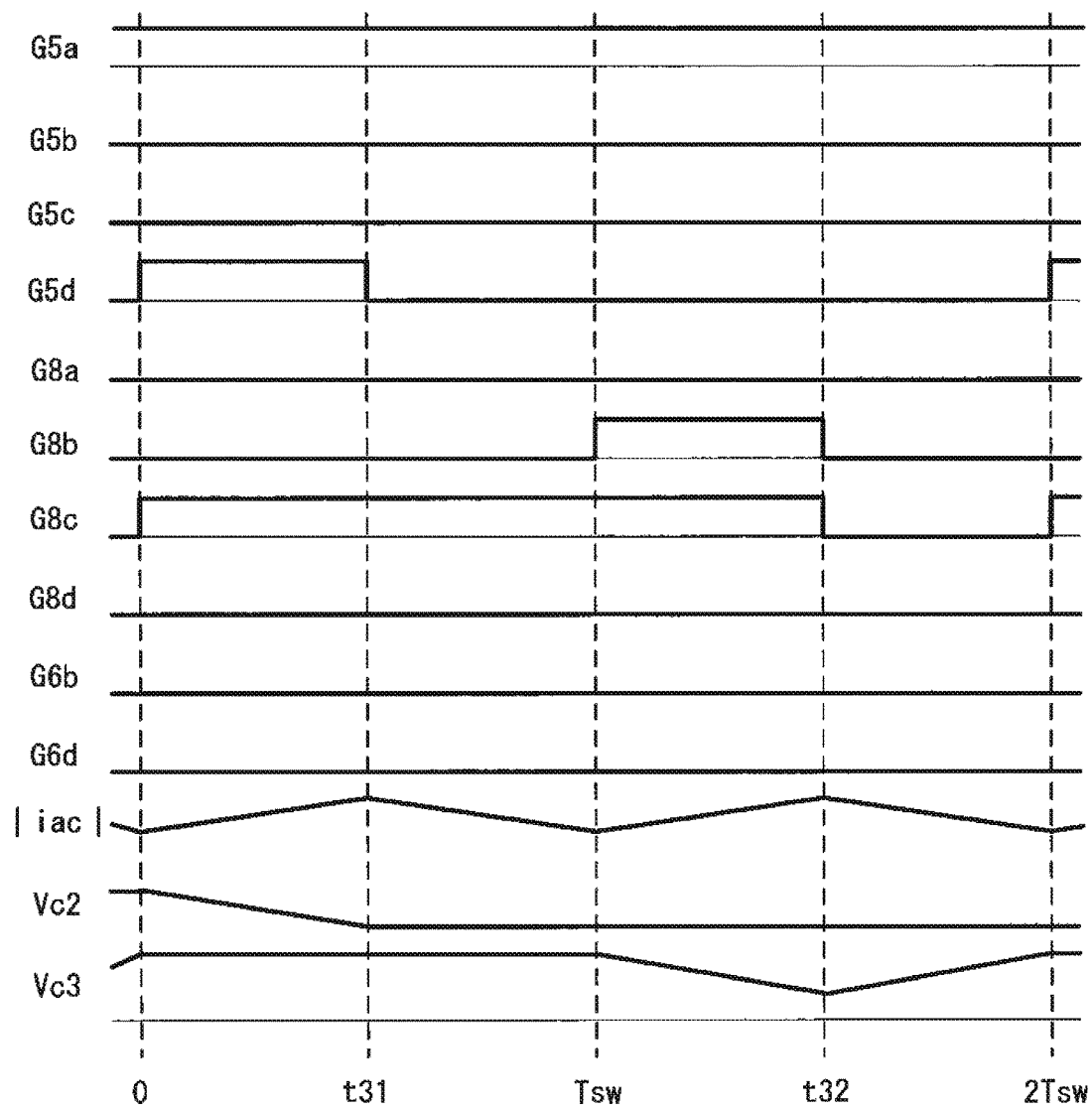

FIG. 164 is a waveform schematic diagram showing the operation state in an area 3 in the negative half wave of the AC power supply 1 in the case where the operation mode in a period from t31 to Tsw is switched from mode 2 to mode 9.

Figure 165:
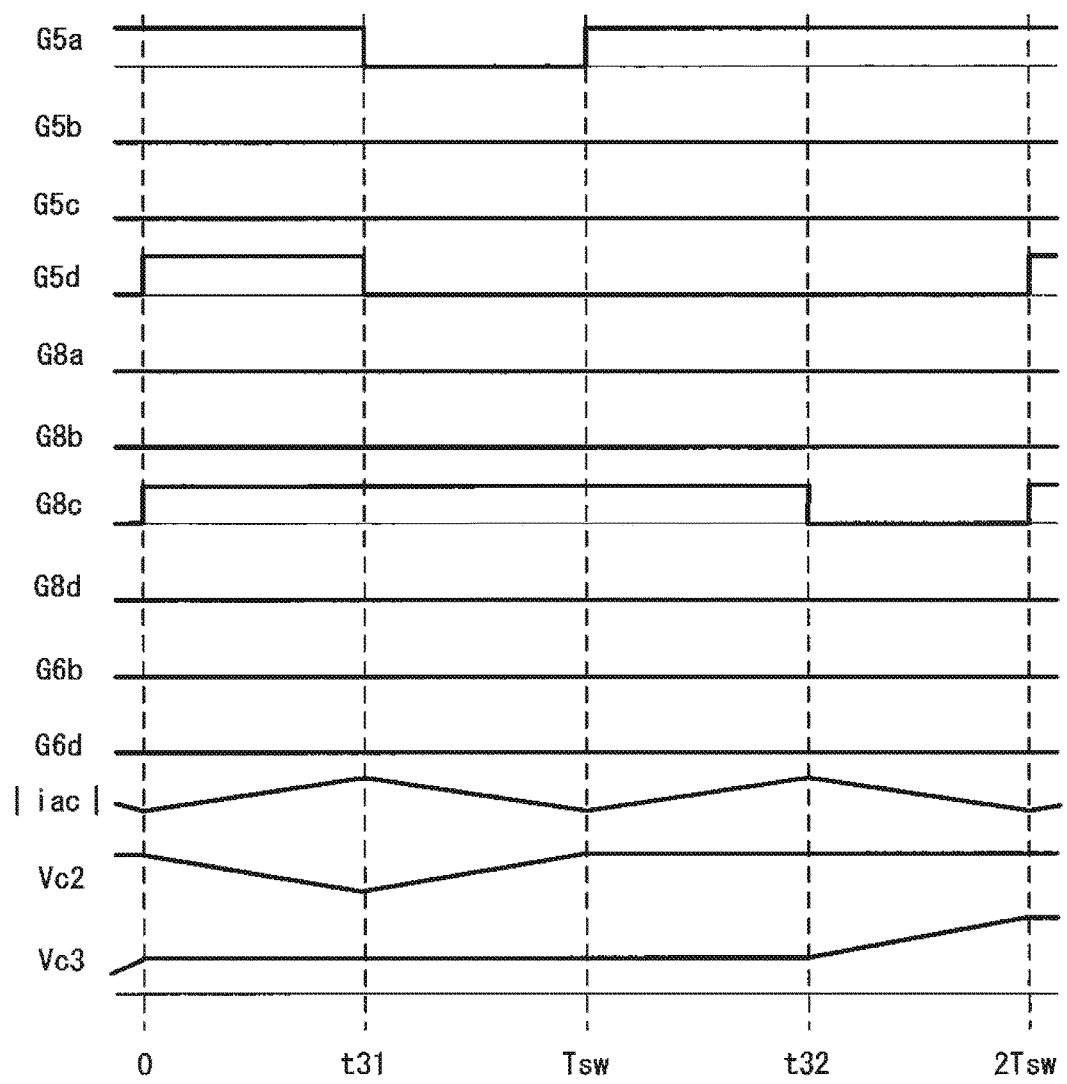

FIG. 165 is a waveform schematic diagram showing the operation state in an area 3 in the negative half wave of the AC power supply 1 in the case where the operation mode in a period from Tsw to t32 is switched from mode 8 to mode 9.

Figure 166:
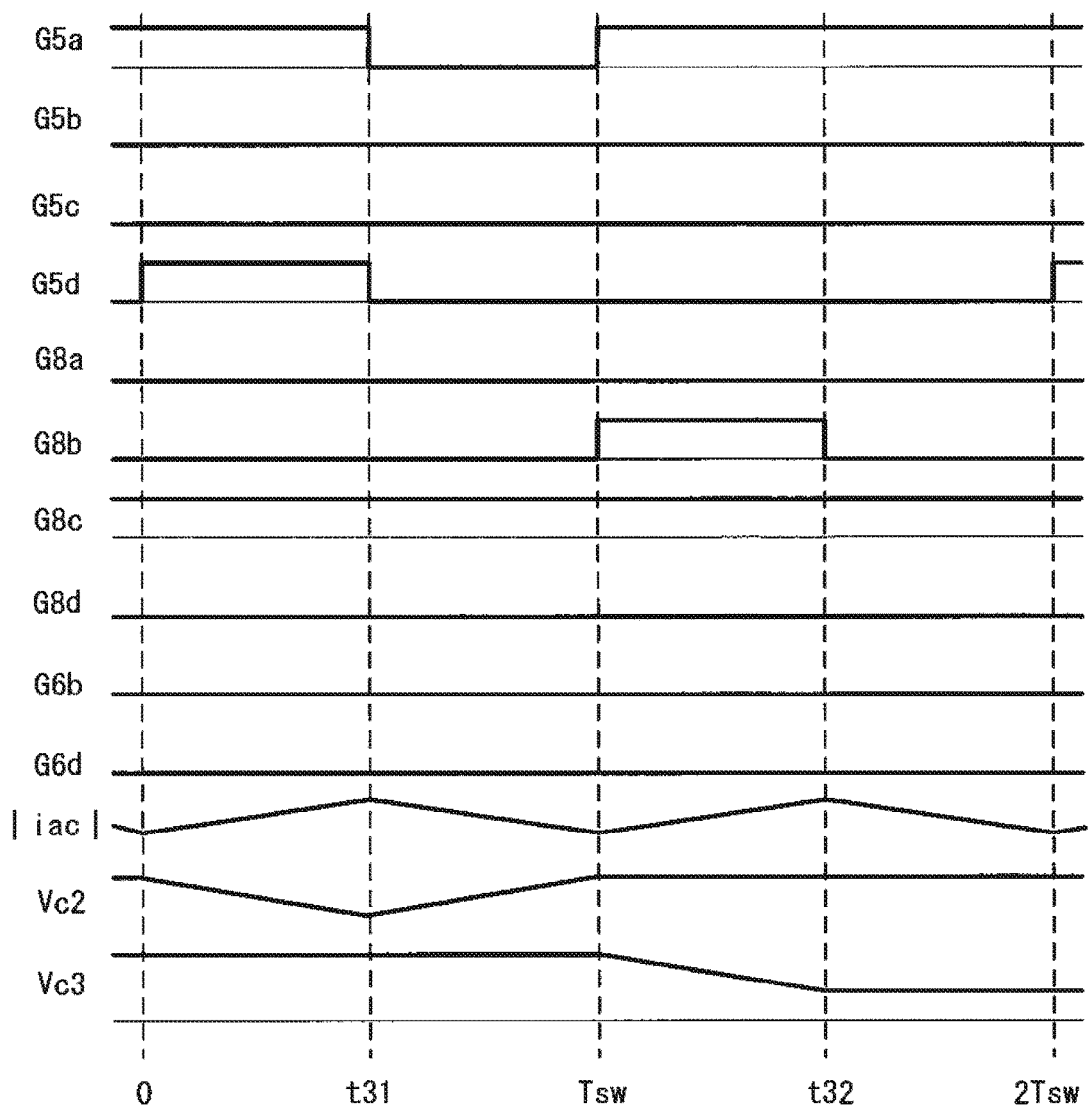

FIG. 166 is a waveform schematic diagram showing the operation state in an area 3 in the negative half wave of the AC power supply 1 in the case where the operation mode in a period from t32 to 2Tsw is switched from mode 1 to mode 9.

Figure 167:
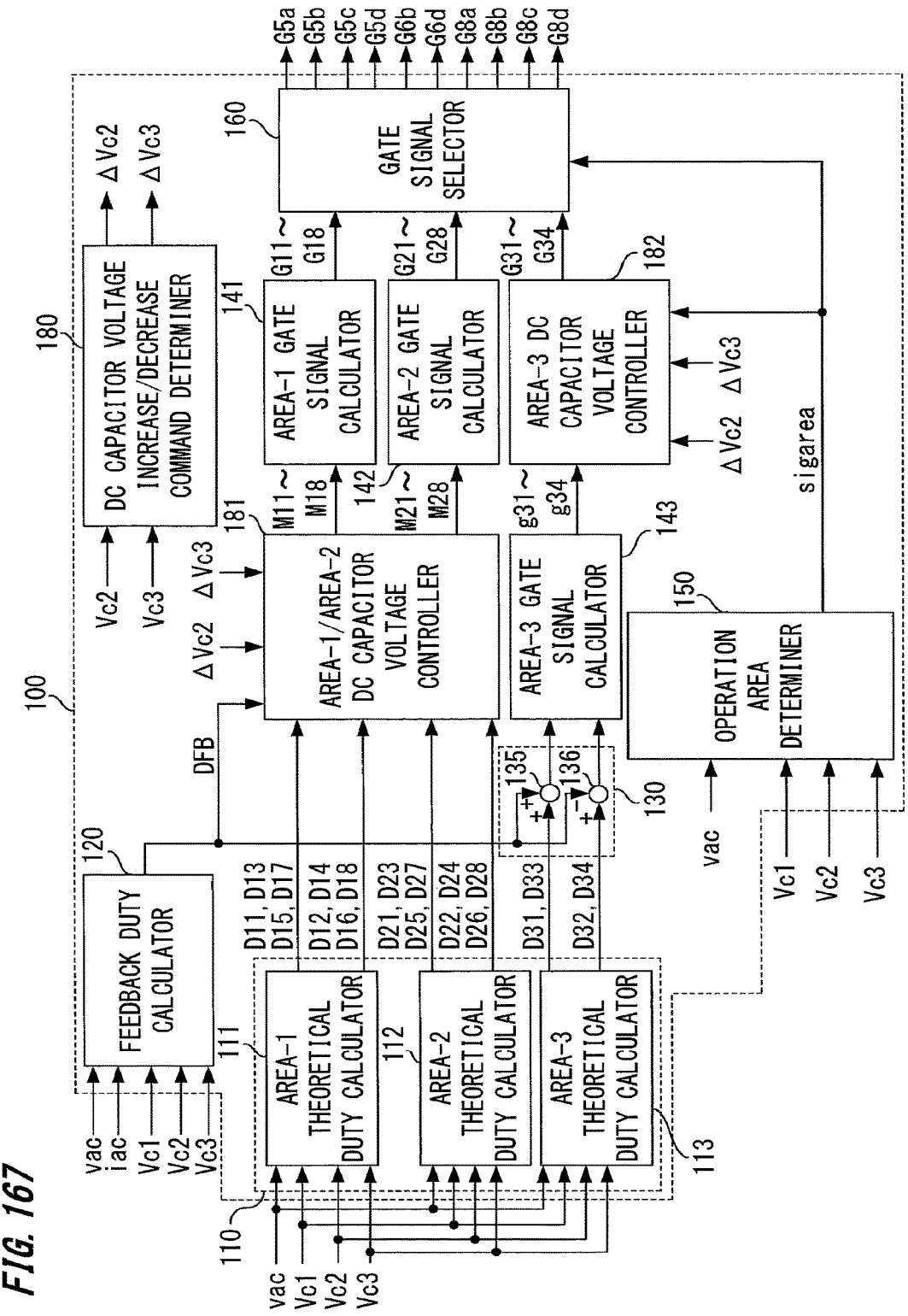

FIG. 167 is a configuration diagram of a control unit 100 in a power conversion device according to embodiment 4.

Figure 168:
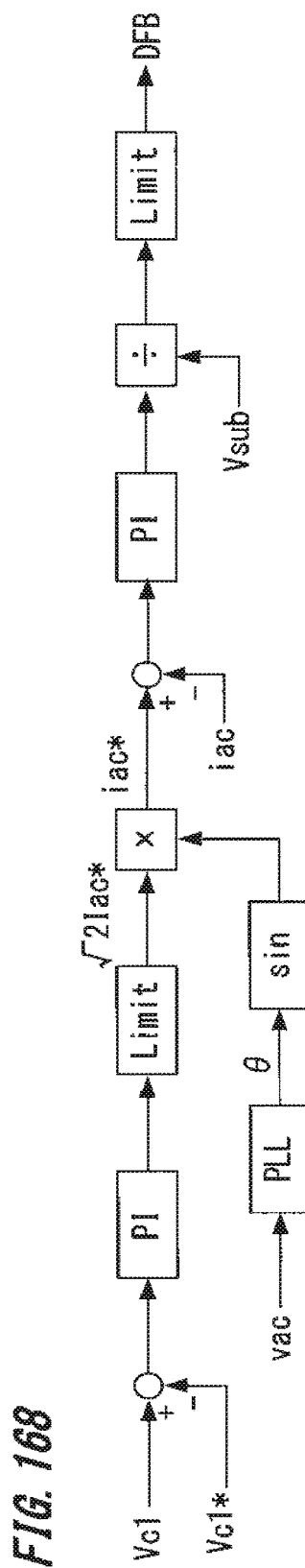

FIG. 168 is a configuration diagram of a feedback duty calculator 120 composing the control unit 100 in FIG. 167.

FIG. 169 is a configuration diagram of a DC capacitor voltage increase/decrease command determiner 180 composing the control unit 100 in FIG. 167.

Figure 170:
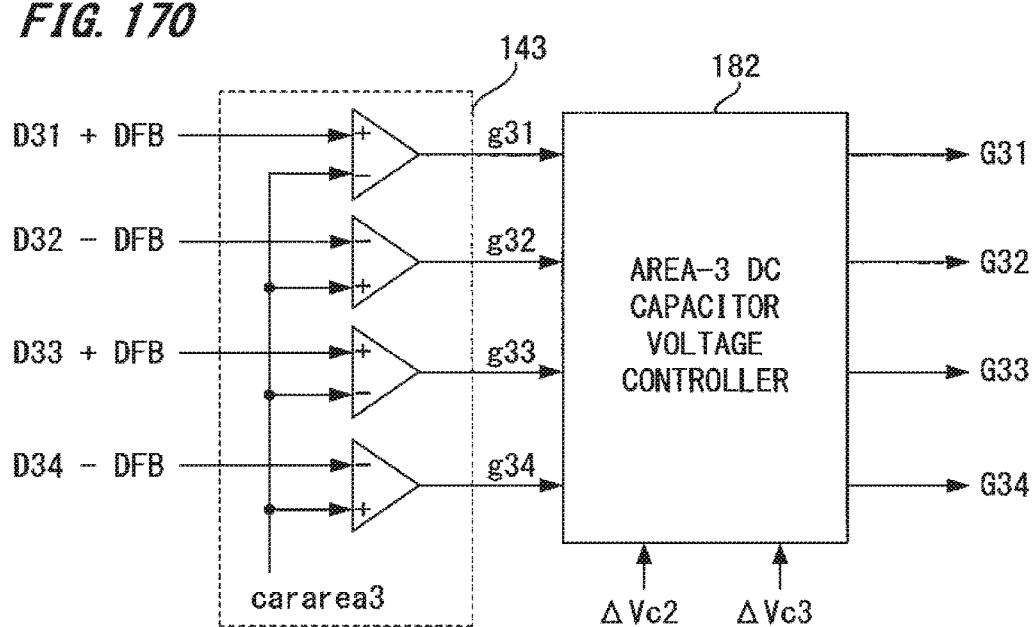

FIG. 170 is a configuration diagram showing an area-3 gate signal calculator 143 and an area-3 DC capacitor voltage controller 182 composing the control unit 100 in FIG. 167.

Figure 171:
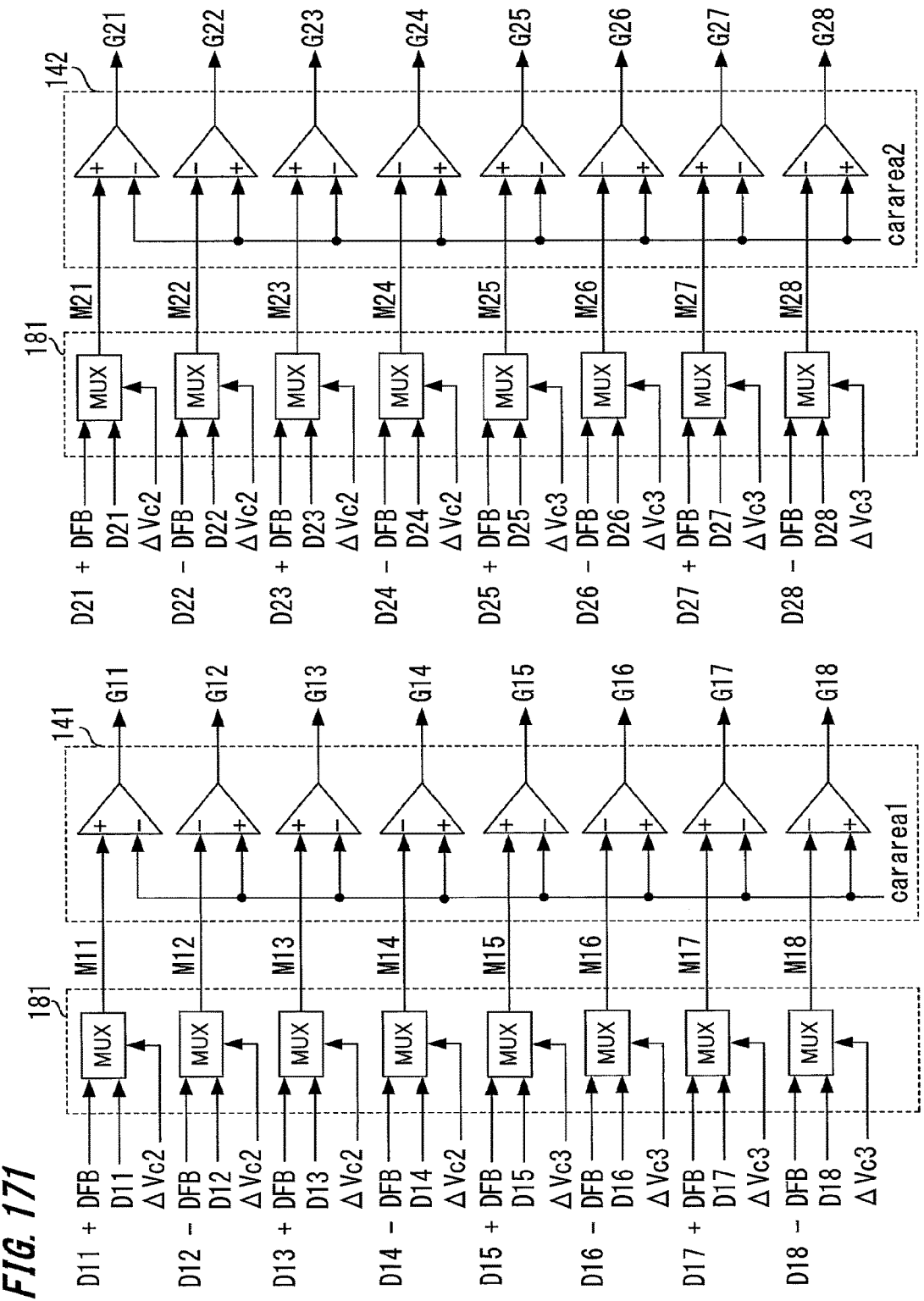

FIG. 171 is a configuration diagram showing an area-1/area-2 DC capacitor voltage controller 181, an area-1 gate signal calculator 141, and an area-2 gate signal calculator 142 composing the control unit 100 in FIG. 167.

DESCRIPTION OF EMBODIMENTS

Embodiment 1

Hereinafter, embodiment 1 of the present invention will be described.

Figure 1:
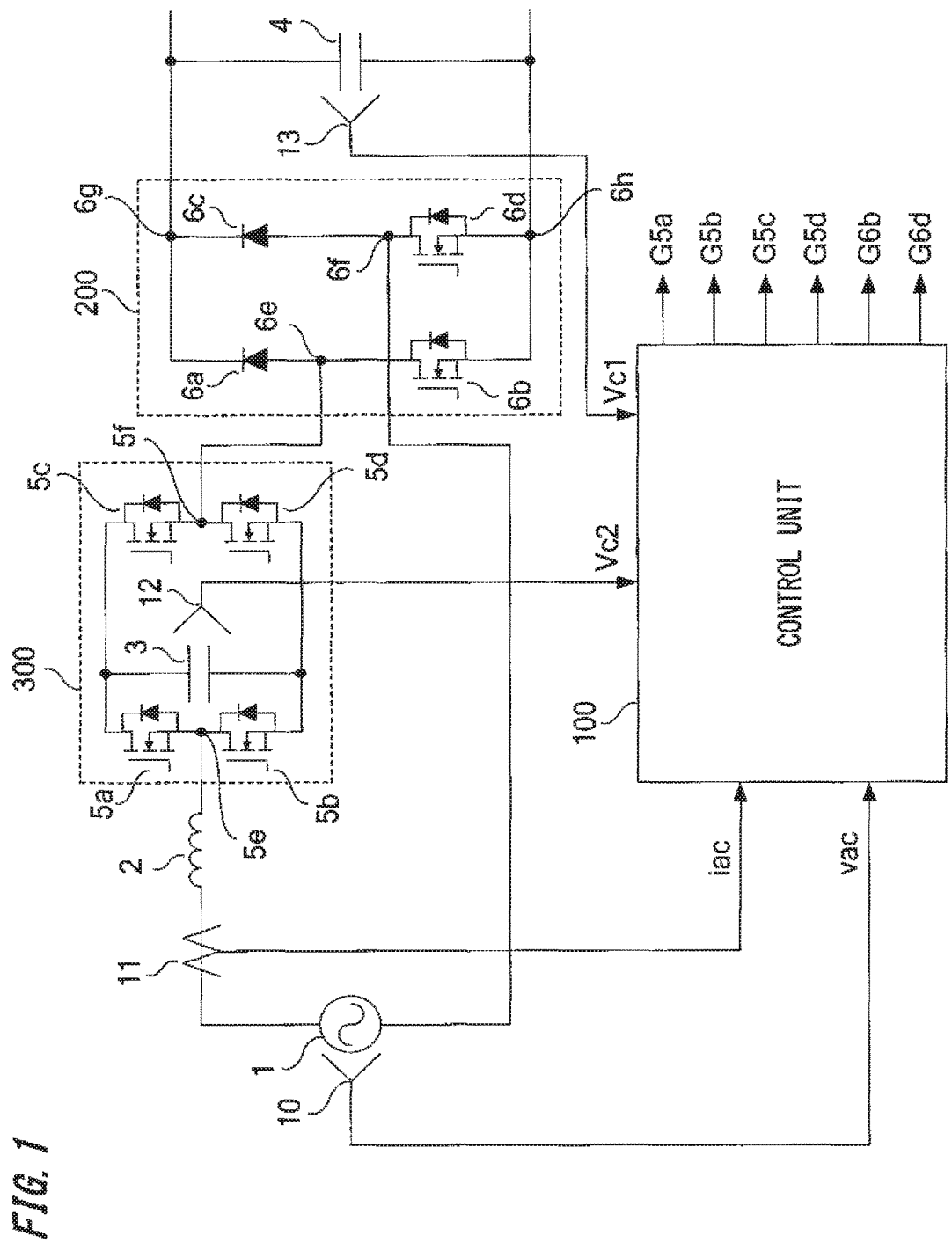
FIG. 1 is a diagram showing the circuit configuration of a power conversion device according to embodiment 1 of the present invention.

FIG. 1 is a circuit configuration diagram of a power conversion device according to embodiment 1 of the present invention. As shown in FIG. 1, the power conversion device includes a main circuit and a control unit 100, for converting AC voltage and AC power of a single-phase AC power supply 1 to DC voltage and DC power and outputting the DC voltage and DC power to a smoothing capacitor 4.

The main circuit is composed of a single-phase inverter 300, a single-phase converter 200, and a reactor 2 connected in series to each other between the AC power supply 1 and the smoothing capacitor 4.

The single-phase inverter 300 includes: a DC capacitor 3; a first leg composed of a series body of a first switch element 5a and a second switch element 5b; and a second leg composed of a series body of a third switch element 5c and a fourth switch element 5d, and the first leg and the second leg are connected in parallel with the DC capacitor 3.

The single-phase converter 200 includes: a third leg composed of a series body of a fifth switch element 6b and a first diode 6a; and a fourth leg composed of a series body of a sixth switch element 6d and a second diode 6c, and the third leg and the fourth leg are connected in parallel to each other.

A reactor 2 is connected between one end of the AC power supply 1 and the connection point between the first switch element 5a and the second switch element 5b in the single-phase inverter 300, i.e., the center point of the first leg which is one 5e of the inverter AC terminals of the single-phase inverter 300. The center point of the second leg which is the other one 5f of the inverter AC terminals of the single-phase inverter 300 is connected to the center point of the third leg which is one 6e of the converter AC terminals of the single-phase converter 200.

The center point of the fourth leg which is the other one 6f of the converter AC terminals of the single-phase converter 200 is connected to the other end of the AC power supply 1. The upper end and the lower end of the third leg and the fourth leg are converter DC terminals 6g, 6h connected to the smoothing capacitor 4.

The control unit 100 receives voltage vac of the AC power supply 1 detected by the AC voltage detection unit 10, current iac of the AC power supply 1 detected by the AC current detection unit 11, voltage Vc2 of the DC capacitor 3 detected by the DC capacitor voltage detection unit 12, and voltage Vc1 of the smoothing capacitor 4 detected by the DC voltage detection unit 13, and executes control operation described in detail below, to output gate signals G5a to G5d for driving the switch elements 5a to 5d in the single-phase inverter 300 to perform switching and gate signals G6b, G6d for driving the switch elements 6b, 6d in the single-phase converter 200 to perform switching.

A load (not shown) is connected in parallel to the smoothing capacitor 4. As the load, a resistor, a voltage source such as a battery, or the like may be directly connected, or a resistor, a voltage source such as a battery, or the like may be connected via a power converter such as a DC-DC converter or a DC-AC inverter.

The switch elements 5a to 5d, 6b, 6d are formed from MOSFETs (Metal Oxide Semiconductor Field Effect Transistors) having diodes therein. Also, the diodes 6a, 6c may be formed from MOSFETs.

Other than MOSFETs, the switch elements may be formed from IGBTs (Insulated Gate Bipolar Transistors) having diodes between the sources and the drains, or semiconductor elements made from compound semiconductors such as SiC (Silicon Carbide), GaN (Galium Nitride), etc.

Next, operation of the power conversion device configured as described above will be described.

The single-phase converter 200 switches the voltage level between the converter AC terminals 6e, 6f to a positive/negative value Vc1, −Vc1 of voltage of the smoothing capacitor 4, or zero voltage, through switching operation of the switch elements 6b, 6d.

The single-phase inverter 300 switches the voltage level between the inverter AC terminals 5e, 5f to a positive/negative value Vc2, −Vc2 of voltage of the DC capacitor 3, or zero voltage, through switching operation of the switch elements 5a to 5d.

The directions of output voltages of the single-phase converter 200 and the single-phase inverter 300 are determined depending on the relationship among voltage vac of the AC power supply 1, voltage Vc1 of the smoothing capacitor 4, and voltage Vc2 of the DC capacitor 3.

Here, it is assumed that voltage Vc2 of the DC capacitor 3 is smaller than voltage Vc1 of the smoothing capacitor 4.

Figure 2:
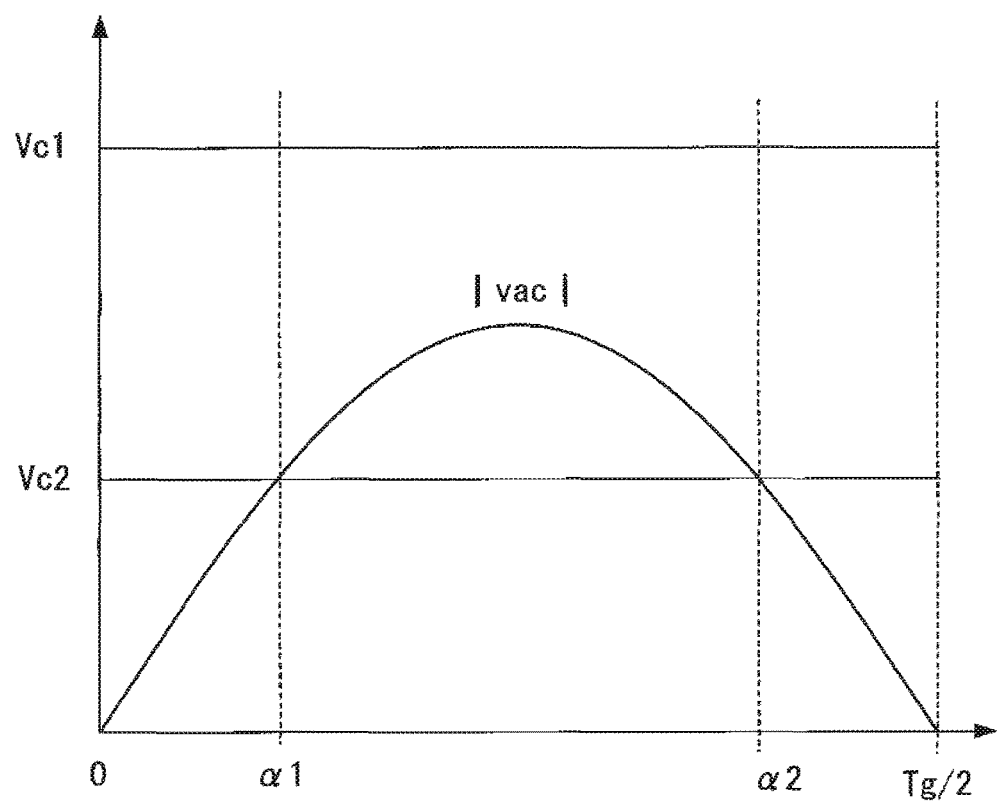
FIG. 2 is a diagram showing a relationship of voltages in a step-up operation mode in the power conversion device according to embodiment 1 of the present invention.

FIG. 2 shows a voltage relationship in the case where voltage Vc1 of the smoothing capacitor 4 is greater than the absolute value |vac| of voltage vac of the AC power supply 1, over the entire cycle of the AC power supply 1. Hereinafter, operation in this case is referred to as a step-up operation mode.

Figure 3:
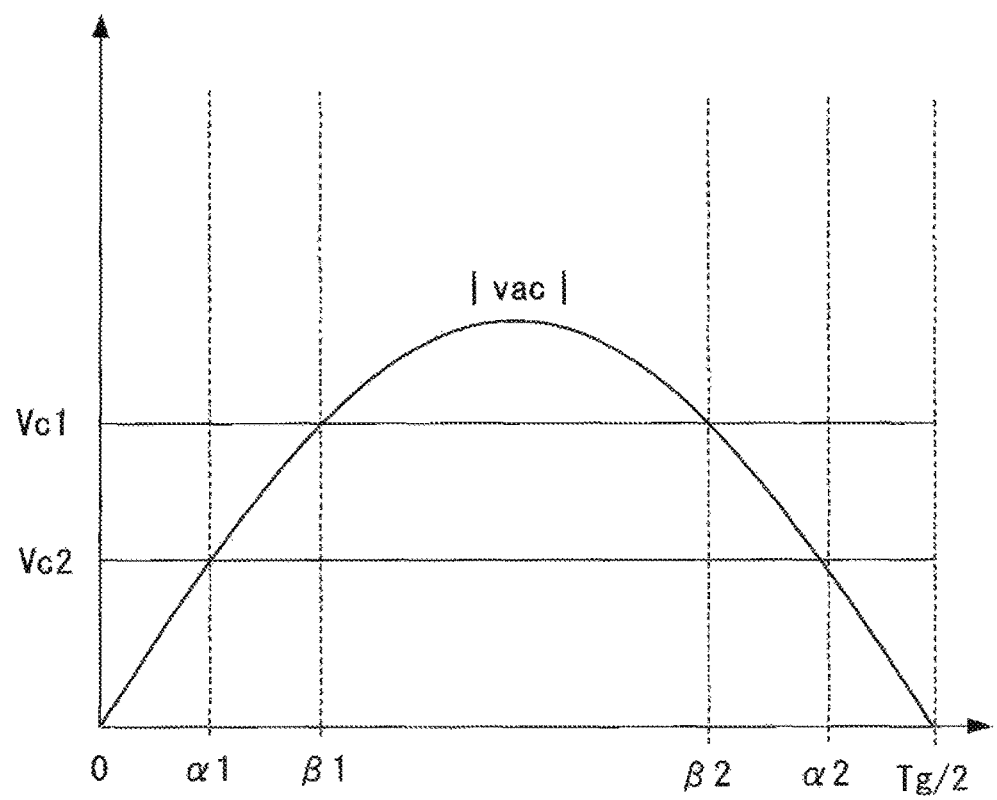
FIG. 3 is a diagram showing a relationship of voltages in a step-down operation mode in the power conversion device according to embodiment 1 of the present invention.

FIG. 3 shows a voltage relationship in the case where voltage Vc1 of the smoothing capacitor 4 is smaller than the absolute value |vac| of voltage vac of the AC power supply 1, within a part of the cycle of the AC power supply 1. Hereinafter, operation in this case is referred to as a step-down operation mode.

In FIG. 2 and FIG. 3, Tg indicates the cycle of the AC power supply 1, and Tg/2 indicates the half cycle of the AC power supply 1. In addition, α1 and α2 are phases when Vc2 is equal to |vac|. On the other hand, µ1 and β2 are phases when Vc1 is equal to |vac|. In FIG. 2 and FIG. 3, areas in which phase t is in ranges of 0≤t<α1 and α2<t≤Tg/2 are areas in which a relationship of |vac|<Vc2<Vc1 is satisfied. Such an area is defined as area 1.

An area of α1≤t≤α2 in FIG. 2 and areas of α1≤t<β1 and β2<t≤α2 in FIG. 3 are areas in which Vc2≤|vac|<Vc1 is satisfied. Such an area is defined as area 2.

An area of µ1≤t≤β2 in FIG. 3 is an area in which Vc1≤|vac| is satisfied. Such an area is defined as area 3.

In claims of the present disclosure, the areas 1 and 2 are referred to as area A, and the area 3 is referred to as area B.

In the present configuration, the current route differs between the positive half wave and the negative half wave of the AC power supply 1. Therefore, first, driving methods (gate patterns) and current routes in the areas 1 to 3 in the positive half wave will be described, and next, driving methods and current routes in the negative half wave will be described. It is noted that the inductance of the reactor 2 is defined as L.

In the present embodiment 1, the switching cycle of the single-phase inverter 300 and the switching cycle of the single-phase converter 200 are equally set to Tsw.

Figure 4:
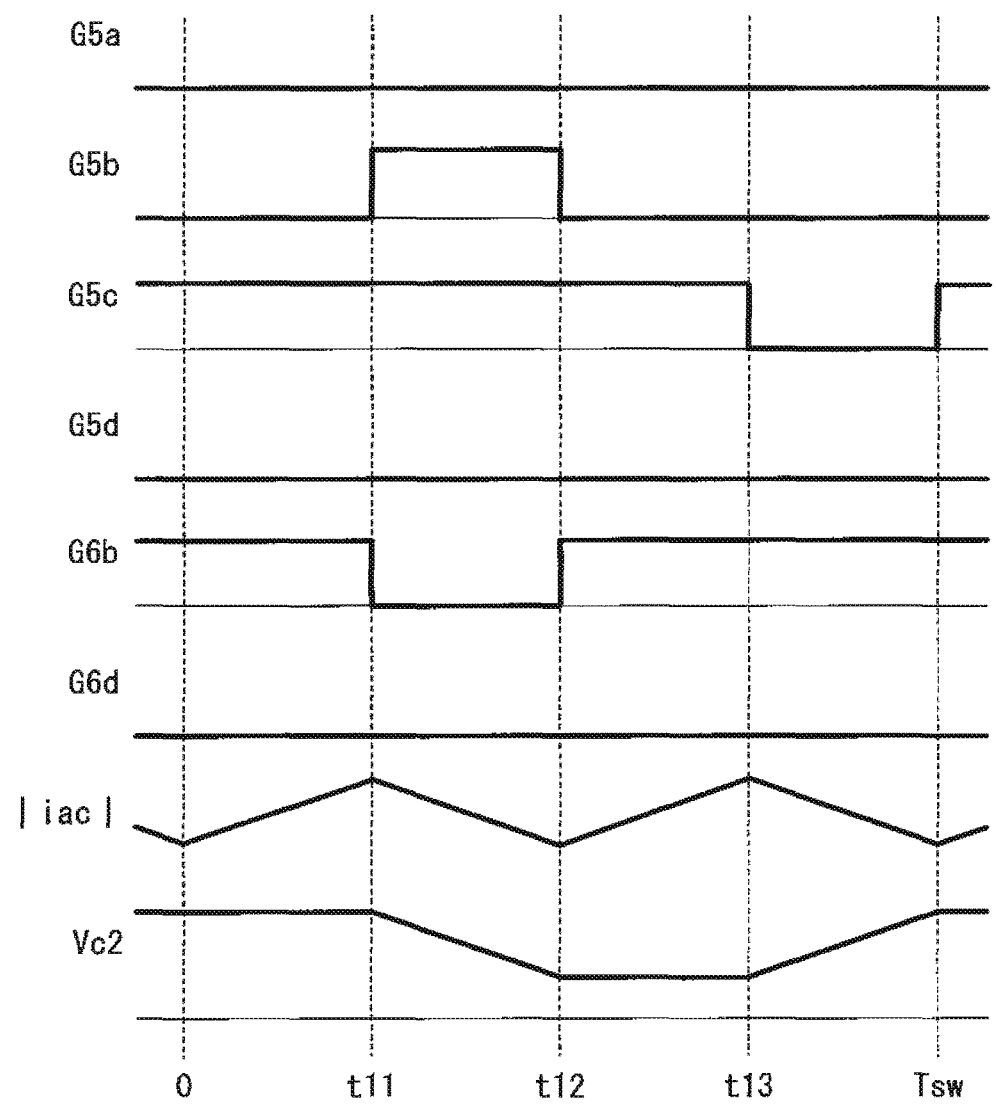
FIG. 4 is a waveform schematic diagram showing the operation state in an area 1 in the positive half wave of the AC power supply 1, in the power conversion device according to embodiment 1 of the present invention.

FIG. 4 is an operation schematic diagram showing the operation state during one switching cycle Tsw, in the area 1 in the positive half wave of the AC power supply 1. Here, as described later, one switching cycle Tsw is divided into two pairs of periods, i.e., four periods in total, in which current |iac| of the AC power supply 1 increases in the first half of each pair of periods and decreases in the second half of each pair of periods, and the driving is performed by high-frequency PWM.

It is noted that current of the AC power supply 1 may decrease in the first half and increase in the second half. In essence, a current increase period and a current decrease period only have to be a pair of periods. The same applies hereafter.

Figure 5:
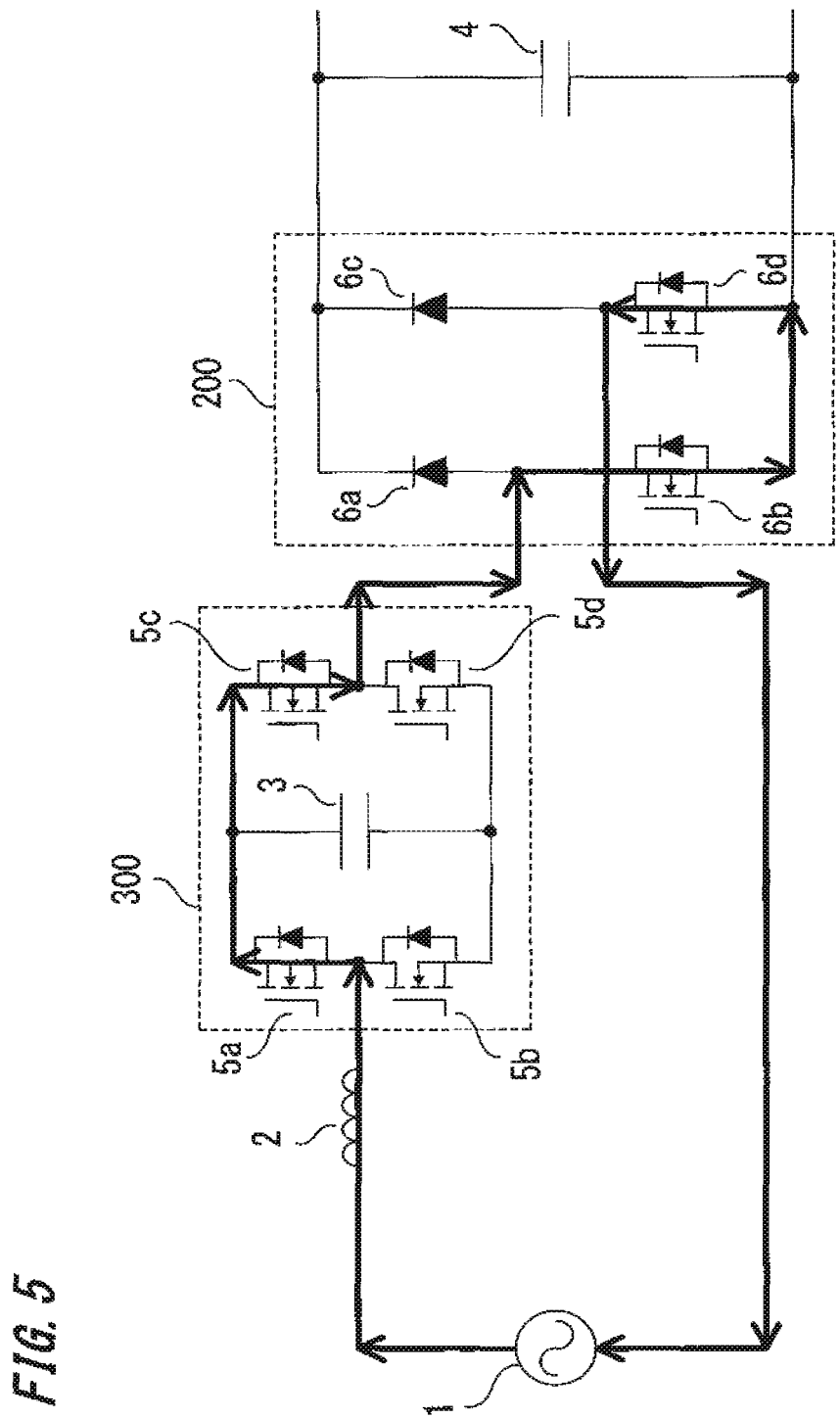
FIG. 5 is a diagram showing a current route in a first period in FIG. 4.

In the first period of 0<t<t11, the switch elements 5c, 6b are ON and the AC power supply 1 is short-circuited through the single-phase converter 200, so that current |iac| of the AC power supply 1 increases. The current at this time flows through a route shown in FIG. 5. The route is as follows: AC power supply 1→reactor 2→switch element 5a→switch element 5c→switch element 6b→switch element 6d→AC power supply 1. During this period, current does not flow through the DC capacitor 3, and therefore voltage Vc2 is constant. A current change amount Δiac11 during this period is represented by the following Expression (1) and becomes a positive value.

$$\Delta iac11 = (|vac|/L) \cdot t11 \quad (1)$$

Figure 6:
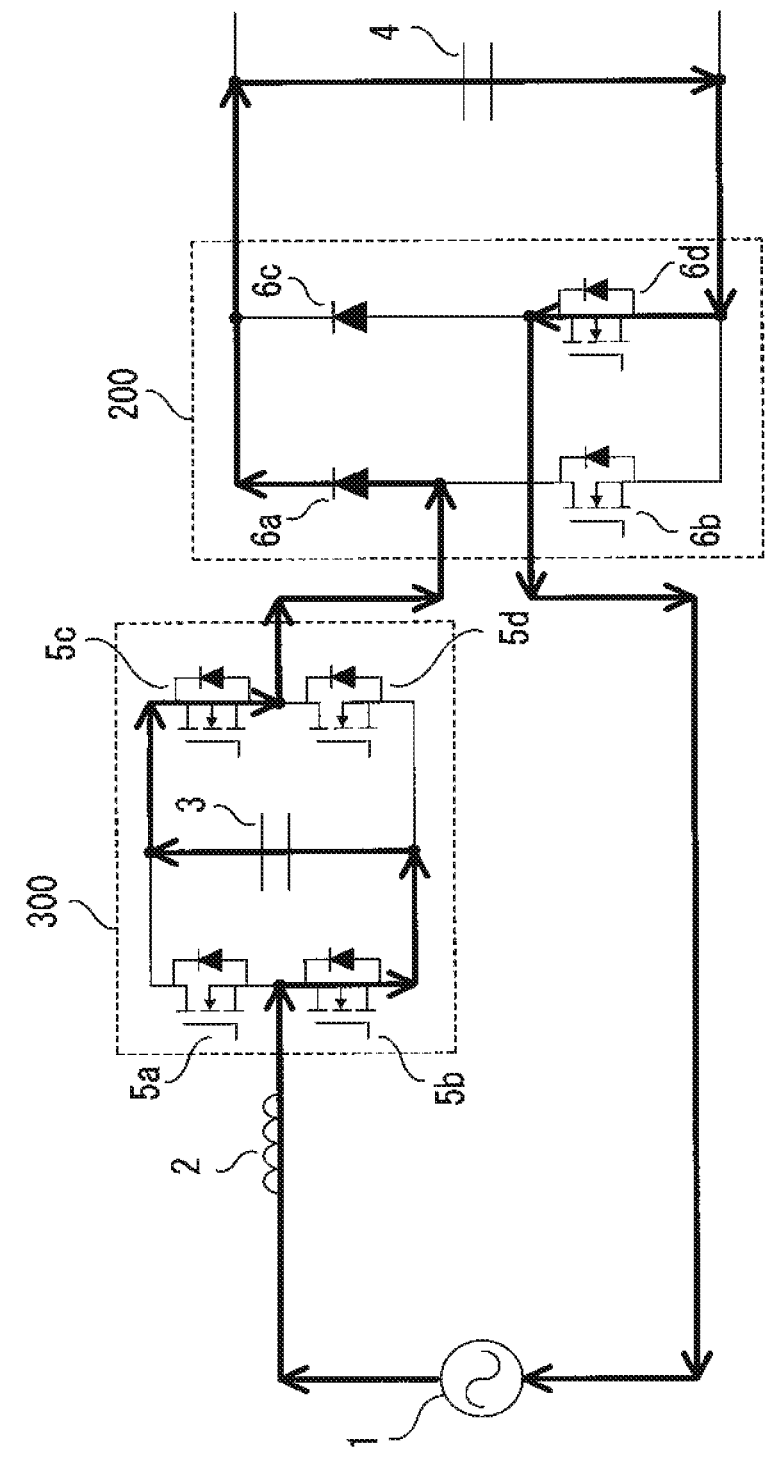
FIG. 6 is a diagram showing a current route in a second period in FIG. 4.

In the second period of t11<t≤t12, the switch elements 5b, 5c are ON, and a circuit is made through the smoothing capacitor 4 and thus the smoothing capacitor 4 is charged, so that current |iac| of the AC power supply 1 decreases. The current at this time flows through a route shown in FIG. 6. The route is as follows: AC power supply 1→reactor 2→switch element 5b→DC capacitor 3→switch element 5c→diode 6a→smoothing capacitor 4→switch element 6d→AC power supply 1. During this period, current flows through the DC capacitor 3 in a discharging direction, so that voltage Vc2 decreases. A current change amount Δiac12 during this period is represented by the following Expression (2) and becomes a negative value.

$$\Delta iac12 = ((|vac| + Vc2 - Vc1)/L) \cdot (t12 - t11) \quad (2)$$

Figure 7:
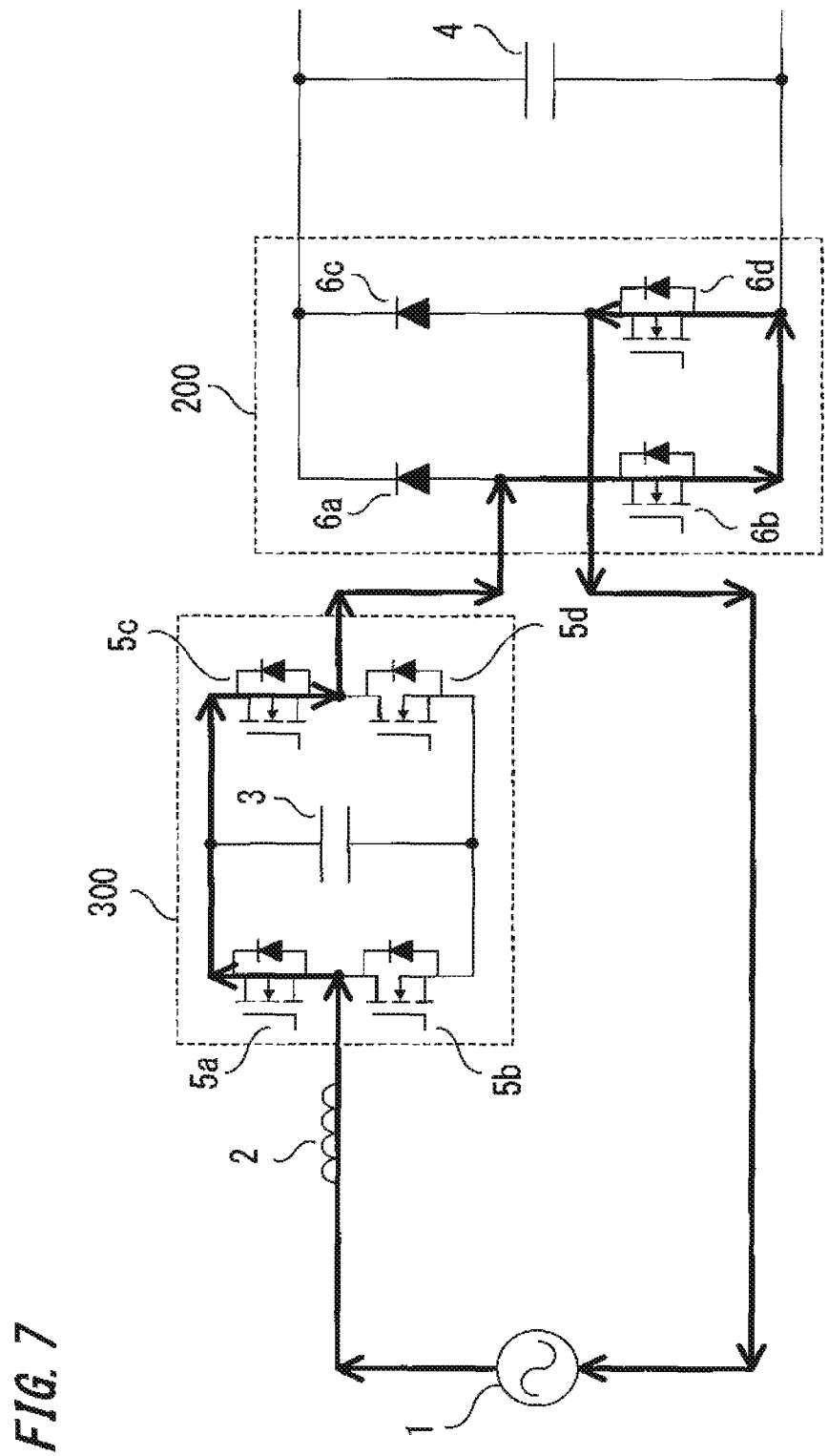
FIG. 7 is a diagram showing a current route in a third period in FIG. 4.

In the third period of t12<t≤t13, the switch elements 5c, 6b are ON and the AC power supply 1 is short-circuited through the single-phase converter 200, so that current |iac| of the AC power supply 1 increases. The current at this time flows through a route shown in FIG. 7. The route is as follows: AC power supply 1→reactor 2→switch element 5a→switch element 5c→switch element 6b→switch element 6d→AC power supply 1. During this period, current does not flow through the DC capacitor 3, and therefore voltage Vc2 is constant. A current change amount Δiac13 during this period is represented by the following Expression (3) and becomes a positive value.

$$\Delta iac13 = (|vac|/L) \cdot (t13 - t12) \quad (3)$$

Figure 8:
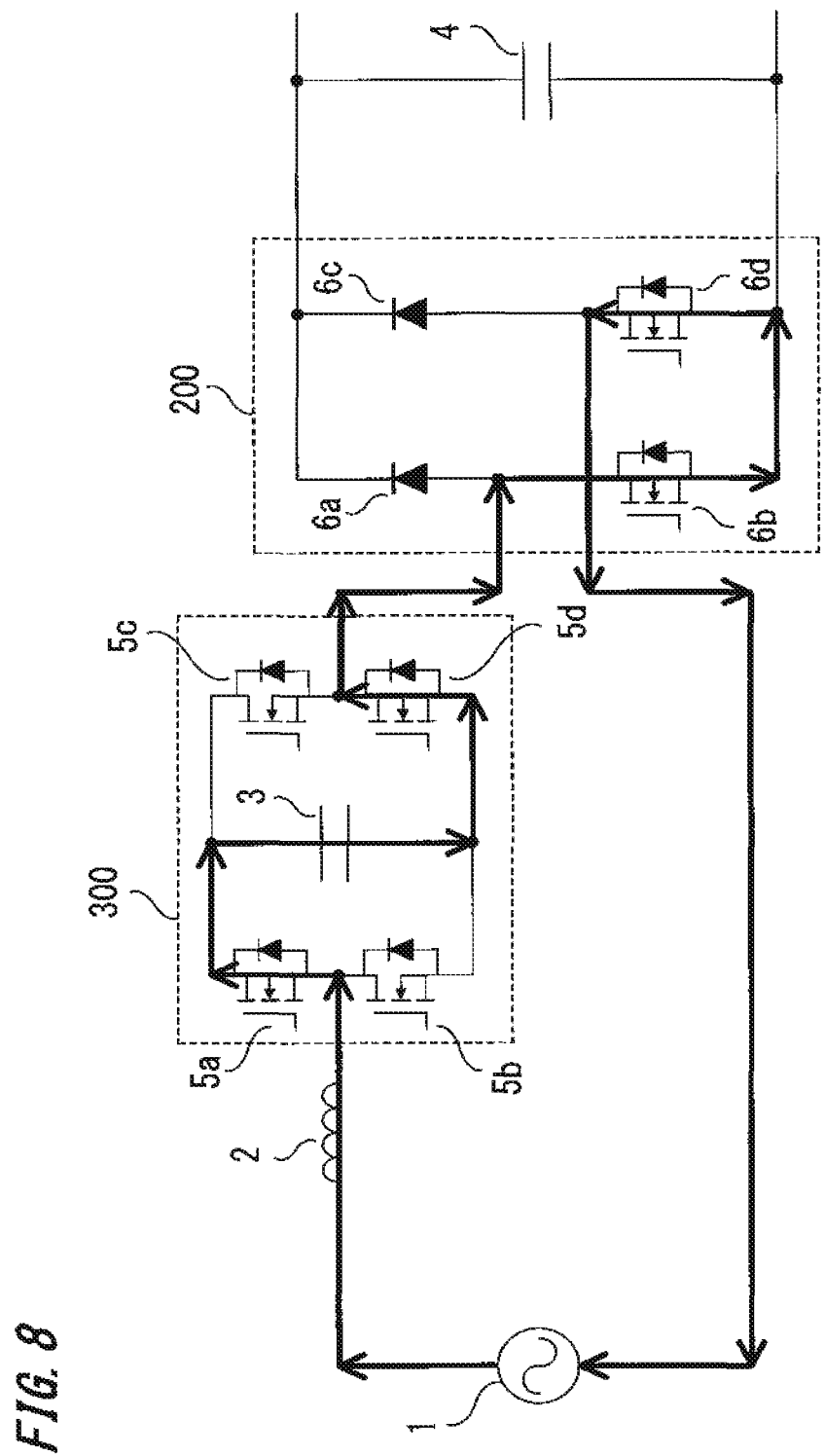
FIG. 8 is a diagram showing a current route in a fourth period in FIG. 4.

In the fourth period of t13<t≤Tsw, the switch element 6b is ON and the DC capacitor 3 is charged by the AC power supply 1, so that current |iac| of the AC power supply 1 decreases. The current at this time flows through a route shown in FIG. 8. The route is as follows: AC power supply 1 reactor 2→switch element 5a→DC capacitor 3→switch element 5d→switch element 6b→switch element 6d→AC power supply 1. During this period, current flows through the DC capacitor 3 in a charging direction, so that voltage Vc2 increases. A current change amount Δiac14 during this period is represented by the following Expression (4) and becomes a negative value.

$$\Delta iac14 = ((|vac| - Vc2)/L) \cdot (Tsw - t13) \quad (4)$$

At this time, under the assumption of Δiac11=−Δiac12, a theoretical duty D11 as a theoretical duty 1 which is a ratio of a period from 0 to t11 with respect to a period from 0 to t12 is represented by Expression (5), and a theoretical duty D12 as a theoretical duty 2 which is a ratio of a period from t11 to t12 with respect to the period from 0 to t12 is represented by Expression (6).

$$D11 = (Vc1 - |vac| - Vc2)/(Vc1 - Vc2) \quad (5)$$

$$D12 = 1 - D11 \quad (6)$$

In addition, under the assumption of Δiac13=−Δiac14, a duty D13 which is a ratio of a period from t12 to t13 with respect to a period from t12 to Tsw is represented by Expression (7), and a duty D14 which is a ratio of a period from t13 to Tsw with respect to the period from t12 to Tsw is represented by Expression (8).

$$D13 = (Vc2 - |vac|)/Vc2 \quad (7)$$

$$D14 = 1 - D13 \quad (8)$$

Figure 9:
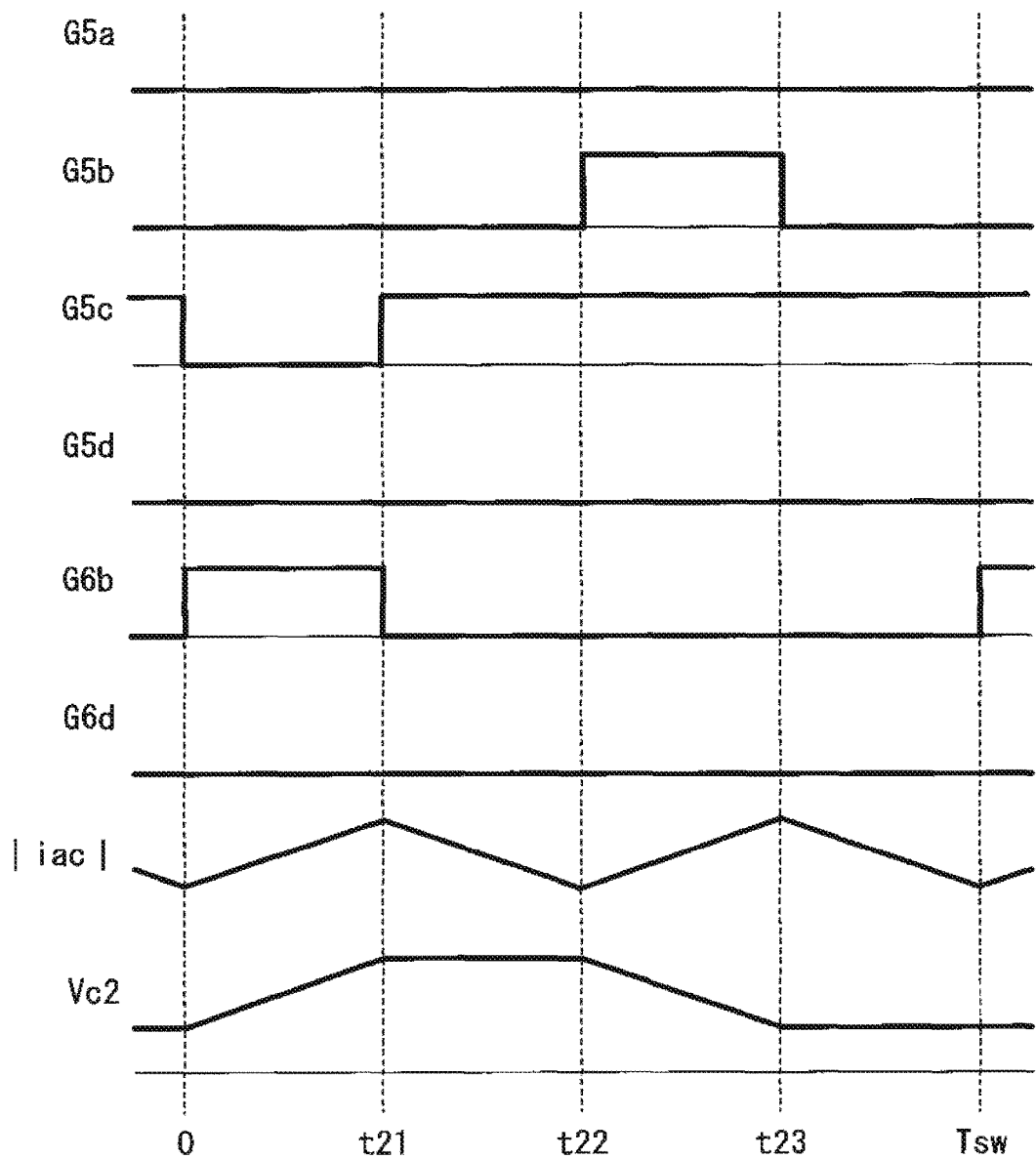
FIG. 9 is a waveform schematic diagram showing the operation state in an area 2 in the positive half wave of the AC power supply 1, in the power conversion device according to embodiment 1 of the present invention.

Next, FIG. 9 shows a schematic diagram of operation during one switching cycle Tsw, in the area 2 in the positive half wave of the AC power supply 1. As in the case of the area 1 above, one switching cycle Tsw is divided into four periods and driving is performed by high-frequency PWM.

Figure 10:
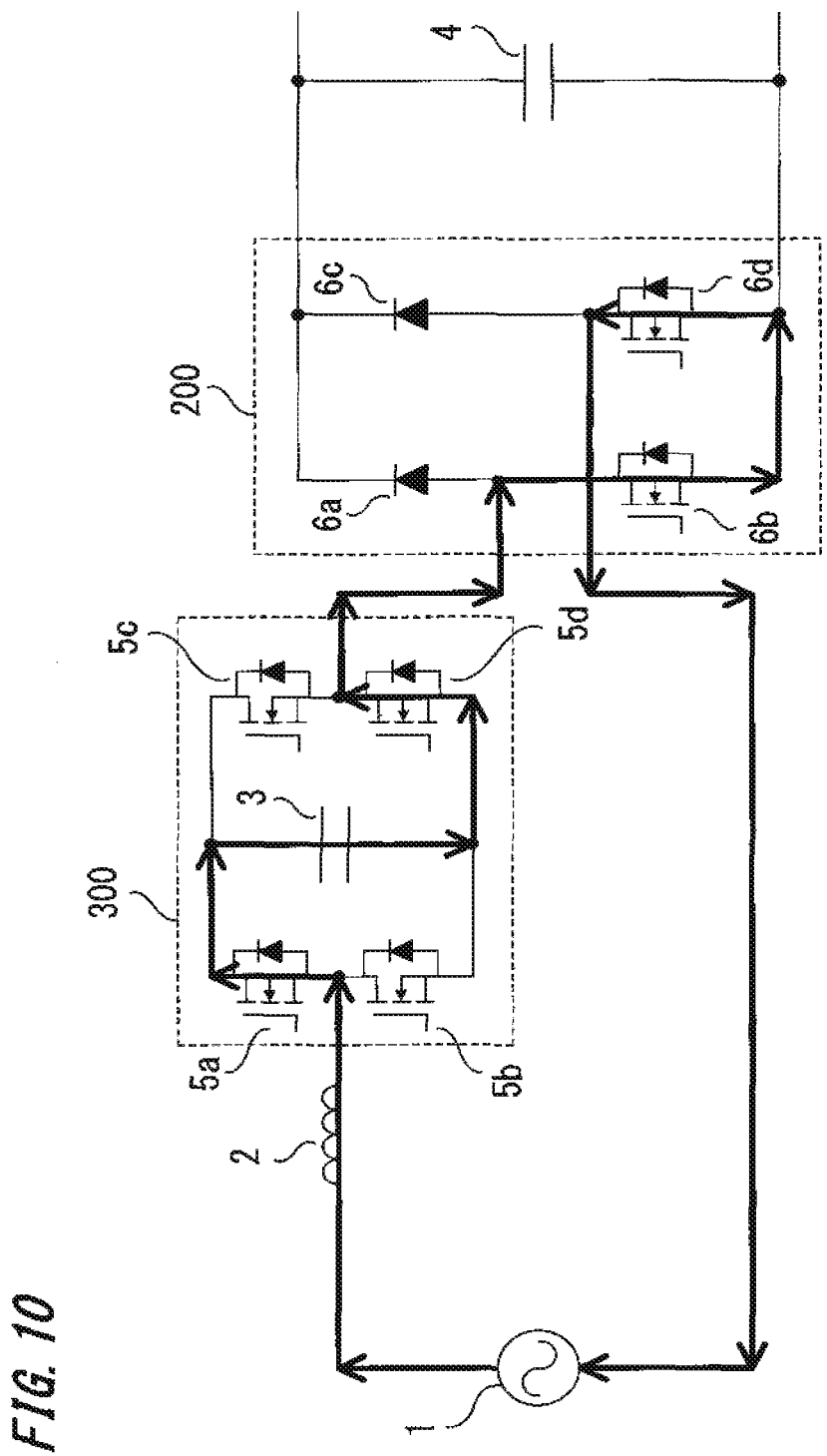
FIG. 10 is a diagram showing a current route in a first period in FIG. 9.

In the first period of 0<t≤t21, the switch element 6b is ON and current |iac| of the AC power supply 1 increases. The current at this time flows through a route shown in FIG. 10. The route is as follows: AC power supply 1→reactor 2→switch element 5a→DC capacitor 3→switch element 5d→switch element 6b→switch element 6d→AC power supply 1. During this period, current flows through the DC capacitor 3 in a charging direction, and therefore voltage Vc2 increases. During this period, a current change amount Δiac21 is represented by the following Expression (9) and becomes a positive value.

$$\Delta iac21 = ((|vac| - Vc2)/L) \cdot t21 \qquad (9)$$

Figure 11:
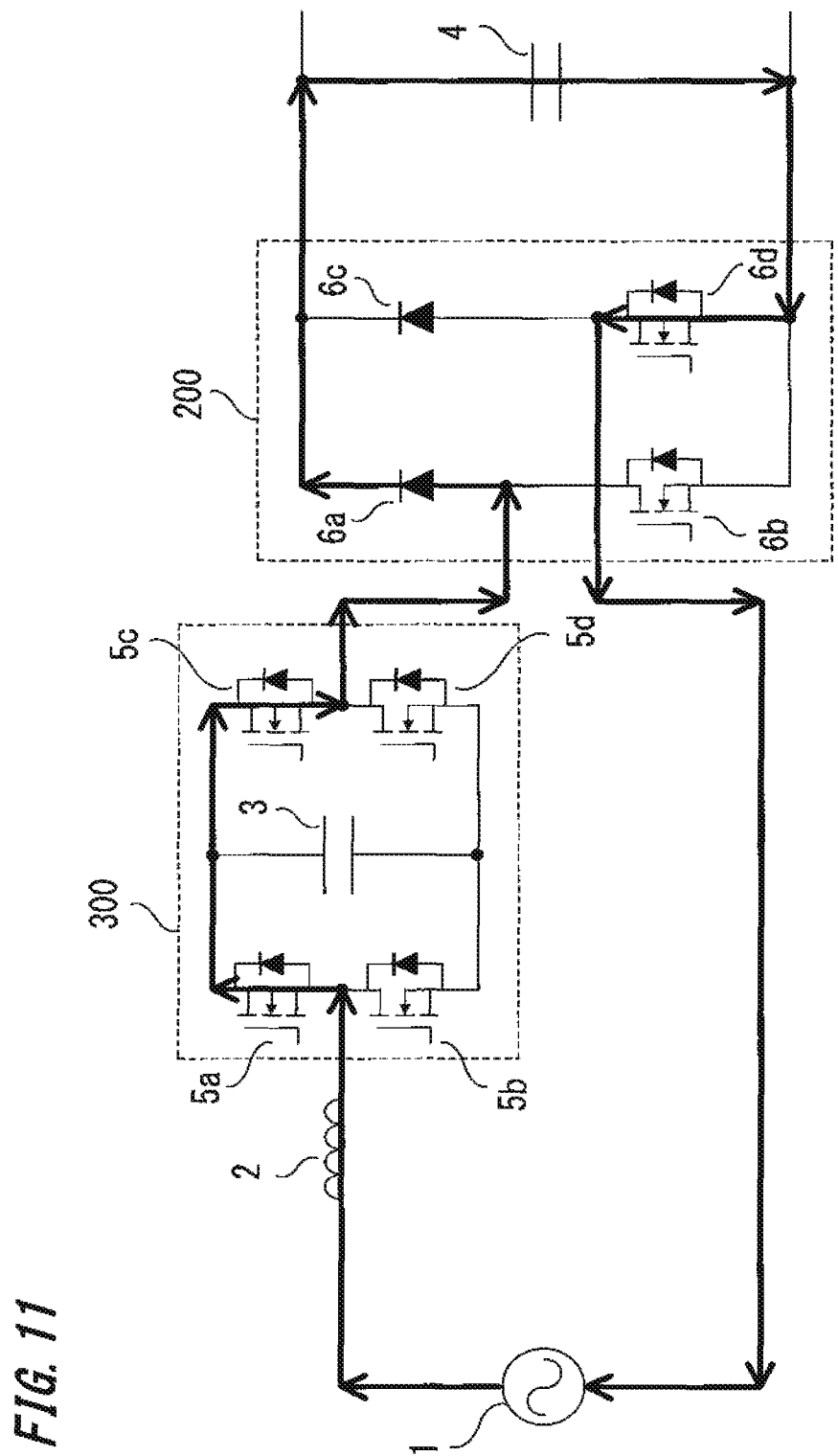
FIG. 11 is a diagram showing a current route in a second period in FIG. 9.

In the second period of t21<t≤t22, the switch element 5c is ON and current |iac| of the AC power supply 1 decreases. The current at this time flows through a route shown in FIG. 11. The route is as follows: AC power supply 1→reactor 2→switch element 5a→switch element 5c→diode 6a→smoothing capacitor 4→switch element 6d→AC power supply 1. During this period, current does not flow through the DC capacitor 3, and therefore voltage Vc2 is constant. The current change amount Δiac22 during this period is represented by the following Expression (10) and becomes a negative value.

$$\Delta iac22 = ((|vac| - Vc1)/L) \cdot (t22 - t21) \qquad (10)$$

Figure 12:
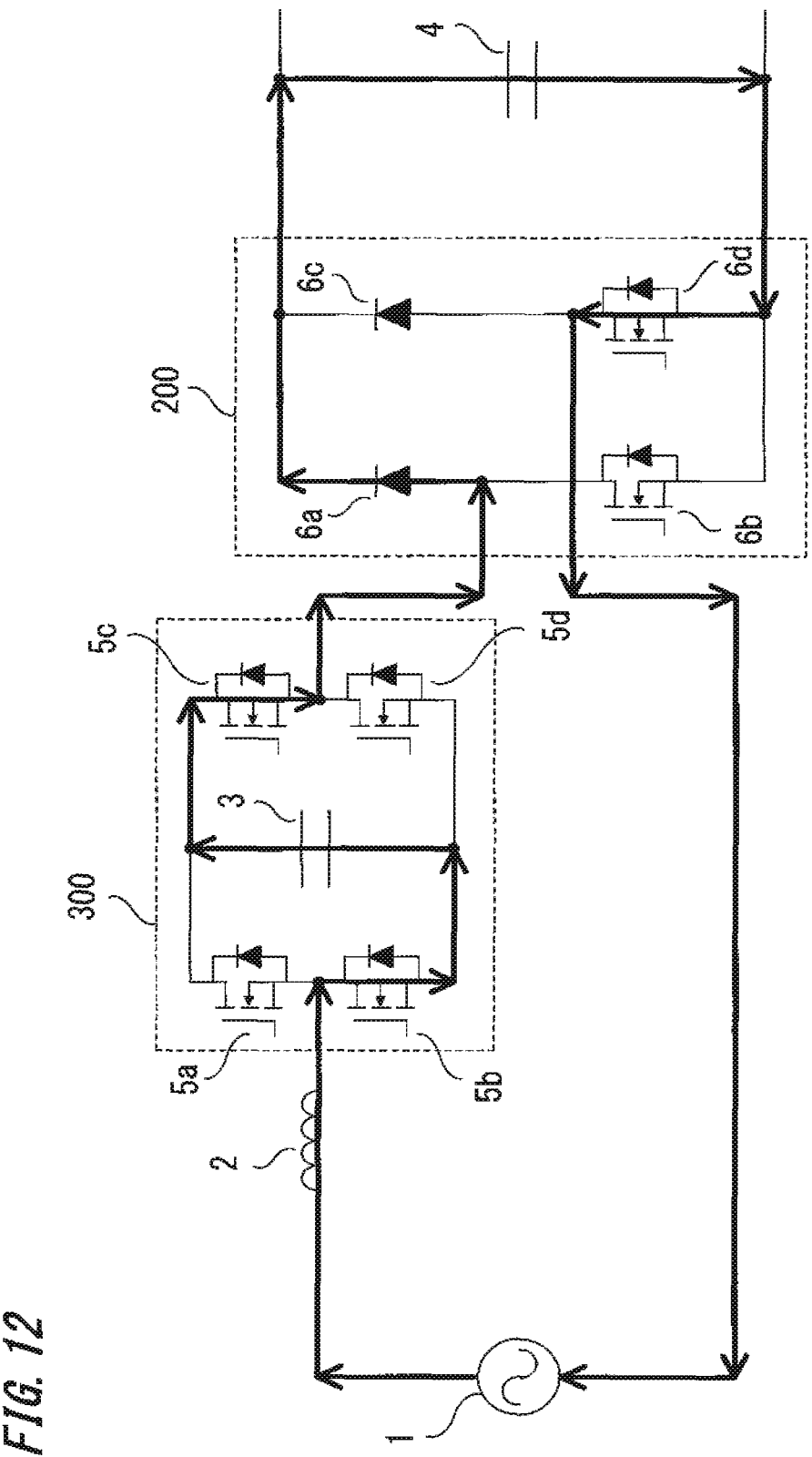
FIG. 12 is a diagram showing a current route in a third period in FIG. 9.

In the third period of t22<t≤t23, the switch elements 5b, 5c are ON and current |iac| of the AC power supply 1 increases. The current at this time flows through a route shown in FIG. 12. The route is as follows: AC power supply 1→reactor 2→switch element 5b→DC capacitor 3→switch element 5c→diode 6a→smoothing capacitor 4→switch element 6d→AC power supply 1. During this period, current flows through the DC capacitor 3 in a discharging direction, and therefore voltage Vc2 decreases. A current change amount Δiac23 during this period is represented by the following Expression (11) and becomes a positive value.

$$\Delta iac23 = ((|vac| + Vc2 - Vc1)/L) \cdot (t23 - t22) \qquad (11)$$

Figure 13:
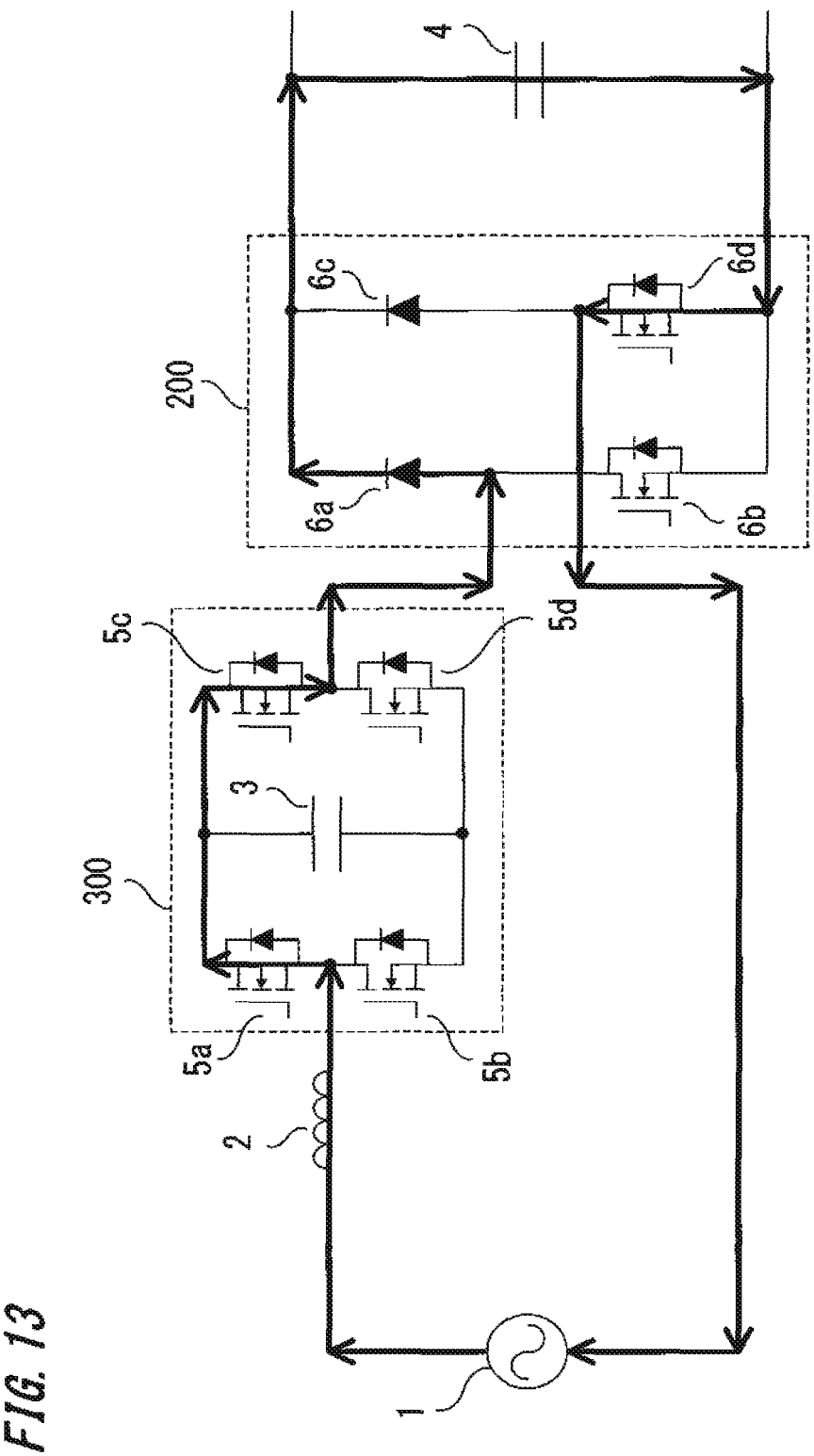
FIG. 13 is a diagram showing a current route in a fourth period in FIG. 9.

In the fourth period of t23<t≤Tsw, the switch element 5c is ON and current |iac| of the AC power supply 1 decreases. The current at this time flows through a route shown in FIG. 13. The route is as follows: AC power supply 1→reactor 2→switch element 5a→switch element 5c→diode 6a→smoothing capacitor 4→switch element 6d→AC power supply 1. During this period, current does not flow through the DC capacitor 3, and therefore voltage Vc2 is constant. A current change amount Δiac24 during this period is represented by the following Expression (12) and becomes a negative value.

$$\Delta iac24 = ((|vac| - Vc1)/L) \cdot (Tsw - t23) \qquad (12)$$

At this time, under the assumption of Δiac21=−Δiac22, a theoretical duty D21 which is a ratio of a period from 0 to t21 with respect to a period from 0 to t22 is represented by Expression (13), and a theoretical duly D22 which is a ratio of a period from t21 to t22 with respect to the period from 0 to t22 is represented by Expression (14).

$$D21 = (Vc1 - |vac|)/(Vc1 - Vc2) \qquad (13)$$

$$D22 = 1 - D21 \qquad (14)$$

In addition, under the assumption of Δiac23=−Δiac24, a theoretical duty D23 which is a ratio of a period from t22 to t23 with respect to a period from t22 to Tsw is represented by Expression (15), and a theoretical duty D24 which is a ratio of a period from t23 to Tsw with respect to the period from t22 to Tsw is represented by Expression (16).

$$D23 = (Vc1 - |vac|)/Vc2 \qquad (15)$$

$$D24 = 1 - D23 \qquad (16)$$

Figure 14:
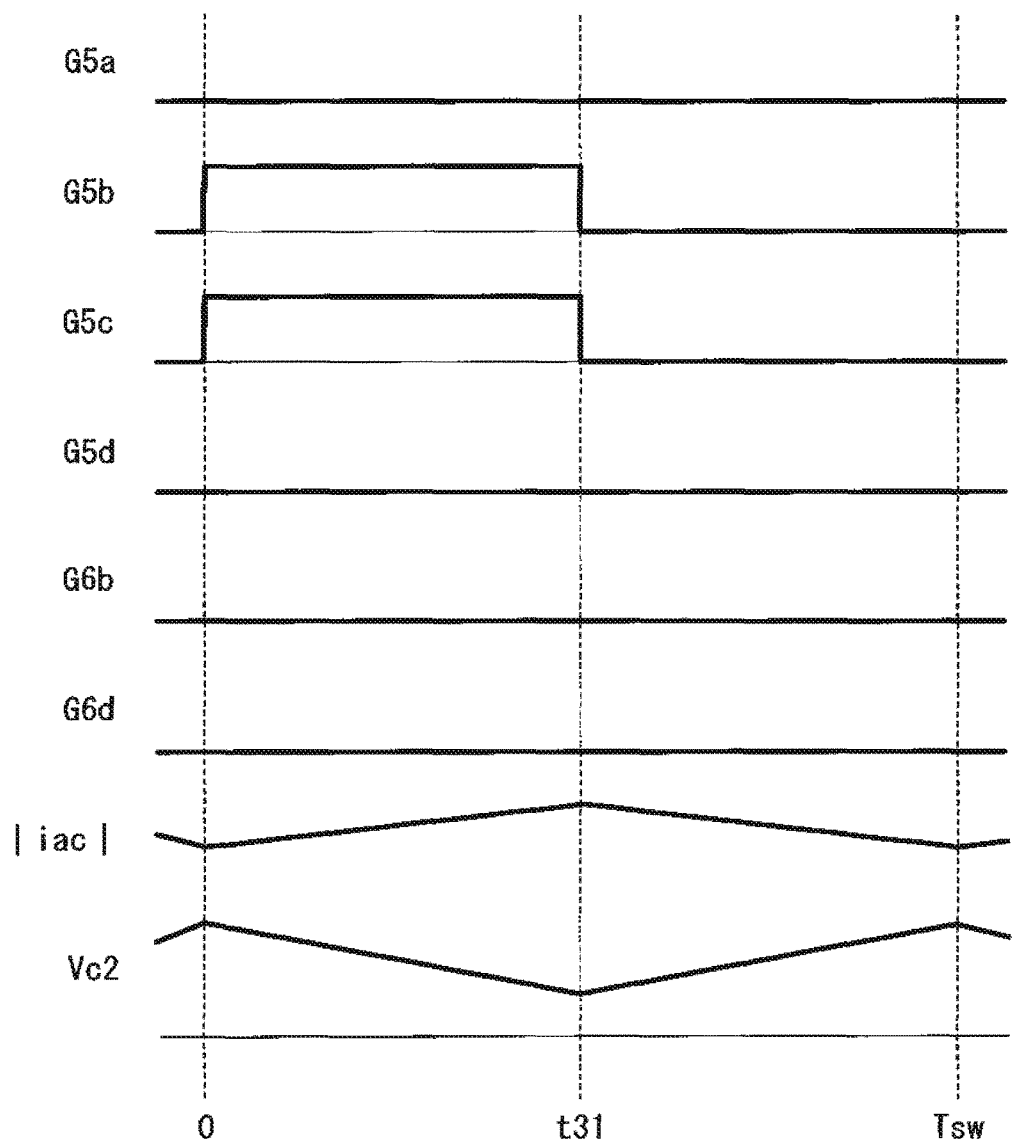
FIG. 14 is a waveform schematic diagram showing the operation state in an area 3 in the positive half wave of the AC power supply 1, in the power conversion device according to embodiment 1 of the present invention.

Next, FIG. 14 shows a schematic diagram of operation during one switching cycle Tsw, in the area 3 in a positive half wave of the AC power supply 1. Here, one switching cycle Tsw is divided into two periods and driving is performed by high-frequency PWM.

Figure 15:
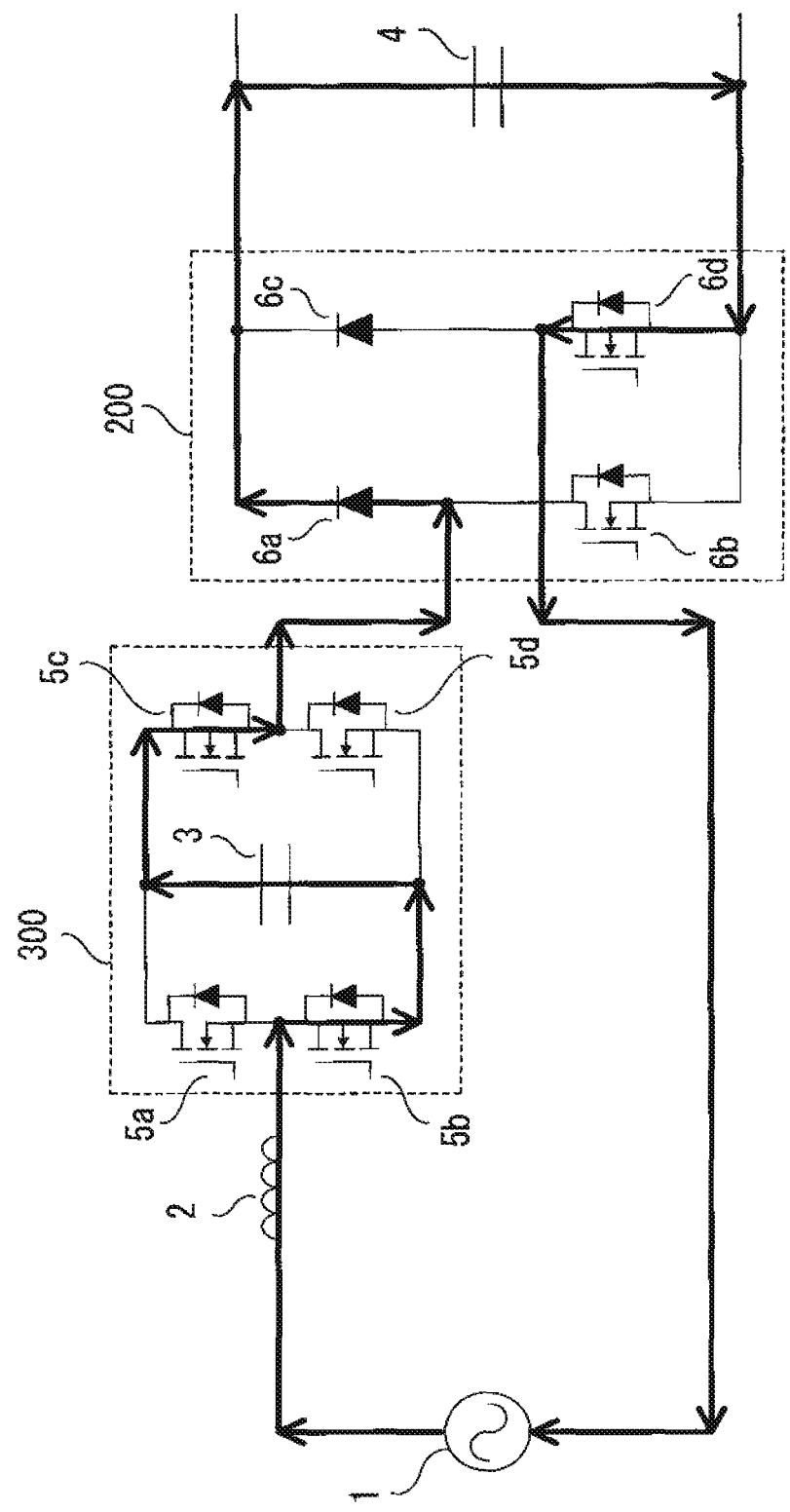
FIG. 15 is a diagram showing a current route in a first period in FIG. 14.

In the first period of 0<t≤t31, the switch elements 5b, 5c are ON and current |iac| of the AC power supply 1 increases. The current at this time flows through a route shown in FIG. 15. The route is as follows: AC power supply 1→reactor 2→switch element 5b→DC capacitor 3→switch element 5c→diode 6a→smoothing capacitor 4→switch element 6d→AC power supply 1. During this period, current flows through the DC capacitor 3 in a discharging direction, and therefore voltage Vc2 decreases. The current change amount Δiac31 during this period is represented by the following Expression (17) and becomes a positive value.

$$\Delta iac31 = ((|vac| + Vc2 - Vc1)/L) \cdot t31 \qquad (17)$$

Figure 16:
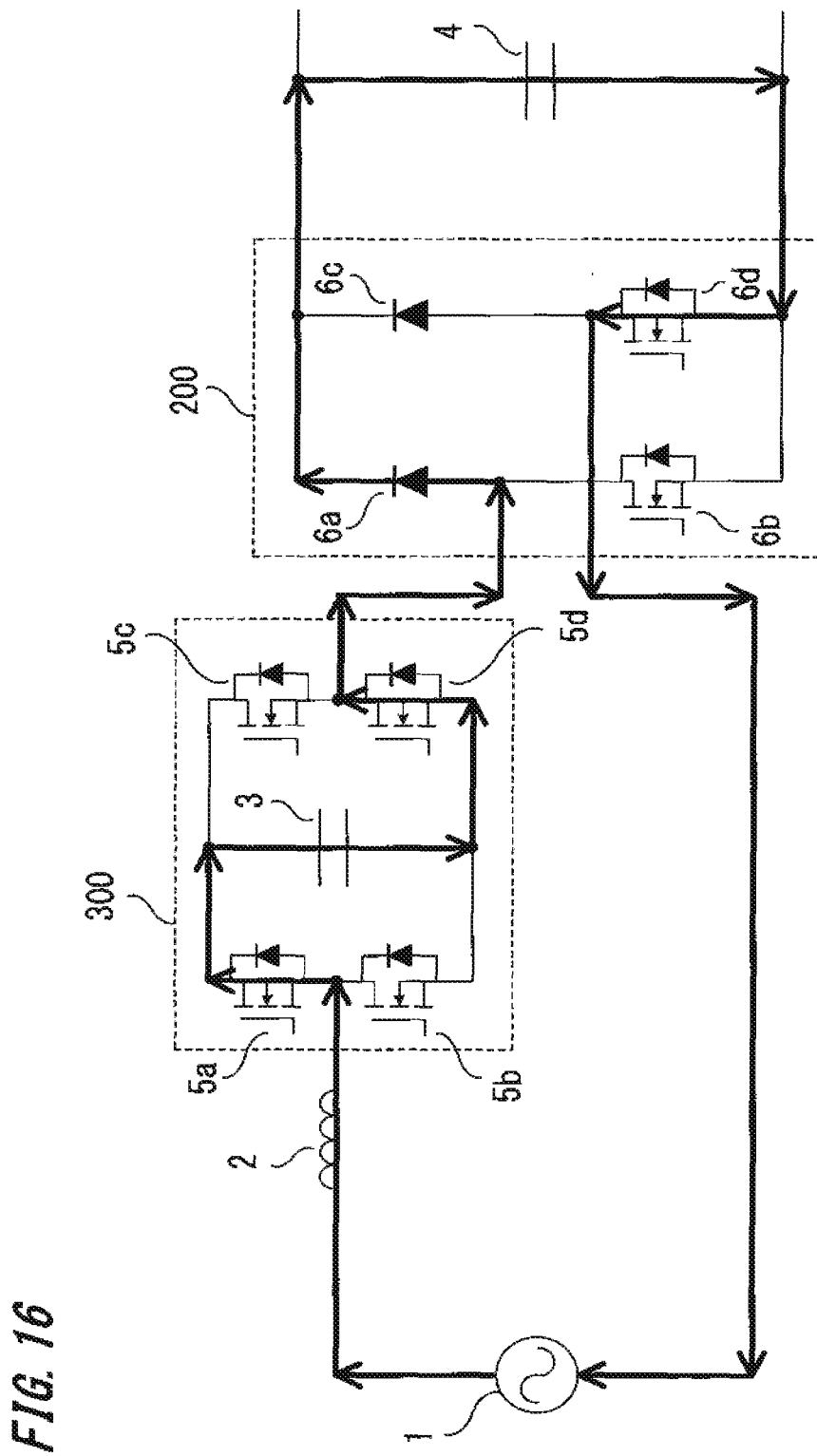
FIG. 16 is a diagram showing a current route in a second period in FIG. 14.

In the second period of t31<t≤Tsw, all the switch elements are OFF and current |iac| of the AC power supply 1 decreases. The current at this time flows through a route shown in FIG. 16. The route is as follows: AC power supply 1→reactor 2→switch element 5a→DC capacitor 3→switch element 5d→diode 6a→smoothing capacitor 4→switch element 6d→AC power supply 1. During this period, current flows through the DC capacitor 3 in a charging direction, and therefore voltage Vc2 increases. A current change amount Δiac32 during this period is represented by the following Expression (18) and becomes a negative value.

$$\Delta iac32 = ((|vac| - Vc2 - Vc1)/L) \cdot (Tsw - t31) \qquad (18)$$

At this time, under the assumption of Δiac31=−Δiac32, a theoretical duty D31 which is a ratio of a period from 0 to t31 with respect to a period from 0 to Tsw is represented by Expression (19), and a theoretical duty D32 which is a ratio of a period from t31 to t32 with respect to the period from 0 to Tsw is represented by Expression (20).

$$D31 = (Vc1 + Vc2 - |vac|)/2Vc2 \qquad (19)$$

$$D32 = 1 - D31 \qquad (20)$$

Next, driving methods and current routes in the areas 1 to 3 in the negative half wave will be described.

Figure 17:
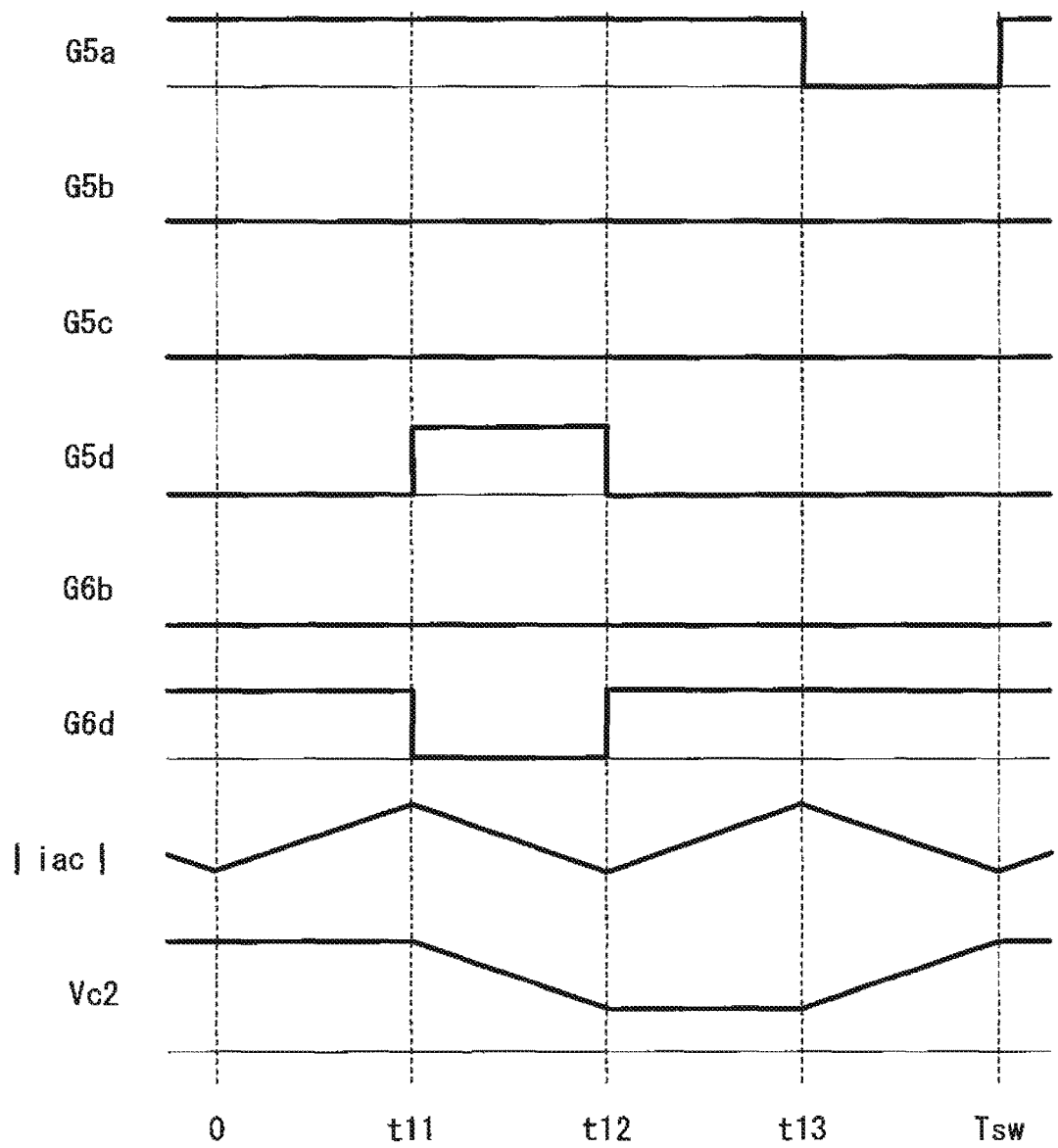
FIG. 17 is a waveform schematic diagram showing the operation state in an area 1 in the negative half wave of the AC power supply 1, in the power conversion device according to embodiment 1 of the present invention.

FIG. 17 shows a schematic diagram of operation during a one switching cycle Tsw, in the area 1 in the negative half wave of the AC power supply 1. One switching cycle Tsw is divided into four periods and driving is performed by high-frequency PWM.

Figure 18:
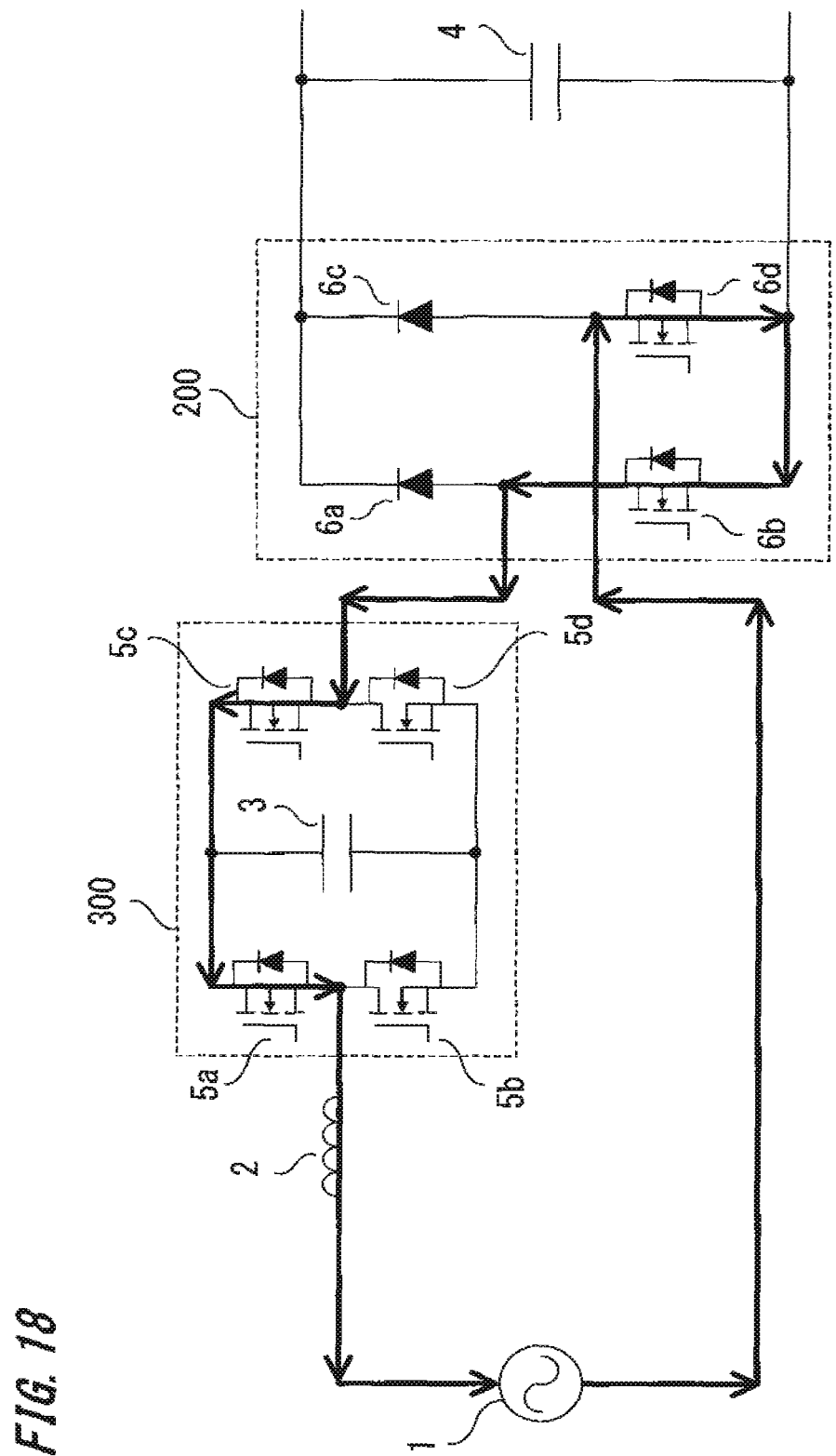
FIG. 18 is a diagram showing a current route in a first period in FIG. 17.

In the first period of 0<t≤t11, the switch elements 5a, 6d are ON and current |iac| of the AC power supply 1 increases. The current at this time flows through a route shown in FIG. 18. The route is as follows: AC power supply 1→switch element 6d→switch element 6b→switch element 5c→switch element 5a→reactor→AC power supply 1. During this period, current does not flow through the DC capacitor 3, and therefore voltage Vc2 is constant. A current change amount Δiac11 during this period is represented by the following Expression (21) and becomes a positive value.

$$\Delta iac11 = (|vac|/L) \cdot t11 \qquad (21)$$

Figure 19:
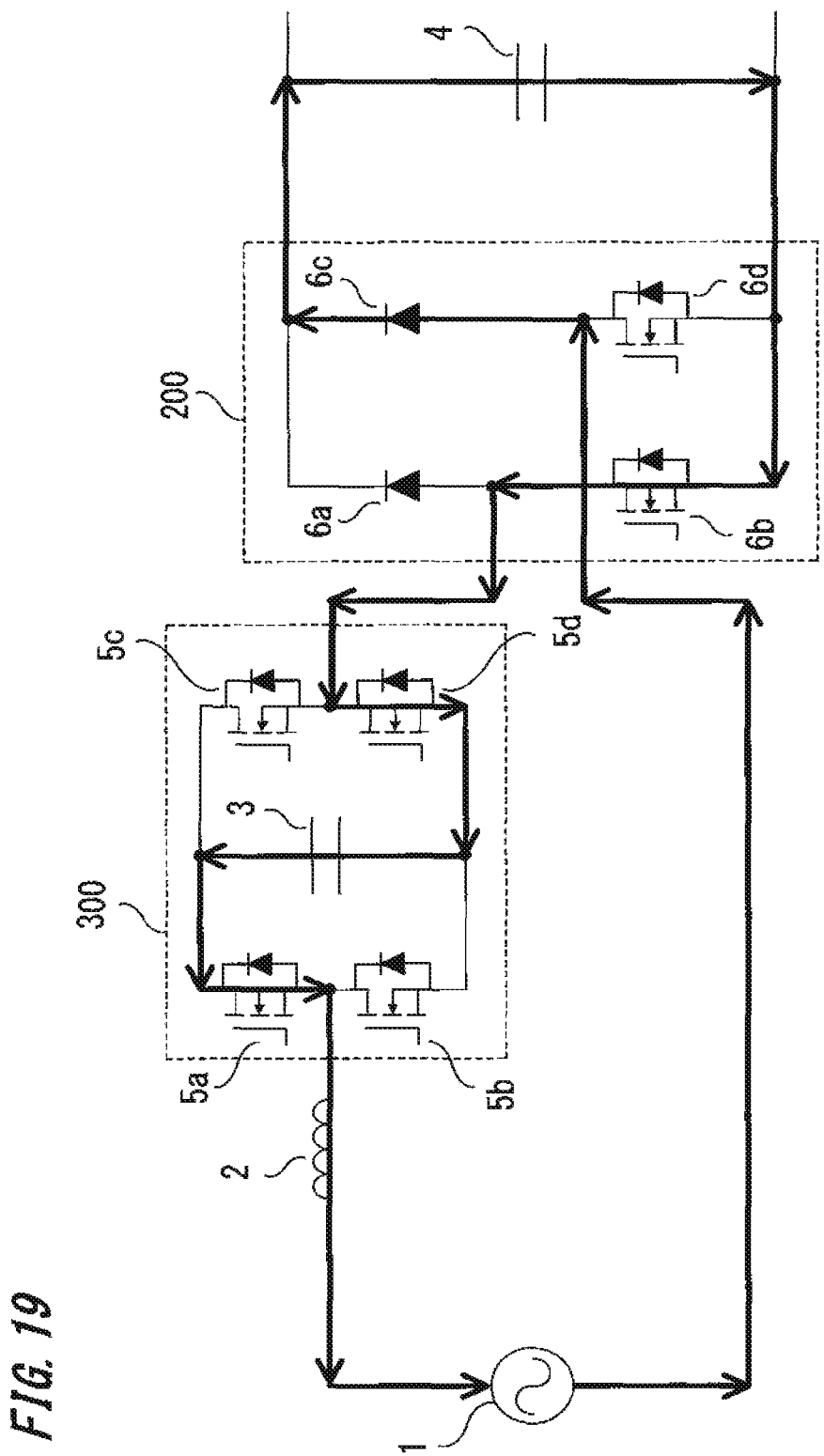
FIG. 19 is a diagram showing a current route in a second period in FIG. 17.

In the second period of t11<t≤t12, the switch elements 5a, 5d are ON and current |iac| of the AC power supply 1 decreases. The current at this time flows through a route shown in FIG. 19. The route is as follows: AC power supply 1→diode 6c→smoothing capacitor 4→switch element 6b→switch element 5d→DC capacitor 3→switch element 5a→reactor 2. During this period, current flows through the DC capacitor 3 in a discharging direction, so that voltage Vc2 decreases. A current change amount Δiac12 during this period is represented by the following Expression (22) and becomes a negative value.

$$\Delta iac12=((|vac|+Vc2-Vc1)/L)\cdot(t12-t11) \quad (22)$$

Figure 20:
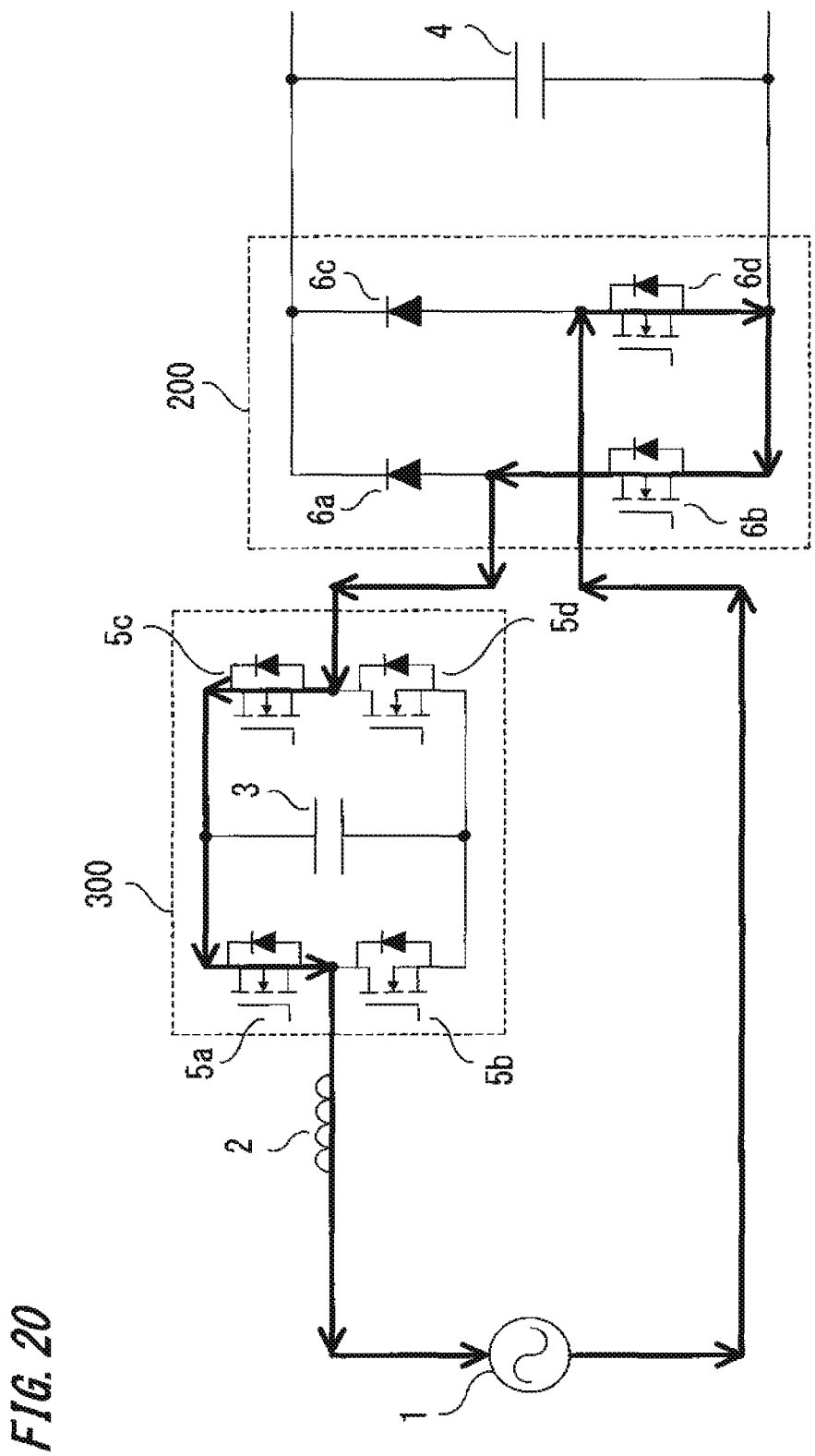
FIG. 20 is a diagram showing a current route in a third period in FIG. 17.

In the third period of t12<t≤t13, the switch elements 5a, 6d are ON and current |iac| of the AC power supply 1 increases. The current at this time flows through a route shown in FIG. 20. The route is as follows: AC power supply 1→switch element 6d→switch element 6b→switch element 5c→switch element 5a→reactor 2→AC power supply 1. During this period, current does not flow through the DC capacitor 3, and therefore voltage Vc2 is constant. A current change amount Δiac13 during this period is represented by the following Expression (23) and becomes a positive value.

$$\Delta iac13=(|vac|/L)\cdot(t13-t12) \quad (23)$$

Figure 21:
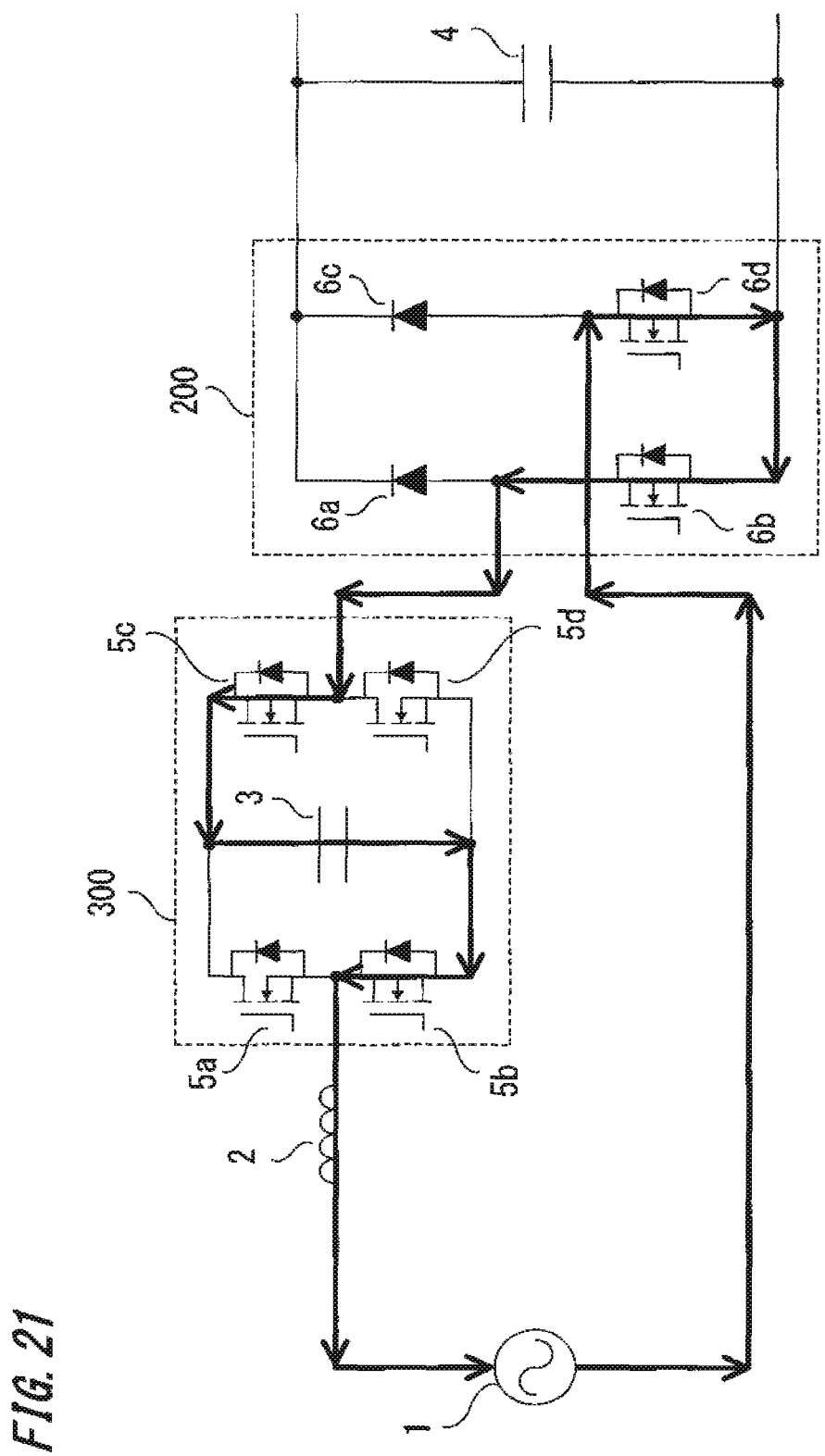
FIG. 21 is a diagram showing a current route in a fourth period in FIG. 17.

In the fourth period of t13<t≤Tsw, the switch element 6d is ON and current |iac| of the AC power supply 1 decreases. The current at this time flows through a route shown in FIG. 21. The route is as follows: AC power supply 1→switch element 6d→switch element 6b→switch element 5c→DC capacitor 3→switch element 5b→reactor 2→AC power supply 1. During this period, current flows through the DC capacitor 3 in a charging direction, so that voltage Vc2 increases. A current change amount Δiac14 during this period is represented by the following Expression (24) and becomes a negative value.

$$\Delta iac14=((|vac|-Vc2)/L)\cdot(Tsw-t13) \quad (24)$$

At this time, under the assumption of Δiac11=−Δiac12, a theoretical duty D11 which is a ratio of a period from 0 to t11 with respect to a period from 0 to t12 is represented by Expression (25), and a theoretical duty D12 which is a ratio of a period from t11 to t12 with respect to the period from 0 to t12 is represented by Expression (26).

$$D11=(Vc1-|vac|-Vc2)/(Vc1-Vc2) \quad (25)$$

$$D12=1-D11 \quad \text{Expression (26)}$$

In addition, under the assumption of Δiac13=−Δiac14, a theoretical duty D13 which is a ratio of a period from t12 to t13 with respect to a period from t12 to Tsw is represented by Expression (27), and a theoretical duty D14 which is a ratio of a period from t13 to Tsw with respect to the period from t12 to Tsw is represented by Expression (28).

$$D13=(Vc2-|vac|)/Vc2 \quad (27)$$

$$D14=1-D13 \quad (28)$$

Figure 22:
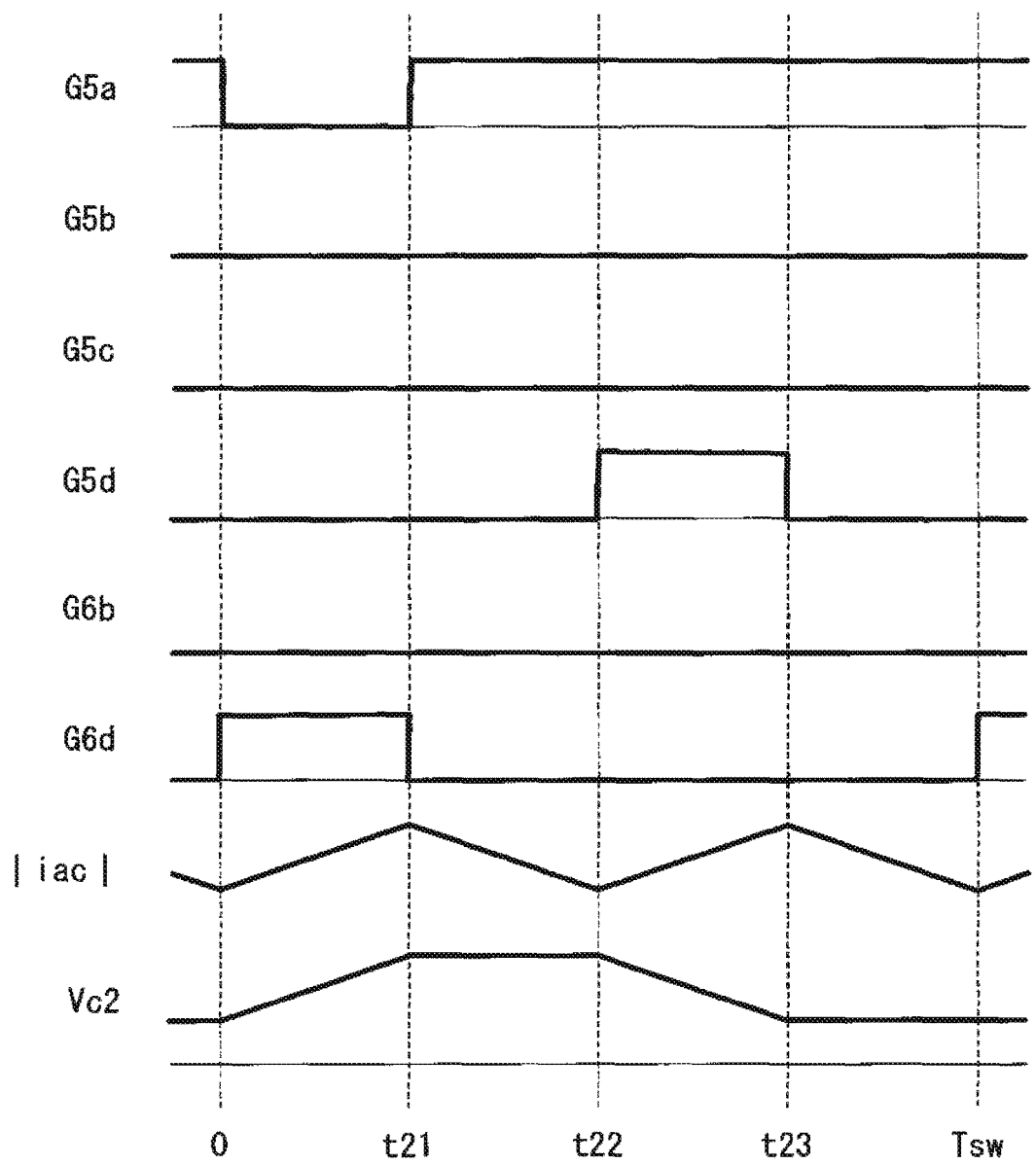
FIG. 22 is a waveform schematic diagram showing the operation state in an area 2 in the negative half wave of the AC power supply 1, in the power conversion device according to embodiment 1 of the present invention.

Next, FIG. 22 shows a schematic diagram of operation during one switching cycle Tsw, in the area 2 in the negative half wave of the AC power supply 1. One switching cycle Tsw is divided into four periods and driving is performed by high-frequency PWM.

Figure 23:
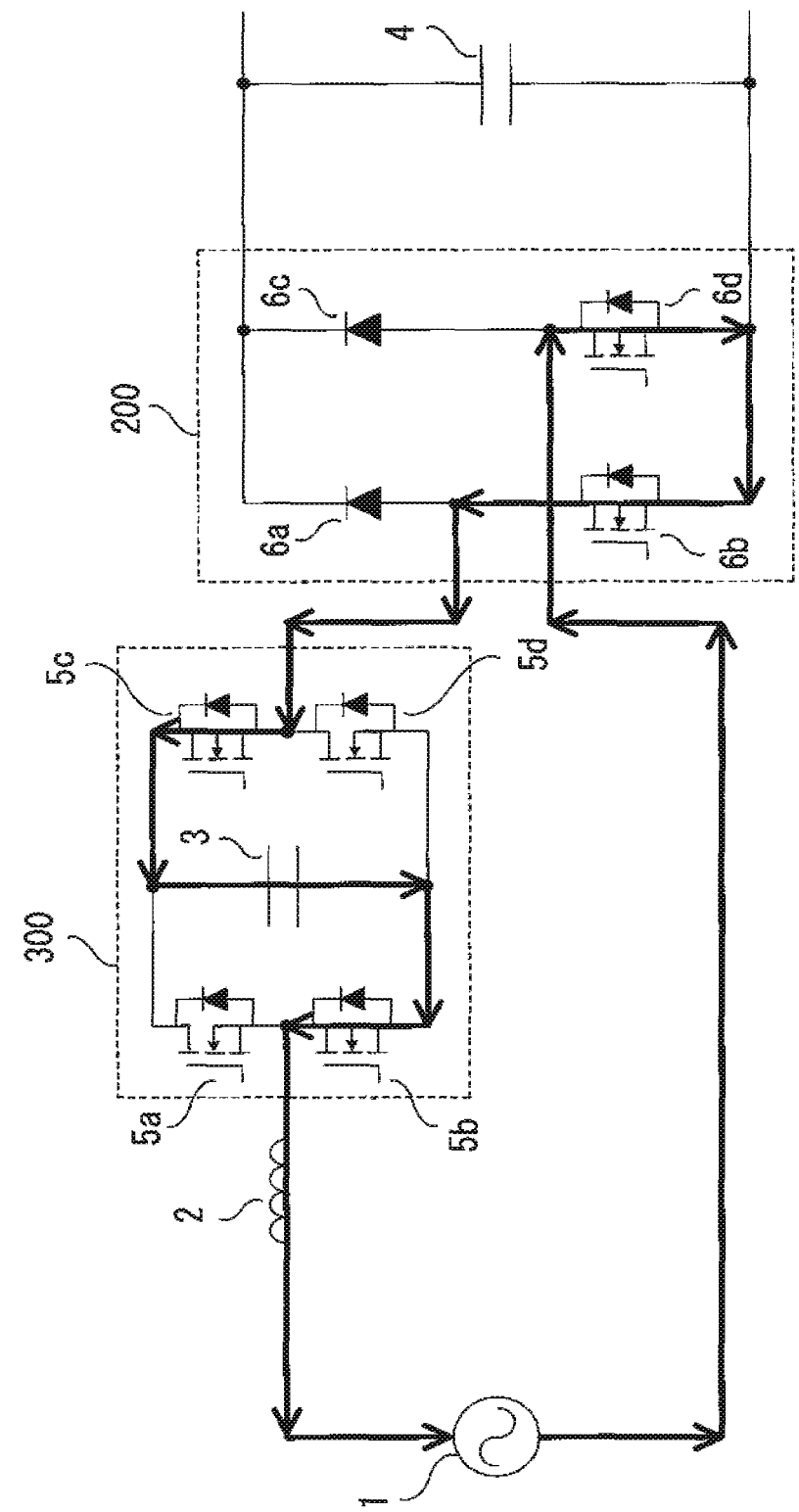
FIG. 23 is a diagram showing a current route in a first period in FIG. 22.

In the first period of 0<t≤t21, the switch element 6d is ON and current |iac| of the AC power supply 1 increases. The current at this time flows through a route shown in FIG. 23. The route is as follows: AC power supply 1→switch element 6d→switch element 6b→switch element 5c→DC capacitor 3→switch element 5b→reactor 2→AC power supply 1. During this period, current flows through the DC capacitor 3 in a charging direction, and therefore voltage Vc2 increases. A current change amount Δiac21 during this period is represented by the following Expression (29) and becomes a positive value.

$$\Delta iac21=((|vac|-Vc2)/L)\cdot t21 \quad (29)$$

Figure 24:
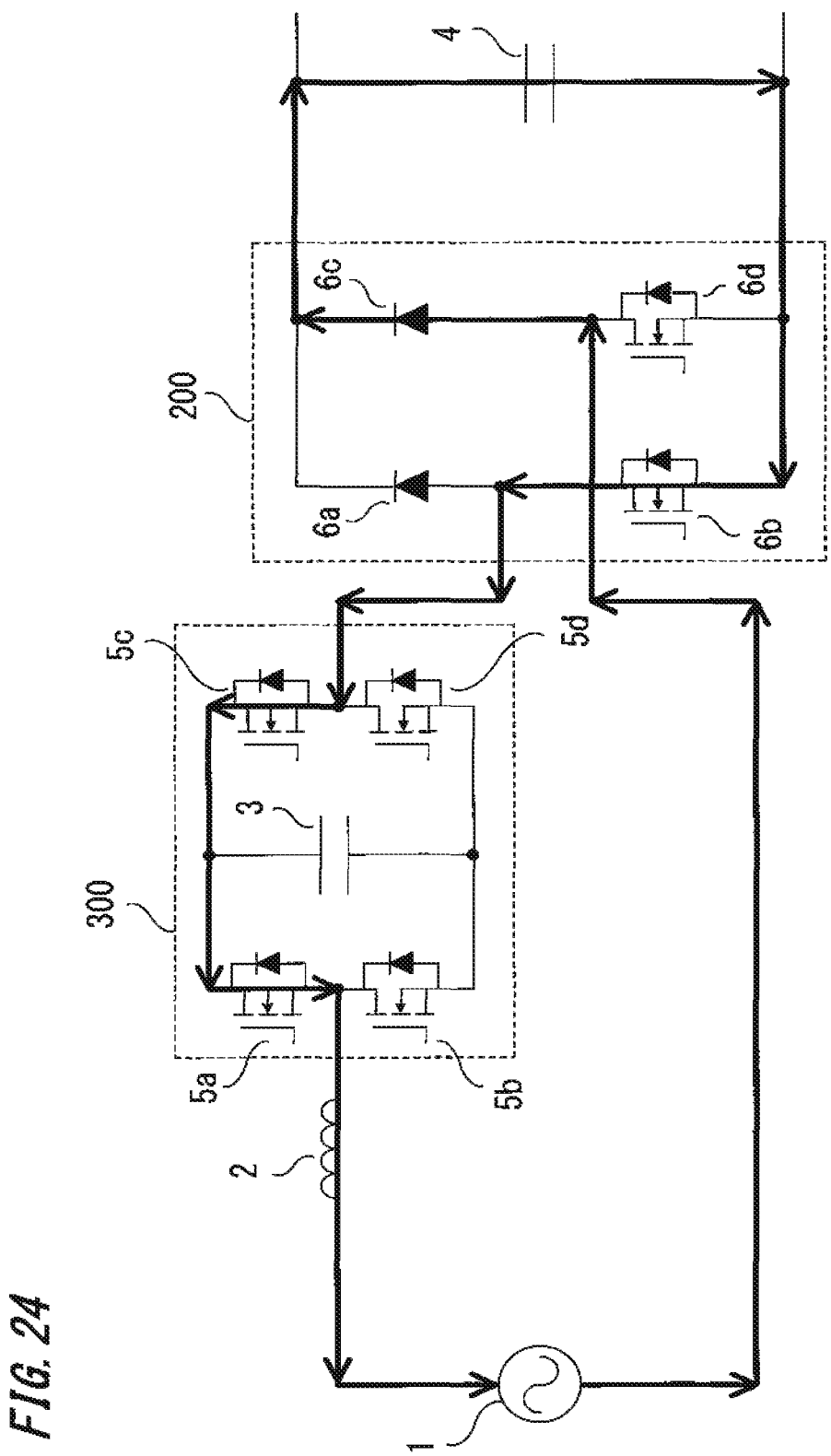
FIG. 24 is a diagram showing a current route in a second period in FIG. 22.

In the second period of t21<t≤t22, the switch element 5a is ON and current |iac| of the AC power supply 1 decreases. The current at this time flows through a route shown in FIG. 24. The route is as follows: AC power supply 1→diode 6c→smoothing capacitor 4→switch element 6b→switch element 5c→switch element 5a→reactor 2→AC power supply 1. During this period, current does not flow through the DC capacitor 3, and therefore voltage Vc2 is constant. A current change amount Δiac22 during this period is represented by the following Expression (30) and becomes a negative value.

$$\Delta iac22=((|vac|-Vc1)/L)\cdot(t22-t21) \quad (30)$$

Figure 25:
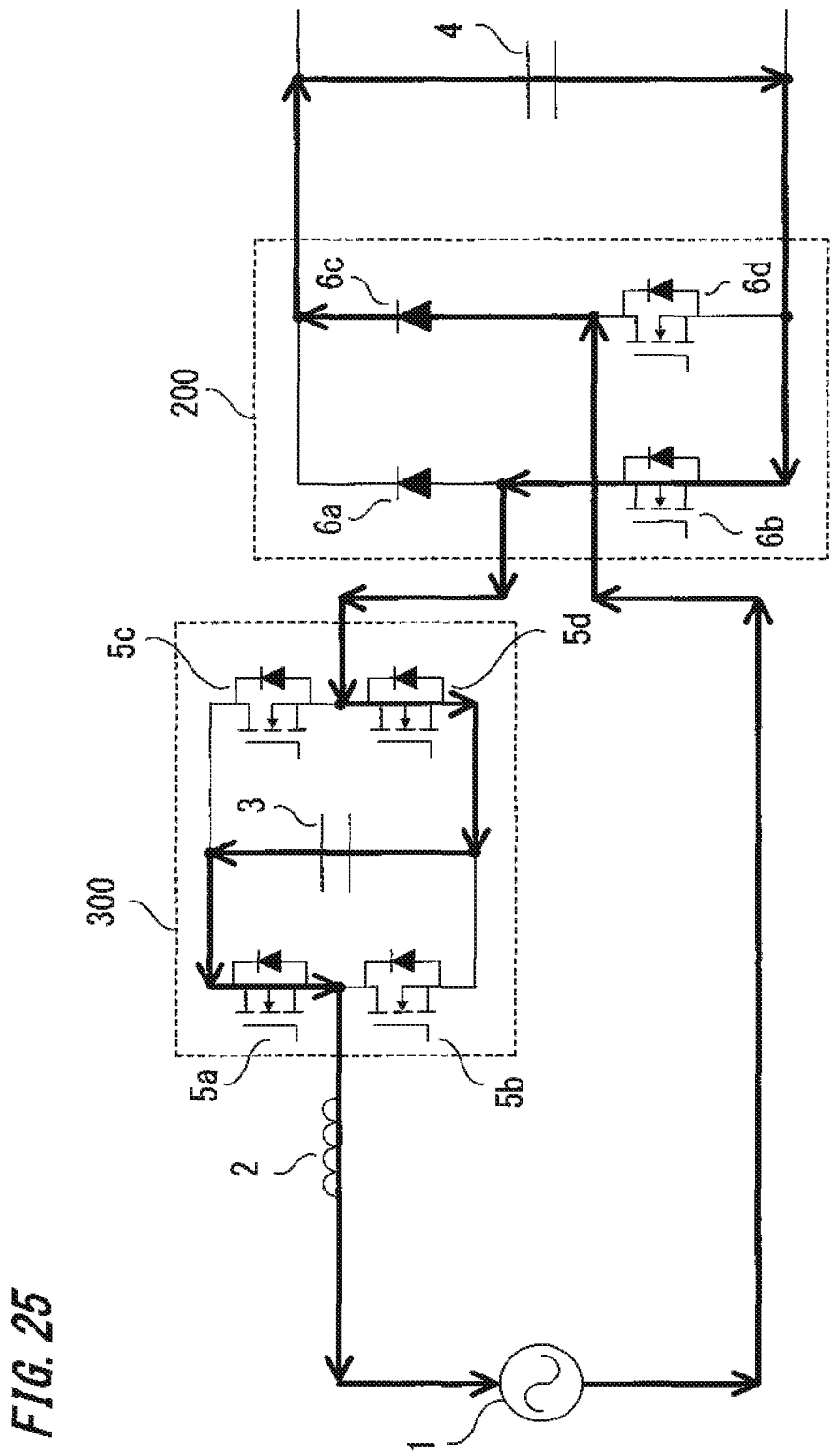
FIG. 25 is a diagram showing a current route in a third period in FIG. 22.

In the third period of t22<t≤t23, the switch elements 5a, 5d are ON and current |iac| of the AC power supply 1 increases. The current at this time flows through a route shown in FIG. 25. The route is as follows: AC power supply 1→diode 6c→smoothing capacitor 4→switch element 6b→switch element 5d→DC capacitor 3→switch element 5a→reactor 2→AC power supply 1. During this period, current flows through the DC capacitor 3 in a discharging direction, and therefore voltage Vc2 decreases. A current change amount Δiac23 during this period is represented by the following Expression (31) and becomes a positive value.

$$\Delta iac23=((|vac|-Vc2-Vc1)/L)\cdot(t23-t22) \quad (31)$$

Figure 26:
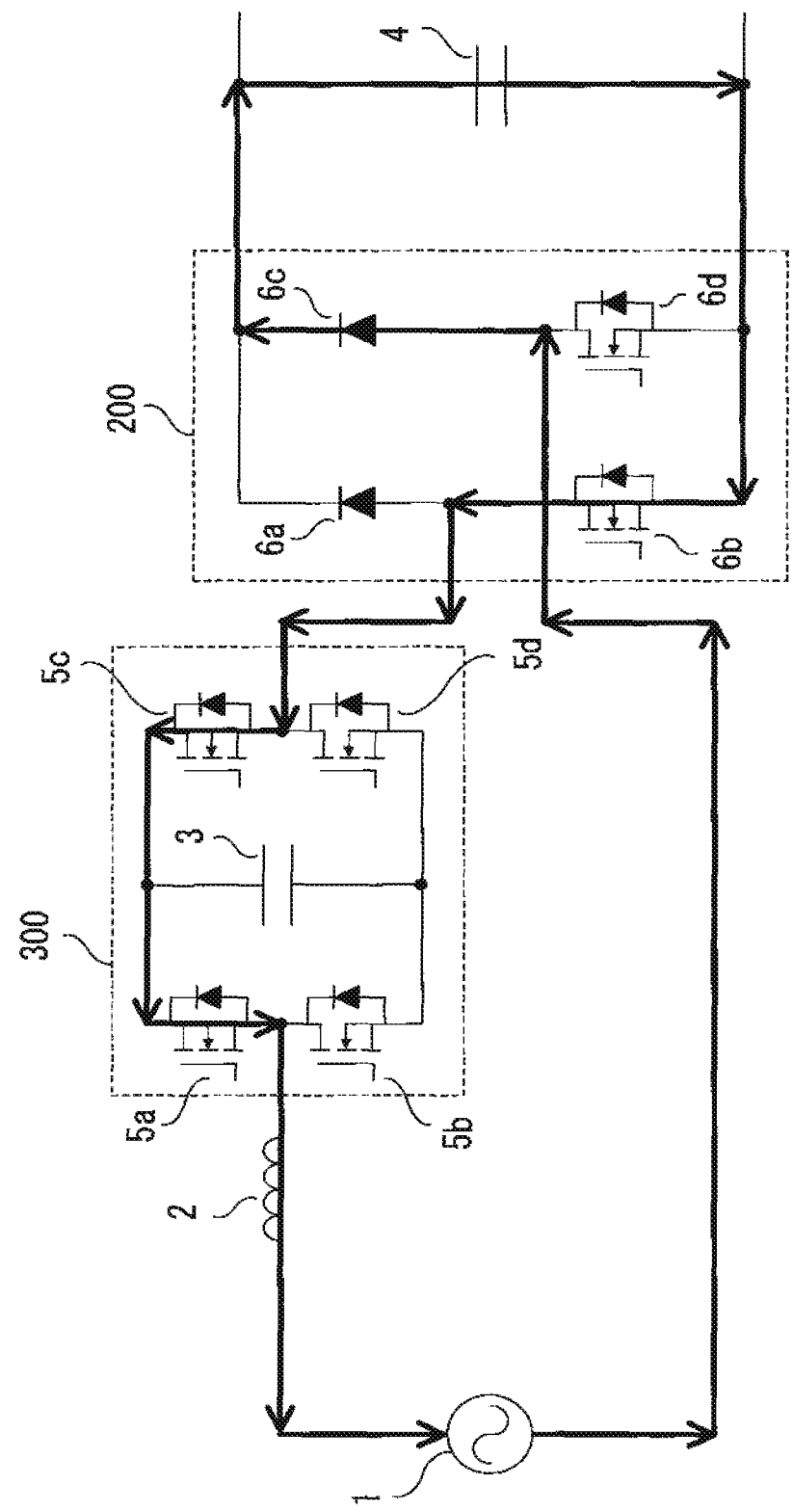
FIG. 26 is a diagram showing a current route in a fourth period in FIG. 22.

In the fourth period of t23<t≤Tsw, the switch element 5a is ON and current |iac| of the AC power supply 1 decreases. The current at this time flows through a route shown in FIG. 26. The route is as follows: AC power supply 1→diode 6c→smoothing capacitor 4→switch element 6b→switch element 5c→switch element 5a→reactor 2→AC power supply 1. During this period, current does not flow through the DC capacitor 3, and therefore voltage Vc2 is constant. A current change amount Δiac22 during this period is represented by the following Expression (32) and becomes a negative value.

$$\Delta iac24=((|vac|-Vc1)/L)\cdot(Tsw-t23) \quad (32)$$

At this time, under the assumption of Δiac21=−Δiac22, a theoretical duty D21 which is a ratio of a period from 0 to t21 with respect to a period from 0 to t22 is represented by Expression (33), and a theoretical duty D22 which is a ratio of a period from t21 to t22 with respect to the period from 0 to t22 is represented by Expression (34).

$$D21=(Vc1-|vac|)/(Vc1-Vc2) \quad (33)$$

$$D22=1-D21 \quad (34)$$

In addition, under the assumption of Δiac23=−Δiac24, a theoretical duty D23 which is a ratio of a period from t22 to t23 with respect to a period from t22 to Tsw is represented by Expression (35), and a theoretical duty D24 which is a ratio of a period from t23 to Tsw with respect to the period from t22 to Tsw is represented by Expression (36).

$$D23=(Vc1-|vac|)/Vc2 \quad (35)$$

$$D24=1-D23 \quad (36)$$

Figure 27:
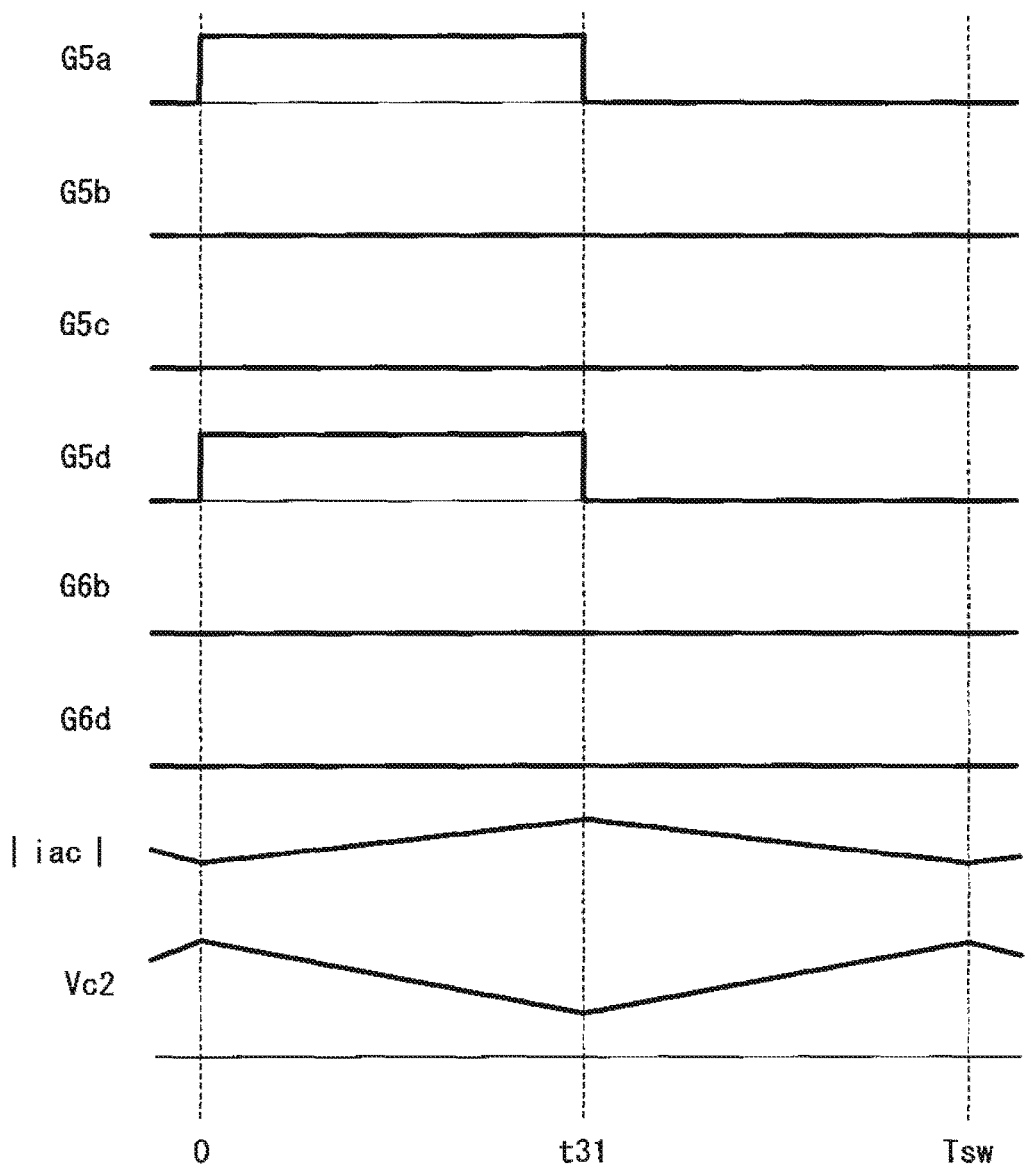
FIG. 27 is a waveform schematic diagram showing the operation state in an area 3 in the negative half wave of the AC power supply 1, in the power conversion device according to embodiment 1 of the present invention.

FIG. 27 shows a schematic diagram of operation during one switching cycle Tsw, in the area 3 in the negative half wave of the AC power supply 1. One switching cycle Tsw is divided into two periods and driving is performed by high-frequency PWM.

Figure 28:
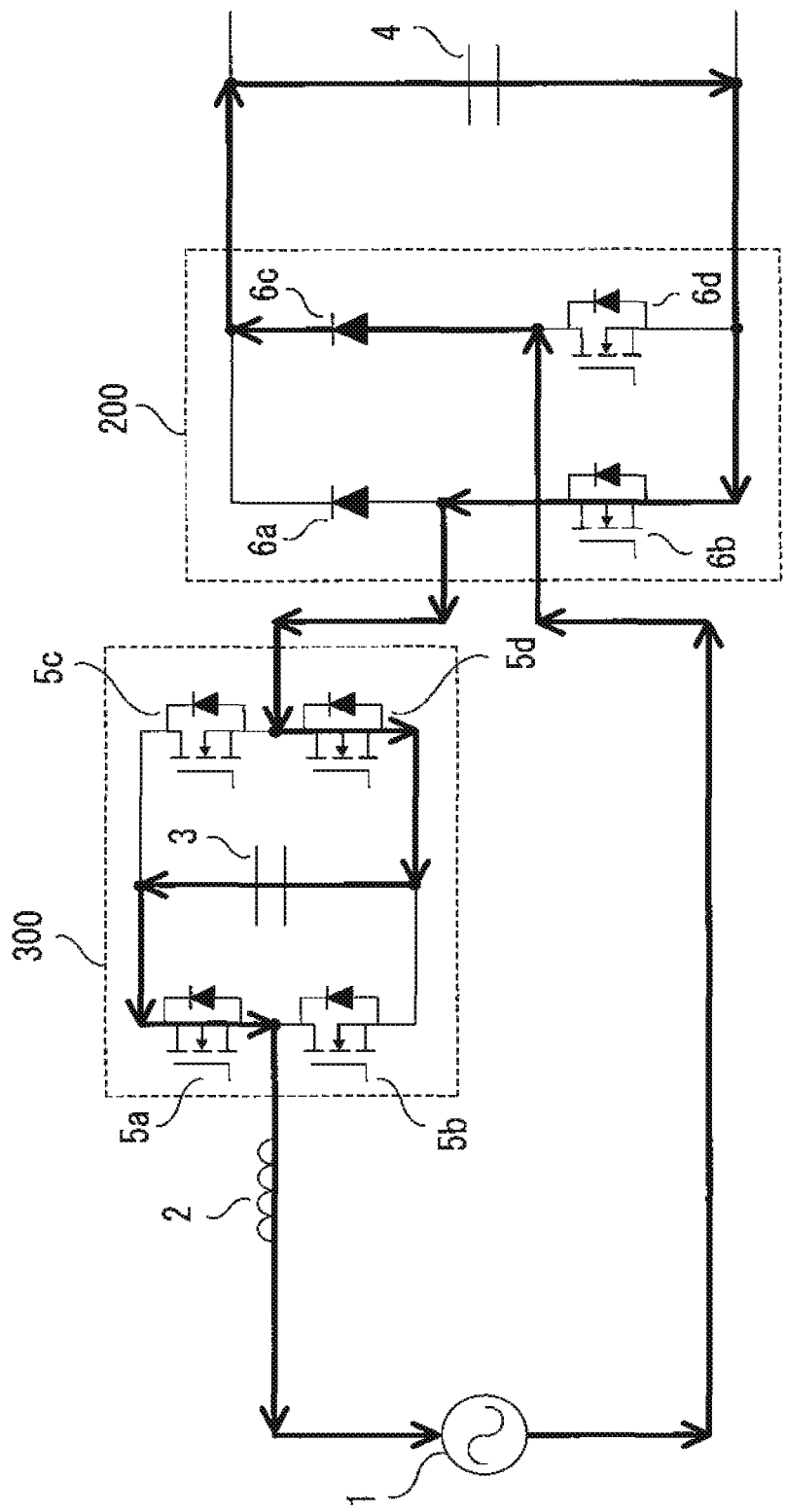
FIG. 28 is a diagram showing a current route in a first period in FIG. 27.

In the first period of 0<t≤t31, the switch elements 5a, 5d are ON and current |iac| of the AC power supply 1 increases. The current at this time flows through a route shown in FIG. 28. The route is as follows: AC power supply 1→diode 6c→smoothing capacitor 4→switch element 6b→switch element 5d→DC capacitor 3→switch element 5a→reactor 2→AC power supply 1. During this period, current flows through the DC capacitor 3 in a discharging direction, and therefore voltage Vc2 decreases. A current change amount Δiac31 during this period is represented by the following Expression (37) and becomes a positive value.

$$\Delta iac31=((|vac|+Vc2-Vc1)/L)\cdot t31 \quad (37)$$

Figure 29:
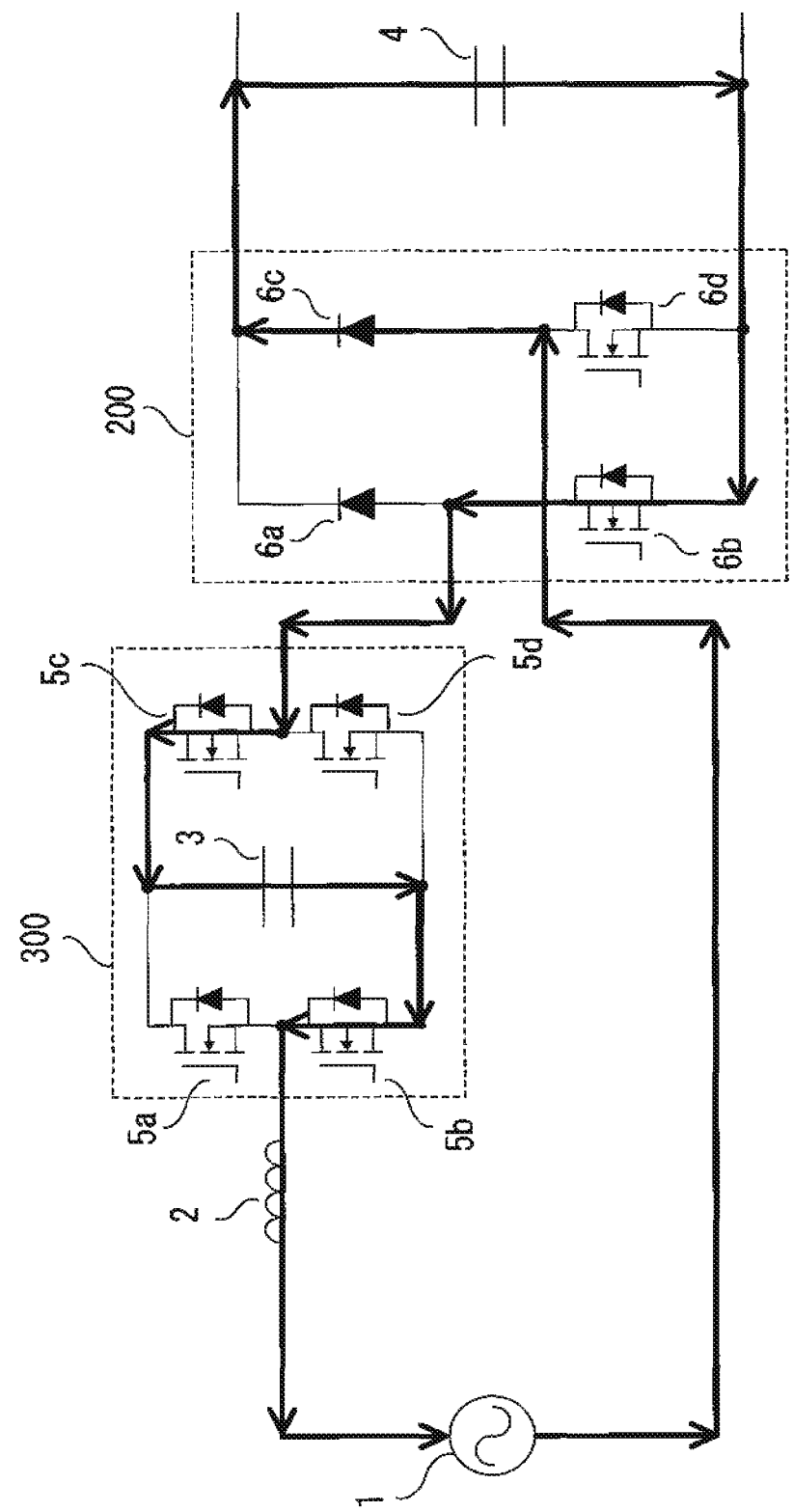
FIG. 29 is a diagram showing a current route in a second period in FIG. 27.

In the second period of t32<t≤Tsw, all the elements are OFF and current |iac| of the AC power supply 1 decreases. The current at this time flows through a route shown in FIG. 29. The route is as follows: AC power supply 1→diode 6c→smoothing capacitor 4→switch element 6b→switch element 5c→DC capacitor 3→switch element 5b→reactor 2→AC power supply 1. During this period, current flows through the DC capacitor 3 in a charging direction, and therefore voltage Vc2 increases. A current change amount Δiac32 during this period is represented by the following Expression (38) and becomes a negative value.

$$\Delta iac32=((|vac|-Vc2-Vc1)/L)\cdot(Tsw-t31) \quad (38)$$

At this time, under the assumption of Δiac31=−Δiac32, a theoretical duty D31 which is a ratio of a period from 0 to t31 with respect to a period from 0 to Tsw is represented by Expression (39), and a theoretical duty D32 which is a ratio of a period from t31 to t32 with respect to the period from 0 to Tsw is represented by Expression (40).

$$D31=(Vc1+Vc2-|vac|)/2Vc2 \quad (39)$$

$$D32=1-D31 \quad (40)$$

As shown above, in the area 1, the theoretical duties D11 to D14 for the positive half wave represented by Expressions (5) to (8), and the theoretical duties D11 to D14 for the negative half wave represented by Expressions (25) to (28), are calculated by the same calculation expression.

Similarly, in the area 2, the theoretical duties D21 to D24 for the positive half wave represented by Expressions (13) to (16), and the theoretical duties D21 to D24 for the negative half wave represented by Expressions (33) to (36), are calculated by the same calculation expression.

Similarly, in the area 3, the theoretical duties D31, D32 for the positive half wave represented by Expressions (19) and (20), and the theoretical duties D31, D32 for the negative half wave represented by Expressions (39) and (40), are calculated by the same calculation expression.

By satisfying each relational expression regarding these theoretical duties, in the aforementioned pair of periods in one switching cycle Tsw of the single-phase inverter 300, charging operation and discharging operation of the DC capacitor 3 are performed and the charging amount and the discharging amount thereof become equal to each other.

Here, the frequency of the AC power supply 1 is 50 to 60 Hz, whereas the switching frequency of the single-phase inverter 300 is generally 10 kHz or higher. Therefore, from the above, irrespective of a very long cycle of the AC power supply 1, charging operation and discharging operation of the DC capacitor 3 are completed within one short switching cycle of the single-phase inverter 300, and thus the charging/discharging amount itself is reduced and ripple voltage is suppressed, whereby the capacitance required for the DC capacitor 3 can be greatly reduced.

In addition, as is found from FIG. 4, FIG. 9, etc., in the areas 1, 2, the application voltage frequency of the reactor 2 is twice the switching frequency (1/Tsw) of the single-phase inverter 300, whereby size reduction of the reactor 2 can be achieved.

Next, the configuration and the operation of the control unit 100 serving to generate gate signals for driving the switch elements to perform switching, in order to actually ensure the relationships of the theoretical duties, will be described with reference to FIG. 30 and the subsequent figures.

Figure 30:
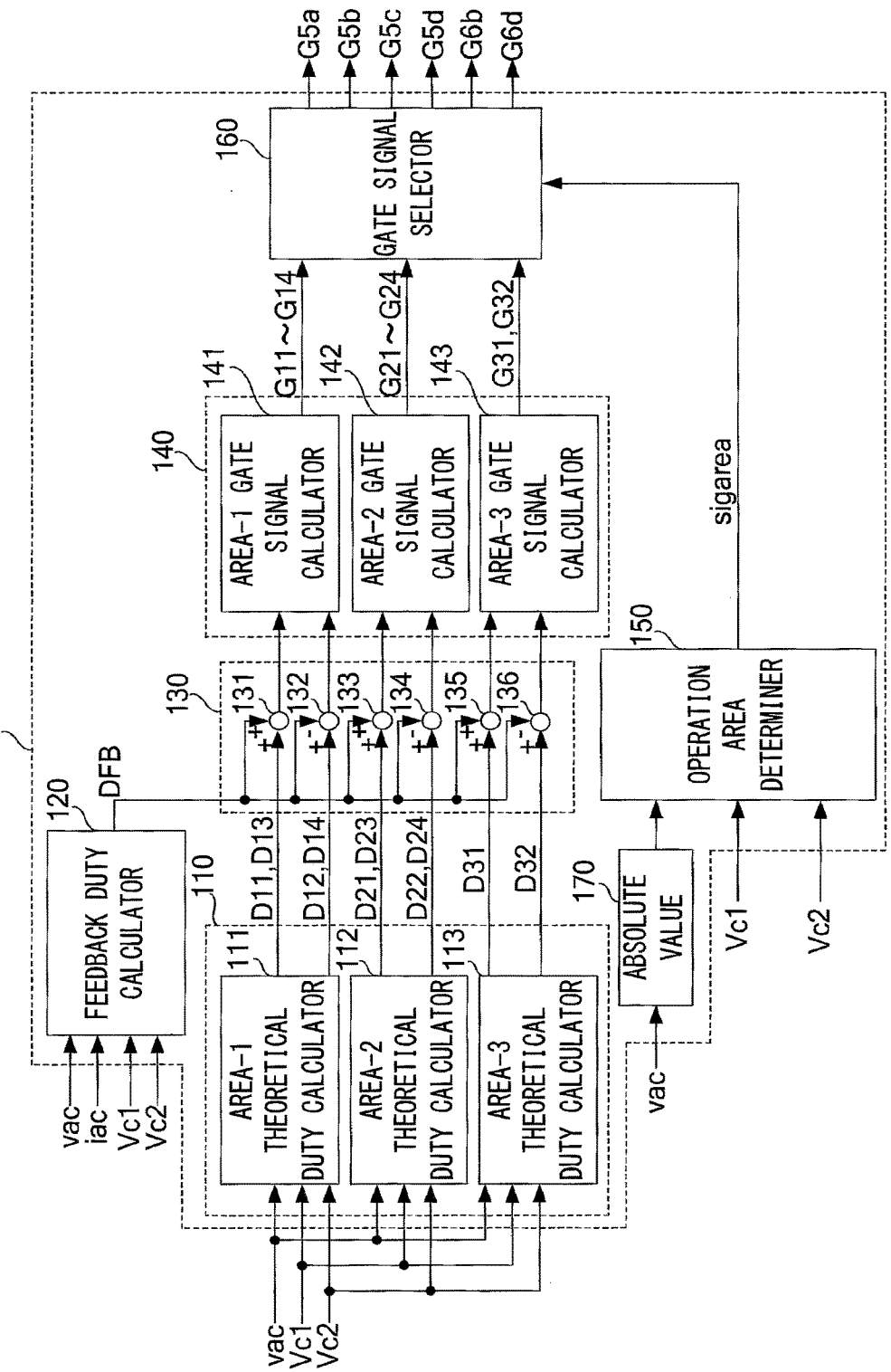
FIG. 30 is a configuration diagram of a control unit 100 in the power conversion device according to embodiment 1 of the present invention.

As shown in FIG. 30, the control unit 100 includes a theoretical duty calculator 110, a feedback duty calculator 120, an adder/subtractor 130, a gate signal calculator 140, an operation area determiner 150, and a gate signal selector 160.

The theoretical duty calculator 110 includes an area-1 theoretical duty calculator 111, an area-2 theoretical duty calculator 112, and an area-3 theoretical duty calculator 113, and calculates theoretical duties using the theoretical expressions in the areas 1 to 3.

The area-1 theoretical duty calculator 111 calculates the theoretical duties D11 to D14 using Expressions (5) to (8) or Expressions (25) to (28). The area-2 theoretical duty calculator 112 calculates the theoretical duties D21 to D24 using Expressions (13) to (16) or Expressions (33) to (36). The area-3 theoretical duty calculator 113 calculates the theoretical duties D31 and D32 using Expressions (19) and (20) or Expressions (39) and (40).

Each theoretical duty is calculated on the basis of: voltage vac of the AC power supply 1 which is a detection value of the AC voltage detection unit 10, or an ideal voltage value vac* of the AC power supply 1; voltage Vc2 of the DC capacitor 3 which is a detection value of the DC capacitor voltage detection unit 12, or a voltage command value vc2* for the DC capacitor 3; and voltage Vc1 of the smoothing capacitor 4 which is a detection value of the DC voltage detection unit 13, or a voltage command value Vc1* for the smoothing capacitor 4. FIG. 30 shows a case of performing the calculation on the basis of the detection values of the respective voltage detection units.

Figure 31:
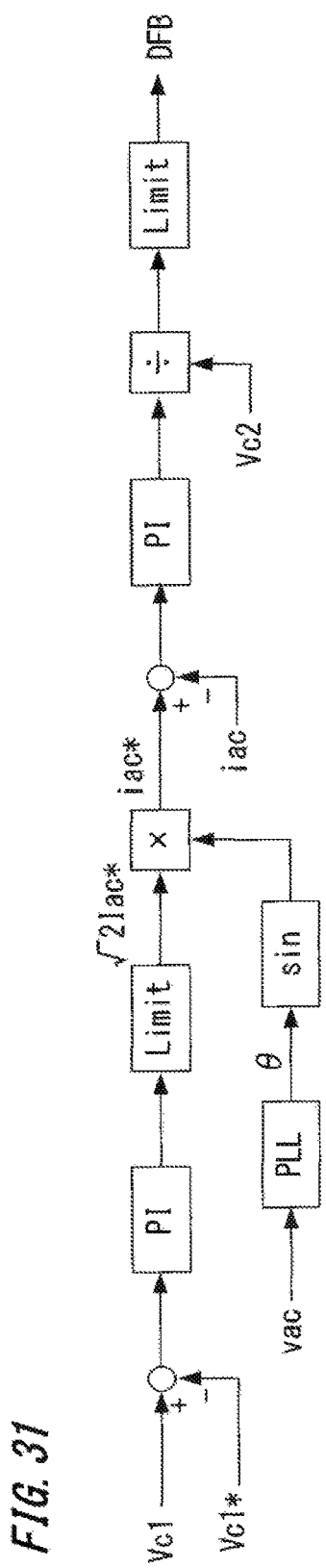
FIG. 31 is a configuration diagram of a feedback duty calculator 120 composing the control unit 100 in FIG. 30.

The feedback duty calculator 120 is configured as shown in FIG. 31. A deviation between the DC voltage detection value Vc1 of the smoothing capacitor 4 and the command value Vc1* therefor is calculated by a subtractor, and then, PI control is performed by a PI controller, and the resultant value is subjected to a limiter, whereby a current amplitude command value √2Iac* for the AC power supply 1 is calculated.

Meanwhile, from the AC voltage detection value vac of the AC power supply 1, a phase θ synchronized with the phase of vac is calculated by PLL (Phase Locked Loop). Then, a sine wave with the phase θ is multiplied with the current amplitude command value √2Iac* for the AC power supply 1, whereby an AC current command value iac* for the AC power supply 1 is calculated.

Then, a deviation between the AC current command value iac* and the AC current detection value iac is subjected to PI control by a PI controller, and the resultant value is divided by Vc2 of the DC capacitor. Then, the resultant value is subjected to a limiter, whereby a feedback duty DFB is obtained.

The adder/subtractor 130 adds or subtracts the feedback duty DFB to or from the calculation results of the theoretical duty calculator 110. Since control is performed in such a direction as to increase current iac of the AC power supply 1 when the DFB increases, the DFB is added to D11, D13, D21, D23, D31 by the adders 131, 133, 135, and the DFB is subtracted from D12, D14, D22, D24, D32 by the subtractors 132, 134, 136. These calculation results are inputted to the gate signal calculator 140.

Figure 32:
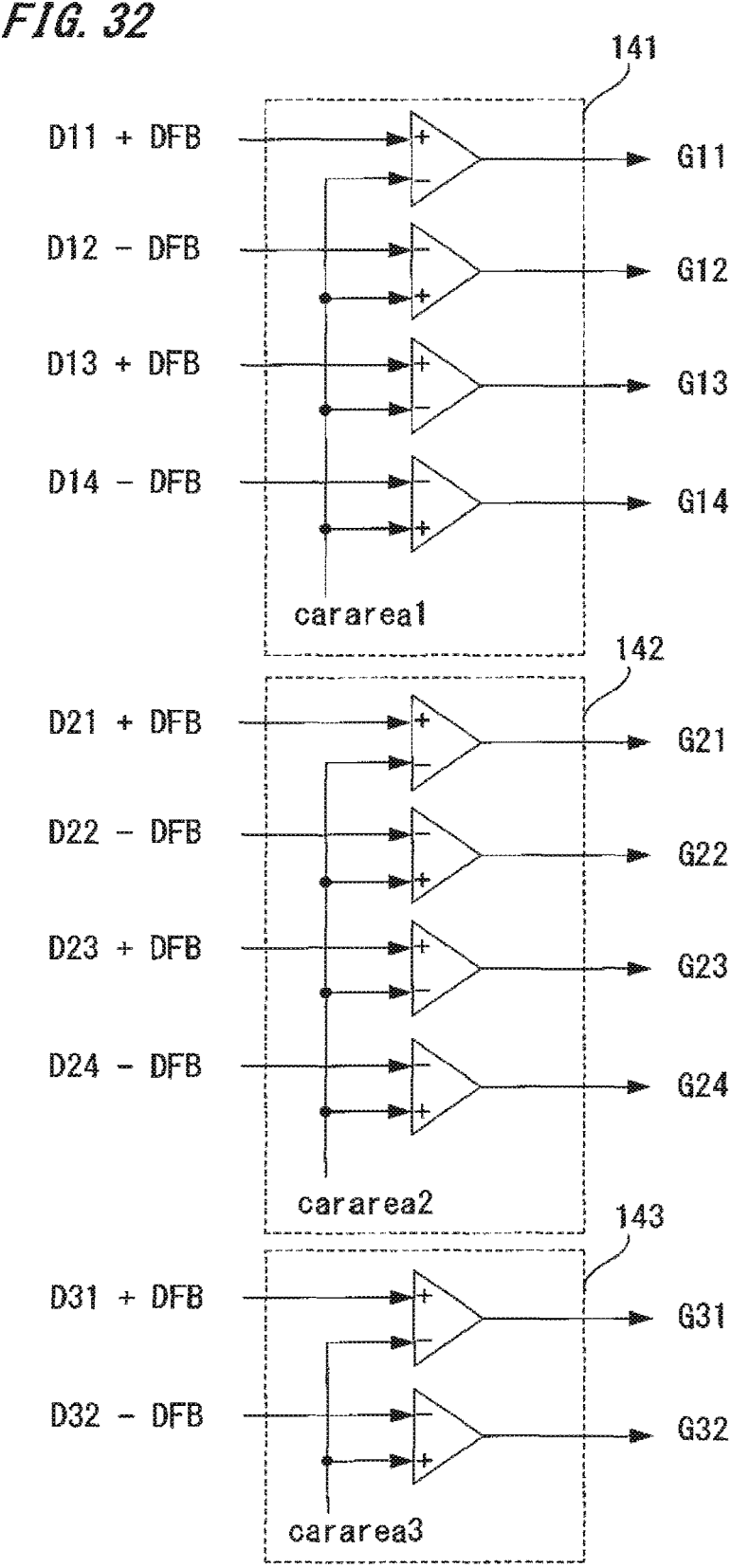
FIG. 32 is a configuration diagram of a gate signal calculator 140 composing the control unit 100 in FIG. 30.

FIG. 32 is a configuration diagram of the gate signal calculator 140. The gate signal calculator 140 includes an area-1 gate signal calculator 141, an area-2 gate signal calculator 142, and an area-3 gate signal calculator 143, and calculates gate signals for each switching cycle, from the inputted duties.

The area-1 gate signal calculator 141 includes four comparators and a carrier signal cararea1, and compares D11+DFB, D12−DFB, D13+DFB, and D14−DFB which are input signals, with the carrier signal cararea1, by the respective comparators, thereby generating a signal G11 for the first period, a signal G12 for the second period, a signal G13 for the third period, and a signal G14 for the fourth period.

The area-2 gate signal calculator 142 includes two comparators and a carrier signal cararea2, and compares D21+DFB, D22−DFB, D23+DFB, and D24−DFB which are input signals, with the carrier signal cararea2, by the respective comparators, thereby generating a signal G21 for the first period, a signal G22 for the second period, a signal G23 for the third period, and a signal G24 for the fourth period.

The area-3 gate signal calculator 143 includes two comparators and a carrier signal cararea3, and compares D31+DFB and D32−DFB which are input signals, with the carrier signal cararea3, by the respective comparators, thereby generating a signal G31 for the first period and a signal G32 for the second period.

The above signals are inputted to the gate signal selector 160, and thus are distributed as gate signals for the respective switch elements.

An absolute value calculator 170 calculates the absolute value |vac| of the AC voltage detection value vac of the AC power supply 1, and outputs the absolute value |vac| to the operation area determiner 150.

The operation area determiner 150 performs magnitude comparison among the absolute value |vac| of the AC voltage detection value vac of the AC power supply 1, the DC capacitor voltage detection value Vc2 of the DC capacitor 3, and the DC voltage detection value Vc1 of the smoothing capacitor 4, performs determination as to the above areas 1 to 3, and calculates an area signal sigarea.

Instead of the DC capacitor voltage detection value Vc2 of the DC capacitor 3, the DC capacitor voltage command value Vc2* may be used.

The gate signal selector 160 allocates outputs of the gate signal calculator 140 to the switch elements, using the area signal sigarea outputted from the operation area determiner 150.

The control unit 100 shown in FIG. 30 performs control such that, in the area 1 and the area 2, one switching cycle is divided into four periods, and in the area 3, one switching cycle is divided into two periods.

Figure 33:
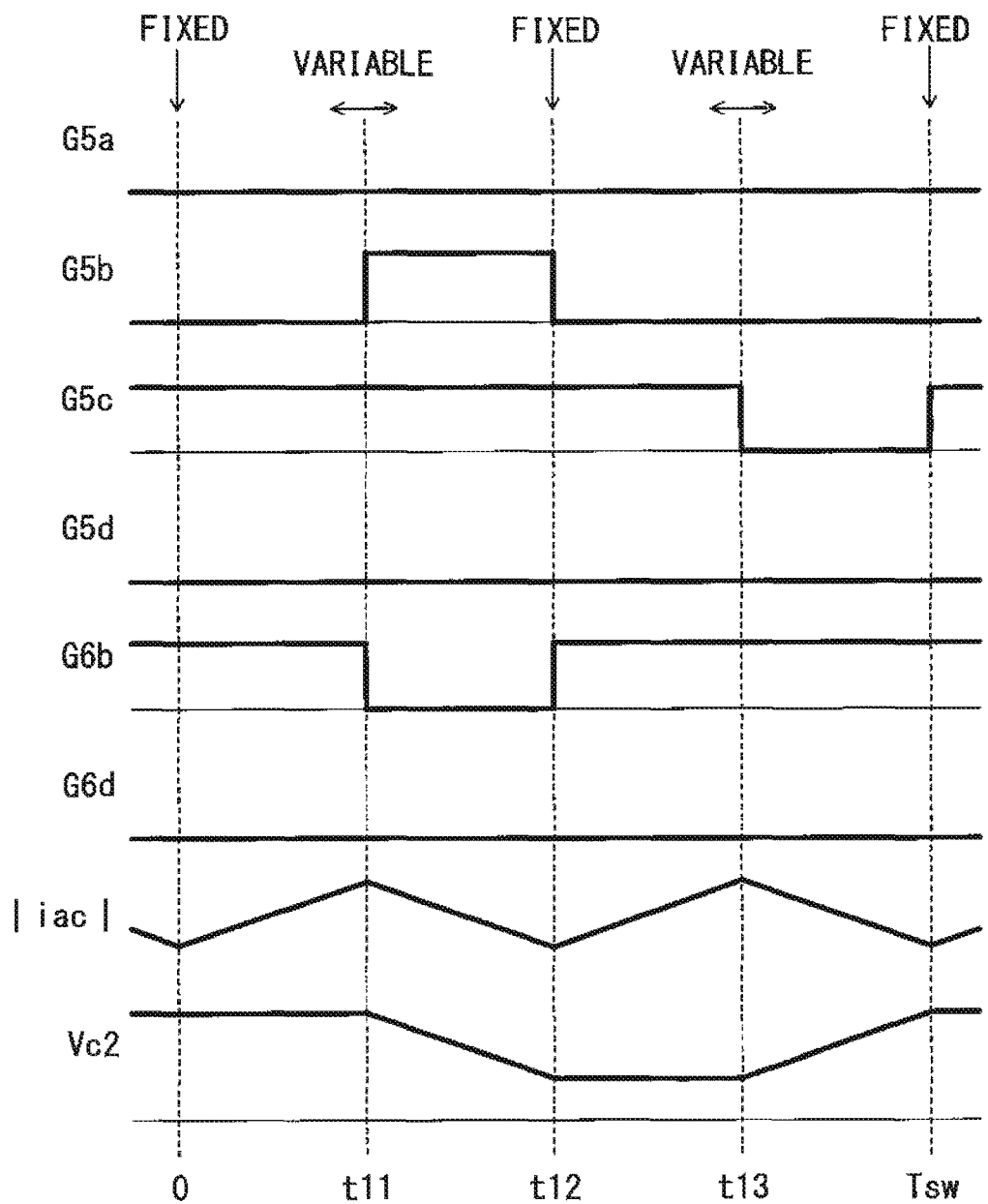
FIG. 33 is a gate pattern diagram in an area 1 in embodiment 1.
Figure 34:
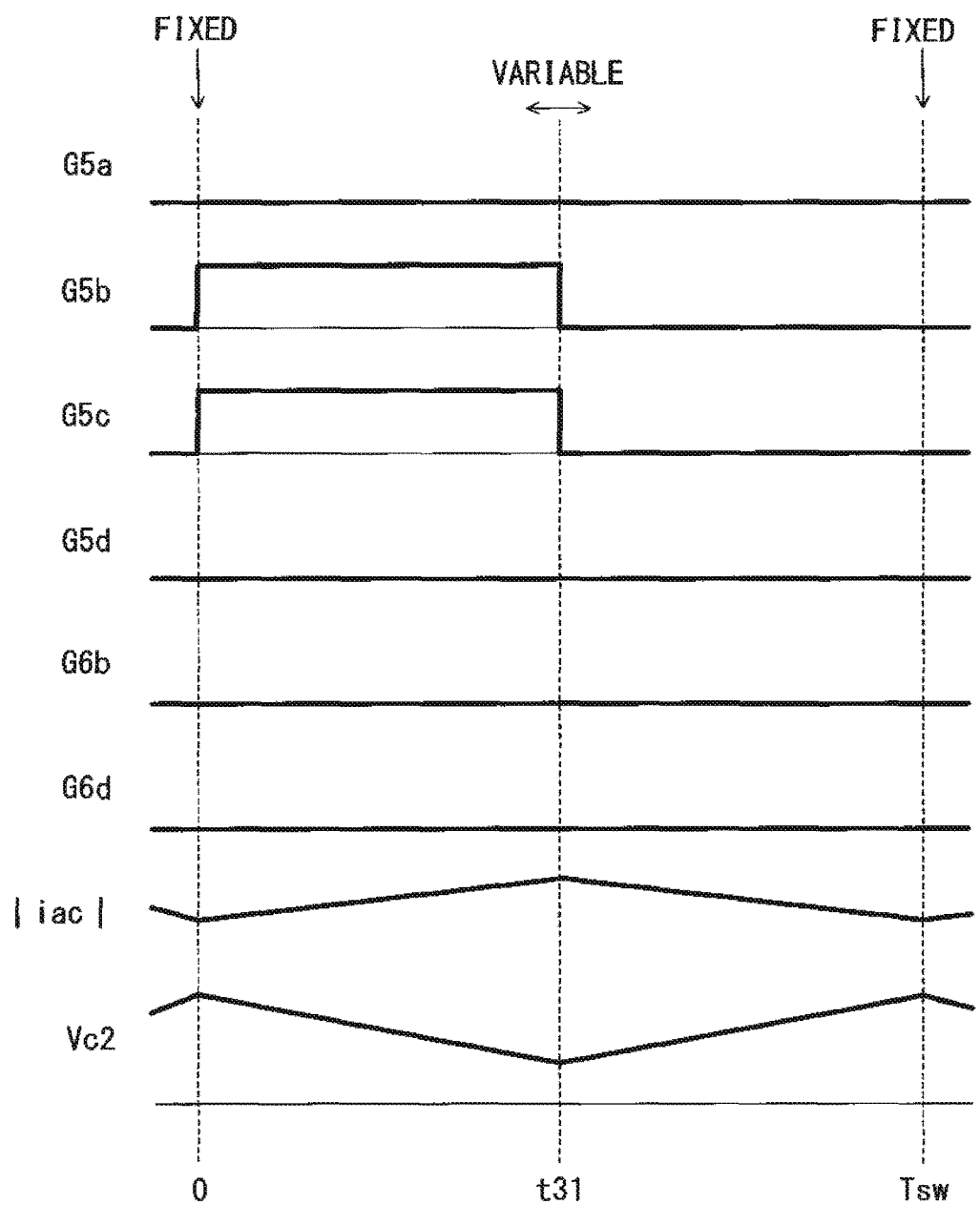
FIG. 34 is a gate pattern diagram in an area 3 in embodiment 1.

As an example, FIG. 33 shows a gate pattern diagram in the area 1 in the positive half wave. FIG. 34 shows a gate pattern diagram in the area 3 in the positive half wave.

In the area 1 and the area 2, 1 cycle and ½ cycle of the switching cycle are made constant, and an ON period ratio during those periods is controlled. That is, in FIG. 33, times 0, t12, Tsw are fixed, and t11 and t13 are controlled by the control unit 100.

It is noted that t11 and t13 correspond to timings that determine the boundaries between the current increase period and the current decrease period regarding the current of the AC power supply 1, and are referred to as control axes in claims of the present disclosure. The same applies to t31 and the like described below.

In the area 3, one cycle of the switching cycle is made constant and an ON period ratio during that period is controlled. The switching cycle as a reference is constant, and PWM (Pulse Width Modulation) control can be used. One cycle of the switching cycle is made constant and an ON period ratio during that period is controlled. That is, in FIG. 34, times 0 and Tsw are fixed and t31 is controlled.

As described above, the control unit 100 of the power conversion device in embodiment 1 of the present invention performs control such that one switching cycle Tsw of the single-phase inverter 300 is the same as one switching cycle Tsw of the single-phase converter 200 and is divided into an even number of periods including one or two pairs of periods in which current of the AC power supply 1 increases in the first half of each pair of periods and decreases in the second half of each pair of periods, and the control unit 100 includes: the theoretical duty calculator 110 which calculates the theoretical duty 1 corresponding to the first-half time width relative to the time width of one pair of periods, and the theoretical duty 2 corresponding to the second-half time width relative to the time width of one pair of periods, so that the increase amount of current of the AC power supply 1 in the first half and the decrease amount thereof in the second half become equal to each other in the one pair of periods; and the gate signal calculator 140 which calculates gate signals for driving the switch elements of the single-phase inverter 300 and the switch elements of the single-phase converter 200 to perform switching, on the basis of the theoretical duty 1 and the theoretical duty 2. Thus, charging operation and discharging operation of the DC capacitor 3 are performed within one switching cycle of the single-phase inverter 300, and the charging amount and the discharging amount become equal to each other. Therefore, irrespective of the very long cycle of the AC power supply 1, charging operation and discharging operation of the DC capacitor 3 are completed within one short switching cycle of the single-phase inverter 300, whereby the charging/discharging amount itself is reduced, the capacitance required for the DC capacitor 3 in order to suppress ripple voltage can be greatly reduced, and size reduction of the device can be achieved.

In addition, the control unit 100 includes: a voltage controller which generates an AC current command value on the basis of a deviation between the DC voltage command value and the DC voltage detection value; and the feedback duty calculator 120 which calculates the feedback duty on the basis of a deviation between the AC current command value and an AC current detection value, and the gate signal calculator 140 calculates the gate signals on the basis of duties calculated by adding the feedback duty to the theoretical duty 1 and by subtracting the feedback duty from the theoretical duty 2. Therefore, it becomes possible to perform constant-voltage control so as to keep voltage of the smoothing capacitor 4 at a desired DC voltage command value.

In addition, the control unit 100 sets the number of divided periods in one switching cycle of the single-phase inverter 300 in accordance with the areas 1, 2, 3 determined depending on the magnitude relationship among voltage vac of the AC power supply 1, voltage Vc1 of the smoothing capacitor 4, and voltage Vc2 of the DC capacitor 3. Therefore, it becomes possible to perform switching control for each switch element by an appropriate gate pattern according to the voltage relationship.

In addition, the control unit 100 controls the switch elements such that switching timings are different between the single-phase inverter 300 and the single-phase converter 200. Therefore, it becomes possible to make the application voltage frequency of the reactor 2 higher than the switching frequencies of the single-phase inverter 300 and the single-phase converter 200.

As a result, it becomes possible to reduce a VT product which is a product of voltage and time of the reactor 2, with a general configuration ratio, and a necessary inductance value can be reduced in principle. In general, in the reactor 2, the inductance value is to be reduced through reduction in core size and decrease in the number of winding turns. Therefore, size reduction of the reactor 2 is achieved as a result.

In the power conversion device shown in embodiment 1, the upper arms of the single-phase converter 200 are composed of diodes 6a, 6c. However, as in the lower arms, the upper arms may be composed of switch elements (substitute switch elements). In this case, by turning on the switch elements during the conduction periods of the diodes 6a, 6c shown in embodiment 1, it is possible to perform so-called synchronous rectification operation.

Similarly, in the switch elements 5a to 5d of the single-phase inverter 300 and the switch elements 6b, 6d of the single-phase converter 200, it is possible to perform synchronous rectification operation by turning on each switch element during a period in which the diode connected in parallel thereto becomes conductive.

In the synchronous rectification operation in the case of using MOSFETs, if voltage drop due to the ON resistance of the switch element is smaller than voltage drop of the parallel diode, current flows through the switch element, and thus conduction loss can be reduced. In addition, by forming the upper arms of the single-phase converter 200 by switch elements, it becomes possible to supply power from the smoothing capacitor 4 to the AC power supply 1.

The switching cycles Tsw in the area 1, the area 2, and the area 3 may have the same constant value or may have respective independent values. For example, the switching cycles in the area 1 and the area 2 may be set at the same constant value, and the switching cycle in the area 3 may be set to be half the switching cycle in the area 1 and the area 2. Thus, the application voltage frequency of the reactor 2 becomes constant in all the areas. If the application voltage frequency is constant, it becomes easy to take measures for noise and establish stable control. In addition, driving may be performed using PFM (Pulse Frequency Modulation) control in which the switching frequency is varied while the ON period of any of the switch elements is fixed.

The reactor 2 is provided on the positive-side line of the AC power supply 1. However, the reactor 2 may be connected on only the negative-side line, or may be connected on both the positive-side line and the negative-side line. The reactor may be connected between the single-phase inverter 300 and the single-phase converter 200. Similarly, although the single-phase inverter 300 is provided on the positive-side line of the AC power supply 1, the single-phase inverter 300 may be provided on the negative-side line.

Figure 35:
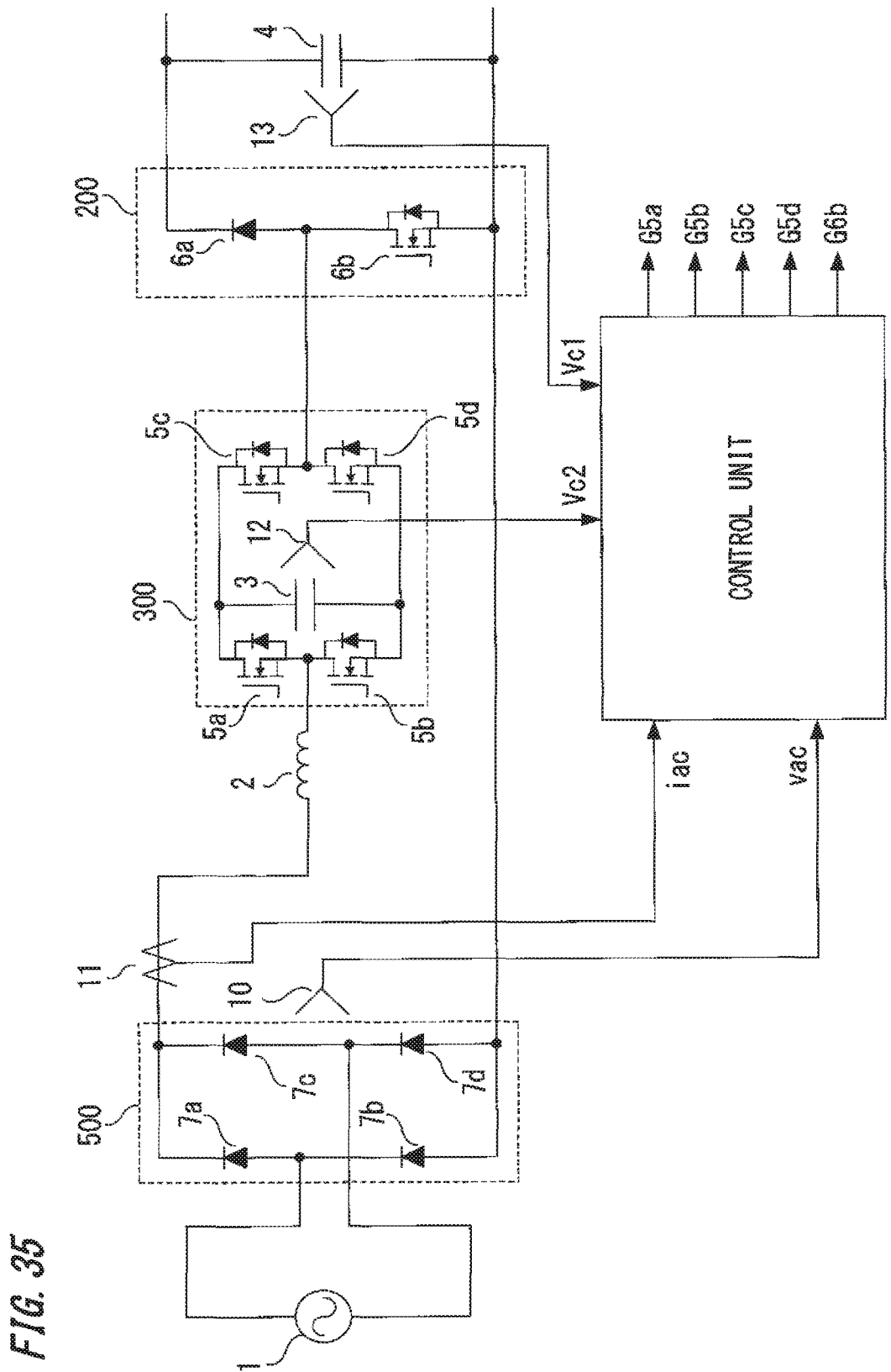
FIG. 35 is a configuration diagram of the power conversion device according to embodiment 1 in the case of using a diode bridge.

As shown in FIG. 35, a configuration having a diode bridge 500 which is a rectification circuit may be employed. In this case, both ends of the AC power supply 1 are connected to AC terminals of the diode bridge 500, and the reactor 2, the single-phase inverter 300, and the AC terminal of the single-phase converter 200 are connected in series to the positive-side DC output terminal. The negative-side DC output terminal of the diode bridge 500 is connected to the source terminal of the switch element 6b of the single-phase converter 200 and one terminal of the smoothing capacitor 4. The other terminal of the smoothing capacitor 4 is connected to the cathode terminal of the diode 6a of the single-phase converter 200. In the configuration shown in FIG. 35, driving can be performed using only the control for the positive half wave in the configuration shown in FIG. 1, and obtained effects are the same as in the case of FIG. 1.

In the configuration shown in FIG. 35, the reactor 2 may be connected on at least one of the positive-side line and the negative-side line between the AC power supply 1 and the diode bridge 500, or may be connected between the single-phase inverter 300 and the single-phase converter 200.

In addition, current on at least one of the positive-side line and the negative-side line between the AC power supply 1 and the diode bridge 500 may be detected. In addition, with the AC power supply 1 and the diode bridge 500 regarded as a DC power supply, it is also possible to configure a DC/DC converter capable of stepping up/down DC voltage of the smoothing capacitor 4 relative to the voltage of the DC power supply.

In the case where, for example, a DC/DC converter for controlling voltage $Vc1$ of the smoothing capacitor 4 or a DC voltage source is connected in parallel with the smoothing capacitor 4, the feedback duty calculator 120 shown in FIG. 31 may perform only current control using a predetermined current amplitude command value $\sqrt{2}Iac^*$ for the AC power supply 1 without performing $Vc1$-constant control.

In this case, it becomes possible to perform high-power-factor operation control.

The AC power supply may be a three-phase power supply. In this case, the single-phase inverters shown in FIG. 1 are provided for three phases, and one of inverter AC terminals of the single-phase inverter for each phase is connected to the terminal for the corresponding phase of the three-phase power supply via a reactor for the corresponding phase. Further, the converter is configured as a three-phase converter in which: legs for three phases are provided each of which is composed of a series body of the switch element and the diode; the converter AC terminal for each phase which corresponds to the middle point of the leg for each phase is connected to the other one of the inverter AC terminals of the single-phase inverter for the corresponding phase; and the converter DC terminals corresponding to the upper end and the lower end of the leg for each phase are connected to the smoothing capacitor.

By providing the above main circuit and the control unit described previously and performing the same control, it is possible to provide a power conversion device that performs power conversion between three-phase AC voltage and DC voltage and that enables size reduction by reduction in the capacitance of the DC capacitor of the inverter for each phase.

Embodiment 2

Hereinafter, embodiment 2 of the present invention will be described.

Figure 36:
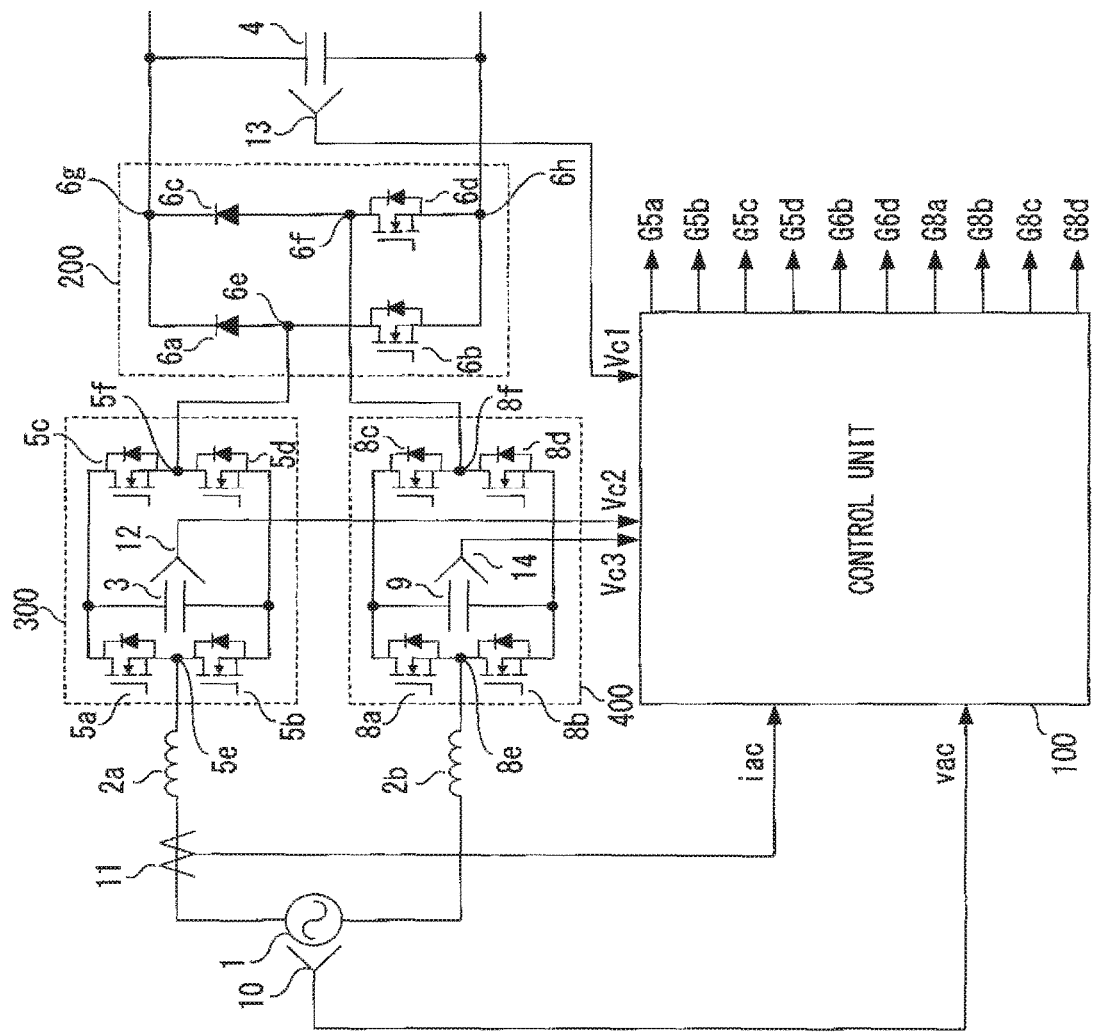
FIG. 36 is a circuit configuration of a power conversion device according to embodiment 2 of the present invention.

FIG. 36 is a circuit configuration diagram of a power conversion device according to embodiment 2 of the present invention. As shown in FIG. 36, the power conversion device includes a main circuit and the control unit 100, for converting AC voltage and AC power of the AC power supply 1 to DC voltage and DC power and outputting the DC voltage and DC power to the smoothing capacitor 4.

Hereinafter, difference from the configuration shown in FIG. 1 in the above embodiment 1 will be mainly described.

The main circuit includes a single-phase inverter 400 connected to the lower end of the AC power supply 1, in addition to the single-phase inverter 300 having the inverter AC terminal 5e connected to the upper end of the AC power supply 1 via a reactor 2a.

The single-phase inverter 400 has the same configuration as the single-phase inverter 300, that is, includes the DC capacitor 9 and two legs respectively composed of series bodies of pairs of switch elements 8a, 8b and 8c, 8d, and an inverter AC terminal 8e corresponding to the middle point of one of the legs is connected to the lower end of the AC power supply 1 via a reactor 2b.

The inverter AC terminal 5f of the single-phase inverter 300 is connected to the converter AC terminal 6e of the single-phase converter 200, and an inverter AC terminal 8f corresponding to the middle point of the other leg of the single-phase inverter 400 is connected to the converter AC terminal 6f of the single-phase converter 200.

The control unit 100 receives voltage Vc3 of the DC capacitor 9 detected by a DC capacitor voltage detection unit 14, as well as voltage vac of the AC power supply 1, current iac of the AC power supply 1, voltage Vc2 of the DC capacitor 3, and voltage Vc1 of the smoothing capacitor 4, and outputs gate signals G8a to G8d for driving the switch elements 8a to 8d of the single-phase inverter 400 to perform switching, as well as the gate signals G5a to G5d for driving the switch elements 5a to 5d of the single-phase inverter 300 to perform switching, and the gate signals G6b, G6d for driving the switch elements 6b, 6d of the single-phase converter 200 to perform switching.

Next, operation of the power conversion device configured as described above will be described.

As in the single-phase inverter 300, the single-phase inverter 400 switches the voltage level between the inverter AC terminals 8e, 8f to a positive/negative value Vc3, −Vc3 of voltage of the DC capacitor 9, or zero voltage, through switching operation of the switch elements 8a to 8d.

The directions of output voltages of the single-phase converter 200, the single-phase inverter 300, and the single-phase inverter 400 are determined-depending on the relationship among voltage vac of the AC power supply 1, voltage Vc1 of the smoothing capacitor 4, voltage Vc2 of the DC capacitor 3, and voltage Vc3 of the DC capacitor 9.

Here, it is assumed that voltage Vc2 of the DC capacitor 3 and voltage Vc3 of the DC capacitor 9 are smaller than voltage Vc1 of the smoothing capacitor 4. In addition, voltages Vc2 and Vc3 are assumed to be equal to each other, and the voltage average value of the voltages Vc2 and Vc3 is defined as Vsub=(Vc2+Vc3)/2.

Figure 37:
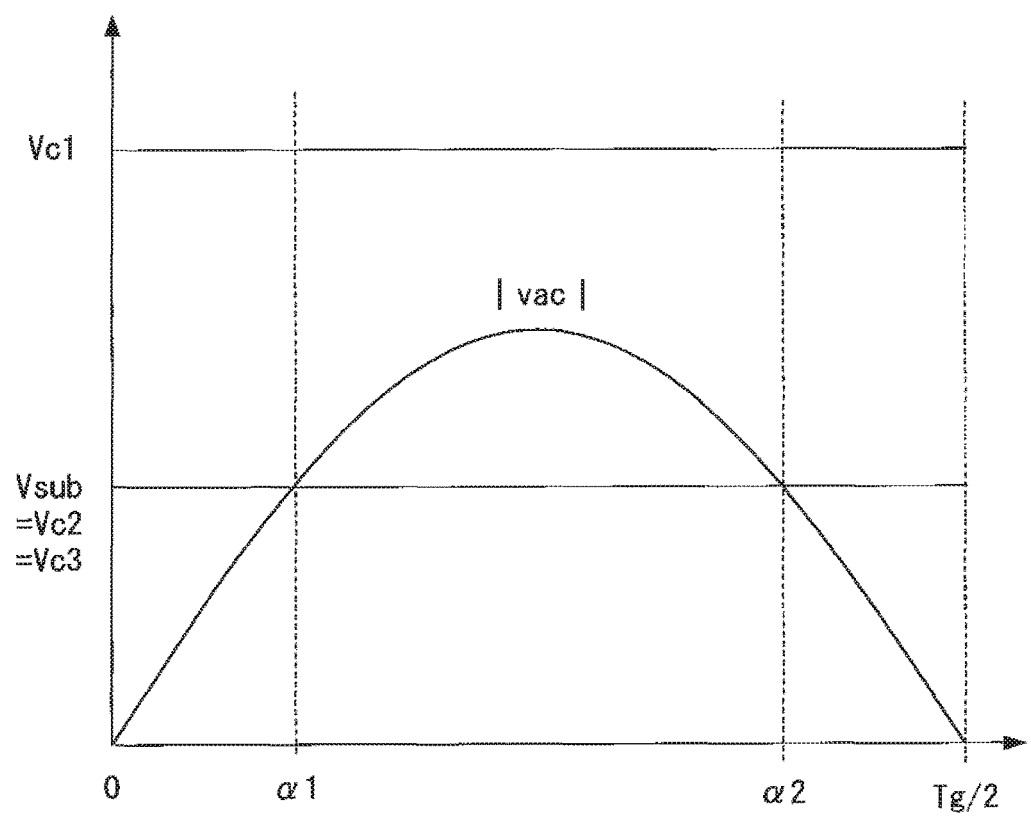
FIG. 37 is a diagram showing a relationship of voltages in a step-up operation mode in the power conversion device according to embodiment 2 of the present invention.
Figure 38:
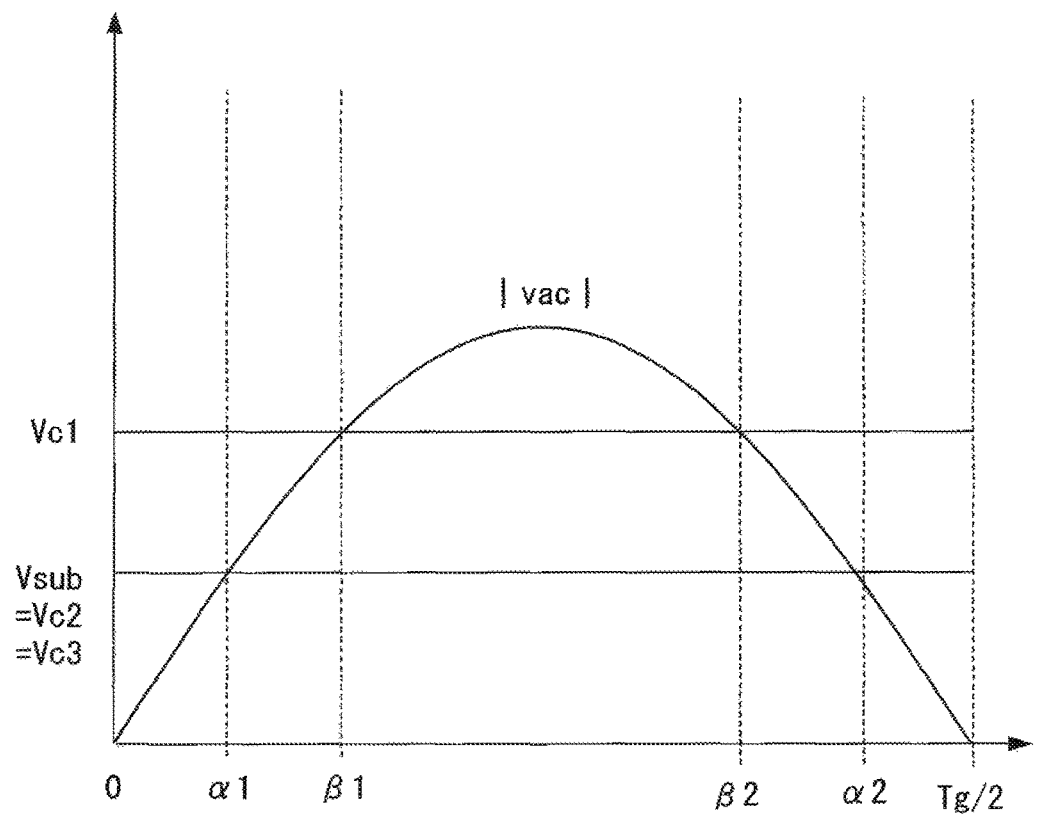
FIG. 38 is a diagram showing a relationship of voltages in a step-down operation mode in the power conversion device according to embodiment 2 of the present invention.

FIG. 37 and FIG. 38 are diagrams obtained by redrawing FIG. 2 and FIG. 3 in the above embodiment 1 so as to be adapted to the present embodiment 2. In the same manner as described above, in FIG. 37 and FIG. 38, areas in which phase t is in ranges of $0 \leq t < \alpha 1$ and $\alpha 2 < t \leq Tg/2$ are areas in which a relationship of $|vac| < Vsub < Vc1$ is satisfied. Such an area is defined as area 1.

An area of $\alpha 1 \leq t \leq \alpha 2$ in FIG. 37 and areas of $\alpha 1 \leq t < \beta 1$ and $\beta 2 < t \leq \alpha 2$ in FIG. 38 are areas in which $Vsub \leq |vac| < Vc1$ is satisfied. Such an area is defined as area 2.

An area of $\beta 1 \leq t \leq \beta 2$ in FIG. 38 is an area in which $Vc1 \leq |vac|$ is satisfied. Such an area is defined as area 3.

In the present configuration, the current route differs between the positive half wave and the negative half wave of the AC power supply 1. Therefore, first, driving methods (gate patterns) and current routes in the areas 1 to 3 in the positive half wave will be described, and next, driving methods and current routes in the negative half wave will be described. It is noted that the total inductance of the reactors 2a and 2b is defined as L.

In the present embodiment 2, a switching cycle 2Tsw of the single-phase inverters 300, 400 is twice the switching cycle Tsw of the single-phase converter 200.

Figure 39:
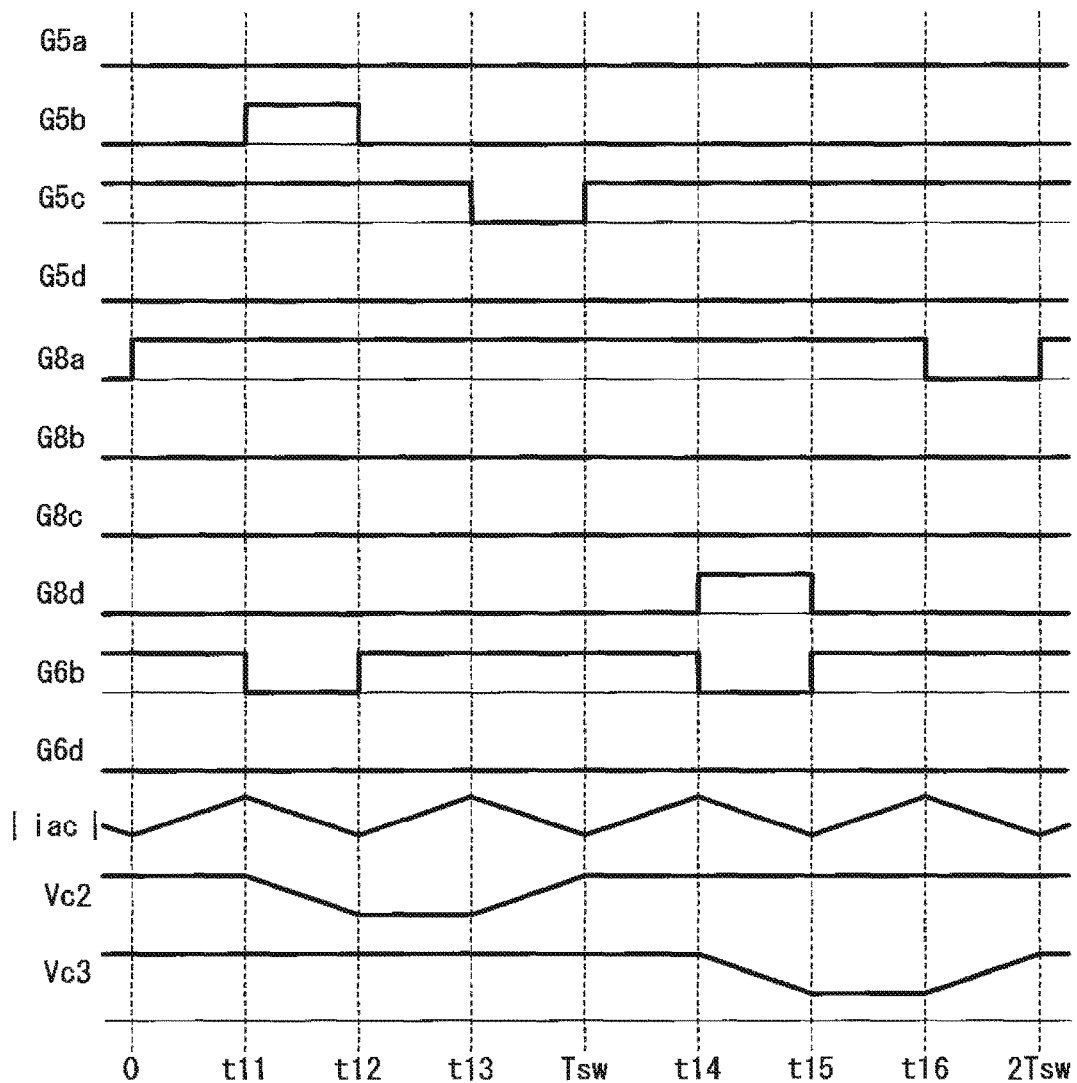
FIG. 39 is a waveform schematic diagram showing the operation state in an area 1 in the positive half wave of the AC power supply 1, in the power conversion device according to embodiment 2 of the present invention.

FIG. 39 is an operation schematic diagram showing the operation state during one switching cycle 2Tsw (two switching cycles of the converter) of the inverters, in the area 1 in the positive half wave of the AC power supply 1. Here, in the switching cycle Tsw in the first half, the single-phase inverter 300 and the single-phase converter 200 operate, and in the switching cycle Tsw in the second half, the single-phase inverter 400 and the single-phase converter 200 operate. The switching cycle Tsw is divided into four periods and driving is performed by high-frequency PWM.

Figure 40:
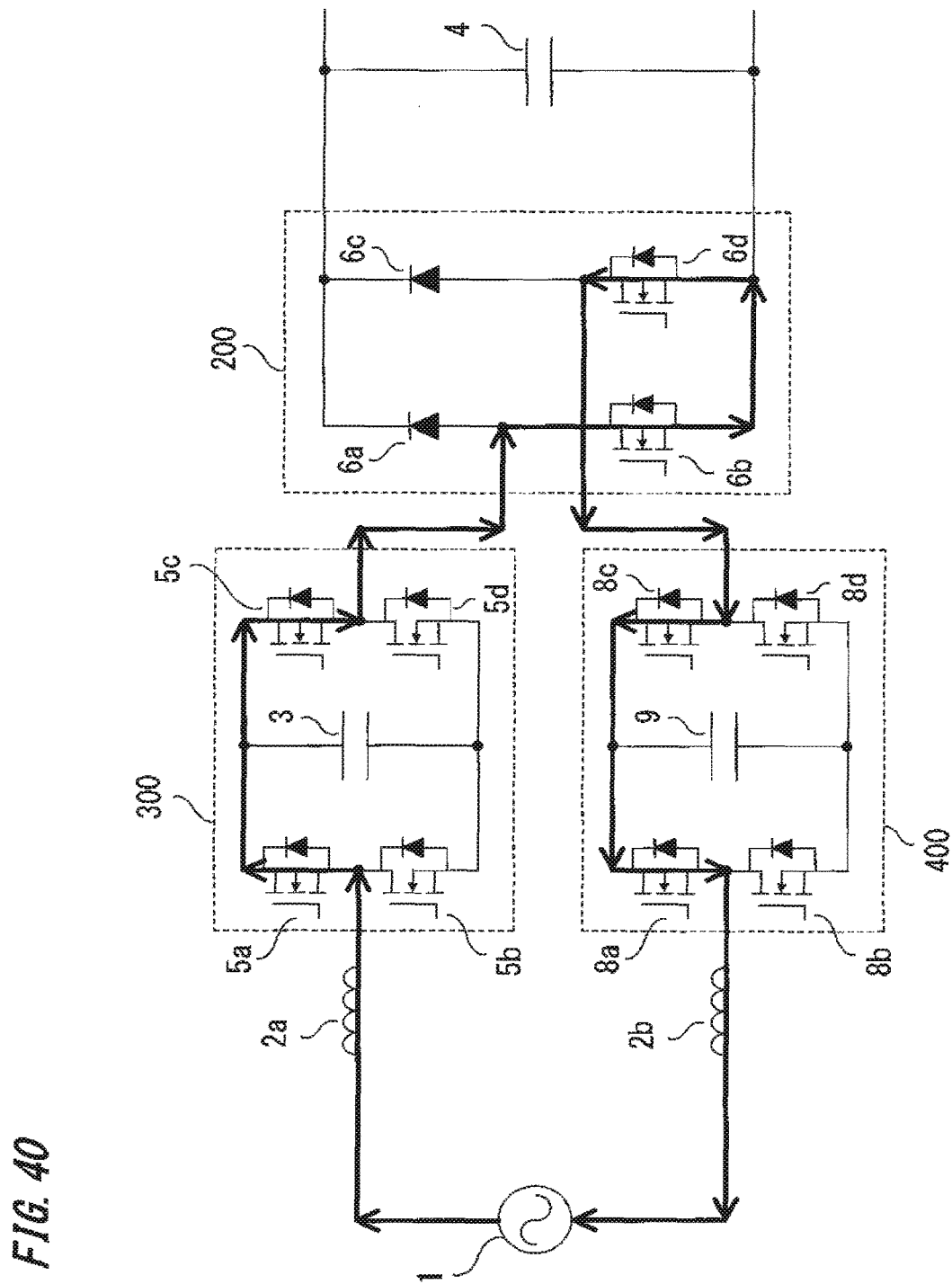
FIG. 40 is a diagram showing a current route in a first period in FIG. 39.

In the first period of 0<t≤t11, the switch elements 5c, 6b, 8a are ON and current |iac| of the AC power supply 1 increases. The current at this time flows through a route shown in FIG. 40. The route is as follows: AC power supply 1→reactor 2a→switch element 5a→switch element 5c→switch element 6b→switch element 6d→switch element 8c→switch element 8a→reactor 2b→AC power supply 1. During this period, current does not flow through the DC capacitor 3 and the DC capacitor 9, and therefore voltages Vc2 and Vc3 are constant. A current change amount Δiac11 during this period is represented by the following Expression (41) and becomes a positive value.

$$\Delta iac11 = (|vac|/L) \cdot t11 \qquad (41)$$

Figure 41:
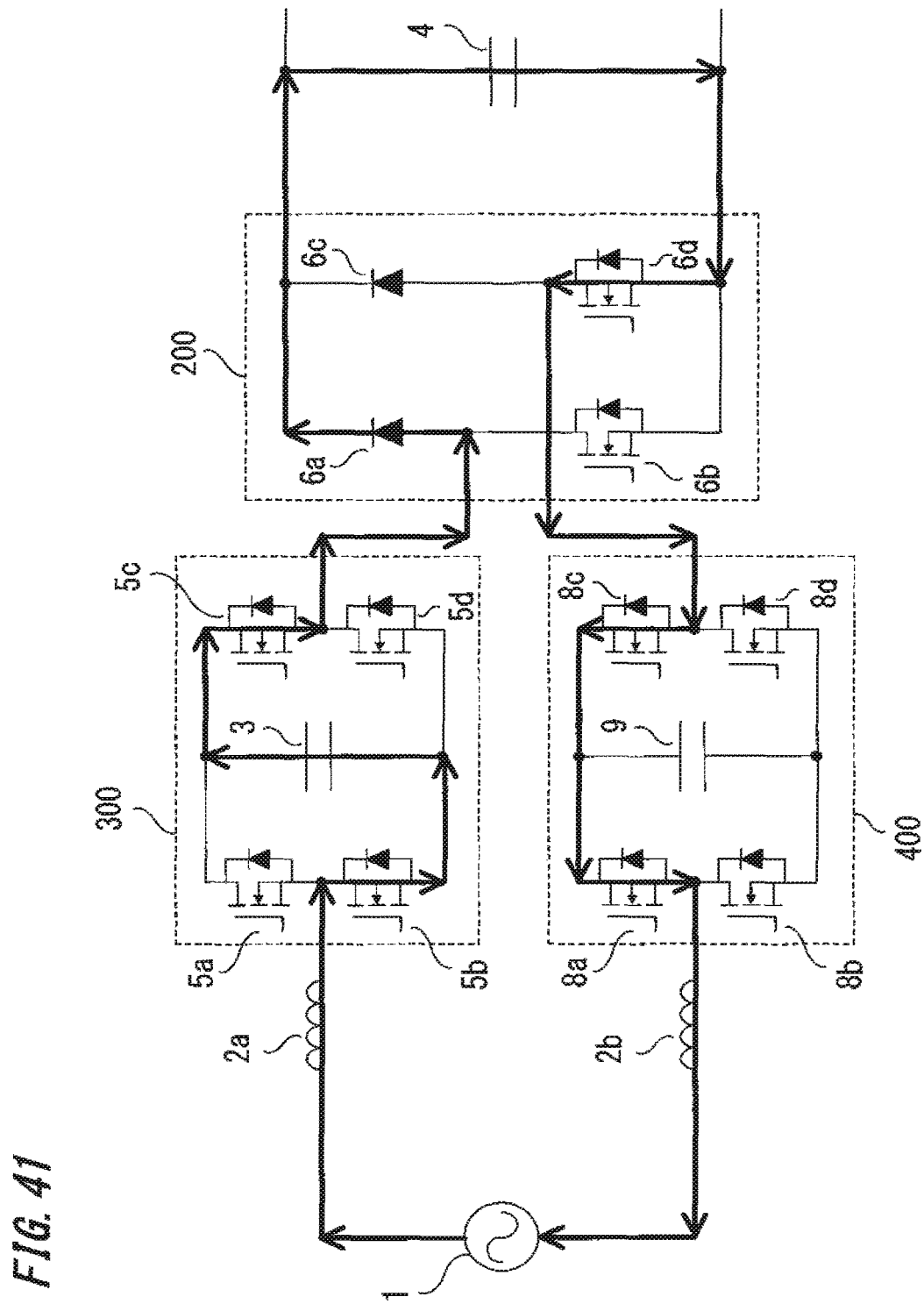
FIG. 41 is a diagram showing a current route in a second period in FIG. 39.

In the second period of t11<t<t12, the switch elements 5b, 5c, 8a are ON and current |iac| of the AC power supply 1 decreases. The current at this time flows through a route shown in FIG. 41. The route is as follows: AC power supply 1→reactor 2a→switch element 5b→DC capacitor 3→switch element 5c→diode 6a→smoothing capacitor 4→switch element 6d→switch element 8c→switch element 8a→reactor 2b→AC power supply 1. During this period, current flows through the DC capacitor 3 in a discharging direction, so that voltage Vc2 decreases, and current does not flow through the DC capacitor 9 and therefore voltage Vc3 is constant. A current change amount Δiac12 during this period is represented by the following Expression (42) and becomes a negative value.

$$\Delta iac12 = ((|vac| + Vc2 - Vc1)/L) \cdot (t12 - t11) \qquad (42)$$

Figure 42:
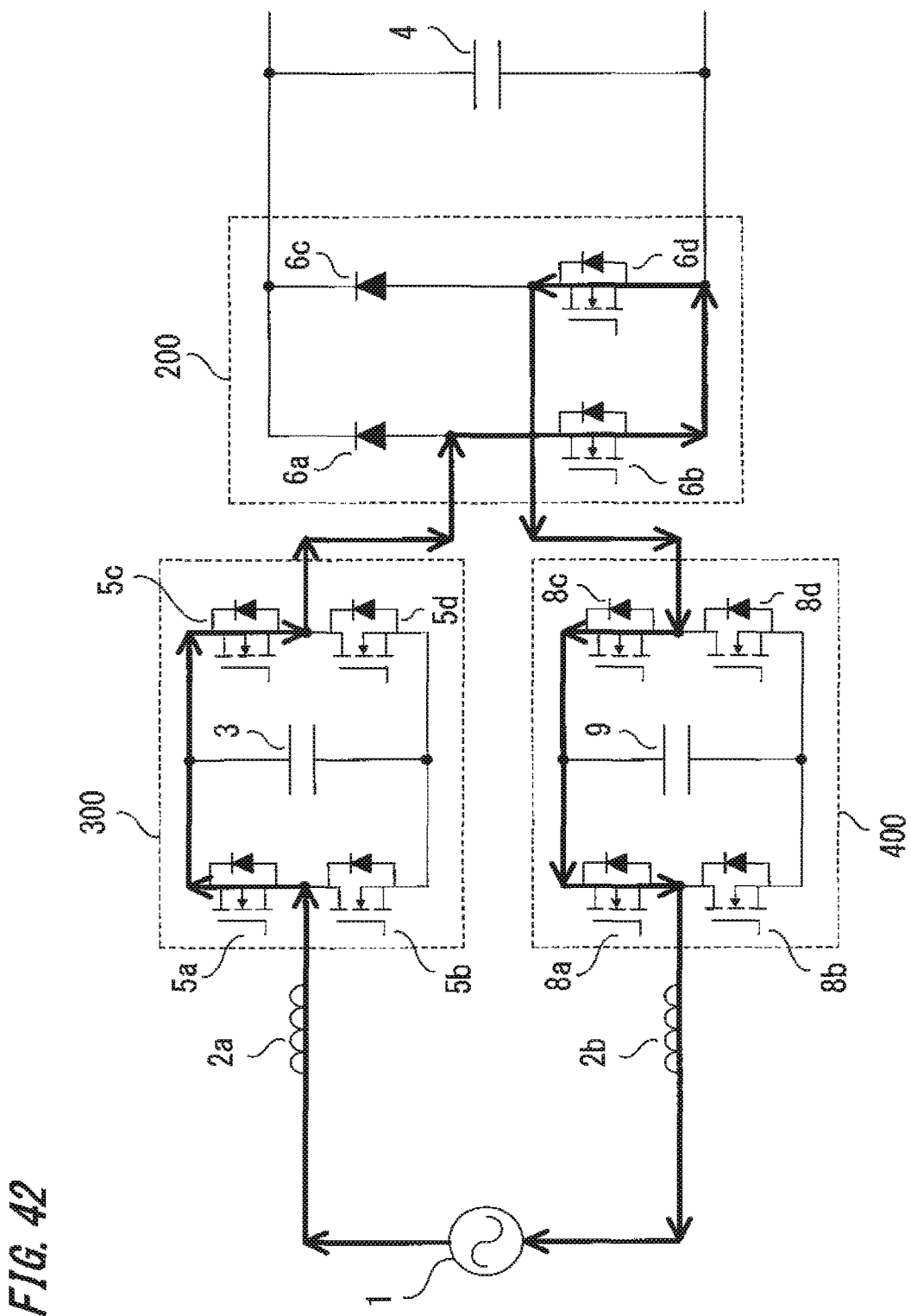
FIG. 42 is a diagram showing a current route in a third period in FIG. 39.

In the third period of t12<t<t13, the switch elements 5c, 6b, 8a are ON and current |iac| of the AC power supply 1 increases. The current at this time flows through a route shown in FIG. 42. The route is as follows: AC power supply 1→reactor 2a→switch element 5a→switch element 5c→switch element 6b→switch element 6d→switch element 8c→switch element 8a→reactor 2b→AC power supply 1. During this period, current does not flow through the DC capacitor 3 and the DC capacitor 9, and therefore voltages Vc2 and Vc3 are constant. A current change amount Δiac13 during this period is represented by the following Expression (43) and becomes a positive value.

$$\Delta iac13 = (|vac|/L) \cdot (t13 - t12) \qquad (43)$$

Figure 43:
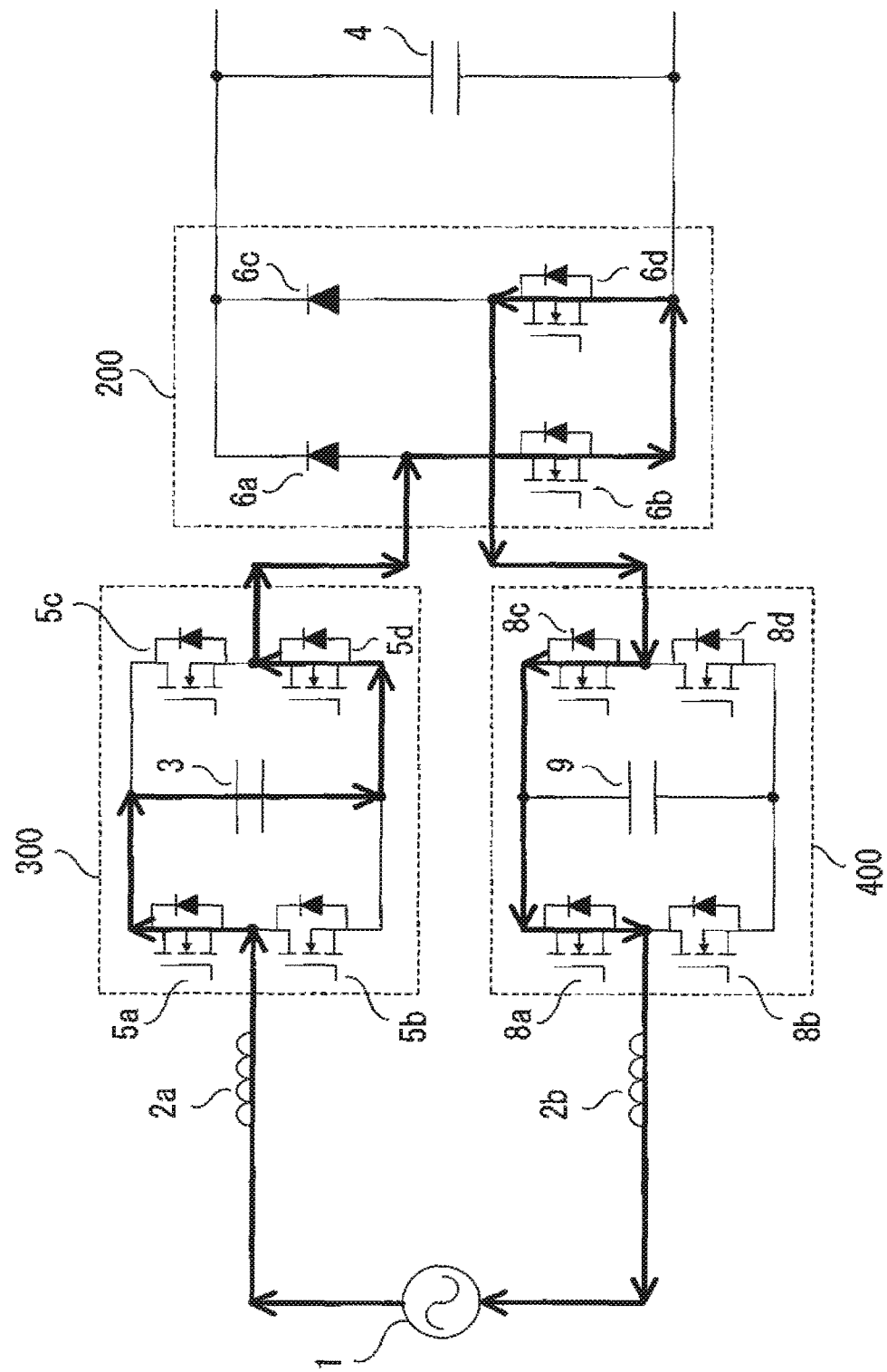
FIG. 43 is a diagram showing a current route in a fourth period in FIG. 39.

In the fourth period of t13<t≤Tsw, the switch elements 6b, 8a are ON and current |iac| of the AC power supply 1 decreases. The current at this time flows through a route shown in FIG. 43. The route is as follows: AC power supply 1→reactor 2a→switch element 5a→DC capacitor 3 switch element 5d→switch element 6b→switch element $6d$→switch element $8c$→switch element $8a$→reactor $2b$→AC power supply 1. During this period, current flows through the DC capacitor 3 in a charging direction, so that voltage Vc2 increases, and current does not flow through the DC capacitor 9 and therefore voltage Vc3 is constant. A current change amount $\Delta iac14$ during this period is represented by the following Expression (44) and becomes a negative value.

$$\Delta iac14=((|vac|-Vc2)/L)\cdot(Tsw-t13) \qquad (44)$$

Figure 44:
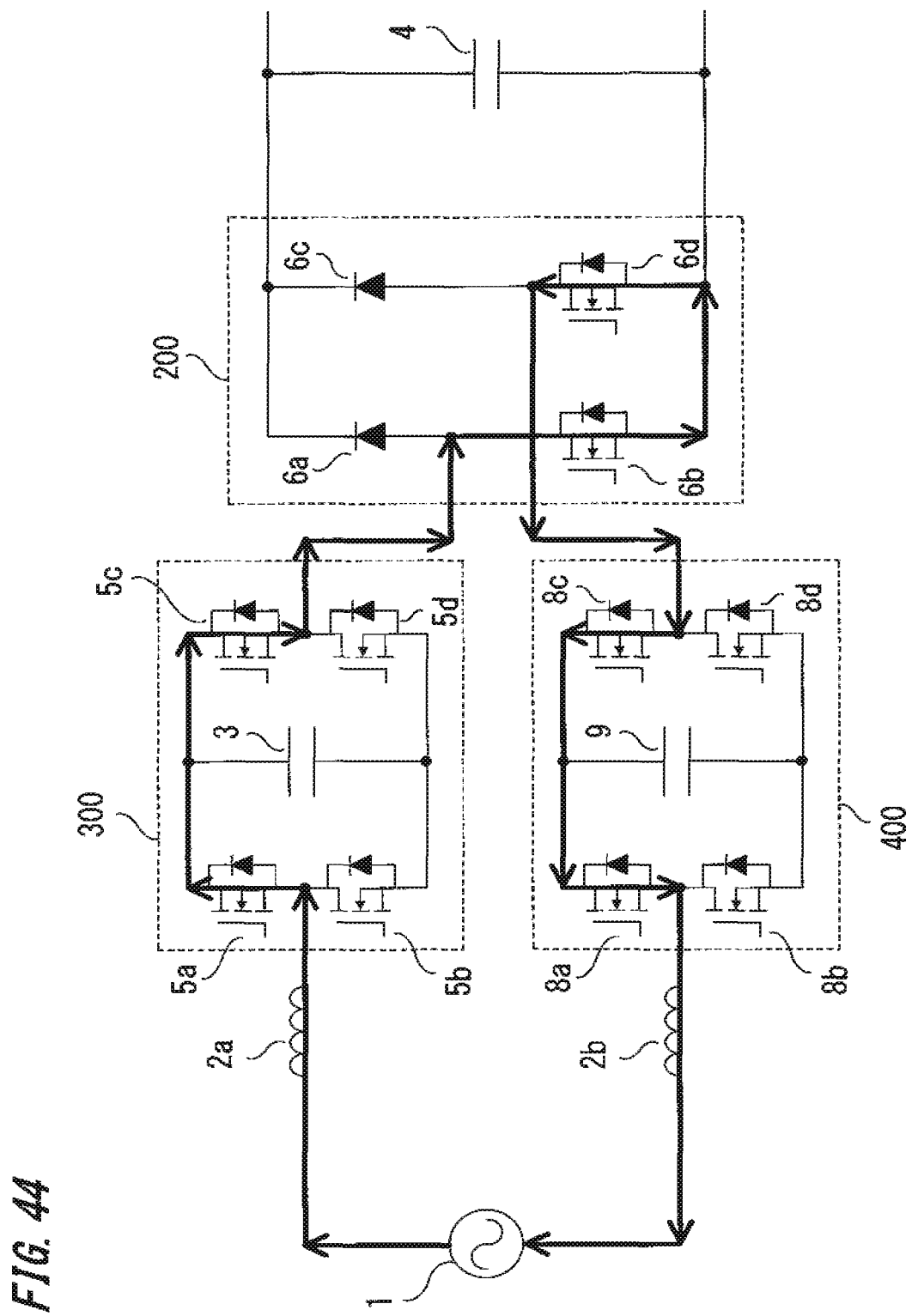
FIG. 44 is a diagram showing a current route in a fifth period in FIG. 39.

In the fifth period of Tsw<t≤t14, the switch elements 5c, 6b, 8a are ON and current |iac| of the AC power supply 1 increases. The current at this time flows through a route shown in FIG. 44. The route is as follows: AC power supply 1→reactor $2a$→switch element $5a$→switch element $5c$→switch element $6b$→switch element $6d$→switch element $8c$→switch element $8a$ reactor $2b$→AC power supply 1. During this period, current does not flow through the DC capacitor 3 and the DC capacitor 9, and therefore voltages Vc2 and Vc3 are constant. A current change amount $\Delta iac15$ during this period is represented by the following Expression (45) and becomes a positive value.

$$\Delta iac15=(|vac|/L)\cdot(t14-Tsw) \qquad (45)$$

Figure 45:
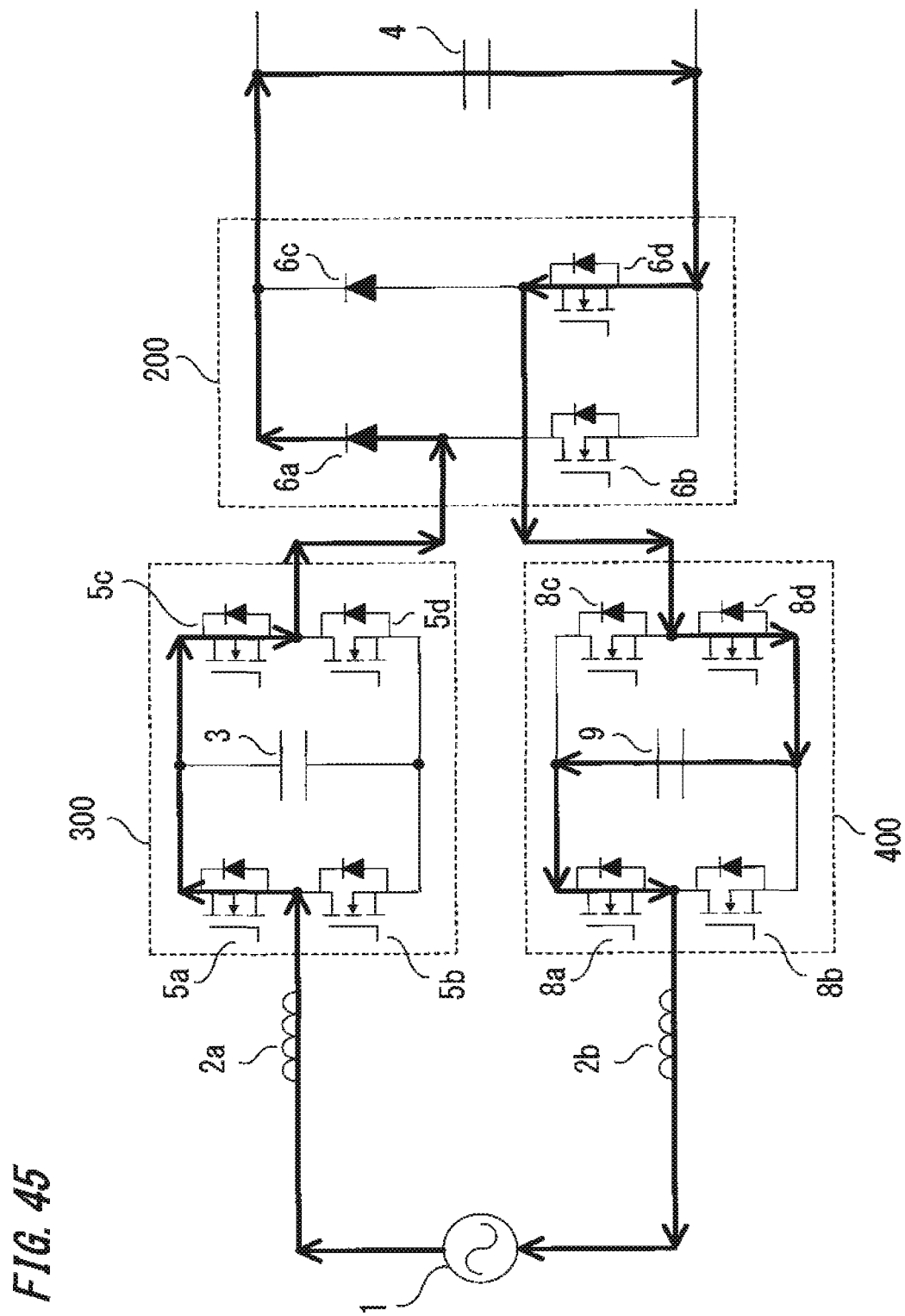
FIG. 45 is a diagram showing a current route in a sixth period in FIG. 39.

In the sixth period of t14<t≤t15, the switch elements 5c, 8a, 8d are ON and current |iac| of the AC power supply 1 decreases. The current at this time flows through a route shown in FIG. 45. The route is as follows: AC power supply 1→reactor $2a$→switch element $5a$→switch element $5c$→diode $6a$→smoothing capacitor 4→switch element $6d$→switch element $8d$→DC capacitor 9→switch element $8a$→reactor $2b$→AC power supply 1. During this period, current flows through the DC capacitor 9 in a discharging direction, so that voltage Vc3 decreases, and current does not flow through the DC capacitor 3 and therefore voltage Vc2 is constant. A current change amount $\Delta iac16$ during this period is represented by the following Expression (46) and becomes a negative value.

$$\Delta iac16=((|vac|+Vc3-Vc1)/L)\cdot(t15-t14) \qquad (46)$$

Figure 46:
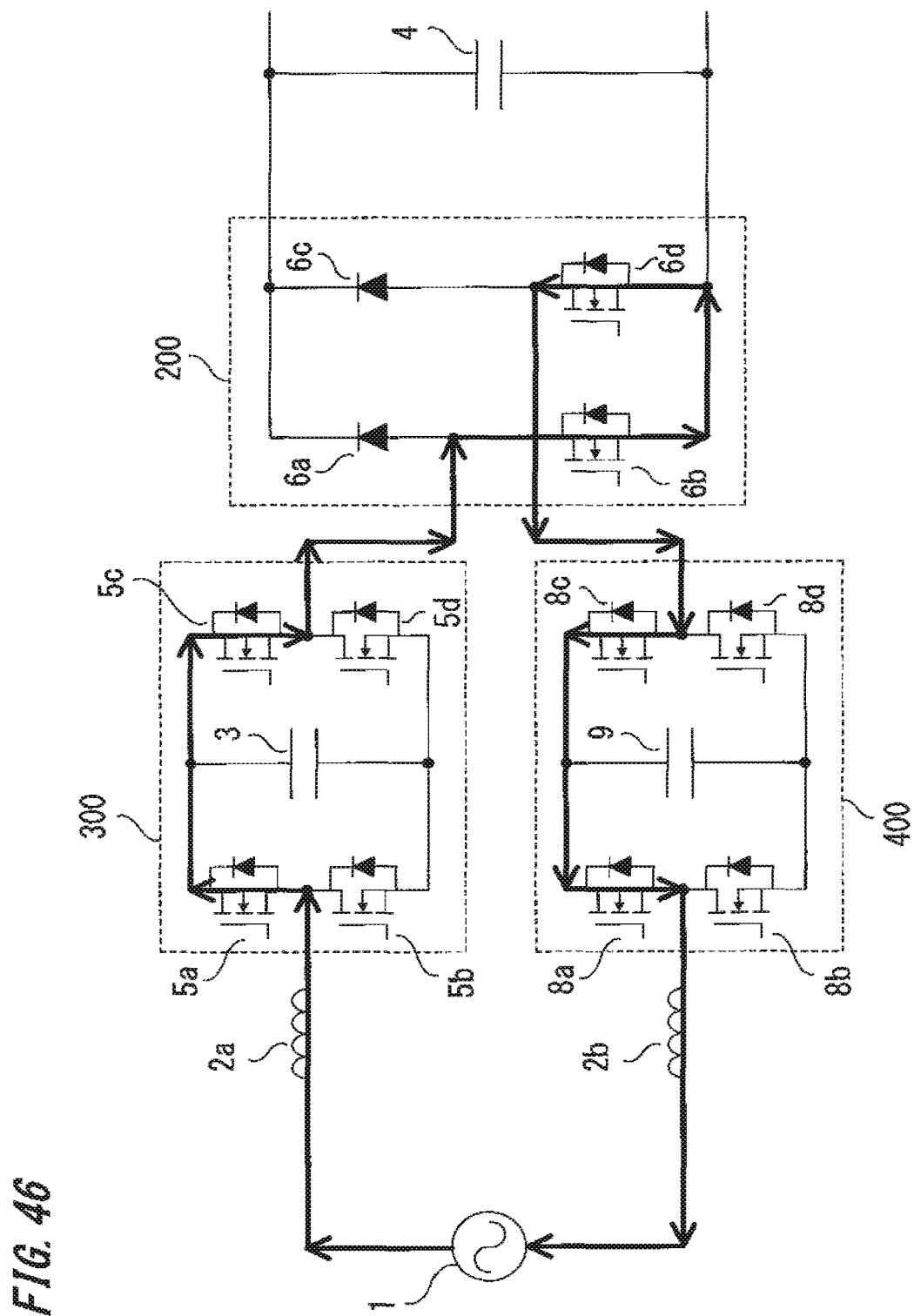
FIG. 46 is a diagram showing a current route in a seventh period in FIG. 39.

In the seventh period of t15<t≤t16, the switch elements 5c, 6b, 8a are ON and current |iac| of the AC power supply 1 increases. The current at this time flows through a route shown in FIG. 46. The route is as follows: AC power supply 1→reactor $2a$→switch element $5a$→switch element $5c$→switch element $6b$→, switch element $6d$→switch element $8c$→switch element $8a$→reactor $2b$→AC power supply 1. During this period, current does not flow through the DC capacitor 3 and the DC capacitor 9, and therefore voltages Vc2 and Vc3 are constant. A current change amount $\Delta iac17$ during this period is represented by the following Expression (47) and becomes a positive value.

$$\Delta iac17=(|vac|/L)\cdot(t16-t15) \qquad (47)$$

Figure 47:
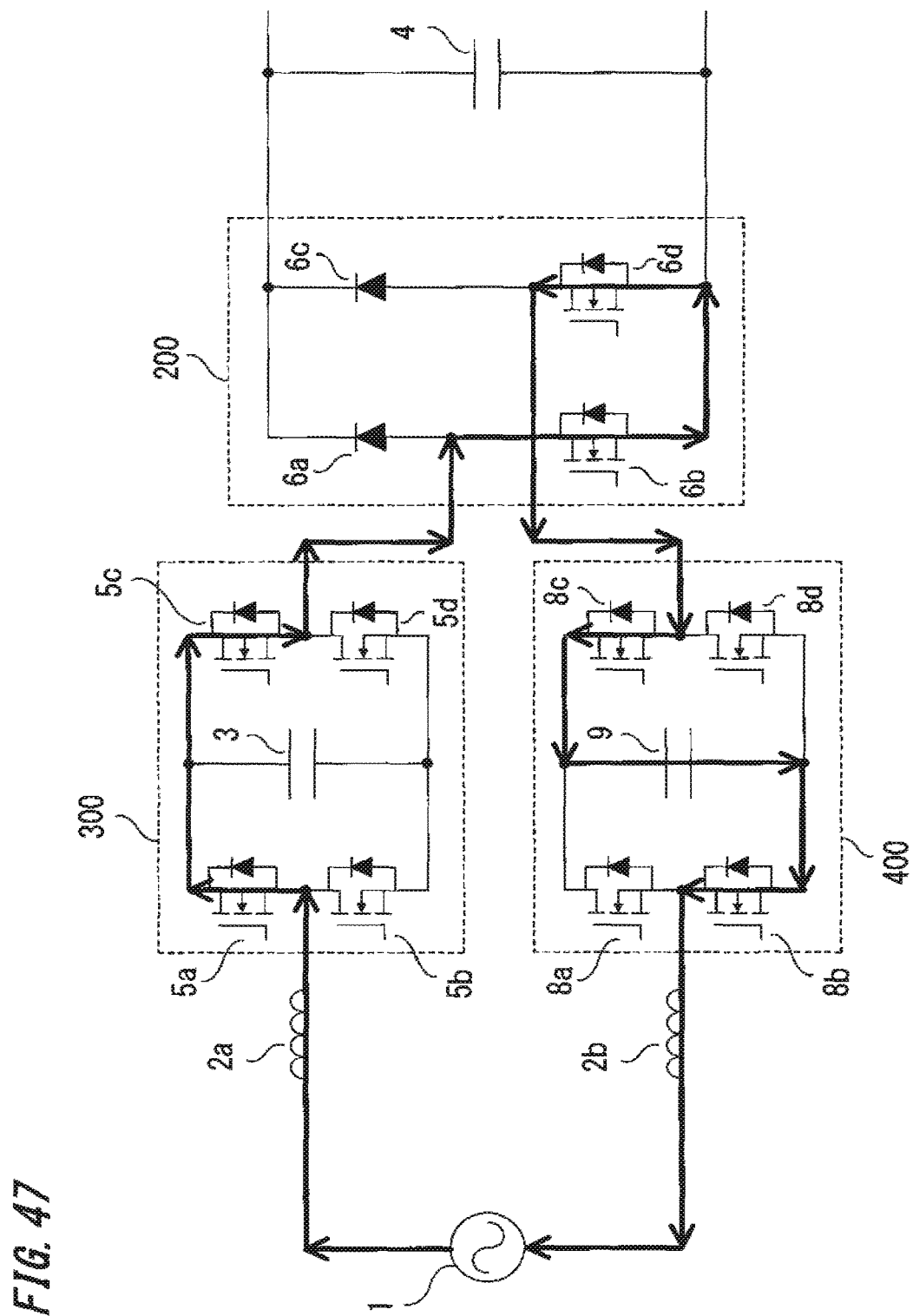
FIG. 47 is a diagram showing a current route in an eighth period in FIG. 39.

In the eighth period of t16<t≤2Tsw, the switch elements 5c, 6b are ON and current |iac| of the AC power supply 1 decreases. The current at this time flows through a route shown in FIG. 47. The route is as follows: AC power supply 1→reactor $2a$→switch element $5a$→switch element $5c$→switch element $6b$→switch element $6d$→switch element $8c$→DC capacitor 9→switch element $8b$→reactor $2b$→AC power supply 1. During this period, current flows through the DC capacitor 9 in a charging direction, so that voltage Vc3 increases, and current does not flow through the DC capacitor 3 and therefore voltage Vc2 is constant. A current change amount $\Delta iac18$ during this period is represented by the following Expression (48) and becomes a negative value.

$$\Delta iac18=((|vac|-Vc3)/L)\cdot(2Tsw-t16) \qquad (48)$$

At this time, under the assumption of $\Delta iac11=-\Delta iac12$, a theoretical duty D11 which is a ratio of a period from 0 to t11 with respect to a period from 0 to t12 is represented by Expression (49), and a theoretical duty D12 which is a ratio of a period from t11 to t12 with respect to the period from 0 to t12 is represented by Expression (50).

$$D11=(Vc1-|vac|-Vc2)/(Vc1-Vc2) \qquad (49)$$

$$D12=1-D11 \qquad (50)$$

In addition, under the assumption of $\Delta iac13=-\Delta iac14$, a theoretical duty D13 which is a ratio of a period from t12 to t13 with respect to a period from t12 to Tsw is represented by Expression (51), and a theoretical duty D14 which is a ratio of a period from t13 to Tsw with respect to the period from t12 to Tsw is represented by Expression (52).

$$D13=(Vc2-|vac|)/Vc2 \qquad (51)$$

$$D14=1-D13 \qquad (52)$$

In addition, under the assumption of $\Delta iac15=-\Delta iac16$, a theoretical duty D15 which is a ratio of a period from Tsw to t14 with respect to a period from Tsw to t15 is represented by Expression (53), and a theoretical duty D16 which is a ratio of a period from t14 to t15 with respect to the period from Tsw to t15 is represented by Expression (54).

$$D15=(Vc1-|vac|-Vc3)/(Vc1-Vc3) \qquad (53)$$

$$D16=1-D15 \qquad (54)$$

In addition, under the assumption of $\Delta iac17=-\Delta iac18$, a theoretical duty D17 which is a ratio of a period from t15 to t16 with respect to a period from t15 to 2Tsw is represented by Expression (55), and a theoretical duty D18 which is a ratio of a period from t16 to 2Tsw with respect to the period from t15 to 2Tsw is represented by Expression (56).

$$D17=(Vc3-|vac|)/Vc3 \qquad (55)$$

$$D18=1-D17 \qquad (56)$$

Figure 48:
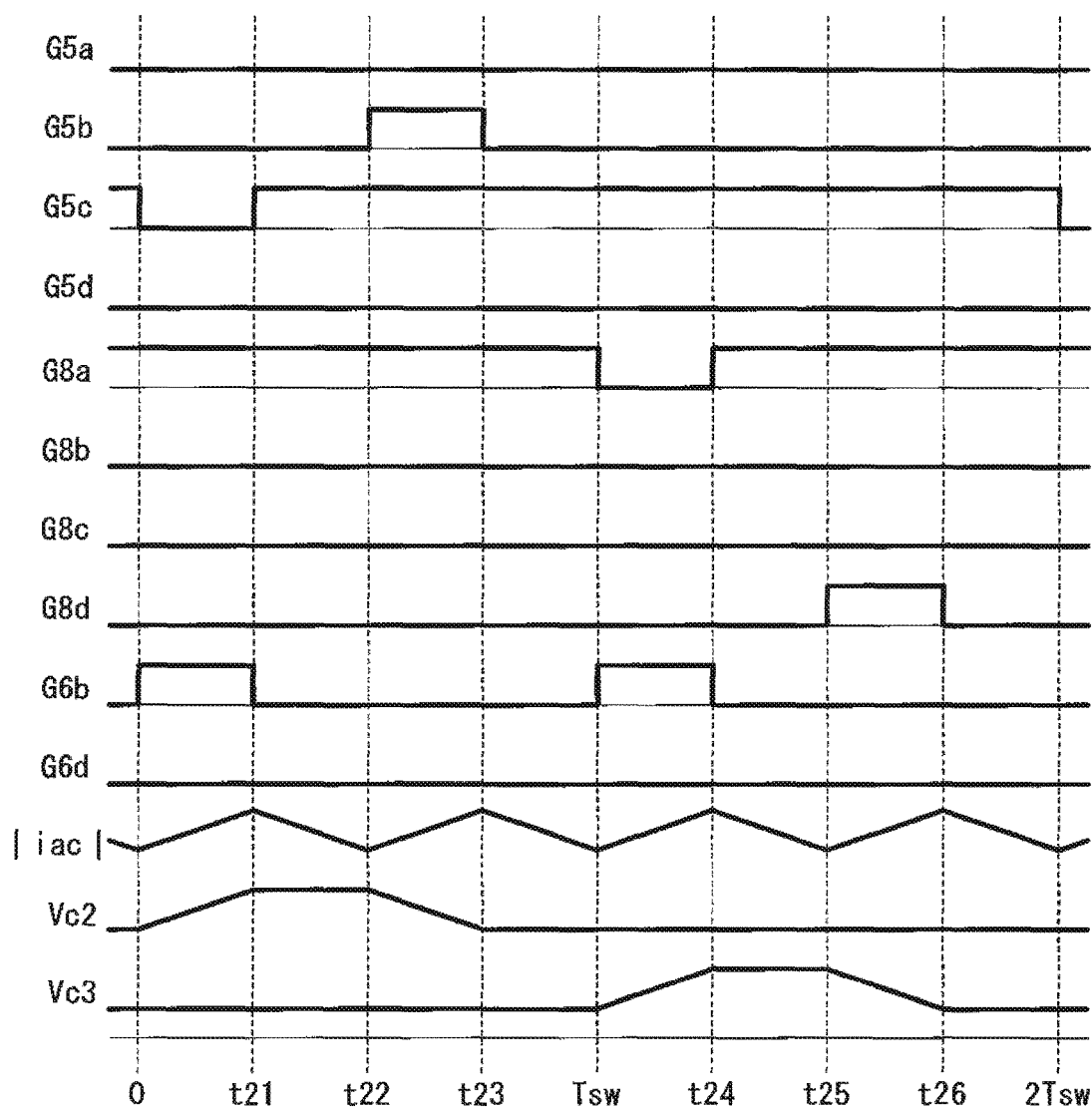
FIG. 48 is a waveform schematic diagram showing the operation state in an area 2 in the positive half wave of the AC power supply 1, in the power conversion device according to embodiment 2 of the present invention.

Next, FIG. 48 shows a schematic diagram of operation during the switching cycle 2Tsw, in the area 2 in the positive half wave of the AC power supply 1. In the switching cycle Tsw in the first half, the single-phase inverter 300 and the single-phase converter 200 operate, and in the switching cycle Tsw in the second half, the single-phase inverter 400 and the single-phase converter 200 operate. The switching cycle Tsw is divided into four periods and driving is performed by high-frequency PWM.

Figure 49:
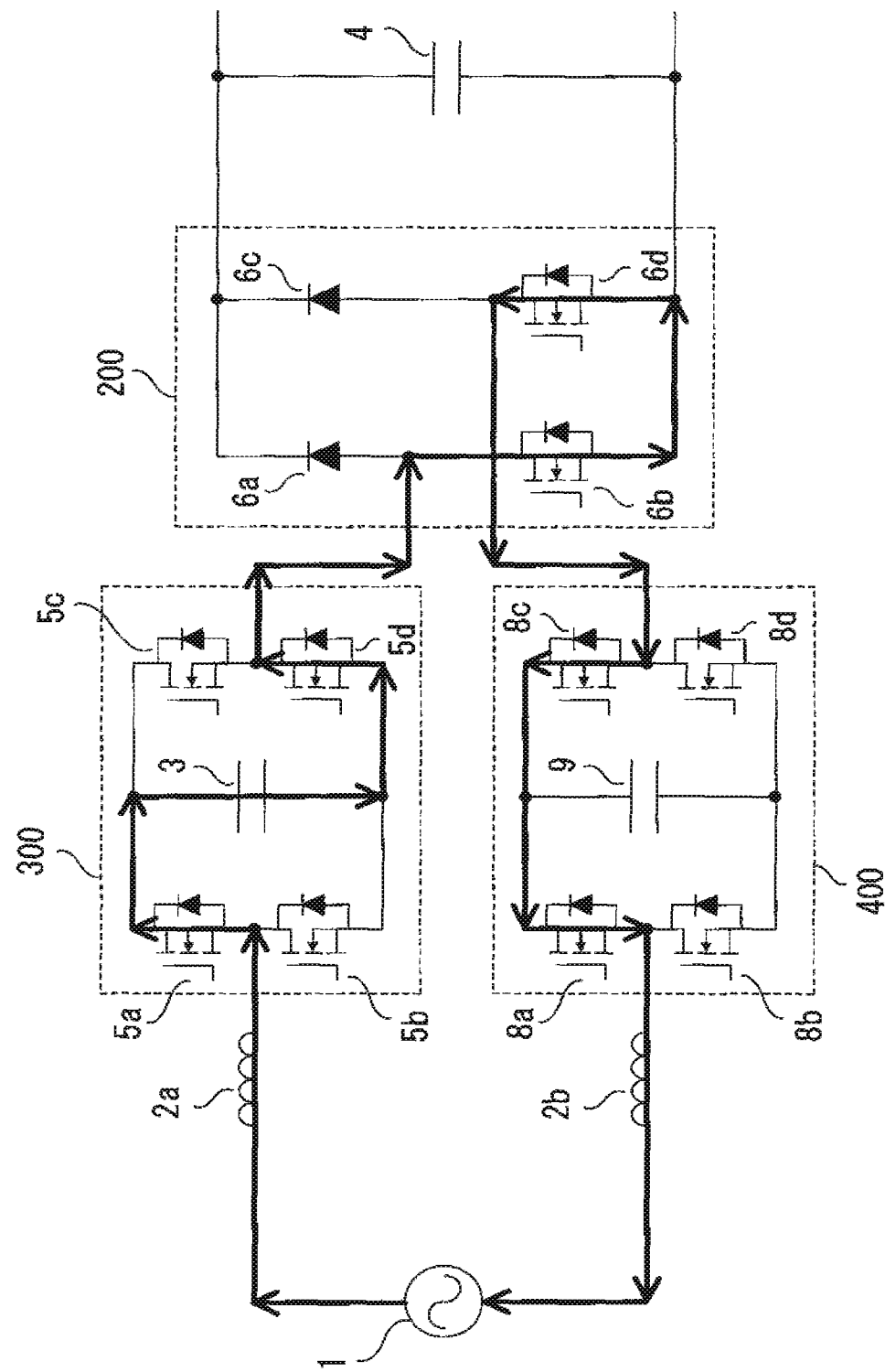
FIG. 49 is a diagram showing a current route in a first period in FIG. 48.

In the first period of 0<t≤t21, the switch elements 6b, 8a are ON and current |iac| of the AC power supply 1 increases. The current at this time flows through a route shown in FIG. 49. The route is as follows: AC power supply 1→reactor $2a$→switch element $5a$→DC capacitor 3→switch element $5d$→switch element $6b$→switch element $6d$→switch element $8c$→switch element $8a$→reactor $2b$→AC power supply 1. During this period, current flows through the DC capacitor 3 in a charging direction and therefore voltage Vc2 increases, and current does not flow through the DC capacitor 9 and therefore voltage Vc3 is constant. A current change amount $\Delta iac21$ during this period is represented by the following Expression (57) and becomes a positive value.

$$\Delta iac21=((|vac|-Vc2)/L)\cdot t21 \qquad (57)$$

Figure 50:
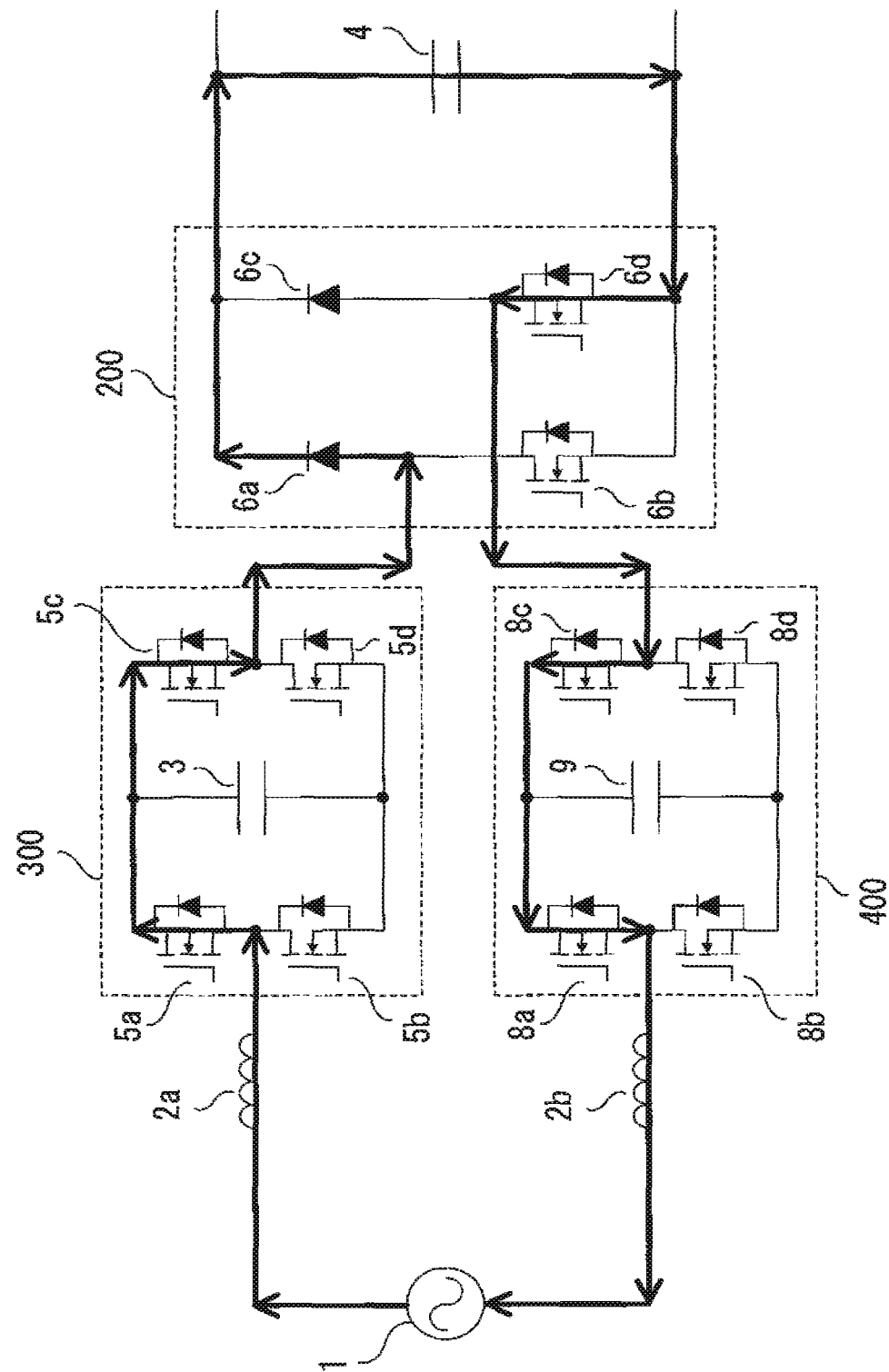
FIG. 50 is a diagram showing a current route in a second period in FIG. 48.
Figure 51:
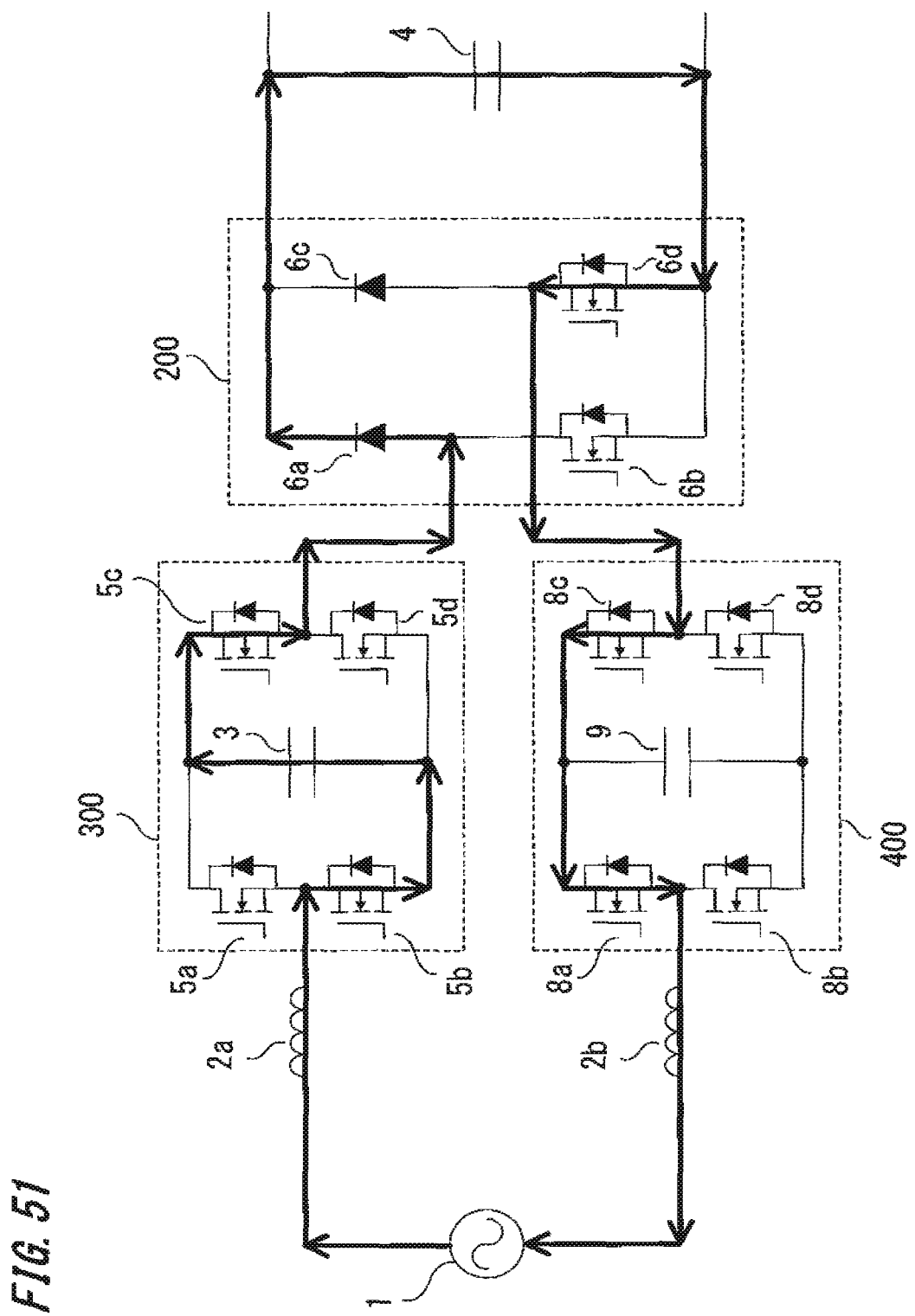
FIG. 51 is a diagram showing a current route in a third period in FIG. 48.

In the second period of t21<t≤t22, the switch elements 5c, 8a are ON and current |iac| of the AC power supply 1 decreases. The current at this time flows through a route shown in FIG. 50. The route is as follows: AC power supply 1→reactor 2a→switch element 5a→switch element 5c→diode 6a→smoothing capacitor 4→switch element 6d→switch element 8c→switch element 8a→reactor 2b→AC power supply 1. During this period, current does not flow through the DC capacitor 3 and the DC capacitor 9, and therefore voltages Vc2 and Vc3 are constant. A current change amount Δiac22 during this period is represented by the following Expression (58) and becomes a negative value.

$$\Delta iac22=((|vac|-Vc1)/L)\cdot(t22-t21) \qquad (58)$$

in the third period of t22<t≤t23, the switch elements 5b, 5c, 8a are ON and current |iac| of the AC power supply 1 increases. The current at this time flows through a route shown in FIG. 51. The route is as follows: AC power supply 1→reactor 2a→switch element 5b→DC capacitor 3→switch element 5c→diode 6a→smoothing capacitor 4→switch element 6d→switch element 8c→switch element 8a→reactor 2b→AC power supply 1. During this period, current flows through the DC capacitor 3 in a discharging direction and therefore voltage Vc2 decreases, and current does not flow through the DC capacitor 9 and therefore voltage Vc3 is constant. A current change amount Δiac23 during this period is represented by the following Expression (59) and becomes a positive value.

$$\Delta iac23=((|vac|+Vc2-Vc1)/L)\cdot(t23-t22) \qquad (59)$$

Figure 52:
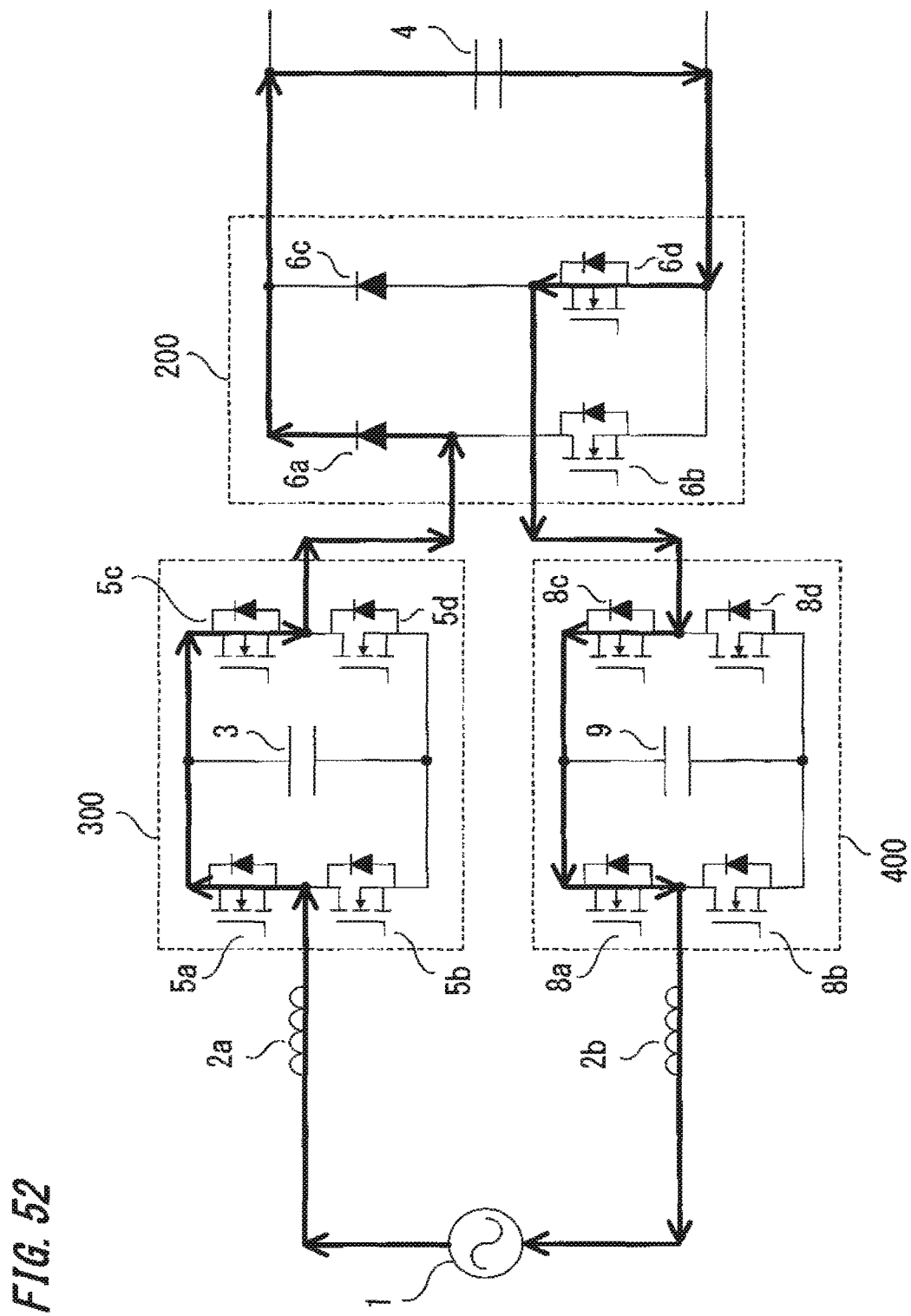
FIG. 52 is a diagram showing a current route in a fourth period in FIG. 48.

In the fourth period of t23<t≤Tsw, the switch elements 5c, 8a are ON and current |iac| of the AC power supply 1 decreases. The current at this time flows through a route shown in FIG. 52. The route is as follows: AC power supply 1→reactor 2a→switch element 5a→switch element 5c→diode 6a→smoothing capacitor 4→switch element 6d→switch element 8c→switch element 8a→reactor 2b→AC power supply 1. During this period, current does not flow through the DC capacitor 3 and the DC capacitor 9, and therefore voltages Vc2 and Vc3 are constant. A current change amount Δiac24 during this period is represented by the following Expression (60) and becomes a negative value.

$$\Delta iac24=((|vac|-Vc1)/L)\cdot(Tsw-t23) \qquad (60)$$

Figure 53:
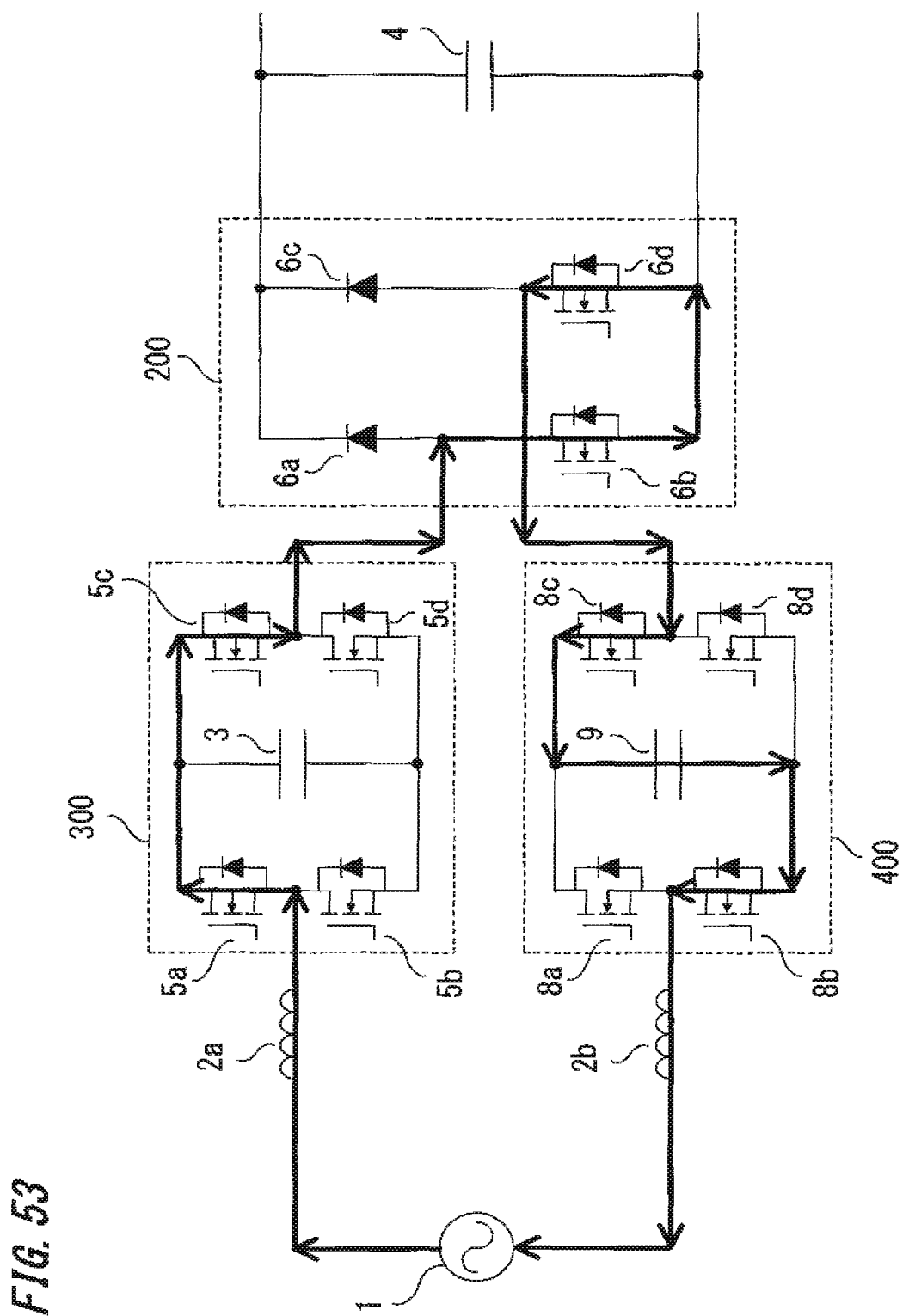
FIG. 53 is a diagram showing a current route in a fifth period in FIG. 48.

In the fifth period of Tsw<t≤t24, the switch elements 5c, 6b are ON and current |iac| of the AC power supply 1 increases. The current at this time flows through a route shown in FIG. 53. The route is as follows: AC power supply 1→reactor 2a→switch element 5a→switch element 5c→switch element 6b→switch element 6d→switch element 8c→DC capacitor 9→switch element 8b→reactor 2b→AC power supply 1. During this period, current flows through the DC capacitor 9 in a charging direction and therefore voltage Vc3 increases, and current does not flow through the DC capacitor 3 and therefore voltage Vc2 is constant. A current change amount Δiac25 during this period is represented by the following Expression (61) and becomes a positive value.

$$\Delta iac25=((|vac|-Vc3)/L)\cdot(t24-Tsw) \qquad (61)$$

Figure 54:
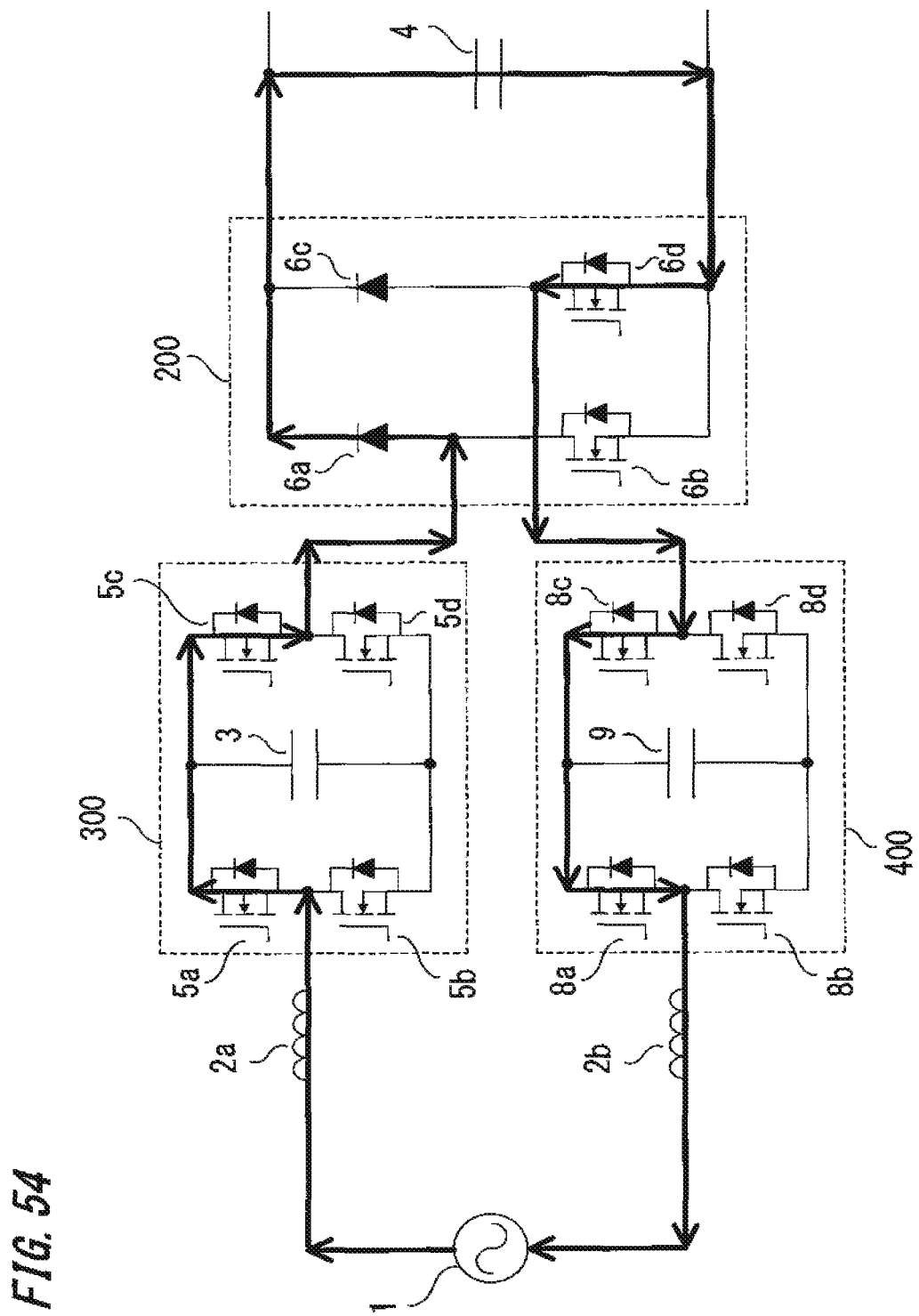
FIG. 54 is a diagram showing a current route in a sixth period in FIG. 48.

In the sixth period of t24<t→t25, the switch elements 5c, 8a are ON and current |iac| of the AC power supply 1 decreases. The current at this time flows through a route shown in FIG. 54. The route is as follows: AC power supply 1→reactor 2a→switch element 5a→switch element 5c→diode 6a→smoothing capacitor 4→switch element 6d→switch element 8c→switch element 8a→reactor 2b→AC power supply 1. During this period, current does not flow through the DC capacitor 3 and the DC capacitor 9, and therefore voltages Vc2 and Vc3 are constant. A current change amount Δiac26 during this period is represented by the following Expression (62) and becomes a negative value.

$$\Delta iac26=((|vac|-Vc1)/L)\cdot(t25-t24) \qquad (62)$$

Figure 55:
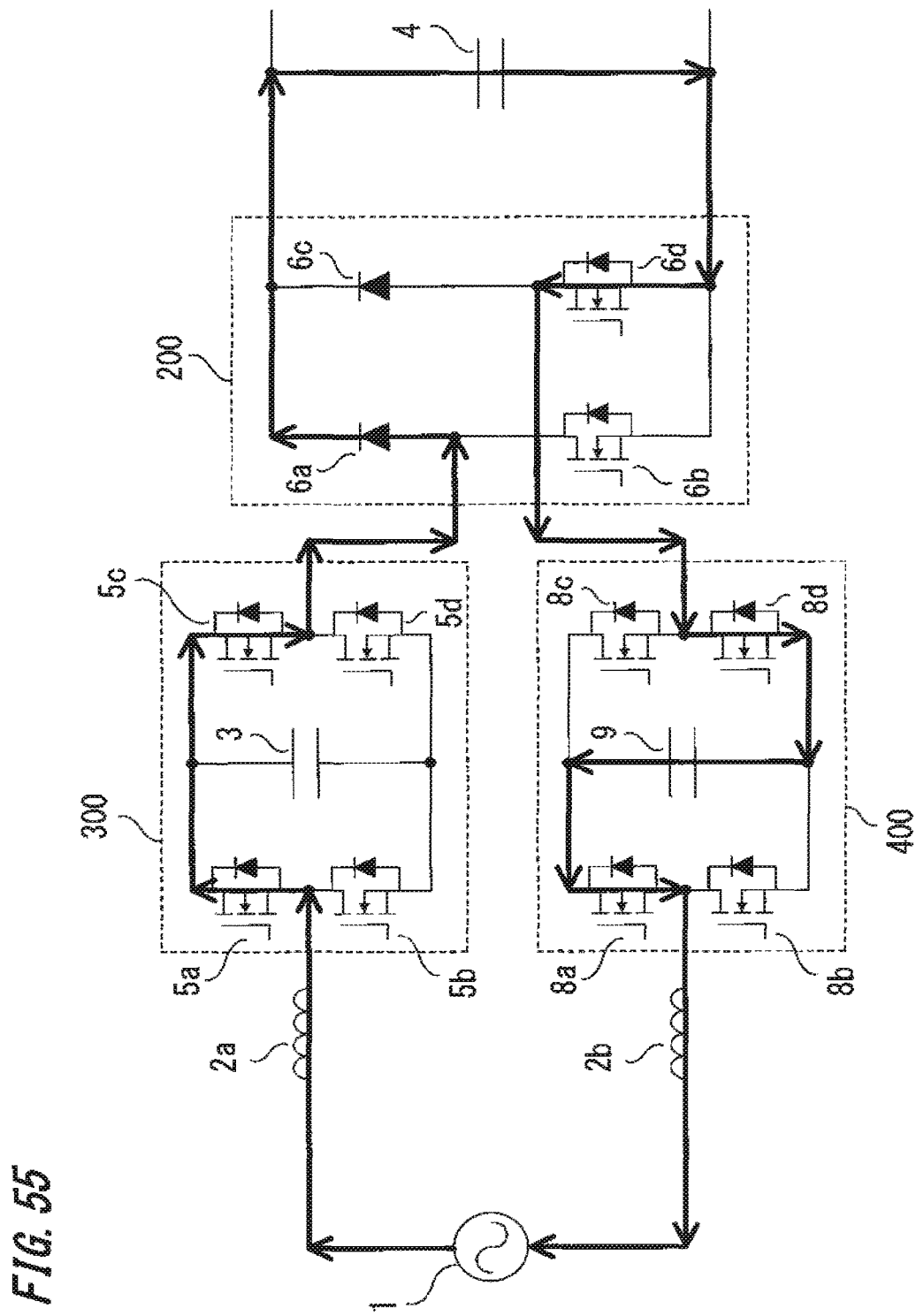
FIG. 55 is a diagram showing a current route in a seventh period in FIG. 48.

In the seventh period of t25<t≤t26, the switch elements 5c, 8a, 8d are ON and current |iac| of the AC power supply 1 increases. The current at this time flows through a route shown in FIG. 55. The route is as follows: AC power supply 1→reactor 2a→→switch element 5a→switch element 5c→diode 6a→smoothing capacitor 4→switch element 6d→switch element 8d→DC capacitor 9→switch element 8a→reactor 2b→AC power supply 1. During this period, current flows through the DC capacitor 9 in a discharging direction and therefore voltage Vc3 decreases, and current does not flow through the DC capacitor 3 and therefore voltage Vc2 is constant. A current change amount Δiac27 during this period is represented by the following Expression (63) and becomes a positive value.

$$\Delta iac27=((|vac|+Vc3-Vc1)/L)\cdot(t26-t25) \qquad (63)$$

Figure 56:
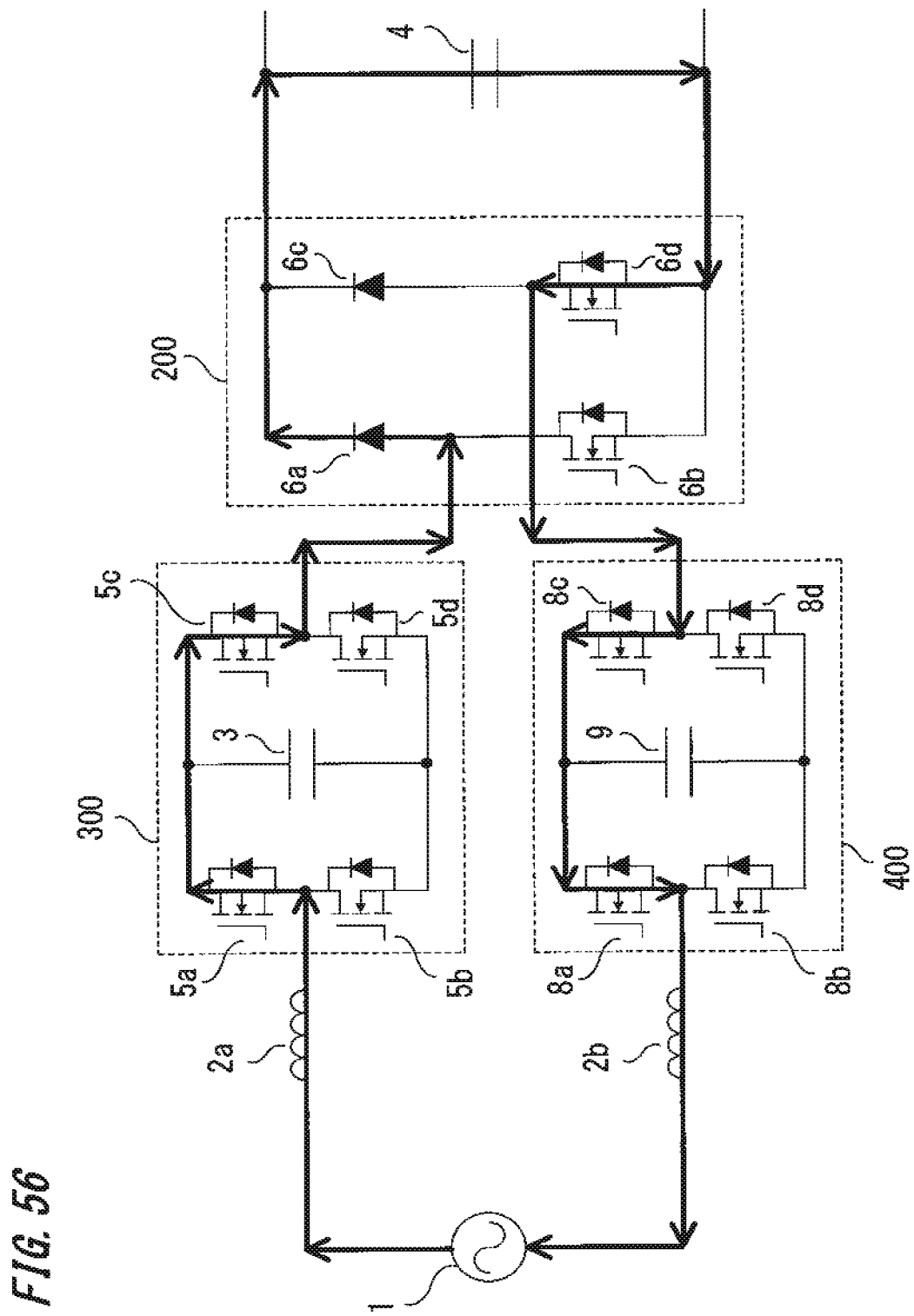
FIG. 56 is a diagram showing a current route in an eighth period in FIG. 48.

In the eighth period of t26<t≤2Tsw, the switch elements 5c, 8a are ON and current |iac| of the AC power supply 1 decreases. The current at this time flows through a route shown in FIG. 56. The current is as follows: AC power supply 1→reactor 2a→switch element 5a→switch element 5c→diode 6a→smoothing capacitor 4→switch element 6d→switch element 8c→switch element 8a→reactor 2b→AC power supply 1. During this period, current does not flow through the DC capacitor 3 and the DC capacitor 9, and therefore voltages Vc2 and Vc3 are constant. A current change amount Δiac28 during this period is represented by the following Expression (64) and becomes a negative value.

$$\Delta iac28=((|vac|-Vc1)/L)\cdot(2Tsw-t26) \qquad (64)$$

At this time, under the assumption of |iac21=−Δiac22, a theoretical duty D21 which is a ratio of a period from 0 to t21 with respect to a period from 0 to t22 is represented by Expression (65), and a theoretical duty D22 which is a ratio of a period from t21 to t22 with respect to the period from 0 to t22 is represented by Expression (66).

$$D21=(Vc1-|vac|)/(Vc1-Vc2) \qquad (65)$$

$$D22=1-D21 \qquad (66)$$

In addition, under the assumption of Δiac23=−Δiac24, a theoretical duty D23 which is a ratio of a period from t22 to t23 with respect to a period from t22 to Tsw is represented by Expression (67), and a theoretical duty D24 which is a ratio of a period from t23 to Tsw with respect to the period from t22 to Tsw is represented by Expression (68).

$$D23=(Vc1-|vac|)/Vc2 \qquad (67)$$

$$D24=1-D23 \qquad (68)$$

In addition, under the assumption of Δiac25=−Δiac26, a theoretical duty D25 which is a ratio of a period from Tsw to t24 with respect to a period from Tsw to t25 is represented by Expression (69), and a theoretical duty D26 which is a ratio of a period from t24 to t25 with respect to the period from Tsw to t25 is represented by Expression (70).

$$D25=(Vc1-|vac|)/(Vc1-Vc3) \qquad (69)$$

$$D26=1-D25 \qquad \text{Expression (70)}$$

In addition, under the assumption of Δiac27=−Δiac28, a theoretical duty D27 which is a ratio a period from t25 to t26 with respect to a period from t25 to 2Tsw is represented by Expression (71), and a theoretical duty D28 which is a ratio of a period from t26 to 2Tsw with respect to the period from t25 to 2Tsw is represented by Expression (72).

$$D27=(Vc1-|vac|)/Vc3 \quad (71)$$

$$D28=1-D27 \quad (72)$$

Figure 57:
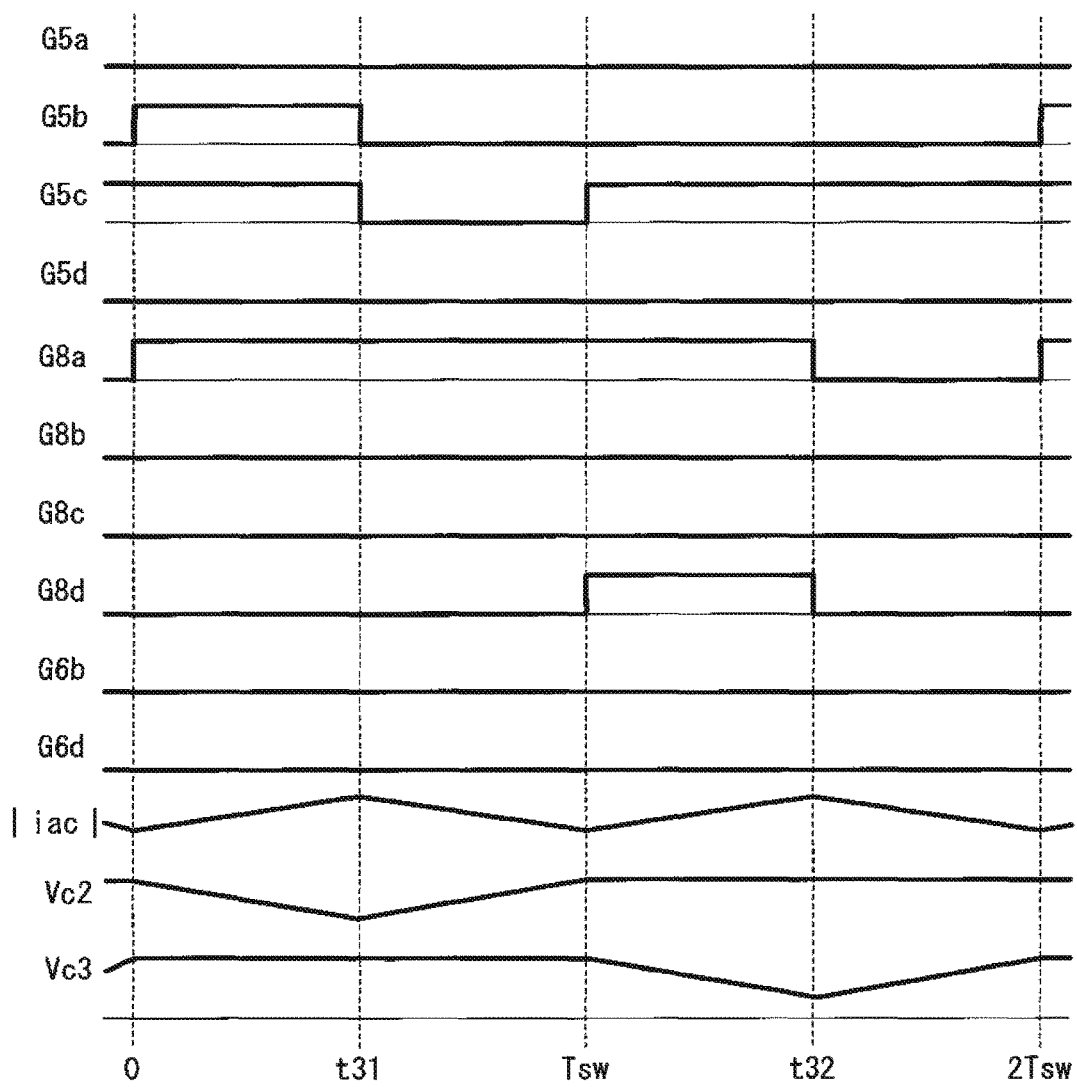
FIG. 57 is a waveform schematic diagram showing the operation state in an area 3 in the positive half wave of the AC power supply 1, in the power conversion device according to embodiment 2 of the present invention.

FIG. 57 shows a schematic diagram of operation during the switching cycle 2Tsw, in the area 3 in the positive half wave of the AC power supply 1. In the switching cycle Tsw in the first half, the single-phase inverter 300 operates, and in the switching cycle Tsw in the second half, the single-phase inverter 400 operates. The switching cycle Tsw is divided into two periods and driving is performed by high-frequency PWM.

In the first period of 0<t≤t31, the switch elements 5b, 5c, 8a are ON and current |iac| of the AC power supply 1 increases. The current at this time flows through a route shown in FIG. 58. The route is as follows: AC power supply 1→reactor 2a→switch element 5b→DC capacitor 3→switch element 5c→diode 6a→smoothing capacitor 4→switch element 6d→switch element 8c→switch element 8a→reactor 2b→AC power supply 1. During this period, current flows through the DC capacitor 3 in a discharging direction and therefore voltage Vc2 decreases, and current does not flow through the DC capacitor 9 and therefore voltage Vc3 is constant. A current change amount Δiac31 during this period is represented by the following Expression (73) and becomes a positive value.

$$\Delta iac31=((|vac|+Vc2-Vc1)/L)\cdot t31 \quad (73)$$

In the second period of t31<t≤Tsw, the switch element 8a is ON and current |iac| of the AC power supply 1 decreases. The current at this time flows through a route shown in FIG. 59. The route is as follows: AC power supply 1→reactor 2a→switch element 5a→DC capacitor 3→switch element 5d→diode 6a→smoothing capacitor 4→switch element 6d→switch element 8c→switch element 8a→reactor 2b→AC power supply 1. During this period, current flows through the DC capacitor 3 in a charging direction and therefore voltage Vc2 increases, and current does not flow through the DC capacitor 9 and therefore voltage Vc3 is constant. A current change amount Δiac32 during this period is represented by the following Expression (74) and becomes a negative value.

$$\Delta iac32=((|vac|-Vc2-Vc1)/L)\cdot(Tsw-t31) \quad (74)$$

In the third period of Tsw<t≤t32, the switch elements 5c, 8a, 8d are ON and current |iac| of the AC power supply 1 increases. The current at this time flows through a route shown in FIG. 60. The route is as follows: AC power supply 1→reactor 2a→switch element 5a→switch element 5c→diode 6a→smoothing capacitor 4→switch element 6d→switch element 8d→DC capacitor 9→switch element 8a→reactor 2b→AC power supply 1. During this period, current flows through the DC capacitor 9 in a discharging direction and therefore voltage Vc3 decreases, and current does not flow through the DC capacitor 3 and therefore voltage Vc2 is constant. A current change amount Δiac33 during this period is represented by the following Expression (75) and becomes a positive value.

$$\Delta iac33=((|vac|+Vc3-Vc1)/L)\cdot(t32-Tsw) \quad (75)$$

In the fourth period of t32<t≤2Tsw, the switch element 5c is ON and current |iac| of the AC power supply 1 decreases. The current at this time flows through a route shown in FIG. 61. The route is as follows: AC power supply 1 reactor 2a→switch element 5a→switch element 5c→diode 6a→smoothing capacitor 4→switch element 8c→DC capacitor 9→switch element 8b→reactor 2b→AC power supply 1. During this period, current flows through the DC capacitor 9 in a charging direction and therefore voltage Vc3 increases, and current does not flow through the DC capacitor 3 and therefore voltage Vc2 is constant. A current change amount Δiac34 during this period is represented by the following Expression (76) and becomes a negative value.

$$\Delta iac34=((|vac|-Vc3-Vc1)/L)\cdot(2Tsw-t32) \quad (76)$$

At this time, under the assumption of Δiac31=−Δiac32, a theoretical duty D31 which is a ratio of a period from 0 to t31 with respect to a period from 0 to Tsw is represented by Expression (77), and a theoretical duty D32 which is a ratio of a period from t31 to t32 with respect to the period from 0 to Tsw is represented by Expression (78).

$$D31=(Vc1+Vc2-|vac|)/2Vc2 \quad (77)$$

$$D32=1-D31 \quad (78)$$

In addition, under the assumption of Δiac33=−Δiac34, a theoretical duty D33 which is a ratio of a period from Tsw to t32 with respect to a period from Tsw to 2Tsw is represented by Expression (79), and a theoretical duty D34 which is a ratio of a period from t32 to 2Tsw with respect to the period from Tsw to 2Tsw is represented by Expression (80).

$$D33=(Vc1+Vc3-|vac|)/2Vc3 \quad (79)$$

$$D34=1-D33 \quad (80)$$

Next, driving methods and current routes in the areas 1 to 3 in the negative half wave will be described.

Figure 62:
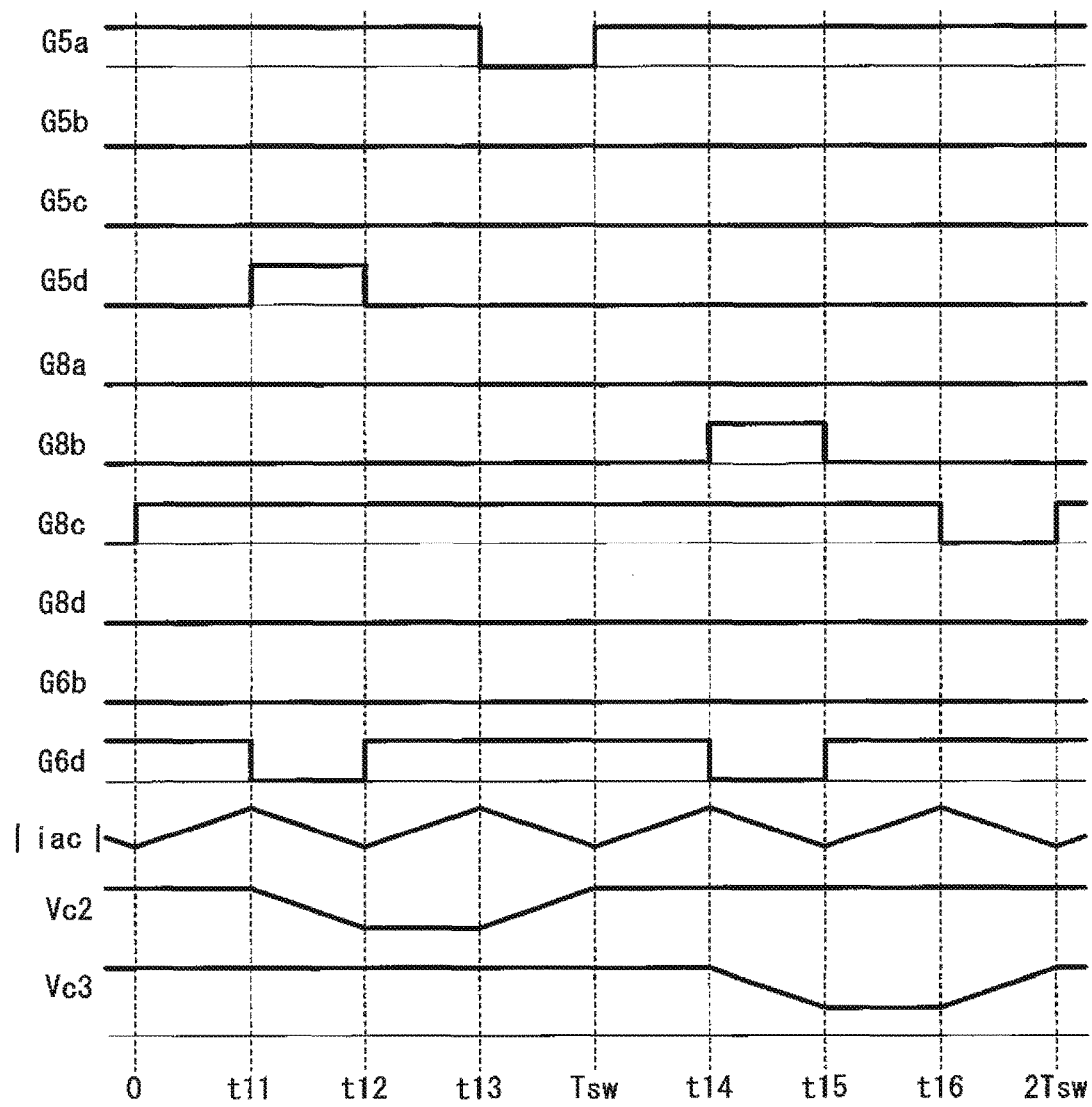
FIG. 62 is a waveform schematic diagram showing the operation state in an area 1 in the negative half wave of the AC power supply 1, in the power conversion device according to embodiment 2 of the present invention.

FIG. 62 shows a schematic diagram of operation during the switching cycle 2Tsw, in the area 1 in the negative half wave of the AC power supply 1. In the switching cycle Tsw in the first half, the single-phase inverter 300 and the single-phase converter 200 operate, and in the switching cycle Tsw in the second half, the single-phase inverter 400 and the single-phase converter 200 operate. The switching cycle Tsw is divided into four periods and driving is performed by high-frequency PWM.

Figure 63:
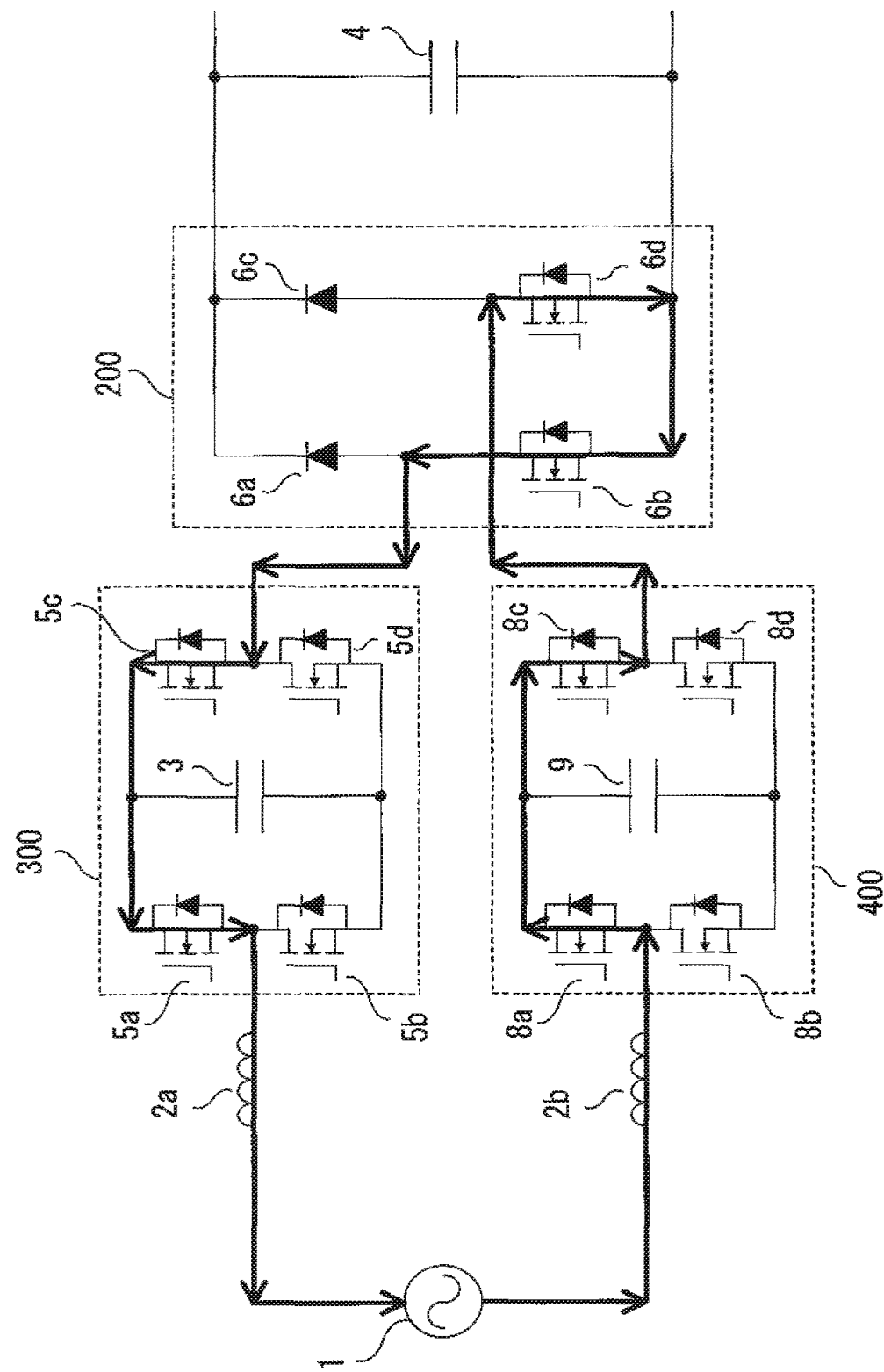
FIG. 63 is a diagram showing a current route in a first period in FIG. 62.

In the first period of 0<t≤t11, the switch elements 5a, 6d, 8c are ON and current |iac| of the AC power supply 1 increases. The current at this time flows through a route shown in FIG. 63. The route is as follows: AC power supply 1→reactor 2b→switch element 8a→switch element 8c→switch element 6d→switch element 6b→switch element 5c→switch element 5a→reactor 2a→AC power supply 1. During this period, current does not flow through the DC capacitor 3 and the DC capacitor 9, and therefore voltages Vc2 and Vc3 are constant. A current change amount Δiac11 during this period is represented by the following Expression (81) and becomes a positive value.

$$\Delta iac11=(|vac|/L)\cdot t11 \quad (81)$$

Figure 64:
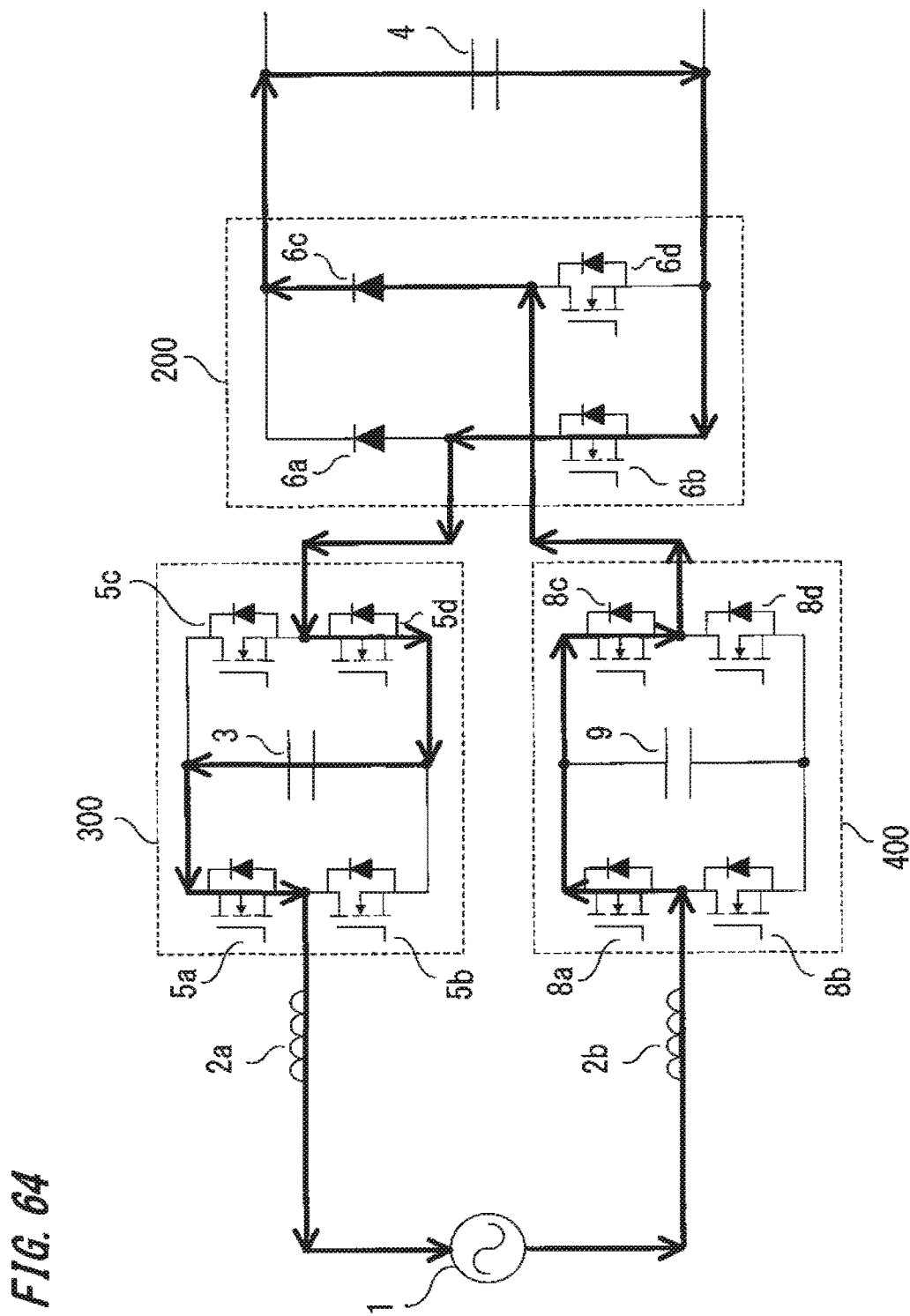
FIG. 64 is a diagram showing a current route in a second period in FIG. 62.

In the second period of t11<t≤t12, the switch elements 5a, 5d, 8c are ON and current |iac| of the AC power supply 1 decreases. The current at this time flows through a route shown in FIG. 64. The route is as follows: AC power supply 1→reactor 2b→switch element 8a→switch element 8c→diode 6c→smoothing capacitor 4→switch element 6b→switch element 5d→DC capacitor 3→switch element 5a→reactor 2a→AC power supply 1. During this period, current flows through the DC capacitor 3 in a discharging direction, so that voltage Vc2 decreases, and current does not flow through the DC capacitor 9 and therefore voltage Vc3 is constant. A current change amount Δiac12 during this period is represented by the following Expression (82) and becomes a negative value.

$$\Delta iac12=((|vac|+Vc2-Vc1)/L)\cdot(t12-t11) \quad (82)$$

Figure 65:
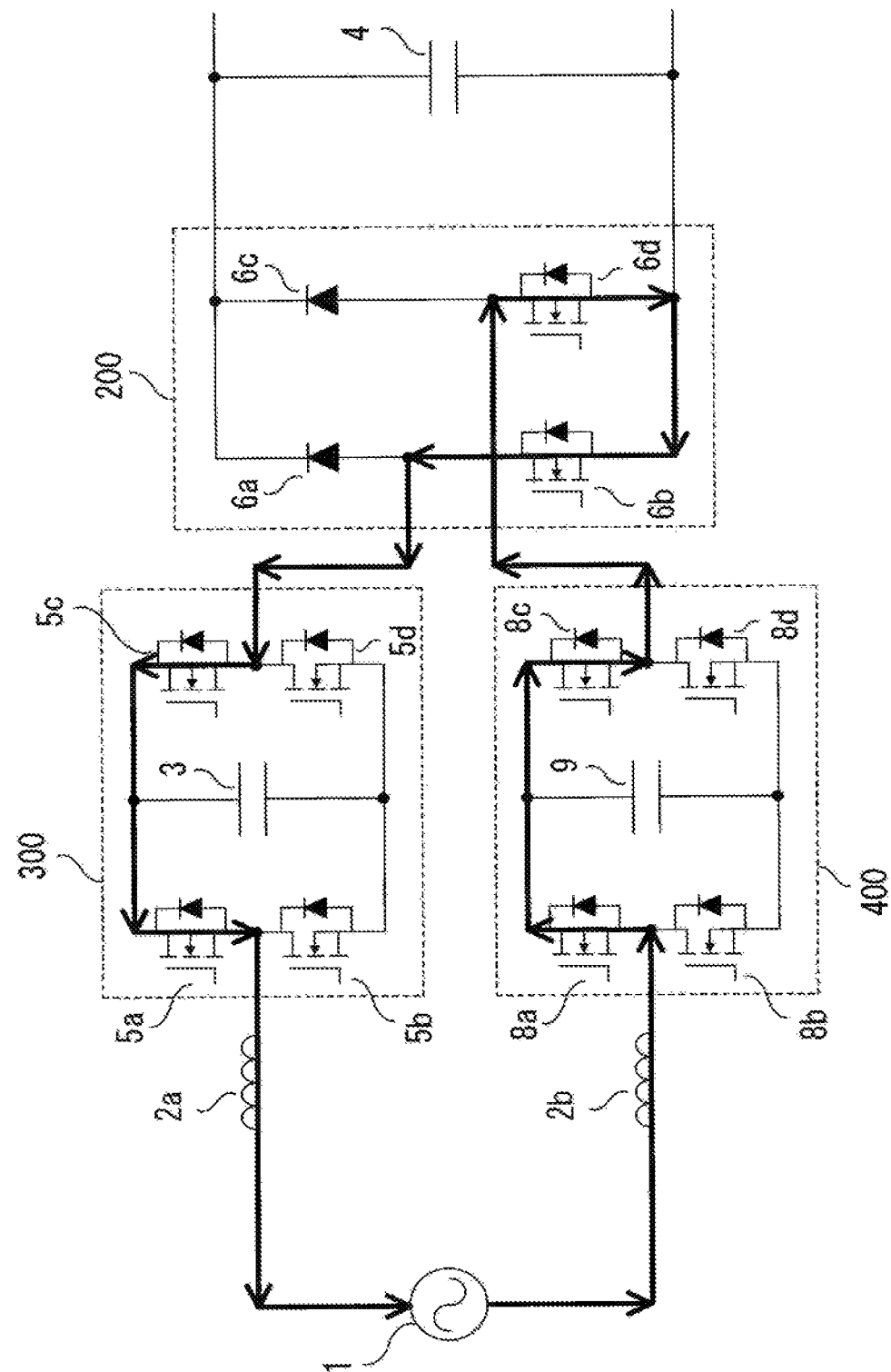
FIG. 65 is a diagram showing a current route in a third period in FIG. 62.

In the third period of t12<t≤t13, the switch elements 5a, 6d, 8c are ON and current |iac| of the AC power supply 1 increases. The current at this time flows through a route shown in FIG. 65. The route is as follows: AC power supply 1→reactor 2b→switch element 8a→switch element 8c→switch element 6d→switch element 6b→switch element 5c→switch element 5a→reactor 2a→AC power supply 1. During this period, current does not flow through the DC capacitor 3 and the DC capacitor 9, and therefore voltages Vc2 and Vc3 are constant. A current change amount Δiac13 during this period is represented by the following Expression (83) and becomes a positive value.

$$\Delta iac13=(|vac|/L)\cdot(t13-t12) \quad (83)$$

Figure 66:
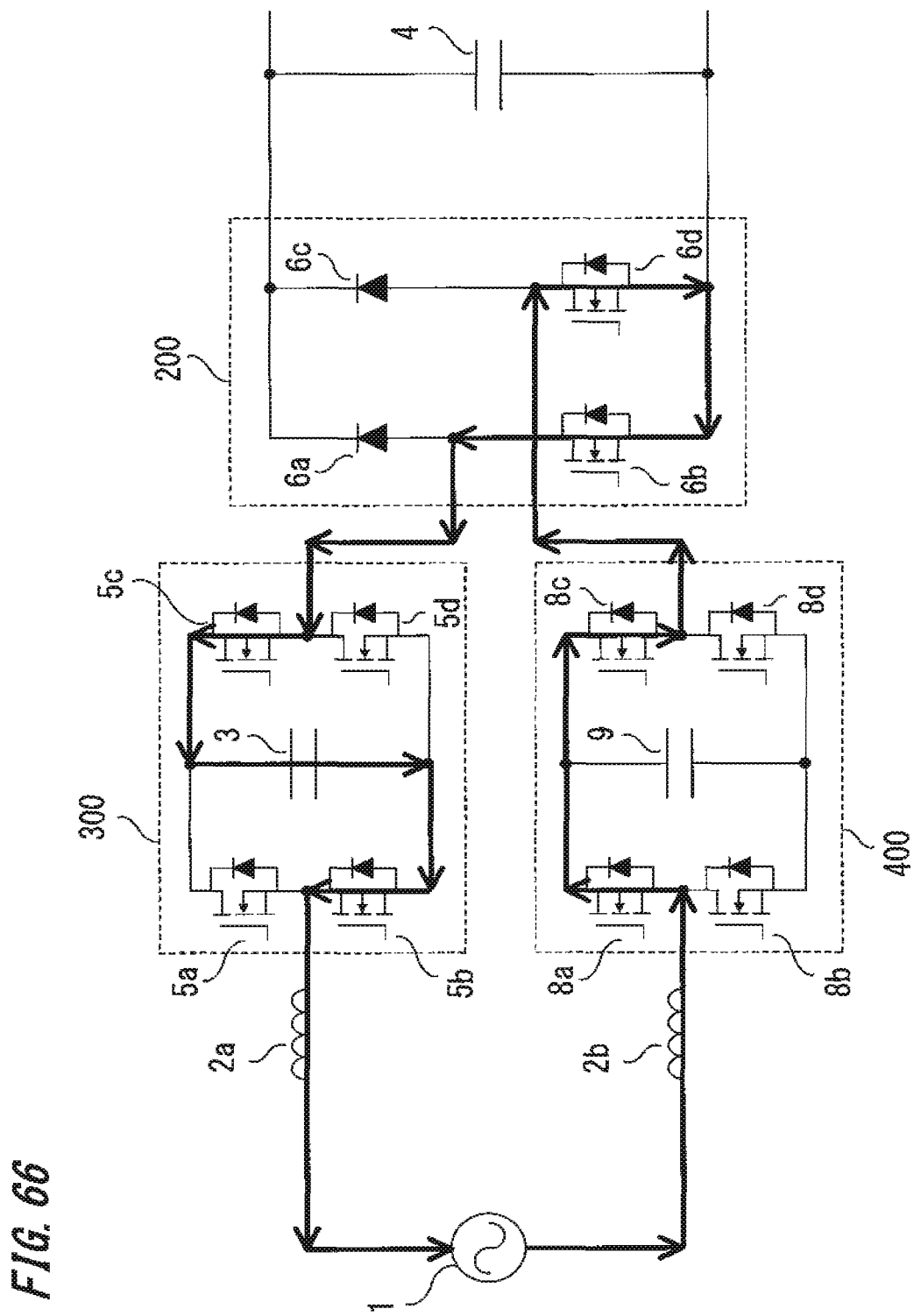
FIG. 66 is a diagram showing a current route in a fourth period in FIG. 62.

In the fourth period of t13<t≤Tsw, the switch elements 6d, 8c are ON and current |iac| of the AC power supply 1 decreases. The current at this time flows through a route shown in FIG. 66. The route is as follows: AC power supply 1→reactor 2b→switch element 8a→switch element 8c→switch element 6d→switch element 6b→switch element 5c→DC capacitor 3→switch element 5b→reactor 2a→AC power supply 1. During this period, current flows through the DC capacitor 3 in a charging direction, so that voltage Vc2 increases, and current does not flow through the DC capacitor 9 and therefore voltage Vc3 is constant. A current change amount Δiac14 during this period is represented by the following Expression (84) and becomes a negative value.

$$\Delta iac14=((|vac|-Vc2)/L)\cdot(Tsw-t13) \quad (84)$$

Figure 67:
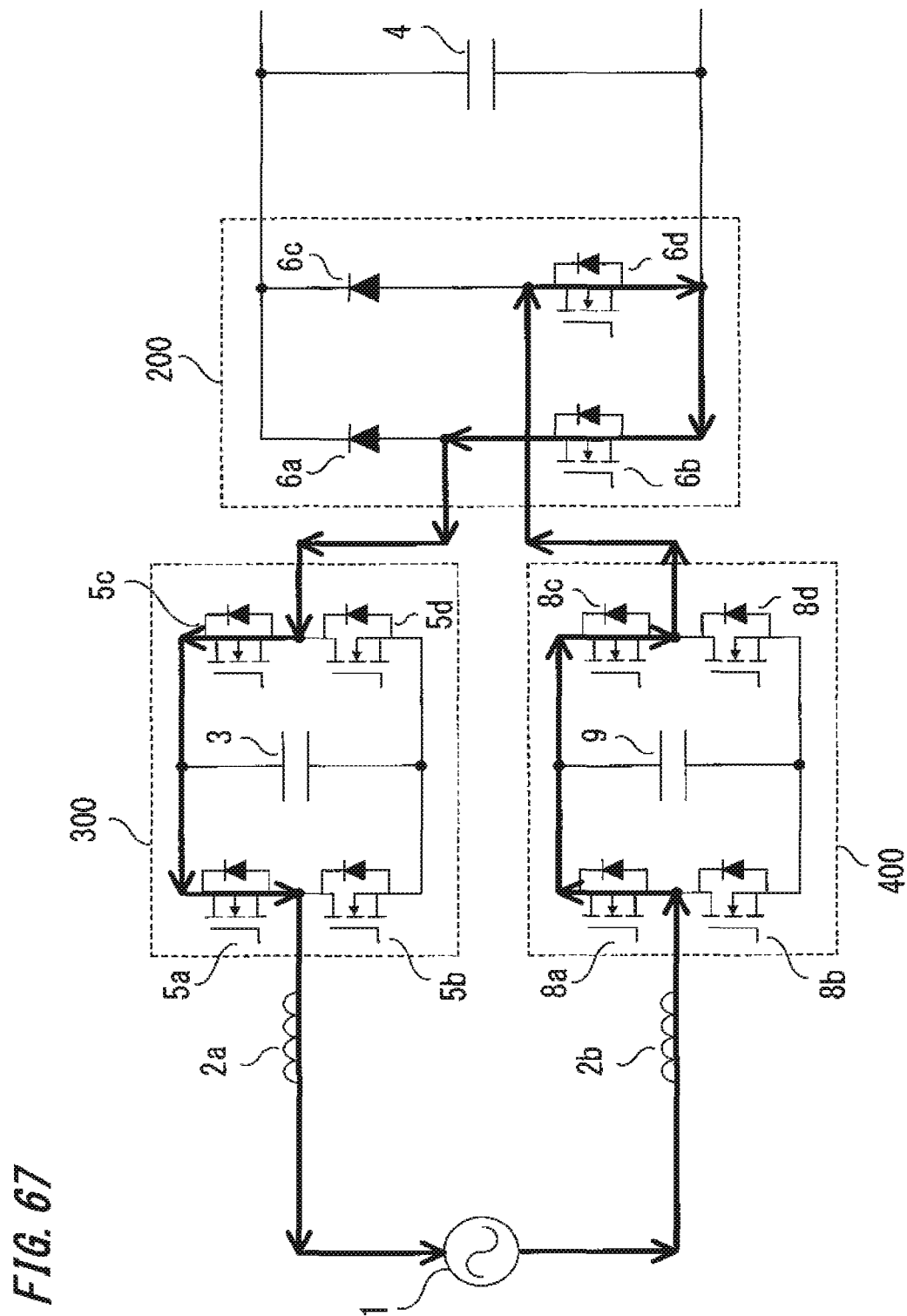
FIG. 67 is a diagram showing a current route in a fifth period in FIG. 62.

In the fifth period of Tsw<t≤t14, the switch elements 5a, 6d, 8c are ON and current |iac| of the AC power supply 1 increases. The current at this time flows through a route shown in FIG. 67. The route is as follows: AC power supply 1→reactor 2b→switch element 8a→switch element 8c→switch element 6d→switch element 6b→switch element 5c→switch element 5a→reactor 2a→AC power supply 1. During this period, current does not flow through the DC capacitor 3 and the DC capacitor 9, and therefore voltages Vc2 and Vc3 are constant. A current change amount Δiac15 during this period is represented by the following Expression (85) and becomes a positive value.

$$\Delta iac15=(|vac|/L)\cdot(t14-Tsw) \quad (85)$$

Figure 68:
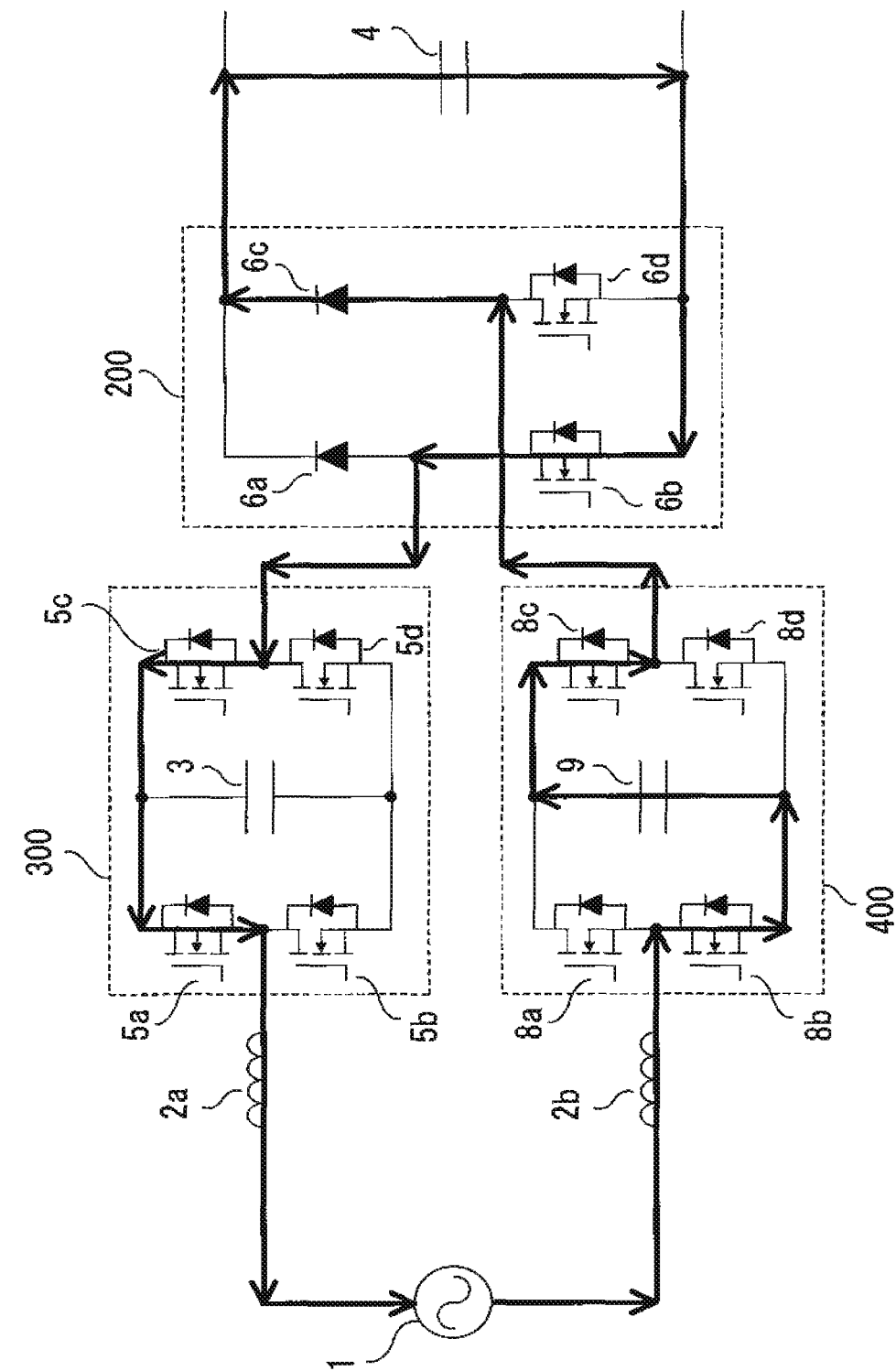
FIG. 68 is a diagram showing a current route in a sixth period in FIG. 62.

In the sixth period of t14<t≤t15, the switch elements 5a, 8b, 8c are ON and current |iac| of the AC power supply 1 decreases. The current at this time flows through a route shown in FIG. 68. The route is as follows: AC power supply 1→reactor 2b→switch element 8b→DC capacitor 9→switch element 8c→diode 6c→smoothing capacitor 4→switch element 6b→switch element 5c→switch element 5a→reactor 2a→AC power supply 1. During this period, current flows through the DC capacitor 9 in a discharging direction, so that voltage Vc3 decreases, and current does not flow through the DC capacitor 3 and therefore voltage Vc2 is constant. A current change amount Δiac16 during this period is represented by the following Expression (86) and becomes a negative value.

$$\Delta iac16=((|vac|+Vc3-Vc1)/L)\cdot(t15-t14) \quad (86)$$

Figure 69:
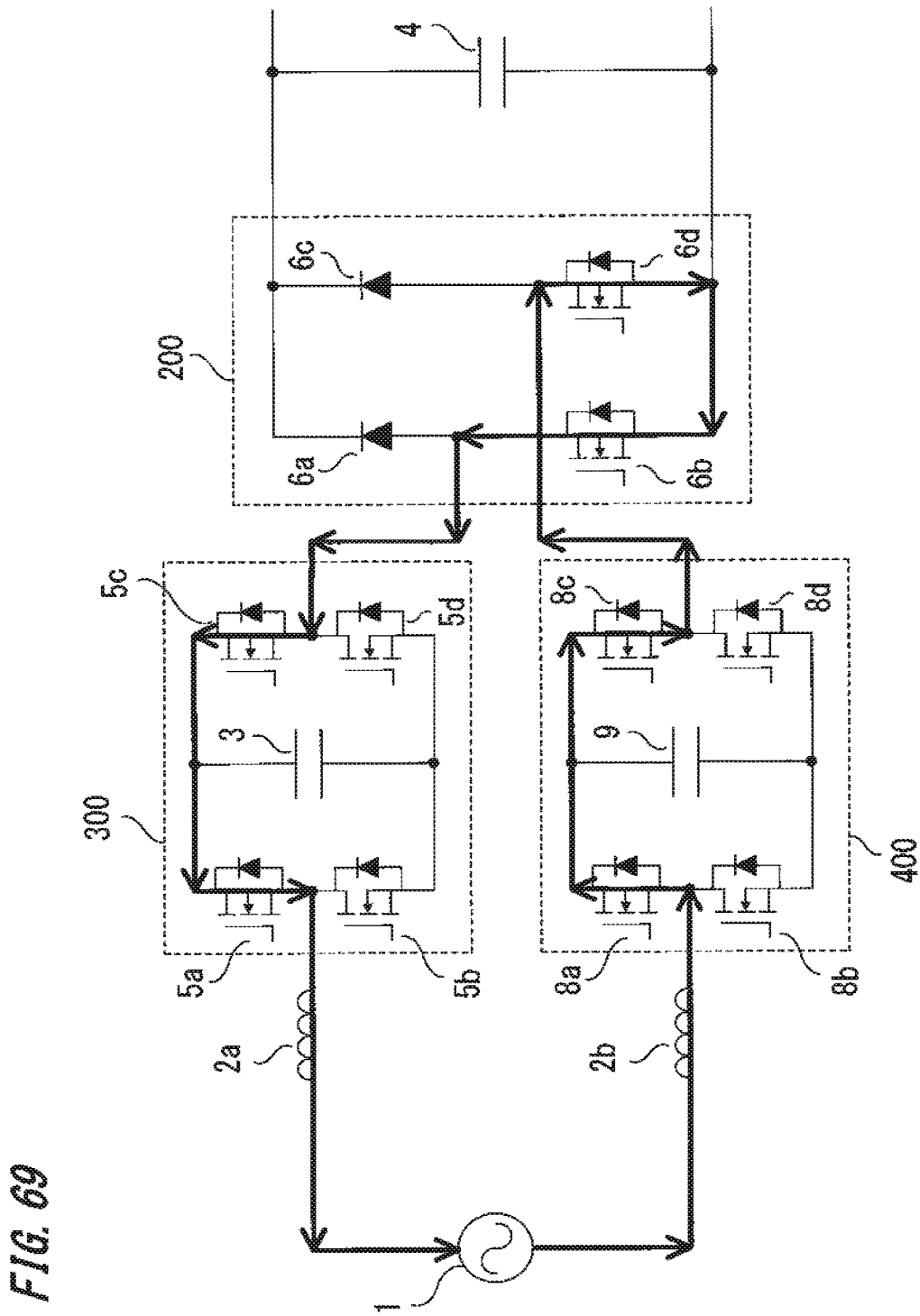
FIG. 69 is a diagram showing a current route in a seventh period in FIG. 62.

In the seventh period of t15<t≤t16, the switch elements 5a, 6d, 8c are ON and current |iac| of the AC power supply 1 increases. The current at this time flows through a route shown in FIG. 69. The route is as follows: AC power supply 1→reactor 2b→switch element 8a→switch element 8c→switch element 6d→switch element 6b→switch element 5c→switch element 5a→reactor 2a→AC power supply 1. During this period, current does not flow through the DC capacitor 3 and the DC capacitor 9, and therefore voltages Vc2 and Vc3 are constant. A current change amount Δiac17 during this period is represented by the following Expression (87) and becomes a positive value.

$$\Delta iac17=(|vac|/L)\cdot(t16-t15) \quad (87)$$

Figure 70:
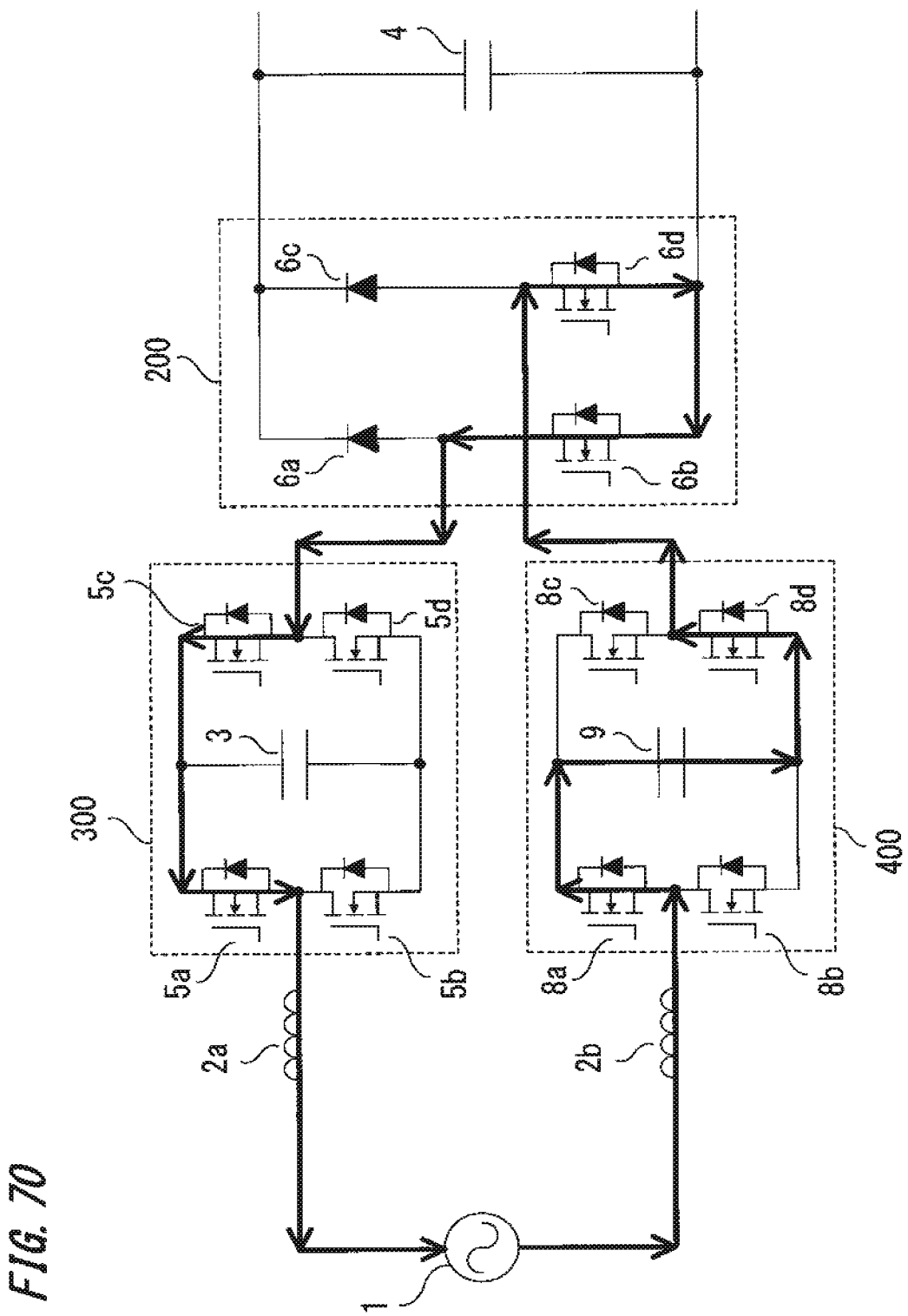
FIG. 70 is a diagram showing a current route in an eighth period in FIG. 62.

In the eighth period of t16<t≤2Tsw, the switch elements 5a, 6d are ON and current |iac| of the AC power supply 1 decreases. The current at this time flows through a route shown in FIG. 70. The route is as follows: AC power supply 1→reactor 2b→switch element 8a→DC capacitor 9→switch element 8d→switch element 6d→switch element 6b→switch element 5c→switch element 5a→reactor 2a→AC power supply 1. During this period, current flows through the DC capacitor 9 in a charging direction, so that voltage Vc3 increases, and current does not flow through the DC capacitor 3 and therefore voltage Vc2 is constant. A current change amount Δiac18 during this period is represented by the following Expression (88) and becomes a negative value.

$$\Delta iac18=((|vac|-Vc3)/L)\cdot(2Tsw-t16) \quad (88)$$

At this time, under the assumption of Δiac11=−Δiac12, a theoretical duty D11 which is a ratio of a period from 0 to t11 with respect to a period from 0 to t12 is represented by Expression (89), and a theoretical duty D12 which is a ratio of a period from t11 to t12 with respect to the period from 0 to t12 is represented by Expression (90).

$$D11=(Vc1-|vac|-Vc2)/(Vc1-Vc2) \quad (89)$$

$$D12=1-D11 \quad (90)$$

In addition, under the assumption of Δiac13=−Δiac14, a theoretical duty D13 which is a ratio of a period from t12 to t13 with respect to a period from t12 to Tsw is represented by Expression (91), and a theoretical duty D14 which is a ratio of a period from t13 to Tsw with respect to the period from t12 to Tsw is represented by Expression (92).

$$D13=(Vc2-|vac|)/Vc2 \quad (91)$$

$$D14=1-D13 \quad (92)$$

In addition, under the assumption of Δiac15=−Δiac16, a theoretical duty D15 which is a ratio of a period from Tsw to t14 with respect to a period from Tsw to t15 is represented by Expression (93), and a theoretical duty D16 which is a ratio of a period from t14 to t15 with respect to the period from Tsw to t15 is represented by Expression (94).

$$D15=(Vc1-|vac|-Vc3)/(Vc3-Vc3) \quad (93)$$

$$D16=1-D15 \quad (94)$$

In addition, under the assumption of Δiac17=−Δiac18, a theoretical duty D17 which is a ratio of a period from t15 to t16 with respect to a period from t15 to 2Tsw is represented by Expression (95), and a theoretical duty D18 which is a ratio of a period from t16 to 2Tsw with respect to the period from t15 to 2Tsw is represented by Expression (96).

$$D17=(Vc3-|vac|)/Vc3 \tag{95}$$

$$D18=1-D17 \tag{Expression (96)}$$

Figure 71:
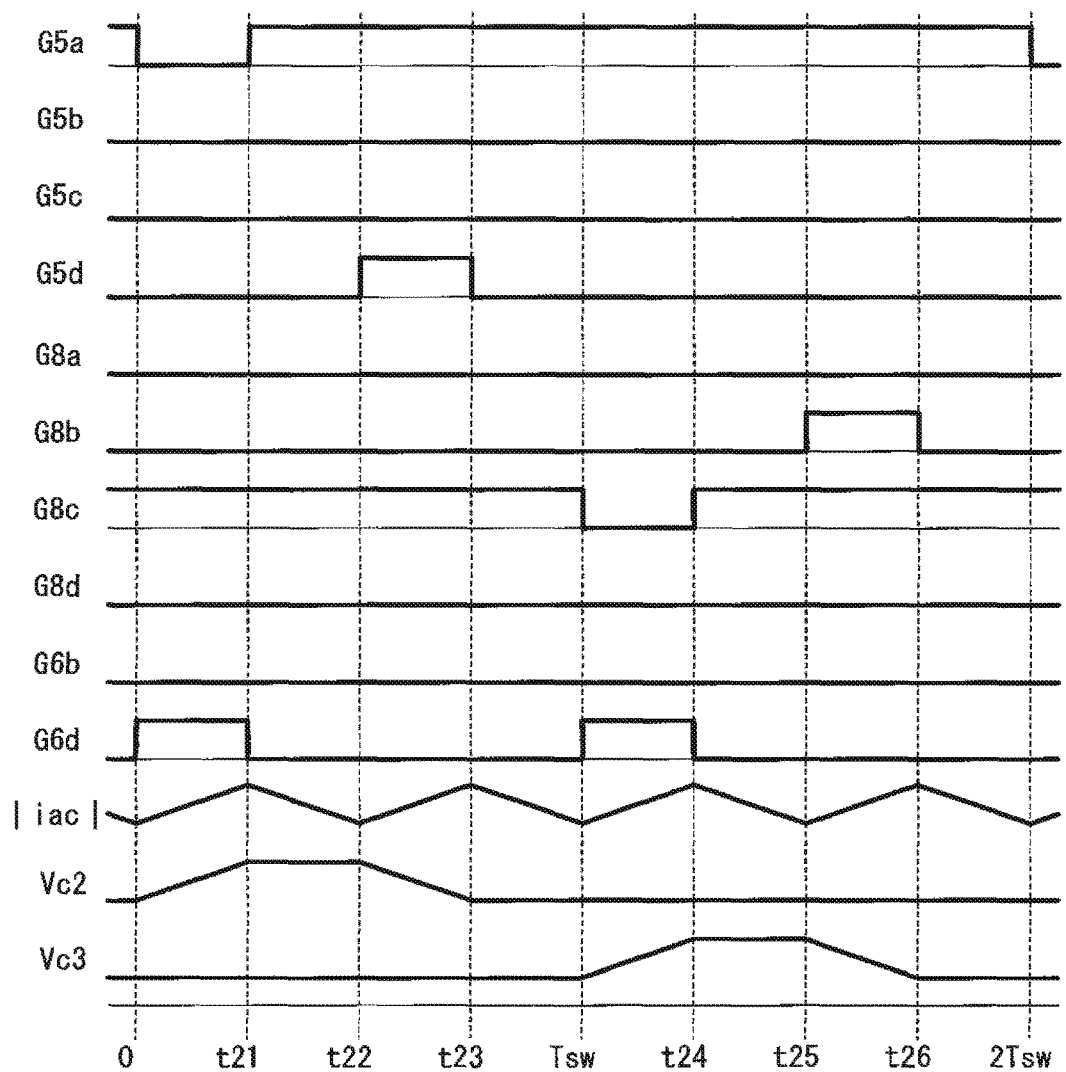
FIG. 71 is a waveform schematic diagram showing the operation state in an area 2 in the negative half wave of the AC power supply 1, in the power conversion device according to embodiment 2 of the present invention.

FIG. 71 shows a schematic diagram of operation during the switching cycle 2Tsw, in the area 2 in the negative half wave of the AC power supply 1. In the switching cycle Tsw in the first half, the single-phase inverter 300 and the single-phase converter 200 operate, and in the switching cycle Tsw in the second half, the single-phase inverter 400 and the single-phase converter 200 operate. The switching cycle Tsw is divided into four periods and driving is performed by high-frequency PWM.

Figure 72:
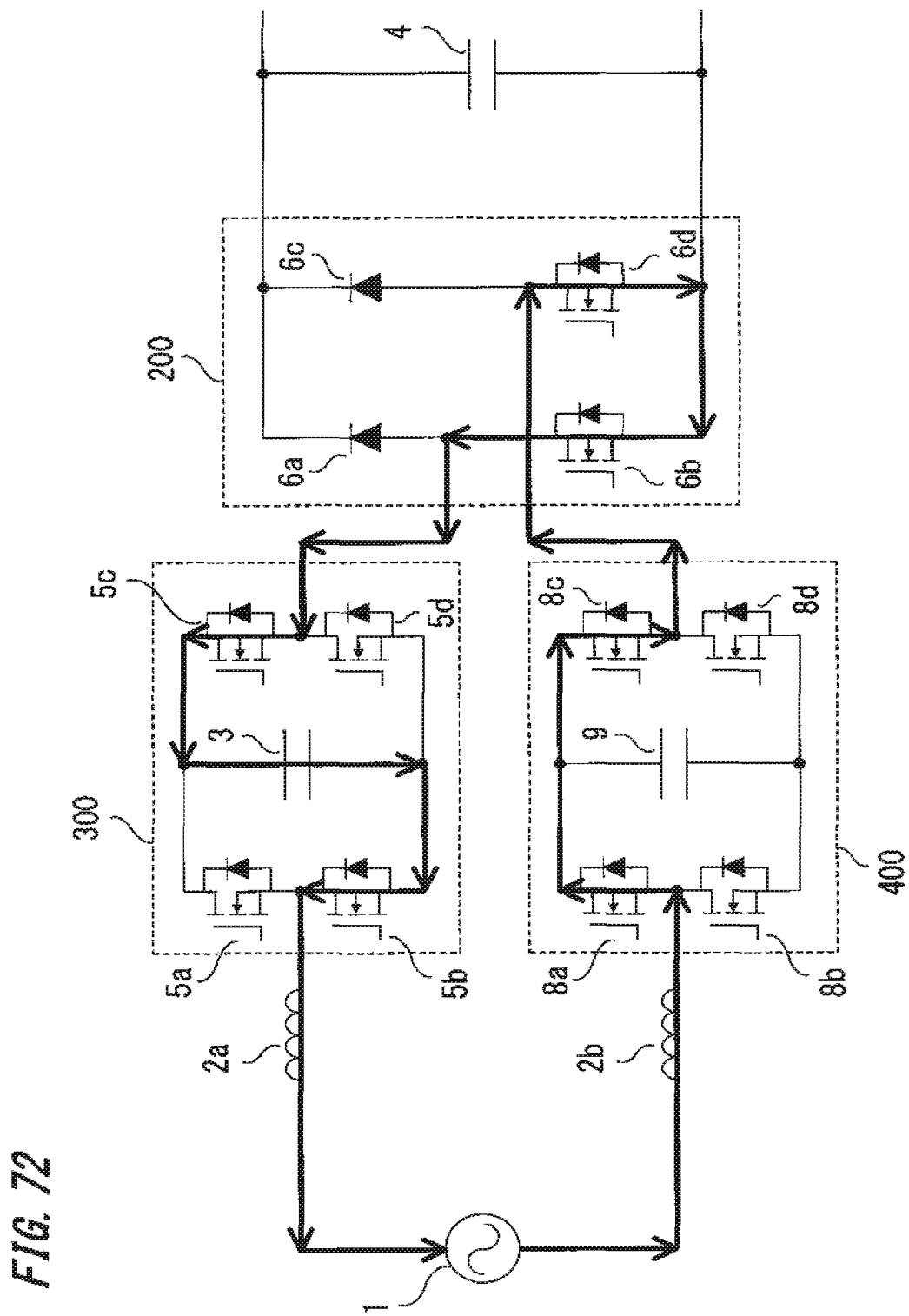
FIG. 72 is a diagram showing a current route in a first period in FIG. 71.

In the first period of 0<t≤t21, the switch elements 6d, 8c are ON and current |iac| of the AC power supply 1 increases. The current at this time flows through a route shown in FIG. 72. The route is as follows: AC power supply 1→reactor 2b→switch element 8a→switch element 8c→switch element 6d→switch element 6b→switch element 5c→DC capacitor 3→switch element 5b→reactor 2a→AC power supply 1. During this period, current flows through the DC capacitor 3 in a charging direction and therefore voltage Vc2 increases, and current does not flow through the DC capacitor 9 and therefore voltage Vc3 is constant. A current change amount Δiac21 during this period is represented by the following Expression (97) and becomes a positive value.

$$\Delta iac21=((|vac|-Vc2)/L) \cdot t21 \tag{Expression (97)}$$

Figure 73:
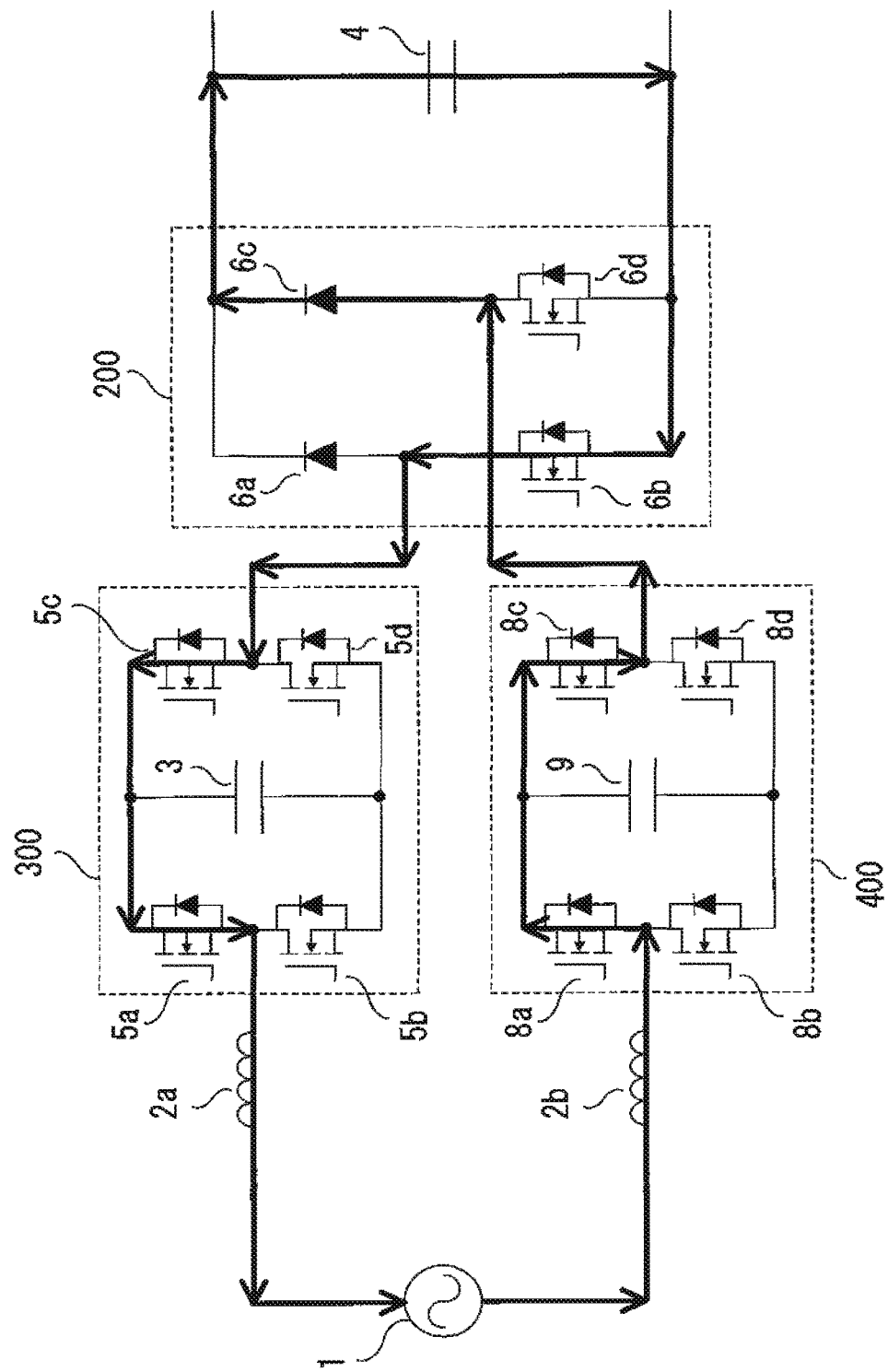
FIG. 73 is a diagram showing a current route in a second period in FIG. 71.

In the second period of t21<t≤t22, the switch elements 5a, 8c are ON and current |iac| of the AC power supply 1 decreases. The current at this time flows through a route shown in FIG. 73. The route is as follows: AC power supply 1→reactor 2b→switch element 8a→switch element 8c→diode 6c→smoothing capacitor 4→switch element 6b→switch element 5c→switch element 5a→reactor 2a→AC power supply 1. During this period, current does not flow through the DC capacitor 3 and the DC capacitor 9, and therefore voltages Vc2 and Vc3 are constant. A current change amount Δiac22 during this period is represented by the following Expression (98) and becomes a negative value.

$$\Delta iac22=((|vac|-Vc1)/L) \cdot (t22-t21) \tag{98}$$

Figure 74:
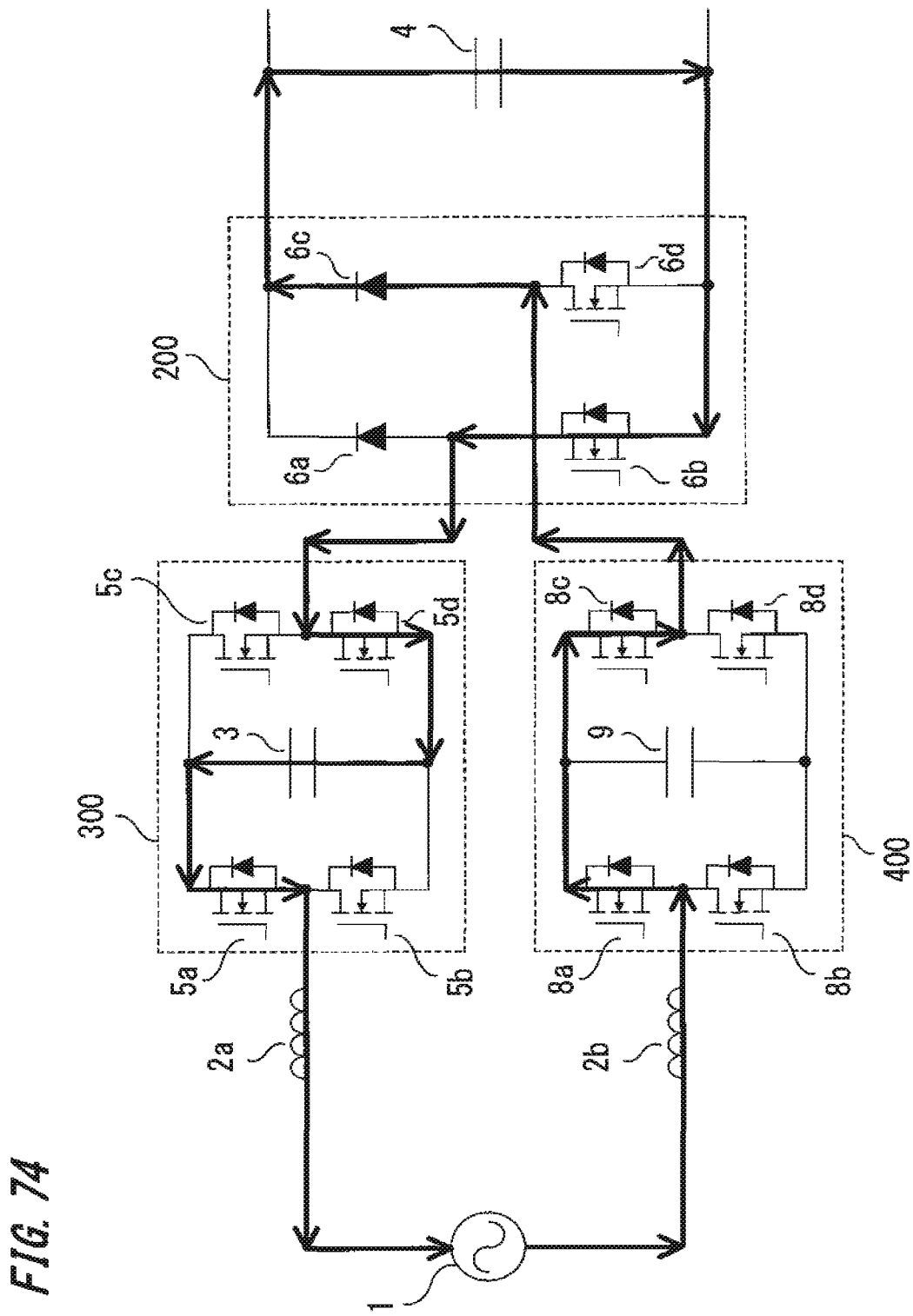
FIG. 74 is a diagram showing a current route in a third period in FIG. 71.

In the third period of t22<t≤t23, the switch elements 5a, 5d, 8c are ON and current |iac| of the AC power supply 1 increases. The current at this time flows through a route shown in FIG. 74. The route is as follows: AC power supply 1→reactor 2b→switch element 8a→switch element 8c→diode 6c→smoothing capacitor 4→switch element 6b→switch element 5d→DC capacitor 3→switch element 5a→reactor 2a→AC power supply 1. During this period, current flows through the DC capacitor 3 in a discharging direction and therefore voltage Vc2 decreases, and current does not flow through the DC capacitor 9 and therefore voltage Vc3 is constant. A current change amount Δiac23 during this period is represented by the following Expression (99) and becomes a positive value.

$$\Delta iac23=((|vac|+Vc2-Vc1)/L) \cdot (t23-t22) \tag{99}$$

Figure 75:
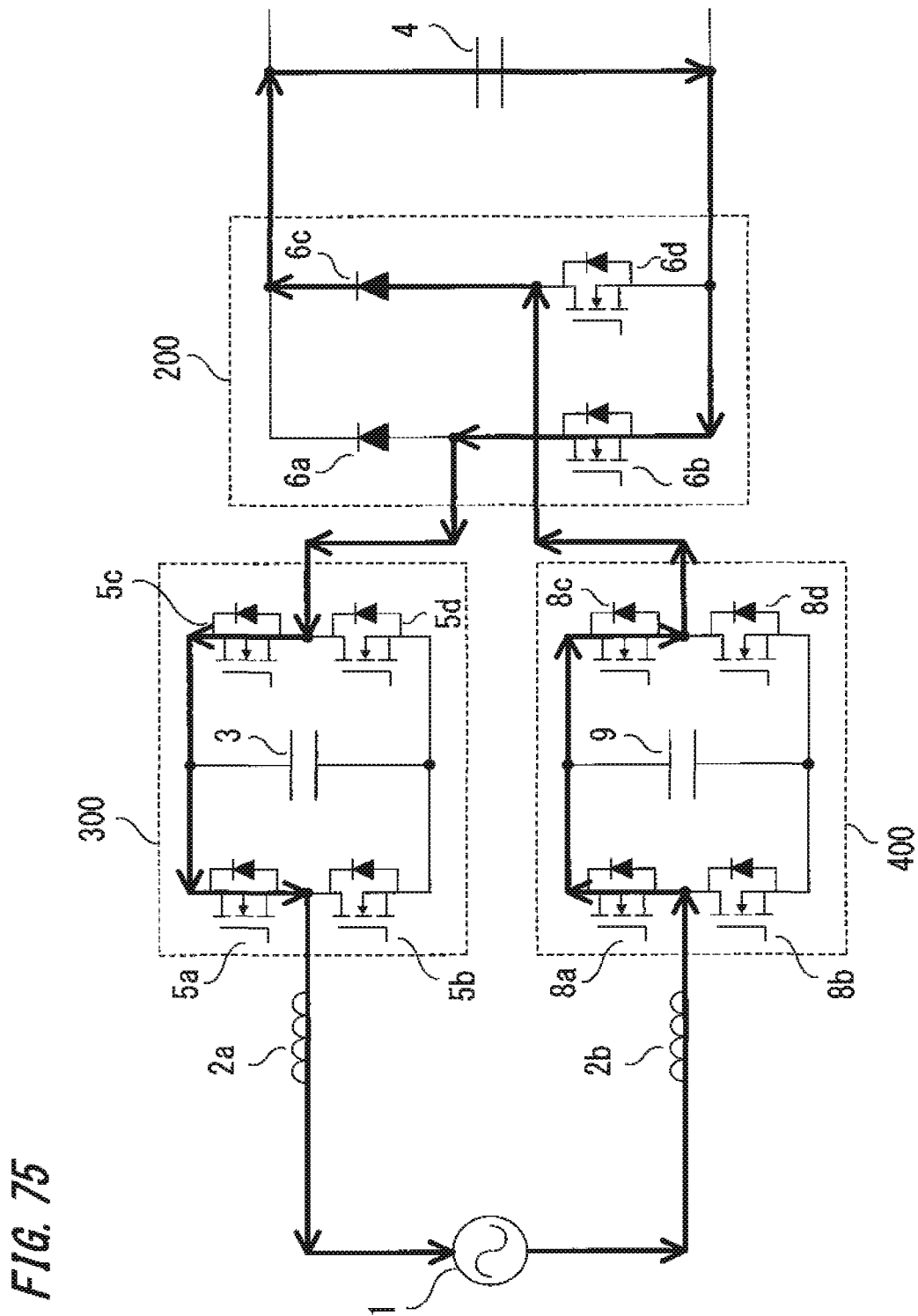
FIG. 75 is a diagram showing a current route in a fourth period in FIG. 71.

In the fourth period of t23<t≤Tsw, the switch elements 5a, 8c are ON and current |iac| of the AC power supply 1 decreases. The current at this time flows through a route shown in FIG. 75. The route is as follows: AC power supply 1→reactor 2b→switch element 8a→switch element 8c→diode 6c→smoothing capacitor 4→switch element 6b→switch element 5c switch element 5a→reactor 2a→AC power supply 1. During this period, current does not flow through the DC capacitor 3 and the DC capacitor 9, and therefore voltages Vc2 and Vc3 are constant. A current change amount Δiac24 during this period is represented by the following Expression (100) and becomes a negative value.

$$\Delta iac24=((|vac|-Vc1)/L) \cdot (Tsw-t23) \tag{100}$$

Figure 76:
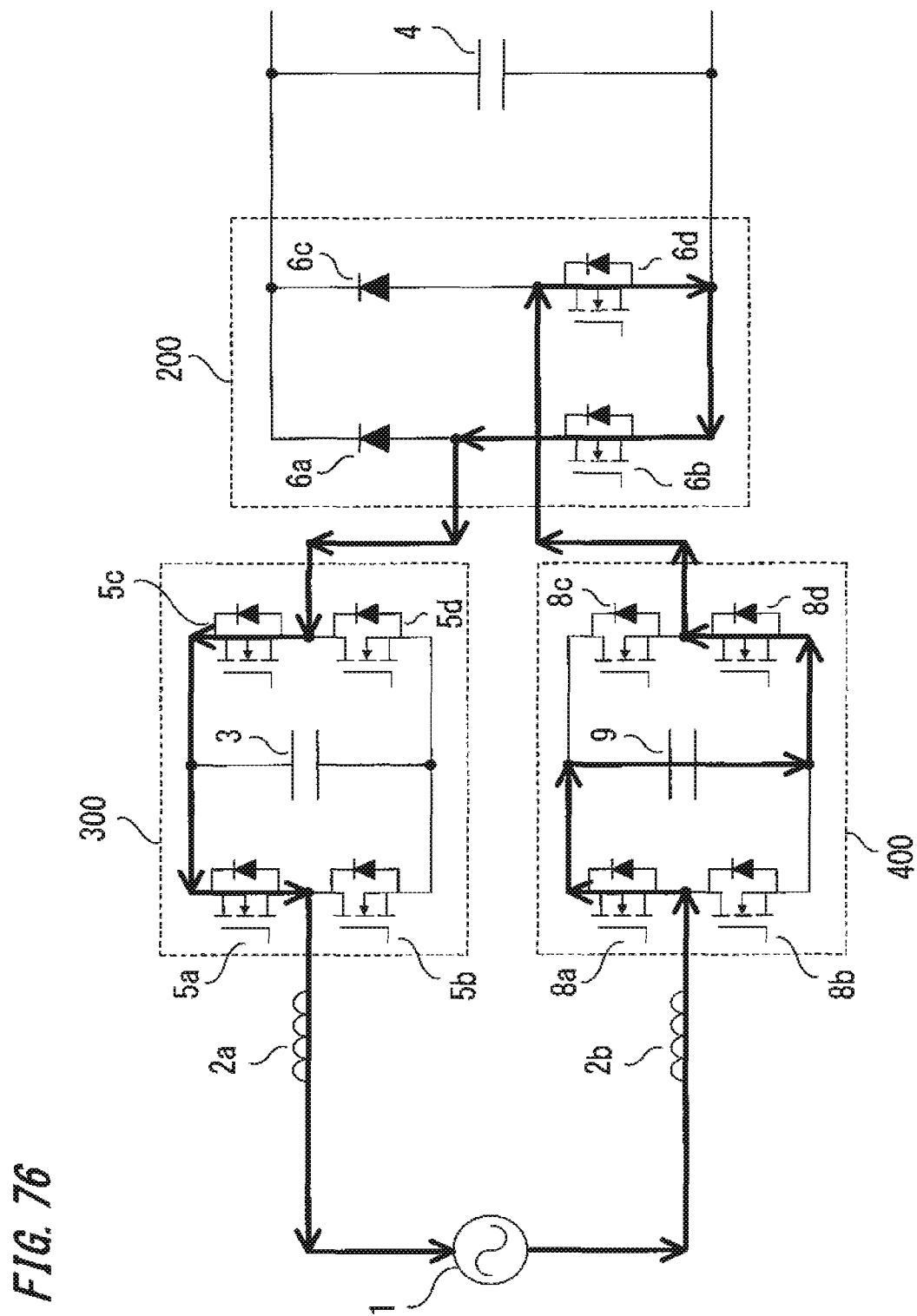
FIG. 76 is a diagram showing a current route in a fifth period in FIG. 71.

In the fifth period of Tsw<t≤t24, the switch elements 5a, 6d are ON and current |iac| of the AC power supply 1 increases. The current at this time flows through a route shown in FIG. 76. The route is as follows: AC power supply 1→reactor 2b→switch element 8a→DC capacitor 9→switch element 8d→switch element 6d→switch element 6b→switch element 5c→switch element 5a→reactor 2a→AC power supply 1. During this period, current flows through the DC capacitor 9 in a charging direction and therefore voltage Vc3 increases, and current does not flow through the DC capacitor 3 and therefore voltage Vc2 is constant. A current change amount Δiac25 during this period is represented by the following Expression (101) and becomes a positive value.

$$\Delta iac25=((|vac|-Vc3)/L) \cdot (t24-Tsw) \tag{101}$$

Figure 77:
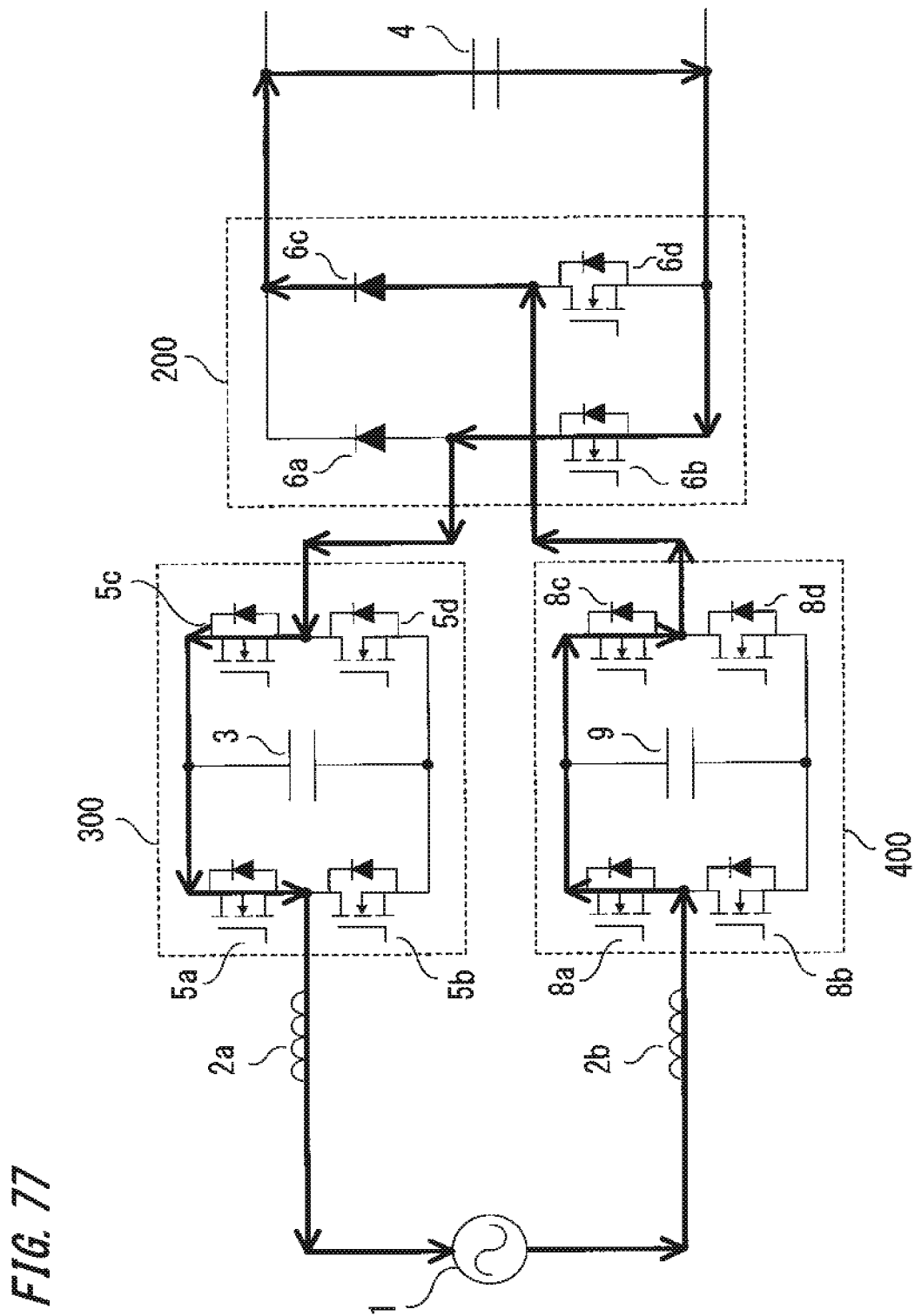
FIG. 77 is a diagram showing a current route in a sixth period in FIG. 71.

In the sixth period of t24<t≤t25, the switch elements 5a, 8c are ON and current |iac| of the AC power supply 1 decreases. The current at this time flows through a route shown in FIG. 77. The route is as follows: AC power supply 1→reactor 2b→switch element 8a→switch element 8c→diode 6c→smoothing capacitor 4→switch element 6b→switch element 5c→switch element 5a→reactor 2a→AC power supply 1. During this period, current does not flow through the DC capacitor 3 and the DC capacitor 9, and therefore voltages Vc2 and Vc3 are constant. A current change amount Δiac26 during this period is represented by the following Expression (102) and becomes a negative value.

$$\Delta iac26=((|vac|-Vc1)/L) \cdot (t25-t24) \tag{102}$$

Figure 78:
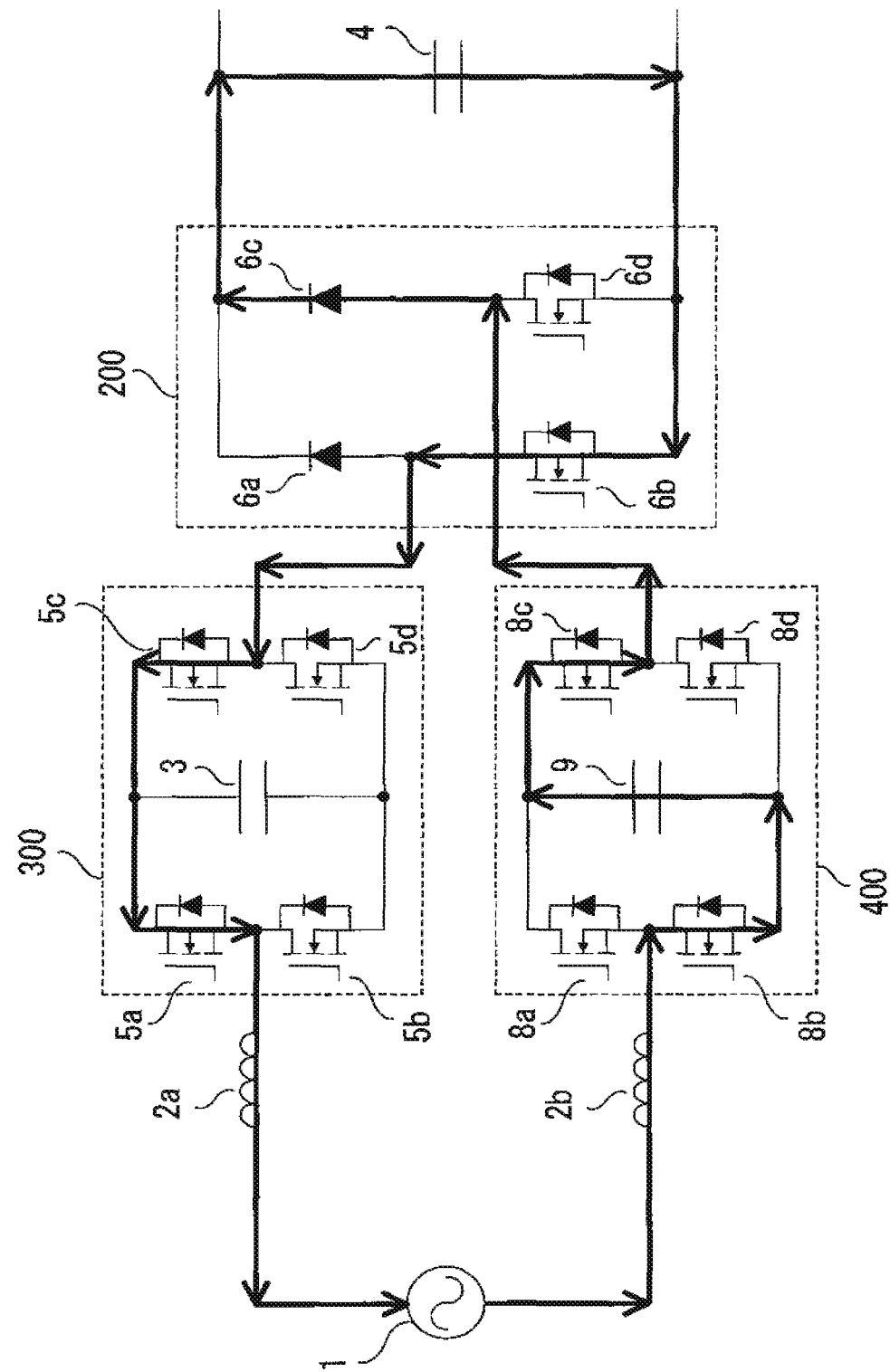
FIG. 78 is a diagram showing a current route in a seventh period in FIG. 71.

In the seventh period of t25<t≤t26, the switch elements 5a, 8b, 8c are ON and current |iac| of the AC power supply 1 increases. The current at this time flows through a route shown in FIG. 78. The route is as follows: AC power supply 1→reactor 2b→switch element 8a→DC capacitor 9→switch element 8d→diode 6c→smoothing capacitor 4→switch element 6b→switch element 5c→switch element 5a→reactor 2a→AC power supply 1. During this period, current flows through the DC capacitor 9 in a discharging direction and therefore voltage Vc3 decreases, and current does not flow through the DC capacitor 3 and therefore voltage Vc2 is constant. A current change amount Δiac27 during this period is represented by the following Expression (103) and becomes a positive value.

$$\Delta iac27=((|vac|+Vc3-Vc1)/L) \cdot (t26-t25) \tag{103}$$

Figure 79:
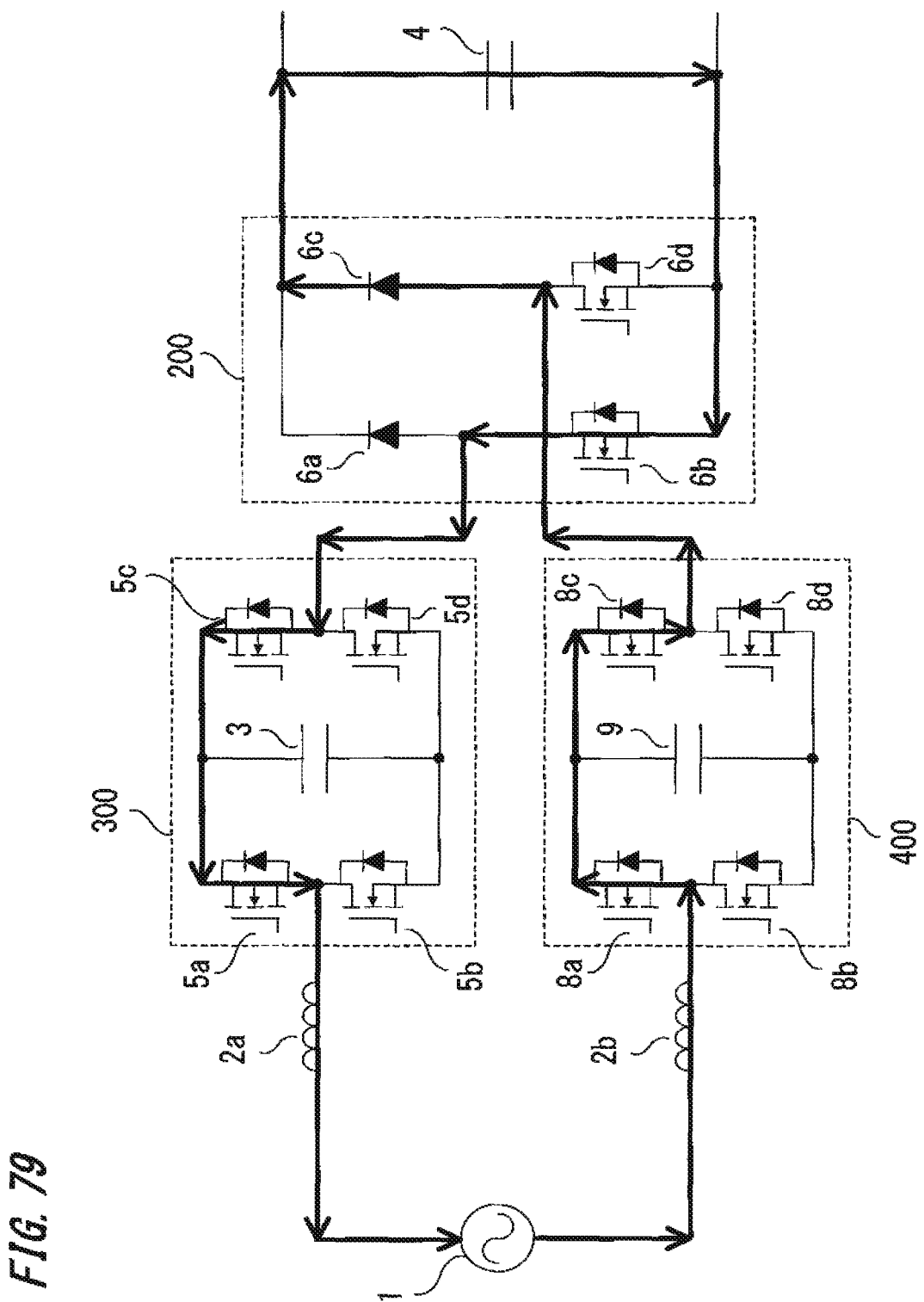
FIG. 79 is a diagram showing a current route in an eighth period in FIG. 71.

In the eighth period of t26<t≤2Tsw, the switch elements 5a, 8c are ON and current |iac| of the AC power supply 1 decreases. The current at this time flows through a route shown in FIG. 79. The route is as follows: AC power supply 1→reactor 2b→switch element 8a→switch element 8c→diode 6c→smoothing capacitor 4→switch element 6b→switch element 5c→switch element 5a→reactor 2a→AC power supply 1. During this period, current does not flow through the DC capacitor 3 and the DC capacitor 9, and therefore voltages Vc2 and Vc3 are constant. A current change amount Δiac28 during this period is represented by the following Expression (104) and becomes a negative value.

$$\Delta iac28=((|vac|-Vc1)/L) \cdot (2Tsw-t26) \tag{104}$$

At this time, under the assumption of Δiac21=−Δiac22, a theoretical duty D21 which is a ratio of a period from 0 to t21 with respect to a period from 0 to t22 is represented by Expression (105), and a theoretical duty D22 which is a ratio of a period from t21 to t22 with respect to the period from 0 to t22 is represented by Expression (106).

$$D21=(Vc1-|vac|)/(Vc1-Vc2) \tag{105}$$

$$D22=1-D21 \tag{106}$$

In addition, under the assumption of Δiac23=−Δiac24, a theoretical duty D23 which is a ratio of a period from t22 to t23 with respect to a period from t22 to Tsw is represented by Expression (107), and a theoretical duty D24 which is a ratio of a period from t23 to Tsw with respect to the period from t22 to Tsw is represented by Expression (108).

$$D23=(Vc1-|vac|)/Vc2 \tag{107}$$

$$D24=1-D23 \tag{108}$$

In addition, under the assumption of Δiac25=−Δiac26, a theoretical duty D25 which is a ratio of a period from Tsw to t24 with respect to a period from Tsw to t25 is represented by Expression (109), and a theoretical duty D26 which is a ratio of a period from t24 to t25 with respect to the period from Tsw to t25 is represented by Expression (110).

$$D25=(Vc1-|vac|)/(Vc1-Vc3) \tag{109}$$

$$D26=1-D25 \tag{110}$$

In addition, under the assumption of Δiac27=−Δiac28, a theoretical duty D27 which is a ratio of a period from t25 to t26 with respect to a period from t25 to 2Tsw is represented by Expression (111), and a theoretical duty D28 which is a ratio of a period from t26 to 2Tsw with respect to a period from t25 to 2Tsw is represented by Expression (112).

$$D27=(Vc1-|vac|)/Vc3 \tag{111}$$

$$D28=1-D27 \tag{112}$$

Figure 80:
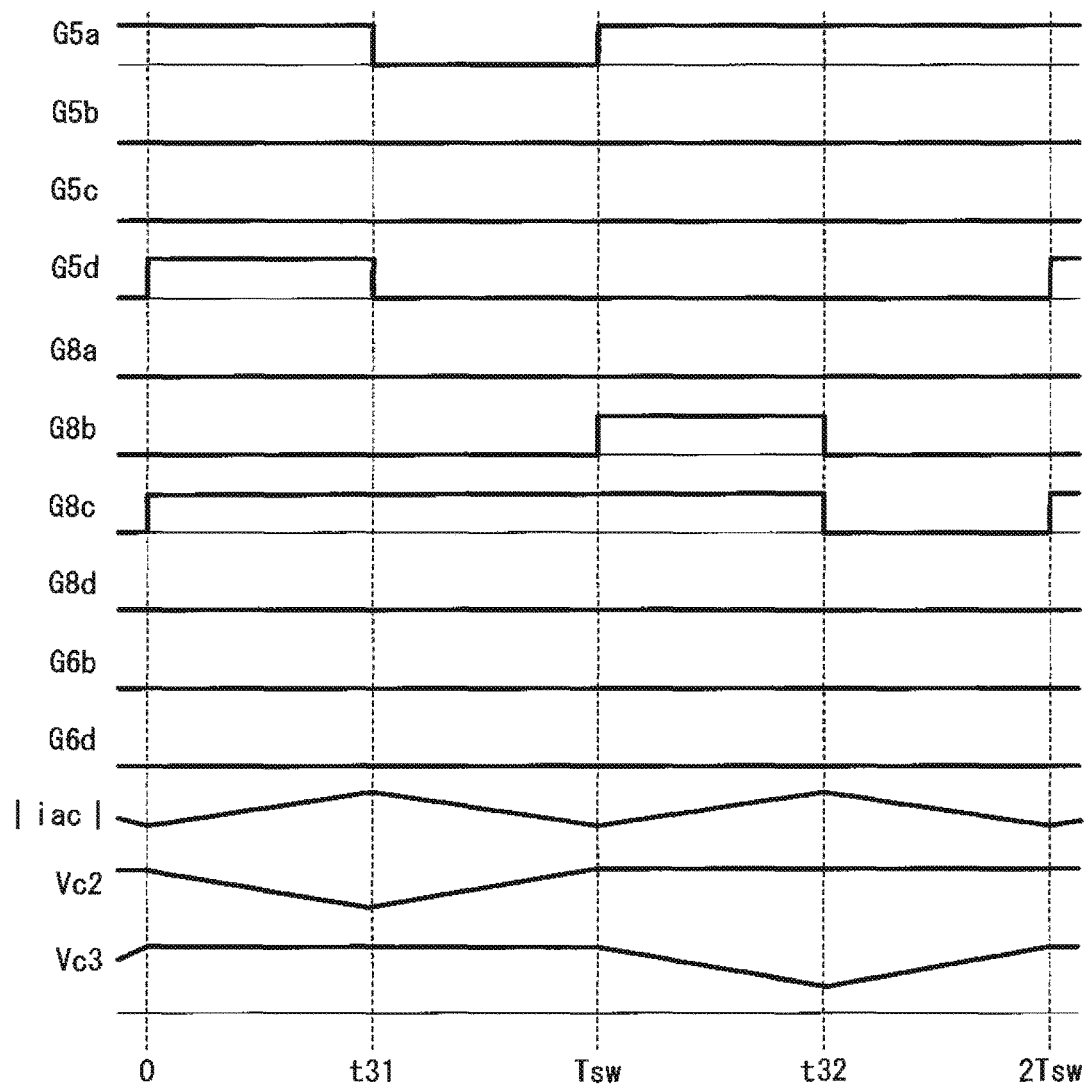
FIG. 80 is a waveform schematic diagram showing the operation state in an area 3 in the negative half wave of the AC power supply 1, in the power conversion device according to embodiment 2 of the present invention.

FIG. 80 shows a schematic diagram of operation during the switching cycle 2Tsw, in the area 3 in the negative half wave of the AC power supply 1. In the switching cycle Tsw in the first half, the single-phase inverter 300 operates, and in the switching cycle Tsw in the second half, the single-phase inverter 400 operates. The switching cycle Tsw is divided into two periods and driving is performed by high-frequency PWM.

In the first period of 0<t≤t31, the switch elements 5a, 5d, 8c are ON and current |iac| of the AC power supply 1 increases. The current at this time flows through a route shown in FIG. 81. The route is as follows: AC power supply 1→reactor 2b→switch element 8a→switch element 8c→diode 6c→smoothing capacitor 4→switch element 6b→switch element 5d→DC capacitor 3→switch element 5a→reactor 2a→AC power supply 1. During this period, current flows through the DC capacitor 3 in a discharging direction and therefore voltage Vc2 decreases, and current does not flow through the DC capacitor 9 and therefore voltage Vc3 is constant. A current change amount Δiac31 during this period is represented by the following Expression (113) and becomes a positive value.

$$\Delta iac31=((|vac|+Vc2-Vc1)/L)\cdot t31 \tag{113}$$

In the second period of t31<t≤Tsw, the switch element 8c is ON and current |iac| of the AC power supply 1 decreases. The current at this time flows through a route shown in FIG. 82. The route is as follows: AC power supply 1 reactor 2b→switch element 8a→switch element 8c→diode 6c→smoothing capacitor 4→switch element 6b→switch element 5c→DC capacitor 3→switch element 5b→reactor 2a→AC power supply 1. During this period, current flows through the DC capacitor 3 in a charging direction and therefore voltage Vc2 increases, and current does not flow through the DC capacitor 9 and therefore voltage Vc3 is constant. A current change amount Δiac32 during this period is represented by the following Expression (114) and becomes a negative value.

$$\Delta iac32=((|vac|-Vc2-Vc1)/L)\cdot (Tsw-t31) \tag{114}$$

In the third period of Tsw<t≤t32, the switch elements 5a, 8b, 8c are ON and current |iac| of the AC power supply 1 increases. The current at this time flows through a route shown in FIG. 83. The route is as follows: AC power supply 1→reactor 2b→switch element 8b→DC capacitor 9→switch element 8c→diode 6c→smoothing capacitor 4→switch element 6b→switch element 5c→switch element 5a→reactor 2a→AC power supply 1. During this period, current flows through the DC capacitor 9 in a discharging direction and therefore voltage Vc3 decreases, and current does not flow through the DC capacitor 3 and therefore voltage Vc2 is constant. A current change amount Δiac33 during this period is represented by the following Expression (115) and becomes a positive value.

$$\Delta iac33=((|vac|+Vc3-Vc1)/L)\cdot (t32-Tsw) \tag{115}$$

In the fourth period of t32<t≤2Tsw, the switch element 5a is ON and current |iac| of the AC power supply 1 decreases. The current at this time flows through a route shown in FIG. 84. The route is as follows: AC power supply 1→reactor 2b→switch element 8a→DC capacitor 9→switch element 8d→diode 6c→smoothing capacitor 4→switch element 6b→switch element 5c→switch element 5a→reactor 2a→AC power supply 1. During this period, current flows through the DC capacitor 9 in a charging direction and therefore voltage Vc3 increases, and current does not flow through the DC capacitor 3 and therefore voltage Vc2 is constant. A current change amount Δiac34 during this period is represented by the following Expression (116) and becomes a negative value.

$$\Delta iac34=((|vac|-Vc3-Vc1)/L)\cdot (2Tsw-t32) \tag{116}$$

At this time, under the assumption of Δiac31=−Δiac32, a theoretical duty D31 which is a ratio of a period from 0 to t31 with respect to a period from 0 to Tsw is represented by Expression (117), and a theoretical duty D32 which is a ratio of a period from t31 to Tsw with respect to the period from 0 to Tsw is represented by Expression (118).

$$D31=(Vc1+Vc2-|vac|)/2Vc2 \tag{117}$$

$$D32=1-D31 \tag{118}$$

In addition, under the assumption of Δiac33=−Δiac34, a theoretical duty D33 which is a ratio of a period from Tsw to t32 with respect to a period from Tsw to 2Tsw is represented by Expression (119), and a theoretical duty D34 which is a ratio of a period from t32 to 2Tsw with respect to the period from Tsw to 2Tsw is represented by Expression (120).

$$D33=(Vc1+Vc3-|vac|)/2Vc3 \qquad \text{Expression (119)}$$

$$D34=1-D33 \tag{120}$$

As shown above, in the area 1, the theoretical duties D11 to D18 for the positive half wave represented by Expressions

(49) to (56), and the theoretical duties D11 to D18 for the negative half wave represented by Expressions (89) to (96), are calculated by the same calculation expression.

Similarly, in the area 2, the theoretical duties D21 to D28 for the positive half wave represented by Expressions (65) to (72), and the theoretical duties D21 to D28 for the negative half wave represented by Expressions (105) to (112), are calculated by the same calculation expression.

Similarly, in the area 3, the theoretical duties D31 to D34 for the positive half wave represented by Expressions (77) to (80), and the theoretical duties D31 to D34 for the negative half wave represented by Expressions (117) to (120), are calculated by the same calculation expression.

By satisfying each relational expression regarding these theoretical duties, in the aforementioned one pair of periods in one switching cycle 2Tsw of the single-phase inverters 300, 400, charging operation and discharging operation of the DC capacitors 3, 9 are performed and the charging amount and the discharging amount thereof become equal to each other.

Here, the frequency of the AC power supply 1 is 50 to 60 Hz, whereas the switching frequencies of the single-phase inverters 300, 400 are generally 10 kHz or higher. Therefore, from the above, irrespective of a very long cycle of the AC power supply 1, charging operation and discharging operation of the DC capacitors 3, 9 are completed within one short switching cycle of the single-phase inverters 300, 400, and thus the charging/discharging amount itself is reduced and ripple voltage is suppressed, whereby the capacitances required for the DC capacitors 3, 9 can be greatly reduced.

In addition, as is found from FIG. 39, FIG. 48, FIG. 57, etc., in the areas 1, 2, the application voltage frequencies of the reactors 2a, 2b are four times the switching frequencies (½Tsw) of the single-phase inverters 300, 400, and in the area 3, the application voltage frequencies are twice the switching frequencies (½Tsw). Therefore, under the condition that the switching frequency of the single-phase inverter is the same, it becomes possible to further downsize the reactors 2a, 2b as compared to the above embodiment 1.

In addition, the switching frequencies of the single-phase inverters 300, 400 are set to be half the switching frequency of the single-phase converter 200, and therefore switching loss of the single-phase inverters 300, 400 is reduced accordingly, so that the amount of heat generated per switch element is reduced, thus providing an advantage depending on a specific design condition.

Figure 85:
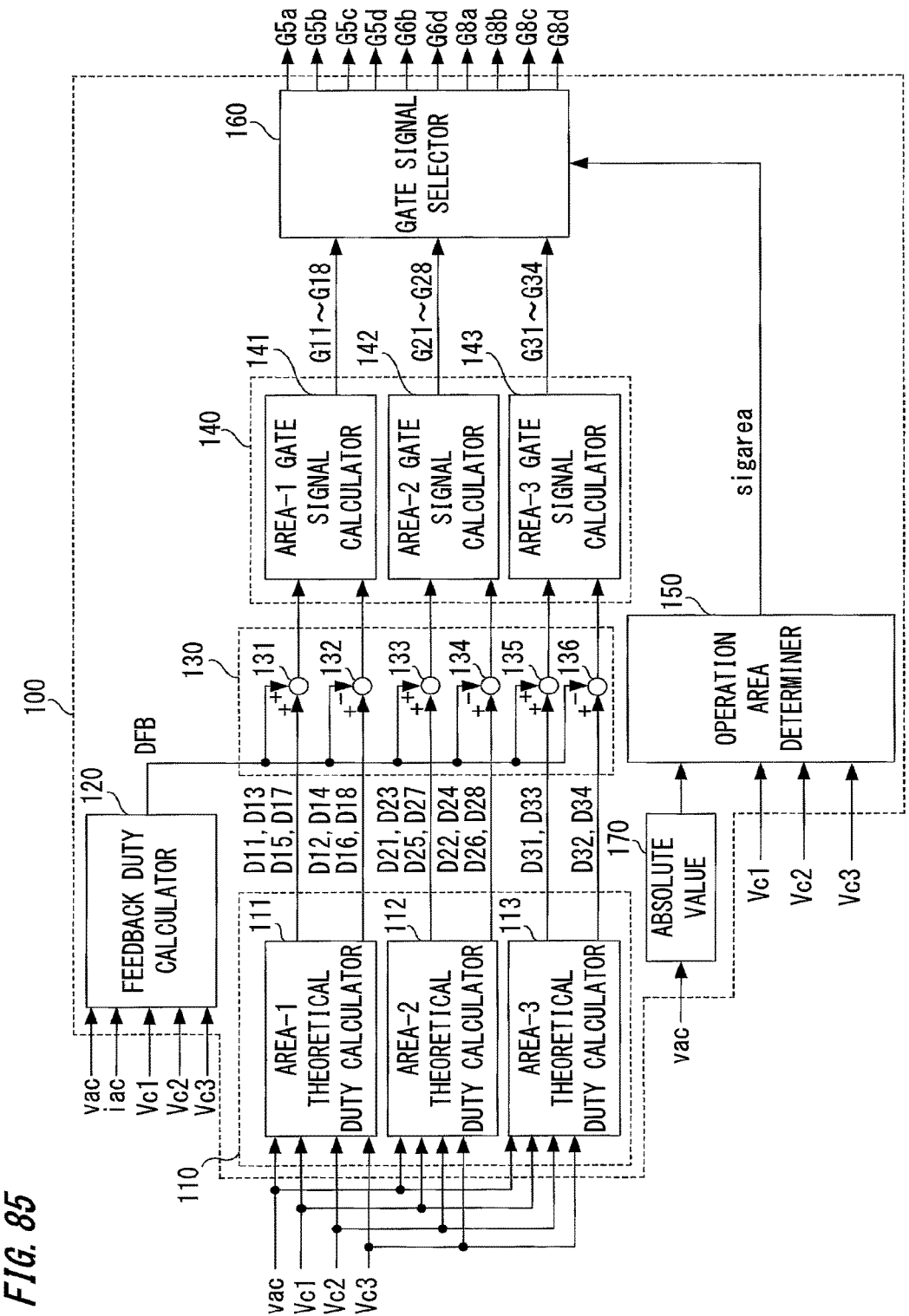
FIG. 85 is a configuration diagram of a control unit 100 in the power conversion device according to embodiment 2 of the present invention.

Next, FIG. 85 shows the configuration of the control unit 100 serving to generate gate signals for driving the switch elements to perform switching, in order to actually ensure the relationships of the theoretical duties. The difference from the above embodiment 1 is that, since the single-phase inverter 400 is newly added, it becomes necessary to perform control based on detection values further including the voltage Vc3 of the DC capacitor 9 thereof and generation of the gate signals G8a to G8d for the switch elements 8a to 8d thereof. Here, just for confirmation, the configuration and the operation of the control unit 100 in embodiment 2 will be described with reference to FIG. 85 and the subsequent figures.

As shown in FIG. 85, the control unit 100 includes a theoretical duty calculator 110, a feedback duty calculator 120, an adder/subtractor 130, a gate signal calculator 140, an operation area determiner 150, and a gate signal selector 160.

The theoretical duty calculator 110 includes an area-1 theoretical duty calculator ill, an area-2 theoretical duty calculator 112, and an area-3 theoretical duty calculator 113, and calculates theoretical duties using the theoretical expressions in the areas 1 to 3.

The area-1 theoretical duty calculator 111 calculates the theoretical duties D11 to D18 using Expressions (49) to (56) or Expressions (89) to (96). The area-2 theoretical duty calculator 112 calculates the theoretical duties D21 to D28 using Expressions (65) to (72) or Expressions (105) to (112). The area-3 theoretical duty calculator 113 calculates the theoretical duties D31 to D34 using Expressions (77) and (80) or Expressions (117) to (120).

Each theoretical duty is calculated on the basis of: voltage vac of the AC power supply 1 which is a detection value of the AC voltage detection unit 10, or an ideal voltage value vac* for the AC power supply 1; voltage Vc2 of the DC capacitor 3 which is a detection value of the DC capacitor voltage detection unit 12, or a DC capacitor voltage command value vc2* for the DC capacitor 3; voltage Vc3 of the DC capacitor 9 which is a detection value of the DC capacitor voltage detection unit 14, or a DC capacitor voltage command value vc3* for the DC capacitor 9; and voltage Vc1 of the smoothing capacitor 4 which is a detection value of the DC voltage detection unit 13, or a DC voltage command value Vc1* for the smoothing capacitor 4. FIG. 85 shows a case of performing the calculation on the basis of the detection values of the respective voltage detection units.

It is noted that, ideally, voltage Vc2 of the DC capacitor 3 and voltage Vc3 of the DC capacitor 9 are equal to each other, and therefore the average voltage of these voltages, Vsub=(Vc2+Vc3)/2, may be used.

Figure 86:
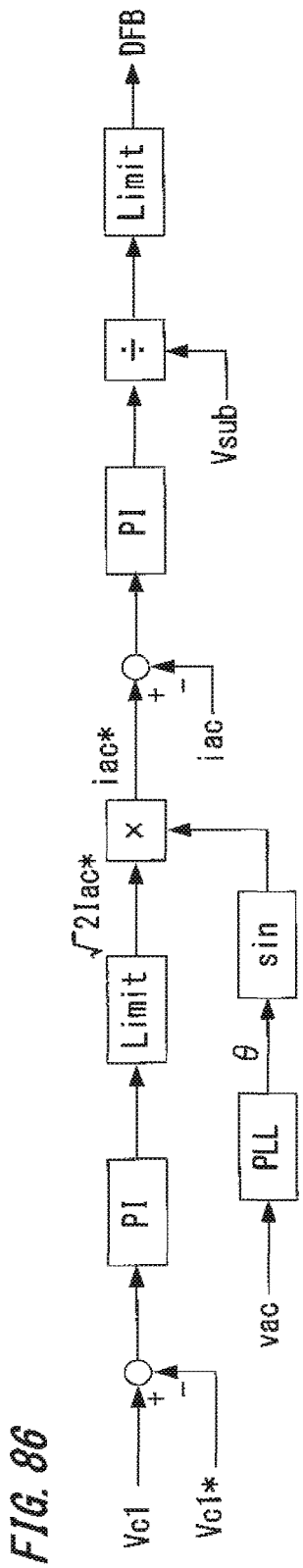
FIG. 86 is a configuration diagram of a feedback duty calculator 120 composing the control unit 100 in FIG. 85.

The feedback duty calculator 120 is configured as shown in FIG. 86. A deviation between the DC voltage detection value Vc1 of the smoothing capacitor 4 and the command value Vc1* therefor is calculated by a subtractor, and then, PT control is performed by a PI controller, and the resultant value is subjected to a limiter, whereby a current amplitude command value $\sqrt{2}$Iac* for the AC power supply 1 is calculated.

Meanwhile, from the AC voltage detection value vac of the AC power supply 1, a phase θ synchronized with the phase of vac is calculated by PLL (Phase Locked Loop). Then, a sine wave with the phase θ is multiplied with the current amplitude command value $\sqrt{2}$Iac* for the AC power supply 1, whereby an AC current command value iac* for the AC power supply 1 is calculated.

Then, a deviation between the AC current command value iac* and the AC current detection value iac is subjected to PI control by a PI controller, and the resultant value is divided by the average value Vsub of the DC capacitor voltages. Then, the resultant value is subjected to a limiter, whereby a feedback duty DFB is obtained.

The adder/subtractor 130 adds or subtracts the feedback duty DFB to or from the calculation results of the theoretical duty calculator 110. Since control is performed in such a direction as to increase current iac of the AC power supply 1 when the DFB increases, the DFB is added to D11, D13, D15, D17, D21, D23, D25, D27, D31, D33 by the adders 131, 133, 135, and the DFB is subtracted from D12, D14, D16, D18, D22, D24, D26, D28, D32, D34 by the subtractors 132, 134, 136. These calculation results are inputted to the gate signal calculator 140.

Figure 87:
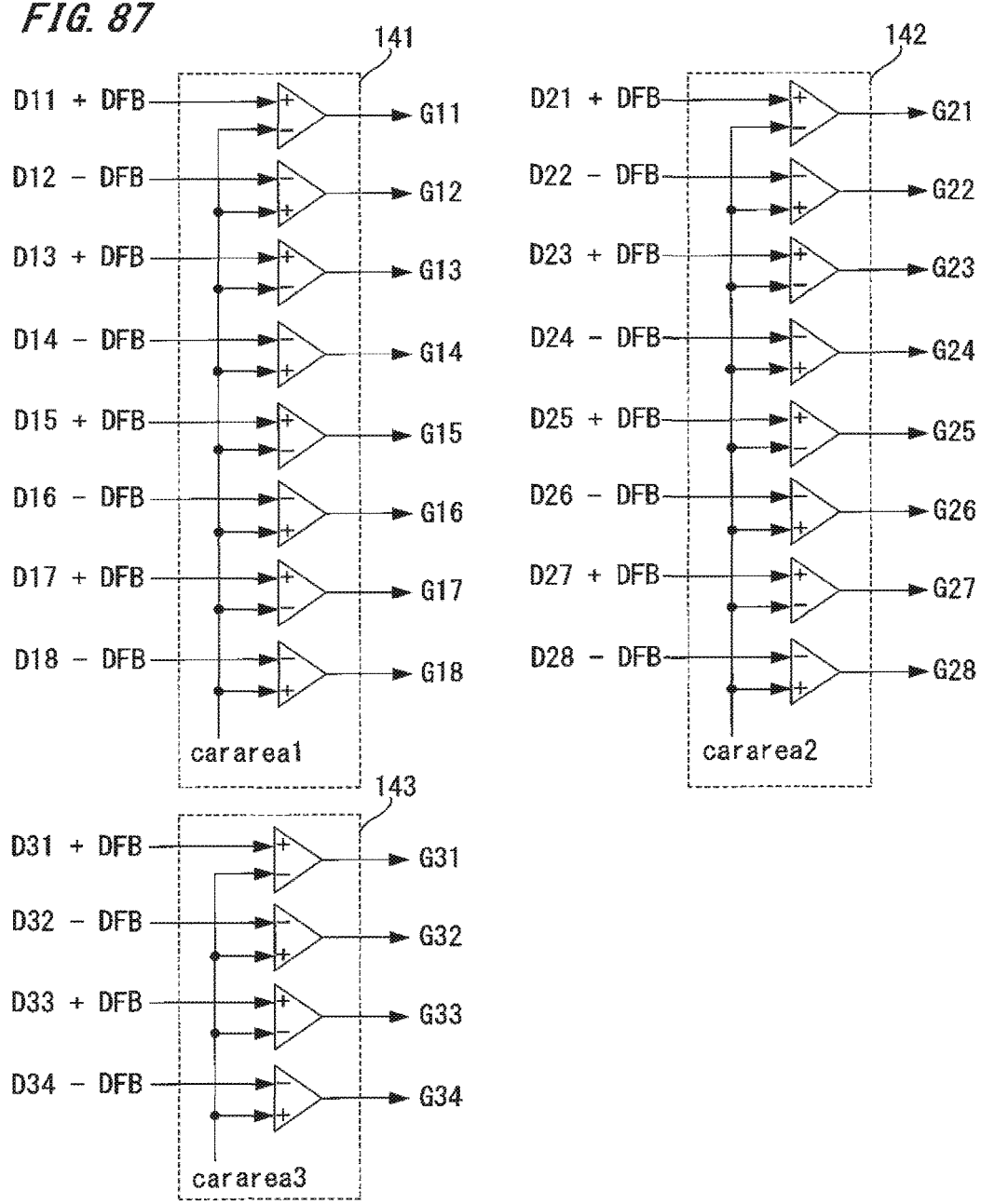
FIG. 87 is a configuration diagram of a gate signal calculator 140 composing the control unit 100 in FIG. 85.

FIG. 87 is a configuration diagram of the gate signal calculator 140. The gate signal calculator 140 includes an area-1 gate signal calculator 141, an area-2 gate signal calculator 142, and an area-3 gate signal calculator 143, and calculates gate signals for each switching cycle, from the inputted duties.

The area-1 gate signal calculator 141 includes eight comparators and a carrier signal cararea1, and compares D11+DFB, D12−DFB, D13+DFB, D14−DFB, D15+DFB, D16−DFB, D17+DFB, and D18−DFB which are input signals, with the carrier signal cararca1, by the respective comparators, thereby generating a signal G11 for the first period, a signal G12 for the second period, a signal G13 for the third period, a signal G14 for the fourth period, a signal G15 for the fifth period, a signal G16 for the sixth period, a signal G17 for the seventh period, and a signal G18 for the eighth period.

The area-2 gate signal calculator 142 includes eight comparators and a carrier signal cararea2, and compares D21+DFB, D22−DFB, D23+DFB, D24−DFB, D25+DFB, D26−DFB, D27+DFB, and D28−DFB which are input signals, with the carrier signal cararea2, by the respective comparators, thereby generating a signal G21 for the first period, a signal G22 for the second period, a signal G23 for the third period, a signal G24 for the fourth period, a signal G25 for the fifth period, a signal G26 for the sixth period, a signal G27 for the seventh period, and a signal G28 for the eighth period.

The area-3 gate signal calculator 143 includes four comparators and a carrier signal cararea3, and compares D31+DFB, D32−DFB, D33+DFB, and D34−DFB which are input signals, with the carrier signal cararea3, by the respective comparators, thereby generating a signal G31 for the first period, a signal G32 for the second period, a signal G33 for the third period, and a signal G34 for the fourth period.

The above signals are inputted to the gate signal selector 160, and thus are distributed as gate signals for the respective switch elements.

The absolute value calculator 170 calculates the absolute value |vac| of the voltage detection value vac of the AC power supply 1, and outputs the absolute value |vac| to the operation area determiner 150.

The operation area determiner 150 performs magnitude comparison among the absolute value |vac| of the AC voltage detection value vac of the AC power supply 1, the DC capacitor voltage detection value Vc2 of the DC capacitor 3 or the DC capacitor voltage detection value Vc3 of the DC capacitor 9, and the DC voltage detection value Vc1 of the smoothing capacitor 4, performs determination as to the above areas 1 to 3, and calculates an area signal sigarea.

Instead of the DC capacitor voltage detection value Vc2 of the DC capacitor 3 or the voltage Vc3 of the DC capacitor 9, the DC capacitor voltage command values Vc2*, Vc3* may be used or the DC capacitor average voltage Vsub may be used.

The gate signal selector 160 allocates outputs of the gate signal calculator 140 to the switch elements, using the area signal sigarea outputted from the operation area determiner 150.

The control unit 100 shown in FIG. 85 performs control such that, in the area 1 and the area 2, the switching cycle Tsw is divided into four periods, and in the area 3, the switching cycle Tsw is divided into two periods.

Figure 88:
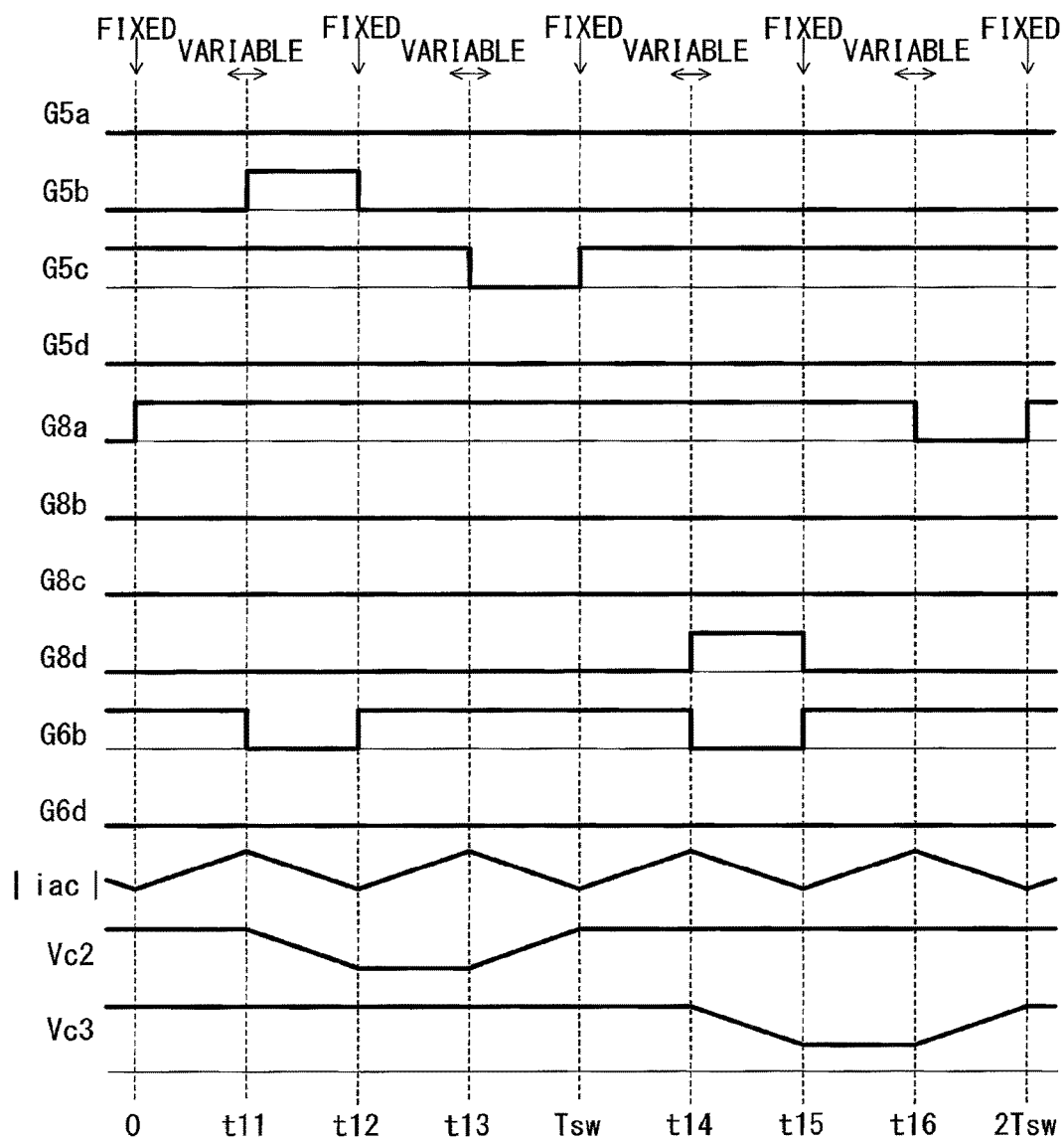
FIG. 88 is a gate pattern diagram in an area 1 in embodiment 2.
Figure 89:
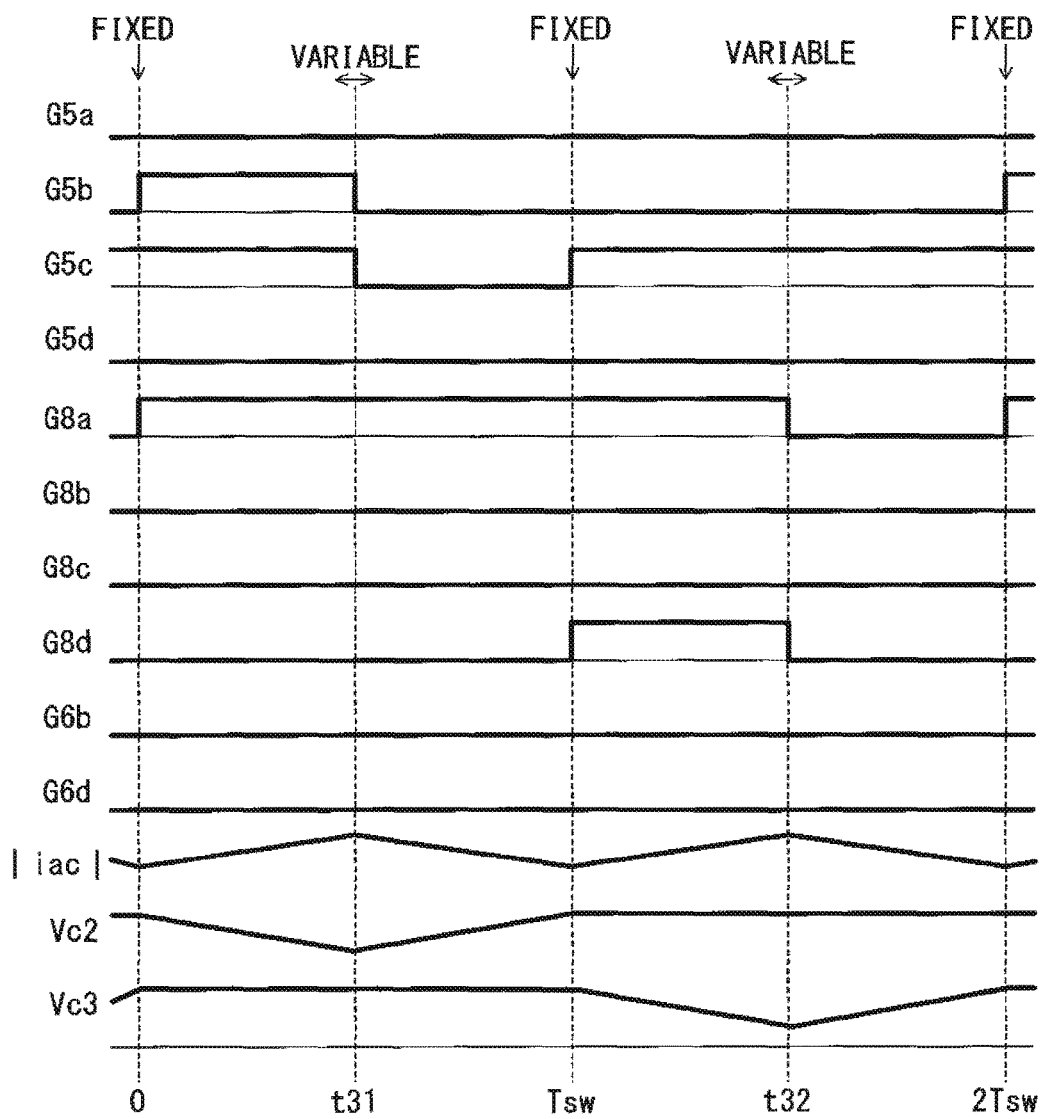
FIG. 89 is a gate pattern diagram in an area 3 in embodiment 2.

As an example, FIG. 88 shows a gate pattern diagram in the area 1 in the positive half wave. FIG. 89 shows a gate pattern diagram in the area 3 in the positive half wave.

In the area 1 and the area 2, the switching cycle Tsw and ½ cycle thereof are made constant, and an ON period ratio during those periods is controlled. That is, in FIG. 85, times 0, t12, Tsw, t15, 2Tsw are fixed, and t11, t13, t14, t16 (control axes) are controlled by the control unit 100.

In the area 3, the switching cycle Tsw is made constant and an ON period ratio during that period is controlled. The switching cycle as a reference is constant, and PWM (Pulse Width Modulation) control can be used. The switching cycle Tsw is made constant and an ON period ratio during that period is controlled. That is, in FIG. 89, times 0, Tsw, 2Tsw are fixed and t31 and t32 (control axes) are controlled.

As described above, the control unit 100 of the power conversion device in embodiment 2 of the present invention performs control such that one switching cycle 2Tsw of the single-phase inverter 300 and the single-phase inverter 400 is twice the one switching cycle Tsw of the single-phase converter 200 and is divided into an even number of periods including two or four pairs of periods in which current of the AC power supply 1 increases in the first half of each pair of periods and decreases in the second half of each pair of periods, and the control unit 100 includes: the theoretical duty calculator 110 which calculates the theoretical duty 1 corresponding to the first-half time width relative to the time width of one pair of periods, and the theoretical duty 2 corresponding to the second-half time width relative to the time width of one pair of periods, so that the increase amount of current of the AC power supply 1 in the first half and the decrease amount thereof in the second half become equal to each other in the one pair of periods; and the gate signal calculator 140 which calculates gate signals for driving the switch elements of the single-phase inverter 300 and the single-phase inverter 400 and the switch elements of the single-phase converter 200 to perform switching, on the basis of the theoretical duty 1 and the theoretical duty 2. Thus, charging operation and discharging operation of the DC capacitor 3 and the single-phase inverter 400 are performed within one switching cycle 2Tsw of the single-phase inverter 300 and the single-phase inverter 100, and the charging amount and the discharging amount become equal to each other. Therefore, irrespective of the very long cycle of the AC power supply 1, charging operation and discharging operation of the DC capacitor 3 and the DC capacitor 9 are completed within one short switching cycle of the single-phase inverter 300 and the single-phase inverter 400, whereby the charging/discharging amount itself is reduced, the capacitances required for the DC capacitor 3 and the DC capacitor 9 in order to suppress ripple voltage can be greatly reduced, and size reduction of the device can be achieved.

In addition, the control unit 100 includes: a voltage controller which generates an AC current command value on the basis of a deviation between the DC voltage command value and the DC voltage detection value; and the feedback duty calculator 120 which calculates the feedback duty on the basis of a deviation between the AC current command value and an AC current detection value, and the gate signal calculator 140 calculates the gate signals on the basis of duties calculated by adding the feedback duty to the theoretical duty 1 and by subtracting the feedback duty from the theoretical duty 2. Therefore, it becomes possible to perform constant-voltage control so as to keep voltage of the smoothing capacitor 4 at a desired DC voltage command value.

In addition, the control unit 100 sets the number of divided periods in one switching cycle of the single-phase inverter 300 and the single-phase inverter 400 in accordance with the areas 1, 2, 3 determined depending on the magnitude relationship among voltage vac of the AC power supply 1, voltage Vc1 of the smoothing capacitor 4, voltage Vc2 of the DC capacitor 3, and voltage Vc3 of the DC capacitor 9. Therefore, it becomes possible to perform switching control for each switch element by an appropriate gate pattern according to the voltage relationship.

In addition, the control unit 100 controls the switch elements such that switching timings are different among the single-phase inverter 300, the single-phase inverter 400, and the single-phase converter 200. Therefore, it becomes possible to make the application voltage frequencies of the reactors 2a, 2b higher than the switching frequencies of the single-phase inverter 300, the single-phase inverter 400, and the single-phase converter 200.

As a result, it becomes possible to reduce a VT product which is a product of voltage and time of the reactors 2a, 2b, with a general configuration ratio, and a necessary inductance value can be reduced in principle. In general, in the reactors 2a, 2b, the inductance value is to be reduced through reduction in core size and decrease in the number of winding turns. Therefore, size reduction of the reactors 2a, 2b is achieved as a result.

In the power conversion device shown in embodiment 2, the upper arms of the single-phase converter 200 are composed of diodes 6a, 6c. However, as in the lower arms, the upper arms may be composed of switch elements. In this case, by turning on the switch elements during the conduction periods of the diodes 6a, 6c shown in embodiment 2, it is possible to perform so-called synchronous rectification operation.

Similarly, in the switch elements 5a to 5d and 8a to 8d of the single-phase inverter 300 and the single-phase inverter 400 and the switch elements 6b, 6d of the single-phase converter 200, it is possible to perform synchronous rectification operation by turning on each switch element during a period in which the diode connected in parallel thereto becomes conductive.

In the synchronous rectification operation in the case of using MOSFETs, if voltage drop due to the ON resistance of the switch element is smaller than voltage drop of the parallel diode, current flows through the switch element, and thus conduction loss can be reduced. In addition, by forming the upper arms of the single-phase converter 200 by switch elements, it becomes possible to supply power from the smoothing capacitor 4 to the AC power supply 1.

The switching cycles Tsw in the area 1, the area 2, and the area 3 may have the same constant value or may have respective independent values. For example, the switching cycles in the area 1 and the area 2 may be set at the same constant value, and the switching cycle in the area 3 may be set to be half the switching cycle in the area 1 and the area 2. Thus, the application voltage frequencies of the reactors 2a, 2b become constant in all the areas. If the application voltage frequency is constant, it becomes easy to take measures for noise and establish stable control. In addition, driving may be performed using PFM (Pulse Frequency Modulation) control in which the switching frequency is varied while the ON period of any of the switch elements is fixed.

The reactors 2a, 2b are provided on both the positive-side line and the negative-side line of the AC power supply 1. However, the reactor may be connected on only the positive-side line or the negative-side line. The reactors may be connected between the single-phase converter 200, and the single-phase inverter 300 and the single-phase inverter 400.

As shown in FIG. 35 above, a configuration having a diode bridge as a rectification circuit may be employed.

In embodiment 2, two single-phase inverters are provided. However, three or more single-phase inverters may be provided.

In the case where, for example, a DC/DC converter for controlling voltage Vc1 of the smoothing capacitor 4 or a DC voltage source is connected in parallel with the smoothing capacitor 4, the feedback duty calculator 120 shown in FIG. 86 may perform only current control using a predetermined current amplitude command value $\sqrt{2}$Iac* for the AC power supply 1 without performing Vc1-constant control.

In this case, it becomes possible to perform high-power-factor operation control.

The AC power supply may be a three-phase power supply. In this case, two or more single-phase inverters are provided for each phase.

Embodiment 3

Hereinafter, embodiment 3 of the present invention will be described.

Figure 90:
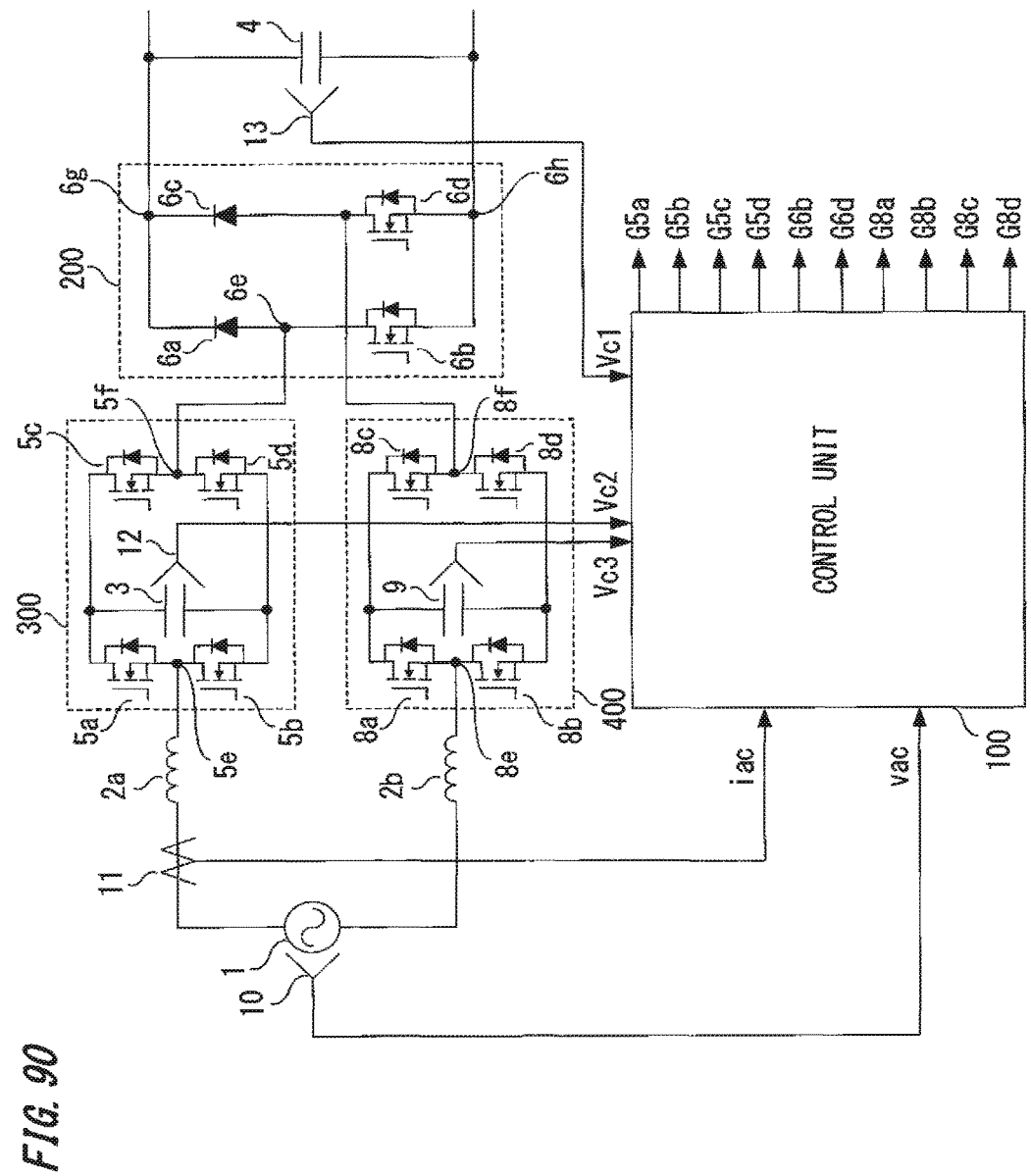
FIG. 90 is a diagram showing the circuit configuration of a power conversion device according to embodiment 3 of the present invention.

FIG. 90 is a circuit configuration diagram of a power conversion device according to embodiment 3 of the present invention. As shown in FIG. 90, the power conversion device includes a main circuit and the control unit 100, for converting AC voltage and AC power of the AC power supply 1 to DC voltage and DC power and outputting the DC voltage and DC power to the smoothing capacitor 4.

It is noted that the configuration shown in FIG. 90 is exactly the same as that in the above embodiment 2, and the description thereof will not be repeated.

Figure 91:
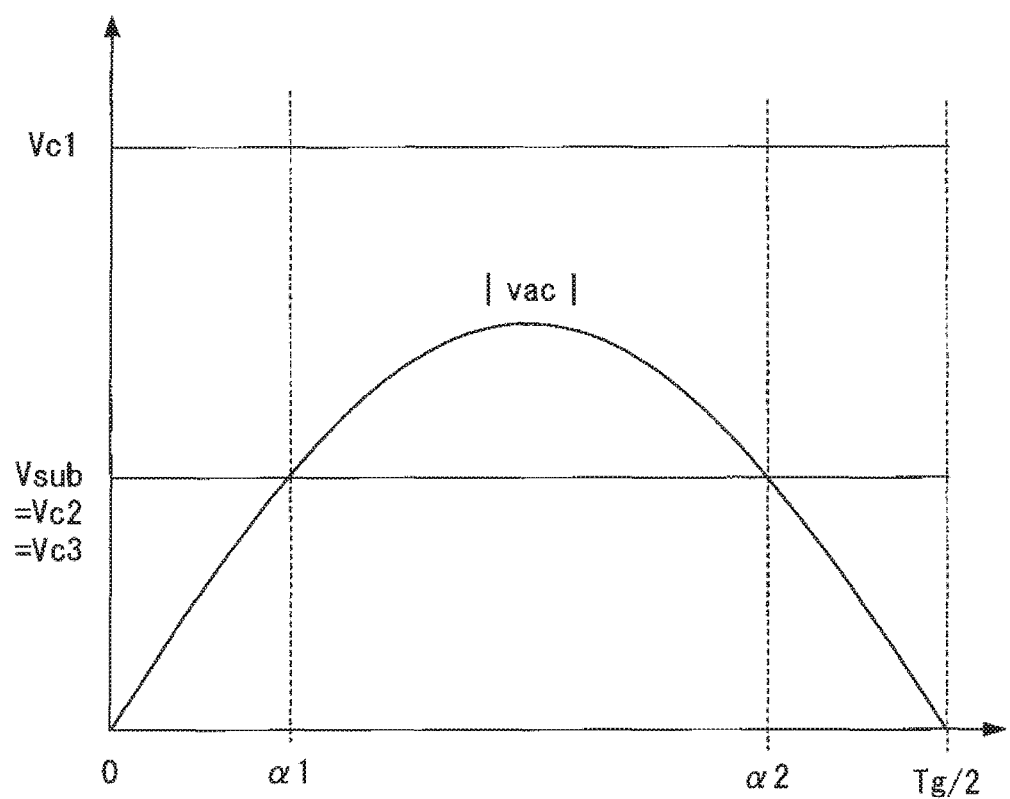
FIG. 91 is a diagram showing a relationship of voltages in a step-up operation mode in the power conversion device according to embodiment 3 of the present invention.
Figure 92:
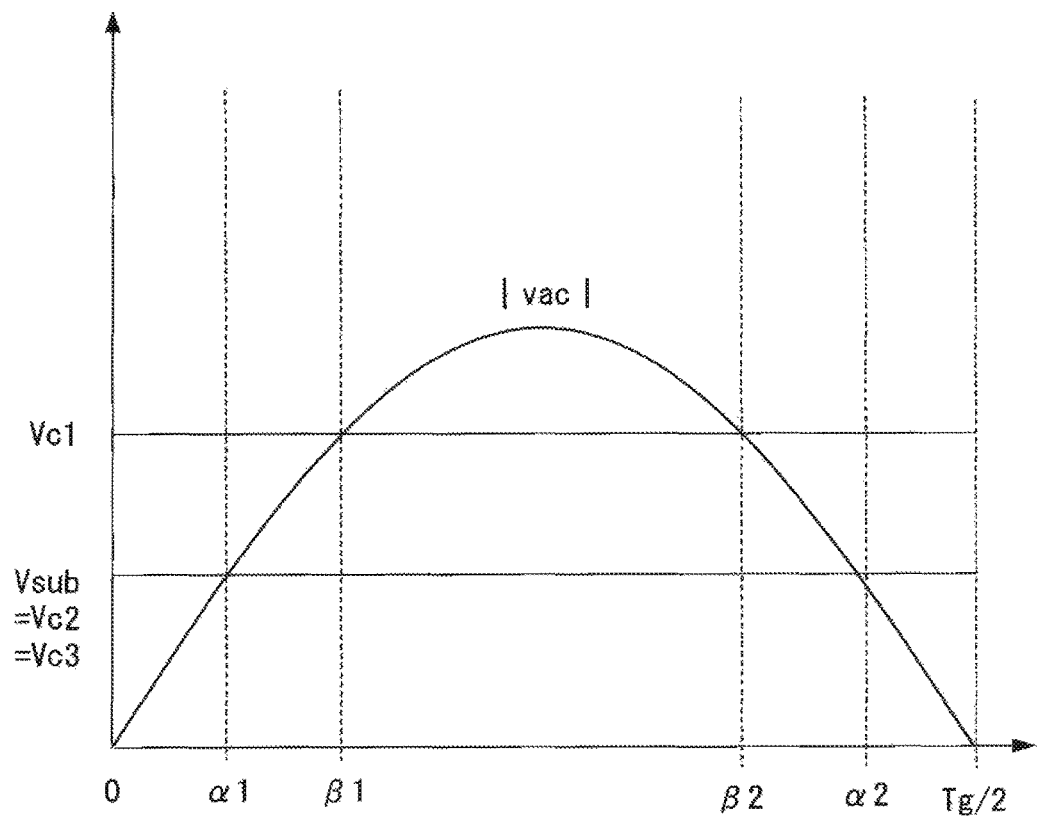
FIG. 92 is a diagram showing a relationship of voltages in a step-down operation mode in the power conversion device according to embodiment 3 of the present invention.

In addition, a feature that control is performed using divided areas of area 1, area 2, and area 3 determined depending on the voltage relationship as shown in FIG. 91 and FIG. 92, is also the same as in the above embodiment 2, and the description thereof is omitted.

What is different from the above embodiment 2 is control operation, and hereinafter, operation of the control unit 100 in FIG. 90 will be described.

In this configuration, the current route differs between the positive half wave and the negative half wave of the AC power supply 1. Therefore, first, driving methods and current routes in the areas 1 to 3 in the positive half wave will be described. It is noted that the total inductance of the reactors 2a and 2b is defined as L.

In the present embodiment 3, one switching cycle Tsw of the single-phase inverter 300 and the single-phase inverter 400 is set to be the same as one switching cycle Tsw of the single-phase converter 200.

Figure 93:
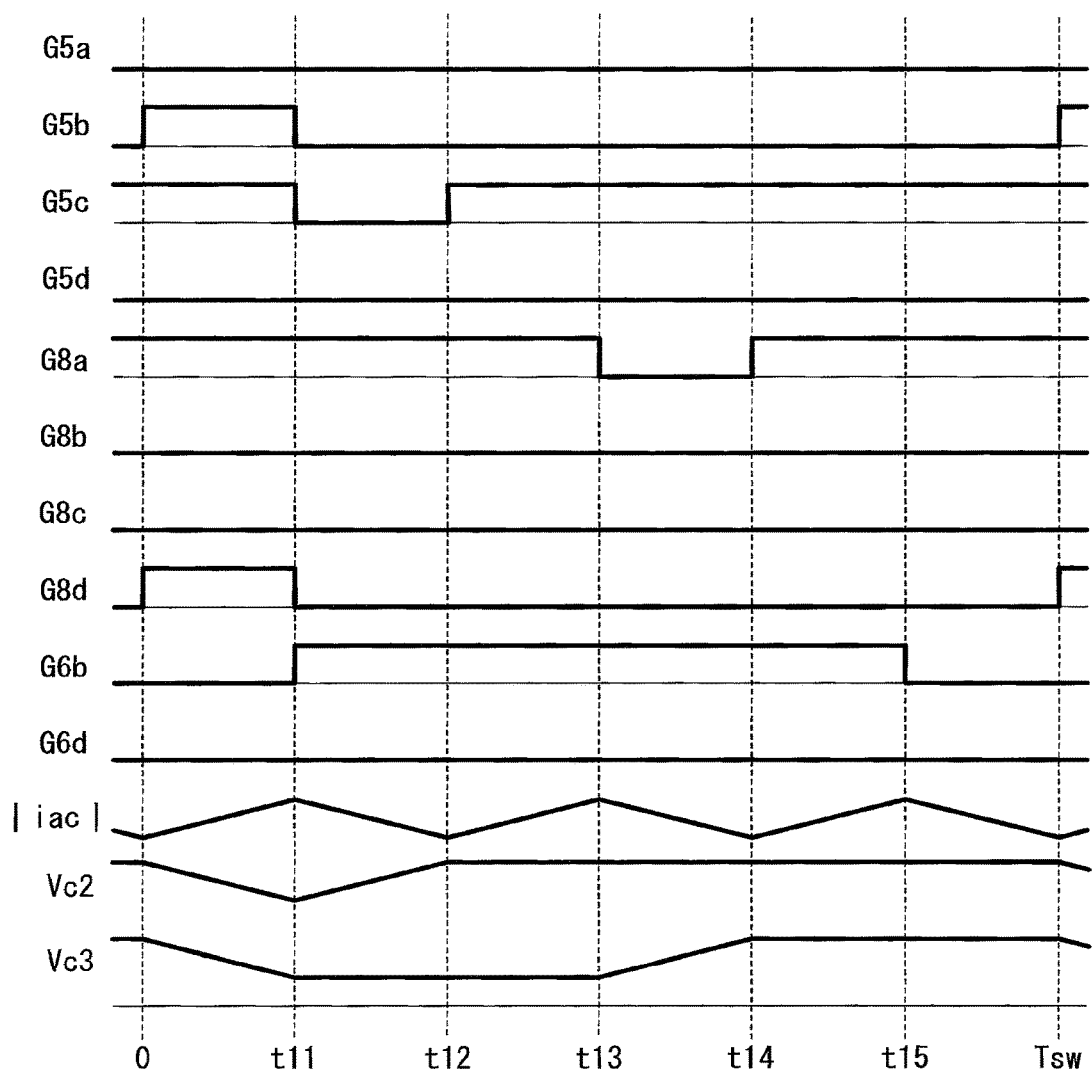
FIG. 93 is a waveform schematic diagram showing the operation state in an area 1 in the positive half wave of the AC power supply 1, in the power conversion device according to embodiment 3 of the present invention.

FIG. 93 shows a schematic diagram of operation during one switching cycle Tsw, in the area 1 in the positive half wave of the AC power supply 1. The one switching cycle Tsw is divided into six periods and driving is performed by high-frequency PWM.

Figure 94:
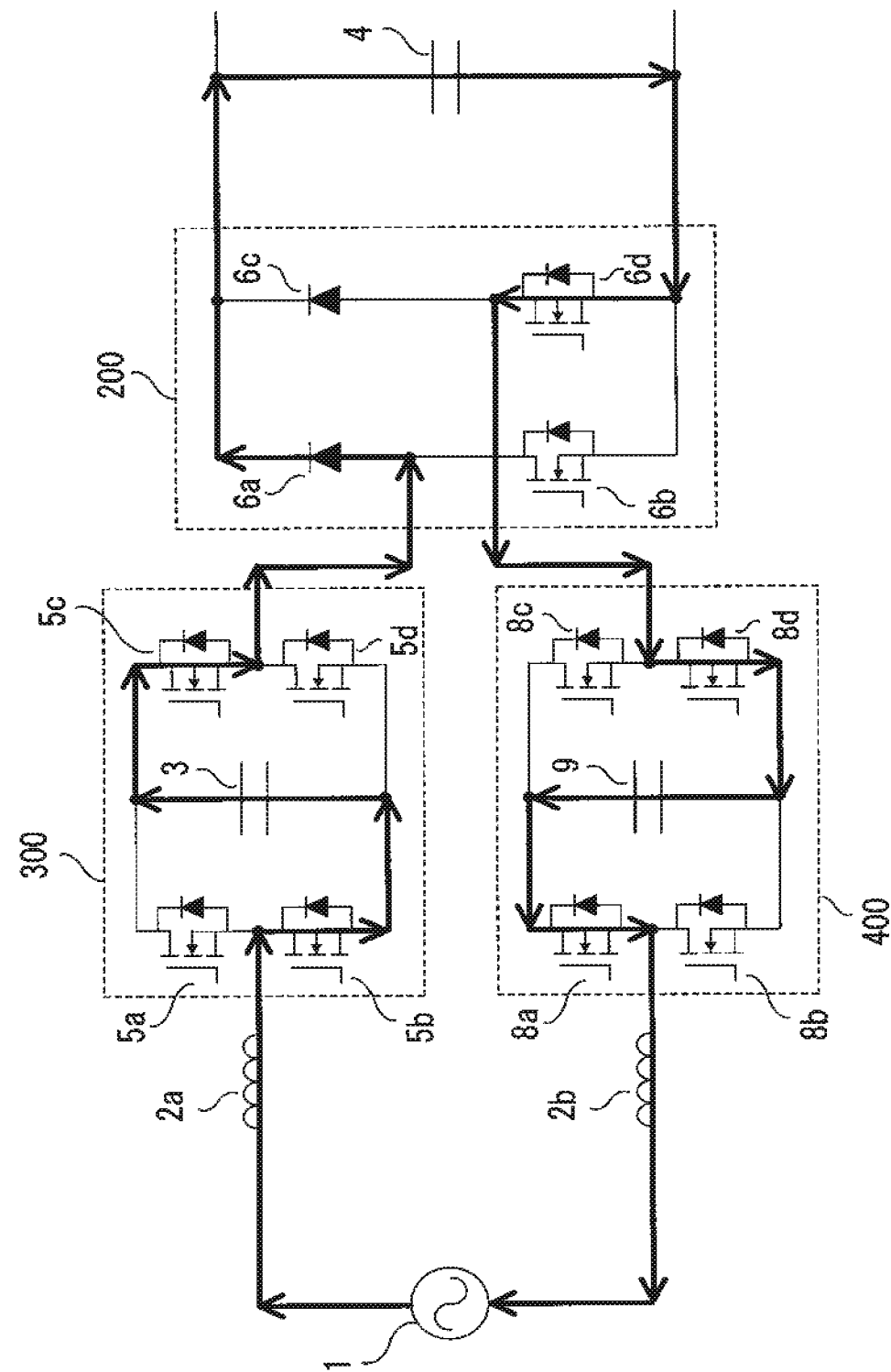
FIG. 94 is a diagram showing a current route in a first period in FIG. 93.

In the first period of 0<t≤t11, the switch elements 5b, 5c, 8a, 8d are ON and current |iac| of the AC power supply 1 increases. The current at this time flows through a route shown in FIG. 94. The route is as follows: AC power supply 1→reactor 2a→switch element 5b→DC capacitor 3→switch element 5c→diode 6a→smoothing capacitor 4→switch element 6d a switch element 8d→DC capacitor 9→switch element 8a→reactor 2b→AC power supply 1. During this period, current flows through the DC capacitor 3 and the DC capacitor 9 in a discharging direction, and therefore voltages Vc2 and Vc3 decrease. A current change amount Δiac11 during this period is represented by the following Expression (121) and becomes a positive value.

$$\Delta iac11 = ((|vac| + Vc2 + Vc3 - Vc1)/L) \cdot t11 \quad (121)$$

Figure 95:
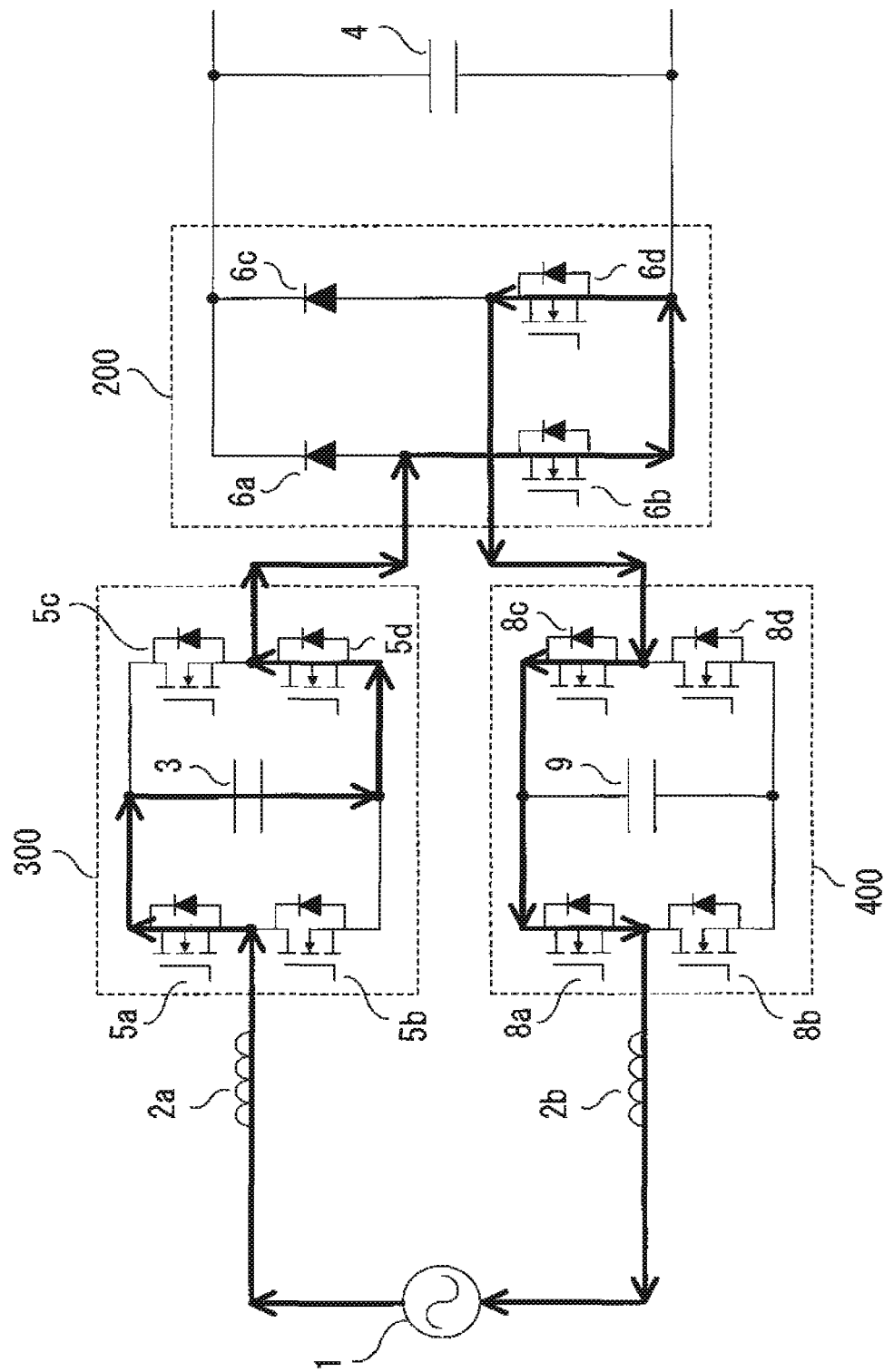
FIG. 95 is a diagram showing a current route in a second period in FIG. 93.

In the second period of t11<t≤t12, the switch elements 6b, 8a are ON and current |iac| of the AC power supply 1 decreases. The current at this time flows through a route shown in FIG. 95. The route is as follows: AC power supply 1→reactor 2a→switch element 5a→DC capacitor 3→switch element 5d→switch element 6b→switch element 6d→switch element 8c→switch element 8a→reactor 2b→AC power supply 1. During this period, current flows through the DC capacitor 3 in a charging direction, so that voltage Vc2 increases, and current does not flow through the DC capacitor 9 and therefore voltage Vc3 is constant. A current change amount Δiac12 during this period is represented by the following Expression (122) and becomes a negative value.

$$\Delta iac12=((|vac|-Vc2)/L)\cdot(t12-t11) \tag{122}$$

Figure 96:
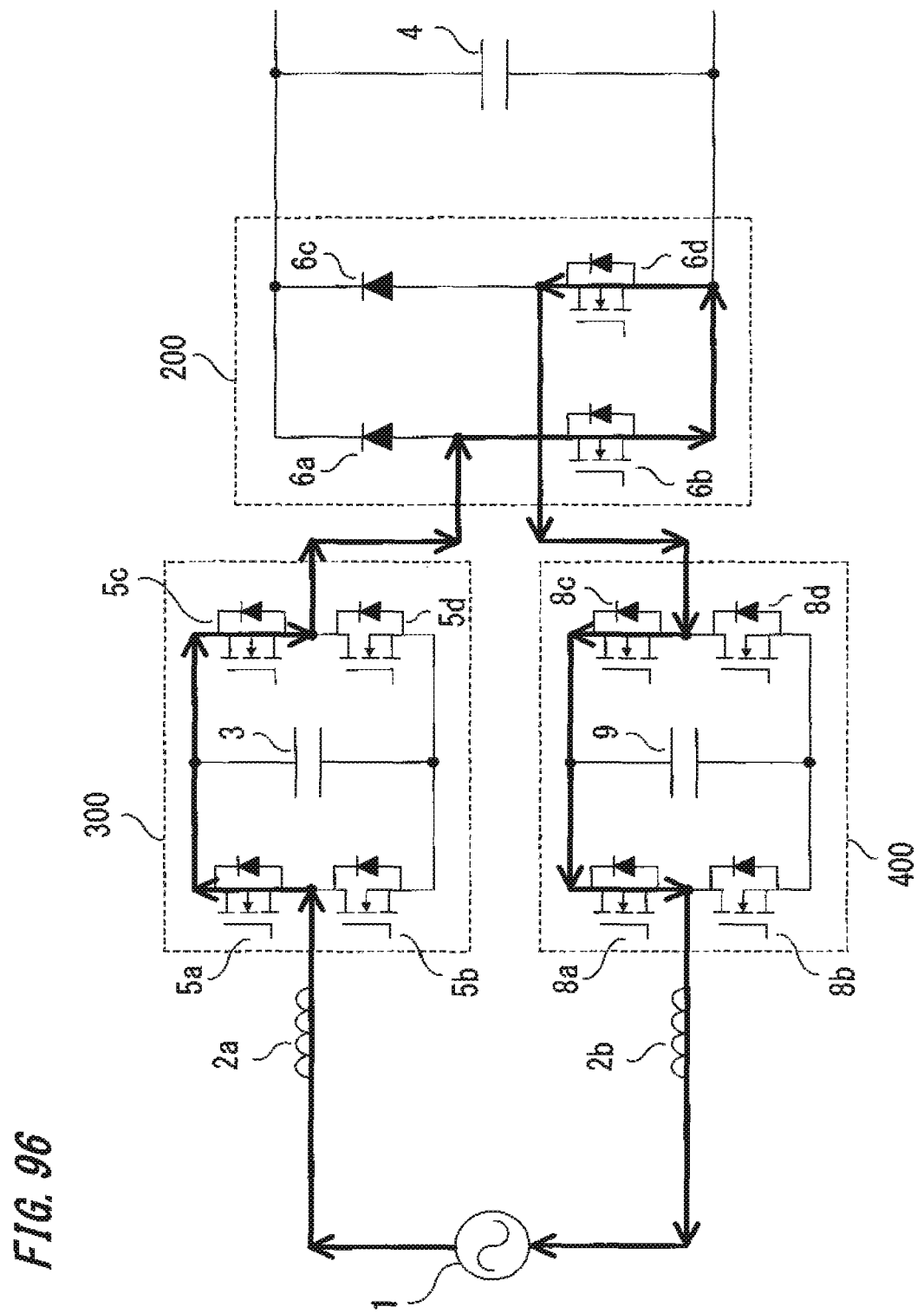
FIG. 96 is a diagram showing a current route in a third period in FIG. 93.

In the third period of t12<t≤t13, the switch elements 5c, 6b, 8a are ON and current |iac| of the AC power supply 1 increases. The current at this time flows through a route shown in FIG. 96. The route is as follows: AC power supply 1→reactor 2a→switch element 5a→switch element 5c→switch element 6b→switch element 6d→switch element 8c→switch element 8a→reactor 2b→AC power supply 1. During this period, current does not flow through the DC capacitor 3 and the DC capacitor 9, and therefore voltages Vc2 and Vc3 are constant. A current change amount Δiac13 during this period is represented by the following Expression (123) and becomes a positive value.

$$\Delta iac13=(|vac|/L)\cdot(t13-t12) \tag{123}$$

Figure 97:
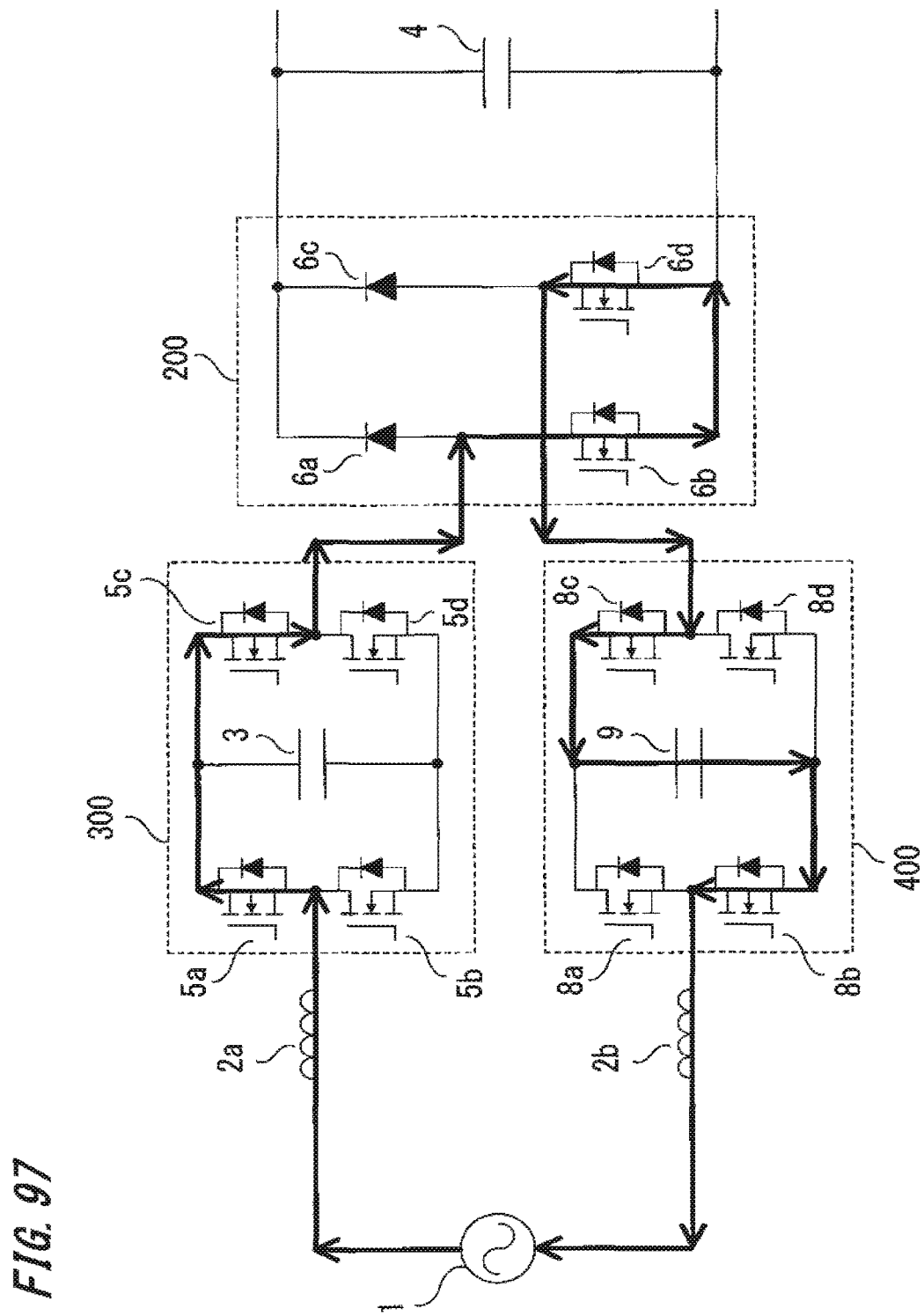
FIG. 97 is a diagram showing a current route in a fourth period in FIG. 93.

In the fourth period of t13<t<t14, the switch elements 5c, 6b are ON and current |iac| of the AC power supply 1 decreases. The current at this time flows through a route shown in FIG. 97. The route is as follows: AC power supply 1→reactor 2a→switch element 5a→switch element 5c→switch element 6b→switch element 6d→switch element 8c→DC capacitor 9→switch element 8b→reactor 2b→AC power supply 1. During this period, current flows through the DC capacitor 9 in a charging direction, so that voltage Vc3 increases, and current does not flow through the DC capacitor 3 and therefore voltage Vc2 is constant. A current change amount Δiac14 during this period is represented by the following Expression (124) and becomes a negative value.

$$\Delta iac14=((|vac|-Vc3)/L)\cdot(t14-t13) \tag{124}$$

Figure 98:
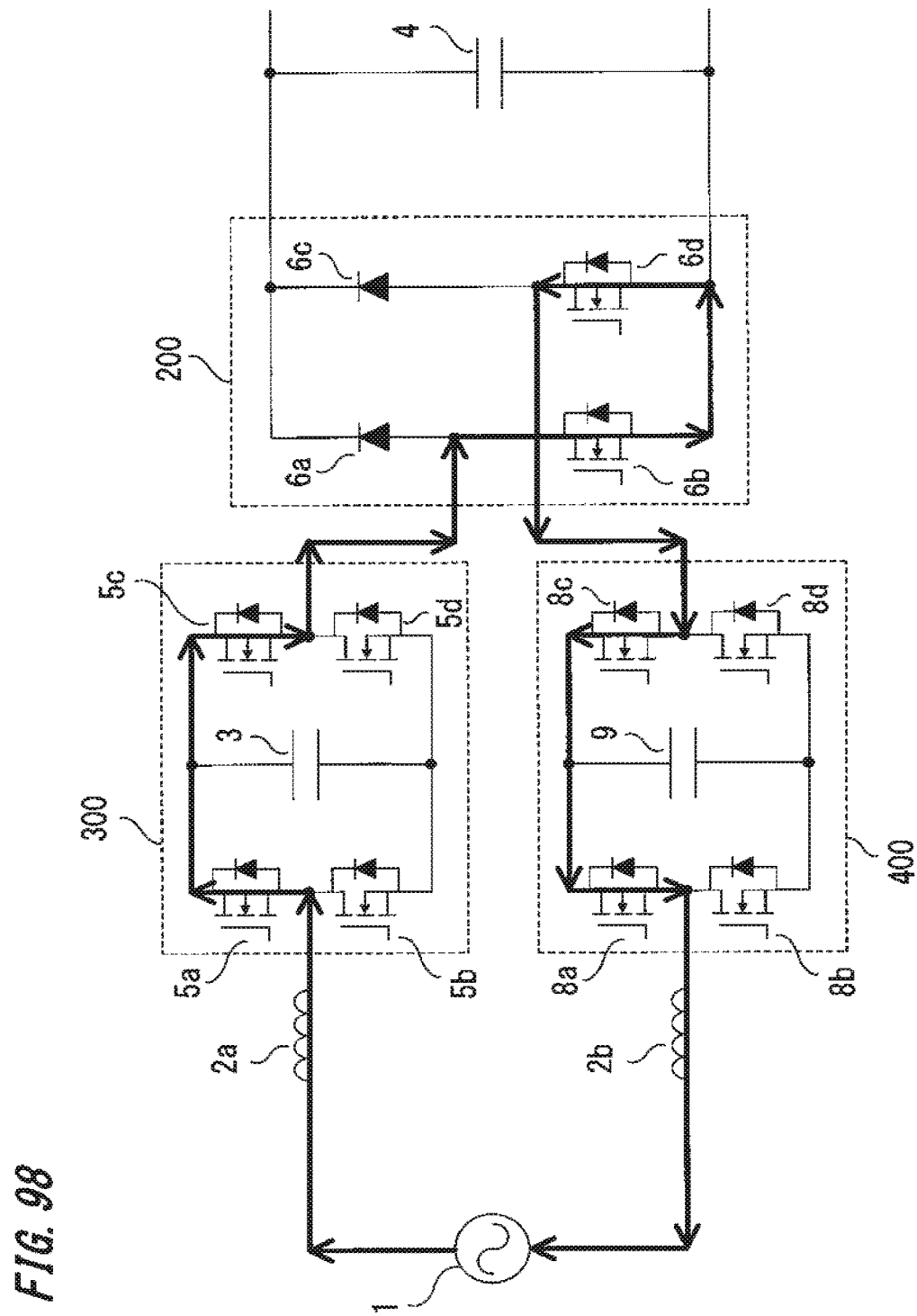
FIG. 98 is a diagram showing a current route in a fifth period in FIG. 93.

In the fifth period of t14<t≤t15, the switch elements 5c, 6b, 8a are ON and current |iac| of the AC power supply 1 increases. The current at this time flows through a route shown in FIG. 98. The route is as follows: AC power supply 1→reactor 2a→switch element 5a→switch element 5c→switch element 6b→switch element 6d→switch element 8c→switch element 8a→reactor 2b→AC power supply 1. During this period, current does not flow through the DC capacitor 3 and the DC capacitor 9, and therefore voltages Vc2 and Vc3 are constant. A current change amount Δiac15 during this period is represented by the following Expression (125) and becomes a positive value.

$$\Delta iac15=(|vac|/L)\cdot(t15-t14) \tag{125}$$

Figure 99:
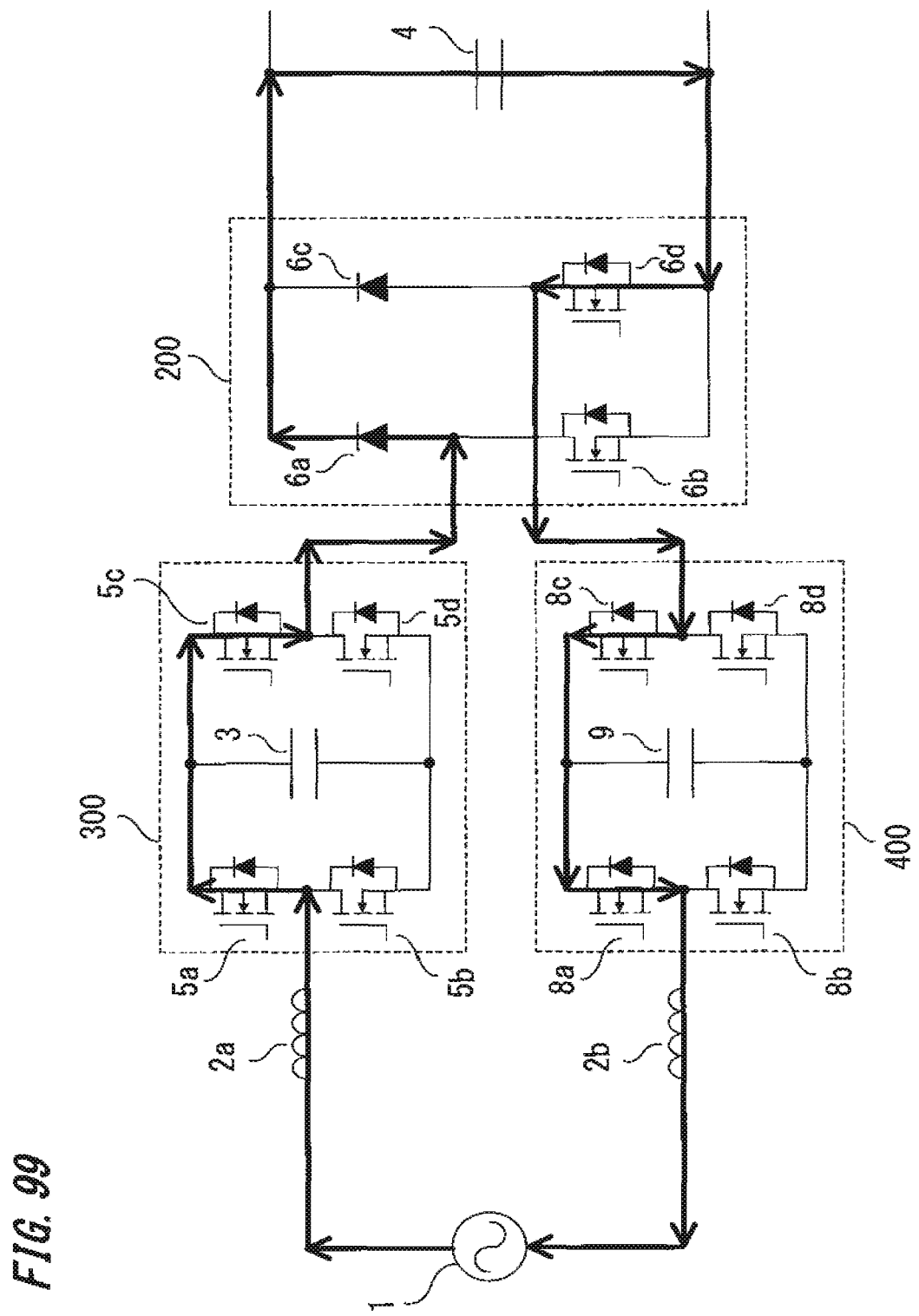
FIG. 99 is a diagram showing a current route in a sixth period in FIG. 93.

In the sixth period of t15<t≤Tsw, the switch elements 5c, 8a are ON and current |iac| of the AC power supply 1 decreases. The current at this time flows through a route shown in FIG. 99. The route is as follows: AC power supply 1→reactor 2a→switch element 5a→switch element 5c→diode 6a→smoothing capacitor 4→switch element 6d→switch element 8c→switch element 8a→reactor 2b→AC power supply 1. During this period, current does not flow through the DC capacitor 3 and the DC capacitor 9, and therefore voltages Vc2 and Vc3 are constant. A current change amount Δiac16 during this period is represented by the following Expression (126) and becomes a negative value.

$$\Delta iac16=((|vac|-Vc1)/L)\cdot(Tsw-t15) \tag{126}$$

At this time, under the assumption of Δiac11=−Δiac12, a theoretical duty D11 which is a ratio of a period from 0 to t11 with respect to a period from 0 to t12 is represented by Expression (127), and a theoretical duty D12 which is a ratio of a period from t11 to t12 with respect to the period from 0 to t12 is represented by Expression (128).

$$D11=(Vc2-|vac|)/(2Vc2+Vc3-Vc1)) \tag{127}$$

$$D12=1-D11 \tag{Expression (128)}$$

In addition, under the assumption of Δiac13=−Δiac14, a theoretical duty D13 which is a ratio of a period from t12 to t13 with respect to a period from t12 to t14 is represented by Expression (129), and a theoretical duty D14 which is a ratio of a period from t13 to t14 with respect to the period from t12 to t14 is represented by Expression (130).

$$D13=(Vc3-|vac|)/Vc3) \tag{129}$$

$$D14=1-D13 \tag{Expression (130)}$$

In addition, under the assumption of Δiac15=−Δiac16, a theoretical duty D15 which is a ratio of a period from t14 to t15 with respect to a period from t14 to Tsw is represented by Expression (131), and a theoretical duty D16 which is a ratio of a period from t15 to Tsw with respect to the period from t14 to Tsw is represented by Expression (132).

$$D15=(Vc1-|vac|)/Vc1 \tag{131}$$

$$D16=1-D15 \tag{Expression (132)}$$

Figure 100:
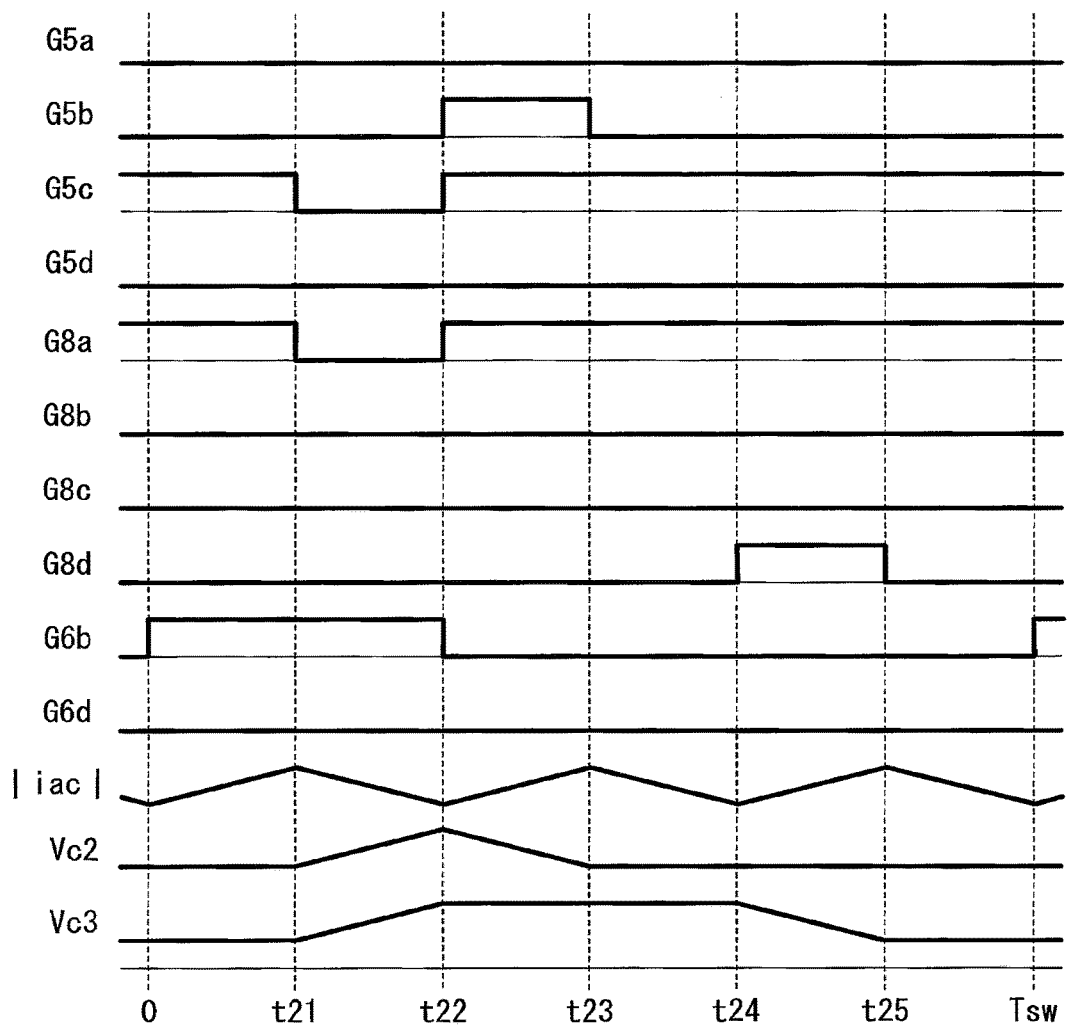
FIG. 100 is a waveform schematic diagram showing the operation state in an area 2 in the positive half wave of the AC power supply 1, in the power conversion device according to embodiment 3 of the present invention.

FIG. 100 shows a schematic diagram of operation b during one switching cycle Tsw, in the area 2 in the positive half wave of the AC power supply 1. One switching cycle Tsw is divided into six periods and driving is performed by high-frequency PWM.

Figure 101:
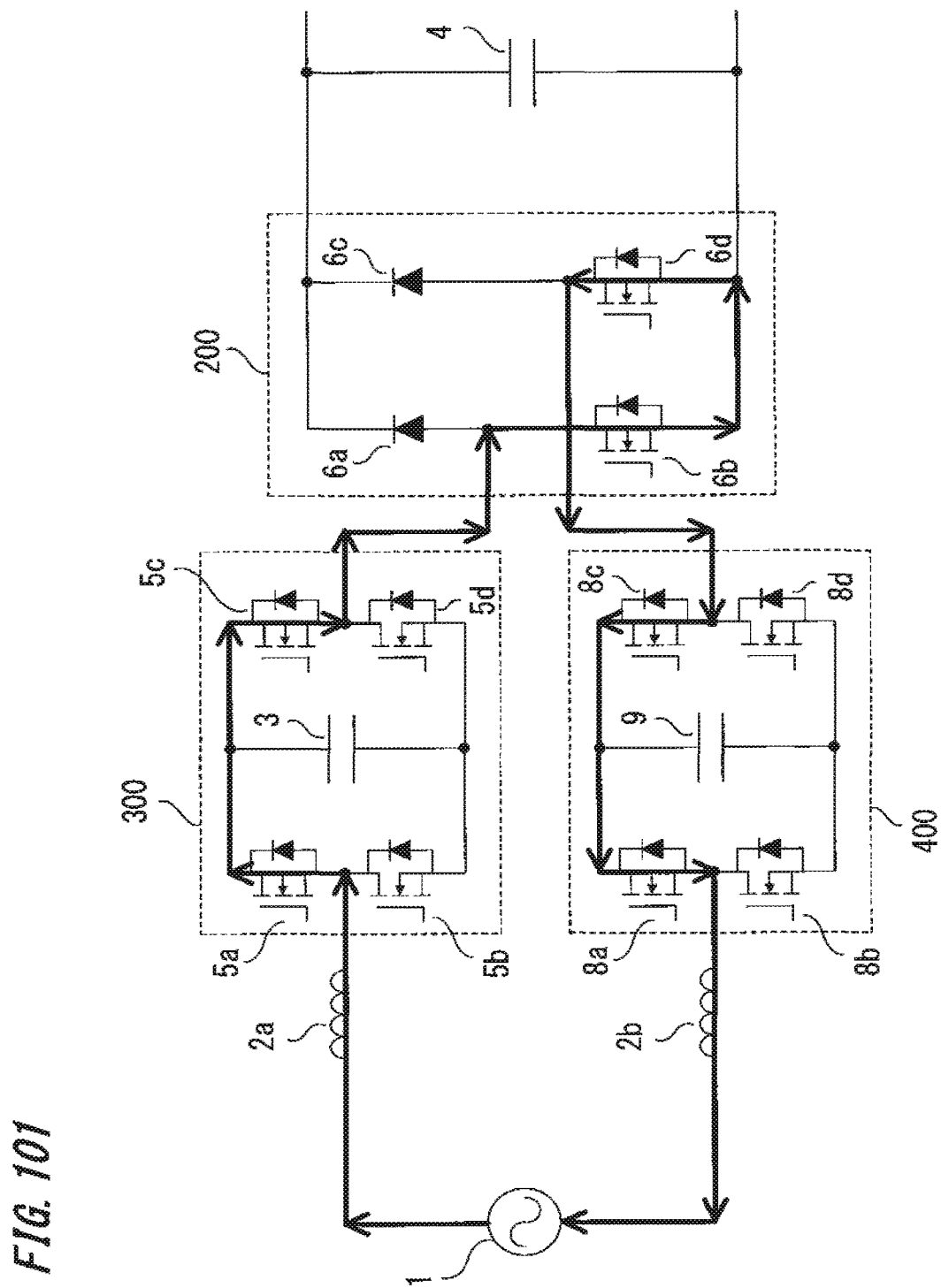
FIG. 101 is a diagram showing a current route in a first period in FIG. 100.

In the first period of 0<t≤t21, the switch elements 5c, 6b, 8a are ON and current |iac| of the AC power supply 1 increases. The current at this time flows through a route shown in FIG. 101. The route is as follows: AC power supply 1→reactor 2a→switch element 5a→switch element 5c→switch element 6b→switch element 6d→switch element 8c→switch element 8a→reactor 2b→AC power supply 1. During this period, current does not flow through the DC capacitor 3 and the DC capacitor 9, and therefore voltages Vc2 and Vc3 are constant. A current change amount Δiac21 during this period is represented by the following Expression (133) and becomes a positive value.

$$\Delta iac21=(|vac|/L)\cdot t21 \tag{133}$$

Figure 102:
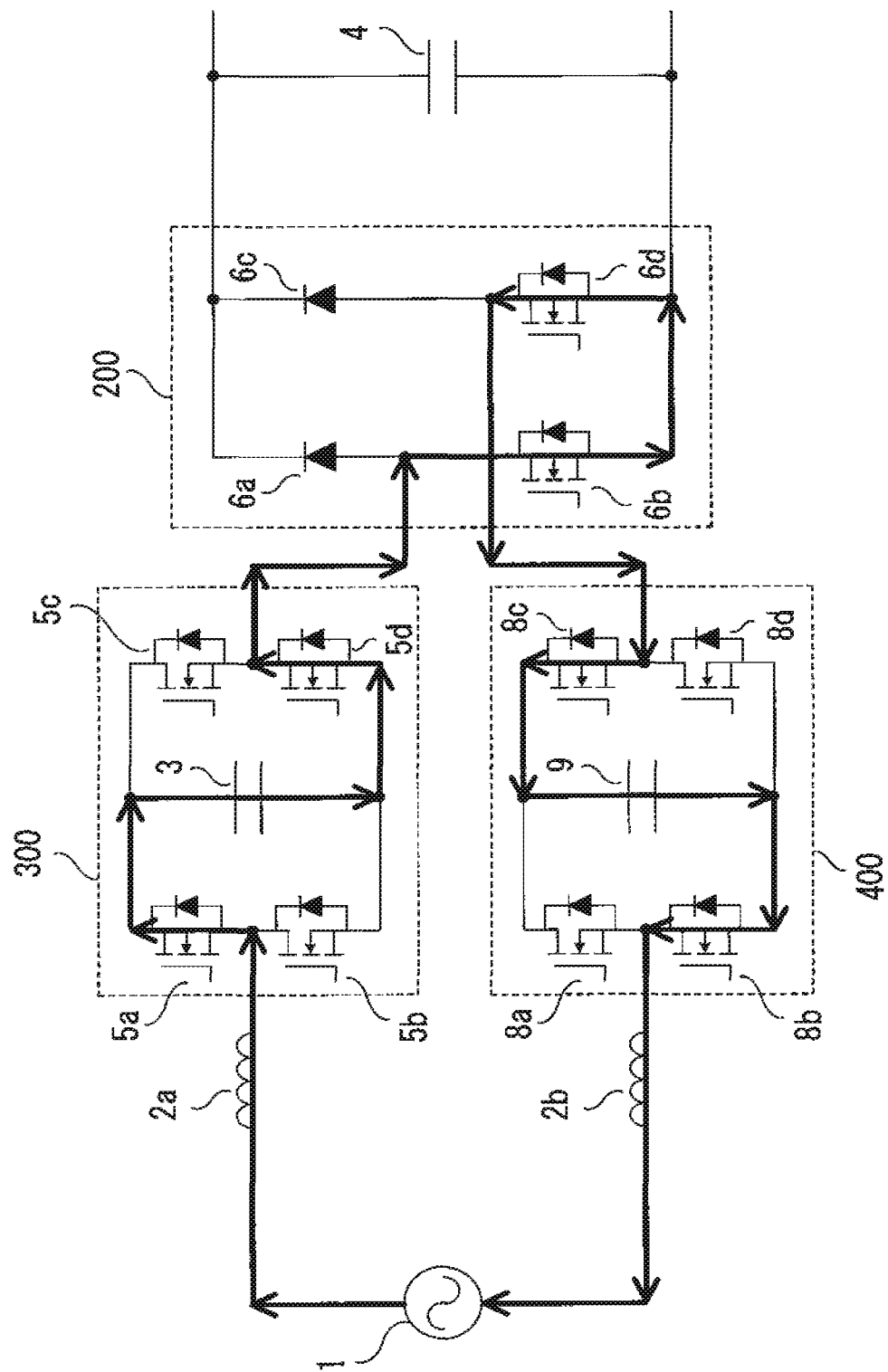
FIG. 102 is a diagram showing a current route in a second period in FIG. 100.

In the second period of t21<t≤t22, the switch element 6b is ON and current |iac| of the AC power supply 1 decreases. The current at this time flows through a route shown in FIG. 102. The route is as follows: AC power supply 1→reactor 2a→switch element 5a→DC capacitor 3→switch element 5d→switch element 6b→switch element 6d→switch element 8c→DC capacitor 9→switch element 8b→reactor 2b→AC power supply 1. During this period, current flows through the DC capacitor 3 and the DC capacitor 9 in a charging direction, and therefore voltages Vc2 and Vc3 increase. A current change amount Δiac22 during this period is represented by the following Expression (134) and becomes a negative value.

$$\Delta iac22=((|vac|-Vc2-Vc3)/L)\cdot(t22-t21) \tag{134}$$

Figure 103:
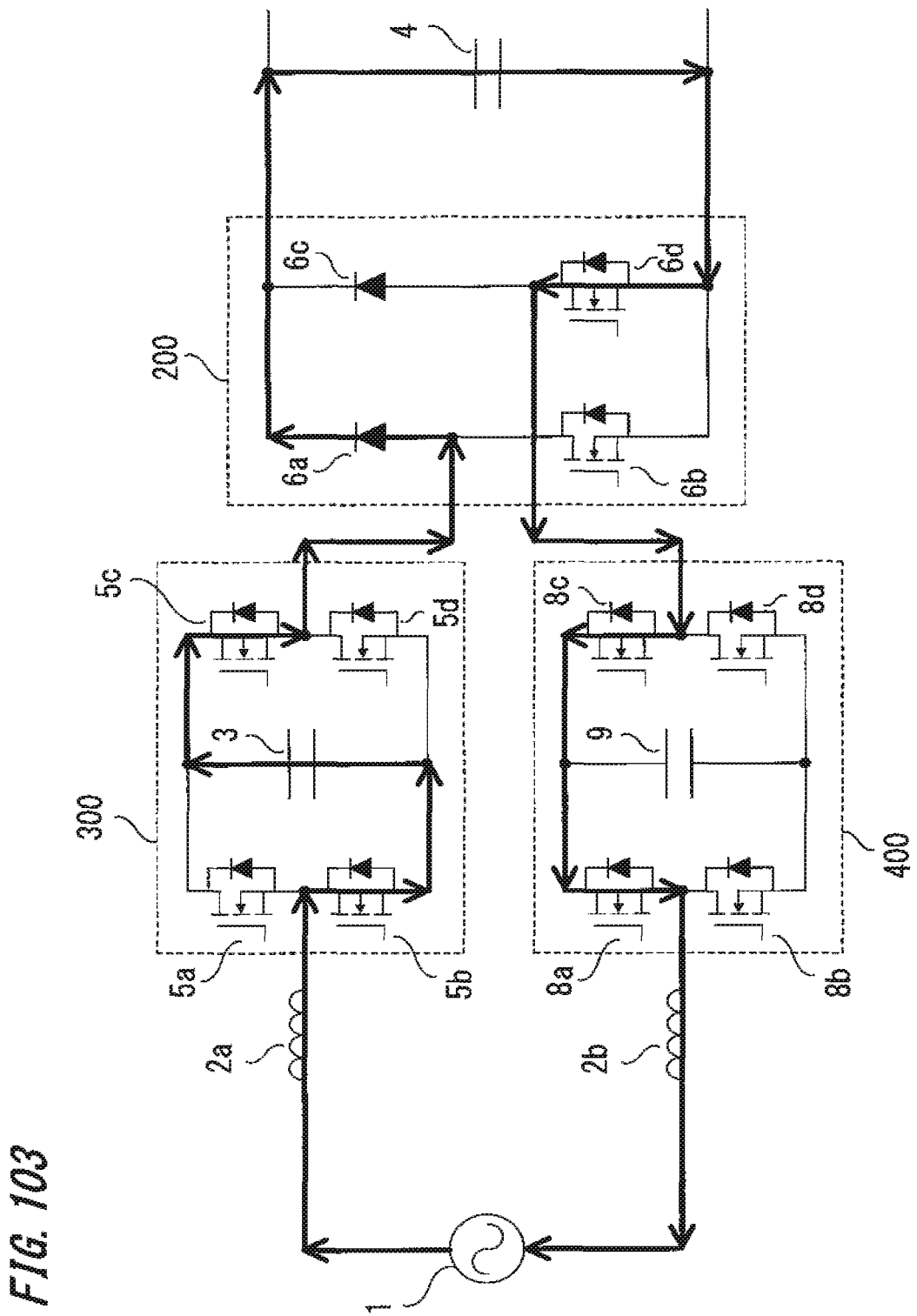
FIG. 103 is a diagram showing a current route in a third period in FIG. 100.

In the third period of t22<t≤t23, the switch elements 5b, 5c, 8a are ON and current |iac| of the AC power supply 1 increases. The current at this time flows through a route shown in FIG. 103. The route is as follows: AC power supply 1→reactor 2a→switch element 5b→DC capacitor 3→switch element 5c→diode 6a→smoothing capacitor 4→switch element 6d→switch element 8c→switch element 8a→reactor 2b→AC power supply 1. During this period, current flows through the DC capacitor 3 in a discharging direction and therefore voltage Vc2 decreases, and current does not flow through the DC capacitor 9 and therefore voltage Vc3 is constant. A current change amount Δiac23 during this period is represented by the following Expression (135) and becomes a positive value.

$$\Delta iac23=((|vac|+Vc2-Vc1)/L)\cdot(t23-t22) \tag{135}$$

Figure 104:
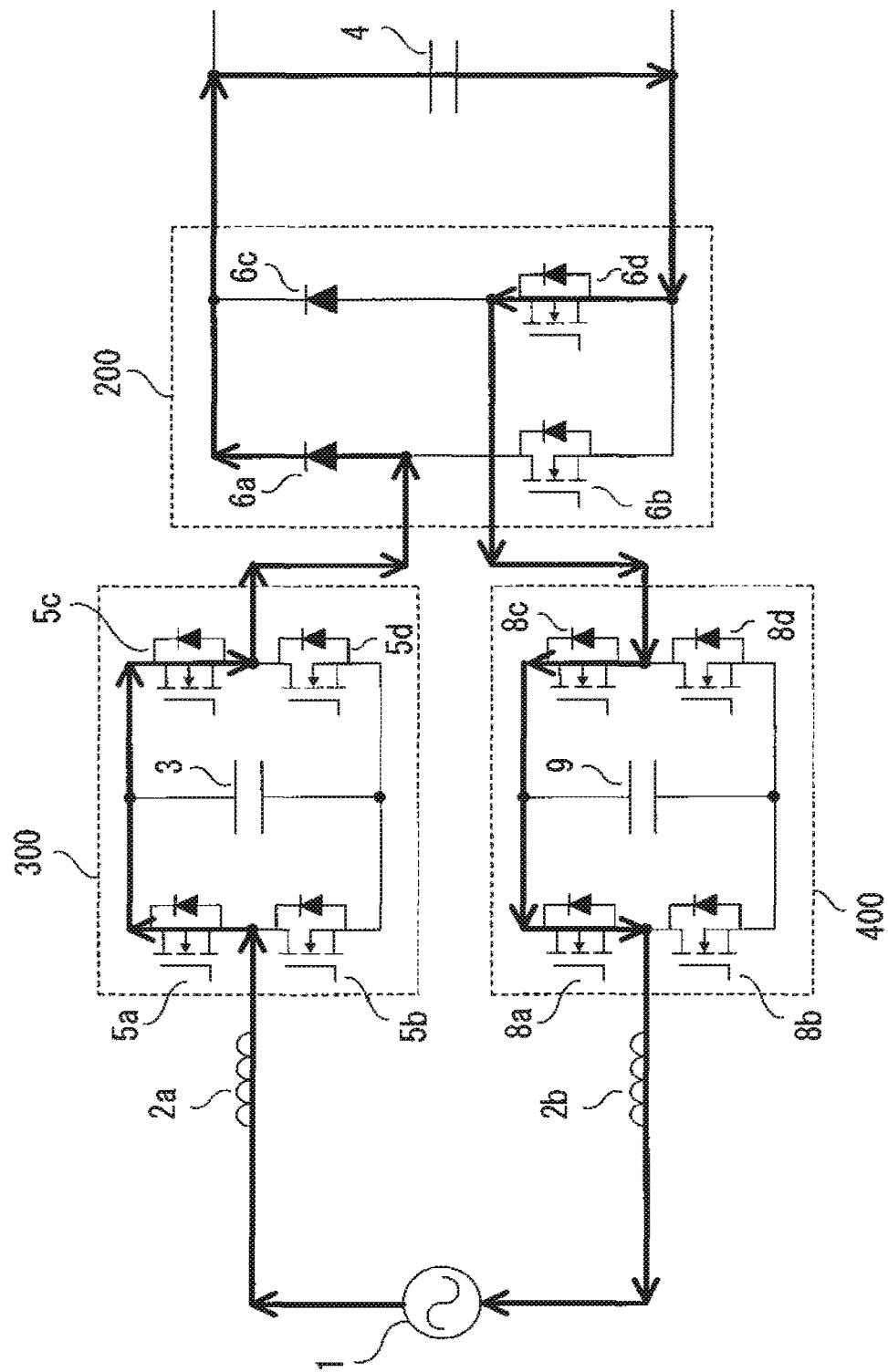
FIG. 104 is a diagram showing a current route in a fourth period in FIG. 100.

In the fourth period of t23<t≤t24, the switch elements 5c, 8a are ON and current |iac| of the AC power supply 1 decreases. The current at this time flows through a route shown in FIG. 104. The route is as follows: AC power supply 1→reactor 2a→switch element 5a→switch element 5c→diode 6a→smoothing capacitor 4→switch element 6d→switch element 8c→switch element 8a→reactor 2b→AC power supply 1. During this period, current does not flow through the DC capacitor 3 and the DC capacitor 9, and therefore voltages Vc2 and Vc3 are constant. A current change amount Δiac24 during this period is represented by the following Expression (136) and becomes a negative value.

$$\Delta iac24=((|vac|-Vc1)/L)\cdot(t24-t23) \tag{136}$$

Figure 105:
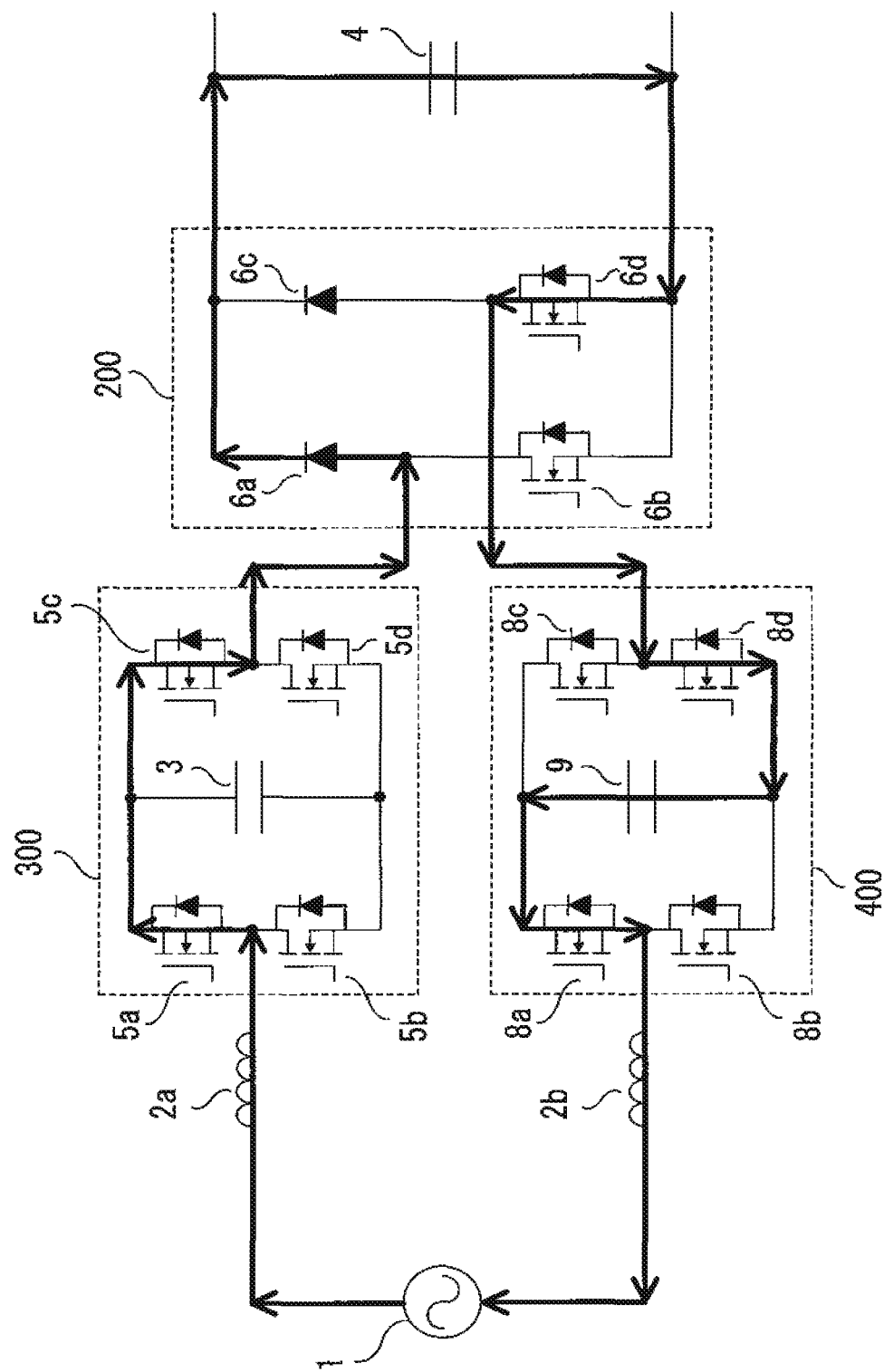
FIG. 105 is a diagram showing a current route in a fifth period in FIG. 100.

In the fifth period of 24<t≤t25, the switch elements 5c, 8a, 8d are ON and current |iac| of the AC power supply 1 increases. The current at this time flows through a route shown in FIG. 105. The route is as follows: AC power supply 1→reactor 2a→switch element 5a→switch element 5c→diode 6a→smoothing capacitor 4→switch element 6d→switch element 8d→DC capacitor 9→switch element 8a→reactor 2b→AC power supply 1. During this period, current flows through the DC capacitor 9 in a discharging direction and therefore voltage Vc3 decreases, and current does not flow through the DC capacitor 3 and therefore voltage Vc2 is constant. A current change amount Δiac25 during this period is represented by the following Expression (137) and becomes a positive value.

$$\Delta iac25=((|vac|+Vc3-Vc1)/L)\cdot(t25-t24) \tag{137}$$

Figure 106:
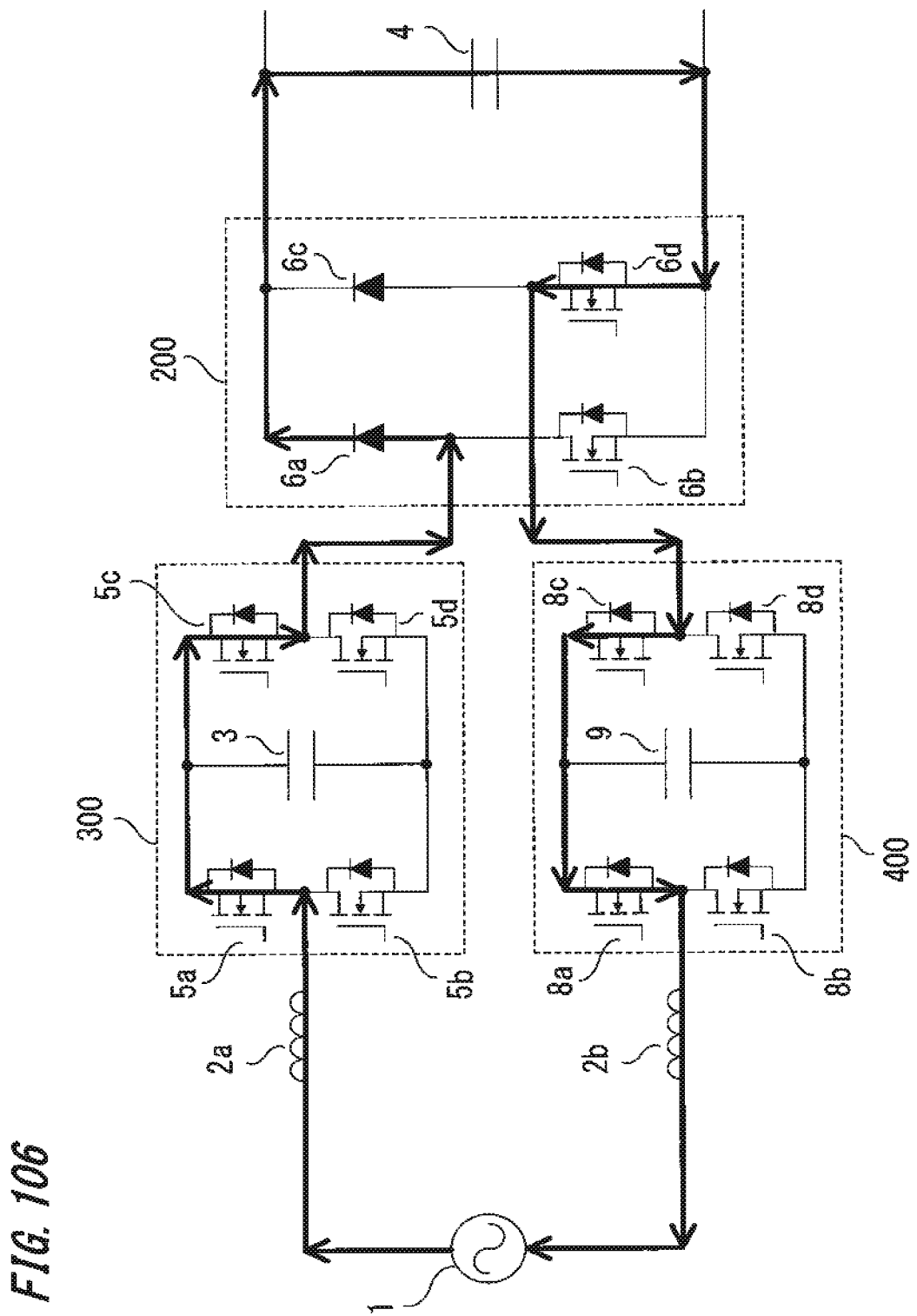
FIG. 106 is a diagram showing a current route in a sixth period in FIG. 100.

In the sixth period of t25<t≤Tsw, the switch elements 5c, 8a are ON and current |iac| of the AC power supply 1 decreases. The current at this time flows through a route shown in FIG. 106. The route is as follows: AC power supply 1→reactor 2a→switch element 5a→switch element 5c→diode 6a→smoothing capacitor 4→switch element 6d→switch element 8c→switch element 8a→reactor 2b→AC power supply 1. During this period, current does not flow through the DC capacitor 3 and the DC capacitor 9 and therefore voltages Vc2 and Vc3 are constant. A current change amount Δiac26 during this period is represented by the following Expression (138) and becomes a negative value.

$$\Delta iac26=((|vac|-Vc1)/L)\cdot(Tsw-t25) \tag{138}$$

At this time, under the assumption of Δiac21=−Δiac22, a theoretical duty D21 which is a ratio of a period from 0 to t21 with respect to a period from 0 to t22 is represented by Expression (139), and a theoretical duty D22 which is a ratio of a period from t21 to t22 with respect to the period from 0 to t22 is represented by Expression (140).

$$D21=(Vc2+Vc3-|vac|)/(Vc1+Vc2) \tag{139}$$

$$D22=1-D21 \tag{Expression 140}$$

In addition, under the assumption of Δiac23=−Δiac24, a theoretical duty D23 which is a ratio of a period from t22 to t23 with respect to a period from t22 to t24 is represented by Expression (141), and a theoretical duty D24 which is a ratio of a period from t23 to t24 with respect to a period from t22 to t24 is represented by Expression (142).

$$D23=(Vc1-|vac|)/Vc2 \tag{141}$$

$$D24=1-D23 \tag{142}$$

In addition, under the assumption of Δiac25=−Δiac26, a theoretical duty D25 which is a ratio of a period from t24 to Tsw with respect to a period from t24 to Tsw is represented by Expression (143), and a theoretical duty D26 which is a ratio of a period from t24 to t25 with respect to the period from t24 to Tsw is represented by Expression (144).

$$D25=(Vc1-|vac|)/Vc3 \tag{143}$$

$$D26=1-D25 \tag{144}$$

Figure 107:
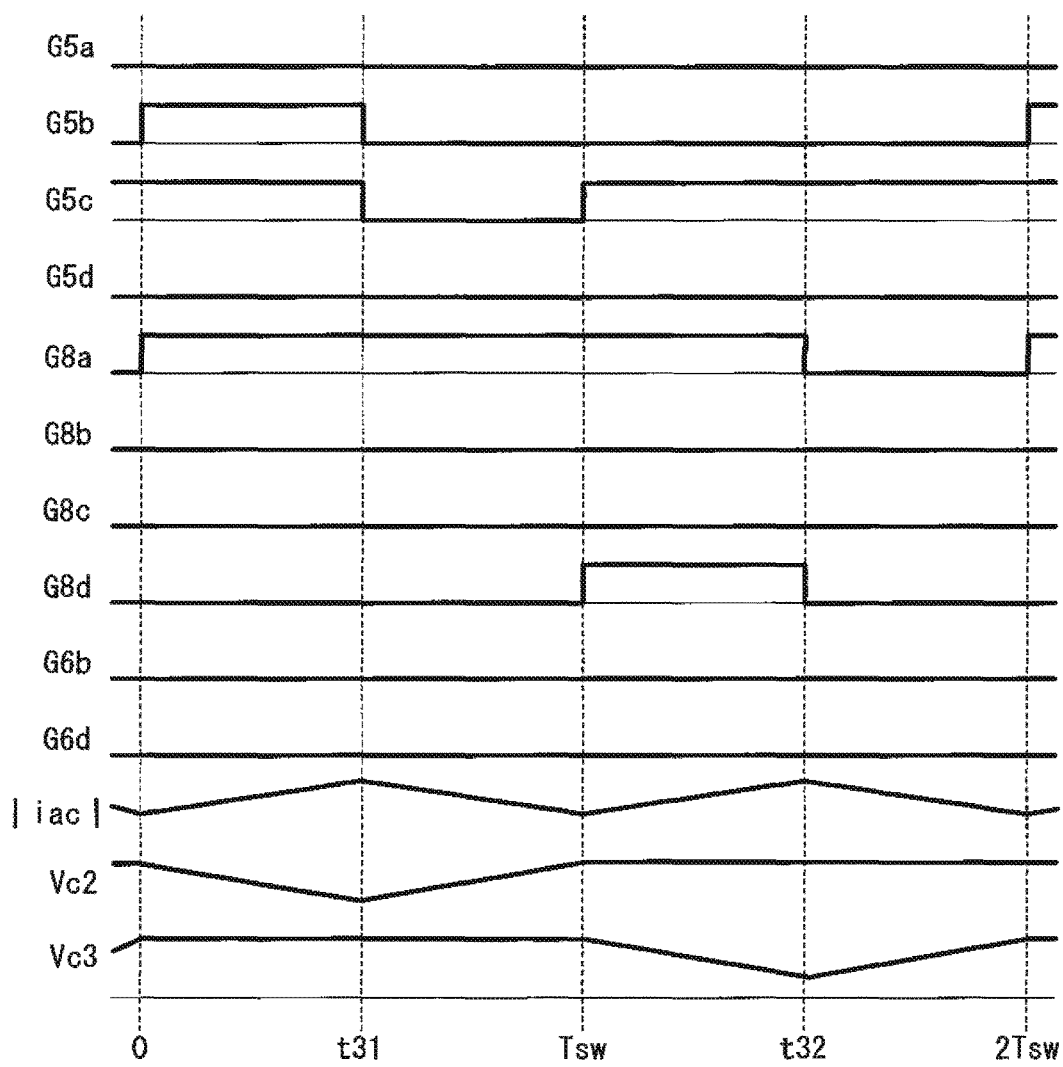
FIG. 107 is a waveform schematic diagram showing the operation state in an area 3 in the positive half wave of the AC power supply 12, in the power conversion device according to embodiment 3 of the present invention.

FIG. 107 shows a schematic diagram of operation during the two switching cycles 2Tsw, in the area 3 in the positive half wave of the AC power supply 1. One switching cycle Tsw is divided into two periods and driving is performed by high-frequency PWM.

Figure 108:
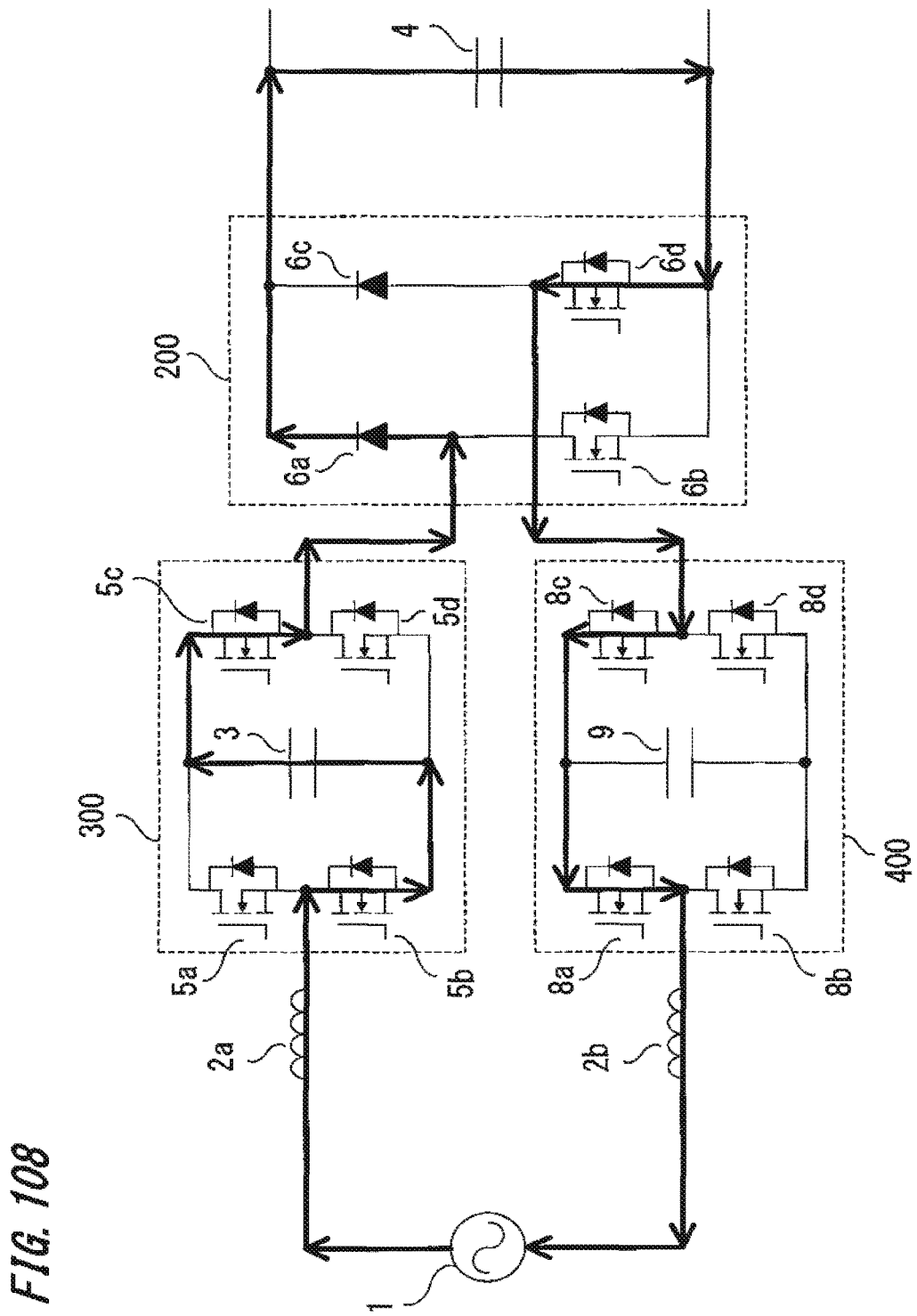
FIG. 108 is a diagram showing a current route in a first period in FIG. 107.

In the first period of 0<t≤t31, the switch elements 5b, 5c, 8a are ON and current |iac| of the AC power supply 1 increases. The current at this time flows through a route shown in FIG. 108. The route is as follows: AC power supply 1→reactor 2a→switch element 5b→DC capacitor 3→switch element 5c→diode 6a→smoothing capacitor 4→switch element 6d→switch element 8c→switch element 8a→reactor 2b→AC power supply 1. During this period, current flows through the DC capacitor 3 in a discharging direction and therefore voltage Vc2 decreases, and current does not flow through the DC capacitor 9 and therefore voltage Vc3 is constant. A current change amount Δiac31 during this period is represented by the following Expression (145) and becomes a positive value.

$$\Delta iac31=((|vac|+Vc2-Vc1)/L)\cdot t31 \tag{145}$$

Figure 109:
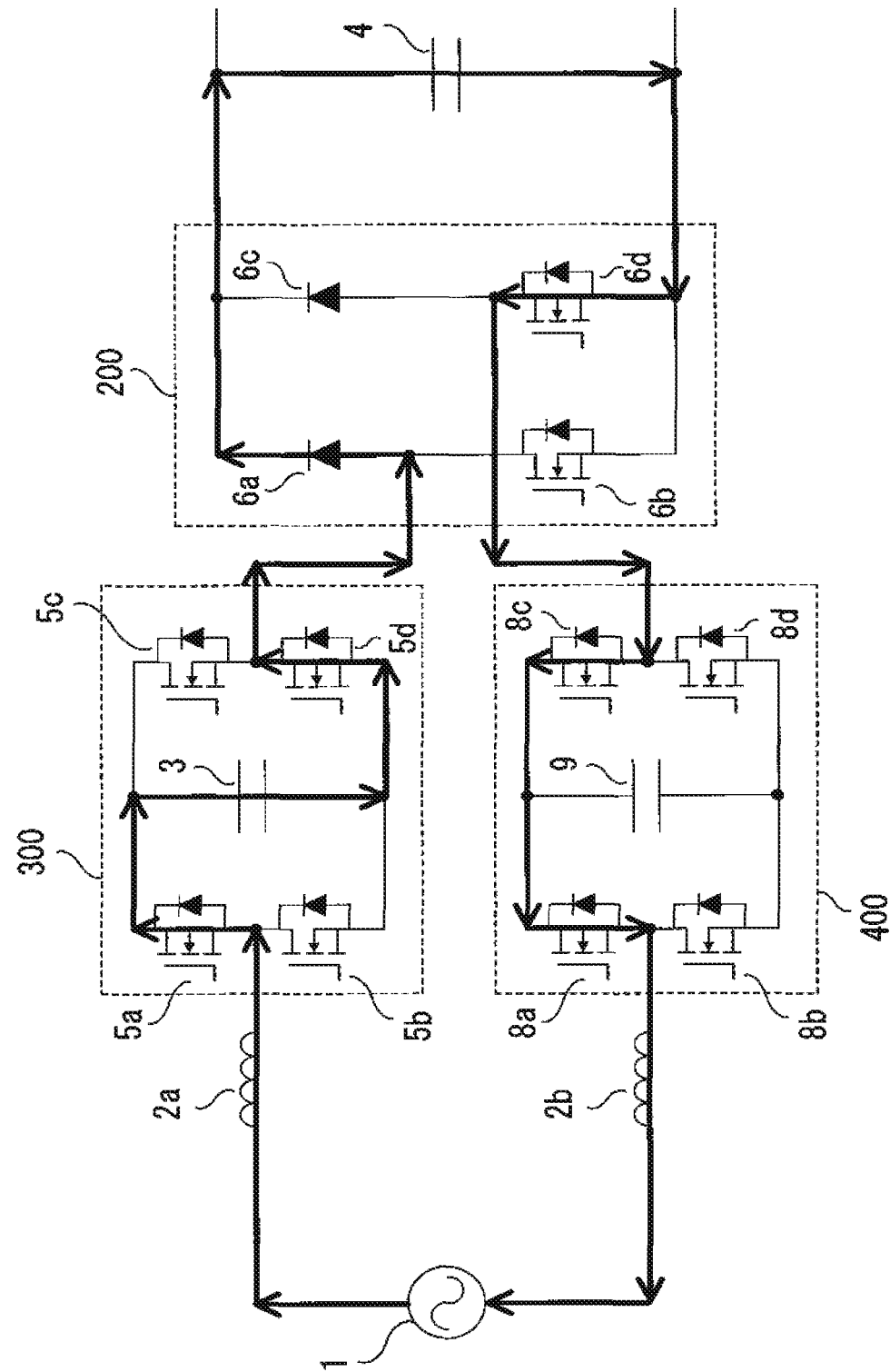
FIG. 109 is a diagram showing a current route in a second period in FIG. 107.

In the second period of t31<t≤Tsw, the switch element 8a is ON and current |iac| of the AC power supply 1 decreases. The current at this time flows through a route shown in FIG. 109. The route is as follows: AC power supply 1→reactor 2a→switch element 5a→DC capacitor 3→switch element 5d→diode 6a→smoothing capacitor 4→switch element 6d→switch element 8c→switch element 8a→reactor 2b→AC power supply 1. During this period, current flows through the DC capacitor 3 in a charging direction and therefore voltage Vc2 increases, and current does not flow through the DC capacitor 9 and therefore voltage Vc3 is constant. A current change amount Δiac32 during this period is represented by the following Expression (146) and becomes a negative value.

$$\Delta iac32=((|vac|-Vc2-Vc1)/L)\cdot(Tsw-t31) \tag{146}$$

Figure 110:
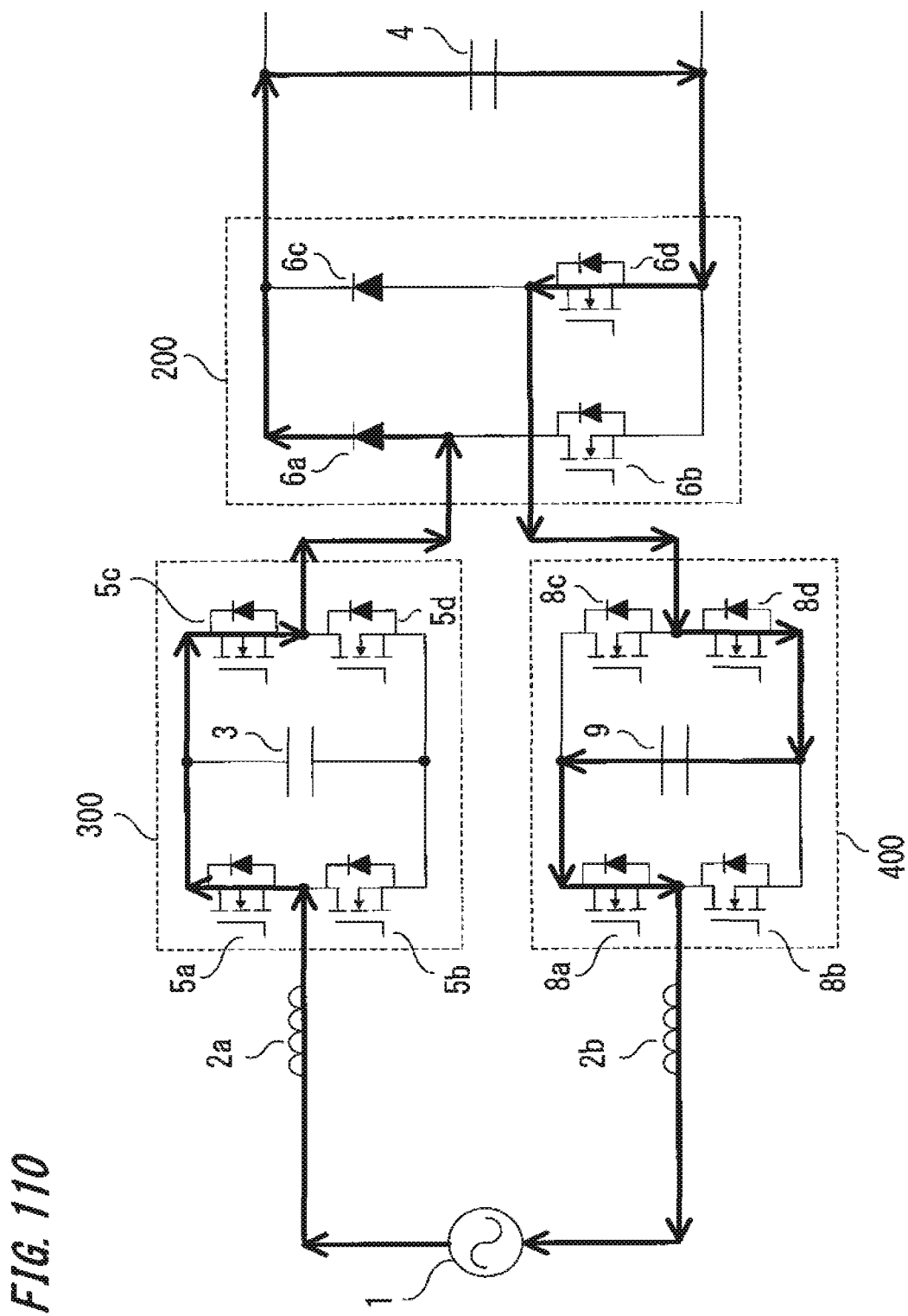
FIG. 110 is a diagram showing a current route in a third period in FIG. 107.

In the third period of Tsw<t≤t32, the switch elements 5c, 8a, 8d are ON and current |iac| of the AC power supply 1 increases. The current at this time flows through a route shown in FIG. 110. The route is as follows: AC power supply 1→reactor 2a→switch element 5a→switch element 5c→diode 6a→smoothing capacitor 4→switch element 6d→switch element 9→DC capacitor 9→switch element 8a→reactor 2b→AC power supply 1. During this period, current flows through the DC capacitor 9 in a discharging direction and therefore voltage Vc3 decreases, and current does not flow through the DC capacitor 3 and therefore voltage Vc2 is constant. A current change amount Δiac33 during this period is represented by the following Expression (147) and becomes a positive value.

$$\Delta iac33=((|vac|+Vc3-Vc1)/L)\cdot(t32-Tsw) \quad (147)$$

Figure 111:
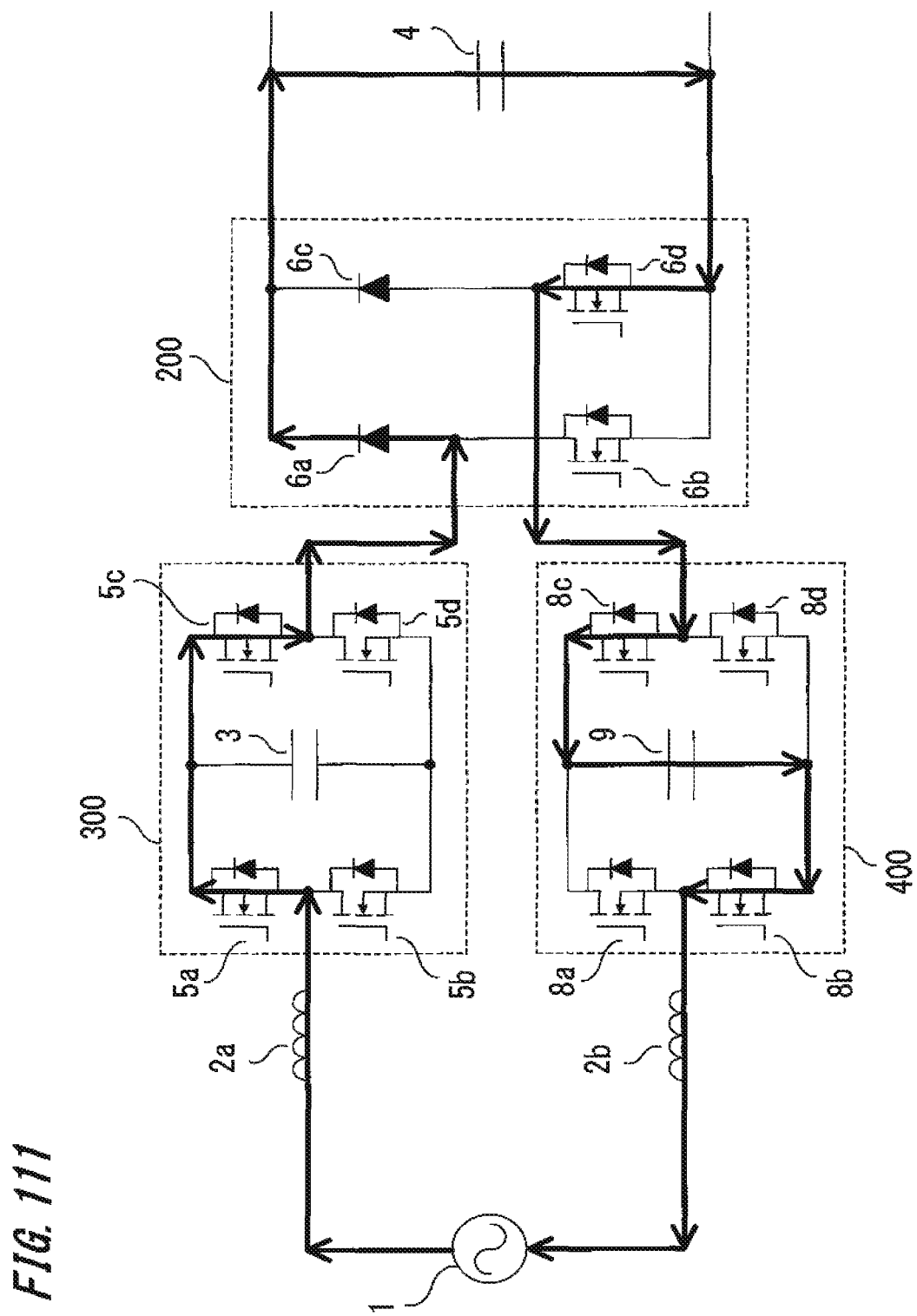
FIG. 111 is a diagram showing a current route in a fourth period in FIG. 107.

In the fourth period of t32<t≤2Tsw, the switch element 5c is ON and current |iac| of the AC power supply 1 decreases. The current at this time flows through a route shown in FIG. 111. The route is as follows: AC power supply 1→reactor 2a→switch element 5a→switch element 5c→diode 6a→smoothing capacitor 4→switch element 6d→switch element 8c→DC capacitor 9→switch element 8b→reactor 2b→AC power supply 1. During this period, current flows through the DC capacitor 9 in a charging direction and therefore voltage Vc3 increases, and current does not flow through the DC capacitor 3 and therefore voltage Vc2 is constant. A current change amount Δiac34 during this period is represented by the following Expression (148) and becomes a negative value.

$$\Delta iac34=((|vac|-Vc3-Vc1)/L)\cdot(2Tsw-t32) \quad (148)$$

At this time, under the assumption of Δiac31=−Δiac32, a theoretical duty D31 which is a ratio of a period from 0 to t31 with respect to a period from 0 to Tsw is represented by Expression (149), and a theoretical duty D32 which is a ratio of a period from t31 to t32 with respect to the period from 0 to Tsw is represented by Expression (150).

$$D31=(Vc1+Vc2-|vac|)/2Vc2 \quad (149)$$

$$D32=1-D31 \quad (150)$$

In addition, under the assumption of Δiac33=−Δiac34, a theoretical duty D33 which is a ratio of a period from Tsw to t32 with respect to a period from Tsw to 2Tsw is represented by Expression (151), and a theoretical duty D34 which is a ratio of a period from t32 to 2Tsw with respect to the period from Tsw to 2Tsw is represented by Expression (152).

$$D33-(Vc1+Vc3-|vac|)/2Vc3 \quad (151)$$

$$D34=1-D33 \quad (152)$$

Figure 112:
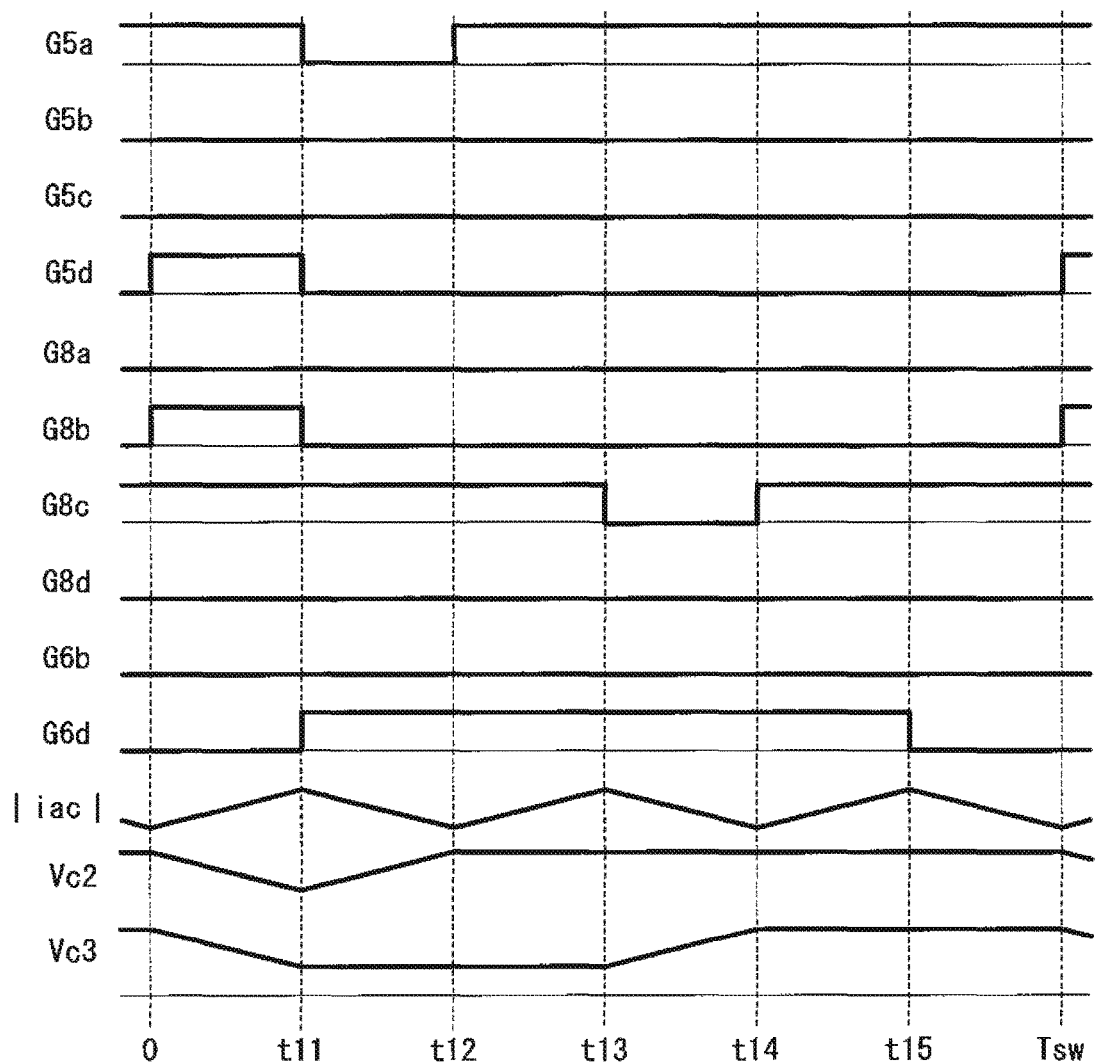
FIG. 112 is a waveform schematic diagram showing the operation state in an area 1 in the negative half wave of the AC power supply 1, in the power conversion device according to embodiment 3 of the present invention.

FIG. 112 shows a schematic diagram of operation during one switching cycle Tsw, in the area 1 in the negative half wave of the AC power supply 1. One switching cycle Tsw is divided into six periods and driving is performed by high-frequency PWM.

Figure 113:
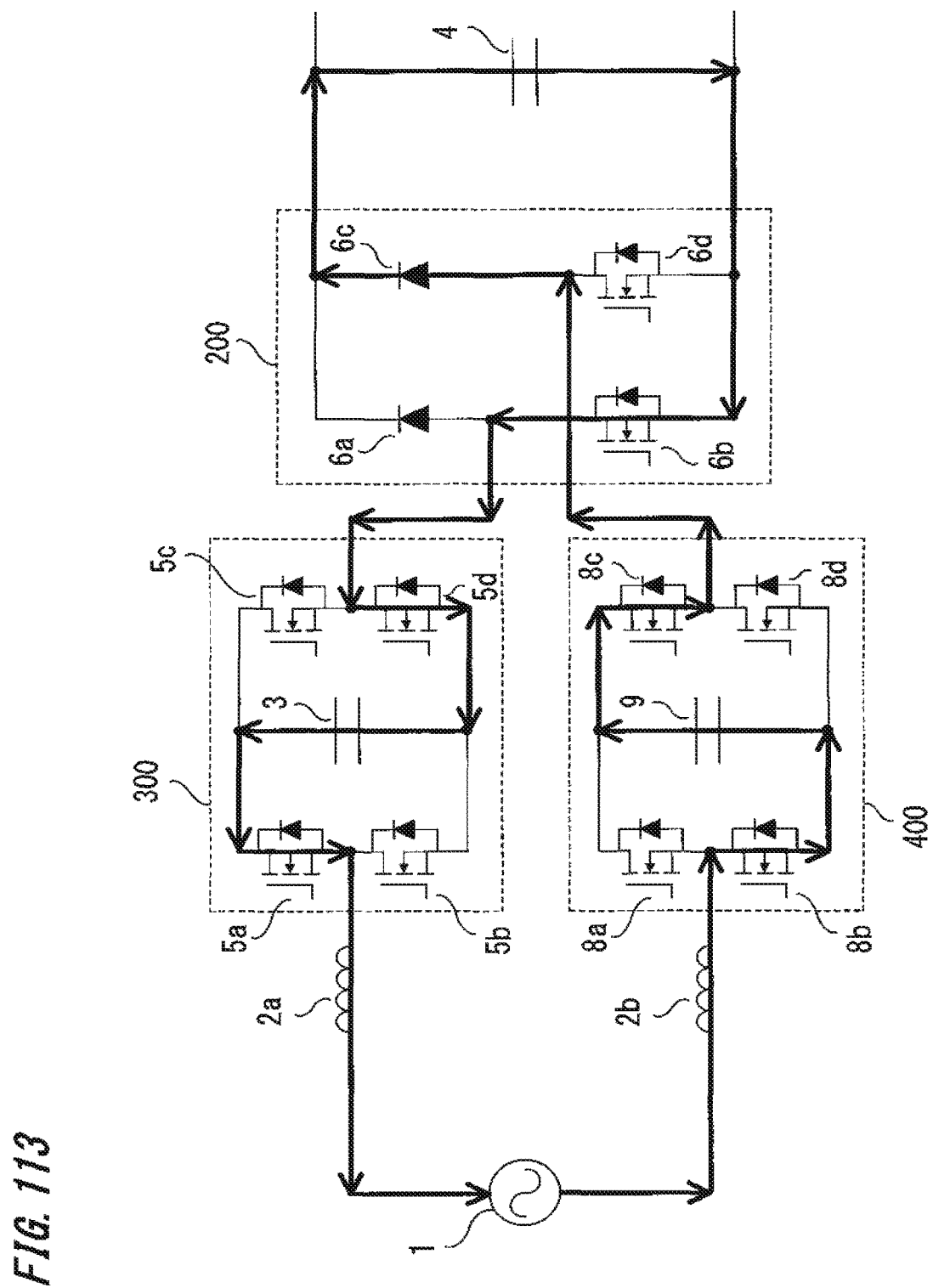
FIG. 113 is a diagram showing a current route in a first period in FIG. 112.

In the first period of 0<t≤t11, the switch elements 5a, 5d, 8b, 8c are ON and current |iac| of the AC power supply 1 increases. The current at this time flows through a route shown in FIG. 113. The route is as follows: AC power supply 1→reactor 2b→switch element 8b DC capacitor 9→switch element 8c→diode 6c→smoothing capacitor 4→switch element 6b→switch element 8d→DC capacitor 3→switch element 5a→reactor 2a→AC power supply 1. During this period, current flows through the DC capacitor 3 and the DC capacitor 9 in a discharging direction, and therefore voltages Vc2 and Vc3 decrease. A current change amount Δiac11 during this period is represented by the following Expression (153) and becomes a positive value.

$$\Delta iac11=((|vac|+Vc2+Vc3-Vc1)/L)\cdot t11 \quad (153)$$

Figure 114:
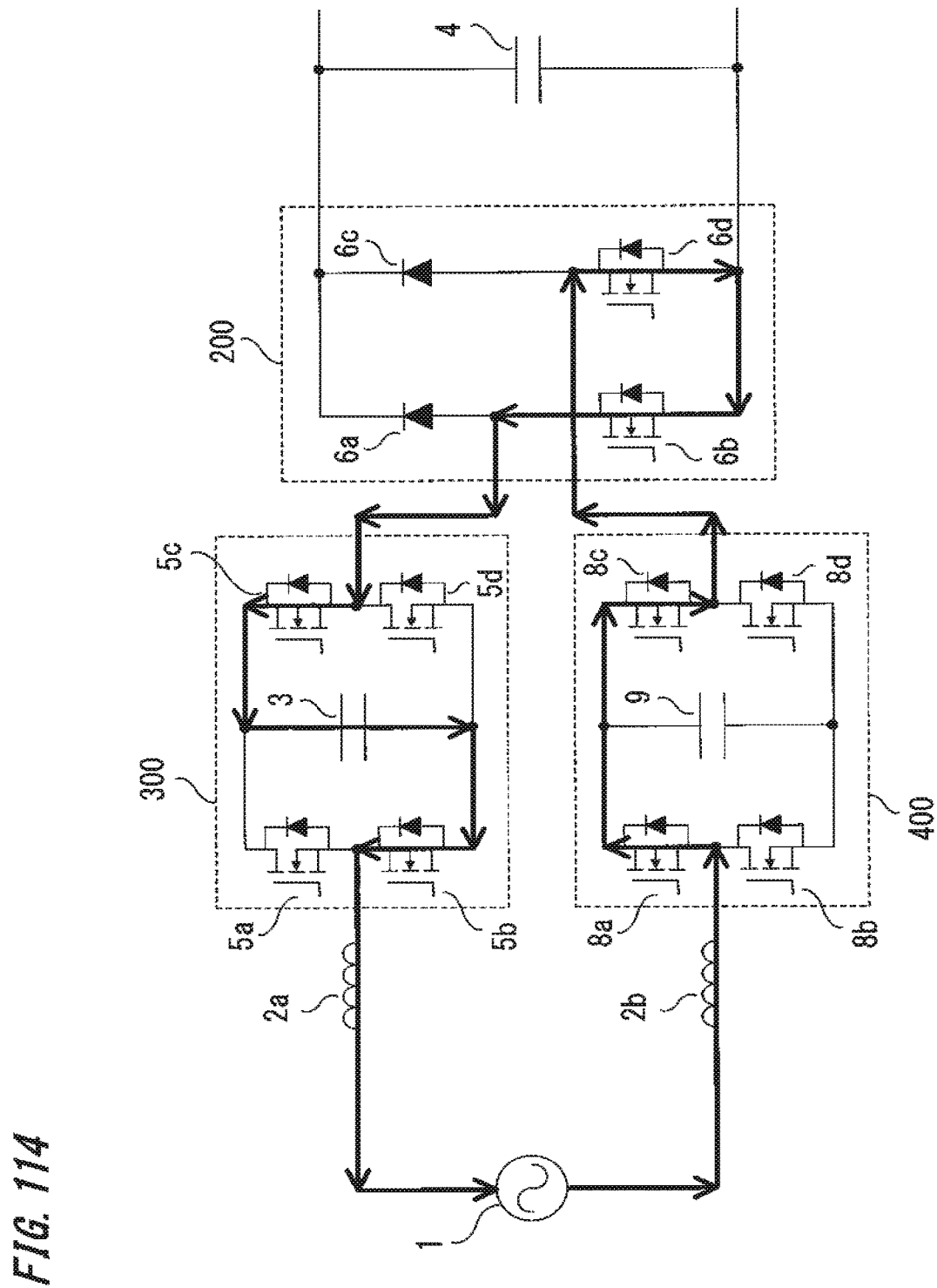
FIG. 114 is a diagram showing a current route in a second period in FIG. 112.

In the second period of t11<t≤t12, the switch elements 6d, 8c are ON and current |iac| of the AC power supply 1 decreases. The current at this time flows through a route shown in FIG. 114. The route is as follows: AC power supply 1→reactor 2b→switch element 8a→switch element 8c→switch element 6d→switch element 6b→switch element 5c→DC capacitor 3→switch element 5b→reactor 2a→AC power supply 1. During this period, current flows through the DC capacitor 3 in a charging direction, so that voltage Vc2 increases, and current does not flow through the DC capacitor 9 and therefore voltage Vc3 is constant. A current change amount Δiac12 during this period is represented by the following Expression (154) and becomes a negative value.

$$\Delta iac12=((|vac|-Vc2)/L)\cdot(t12-t11) \quad (154)$$

Figure 115:
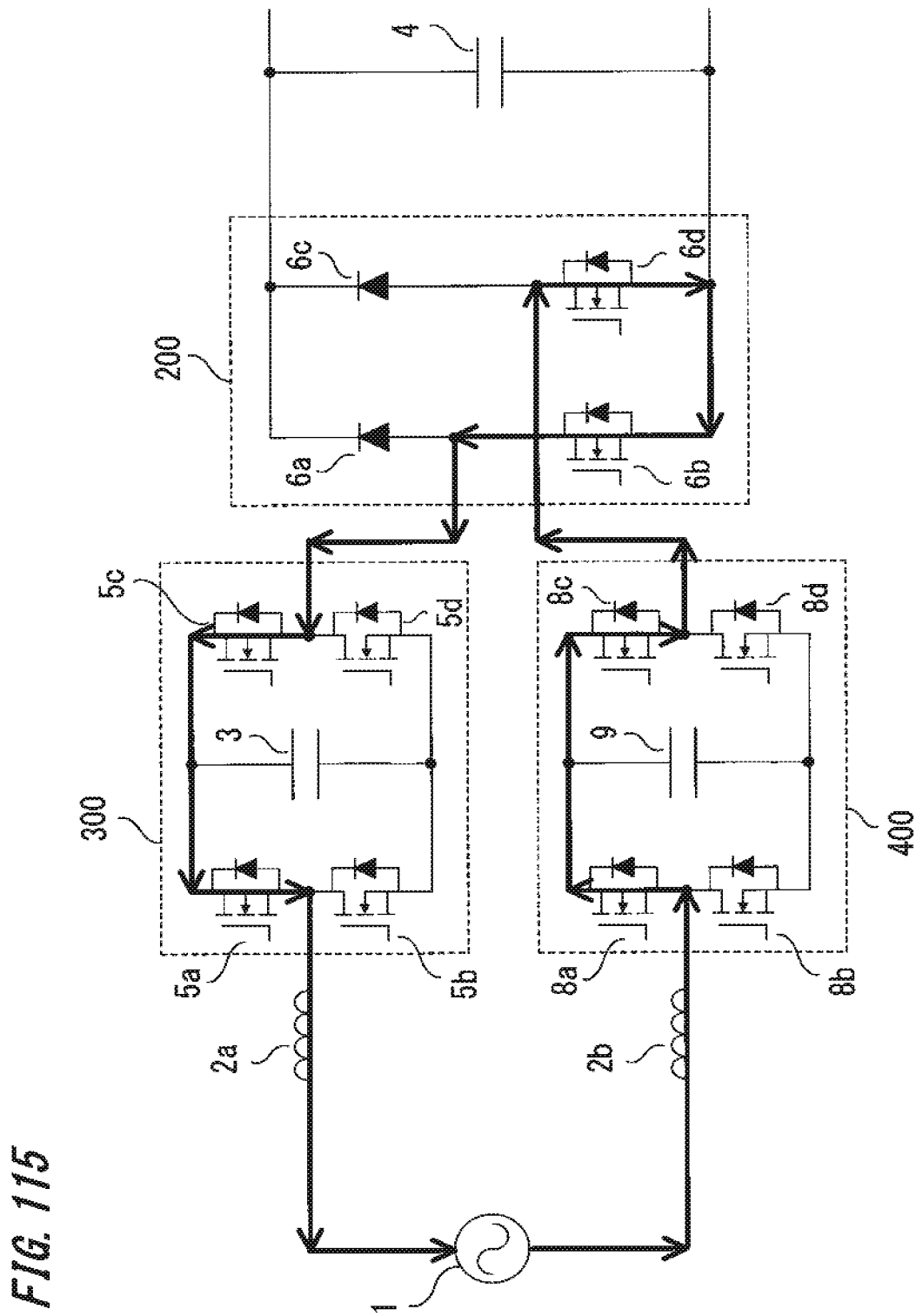
FIG. 115 is a diagram showing a current route in a third period in FIG. 112.

In the third period of t12<t≤t13, the switch elements 5a, 6d, 8c are ON and current |iac| of the AC power supply 1 increases. The current at this time flows through a route shown in FIG. 115. The route is as follows: AC power supply 1→reactor 2b→switch element 8a→switch element 8c→switch element 6d→switch element 6b→switch element 5c→switch element 5a→reactor 2a→AC power supply 1. During this period, current does not flow through the DC capacitor 3 and the DC capacitor 9, and therefore voltages Vc2 and Vc3 are constant. A current change amount Δiac13 during this period is represented by the following Expression (155) and becomes a positive value.

$$\Delta iac13=(|vac|/L)\cdot(t13-t12) \quad (155)$$

Figure 116:
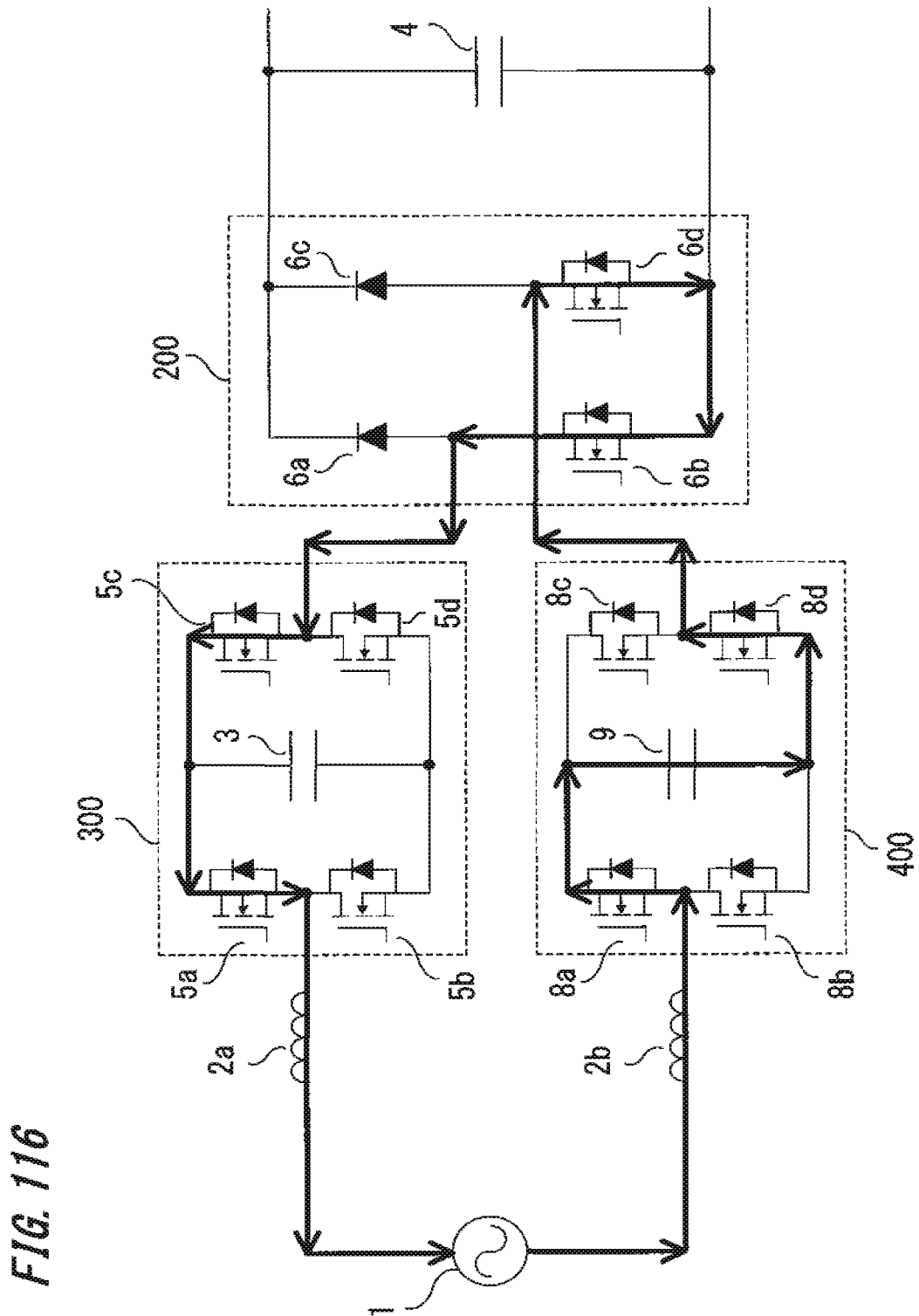
FIG. 116 is a diagram showing a current route in a fourth period in FIG. 112.

In the fourth period of t13<t<t14, the switch elements 5a, 6d are ON and current |iac| of the AC power supply 1 decreases. The current at this time flows through a route shown in FIG. 116. The route is as follows: AC power supply 1→reactor 2b→switch element 8a→DC capacitor 9→switch element 8d→switch element 6d→switch element 6b→switch element 5c→switch element 5a→reactor 2a→AC power supply 1. During this period, current flows through the DC capacitor 9 in a charging direction, so that voltage Vc3 increases, and current does not flow through the DC capacitor 3 and therefore voltage Vc2 is constant. A current change amount Δiac14 during this period is represented by the following Expression (156) and becomes a negative value.

$$\Delta iac14=((|vac|-Vc3)/L)\cdot(t14-t13) \quad (156)$$

Figure 117:
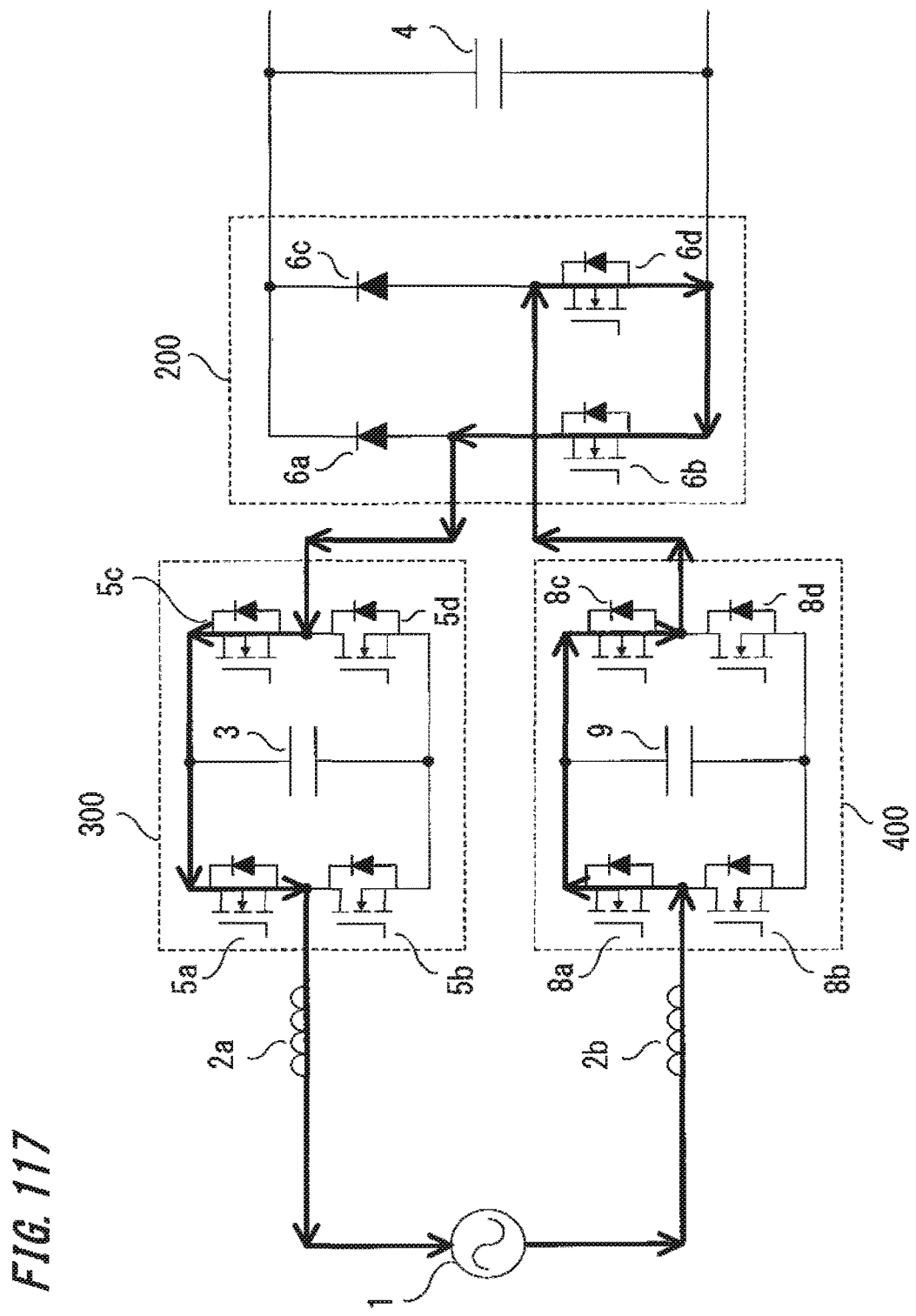
FIG. 117 is a diagram showing a current route in a fifth period in FIG. 112.

In the fifth period of t14<t≤t15, the switch elements 5a, 6d, 8c are ON and current |iac| of the AC power supply 1 increases. The current at this time flows through a route shown in FIG. 117. The route is as follows: AC power supply 1→reactor 2b→switch element 8a→switch element 8c→switch element 6d→switch element 6b→switch element 5c→switch element 5a→reactor 2b→AC power supply 1. During this period, current does not flow through the DC capacitor 3 and the DC capacitor 9 and therefore voltages Vc2 and Vc3 are constant. A current change amount Δiac15 during this period is represented by the following Expression (157) and becomes a positive value.

$$\Delta iac15=(|vac|/L)\cdot(t15-t14) \quad (157)$$

Figure 118:
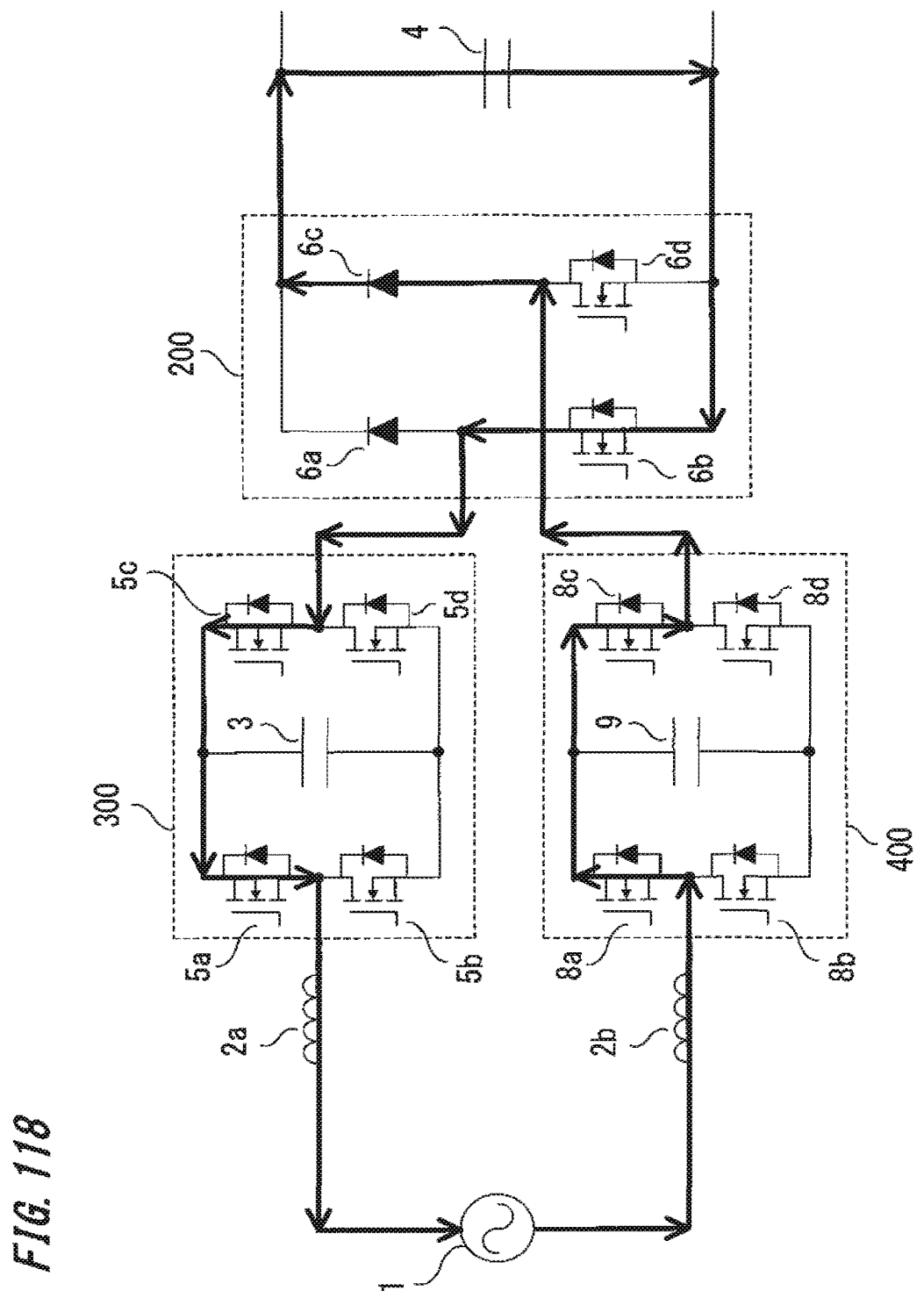
FIG. 118 is a diagram showing a current route in a sixth period in FIG. 112.

In the sixth period of t15<t≤Tsw, the switch elements 5a, 8c are ON and current |iac| of the AC power supply 1 decreases. The current at this time flows through a route shown in FIG. 118. The route is as follows: AC power supply 1→reactor 2b→switch element 8a→switch element 8c→diode 6c→smoothing capacitor 4→switch element $6b \rightarrow$switch element $5c \rightarrow$switch element $5a \rightarrow$reactor $2a \rightarrow$AC power supply 1. During this period, current does not flow through the DC capacitor 3 and the DC capacitor 9, and therefore voltages Vc2 and Vc3 are constant. A current change amount $\Delta iac16$ during this period is represented by the following Expression (158) and becomes a negative value.

$$\Delta iac16=((|vac|-Vc1)/L) \cdot (Tsw-t15) \tag{158}$$

At this time, under the assumption of $\Delta iac11=-\Delta iac12$, a theoretical duty D11 which is a ratio of a period from 0 to t11 with respect to a period from 0 to t12 is represented by Expression (159), and a theoretical duty D12 which is a ratio of a period from t11 to t12 with respect to the period from 0 to t12 is represented by Expression (160).

$$D11=(Vc2-|vac|)/(2Vc2+Vc3-Vc1)) \tag{159}$$

$$D12=1-D11 \tag{160}$$

In addition, under the assumption of $\Delta iac13=-\Delta iac14$, a theoretical duty D13 which is a ratio of a period from t12 to t13 with respect to a period from t12 to t14 is represented by Expression (161), and a theoretical duty D14 which is a ratio of a period from t13 to t14 with respect to the period from t12 to t1.4 is represented by Expression (162).

$$D13=(Vc3-|vac|)/Vc3 \tag{161}$$

$$D14=1-D13 \tag{162}$$

In addition, under the assumption of $\Delta iac15=-\Delta iac16$, a theoretical duty D15 which is a ratio of a period from t14 to t15 with respect to a period from t14 to Tsw is represented by Expression (163), and a theoretical duty D16 which is a ratio of a period from t15 to Tsw with respect to the period from t14 to Tsw is represented by Expression (164).

$$D15=(Vc1-|vac|)/Vc1 \tag{163}$$

$$D16=1-D15 \tag{164}$$

Figure 119:
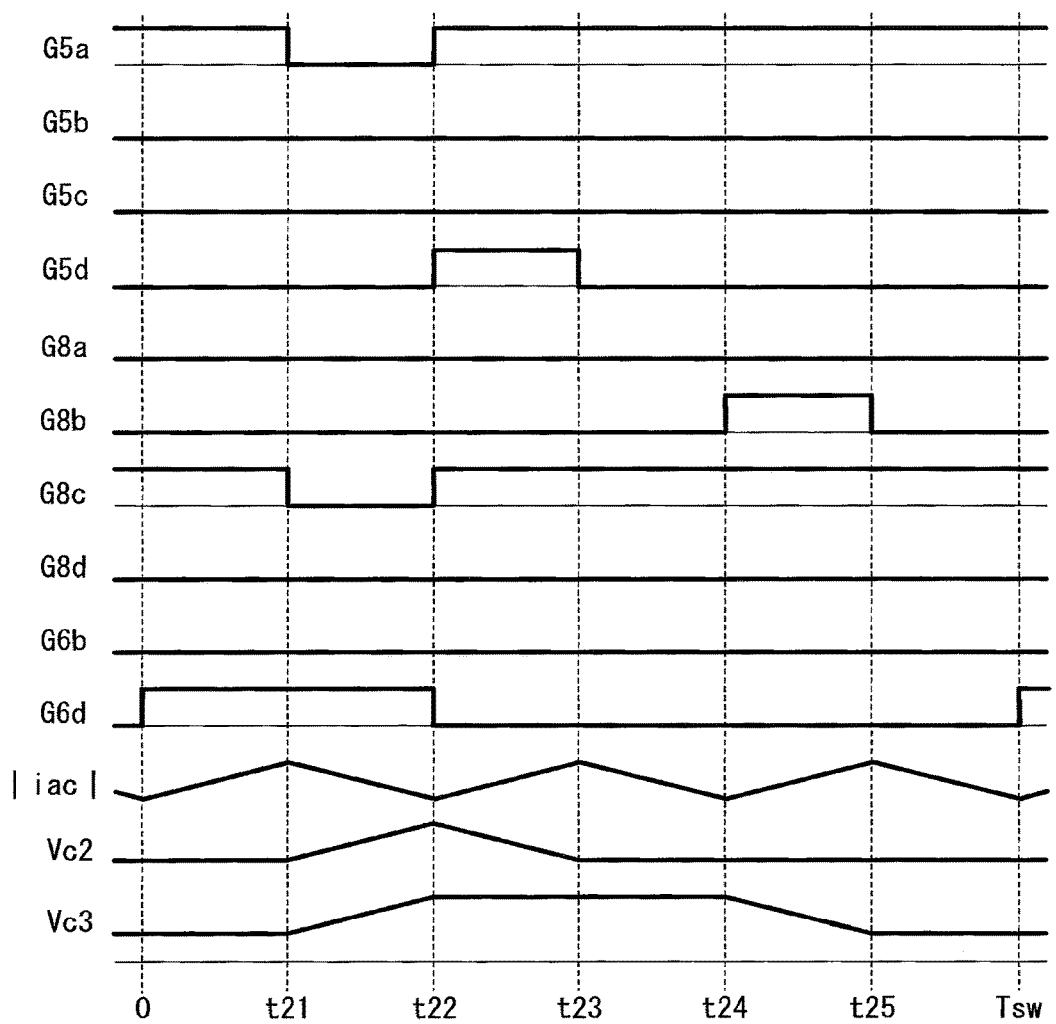
FIG. 119 is a waveform schematic diagram showing the operation state in an area 2 in the negative half wave of the AC power supply 1, in the power conversion device according to embodiment 3 of the present invention.

FIG. 119 shows a schematic diagram of operation during one switching cycle Tsw, in the area 2 in the negative half wave of the AC power supply 1. One switching cycle Tsw is divided into six periods and driving is performed by high-frequency PWM.

Figure 120:
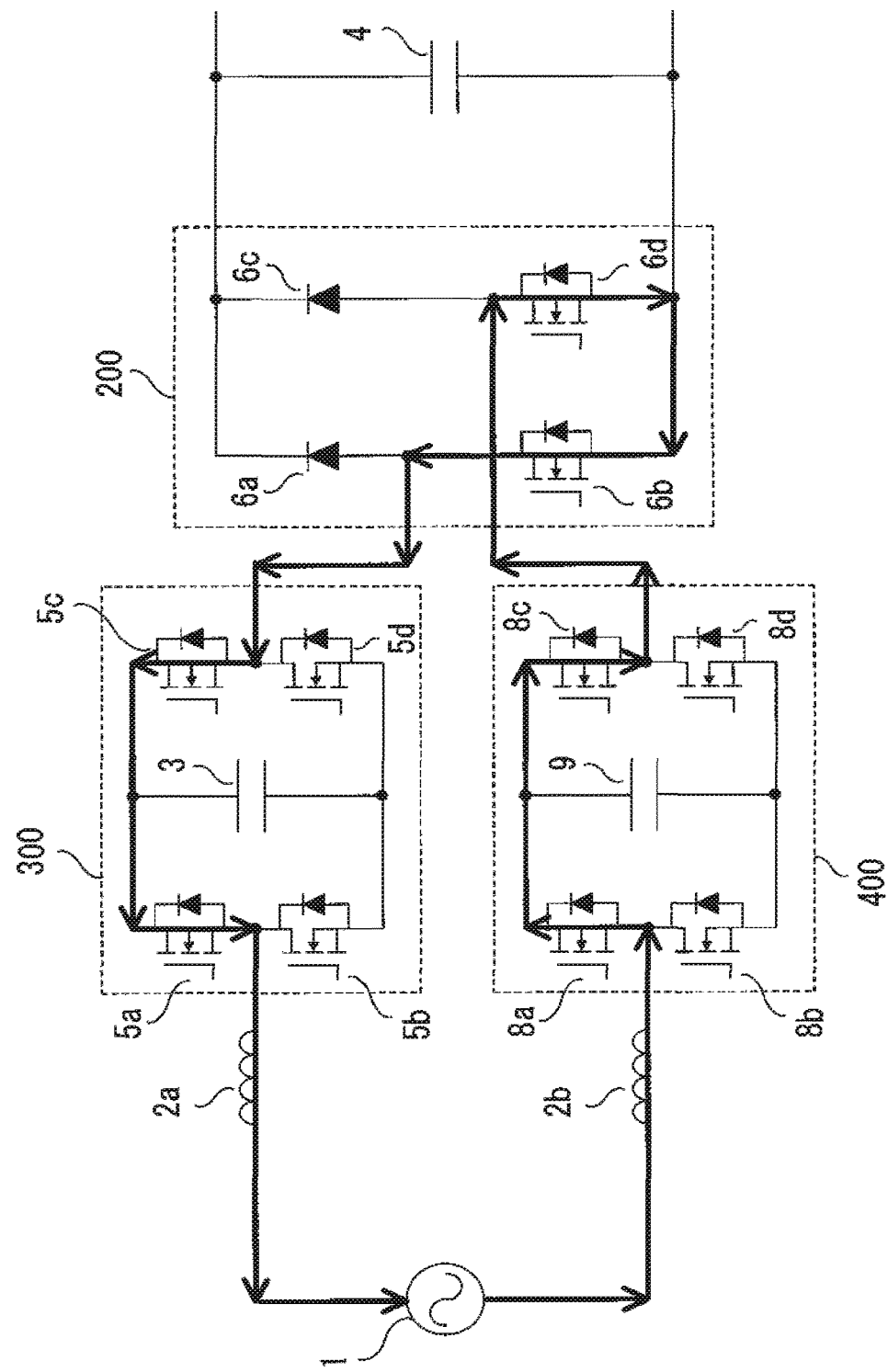

In the first period of $0<t \leq t21$, the switch elements $5a$, $6d$, $8c$ are ON and current |iac| of the AC power supply 1 increases. The current at this time flows through a route shown in FIG. 120. The route is as follows: AC power supply $1 \rightarrow$reactor $2b \rightarrow$switch element $8a \rightarrow$switch element $8c \rightarrow$switch element $6d \rightarrow$switch element $6b \rightarrow$switch element $5c \rightarrow$switch element $5a \rightarrow$reactor $2a \rightarrow$AC power supply 1. During this period, current does not flow through the DC capacitor 3 and the DC capacitor 9, and therefore voltages Vc2 and Vc3 are constant. A current change amount $\Delta iac21$ during this period is represented by the following Expression (165) and becomes a positive value.

$$\Delta iac21=(|vac|/L) \cdot t21 \tag{165}$$

Figure 121:
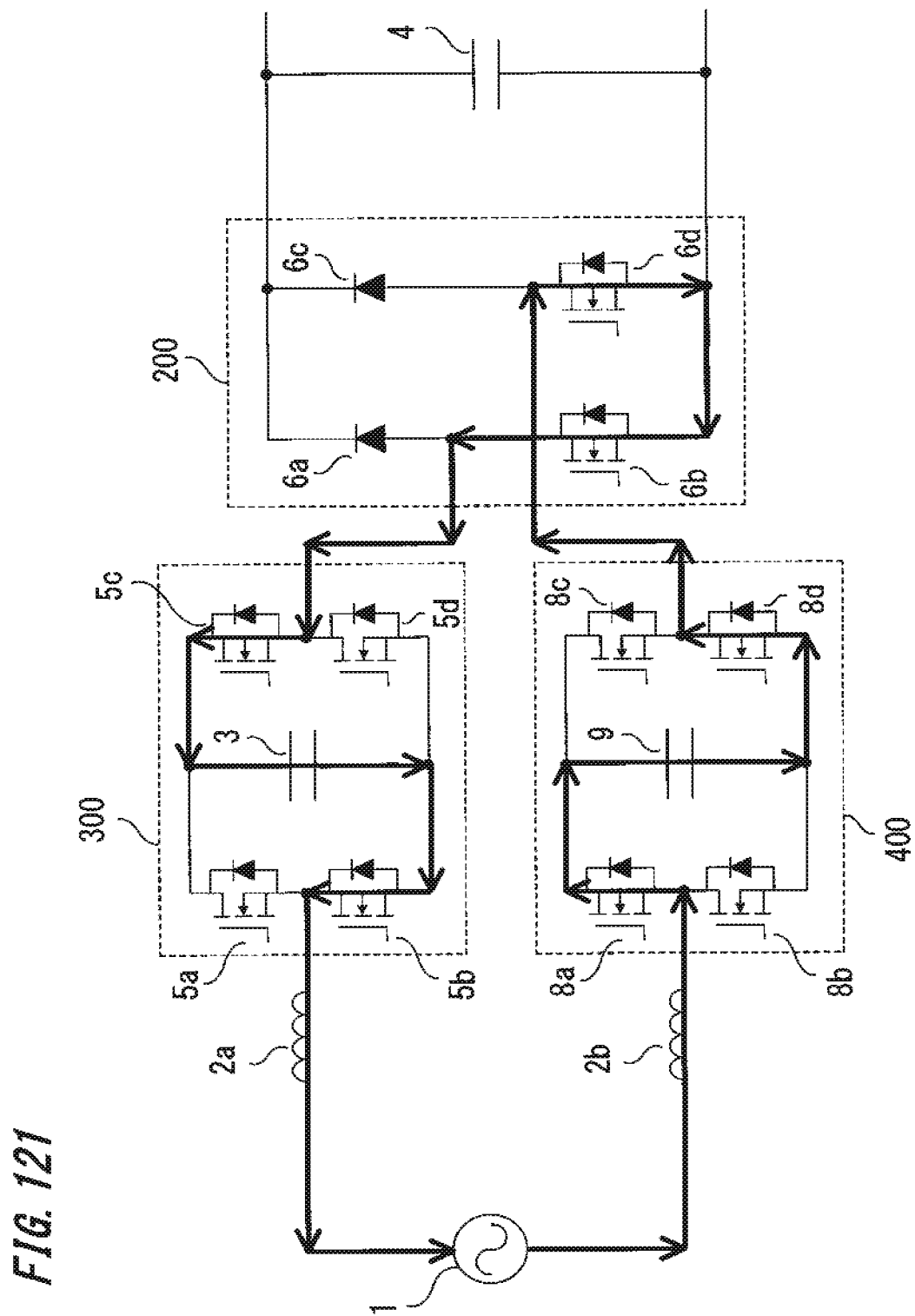
Figure 122:
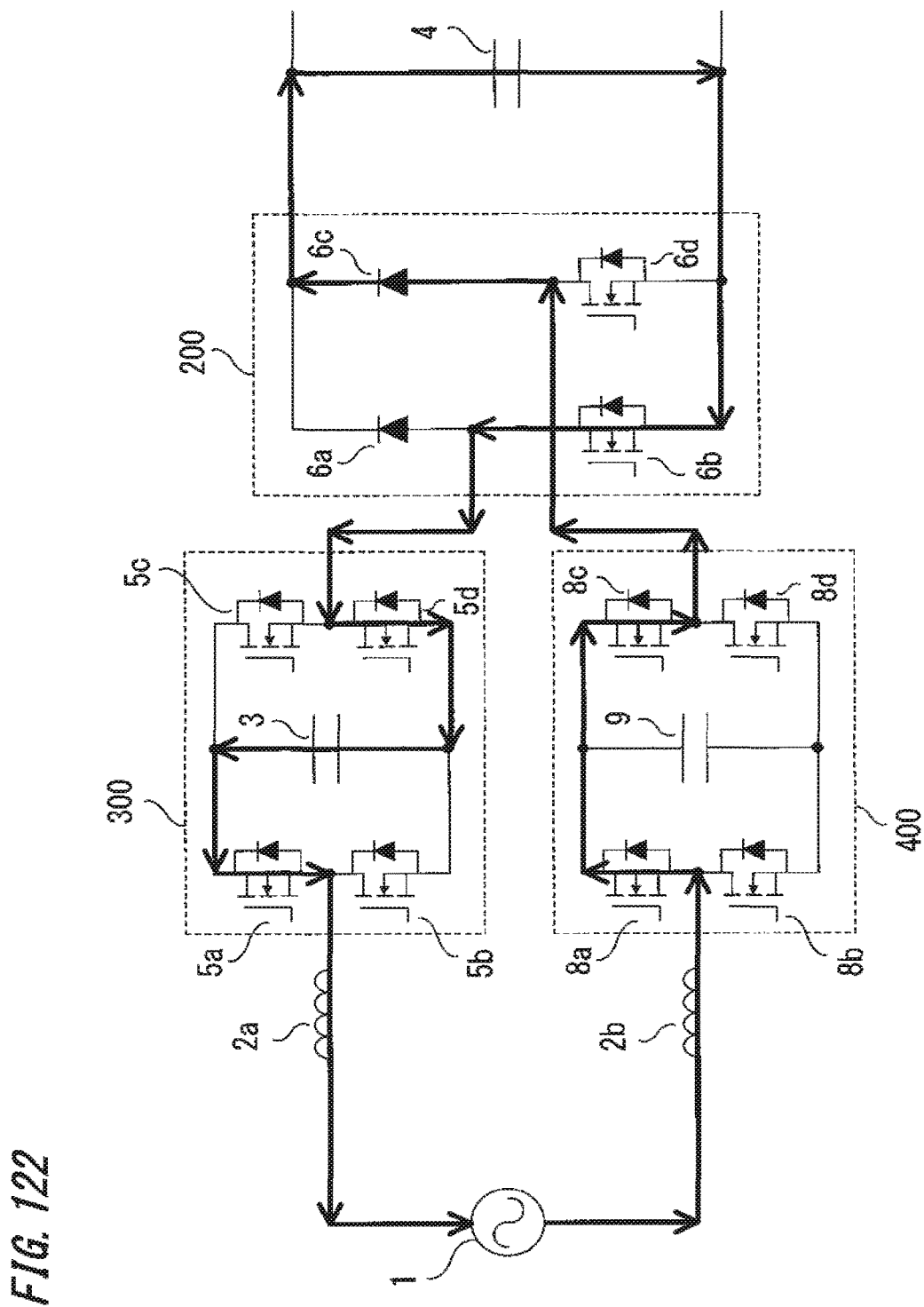

In the second period of $t21<t \leq t22$, the switch element $6d$ is ON and current |iac| of the AC power supply 1 decreases. The current at this time flows through a route shown in FIG. 121. The route is as follows: AC power supply $1 \rightarrow$reactor $2b \rightarrow$switch element $8a \rightarrow$DC capacitor $9 \rightarrow$switch element $8d \rightarrow$switch element $6d \rightarrow$switch element $6b \rightarrow$switch element $5c \rightarrow$DC capacitor $3 \rightarrow$switch element $5b \rightarrow$reactor $2a \rightarrow$AC power supply 1. During this period, current flows through the DC capacitor 3 and the DC capacitor 9 in a charging direction, and therefore voltages Vc2 and Vc3 increase. A current change amount $\Delta iac22$ during this period is represented by the following Expression (166) and becomes a negative value.

$$\Delta iac22=((|vac|-Vc2-Vc3)/L) \cdot (t22-t21) \tag{166}$$

in the third period of $t22<t \leq t23$, the switch elements $5a$, $5d$, $8c$ are ON and current |iac| of the AC power supply 1 increases. The current at this time flows through a route shown in FIG. 122. The route is as follows: AC power supply $1 \rightarrow$reactor $2b \rightarrow$switch element $8a \rightarrow$switch element $8c \rightarrow$diode $6c \rightarrow$smoothing capacitor $4 \rightarrow$switch element $6b \rightarrow$switch element $5d \rightarrow$DC capacitor $3 \rightarrow$switch element $5a \rightarrow$reactor $2a \rightarrow$AC power supply 1. During this period, current flows through the DC capacitor 3 in a discharging direction and therefore voltage Vc2 decreases, and current does not flow through the DC capacitor 9 and therefore voltage Vc3 is constant. A current change amount $\Delta iac23$ during this period is represented by the following Expression (167) and becomes a positive value.

$$\Delta iac23=((|vac|+Vc2-Vc1)/L) \cdot (t23-t22) \tag{167}$$

Figure 123:
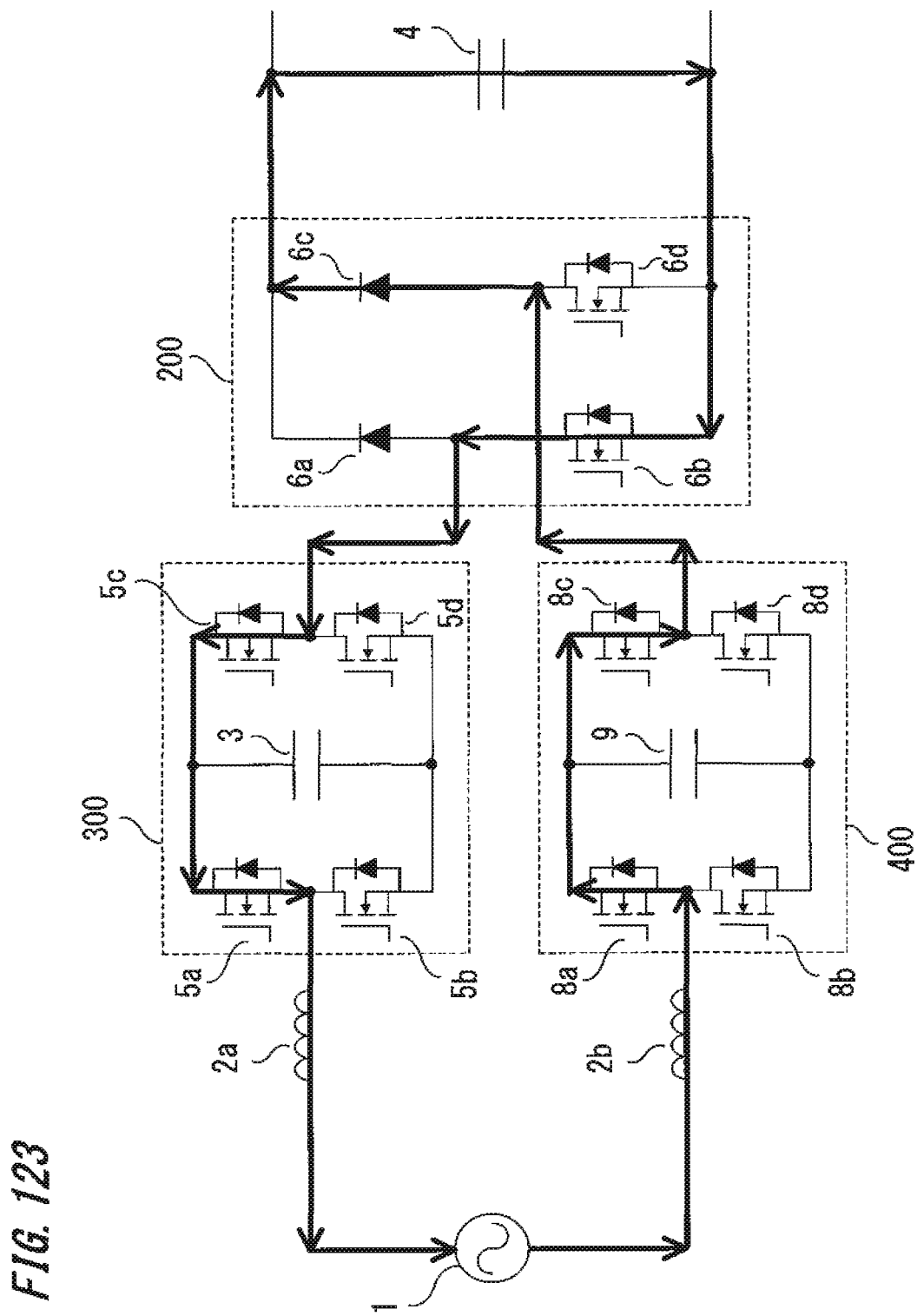

In the fourth period of $t23<t \leq t24$, the switch elements $5a$, $8c$ are ON and current |iac| of the AC power supply 1 decreases. The current at this time flows through a route shown in FIG. 123. The route is as follows: AC power supply $1 \rightarrow$reactor $2b \rightarrow$switch element $8a \rightarrow$switch element $8c \rightarrow$diode $6c \rightarrow$smoothing capacitor $4 \rightarrow$switch element $6b \rightarrow$switch element $5c \rightarrow$switch element $5a \rightarrow$reactor $2a \rightarrow$AC power supply 1. During this period, current does not flow through the DC capacitor 3 and the DC capacitor 9, and therefore voltages Vc2 and Vc3 are constant. A current change amount $\Delta iac24$ during this period is represented by the following Expression (168) and becomes a negative value.

$$\Delta iac24=((|vac|-Vc1)/L) \cdot (t24-t23) \tag{168}$$

Figure 124:
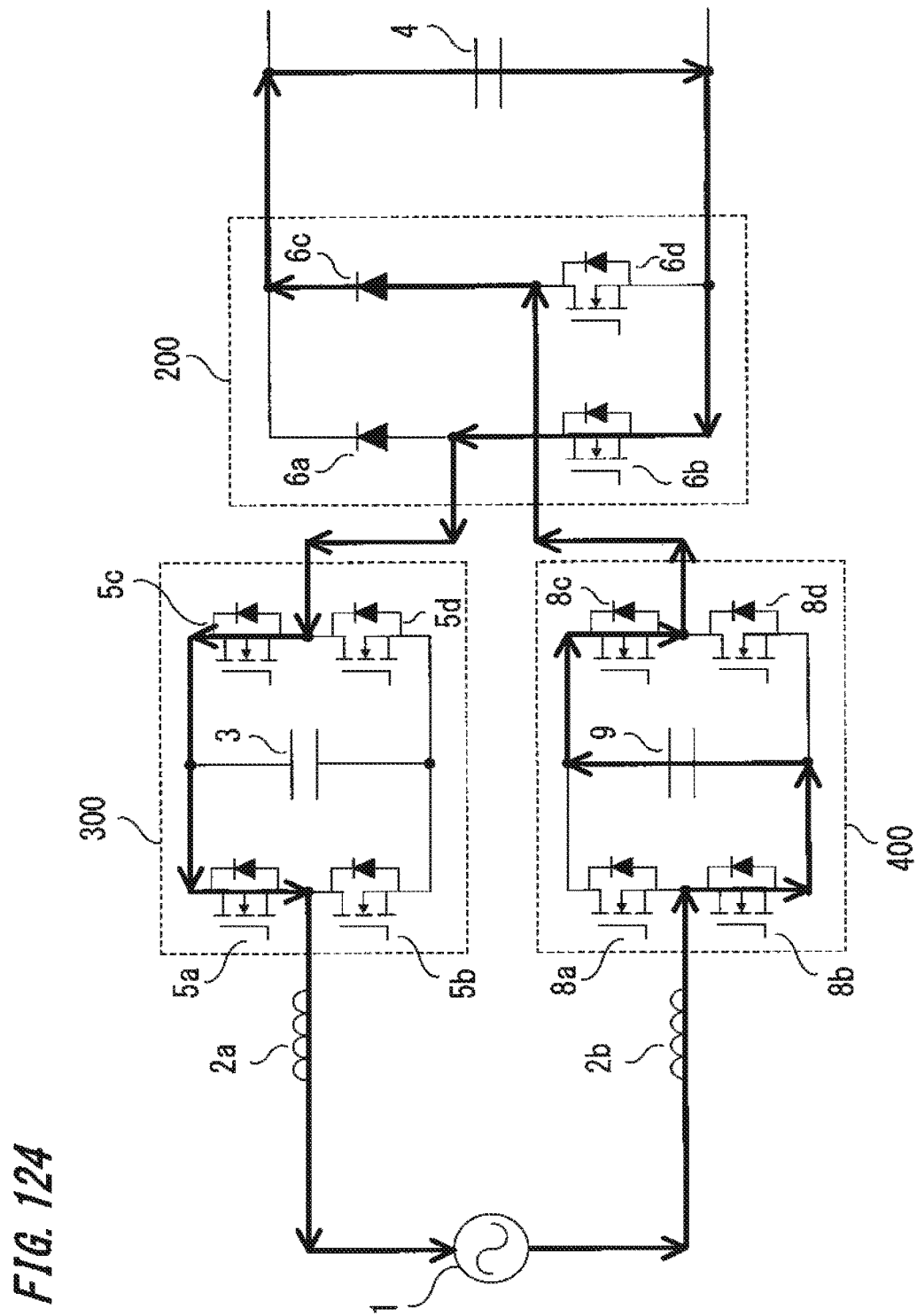

In the fifth period of $t24<t \leq t25$, the switch elements $5a$, $8b$, $8c$ are ON and current |iac| of the AC power supply 1 increases. The current at this time flows through a route shown in FIG. 124. The route is as follows: AC power supply $1 \rightarrow$reactor $2b \rightarrow$switch element $8b \rightarrow$DC capacitor $9 \rightarrow$switch element $8c \rightarrow$diode $6c \rightarrow$smoothing capacitor $4 \rightarrow$switch element $6b \rightarrow$switch element $5c \rightarrow$switch element $5a \rightarrow$reactor $2a \rightarrow$AC power supply 1. During this period, current flows through the DC capacitor 9 in a discharging direction and therefore voltage Vc3 decreases, and current does not flow through the DC capacitor 3 and therefore voltage Vc2 is constant. A current change amount $\Delta iac25$ during this period is represented by the following Expression (169) and becomes a positive value.

$$\Delta iac25=((|vac|+Vc3-Vc1)/L) \cdot (t25-t24) \tag{169}$$

Figure 125:
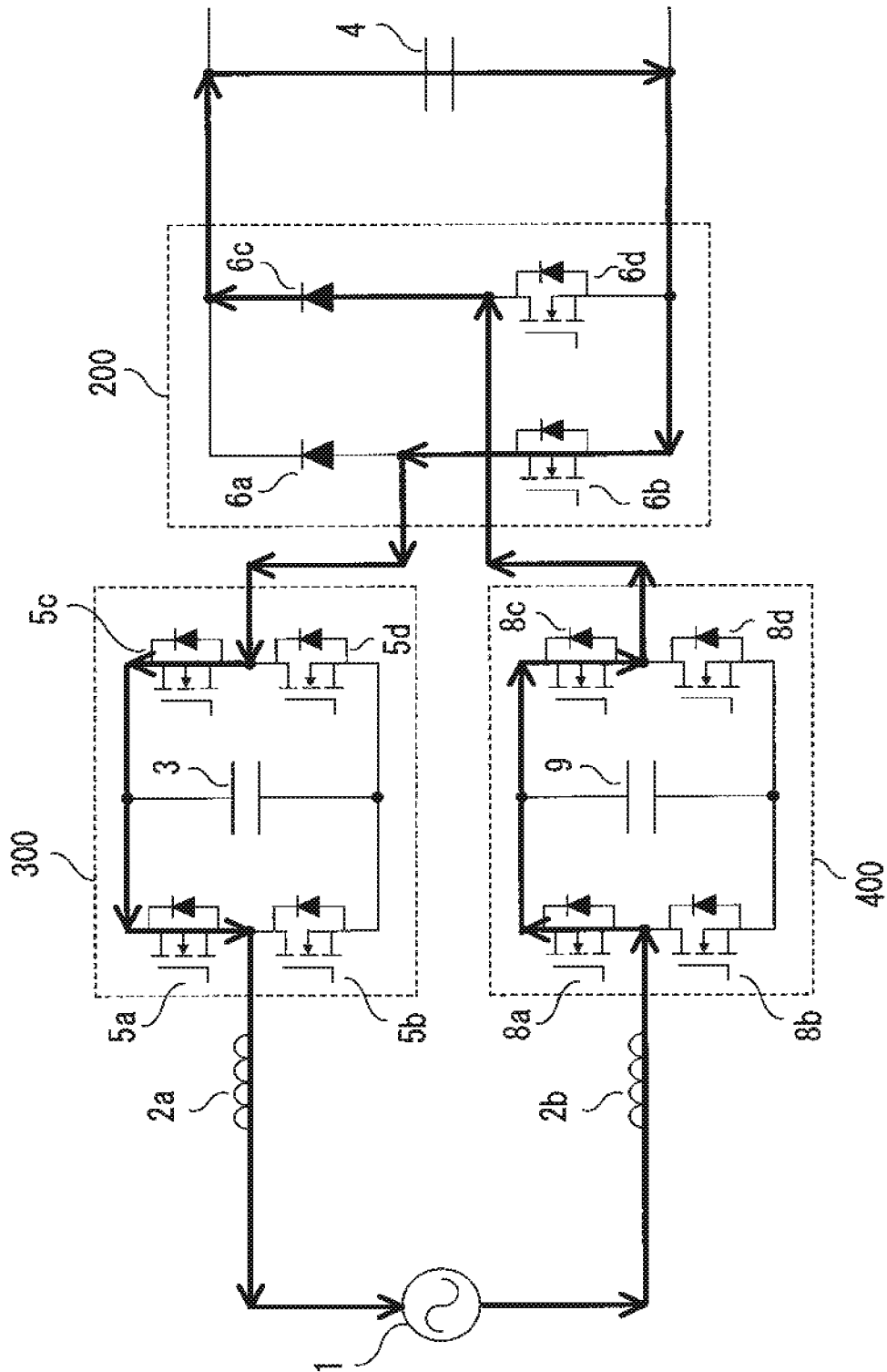

In the sixth period of $t25<t \leq Tsw$, the switch elements $5a$, $8c$ are ON and current |iac| of the AC power supply 1 decreases. The current at this time flows through a route shown in FIG. 125. The route is as follows: AC power supply $1 \rightarrow$reactor $2b \rightarrow$switch element $8a \rightarrow$switch element $8c \rightarrow$diode $6c \rightarrow$smoothing capacitor $4 \rightarrow$switch element $6b \rightarrow$switch element $5c \rightarrow$switch element $5a \rightarrow$reactor $2a \rightarrow$AC power supply 1. During this period, current does not flow through the DC capacitor 3 and the DC capacitor 9, and therefore voltages Vc2 and Vc3 are constant. A current change amount $\Delta iac26$ during this period is represented by the following Expression (170) and becomes a negative value.

$$\Delta iac26=((|vac|-Vc1)/L) \cdot (Tsw-t25) \tag{170}$$

At this time, under the assumption of Δiac21=−Δiac22, a theoretical duty D21 which is a ratio of a period from 0 to t21 with respect to a period from 0 to t22 is represented by Expression (171), and a theoretical duty D22 which is a ratio of a period from t21 to t22 with respect to the period from 0 to t22 is represented by Expression (172).

$$D21=(Vc2+Vc3-|vac|)/(Vc1+Vc2) \quad (171)$$

$$D22=1-D21 \quad (172)$$

In addition, under the assumption of Δiac23=−Δiac24, a theoretical duty D23 which is a ratio of a period from t22 to t23 with respect to a period from t22 to t24 is represented by Expression (173), and a theoretical duty D24 which is a ratio of a period from t23 to t24 with respect to the period from t22 to t24 is represented by Expression (174).

$$D23=(Vc1-|vac|)/Vc2 \quad (173)$$

$$D24=1-D23 \quad (174)$$

In addition, under the assumption of Δiac25=−Δiac26, a theoretical duty D25 which is a ratio of a period from t24 to Tsw with respect to a period from t24 to Tsw is represented by Expression (175), and a theoretical duty D26 which is a ratio of a period from t24 to t25 with respect to the period from t24 to Tsw is represented by Expression (176).

$$D25=(Vc1-|vac|)/Vc3 \quad (175)$$

$$D26=1-D25 \quad (176)$$

FIG. 126 is a schematic diagram showing operation during the two switching cycles 2Tsw, in the area 3 in the negative half wave of the AC power supply 1. One switching cycle Tsw is divided into two periods and driving is performed by high-frequency PWM.

In the first period of 0<t≤t31, the switch elements 5a, 5d, 8c are ON and current |iac| of the AC power supply 1 increases. The current at this time flows through a route shown in FIG. 127. The route is as follows: AC power supply 1→reactor 2b→switch element 8a→switch element 8B→diode 6c→smoothing capacitor 4→switch element 6b→switch element 5d→DC capacitor 3→switch element 5a→reactor 2a→AC power supply 1. During this period, current flows through the DC capacitor 3 in a discharging direction and therefore voltage Vc2 decreases, and current does not flow through the DC capacitor 9 and therefore voltage Vc3 is constant. A current change amount Δiac31 during this period is represented by the following Expression (177) and becomes a positive value.

$$\Delta iac31=((|vac|+Vc2-Vc1)/L)\cdot t31 \quad (177)$$

In the second period of t31<t≤Tsw, the switch element 8c is ON and current |iac| of the AC power supply 1 decreases. The current at this time flows through a route shown in FIG. 128. The route is as follows: AC power supply 1→reactor 2b→switch element 8a→switch element 8c→diode 6c→smoothing capacitor 4→switch element 6b→switch element 5c→DC capacitor 3→switch element 5b→reactor 2a→AC power supply 1. During this period, current flows through the DC capacitor 3 in a charging direction and therefore voltage Vc2 increases, and current does not flow through the DC capacitor 9 and therefore voltage Vc3 is constant. A current change amount Δiac32 during this period is represented by the following Expression (178) and becomes a negative value.

$$\Delta iac32=((|vac|-Vc2+Vc1)/L)\cdot (Tsw-t31) \quad (178)$$

In the third period of Tsw<t≤t32, the switch elements 5a, 8b, 8c are ON and current |iac| of the AC power supply 1 increases. The current at this time flows through a route shown in FIG. 129. The route is as follows: AC power supply 1→reactor 2b→switch element 8b→DC capacitor 9→switch element 8c→diode 6c→smoothing capacitor 4→switch element 6b→switch element 5c→switch element 5a→reactor 2a→AC power supply 1. During this period, current flows through the DC capacitor 9 in a discharging direction and therefore voltage Vc3 decreases, and current does not flow through the DC capacitor 3 and therefore voltage Vc2 is constant. A current change amount Δiac33 during this period is represented by the following Expression (179) and becomes a positive value.

$$\Delta iac33=((|vac|+Vc3-Vc1)/L)\cdot (t32-Tsw) \quad (179)$$

In the fourth period of t32<t≤2Tsw, the switch element 5a is ON and current |iac| of the AC power supply 1 decreases. The current at this time flows through a route shown in FIG. 130. The route is as follows: AC power supply 1→reactor 2b→switch element 8a→DC capacitor 9→switch element 8d→diode 6c→smoothing capacitor 4→switch element 6b→switch element 5c→switch element 5a→reactor 2a→AC power supply 1. During this period, current flows through the DC capacitor 9 in a charging direction and therefore voltage Vc3 increases, and current does not flow through the DC capacitor 3 and therefore voltage Vc2 is constant. A current change amount Δiac34 during this period is represented by the following Expression (180) and becomes a negative value.

$$\Delta iac34=((|vac|-Vc3-Vc1)/L)\cdot (2Tsw-t32) \quad (180)$$

At this time, under the assumption of Δiac31−Δiac32, a theoretical duty D31 which is a ratio of a period from 0 to t31 with respect to a period from 0 to Tsw is represented by Expression (181), and a theoretical duty D32 which is a ratio of a period from t31 to t32 with respect to the period from 0 to Tsw is represented by Expression (182).

$$D31=(Vc1+Vc2-|vac|)/2Vc2 \quad (181)$$

$$D32=1-D31 \quad (182)$$

In addition, under the assumption of Δiac33=−Δiac34, a theoretical duty D33 which is a ratio of a period from Tsw to t32 with respect to a period from Tsw to 2Tsw is represented by Expression (183), and a theoretical duty D34 which is a ratio of a period from t32 to 2Tsw with respect to the period from Tsw to 2Tsw is represented by Expression (184).

$$D33=(Vc1+Vc3-|vac|)/2Vc3 \quad (183)$$

$$D34=1-D33 \quad (184)$$

As shown above, in the area 1, the theoretical duties D11 to D16 for the positive half wave represented by Expressions (127) to (132), and the theoretical duties D11 to D16 for the negative half wave represented by Expressions (159) to (164), are calculated by the same calculation expression.

Similarly, in the area 2, the theoretical duties D21 to D26 for the positive half wave represented by Expressions (139) to (144), and the theoretical duties D21 to D26 for the negative half wave represented by Expressions (171) to (176), are calculated by the same calculation expression.

Similarly, in the area 3, the theoretical duties D31 to D34 for the positive half wave represented by Expressions (149) to (152), and the theoretical duties D31 to D34 for the negative half wave represented by Expressions (181) to (184), are calculated by the same calculation expression.

By satisfying each relational expression regarding these theoretical duties, in the aforementioned one pair of periods in one switching cycle Tsw of the single-phase inverters 300, 400, charging operation and discharging operation of the DC capacitors 3, 9 are performed and the charging amount and the discharging amount thereof become equal to each other.

Here, the frequency of the AC power supply 1 is 50 to 60 Hz, whereas the switching frequencies of the single-phase inverters 300, 400 are generally 10 kHz or higher. Therefore, from the above, irrespective of a very long cycle of the AC power supply 1, charging operation and discharging operation of the DC capacitors 3, 9 are completed within one short switching cycle of the single-phase inverters 300, 400, and thus the charging/discharging amount itself is reduced and ripple voltage is suppressed, whereby the capacitances required for the DC capacitors 3, 9 can be greatly reduced.

In addition, as is found from FIG. 93, FIG. 100, etc., in the areas 1, 2, the application voltage frequencies of the reactors 2a, 2b are three times the switching frequencies (1/Tsw) of the single-phase inverters 300, 400. Therefore, under the condition that the switching frequency of the single-phase inverter is the same, it becomes possible to further downsize the reactors 2a, 2b as compared to the above embodiment 1.

In addition, the switching frequency of the single-phase converter 200 is equal to the switching frequencies of the single-phase inverters 300, 400. Therefore, under the condition that the switching frequency of the single-phase inverter is the same, it is possible to reduce switching loss occurring in the single-phase converter 200, as compared to the above embodiment 2.

Next, FIG. 131 shows the configuration of the control unit 100 serving to generate gate signals for driving the switch elements to perform switching, in order to actually ensure the relationships of the theoretical duties. It is noted that the only difference from the above embodiment 2 is that, as described in FIG. 93, etc., the division number of plural periods divided in one switching cycle of the single-phase inverters 300, 400 is up to 6 in the present embodiment 3 whereas the division number is up to 8 in embodiment 2.

However, here, just for confirmation, the configuration and the operation of the control unit 100 in embodiment 3 will be described with reference to FIG. 131 and the subsequent figures.

As shown in FIG. 131, the control unit 100 includes a theoretical duty calculator 110, a feedback duty calculator 120, an adder/subtractor 130, a gate signal calculator 140, an operation area determiner 150, and a gate signal selector 160.

The theoretical duty calculator 110 includes an area-1 theoretical duty calculator 111, an area-2 theoretical duty calculator 112, and an area-3 theoretical duty calculator 113, and calculates theoretical duties using the theoretical expressions in the areas 1 to 3.

The area-1 theoretical duty calculator 111 calculates the theoretical duties D11 to D16 using Expressions (127) to (132) or Expressions (159) to (164). The area-2 theoretical duty calculator 112 calculates the theoretical duties D21 to D26 using Expressions (139) to (144) or Expressions (171) to (176). The area-3 theoretical duty calculator 113 calculates the theoretical duties D31 to D34 using Expressions (149) and (152) or Expressions (181) to (184).

Each theoretical duty is calculated on the basis of: voltage vac of the AC power supply 1 which is a detection value of the AC voltage detection unit 10, or an ideal voltage value vac* for the AC power supply 1; voltage Vc2 of the DC capacitor 3 which is a detection value of the DC capacitor voltage detection unit 12, or a DC capacitor voltage command value vc2* for the DC capacitor 3; voltage Vc3 of the DC capacitor 9 which is a detection value of the DC capacitor voltage detection unit 14, or a DC capacitor voltage command value vc3* for the DC capacitor 9; and voltage Vc1 of the smoothing capacitor 4 which is a detection value of the DC voltage detection unit 13, or a DC voltage command value Vc1* for the smoothing capacitor 4. FIG. 131 shows a case of performing the calculation on the basis of the detection values of the respective voltage detection units.

It is noted that, ideally, voltage Vc2 of the DC capacitor 3 and voltage Vc3 of the DC capacitor 9 are equal to each other, and therefore the average voltage of these voltages, Vsub=(Vc2+Vc3)/2, may be used.

The feedback duty calculator 120 is configured as shown in FIG. 132. A deviation between the DC voltage detection value Vc1 of the smoothing capacitor 4 and the DC voltage command value Vc1* therefor is calculated by a subtractor, and then, PI control is performed by a PI controller, and the resultant value is subjected to a limiter, whereby a current amplitude command value $\sqrt{2}$Iac* for the AC power supply 1 is calculated.

Meanwhile, from the AC voltage detection value vac of the AC power supply 1, a phase θ synchronized with the phase of vac is calculated by PLL (Phase Locked Loop). Then, a sine wave with the phase θ is multiplied with the current amplitude command value $\sqrt{2}$Iac* for the AC power supply 1, whereby an AC current command value iac* for the AC power supply 1 is calculated.

Then, a deviation between the AC current command value iac* and the AC current detection value iac is subjected to PI control by a PI controller, and the resultant value is divided by the average value Vsub of the DC capacitor voltages. Then, the resultant value is subjected to a limiter, whereby a feedback duty DFB is obtained.

The adder/subtractor 130 adds or subtracts the feedback duty DFB to or from the calculation results of the theoretical duty calculator 110. Since control is performed in such a direction as to increase current iac of the AC power supply 1 when the DFB increases, the DFB is added to D11, D13, D15, D21, D23, D25, D31, D33 by the adders 131, 133, 135, and the DFB is subtracted from D12, D14, D16, D22, D24, D26, D32, D34 by the subtractors 132, 134, 136. These calculation results are inputted to the gate signal calculator 140.

FIG. 133 is a configuration diagram of the gate signal calculator 140. The gate signal calculator 140 includes an area-1 gate signal calculator 141, an area-2 gate signal calculator 142, and an area-3 gate signal calculator 143, and calculates gate signals for each switching cycle, from the inputted duties.

The area-1 gate signal calculator 141 includes six comparators and a carrier signal cararea1, and compares D11+DFB, D12−DFB, D13+DFB, D14−DFB, D15+DFB, and D16−DFB which are input signals, with the carrier signal cararea1, by the respective comparators, thereby generating a signal G11 for the first period, a signal G12 for the second period, a signal G13 for the third period, a signal G14 for the fourth period, a signal G15 for the fifth period, and a signal G16 for the sixth period.

The area-2 gate signal calculator 142 includes six comparators and a carrier signal cararea2, and compares D21+DFB, D22−DFB, D23+DFB, D24−DFB, D25+DFB, and D26−DFB which are input signals, with the carrier signal cararea2, by the respective comparators, thereby generating a signal G21 for the first period, a signal G22 for the second period, a signal G23 for the third period, a signal G24 for the fourth period, a signal G25 for the fifth period, and a signal G26 for the sixth period.

The area-3 gate signal calculator 143 includes four comparators and a carrier signal cararea3, and compares D31+DFB, D32−DFB, D33+DFB, and D34−DFB which are input signals, with the carrier signal cararea3, by the respective comparators, thereby generating a signal G31 for the first period, a signal G32 for the second period, a signal G33 for the third period, and a signal G34 for the fourth period.

The above signals are inputted to the gate signal selector 160, and thus are distributed as gate signals for the respective switch elements.

The absolute value calculator 170 calculates the absolute value |vac| of the voltage detection value vac of the AC power supply 1, and outputs the absolute value |vac| to the operation area determiner 150.

The operation area determiner 150 performs magnitude comparison among the absolute value |vac| of the AC voltage detection value vac of the AC power supply 1, the DC capacitor voltage detection value Vc2 of the DC capacitor 3 or the DC capacitor voltage detection value Vc3 of the DC capacitor 9, and the DC voltage detection value Vc1 of the smoothing capacitor 4, performs determination as to the above areas 1 to 3, and calculates an area signal sigarea.

Instead of the DC capacitor voltage detection value Vc2 of the DC capacitor 3 or the voltage Vc3 of the DC capacitor 9, the DC capacitor voltage command values Vc2*, Vc3* may be used or the DC capacitor average voltage Vsub may be used.

The gate signal selector 160 allocates outputs of the gate signal calculator 140 to the switch elements, using the area signal sigarea outputted from the operation area determiner 150.

The control unit 100 shown in FIG. 131 performs control such that, in the area 1 and the area 2, the switching cycle Tsw is divided into six periods, and in the area 3, the switching cycle Tsw is divided into two periods.

As an example, FIG. 134 shows a gate pattern diagram in the area 1 in the positive half wave. FIG. 135 shows a gate pattern diagram in the area 3 in the positive half wave.

In the area 1 and the area 2, the switching cycle Tsw and ⅓ cycle thereof are made constant, and an ON period ratio during those periods is controlled. That is, in FIG. 134, times 0, t12, t14, Tsw are fixed, and t11, t13, t15 (control axes) are controlled by the control unit 100.

In the area 3, the switching cycle Tsw is made constant and an ON period ratio during that period is controlled. The switching cycle as a reference is constant, and PWM (Pulse Width Modulation) control can be used. The switching cycle Tsw is made constant and an ON period ratio during that period is controlled. That is, in FIG. 135, times 0, Tsw, 2Tsw are fixed and t31 and t32 (control axes) are controlled.

As described above, the control unit 100 of the power conversion device in embodiment 3 of the present invention performs control such that one switching cycle Tsw of the single-phase inverter 300 and the single-phase inverter 400 is the same as the one switching cycle of the single-phase converter 200 and is divided into an even number of periods including one or three pairs of periods in which current of the AC power supply 1 increases in the first half of each pair of periods and decreases in the second half of each pair of periods, and the control unit 100 includes: the theoretical duty calculator 110 which calculates the theoretical duty 1 corresponding to the first-half time width relative to the time width of one pair of periods, and the theoretical duty 2 corresponding to the second-half time width relative to the time width of one pair of periods, so that the increase amount of current of the AC power supply 1 in the first half and the decrease amount thereof in the second half become equal to each other in the one pair of periods; and the gate signal calculator 140 which calculates gate signals for driving the switch elements of the single-phase inverter 300 and the single-phase inverter 400 and the switch elements of the single-phase converter 200 to perform switching, on the basis of the theoretical duty 1 and the theoretical duty 2. Thus, charging operation and discharging operation of the DC capacitor 3 and the single-phase inverter 400 are performed within one switching cycle Tsw of the single-phase inverter 300 and the single-phase inverter 400, and the charging amount and the discharging amount become equal to each other. Therefore, irrespective of the very long cycle of the AC power supply 1, charging operation and discharging operation of the DC capacitor 3 and the DC capacitor 9 are completed within one short switching cycle of the single-phase inverter 300 and the single-phase inverter 400, whereby the charging/discharging amount itself is reduced, the capacitances required for the DC capacitor 3 and the DC capacitor 9 in order to suppress ripple voltage can be greatly reduced, and size reduction of the device can be achieved.

In addition, the control unit 100 includes: a voltage controller which generates an AC current command value on the basis of a deviation between the DC voltage command value and the DC voltage detection value; and the feedback duty calculator 120 which calculates the feedback duty on the basis of a deviation between the AC current command value and an AC current detection value, and the gate signal calculator 140 calculates the gate signals on the basis of duties calculated by adding the feedback duty to the theoretical duty 1 and by subtracting the feedback duty from the theoretical duty 2. Therefore, it becomes possible to perform constant-voltage control so as to keep voltage of the smoothing capacitor 4 at a desired DC voltage command value.

In addition, the control unit 100 sets the number of divided periods in one switching cycle of the single-phase inverter 300 and the single-phase inverter 400 in accordance with the areas 1, 2, 3 determined depending on the magnitude relationship among voltage vac of the AC power supply 1, voltage Vc1 of the smoothing capacitor 4, voltage Vc2 of the DC capacitor 3, and voltage Vc3 of the DC capacitor 9. Therefore, it becomes possible to perform switching control for each switch element by an appropriate gate pattern according to the voltage relationship.

In addition, the control unit 100 controls the switch elements such that switching timings are different among the single-phase inverter 300, the single-phase inverter 400, and the single-phase converter 200. Therefore, it becomes possible to make the application voltage frequencies of the reactors 2a, 2b higher than the switching frequencies of the single-phase inverter 300, the single-phase inverter 400, and the single-phase converter 200.

As a result, it becomes possible to reduce a VT product which is a product of voltage and time of the reactors 2a, 2b, with a general configuration ratio, and a necessary inductance value can be reduced in principle. In general, in the reactors 2a, 2b, the inductance value is to be reduced through reduction in core size and decrease in the number of winding turns. Therefore, size reduction of the reactors 2a, 2b is achieved as a result.

In the power conversion device shown in embodiment 3, the upper arms of the single-phase converter 200 are composed of diodes 6a, 6c. However, as in the lower arms, the upper arms may be composed of switch elements. In this case, by turning on the switch elements during the conduction periods of the diodes 6a, 6c shown in embodiment 3, it is possible to perform so-called synchronous rectification operation.

Similarly, in the switch elements 5a to 5d and 8a to 8d of the single-phase inverter 300 and the single-phase inverter 400 and the switch elements 6b, 6d of the single-phase converter 200, it is possible to perform synchronous rectification operation by turning on each switch element during a period in which the diode connected in parallel thereto becomes conductive.

In the synchronous rectification operation in the case of using MOSFETs, if voltage drop due to the ON resistance of the switch element is smaller than voltage drop of the parallel diode, current flows through the switch element, and thus conduction loss can be reduced. In addition, by forming the upper arms of the single-phase converter 200 by switch elements, it becomes possible to supply power from the smoothing capacitor 4 to the AC power supply 1.

The switching cycles Tsw in the area 1, the area 2, and the area 3 may have the same constant value or may have respective independent values. For example, the switching cycles in the area 1 and the area 2 may be set at the same constant value, and the switching cycle in the area 3 may be set to be half the switching cycle in the area 1 and the area 2. Thus, the application voltage frequencies of the reactors 2a, 2b become constant in all the areas. If the application voltage frequency is constant, it becomes easy to take measures for noise and establish stable control. In addition, driving may be performed using PFM (Pulse Frequency Modulation) control in which the switching frequency is varied while the ON period of any of the switch elements is fixed.

The reactors 2a, 2b are provided on both the positive-side line and the negative-side line of the AC power supply 1. However, the reactor may be connected on only the positive-side line or the negative-side line. The reactors may be connected between the single-phase converter 200, and the single-phase inverter 300 and the single-phase inverter 400.

As shown in FIG. 35 above, a configuration having a diode bridge as a rectification circuit may be employed.

In embodiment 3, two single-phase inverters are provided. However, three or more single-phase inverters may be provided.

In the case where, for example, a DC/DC converter for controlling voltage Vc1 of the smoothing capacitor 4 or a DC voltage source is connected in parallel with the smoothing capacitor 4, the feedback duty calculator 120 shown in FIG. 132 may perform only current control using a predetermined current amplitude command value √2Iac* for the AC power supply 1 without performing Vc1-constant control.

In this case, it becomes possible to perform high-power-factor operation control.

The AC power supply may be a three-phase power supply. In this case, two or more single-phase inverters are provided for each phase.

Embodiment 4

In the above embodiments 1 to 3, a control system not including voltage adjustment means for the DC capacitor voltages Vc2 and Vc3 has been described under the condition that the charging amount and the discharging amount of the DC capacitor 3, 9 in each of the single-phase inverter 300 and the single-phase inverter 400 are equal to each other. In the present embodiment 4, a control system including voltage adjustment means for the DC capacitor voltages Vc2 and Vc3 will be described.

A condition assumed in the present embodiment 4 is that the charging amount and the discharging amount of the DC capacitor 3, 9 are different, even slightly, due to circuit loss, disturbance to the switching duties of the single-phase inverter 300 and the single-phase inverter 400, and the like.

FIG. 136 is a circuit configuration diagram of a power conversion device according to embodiment 4 of the present invention. As shown in FIG. 136, the power conversion device includes a main circuit and the control unit 100, for converting AC voltage and AC power of the AC power supply 1 to DC voltage and DC power and outputting the DC voltage and DC power to the smoothing capacitor 4.

It is noted that the configuration shown in FIG. 136 is exactly the same as that in the above embodiment 2, and the description thereof will not be repeated.

However, here, in relation to using a control system including voltage adjustment means for the DC capacitor voltages Vc2 and Vc3 as described above, in the following description and claims of the present disclosure, the single-phase inverter 300 may be referred to as a first inverter, the single-phase inverter 400 may be referred to as a second inverter, the DC capacitor 3 may be referred to as a first DC capacitor, and the DC capacitor 9 may be referred to as a second DC capacitor 9, as necessary.

A feature that control is performed using divided areas of area 1, area 2, and area 3 determined depending on the voltage relationship as shown in FIG. 137 and FIG. 138, is the same as in the above embodiment 2, and the description thereof is omitted.

It is noted that, as also mentioned in the above embodiment 1, the areas 1, 2 may be referred to as area A and the area 3 may be referred to as area B, as necessary.

The basic operation in this configuration is the same as in the above embodiment 2, and driving methods and current routes in the areas 1 to 3 in the positive half wave of the AC power supply 1 and driving methods and current routes in the areas 1 to 3 in the negative half wave of the AC power supply 1 are the same as in embodiment 2. Therefore, the individual descriptions thereof are omitted.

The present embodiment is different from the above embodiment 2 in operation of adjusting the charging/discharging amount of the DC capacitor. The operation principle thereof will be described for each of six areas of the areas 1 to 3 in the positive half wave of the AC power supply 1 and the areas 1 to 3 in the negative half wave of the AC power supply 1.

FIG. 139 is an operation schematic diagram showing the operation state during one switching cycle 2Tsw (corresponding to two switching cycles of the converter) of the inverters, in the area 1 in the positive half wave of the AC power supply 1. It is noted that these operation waveforms are the same as those described in FIG. 39 in the above embodiment 2, and the description thereof will not be repeated.

Here, the control axes described in FIG. 33 in the above embodiment 1 will be described. That is, each control axis corresponds to a timing that determines the boundary between the current increase period and the current decrease period of the current of the AC power supply 1. In FIG. 139, as in the above embodiment 2, one switching cycle 2Tsw of the inverters 300, 400 is divided into four pairs of periods, i.e., eight periods, whereby four control axes of a first control axis t11, a second control axis t13, a third control axis t14, and a fourth control axis t16 are set.

In the above embodiment 2, in order to keep voltage Vc1 of the smoothing capacitor 4 constant, as shown in FIG. 87, the feedback duty DFB is reflected for both of the first control axis t11 and the second control axis t13, to generate gate signals for the single-phase inverter 300, and similarly, the feedback duty DFB is reflected for both of the third control axis t14 and the fourth control axis t16, to generate gate signals for the single-phase inverter 400.

In the present embodiment 4, as described below, focusing on the fact that the tendency of increase/decrease of the voltages Vc2 and Vc3 of the DC capacitors 3, 9 differs depending on the control axis for which the feedback duty DFB is reflected, a control method is provided in which the control axis for which the feedback duty DFB is reflected is appropriately selected from among a plurality of control axes that can be taken, thereby enabling the DC voltage Vc1 to be kept constant and also enabling the voltages Vc2 and Vc3 of the DC capacitors 3, 9 to be kept constant.

Hereinafter, a specific control method will be described in detail.

In FIG. 139, first, the control principle for voltage Vc2 of the first DC capacitor 3 in the single-phase inverter 300 will be described. In the period from 0 to Tsw, the first DC capacitor 3 is discharged during the period from t11 to t12 and therefore voltage Vc2 decreases, and the first DC capacitor 3 is charged during the period from t13 to Tsw and therefore voltage Vc2 increases.

The increase/decrease of voltage Vc2 is considered in terms of a total amount in the period from 0 to Tsw. It is noted that the control axes are t11 (first control axis) and t13 (second control axis), and in the present embodiment 4, one of t11 and t13 is selected to adjust increase/decrease.

(1) In the case of selecting and increasing t11, iac increases and Vc2 increases.

Here, the case of increasing t11 corresponds to the case where the feedback duty DFB is outputted as a plus value so as to increase AC current iac in operation of the feedback duty calculator 120, in order to make DC voltage Vc1 constant.

Therefore, the phenomenon (1) indicates that, when t11 is increased by the plus value DFB being reflected for the first control axis t11, AC current iac increases and voltage Vc2 increases.

(2) In the case of selecting and decreasing t11, iac decreases and Vc2 decreases.

As in the above concept, the case of decreasing t11 corresponds to the case where the feedback duty DFB is outputted as a minus value so as to decrease AC current iac in operation of the feedback duty calculator 120, in order to make DC voltage Vc1 constant.

Therefore, the phenomenon (2) indicates that, when t11 is decreased by the minus value DFB being reflected for the first control axis t11, AC current iac decreases and voltage Vc2 decreases.

The above case is the case where the DFB is reflected for the first control axis t11. On the other hand, if the DFB is reflected for another second control axis t13 instead of the first control axis t11, the tendency of increase/decrease of AC current iac and voltage Vc2 differs as shown in the following (3), (4).

(3) In the case of selecting and increasing t13, iac increases and Vc2 decreases.

(4) In the case of selecting and decreasing t13, iac decreases and Vc2 increases.

Here, a command for increase/decrease of AC current iac, i.e., an AC current increase/decrease command corresponds to the feedback duty DFB, as described above. Operation is performed such that, when the DFB is a plus value, AC current iac increases, and when the DFB is a minus value, AC current iac decreases.

In addition, a command for increase/decrease of the voltage Vc2, i.e., a first DC capacitor voltage increase/decrease command corresponds to a deviation ΔVc2 between the first DC capacitor voltage detection value Vc2 and the first DC capacitor voltage command value Vc2* as shown in FIG. 167 and FIG. 169 later. Operation is performed such that, when the deviation ΔVc2 is a plus value, the first DC capacitor voltage Vc2 decreases, and when the deviation ΔVc2 is a minus value, the first DC capacitor voltage Vc2 increases.

Therefore, on the basis of the AC current increase/decrease command for AC current iac and the first DC capacitor voltage increase/decrease command for first DC capacitor voltage Vc2, one of the first control axis t11 and the second control axis t13 is selected to be increased/decreased in accordance with the above four operation patterns, whereby the first DC capacitor voltage Vc2 can be controlled to be constant.

On the basis of the same operation principle as described in detail above for the first DC capacitor voltage Vc2, operation in the case of controlling the second DC capacitor voltage Vc3 to be constant will be briefly described below.

In FIG. 139, in the period from Tsw to 2Tsw, the second DC capacitor 9 is discharged during the period from t14 to t15 and therefore voltage Vc3 decreases, and the second DC capacitor 9 is charged during the period from t16 to 2Tsw and therefore voltage Vc3 increases. The increase/decrease of voltage Vc3 is considered in terms of a total amount in the period from Tsw to 2Tsw. It is noted that the control axes are t14 (third control axis) and t16 (fourth control axis) and one of t14 and t16 is selected to adjust increase/decrease.

In the case of selecting and increasing t14, iac increases and Vc3 increases.

In the case of selecting and decreasing t14, iac decreases and Vc3 decreases.

In the case of selecting and increasing t16, iac increases and Vc3 decreases.

In the case of selecting and decreasing t16, iac decreases and Vc3 increases.

Therefore, on the basis of the AC current increase/decrease command for AC current iac and the second DC capacitor voltage increase/decrease command for second DC capacitor voltage Vc3, one of the third control axis t14 and the fourth control axis t16 is selected to be increased/decreased in accordance with the above four operation patterns, whereby the second DC capacitor voltage Vc3 can be controlled to be constant.

Next, FIG. 140 is an operation schematic diagram showing the operation state during one switching cycle 2Tsw (two switching cycles of the converter) of the inverters, in the area 2 in the positive half wave of the AC power supply 1. It is noted that these operation waveforms are the same as those described in FIG. 48 in the above embodiment 2, and the description thereof will not be repeated.

In FIG. 140, as in the above embodiment 2, one switching cycle 2Tsw of the inverters 300, 400 is divided into four pairs of periods, i.e., eight periods, whereby four control axes of a first control axis t21, a second control axis t23, a third control axis t24, and a fourth control axis t26 are set.

In the above embodiment 2, in order to keep voltage Vc1 of the smoothing capacitor 4 constant, as shown in FIG. 87, the feedback duty DFB is reflected for both of the first control axis t21 and the second control axis t23, to generate gate signals for the single-phase inverter 300, and similarly, the feedback duty DFB is reflected for both of the third control axis t24 and the fourth control axis t26, to generate gate signals for the single-phase inverter 400.

In the present embodiment 4, as described below, focusing on the fact that the tendency of increase/decrease of the voltages Vc2 and Vc3 of the DC capacitors 3, 9 differs depending on the control axis for which the feedback duty DFB is reflected, a control method is provided in which the control axis for which the feedback duty DFB is reflected is appropriately selected from among a plurality of control axes that can be taken, thereby enabling the DC voltage Vc1 to be kept constant and also enabling the voltages Vc2 and Vc3 of the DC capacitors 3, 9 to be kept constant.

Hereinafter, a specific control method will be described in detail.

In FIG. 140, first, the control principle for voltage Vc2 of the first DC capacitor 3 in the single-phase inverter 300 will be described. In the period from 0 to Tsw, the first DC capacitor 3 is charged during the period from 0 to t21 and therefore voltage Vc2 increases, and the first DC capacitor 3 is discharged during the period from t22 to t23 and therefore Vc2 decreases.

The increase/decrease of voltage Vc2 is considered in terms of a total amount in the period from 0 to Tsw. It is noted that the control axes are t21 (first control axis) and t23 (second control axis), and in the present embodiment 4, one of t21 and t23 is selected to adjust increase/decrease.

In the case of selecting and increasing t21, iac increases and Vc2 increases.

In the case of selecting and decreasing t21, iac decreases and Vc2 decreases.

In the case of selecting and increasing t23, iac increases and Vc2 decreases.

In the case of selecting and decreasing t23, iac decreases and Vc2 increases.

Therefore, as in the case of area 1 above, on the basis of the AC current increase/decrease command for AC current iac and the first DC capacitor voltage increase/decrease command for first DC capacitor voltage Vc2, one of the first control axis t21 and the second control axis t23 is selected to be increased/decreased in accordance with the above four operation patterns, whereby the first DC capacitor voltage Vc2 can be controlled to be constant.

Next, operation in the case of controlling the second DC capacitor voltage Vc3 to be constant will be briefly described.

In FIG. 140, in the period from Tsw to 2Tsw, the second DC capacitor 9 is charged during the period from Tsw to t24 and therefore voltage Vc3 increases, and the second DC capacitor 9 is discharged during the period from t25 to t26 and therefore voltage Vc3 decreases. The increase/decrease of voltage Vc3 is considered in terms of a total amount in the period from Tsw to 2Tsw. It is noted that the control axes are t24 (third control axis) and t26 (fourth control axis) and one of t24 and t26 is selected to adjust increase/decrease.

In the case of selecting and increasing t24, iac increases and Vc3 increases.

In the case of selecting and decreasing t24, iac decreases and Vc3 decreases.

In the case of selecting and increasing t26, iac increases and Vc3 decreases.

In the case of selecting and decreasing t26, iac decreases and Vc3 increases.

Therefore, on the basis of the AC current increase/decrease command for AC current iac and the second DC capacitor voltage increase/decrease command for second DC capacitor voltage Vc3, one of the third control axis t24 and the fourth control axis t26 is selected to be increased/decreased in accordance with the above four operation patterns, whereby the second DC capacitor voltage Vc3 can be controlled to be constant.

Next, FIG. 141 is an operation schematic diagram showing the operation state during one switching cycle 2Tsw (two switching cycles of the converter) of the inverters, in the area 3 in the positive half wave of the AC power supply 1. It is noted that these operation waveforms are the same as those described in FIG. 57 in the above embodiment 2, and the description thereof will not be repeated.

In FIG. 141, the control principle for voltage Vc2 of the first DC capacitor 3 in the single-phase inverter 300 and voltage Vc3 of the second DC capacitor 9 in the single-phase inverter 400 will be described.

In the area 3 (area B), as shown in FIG. 141, there are a less number of periods divided in one switching cycle, and therefore it is impossible to perform the control of keeping the voltage Vc2 constant by setting two control axes and selecting the control axis in accordance with one of the four operation patterns on the basis of increase/decrease of the AC current iac and increase/decrease of the voltage Vc2 as in the cases of areas 2, 3 (area A) above.

Therefore, as described in detail below, in the area 3, voltages Vc2 and Vc3 are controlled at the same time, unlike the cases of area 1 and area 2.

In the period from 0 to t31, the first DC capacitor 3 in the single-phase inverter 300 is discharged and therefore voltage Vc2 decreases, and in the period from t31 to Tsw, the first DC capacitor 3 in the single-phase inverter 300 is and therefore voltage Vc2 increases. Next, in the period from Tsw to t32, the second DC capacitor 9 in the single-phase inverter 400 is discharged and therefore voltage Vc3 decreases, and in the period from t32 to 2Tsw, the second DC capacitor 9 in the single-phase inverter 400 is charged and therefore voltage Vc3 increases. The increase/decrease of voltages Vc2 and Vc3 is considered in terms of a total amount in the period from 0 to 2Tsw.

The outline of a voltage adjustment method for the first DC capacitor voltage Vc2 and the second DC capacitor voltage Vc3 in the area 3 is as follows.

That is, in order to ensure that DC voltage Vc1 is constant, the feedback duty DFB is reflected for the control axes t31 and t32, and the operation modes determined in accordance with the ON/OFF states of the switch elements in four periods of 0 to t31, t31 to Tsw, Tsw to t32, and t32 to 2Tsw which are determined upon the reflection, are switched to predetermined different modes as appropriate, whereby, without changing the increase/decrease characteristic of AC current iac corresponding to the DFB, and thus, while DC voltage Vc1 is kept constant, the first DC capacitor voltage Vc2 and the second DC capacitor voltage Vc3 are controlled to be kept constant.

In other words, in the area 3, on the basis of the increase/decrease command for AC current iac, the increase/decrease command for first DC capacitor voltage Vc2, and the increase/decrease command for second DC capacitor voltage Vc3, the switch elements 5a to 5d composing the single-phase inverter 300 and the switch elements 8a to 8d composing the single-phase inverter 400 are newly caused to perform switching at time 0, time t31, time Tsw, and time t32 in FIG. 141, so as to generate operation modes for new current routes and unbalance the charging/discharging amounts of the DC capacitors of the single-phase inverter 300 and the single-phase inverter 400, whereby voltages Vc2 and Vc3 are controlled to be constant.

Hereinafter, the details of the control will be described specifically.

FIG. 142 shows the manner of switching of the operation mode in accordance with the increase/decrease command for voltage Vc2 and the increase/decrease command for voltage Vc3.

As shown in the left columns on the table, there are a total of eight cases according to three types of each increase/decrease command, i.e., increase, decrease, and no increase/decrease.

On the top row of the table, operation modes determined depending on the ON/OFF states of the switch elements shown in FIG. 141 are indicated for the respective periods.

Figure 58:
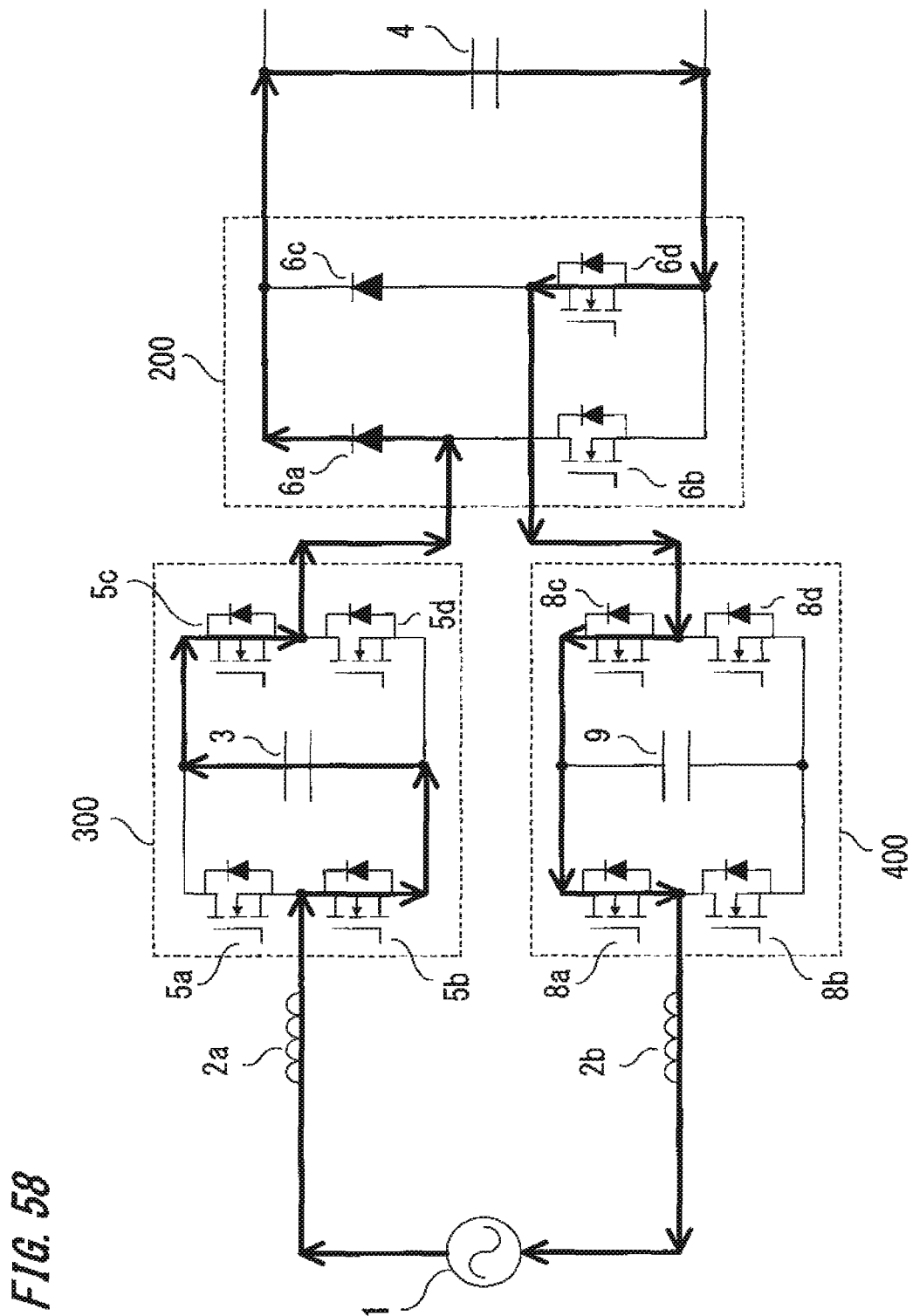
FIG. 58 is a diagram showing a current route in a first period in FIG. 57.

The period from 0 to t31 in FIG. 141 corresponds to mode 7 and the current route is as shown in FIG. 58 above.

Figure 59:
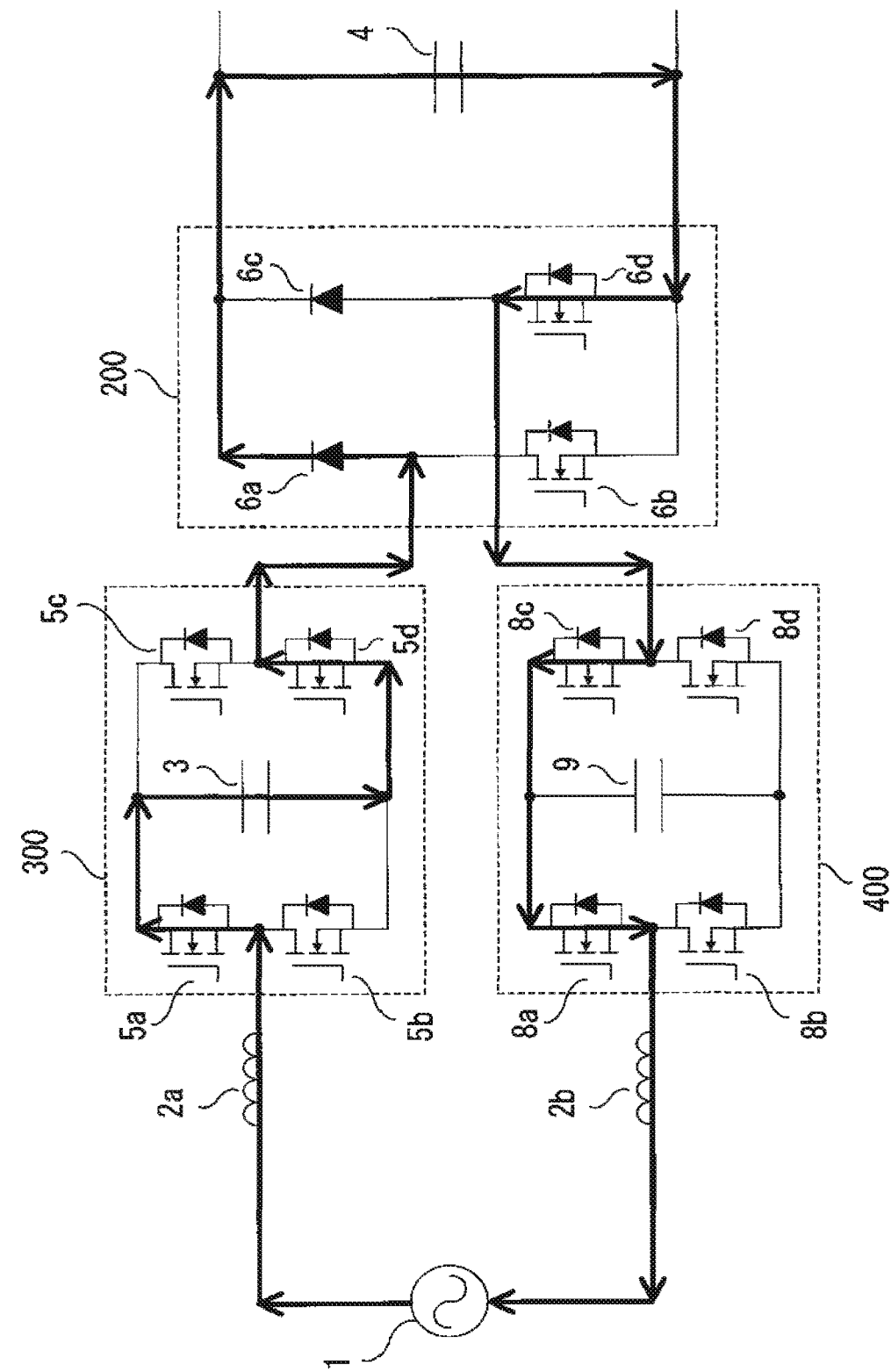
FIG. 59 is a diagram showing a current route in a second period in FIG. 57.

The period from t31 to Tsw in FIG. 141 corresponds to mode 2 and the current route is as shown in FIG. 59 above.

Figure 60:
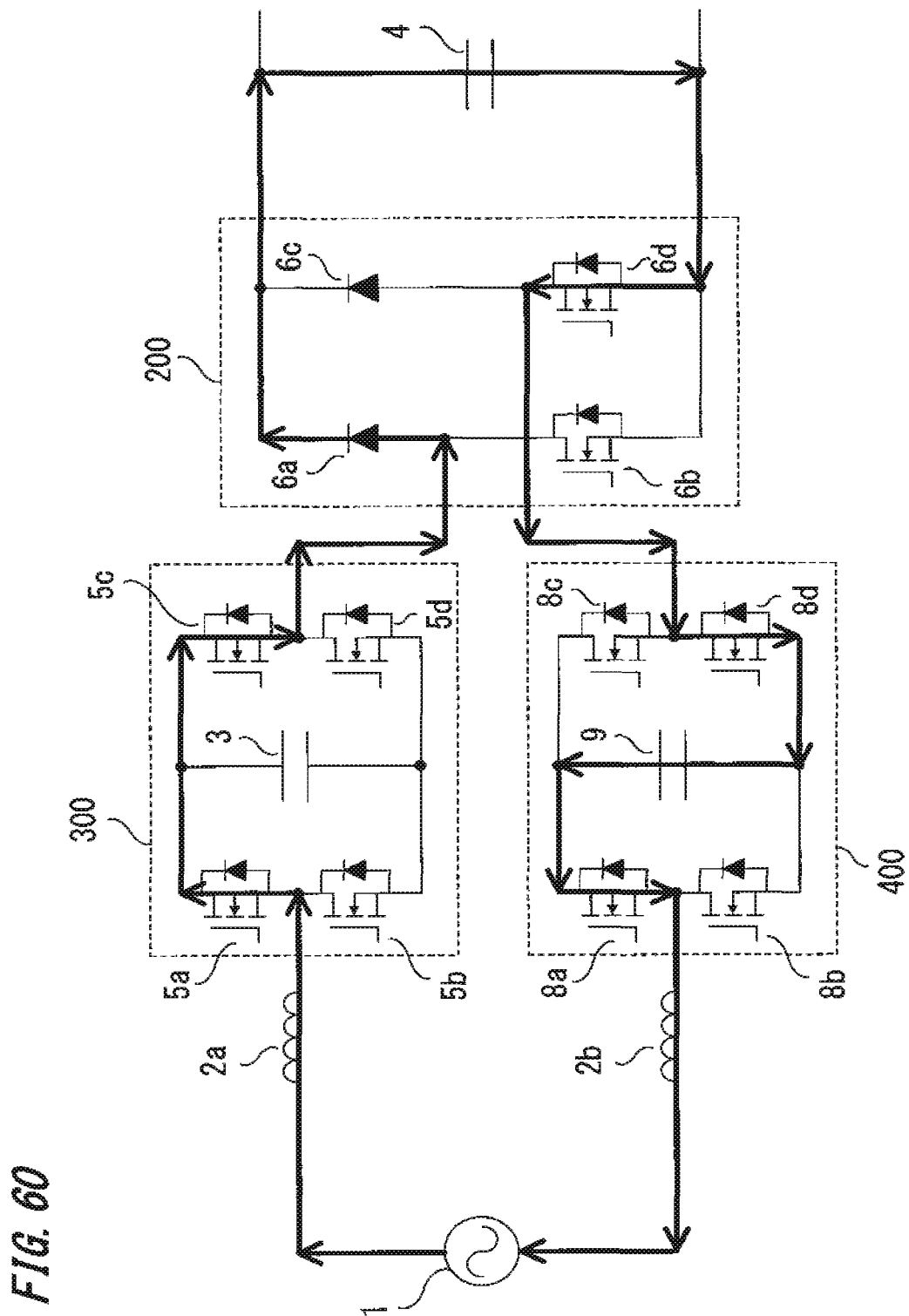
FIG. 60 is a diagram showing a current route in a third period in FIG. 57.

The period from Tsw to t32 in FIG. 141 corresponds to mode 8 and the current route is as shown in FIG. 60 above.

Figure 61:
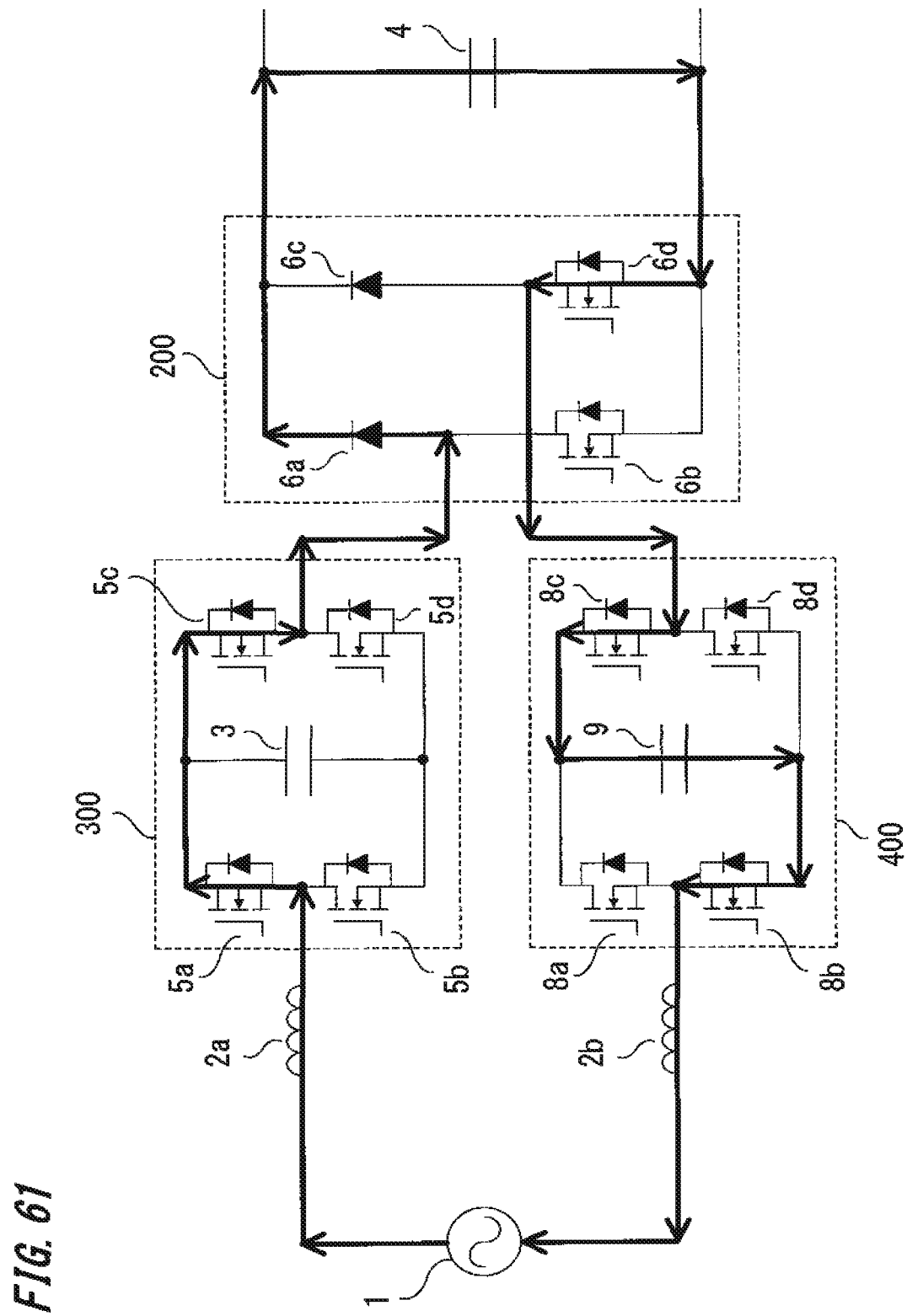
FIG. 61 is a diagram showing a current route in a fourth period in FIG. 57.

The period from t32 to 2Tsw in FIG. 141 corresponds to mode 1 and the current route is as shown in FIG. 61 above.

Next, the manner of switching the mode will be described for each case of the increase/decrease commands for voltages Vc2 and Vc3.

In the case of increasing both voltages Vc2 and Vc3 in the period from 0 to 2Tsw, the switch element 5b is kept being OFF at time 0 in FIG. 141, to switch the operation mode in the period from 0 to t31, from mode 7 to mode 9. In addition, the switch element 8d is kept being OFF at time Tsw, to switch the operation mode in the period from Tsw to t32, from mode 8 to mode 9.

FIG. 143 shows a current route in mode 9. The route is as follows: AC power supply 1→reactor 2a→diode 5a→switch element 5c→diode 6a→smoothing capacitor 4→diode 6d→diode 8c→switch element 8a→reactor 2b→AC power supply 1. Since the voltage of the AC power supply 1 is higher than voltage Vc1 of the smoothing capacitor 4, current iac of the AC power supply 1 increases and this is the same as in the original mode 7. During this period, current does not flow through the first DC capacitor 3 and the second DC capacitor 9, and therefore voltage Vc2 and voltage Vc3 are constant.

FIG. 144 is an operation schematic diagram showing the operation state during one switching cycle 2Tsw (two switching cycles of the converter) of the inverters, in the area 3 in the positive half wave of the AC power supply 1 when the operation mode is switched as described above. In the period from 0 to t31, voltage Vc2 is switched not to be increased or decreased, whereby voltage Vc2 increases in the period from 0 to 2Tsw. Similarly, in the period from Tsw to t32, voltage Vc3 is switched not to be increased or decreased, whereby voltage Vc3 increases in the period from 0 to 2Tsw. That is, it is possible to increase voltages Vc2 and Vc3 without changing the increase/decrease characteristic of AC current iac.

Next, in the case of increasing voltage Vc2 and decreasing Vc3 in the period from 0 to 2Tsw, the switch element 5b is kept being OFF at time 0 in FIG. 141 and the switch element 8d is turned ON in the period from 0 to t31, to switch the operation mode in the period from 0 to t31, from mode 7 to mode 8.

The current route in the mode 8 is as described in FIG. 60 in embodiment 2, that is, the route is as follows: AC power supply 1→reactor 2a→diode 5a→switch element 5c→diode 6a→smoothing capacitor 4→diode 6d→switch element 8d→second DC capacitor 9→switch element 8a→reactor 2b→AC power supply 1. Since the sum of voltage of the AC power supply 1 and voltage Vc3 of the DC capacitor 9 is higher than voltage Vc1 of the smoothing capacitor 4, AC current iac of the AC power supply 1 increases and this is the same as in the original mode 7. During this period, current does not flow through the first DC capacitor 3 and therefore voltage Vc2 is constant, but current flows through the second DC capacitor 9 in a discharging direction, so that voltage Vc3 decreases.

FIG. 145 is an operation schematic diagram showing the operation state during the one switching cycle 2Tsw (two switching cycles of the converter) of the inverters, in the area 3 in the positive half wave of the AC power supply 1 when the operation mode is switched as described above. In the period from 0 to t31, voltage Vc2 is switched not to be increased or decreased and voltage Vc3 is switched to be decreased, whereby, in the period from 0 to 2Tsw, voltage Vc2 increases and Vc3 decreases. That is, it is possible to increase voltage Vc2 and decrease voltage Vc3 without changing the increase/decrease characteristic of the AC current iac.

Next, in the case of decreasing voltage Vc2 and increasing voltage Vc3 in the period from 0 to 2Tsw, in FIG. 141, the switch element 5b is kept being ON from time Tsw to time t32 and the switch element 8d is kept being OFF at time Tsw, to switch the operation mode in the period from Tsw to t32, from mode 8 to mode 7.

The current route in mode 7 is as described in FIG. 58 in embodiment 2, that is, the route is as follows: AC power supply 1→reactor 2a→switch element 5b→first DC capacitor 3→switch element 5c→diode 6a→smoothing capacitor 4→diode 6d→diode 8c→switch element 8a→reactor 2b→AC power supply 1. Since the sum of voltage of the AC power supply 1 and voltage Vc2 of the first DC capacitor 3 is higher than voltage Vc1 of the smoothing capacitor 4, AC current iac of the AC power supply 1 increases. During this period, current flows through the first DC capacitor 3 in a discharging direction, so that voltage Vc2 decreases. On the other hand, current does not flow through the second DC capacitor 9 and therefore voltage Vc3 is constant.

FIG. 146 is an operation schematic diagram showing the operation state during one switching cycle 2Tsw (two switching cycles of the converter) of the inverters, in the area 3 in the positive half wave of the AC power supply 1 when the operation mode is switched as described above.

In the period from Tsw to t32, voltage Vc2 is switched to be decreased and voltage Vc3 is switched not to be increased or decreased, whereby, in the period from 0 to 2Tsw, voltage Vc2 decreases and voltage Vc3 increases. That is, it is possible to decrease voltage Vc2 and increase voltage Vc3 without changing the increase/decrease characteristic of AC current iac.

In the case of decreasing both voltages Vc2 and Vc3 in the period from 0 to 2Tsw, the switch element 8d is turned ON in the period from 0 to t31 in FIG. 141, to switch the operation mode in the period from 0 to t31, from mode 7 to mode 6. In addition, the switch element 5b is turned ON in the period from Tsw to t32, to switch the operation mode in the period from Tsw to t32, from mode 8 to mode 6.

FIG. 147 shows the current route in the mode 6. The route is as follows: AC power supply 1→reactor 2a→switch element 5b→first DC capacitor 3→switch element 5c→diode 6a→smoothing capacitor 4→diode 6d→switch element 8d→second DC capacitor 9→switch element 8a→reactor 2b→AC power supply 1. Since the sum of voltage of the AC power supply 1 and voltages Vc2 and Vc3 is higher than voltage Vc1 of the smoothing capacitor 4, AC current iac of the AC power supply 1 increases. During this period, current flows through the first DC capacitor 3 and the second DC capacitor 9 in a discharging direction, and therefore voltage Vc2 and voltage Vc3 decrease.

FIG. 148 is an operation schematic diagram showing the operation state during one switching cycle 2Tsw (two switching cycles of the converter) of the inverters, in the area 3 in the positive half wave of the AC power supply 1 when the operation mode is switched as described above. In the period from 0 to t31, voltages Vc2 and Vc3 are both decreased, and also in the period from Tsw to t32, voltages Vc2 and Vc3 are both decreased, whereby voltages Vc2 and Vc3 are both decreased in the period from 0 to 2Tsw. That is, it is possible to decrease voltages Vc2 and Vc3 without changing the increase/decrease characteristic of i AC current ac.

In the case of increasing only voltage Vc2 in the period from 0 to 2Tsw, the switch element 8d is kept being ON in the period from 0 to t31 in FIG. 141, to switch the operation mode in the period from 0 to t31, from mode 7 to mode 9.

The current route in the mode 9 is as described in FIG. 143. That is, the route is as follows: AC power supply 1→reactor 2a→diode 5a→switch element 5c→diode 6a→smoothing capacitor 4→diode 6d→diode 8c→switch element 8a→reactor 2b→AC power supply 1. Since voltage of the AC power supply 1 is higher than voltage Vc1 of the smoothing capacitor 4, AC current iac of the AC power supply 1 increases. During this period, current does not flow through the first DC capacitor 3 and the second DC capacitor 9, and therefore voltage Vc2 and voltage Vc3 do not change.

FIG. 149 is an operation schematic diagram showing the operation state during one switching cycle 2Tsw (two switching cycles of the converter) of the inverters, in the area 3 in the positive half wave of the AC power supply 1 when the operation mode is switched as described above.

In the period from 0 to t31, voltages Vc2 and Vc3 become constant, whereby, in the period from 0 to 2Tsw, voltage Vc2 increases and voltage Vc3 becomes constant. That is, it is possible to increase voltage Vc2 and make voltage Vc3 constant without changing the increase/decrease characteristic of AC current iac.

In the case of decreasing only voltage Vc2 in the period from 0 to 2Tsw, the switch element 5c is turned ON instead of OFF at time t31 in FIG. 141, to switch the operation mode in the period from t31 to Tsw, from mode 2 to mode 9.

The current route in the mode 9 is as described in FIG. 143, that is, the route is as follows: AC power supply 1→reactor 2a→diode 5a→switch element 5c→diode 6a→smoothing capacitor 4→diode 6d→diode 8c→switch element 8a→reactor 2b→AC power supply 1. Since voltage of the AC power supply 1 is higher than voltage Vc1 of the smoothing capacitor 4, AC current iac of the AC power supply 1 increases. During this period, current does not flow through the first DC capacitor 3 and the second DC capacitor 9, and therefore voltage Vc2 and voltage Vc3 do not change.

FIG. 150 is an operation schematic diagram showing the operation state during one switching cycle 2Tsw (two switching cycles of the converter) of the inverters, in the area 3 in the positive half wave of the AC power supply 1 when the operation mode is switched as described above.

In the period from t31 to Tsw, voltages Vc2 and Vc3 become constant, whereby, in the period from 0 to 2Tsw, voltage Vc2 decreases and voltage Vc3 becomes constant. That is, it is possible to decrease voltage Vc2 and make voltage Vc3 constant without changing the increase/decrease characteristic of AC current iac.

In the case of increasing only voltage Vc3 in the period from 0 to 2Tsw, the switch element 8d is kept being OFF at time Tsw in FIG. 141, to switch the operation mode in the period from Tsw to t32, from mode 8 to mode 9.

The current route in the mode 9 is as described in FIG. 143, that is, the route is as follows: AC power supply 1→reactor 2a→diode 5a→switch element 5c→diode 6a→smoothing capacitor 4→diode 6d→diode 8c→switch element 8a→reactor 2b→AC power supply 1. Since voltage of the AC power supply 1 is higher than voltage Vc1 of the smoothing capacitor 4, AC current iac of the AC power supply 1 increases. During this period, current does not flow through the first DC capacitor 3 and the second DC capacitor 9, and therefore voltage Vc2 and voltage Vc3 do not change.

FIG. 151 is an operation schematic diagram showing the operation state during one switching cycle 2Tsw (two switching cycles of the converter) of the inverters, in the area 3 in the positive half wave of the AC power supply 1 when the operation mode is switched as described above.

In the period from t31 to Tsw, voltages Vc2 and Vc3 become constant, whereby, in the period from 0 to 2Tsw, voltage Vc2 becomes constant and voltage Vc3 increases. That is, it is possible to make voltage Vc2 constant and increase voltage Vc3 without changing the increase/decrease characteristic of AC current iac.

In the case of decreasing only voltage Vc3 in the period from 0 to 2Tsw, the switch element 8a is turned ON at time t32 in FIG. 141, to switch the operation mode in the period from t32 to 2Tsw, from mode 1 to mode 9.

The current route in the mode 9 is as described in FIG. 143, that is, the route is as follows: AC power supply 1→reactor 2a→diode 5a→switch element 5c→diode 6a→smoothing capacitor 4→diode 6d→diode 8c→switch element 8a→reactor 2b→AC power supply 1. Since voltage of the AC power supply 1 is higher than voltage Vc1 of the smoothing capacitor 4, AC current iac of the AC power supply 1 increases. During this period, current does not flow through the first DC capacitor 3 and the second DC capacitor 9, and therefore voltage Vc2 and voltage Vc3 do not change.

FIG. 152 is an operation schematic diagram showing the operation state during one switching cycle 2Tsw (two switching cycles of the converter) of the inverters, in the area 3 in the positive half wave of the AC power supply 1 when the operation mode is switched as described above.

In the period from t31 to Tsw, voltages Vc2 and Vc3 become constant, whereby, in the period from 0 to 2Tsw, voltage Vc2 becomes constant and voltage Vc3 decreases. That is, it is possible to make voltage Vc2 constant and decrease voltage Vc3 without changing the increase/decrease characteristic of AC current iac.

FIG. 153 is an operation schematic diagram showing the operation state during one switching cycle 2Tsw (two switching cycles of the converter) of the inverters, in the area 1 in the negative half wave of the AC power supply 1. It is noted that these operation waveforms are the same as those described in FIG. 62 in the above embodiment 2, and the description thereof will not be repeated.

In FIG. 153, first, the control principle for voltage Vc2 of the first DC capacitor 3 in the single-phase inverter 300 will be described. In the period from 0 to Tsw, the first DC capacitor 3 is discharged during the period from t11 to t12 and therefore voltage Vc2 decreases, and the first DC capacitor 3 is charged during the period from t13 to Tsw and therefore voltage Vc2 increases.

The increase/decrease of voltage Vc2 is considered in terms of a total amount in the period from 0 to Tsw. It is noted that the control axes are t11 (first control axis) and t13 (second control axis), and in the present embodiment 4, one of t11 and t13 is selected to adjust increase/decrease.

In the case of selecting and increasing t11, iac increases and Vc2 increases.

In the case of selecting and decreasing t11, iac decreases and Vc2 decreases.

In the case of selecting and increasing t13, iac increases and Vc2 decreases.

In the case of selecting and decreasing t13, iac decreases and Vc2 increases.

Therefore, on the basis of the AC current increase/decrease command for AC current iac and the first DC capacitor voltage increase/decrease command for first DC capacitor voltage Vc2, one of the first control axis t11 and the second control axis t13 is selected to be increased/decreased in accordance with the above four operation patterns, whereby the first DC capacitor voltage Vc2 can be controlled to be constant.

It is noted that the control axes to be selected in this control and the increase/decrease characteristics of the control axes are the same as in the case of the area 1 in the positive half wave of the AC power supply 1, but the switch elements to be selected are different.

In the case of adjusting t11:

(1) In the case of the area 1 in the positive half wave of the AC power supply 1, in FIG. 139, the ON periods of the switch element 5b and the switch element 6b are adjusted.

(2) In the case of the area 1 in the negative half wave of the AC power supply 1, in FIG. 153, the ON periods of the switch element 5d and the switch element 6d are adjusted.

In the case of adjusting t13:

(1) In the case of the area 1 in the positive half wave of the AC power supply 1, in FIG. 139, the ON period of the switch element 5c is adjusted.

(2) In the case of the area 1 in the negative half wave of the AC power supply 1, in FIG. 153, the ON period of the switch element 5a is adjusted.

Similarly, the control principle for the second DC capacitor voltage Vc3 of the single-phase inverter 400 will be described with reference to FIG. 153. In the period from Tsw to 2Tsw, the second DC capacitor 9 is discharged during the period from t14 to t15 and therefore voltage Vc3 decreases, and the second DC capacitor 9 is charged during the period from t16 to 2Tsw and therefore voltage Vc3 increases.

The increase/decrease of voltage Vc3 is considered in terms of a total amount in the period from Tsw to 2Tsw. It is noted that the control axes are t14 (third control axis) and t16 (fourth control axis), and one of t14 and t16 is selected to adjust increase/decrease.

In the case of selecting and increasing t14, iac increases and Vc3 increases.

In the case of selecting and decreasing t14, iac decreases and Vc3 decreases.

In the case of selecting and increasing t16, iac increases and Vc3 decreases.

In the case of selecting and decreasing t16, iac decreases and Vc3 increases.

Therefore, on the basis of the AC current increase/decrease command for AC current iac and the second DC capacitor voltage increase/decrease command for second DC capacitor voltage Vc3, one of the third control axis t14 and the fourth control axis t16 is selected to be increased/decreased in accordance with the above four operation patterns, whereby the second DC capacitor voltage Vc3 can be controlled to be constant.

It is noted that the control axes to be selected in this control and the increase/decrease characteristics of the control axes are the same as in the case of the area 1 in the positive half wave of the AC power supply 1, but the switch elements to be selected are different.

In the case of adjusting t14:

(1) In the case of the area 1 in the positive half wave of the AC power supply 1, in FIG. 139, the ON periods of the switch element 8d and the switch element 6b are adjusted.

(2) In the case of the area 1 in the negative half wave of the AC power supply 1, in FIG. 153, the ON periods of the switch element 8b and the switch element 6d are adjusted.

In the case of adjusting t16:

(1) In the case of the area 1 in the positive half wave of the AC power supply 1, in FIG. 139, the ON period of the switch element 8a is adjusted.

(2) In the case of the area 1 in the negative half wave of the AC power supply 1, in FIG. 153, the ON period of the switch element 8c is adjusted.

Next, FIG. 154 is an operation schematic diagram showing the operation state during one switching cycle 2Tsw (two switching cycles of the converter) of the inverters, in the area 2 in the negative half wave of the AC power supply 1. It is noted that these operation waveforms are the same as those described in FIG. 71 in the above embodiment 2, and the description thereof will not be repeated.

In FIG. 154, first, the control principle for voltage Vc2 of the first DC capacitor 3 in the single-phase inverter 300 will be described. In the period from 0 to Tsw, the first DC capacitor 3 of the single-phase inverter 300 is charged during the period from 0 to t21 and therefore voltage Vc2 increases, and the first DC capacitor 3 is discharged during the period from t22 to t23 and therefore voltage Vc2 decreases. The increase/decrease of voltage Vc2 is considered in terms of a total amount in the period from 0 to Tsw. It is noted that the control axes are t21 (first control axis) and t23 (second control axis), and in the present embodiment 4, one of t21 and t23 is selected to adjust increase/decrease.

In the case of selecting and increasing t21, iac increases and Vc2 increases.

In the case of selecting and decreasing t21, iac decreases and Vc2 decreases.

In the case of selecting and increasing t23, iac increases and Vc2 decreases.

In the case of selecting and decreasing t23, iac decreases and Vc2 increases.

Therefore, as in the case of the area 1 above, on the basis of the AC current increase/decrease command for AC current iac and the first DC capacitor voltage increase/decrease command for first DC capacitor voltage Vc2, one of the first control axis t21 and the second control axis t23 is selected to be increased/decreased in accordance with the above four operation patterns, whereby the first DC capacitor voltage Vc2 can be controlled to be constant.

It is noted that the control axes to be selected in this control and the increase/decrease characteristics of the control axes are the same as in the case of the area 2 in the positive half wave of the AC power supply 1, but the switch elements to be selected are different.

In the case of adjusting t21:

(1) In the case of the area 2 in the positive half wave of the AC power supply 1, in FIG. 140, the ON periods of the switch element 5c and the switch element 6b are adjusted.

(2) In the case of the area 2 in the negative half wave of the AC power supply 1, in FIG. 154, the ON periods of the switch element 5a and the switch element 6d are adjusted.

In the case of selecting t23:

(1) In the case of the area 2 in the positive half wave of the AC power supply 1, in FIG. 140, the ON period of the switch element 5b is adjusted.

(2) In the case of the area 2 in the negative half wave of the AC power supply 1, in FIG. 154, the ON period of the switch element 5d is adjusted.

Similarly, the control principle for voltage Vc3 of the second DC capacitor of the single-phase inverter 400 will be described with reference to FIG. 154. In the period from Tsw to 2Tsw, the second DC capacitor 9 is charged during the period from Tsw to t24 and therefore voltage Vc3 increases, and the second DC capacitor 9 is discharged during the period from t25 to t26 and therefore voltage Vc3 decreases. The increase/decrease of voltage Vc3 is considered in terms of a total amount in the period from Tsw to 2Tsw. It is noted that the control axes are t24 (third control axis) and t26 (fourth control axis), and one of t24 and t26 is selected to adjust increase/decrease.

In the case of selecting and increasing t24, iac increases and Vc3 increases.

In the case of selecting and decreasing t24, iac decreases and Vc3 decreases.

In the case of selecting and increasing t26, iac increases and Vc3 decreases.

In the case of selecting and decreasing t26, iac decreases and Vc3 increases.

Therefore, on the basis of the AC current increase/decrease command for AC current iac and the second DC capacitor voltage increase/decrease command for second DC capacitor voltage Vc3, one of the third control axis t24 and the fourth control axis t26 is selected to be increased/decreased in accordance with the above four operation patterns, whereby the second DC capacitor voltage Vc3 can be controlled to be constant.

It is noted that the control axes to be selected in this control and the increase/decrease characteristics of the control axes are the same as in the case of the area 2 in the positive half wave of the AC power supply 1, but the switch elements to be selected are different.

In the case of adjusting t24:

(1) In the case of the area 2 in the positive half wave of the AC power supply 1, in FIG. 140, the ON periods of the switch element 8a and the switch element 6b are adjusted.

(2) In the case of the area 2 in the negative half wave of the AC power supply 1, in FIG. 154, the ON periods of the switch element 8c and the switch element 6d are adjusted.

In the case of selecting t26:

(1) In the case of the area 2 in the positive half wave of the AC power supply 1, in FIG. 140, the ON period of the switch element 8d is adjusted.

(2) In the case of the area 2 in the negative half wave of the AC power supply 1, in FIG. 154, the ON period of the switch element 8b is adjusted.

Next, FIG. 155 is an operation schematic diagram showing the operation state during one switching cycle 2Tsw (two switching cycles of the converter) of the inverters, in the area 3 in the negative half wave of the AC power supply 1. It is noted that these operation waveforms are the same as those described in FIG. 80 in the above embodiment 2, and the description thereof will not be repeated.

In FIG. 155, the control principle for voltage Vc2 of the first DC capacitor 3 in the single-phase inverter 300 and voltage Vc3 of the second DC capacitor 9 in the single-phase inverter 400 will be described. As in the case of the positive half wave of the AC power supply 1, voltages Vc2 and Vc3 are controlled at the same time.

In the period from 0 to t31, the first DC capacitor 3 of the single-phase inverter 300 is discharged and therefore voltage Vc2 decreases, and in the period from t31 to Tsw, the first DC capacitor 3 of the single-phase inverter 300 is charged and therefore voltage Vc2 increases. Next, in the period from Tsw to t32, the second DC capacitor 9 of the single-phase inverter 400 is discharged and therefore voltage Vc3 decreases, and in the period from t32 to 2Tsw, the second DC capacitor 9 of the single-phase inverter 400 is charged and therefore voltage Vc3 increases. The increase/decrease of voltages Vc2 and Vc3 is considered in terms of a total amount in the period from 0 to 2Tsw.

In the area 3, as described above in the operation in the area 3 of the positive half wave, on the basis of the increase/decrease command for AC current iac, the increase/decrease command for first DC capacitor voltage Vc2, and the increase/decrease command for second DC capacitor voltage Vc3, the switch elements 5a to 5d composing the single-phase inverter 300 and the switch elements 8a to 8d composing the single-phase inverter 400 are newly caused to perform switching at time 0, time t31, time Tsw, and time t32 in FIG. 155, so as to generate operation modes for new current routes and unbalance the charging/discharging amounts of the DC capacitors of the single-phase inverter 300 and the single-phase inverter 400, whereby voltages Vc2 and Vc3 are controlled to be constant.

FIG. 156 shows the manner of switching of the b operation mode in accordance with the increase/decrease command for voltage Vc2 and the increase/decrease command for voltage Vc3.

As shown in the left columns on the table, there are a total of eight cases according to three types of each increase/decrease command, i.e., increase, decrease, and no increase/decrease.

On the top row of the table, operation modes determined depending on the ON/OFF states of the switch elements shown in FIG. 155 are indicated for the respective periods.

Figure 81:
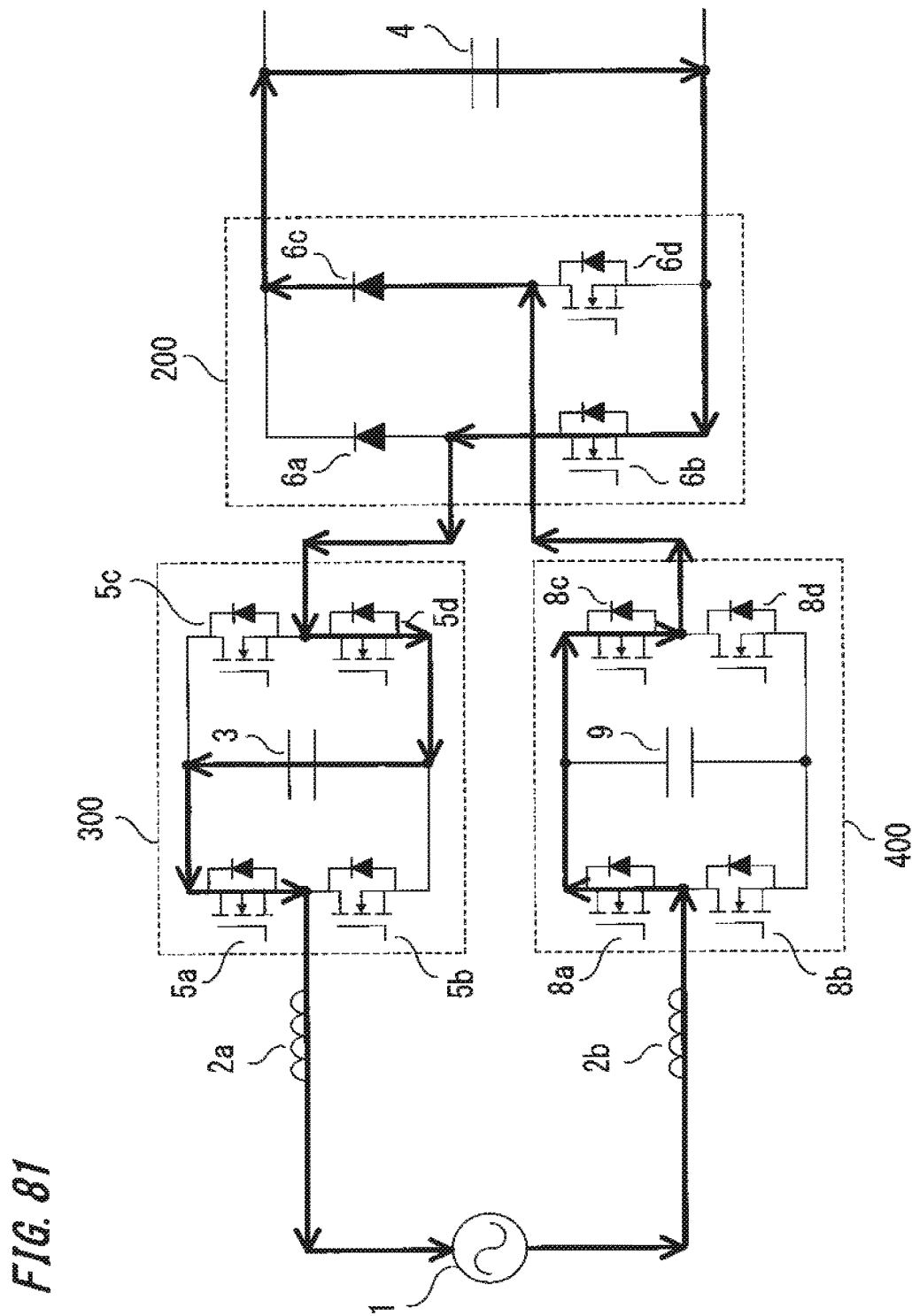
FIG. 81 is a diagram showing a current route in a first period in FIG. 80.

The period from 0 to t31 in FIG. 155 corresponds to mode 7 and the current route is as shown in FIG. 81.

Figure 82:
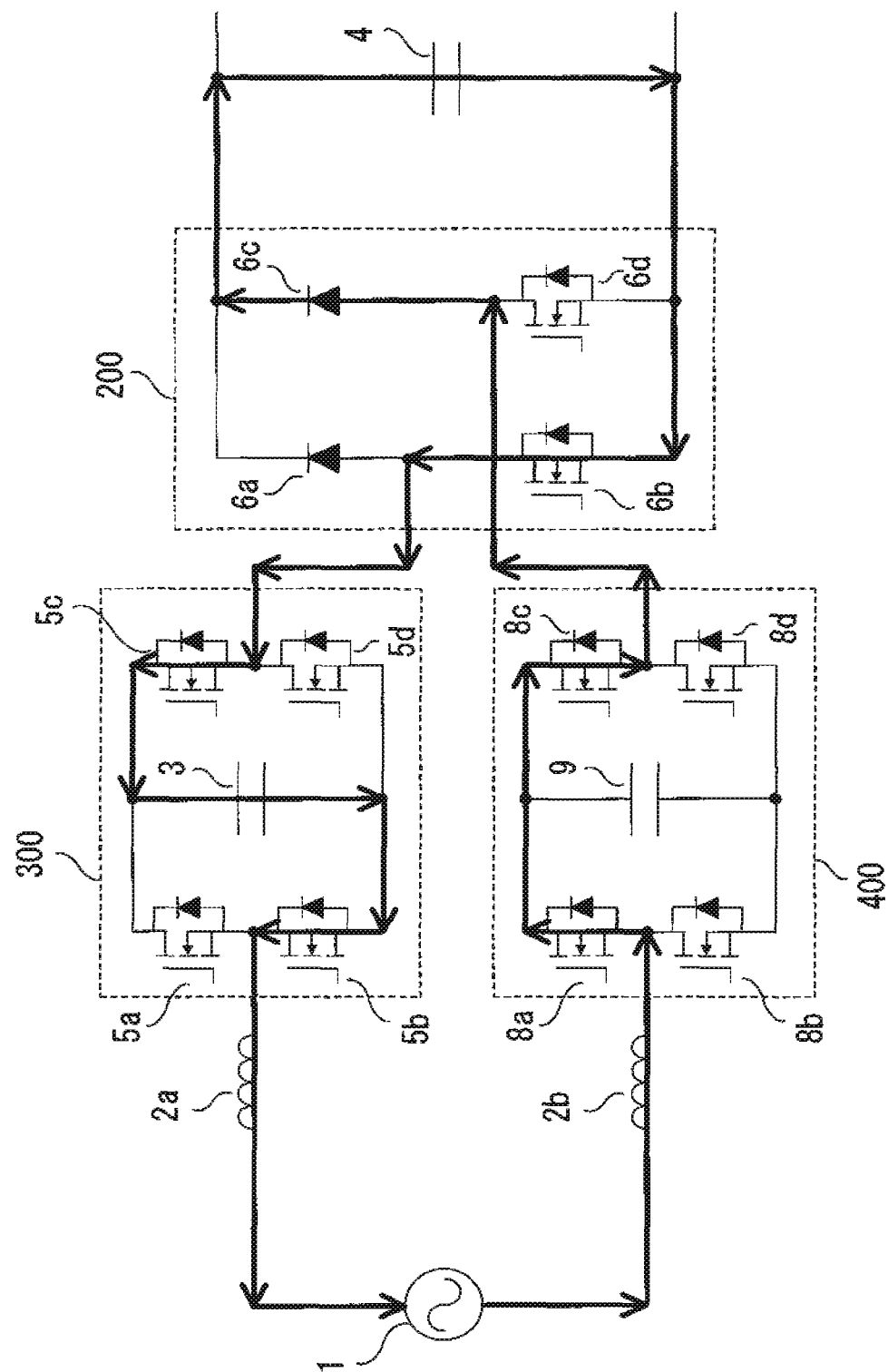
FIG. 82 is a diagram showing a current route in a second period in FIG. 80.

The period from t31 to Tsw in FIG. 155 corresponds to mode 2 and the current route is as shown in FIG. 82.

Figure 83:
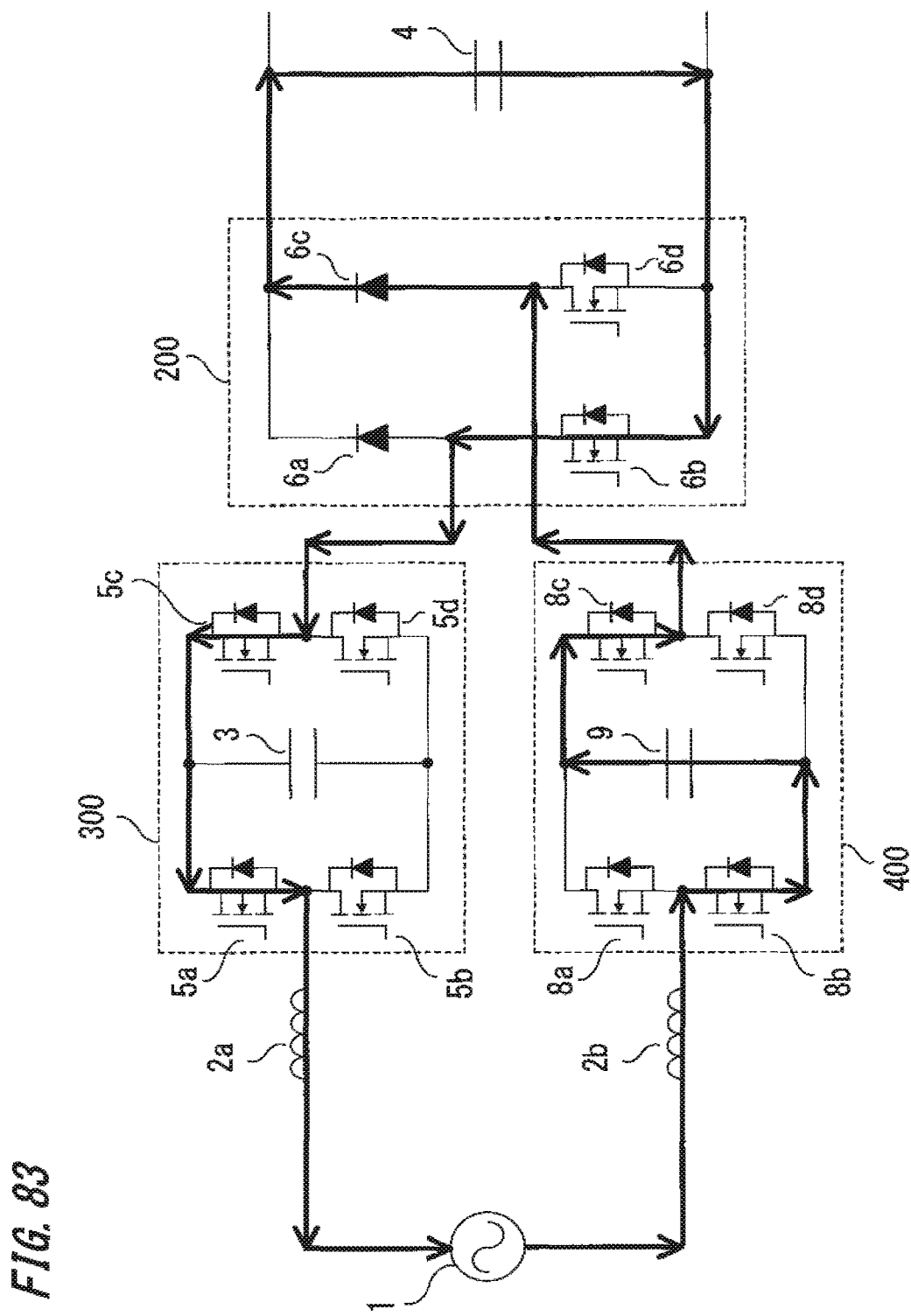
FIG. 83 is a diagram showing a current route in a third period in FIG. 80.

The period from Tsw to t32 in FIG. 155 corresponds to mode 8 and the current route is as shown in FIG. 83.

Figure 84:
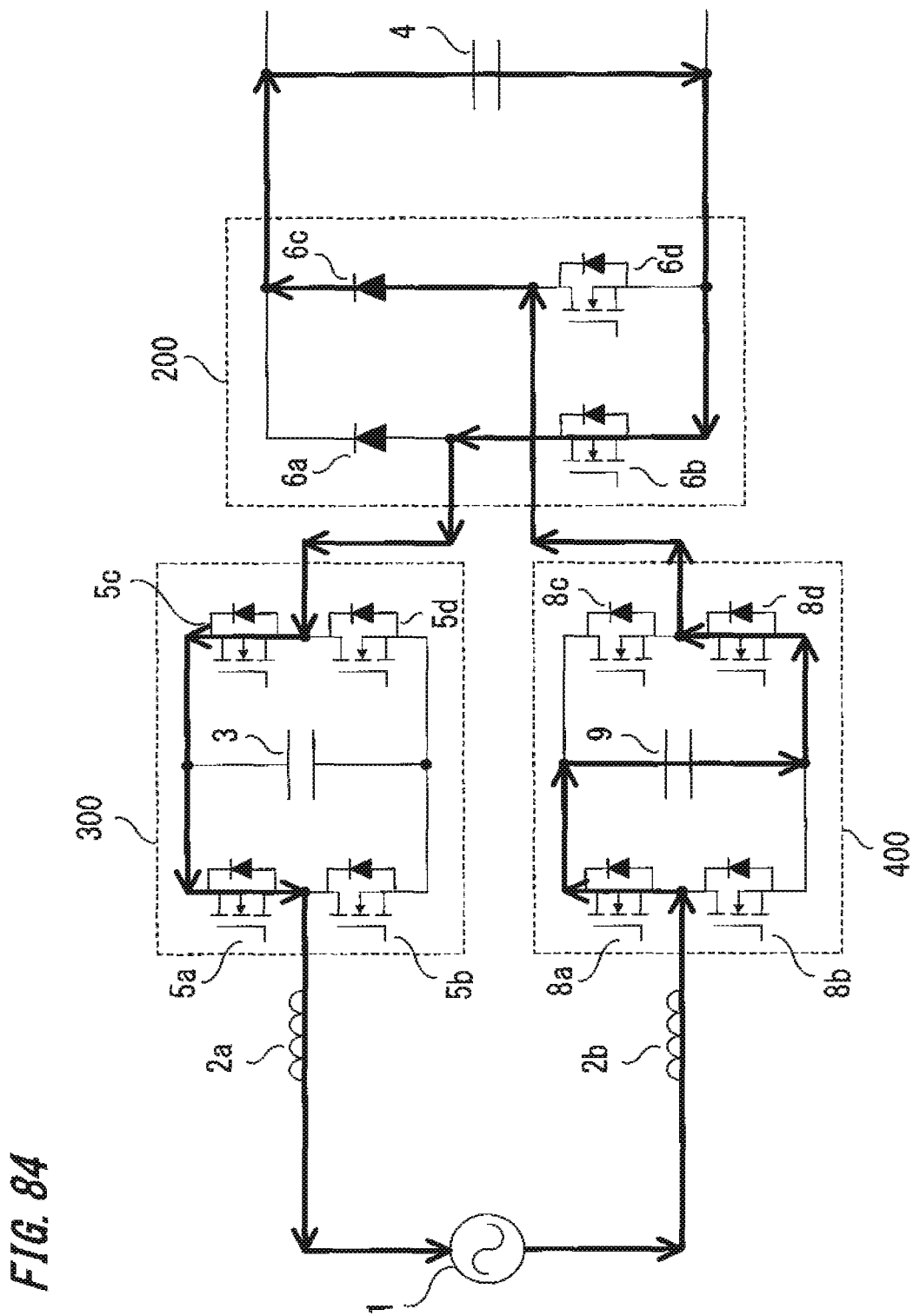
FIG. 84 is a diagram showing a current route in a fourth period in FIG. 80.

The period from t32 to 2Tsw in FIG. 155 corresponds to mode 1 and the current route is as shown in FIG. 84.

Next, the manner of switching the mode will be described for each case of the increase/decrease commands for voltages Vc2 and Vc3.

In the case of increasing both voltages Vc2 and Vc3 in the period from 0 to 2Tsw, the switch element 5d is turned OFF instead of ON at time 0 in FIG. 155, to switch the operation mode in the period from 0 to t31, from mode 7 to mode 9. In addition, the switch element 8b is turned OFF instead of ON at time Tsw, to switch the operation mode in the period from Tsw to t32, from mode 8 to mode 9.

FIG. 157 shows the current route in the mode 9. The route is as follows: AC power supply 1→reactor 2b→diode 8a→switch element 8c→diode 6c→smoothing capacitor 4→diode 6b→diode 5c→switch element 5a→reactor 2a→AC power supply 1. Since voltage of the AC power supply 1 is higher than voltage Vc1 of the smoothing capacitor 4, current iac of the AC power supply 1 increases. During this period, current does not flow through the first DC capacitor 3 and the second DC capacitor 9, and therefore voltage Vc2 and voltage Vc3 become constant.

FIG. 158 is an operation schematic diagram showing the operation state during one switching cycle 2Tsw (two switching cycles of the converter) of the inverters, in the area 3 in the negative half wave of the AC power supply 1 when the operation mode is switched as described above. In the period from 0 to t31, voltage Vc2 is switched not to be increased or decreased, whereby voltage Vc2 increases in the period from 0 to 2Tsw. Similarly, in the period from Tsw to t32, voltage Vc3 is switched not to be increased or decreased, whereby voltage Vc3 increases in the period from 0 to 2Tsw. That is, it is possible to increase voltages Vc2 and Vc3 without changing the increase/decrease characteristic of AC current iac.

Next, in the case of increasing voltage Vc2 and decreasing voltage Vc3 in the period from 0 to 2Tsw, the switch element 8d is turned OFF instead of ON at time 0 in FIG. 155 and the switch element 8b is turned ON in the period from 0 to t31, to switch the operation mode in the period from 0 to t31, from mode 7 to mode 8.

The current route in the mode 8 is as described in FIG. 83 in embodiment 2, that is, the route is as follows: AC power supply 1→reactor 2b→switch element 8b→DC capacitor 9→switch element 8c→diode 6c→smoothing capacitor 4→diode 6b→diode 5c→switch element 5a→reactor 2a→AC power supply 1. Since the sum of voltage of the AC power supply 1 and voltage Vc3 of the second DC capacitor 9 is higher than voltage Vc1 of the smoothing capacitor 4, AC current iac of the AC power supply 1 increases and this is the same as in the original mode 7. During this period, current does not flow through the first DC capacitor 3 and therefore voltage Vc2 is constant, but current flows through the second DC capacitor 9 in a discharging direction, so that voltage Vc3 decreases.

FIG. 159 is an operation schematic diagram showing the operation state during the one switching cycle 2Tsw (two switching cycles of the converter) of the inverters, in the area 3 in the negative half wave of the AC power supply 1 when the operation mode is switched as described above.

In the period from 0 to t31, voltage Vc2 is switched not to be increased or decreased and voltage Vc3 is switched to be decreased, whereby, in the period from 0 to 2Tsw, voltage Vc2 increases and voltage Vc3 decreases. That is, it is possible to increase voltage Vc2 and decrease voltage Vc3 without changing the increase/decrease characteristic of the AC current iac.

Next, in the case of decreasing voltage Vc2 and increasing voltage Vc3 in the period from 0 to 2Tsw, the switch element 5d is turned ON in the period from Tsw to t32 in FIG. 155 and the switch element 8b is turned OFF instead of ON at time Tsw, to switch the operation mode in the period from Tsw to t32, from mode 8 to mode 7.

The current route in mode 7 is as described in FIG. 81 in embodiment 2, that is, the route is as follows: AC power supply 1→reactor 2b→diode 8a→switch element 8c→diode 6c→smoothing capacitor 4→diode 6b→switch element 5d→DC capacitor 3→switch element 5a→reactor 2a→AC power supply 1. Since the sum of AC voltage of the AC power supply 1 and voltage Vc2 of the first DC capacitor 3 is higher than voltage Vc1 of the smoothing capacitor 4, AC current iac of the AC power supply 1 increases. During this period, current flows through the first DC capacitor 3 in a discharging direction, so that voltage Vc2 decreases. On the other hand, current does not flow through the second DC capacitor 9 and therefore voltage Vc3 is constant.

FIG. 160 is an operation schematic diagram showing the operation state during one switching cycle 2Tsw (two switching cycles of the converter) of the inverters, in the area 3 in the negative half wave of the AC power supply 1 when the operation mode is switched as described above.

In the period from Tsw to t32, voltage Vc2 is switched to be decreased and voltage Vc3 is switched not to be increased or decreased, whereby, in the period from 0 to 2Tsw, voltage Vc2 decreases and voltage Vc3 increases. That is, it is possible to decrease voltage Vc2 and increase voltage Vc3 without changing the increase/decrease characteristic of AC current iac.

In the case of decreasing both voltages Vc2 and Vc3 in the period from 0 to 2Tsw, the switch element 8b is turned ON in the period from 0 to t31 in FIG. 155, to switch the operation mode in the period from 0 to t31, from mode 7 to mode 6. In addition, the switch element 5d is turned ON in the period from Tsw to t32, to switch the operation mode in the period from Tsw to t32, from mode 8 to mode 6.

FIG. 161 shows the current route in the mode 6. The route is as follows: AC power supply 1→reactor 2b→switch element 8b→DC capacitor 9→switch element 8c→diode 6c→smoothing capacitor 4→diode 6b→switch element 5d→DC capacitor 3→switch element 5a→reactor 5b→AC power supply 1. Since the sum of AC voltage of the AC power supply 1 and voltages Vc2 and Vc3 is higher than voltage Vc1 of the smoothing capacitor 4, AC current iac of the AC power supply 1 increases. During this period, current flows through the first DC capacitor 3 and the second DC capacitor 9 in a discharging direction, and therefore voltage Vc2 and voltage Vc3 decrease.

FIG. 162 is an operation schematic diagram showing the operation state during one switching cycle 2Tsw (two switching cycles of the converter) of the inverters, in the area 3 in the negative half wave of the AC power supply 1 when the operation mode is switched as described above. In the period from 0 to t31, voltages Vc2 and Vc3 are both decreased, and also in the period from Tsw to t32, voltages Vc2 and Vc3 are both decreased, whereby voltages Vc2 and Vc3 are both decreased in the period from 0 to 2Tsw. That is, it is possible to decrease voltages Vc2 and Vc3 without changing the increase/decrease characteristic of AC current iac.

In the case of increasing only voltage Vc2 in the period from 0 to 2Tsw, the switch element 5d is turned OFF instead of ON at time 0 in FIG. 155, to switch the operation mode in the period from 0 to t31, from mode 7 to mode 9.

The current route in mode 9 is as shown in FIG. 157, that is, the current route is as follows: AC power supply 1→reactor 2b→diode 8a→switch element 8c→diode 6c→smoothing capacitor 4→diode 6b→diode 5c→switch element 5a→reactor 2a→AC power supply 1. Since voltage of the AC power supply 1 is higher than voltage Vc1 of the smoothing capacitor 4, AC current iac of the AC power supply 1 increases. During this period, current does not flow through the first DC capacitor 3 and the second DC capacitor 9, and therefore voltage Vc2 and voltage Vc3 become constant.

FIG. 163 is an operation schematic diagram showing the operation state during one switching cycle 2Tsw (two switching cycles of the converter) of the inverters, in the area 3 in the negative half wave of the AC power supply 1 when the operation mode is switched as described above.

In the period from 0 to t31, voltages Vc2 and Vc3 become constant, whereby, in the period from 0 to 2Tsw, voltage Vc2 increases and voltage Vc3 becomes constant. That is, it is possible to increase voltage Vc2 and make voltage Vc3 constant without changing the increase/decrease characteristic of AC current iac.

In the case of decreasing only voltage Vc2 in the period from 0 to 2Tsw, the switch element 5a is turned ON instead of OFF at time t31 in FIG. 155, to switch the operation mode in the period from t31 to Tsw, from mode 2 to mode 9.

The current route in the mode 9 is as shown in FIG. 157. That is, the current route is as follows: AC power supply 1→reactor 2b→diode 8a→switch element 8c→diode 6c→smoothing capacitor 4→diode 6b→diode 5c→switch element 5a→reactor 2a→AC power supply 1. Since voltage of the AC power supply 1 is higher than voltage Vc1 of the smoothing capacitor 4, AC current iac of the AC power supply 1 increases. During this period, current does not flow through the first DC capacitor 3 and the second DC capacitor 9, and therefore voltage Vc2 and voltage Vc3 become constant.

FIG. 164 is an operation schematic diagram showing the operation state during one switching cycle 2Tsw (two switching cycles of the converter) of the inverters, in the area 3 in the negative half wave of the AC power supply 1 when the operation mode is switched as described above.

In the period from t31 to Tsw, voltages Vc2 and Vc3 becomes constant, whereby, in the period from 0 to 2Tsw, voltage Vc2 decreases and voltage Vc3 becomes constant. That is, it is possible to decrease voltage Vc2 and make voltage Vc3 constant without changing the increase/decrease characteristic of AC current iac.

In the case of increasing only voltage Vc3 in the period from 0 to 2Tsw, the switch element 8b is turned OFF instead of ON at time Tsw in FIG. 155, to switch the operation mode in the period from Tsw to t32, from mode 8 to mode 9.

The current route in the mode 9 is as shown in FIG. 157, that is, the current route is as follows: AC power supply 1→reactor 2b→diode 8a→switch element 8c→diode 6c→smoothing capacitor 4→diode 6b→diode 5c→switch element 5a→reactor 2a→AC power supply 1. Since voltage of the AC power supply 1 is higher than voltage Vc1 of the smoothing capacitor 4, current iac of the AC power supply 1 increases. During this period, current does not flow through the first DC capacitor 3 and the second DC capacitor 9, and therefore voltage Vc2 and voltage Vc3 become constant.

FIG. 165 is an operation schematic diagram showing the operation state during one switching cycle 2Tsw (two switching cycles of the converter) of the inverters, in the area 3 in the negative half wave of the AC power supply 1 when the operation mode is switched as described above.

In the period from Tsw to t32, voltages Vc2 and Vc3 become constant, whereby, in the period from 0 to 2Tsw, voltage Vc2 becomes constant and voltage Vc3 increases. That is, it is possible to make voltage Vc2 constant and increase voltage Vc3 without changing the increase/decrease characteristic of AC current iac.

In the case of decreasing only voltage Vc3 in the period from 0 to 2Tsw, the switch element 8c is turned ON instead of OFF at time t32 in FIG. 155, to switch the operation mode in the period from t32 to 2Tsw, from mode 1 to mode 9.

The current route in the mode 9 is as shown in FIG. 157, that is, the current route is as follows: AC power supply 1→reactor 2b→diode 8a→switch element 8c→diode 6c→smoothing capacitor 4→diode 6b→diode 5c→switch element 5a→reactor 2a→AC power supply 1. Since voltage of the AC power supply 1 is higher than voltage Vc1 of the smoothing capacitor 4, AC current iac of the AC power supply 1 increases. During this period, current does not flow through the first DC capacitor 3 and the second DC capacitor 9, and therefore voltage Vc2 and voltage Vc3 become constant.

FIG. 166 is an operation schematic diagram showing the operation state during one switching cycle 2Tsw (two switching cycles of the converter) of the inverters, in the area 3 in the negative halt wave of the AC power supply 1 when the operation mode is switched as described above.

In the period from t32 to Tsw, voltages Vc2 and Vc3 become constant, whereby, in the period from 0 to 2Tsw, voltage Vc2 becomes constant and voltage Vc3 decreases. That is, it is possible to make voltage Vc2 constant and decrease voltage Vc3 without changing the increase/decrease characteristic of AC current iac.

As described above, among a total of six conditions of the area 1, area 2, and the area 3 in the positive half wave of the AC power supply 1 and the area 1, the area 2, and the area 3 in the negative half wave of the AC power supply 1, in a total of four conditions regarding the area 1 and the area 2 (area A), control is performed such that the control axes for which the feedback duty DFB is reflected are appropriately selected from the plurality of control axes that can be taken, thereby keeping DC voltage Vc1 constant and keeping voltages Vc2 and Vc3 of the DC capacitors 3, 9 constant.

In a total of two conditions regarding the area 3 (area B), in order to ensure that DC voltage Vc1 is constant, the feedback duty DFB is reflected for the control axes, and the operation mode determined in accordance with the ON/OFF states of the switch elements in each period which is determined upon the reflection, is switched to a predetermined different mode as appropriate, whereby, without changing the increase/decrease characteristic of AC current iac corresponding to the DFB, and thus, while DC voltage Vc1 is kept constant, the first DC capacitor voltage Vc2 and the second DC capacitor voltage Vc3 are controlled to be kept constant.

Next, FIG. 167 shows the configuration of the control unit 100 serving to generate gate signals for driving the switch elements to perform switching, in order to keep the DC voltages Vc1 to Vc3 constant by the above method.

As shown in FIG. 167, the control unit 100 includes a theoretical duty calculator 110, a feedback duty calculator 120, an adder/subtractor 130, an area-1 gate signal calculator 141, an area-2 gate signal calculator 142, an area-3 gate signal calculator 143, an operation area determiner 150, a gate signal selector 160, a DC capacitor voltage increase/decrease command determiner 180, an area-1/area-2 DC capacitor voltage controller 181, and an area-3 DC capacitor voltage controller 182.

The theoretical duty calculator 110 includes an area-1 theoretical duty calculator 111, an area-2 theoretical duty calculator 112, and an area-3 theoretical duty calculator 113, and calculates theoretical duties using theoretical expressions in the areas 1 to 3.

Each theoretical duty is calculated on the basis of: voltage vac of the AC power supply 1 which is a detection value of the AC voltage detection unit 10, or an ideal voltage value vac* of the AC power supply 1; voltage Vc2 of the first DC capacitor 3 which is a detection value of the first DC capacitor voltage detection unit 12, or a voltage command value vc2* for the first DC capacitor 3; voltage Vc3 of the second DC capacitor 9 which is a detection value of the second DC capacitor voltage detection unit 14, or a voltage command value vc3* for the second DC capacitor 9; and voltage Vc1 of the smoothing capacitor 4 which is a detection value of the DC voltage detection unit 13, and a voltage command value Vc1* for the smoothing capacitor 4. FIG. 167 shows a case of performing the calculation on the basis of the detection values of the respective voltage detection units.

It is noted that, ideally, voltage Vc2 of the first DC capacitor 3 and voltage Vc3 of the second DC capacitor 9 are equal to each other, and therefore the average voltage of these voltages, Vsub=(Vc2+Vc3)/2, may be used.

The feedback duty calculator 120 is configured as shown in FIG. 168, which is the same as that described in FIG. 86 in embodiment 2, and therefore the description thereof will not be repeated.

The DC capacitor voltage increase/decrease command determiner 180 is configured as shown in FIG. 169. The DC capacitor voltage increase/decrease command determiner 180 calculates a deviation between voltage Vc2 and a voltage command value Vc2* by a comparator, and outputs the deviation as a first DC capacitor voltage increase/decrease command $\Delta Vc2$. In addition, the DC capacitor voltage increase/decrease command determiner 180 calculates a deviation between voltage Vc3 and a voltage command value Vc3* by a comparator, and outputs the deviation as a second DC capacitor voltage increase/decrease command $\Delta Vc3$.

For convenience sake, first, the control operation in the area 3 will be described below.

Only in the area 3, the adder/subtractor 130 adds or subtracts the feedback duty DFB to or from the calculation results of the area-3 theoretical duty calculator 113. Since control is performed in such a direction as to increase AC current iac of the AC power supply 1 when the DFB increases, the DFB is added to D31, D33 by the adder 135, and the DFB is subtracted from D32, D34 by the subtractor 136. The resultant outputs are inputted to the area-3 gate signal calculator 143.

The area-3 gate signal calculator 143, as shown in FIG. 170 which shows the internal configuration thereof, includes four comparators and a carrier signal cararea3, and compares D31+DFB, D32−DFB, D33+DFB, and D34−DFB which are input signals, with the carrier signal cararea3, by the respective comparators, thereby generating a signal g31 for the first period, a signal g32 for the second period, a signal g33 for the third period, and a signal g34 for the fourth period.

The operations described thus far are the same as in the above embodiment 2, but in the present embodiment 4, the subsequent area-3 DC capacitor voltage controller 182 executes switching of the operation mode on the basis of the first DC capacitor voltage increase/decrease command $\Delta Vc2$ and the second DC capacitor voltage increase/decrease command $\Delta Vc3$ as described in detail above.

In the case of $\Delta Vc2<0$ and $\Delta Vc3<0$, i.e., in the case of increasing both voltages Vc2 and Vc3, the switch element 5b is switched OFF instead of ON at time 0, to switch the operation mode in the period from 0 to t31, from mode 7 to mode 9, and the switch element 8d is switched OFF instead of ON at time Tsw, to switch the operation mode in the period from Tsw to t32, from mode 8 to mode 9.

Likewise, to describe briefly, in the case of $\Delta Vc2<0$ and $\Delta Vc3>0$, the switch element 5b is switched OFF instead of ON at time 0, and the switch element 8d is switched ON instead of OFF at time 0.

In the case of $\Delta Vc2>0$ and $\Delta Vc3<0$, the switch element 5b is switched ON instead of OFF at time Tsw, and the switch element 8d is switched OFF instead of ON at time Tsw.

In the case of $\Delta Vc2>0$ and $\Delta Vc3>0$, the switch element 8d is switched ON instead of OFF at time 0, and the switch element 5b is switched ON instead of OFF at time Tsw.

In the case of $\Delta Vc2<0$ and $\Delta Vc3=0$, the switch element 8d is switched ON instead of OFF at time 0.

In the case of $\Delta Vc2>0$ and $\Delta Vc3=0$, the switch element 5c is switched ON instead of OFF at time t31.

In the case of $\Delta Vc2=0$ and $\Delta Vc3<0$, the switch element 8d is switched OFF instead of ON at time Tsw.

In the case of $\Delta Vc2=0$ and $\Delta Vc3>0$, the switch element 8a is switched ON instead of OFF at time t32.

On the basis of a calculation program set in advance so as to execute the above mode switching operations, the area-3 DC capacitor voltage controller 182 switches the operation mode in accordance with the first DC capacitor voltage increase/decrease command $\Delta Vc2$ and the second DC capacitor voltage increase/decrease command $\Delta Vc3$ that are inputted, and outputs the signals G31 to G34 for each period on the basis of the result thereof.

Next, the control operations in the area 1 and the area 2 will be described.

The area-1/area-2 DC capacitor voltage controller 181 receives the theoretical duties D11 to D18 for the area 1, the theoretical duties D21 to D28 for the area 2, the feedback duty DFB, the first DC capacitor voltage increase/decrease command $\Delta Vc2$, and the second DC capacitor voltage increase/decrease command $\Delta Vc3$, and outputs signals M for determining, for each control axis, whether or not to target the control axis for addition/subtraction of the feedback duty DFB, in accordance with the voltage increase/decrease commands $\Delta Vc2$ and $\Delta Vc3$. The signals M are sent to the subsequent area-1 gate signal calculator 141 and area-2 gate signal calculator 142.

Next, the operation of the area-1/area-2 DC capacitor voltage controller 181 will be specifically described with reference to FIG. 171.

First, in FIG. 139 described above for the area 1, the theoretical duties D11 and D12 are involved with the first control axis t11. Similarly, the theoretical duties D13 and D14 are involved with the second control axis t13, the theoretical duties D15 and D16 are involved with the third control axis t14, and the theoretical duties D17 and D18 are involved with the fourth control axis t16.

Therefore, for example, in the case of adding/subtracting the feedback duty DFB for the first control axis t11 and not adding/subtracting the feedback duty DFB for the second control axis t13, it suffices that D11+DFB and D12−DFB are outputted for the first control axis and D13 and D14 are directly outputted for the second control axis.

Theoretical circuits MUX in FIG. 171 output the signals M on the basis of the theory described above. As an example, operation of the theoretical circuits MUX at the uppermost and second stages corresponding to the first control axis will be described below.

In the case where the feedback duty DFB corresponding to an increase/decrease command for AC current iac is plus, i.e., AC current iac is increased, and the first DC capacitor voltage increase/decrease command 1Vc2 is minus, i.e., voltage Vc2 is increased, on the basis of the control principle described above, the theoretical circuit MUX at the uppermost stage selects, of the inputted signals respectively indicating D11+DFB and D11, the former one, and thus outputs M11=D11+DFB, and the theoretical circuit MUX at the second stage selects, of the inputted signals respectively indicating D12−DFB and D12, the former one, and thus outputs M12=D12−DFB.

Also in the case where the feedback duty DFB is minus, i.e., AC current iac is decreased, and the first DC capacitor voltage increase/decrease command $\Delta Vc2$ is plus, i.e., voltage Vc2 is decreased, on the basis of the control principle described above, the theoretical circuit MUX at the uppermost stage selects, of the inputted signals respectively indicating D11| DFB (note that DFB is a minus value) and D11, the former one, and thus outputs M11=D11+DFB, and the theoretical circuit MUX at the second stage selects, of the inputted signals respectively indicating D12−DFB and D12, the former one, and thus outputs M12=D12−DFB.

In the above two cases, i.e., the case of increasing AC current iac and increasing voltage Vc2 and the case of decreasing AC current iac and decreasing voltage Vc2, the theoretical circuits MUX at the third and fourth stages corresponding to the second control axis respectively select and output M13=D13 and M14=D14 on the basis of the control principle described above.

Thus, in the above two cases, the first control axis, instead of the second control axis, is set as a target for which the feedback duty DFB is to be added/subtracted, whereby control for making both voltages Vc1 and Vc2 constant is achieved.

Unlike the above two cases, in the case of increasing AC current iac and decreasing voltage Vc2 and the case of decreasing AC current iac and increasing voltage Vc2, on the basis of the above control principle again, the theoretical circuit MUX at the uppermost stage selects, of the inputted signals respectively indicating D11+DFB and D11, the latter one, and thus outputs M11=D11, and the theoretical circuit MUX at the second stage selects, of the inputted signals respectively indicating D12−DFB and D12, the latter one, and thus outputs M12=D12. In addition, the theoretical circuits MUX at the third and fourth stages respectively select and output M13=D13+DFB and M14=D14−DFB.

Thus, in the above two cases where increase/decrease of AC current iac and increase/decrease of voltage Vc2 are opposite to each other, the second control axis, instead of the first control axis, is set as a target for which the feedback duty DFB is to be added/subtracted, whereby control for making both voltages Vc1 and Vc2 constant is achieved as in the previously-described case.

The other operations of the area-1/area-2 DC capacitor voltage controller 181, i.e., operation of making voltages Vc1 and Vc3 constant in the area 1, operation of making voltages Vc1 and Vc2 constant in the area 2, and operation of making voltages Vc1 and Vc3 constant in the area 2, are performed on the basis of exactly the same operation principle as in the above-described operation of making voltages Vc1 and Vc2 constant in the area 1. Therefore, the individual descriptions thereof are omitted.

The area-1 gate signal calculator 141 includes eight comparators and a carrier signal cararea1, and compares M11, M12, M13, M14, M15, M16, M17, and M18 which are input signals, with the carrier signal cararea1, by the respective comparators, thereby generating a signal G11 for the first period, a signal G12 for the second period, a signal G13 for the third period, a signal G14 for the fourth period, a signal G15 for the fifth period, a signal G16 for the sixth period, a signal G17 for the seventh period, and a signal G18 for the eighth period.

The area-2 gate signal calculator 142 includes eight comparators and a carrier signal cararea2, and compares M21, M22, M23, M24, M25, M26, M27, and M28 which are input signals, with the carrier signal cararea2, by the respective comparators, thereby generating a signal G21 for the first period, a signal G22 for the second period, a signal G23 for the third period, a signal G24 for the fourth period, a signal G25 for the fifth period, a signal G26 for the sixth period, a signal G27 for the seventh period, and a signal G28 for the eighth period.

Returning to FIG. 167, the operation area determiner 150 performs magnitude comparison among the voltage detection value vac of the AC power supply 1, the voltage detection value Vc2 of the first DC capacitor 3 or the voltage detection value Vc3 of the second DC capacitor 9, and the voltage detection value Vc1 of the smoothing capacitor 4, performs determination as to the areas 1 to 3, and calculates an area signal sigarea.

Instead of the voltage detection value Vc2 of the first DC capacitor 3 or voltage Vc3 of the second DC capacitor 9, the voltage command value Vc2*, Vc3* may be used, or the DC capacitor average voltage Vsub may be used.

The gate signal selector 160 allocates outputs of the area-1 gate signal calculator 141, the area-2 gate signal calculator 142, and the area-3 DC capacitor voltage controller 182 to the switch elements, using the area signal sigarea outputted from the operation area determiner 150.

As described above, the control unit 100 of the power conversion device in embodiment 4 of the present invention includes: the area-1/area-2 DC capacitor voltage controller 181 which selects the control axes for which the feedback duty DFB is reflected, on the basis of the feedback duty DFB, the first DC capacitor voltage increase/decrease command $\Delta Vc2$, and the second DC capacitor voltage increase/decrease command $\Delta Vc3$, in the areas 1 and 2 (area A); and the area-3 DC capacitor voltage controller 182 which switches the operation mode without changing the AC current increase/decrease characteristic, on the basis of the first DC capacitor voltage increase/decrease command $\Delta Vc2$ and the second DC capacitor voltage increase/decrease command $\Delta Vc3$, in the area 3 (area B). Thus, it is possible to achieve control for keeping DC voltage Vc1 constant and keeping first DC capacitor voltage Vc2 and second DC capacitor voltage Vc3 constant.

It is noted that, within the scope of the present invention, the above embodiments may be freely combined with each other, or each of the above embodiments may be modified or simplified as appropriate.

The invention claimed is:

1. A power conversion device which has a reactor, an inverter, and a converter, and which performs power conversion between an AC voltage of an AC power supply and a DC voltage of a smoothing capacitor, wherein
the inverter includes inverter AC terminals, a DC capacitor, and switch elements, and switches a voltage level between the inverter AC terminals to a positive or negative value of voltage of the DC capacitor, or zero voltage, through switching operations of the switch elements, and
the converter includes converter AC terminals connected to the AC power supply via the reactor and the inverter AC terminals connected in series to each other, converter DC terminals connected to the smoothing capacitor, and the switch elements, and switches a voltage level between the converter AC terminals to a positive or negative value of voltage of the smoothing capacitor, or zero voltage, through switching operations of the switch elements,
the power conversion device comprising a control unit for controlling the switching operations of the switch elements of the inverter and the switch elements of the converter, wherein
the control unit controls the switch elements of the inverter and the switch elements of the converter so that charging operation and discharging operation of the DC capacitor are performed in one switching cycle of the inverter and a charging amount and a discharging amount thereof are equal to each other, and
wherein
the control unit divides one switching cycle of the inverter into an even number of periods including one or a plurality of pairs of periods, each pair of periods being composed of a current increase period in which a current of the AC power supply increases and a current decrease period in which the current of the AC power supply decreases, and the control unit includes: a theoretical duty calculator which calculates a theoretical duty 1 corresponding to a time width of the current increase period relative to a time width of the pair of periods, and a theoretical duty 2 corresponding to a time width of the current decrease period relative to a time width of the pair of periods, so that a current increase amount in the current increase period and a current decrease amount in the current decrease period are equal to each other in the pair of periods; and a gate signal calculator which calculates gate signals for driving the switch elements of the inverter and the switch elements of the converter to perform switching, on the basis of the theoretical duty 1 and the theoretical duty 2.

2. The power conversion device according to claim 1, wherein the time width of the pair of periods is a predetermined fixed value.

3. The power conversion device according to claim 1, wherein the theoretical duty calculator calculates the theoretical duty 1 and the theoretical duty 2 on the basis of a voltage value of the AC power supply, a voltage value of the DC capacitor, a voltage value between the converter DC terminals, and an inductance value of the reactor which are set in advance.

4. The power conversion device according to claim 1, further comprising:

an AC voltage detection unit which detects the AC voltage of the AC power supply and outputs an AC voltage detection value;

a DC capacitor voltage detection unit which detects a voltage of the DC capacitor and outputs a DC capacitor voltage detection value; and a DC voltage detection unit which detects a voltage between the converter DC terminals and outputs a DC voltage detection value, wherein the theoretical duty calculator calculates the theoretical duty 1 and the theoretical duty 2 on the basis of the AC voltage detection value, the DC capacitor voltage detection value, the DC voltage detection value, and the inductance value of the reactor.

5. The power conversion device according to claim 1, further comprising an AC current detection unit which detects the current of the AC power supply and outputs an AC current detection value, wherein the control unit includes a feedback duty calculator which calculates a feedback duty on the basis of a predetermined AC current command value and the AC current detection value, and the gate signal calculator calculates the gate signals on the basis of duties obtained by adding the feedback duty to the theoretical duty 1 and by subtracting the feedback duty from the theoretical duty 2.

6. The power conversion device according to claim 1, further comprising:

a DC voltage detection unit which detects a voltage between the converter DC terminals and outputs a DC voltage detection value; and an AC current detection unit which detects a current of the AC power supply and outputs an AC current detection value, wherein the control unit includes a voltage controller which generates an AC current command value on the basis of a deviation between a predetermined DC voltage command value and the DC voltage detection value, and a feedback duty calculator which calculates a feedback duty on the basis of a deviation between the AC current command value and the AC current detection value, and the gate signal calculator calculates the gate signals on the basis of duties obtained by adding the feedback duty to the theoretical duty 1 and by subtracting the feedback duty from the theoretical duty 2.

7. The power conversion device according to claim 1, wherein the switching cycle of the inverter and the switching cycle of the converter are set to be equal to each other, and the control unit in an area A in which a voltage between the converter DC terminals is the greatest among the AC voltage of the AC power supply, the voltage between the converter DC terminals, and a voltage of the DC capacitor, divides one switching cycle of each of the inverter and the converter into four periods, and in an area B in which voltage of the AC power supply is the greatest among the AC voltage of the AC power supply, the voltage between the converter DC terminals, and the voltage of the DC capacitor, divides one switching cycle of each of the inverter and the converter into two periods, thereby controlling the switch elements of the inverter and the switch elements of the converter.

8. The power conversion device according to claim 1, wherein the switching cycle of the inverter is set to be twice the switching cycle of the converter, and the control unit in an area A in which a voltage between the converter DC terminals is the greatest among the AC voltage of the AC power supply, the voltage between the converter DC terminals, and a voltage of the DC capacitor, divides one switching cycle of the inverter into eight periods and divides one switching cycle of the converter into four periods, and in an area B in which the AC voltage of the AC power supply is the greatest among the AC voltage of the AC power supply, the voltage between the converter DC terminals, and the voltage of the DC capacitor, divides one switching cycle of the inverter into four periods and divides one switching cycle of the converter into two periods, thereby controlling the switch elements of the inverter and the switch elements of the converter.

9. The power conversion device according to claim 1, wherein the switching cycle of the inverter and the switching cycle of the converter are set to be equal to each other, and the control unit in an area A in which a voltage between the converter DC terminals is the greatest among the AC voltage of the AC power supply, the voltage between the converter DC terminals, and a voltage of the DC capacitor, divides one switching cycle of each of the inverter and the converter into six periods, and in an area B in which the AC voltage of the AC power supply is the greatest among the AC voltage of the AC power supply, the voltage between the converter DC terminals, and the voltage of the DC capacitor, divides one switching cycle of each of the inverter and the converter into two periods, thereby controlling the switch elements of the inverter and the switch elements of the converter.

10. The power conversion device according to claim 6, further comprising a DC capacitor voltage detection unit which detects the voltage of the DC capacitor and outputs a DC capacitor voltage detection value, wherein the control unit divides one switching cycle of each of the inverter and the converter into a plurality of pairs of periods, thereby setting control axes the number of which is equal to the number of the plurality of pairs, each control axis determining a boundary between the current increase period and the current decrease period in each pair of the periods, and the control unit performs, for a control axis selected from the plurality of control axes, operation of adding the feedback duty to the theoretical duty 1 and subtracting the feedback duty from the theoretical duty 2 on the basis of an AC current increase or decrease command corresponding to the feedback duty and a DC capacitor voltage increase or decrease command corresponding to a deviation between a predetermined DC capacitor voltage command value and the DC capacitor voltage detection value, thereby keeping the DC voltage detection value at the DC voltage command value and keeping the DC capacitor voltage detection value at the DC capacitor voltage command value.

11. The power conversion device according to claim 6, further comprising a DC capacitor voltage detection unit which detects the voltage of the DC capacitor and outputs a DC capacitor voltage detection value, wherein the control unit sets a plurality of modes in advance for an operation mode determined by ON or OFF states of the switch elements in each period, and on the basis of a DC capacitor voltage increase or decrease command corresponding to a deviation between a predetermined DC capacitor voltage command value and the DC capacitor voltage detection value, the control unit selects one of the periods and switches the operation mode in the selected period to a mode selected from the plurality of modes, thereby keeping the DC voltage detection value at the DC voltage command value and keeping the DC capacitor voltage detection value at the DC capacitor voltage command value.

12. The power conversion device according to claim 6, wherein the inverter comprises: a first inverter of which one of the inverter AC terminals is connected to a positive side of the AC power supply and the other one of the inverter AC terminals is connected to one of the converter AC terminals of the converter; and a second inverter of which one of the inverter AC terminals is connected to a negative side of the AC power supply and the other one of the inverter AC terminals is connected to the other one of the converter AC terminals of the converter, the switching cycle of both of the inverters are set to be twice the switching cycle of the converter, the control unit in an area A in which the voltage between the converter DC terminals is the greatest among the AC voltage of the AC power supply, the voltage between the converter DC terminals, a voltage of a first DC capacitor of the first inverter, and a voltage of a second DC capacitor of the second inverter, divides one switching cycle of both of the inverters into four pairs of periods, which are eight periods in total, and divides one switching cycle of the converter into two pairs of periods, which are four periods in total, thereby setting four control axes of a first control axis, a second control axis, a third control axis, and a fourth control axis as control axes each determining a boundary between the current increase period and the current decrease period in each pair of periods, per one switching cycle of both of the inverters, and in an area B in which the AC voltage of the AC power supply is the greatest among the AC voltage of the AC power supply, the voltage between the converter DC terminals, the voltage of the first DC capacitor, and the voltage of the second DC capacitor, divides one switching cycle of both of the inverters into four periods and divides one switching cycle of the converter into two periods, thereby controlling the switch elements of both of the inverters and the switch elements of the converter, the power conversion device further comprising: a first DC capacitor voltage detection unit which detects the voltage of the first DC capacitor and outputs a first DC capacitor voltage detection value; and a second DC capacitor voltage detection unit which detects the voltage of the second DC capacitor and outputs a second DC capacitor voltage detection value, wherein in the area A, the control unit performs, for a control axis selected from two control axes of the first control axis and the second control axis, operation of adding the feedback duty to the theoretical duty 1 and subtracting the feedback duty from the theoretical duty 2 on the basis of an AC current increase or decrease command corresponding to the feedback duty and a first DC capacitor voltage increase or decrease command corresponding to a deviation between a predetermined first DC capacitor voltage command value and the first DC capacitor voltage detection value, and performs, for a control axis selected from two control axes of the third control axis and the fourth control axis, operation of adding the feedback duty to the theoretical duty 1 and subtracting the feedback duty from the theoretical duty 2 on the basis of the AC current increase or decrease command and a second DC capacitor voltage increase or decrease command corresponding to a deviation between a predetermined second DC capacitor voltage command value and the second DC capacitor voltage detection value, thereby keeping the DC voltage detection value at the DC voltage command value, and keeping the first DC capacitor voltage detection value at the first DC capacitor voltage command value, and the second DC capacitor voltage detection value at the second DC capacitor voltage command value, and in the area B, the control unit sets a plurality of modes in advance for an operation mode determined by ON or OFF states of the switch elements in each period, and on the basis of the first DC capacitor voltage increase or decrease command and the second DC capacitor voltage increase or decrease command, the control unit selects one of the periods and switches the operation mode in the selected period to a mode selected from the plurality of modes, thereby keeping the DC voltage detection value at the DC voltage command value, and keeping the first DC capacitor voltage detection value at the first DC capacitor voltage command value, and the second DC capacitor voltage detection value at the second DC capacitor voltage command value.

13. The power conversion device according to claim 2, wherein
the theoretical duty calculator calculates the theoretical duty 1 and the theoretical duty 2 on the basis of a voltage value of the AC power supply, a voltage value of the DC capacitor, a voltage value between the converter DC terminals, and an inductance value of the reactor which are set in advance.

14. The power conversion device according to claim 3, further comprising:
an AC voltage detection unit which detects the AC voltage of the AC power supply and outputs an AC voltage detection value;
a DC capacitor voltage detection unit which detects a voltage of the DC capacitor and outputs a DC capacitor voltage detection value; and
a DC voltage detection unit which detects a voltage between the converter DC terminals and outputs a DC voltage detection value, wherein
the theoretical duty calculator calculates the theoretical duty 1 and the theoretical duty 2 on the basis of the AC voltage detection value, the DC capacitor voltage detection value, the DC voltage detection value, and the inductance value of the reactor.

15. The power conversion device according to claim 3, further comprising an AC current detection unit which detects a current of the AC power supply and outputs an AC current detection value, wherein
the control unit includes a feedback duty calculator which calculates a feedback duty on the basis of a predetermined AC current command value and the AC current detection value, and
the gate signal calculator calculates the gate signals on the basis of duties obtained by adding the feedback duty to the theoretical duty 1 and by subtracting the feedback duty from the theoretical duty 2.

16. The power conversion device according to claim 3, further comprising:
a DC voltage detection unit which detects a voltage between the converter DC terminals and outputs a DC voltage detection value; and
an AC current detection unit which detects a current of the AC power supply and outputs an AC current detection value, wherein
the control unit includes a voltage controller which generates an AC current command value on the basis of a deviation between a predetermined DC voltage command value and the DC voltage detection value, and a feedback duty calculator which calculates a feedback duty on the basis of a deviation between the AC current command value and the AC current detection value, and
the gate signal calculator calculates the gate signals on the basis of duties obtained by adding the feedback duty to the theoretical duty 1 and by subtracting the feedback duty from the theoretical duty 2.

17. The power conversion device according to claim 3, wherein
the switching cycle of the inverter and the switching cycle of the converter are set to be equal to each other, and
the control unit
in an area A in which a voltage between the converter DC terminals is the greatest among the AC voltage of the AC power supply, the voltage between the converter DC terminals, and a voltage of the DC capacitor, divides one switching cycle of each of the inverter and the converter into four periods, and
in an area B in which the AC voltage of the AC power supply is the greatest among the AC voltage of the AC power supply, the voltage between the converter DC terminals, and the voltage of the DC capacitor, divides one switching cycle of each of the inverter and the converter into two periods,
thereby controlling the switch elements of the inverter and the switch elements of the converter.

18. The power conversion device according to claim 3, wherein
the switching cycle of the inverter is set to be twice the switching cycle of the converter, and
the control unit
in an area A in which a voltage between the converter DC terminals is the greatest among the AC voltage of the AC power supply, the voltage between the converter DC terminals, and a voltage of the DC capacitor, divides one switching cycle of the inverter into eight periods and divides one switching cycle of the converter into four periods, and
in an area B in which the AC voltage of the AC power supply is the greatest among the AC voltage of the AC power supply, the voltage between the converter DC terminals, and the voltage of the DC capacitor, divides one switching cycle of the inverter into four periods and divides one switching cycle of the converter into two periods,
thereby controlling the switch elements of the inverter and the switch elements of the converter.

19. The power conversion device according to claim 3, wherein
the switching cycle of the inverter and the switching cycle of the converter are set to be equal to each other, and
the control unit
in an area A in which a voltage between the converter DC terminals is the greatest among the AC voltage of the AC power supply, the voltage between the converter DC terminals, and a voltage of the DC capacitor, divides one switching cycle of each of the inverter and the converter into six periods, and
in an area B in which the AC voltage of the AC power supply is the greatest among the AC voltage of the AC power supply, the voltage between the converter DC terminals, and the voltage of the DC capacitor, divides one switching cycle of each of the inverter and the converter into two periods,
thereby controlling the switch elements of the inverter and the switch elements of the converter.

* * * * *